(12) United States Patent
Singh et al.

(10) Patent No.: US 11,796,255 B2
(45) Date of Patent: Oct. 24, 2023

(54) AIR-COOLED CONDENSER WITH DEFLECTION LIMITER BEAMS

(71) Applicant: Holtec International, Camden, NJ (US)

(72) Inventors: Krishna P. Singh, Jupiter, FL (US); Vytautas Vincas Maciunas, Cherry Hill, NJ (US); Raghavendra Palle, Camden, NJ (US)

(73) Assignee: Holtec International

( * ) Notice: Subject to any disclaimer, the term of this patent is extended or adjusted under 35 U.S.C. 154(b) by 248 days.

(21) Appl. No.: 17/073,976

(22) Filed: Oct. 19, 2020

(65) Prior Publication Data

US 2021/0210242 A1 Jul. 8, 2021

Related U.S. Application Data

(63) Continuation-in-part of application No. 16/906,382, filed on Jun. 19, 2020, now Pat. No. 11,604,030, and
(Continued)

(51) Int. Cl.
*F28B 1/06* (2006.01)
*G21F 5/12* (2006.01)
(Continued)

(52) U.S. Cl.
CPC ................. *F28B 1/06* (2013.01); *G21F 5/12* (2013.01); *G21C 19/40* (2013.01); *G21F 5/008* (2013.01)

(58) Field of Classification Search
CPC ...... F28B 1/00; F28B 1/06; F28B 7/00; F28B 9/00; F28F 9/0132; F28F 9/13
See application file for complete search history.

(56) References Cited

U.S. PATENT DOCUMENTS

| 1,841,528 A | 2/1930 | Gebhardt |
| 1,781,062 A | 11/1930 | Huston |

(Continued)

FOREIGN PATENT DOCUMENTS

| CA | 2081695 | 9/1993 |
| CN | 101777394 A | 7/2010 |

(Continued)

OTHER PUBLICATIONS

Corresponding EP Search Report for Application No. 18158156.2 dated Jun. 25, 2018.
(Continued)

*Primary Examiner* — Travis Ruby
(74) *Attorney, Agent, or Firm* — The Belles Group, P.C.

(57) ABSTRACT

An air-cooled condenser system for steam condensing applications in a power plant Rankine cycle includes an air cooled condenser having a plurality of interconnected modular cooling cells. Each cell comprises a frame-supported fan, inlet steam headers, outlet condensate headers, and tube bundle assemblies having extending between the headers. The tube bundle assemblies may be arranged in a V-shaped tube structure. A plurality of deflection limiter beams are arranged coplanar with the tube bundles. Top ends of each deflection limiter beam are slideably inserted in an associated floating end cap affixed to an upper tubesheet which moves vertically relative to the beams via thermal expansion/contraction concomitantly with the tubes. The deflection limiter beams provides guided restraint system for expansion/contraction of the tube bundles which prevents out of plane tube bowing.

18 Claims, 145 Drawing Sheets

Related U.S. Application Data a continuation-in-part of application No. 16/792,711, filed on Feb. 17, 2020, now Pat. No. 11,488,737, and a continuation-in-part of application No. 16/779,908, filed on Feb. 3, 2020, now Pat. No. 11,410,784, and a continuation-in-part of application No. 16/381,728, filed on Apr. 11, 2019, now Pat. No. 11,512,902, which is a continuation-in-part of application No. 16/173,313, filed on Oct. 29, 2018, now Pat. No. 11,306,972, said application No. 16/906,382 is a continuation-in-part of application No. 16/142,246, filed on Sep. 26, 2018, now Pat. No. 11,204,201, application No. 17/073,976 is a continuation-in-part of application No. 16/018,974, filed on Jun. 26, 2018, now Pat. No. 11,187,471, and a continuation-in-part of application No. 15/618,774, filed on Jun. 9, 2017, now Pat. No. 10,847,274.

(60) Provisional application No. 62/863,360, filed on Jun. 19, 2019, provisional application No. 62/806,144, filed on Feb. 15, 2019, provisional application No. 62/799,868, filed on Feb. 1, 2019, provisional application No. 62/655,858, filed on Apr. 11, 2018, provisional application No. 62/630,573, filed on Feb. 14, 2018, provisional application No. 62/580,125, filed on Nov. 1, 2017, provisional application No. 62/564,000, filed on Sep. 27, 2017, provisional application No. 62/526,213, filed on Jun. 28, 2017, provisional application No. 62/463,319, filed on Feb. 24, 2017.

(51) Int. Cl.
  *G21F 5/008* (2006.01)
  *G21C 19/40* (2006.01)

(56) References Cited

U.S. PATENT DOCUMENTS

| | | |
|---|---|---|
| 1,788,673 A | 1/1931 | Houston |
| 1,814,010 A | 7/1931 | Snow |
| 1,814,401 A | 7/1931 | Snow |
| 2,061,980 A | 11/1936 | Price |
| 2,452,391 A | 10/1948 | O'Sullivan et al. |
| 2,549,093 A | 4/1951 | Walter |
| 3,048,372 A | 8/1962 | Newton, Jr. |
| 3,118,497 A | 1/1964 | Olson |
| 3,125,161 A | 3/1964 | Romanos |
| 3,177,934 A | 4/1965 | Hoppe, Jr. |
| 3,333,630 A | 8/1967 | Charcharos |
| 3,447,598 A * | 6/1969 | Kaess, Jr. ............ F28F 9/013 165/122 |
| 3,692,140 A | 9/1972 | Smith |
| 3,707,185 A * | 12/1972 | Modine ............ F25B 39/04 165/122 |
| 3,716,097 A | 2/1973 | Kelp et al. |
| 3,797,566 A | 3/1974 | Credoz et al. |
| 3,841,271 A | 10/1974 | Massaro |
| 3,842,904 A | 10/1974 | Gardenier |
| 3,902,548 A | 9/1975 | Bochard |
| 4,067,771 A | 1/1978 | Rubin |
| 4,120,350 A | 10/1978 | Norton |
| 4,133,374 A * | 1/1979 | York ............ F28F 9/0241 110/304 |
| 4,163,470 A | 8/1979 | Johnsen et al. |
| 4,163,570 A | 8/1979 | Greenaway |
| 4,237,968 A | 12/1980 | Duke |
| 4,263,964 A * | 4/1981 | Masai ............ F28D 9/00 29/469 |
| 4,276,928 A | 7/1981 | Blaskowski |
| 4,308,913 A * | 1/1982 | Heeren ............ F28F 9/013 261/DIG. 11 |
| 4,429,662 A | 2/1984 | Hashizume |
| 4,436,146 A | 3/1984 | Smolarek |
| 4,436,693 A | 3/1984 | Zezza et al. |
| 4,450,134 A | 5/1984 | Soot et al. |
| 4,506,728 A | 3/1985 | Gentry |
| 4,561,496 A | 12/1985 | Kehrer |
| 4,612,980 A | 9/1986 | Roberts |
| 4,634,875 A | 1/1987 | Kugeler et al. |
| 4,635,707 A | 1/1987 | Gentry |
| 4,820,472 A | 4/1989 | Machado et al. |
| 4,889,681 A | 12/1989 | Wachter et al. |
| 4,980,093 A | 12/1990 | Katsuyuki et al. |
| 5,015,432 A | 5/1991 | Koloc |
| 5,185,104 A | 2/1993 | Horie |
| 5,245,641 A | 9/1993 | Machado et al. |
| 5,296,199 A | 3/1994 | Kwok et al. |
| 5,309,946 A | 5/1994 | Ligneul |
| 5,323,849 A | 6/1994 | Korczynski, Jr. et al. |
| 5,419,391 A | 5/1995 | Chan et al. |
| 5,490,559 A | 2/1996 | Dinulescu |
| 5,579,836 A | 12/1996 | Maruyama |
| 5,740,215 A | 4/1998 | Gluschke et al. |
| 6,234,244 B1 | 5/2001 | Morrison et al. |
| 6,273,180 B1 | 8/2001 | Joshi et al. |
| 6,474,272 B2 | 11/2002 | Bensing et al. |
| 6,587,536 B1 | 7/2003 | Singh et al. |
| 6,691,742 B1 | 2/2004 | Cooper |
| 7,330,525 B2 | 2/2008 | Singh et al. |
| 7,994,380 B2 | 8/2011 | Singh et al. |
| 8,091,617 B2 | 1/2012 | Kirschenmann |
| 8,297,561 B1 | 10/2012 | Montplaisir et al. |
| 8,415,521 B2 | 4/2013 | Singh et al. |
| 8,660,231 B2 | 2/2014 | Kielbowiez |
| 8,789,389 B2 | 7/2014 | Ogasawara |
| 8,794,299 B2 | 8/2014 | Barfknecht et al. |
| 9,146,045 B2 | 9/2015 | Miglio |
| 9,786,394 B2 | 10/2017 | Singh et al. |
| 9,786,395 B2 | 10/2017 | Singh et al. |
| 9,951,994 B2 | 4/2018 | Vouche et al. |
| 9,995,182 B2 * | 6/2018 | Scholz ............ F28B 1/06 |
| 10,024,600 B2 | 7/2018 | Bugler et al. |
| 2002/0005176 A1 | 1/2002 | Bensing et al. |
| 2003/0089491 A1 | 5/2003 | Mitsumoto et al. |
| 2007/0079956 A1 | 4/2007 | Howard |
| 2008/0076953 A1 | 3/2008 | Singh et al. |
| 2008/0265182 A1 | 10/2008 | Singh et al. |
| 2009/0178279 A1 | 7/2009 | Schabosky et al. |
| 2009/0220334 A1 | 9/2009 | Vouche |
| 2010/0078147 A1 | 4/2010 | Samyn et al. |
| 2010/0177858 A1 | 7/2010 | Kielbowiez |
| 2010/0263840 A1 | 10/2010 | Nobel |
| 2010/0282451 A1 | 11/2010 | Singh et al. |
| 2010/0300653 A1 | 12/2010 | Bonner |
| 2012/0199323 A1 | 8/2012 | Pazzaglia et al. |
| 2013/0269910 A1 | 10/2013 | De Piero et al. |
| 2013/0263840 A1 | 11/2013 | Eidhoven |
| 2013/0292103 A1 | 11/2013 | Eindhoven |
| 2013/0301781 A1 | 11/2013 | Parvin et al. |
| 2014/0311466 A1 | 10/2014 | Schuricht et al. |
| 2014/0367243 A1 | 12/2014 | Kroger et al. |
| 2015/0206610 A1 | 7/2015 | Carver et al. |
| 2015/0221402 A1 | 8/2015 | Singh et al. |
| 2015/0287483 A1 | 10/2015 | Singh et al. |
| 2015/0310947 A1 | 10/2015 | Singh et al. |
| 2015/0345166 A1 | 12/2015 | Quickelber-Ghe et al. |
| 2016/0003551 A1 | 1/2016 | Fujita et al. |
| 2016/0040267 A1 | 2/2016 | Stoner et al. |
| 2016/0169229 A1 | 6/2016 | Kimura et al. |
| 2016/0260508 A1 | 9/2016 | Singh et al. |
| 2016/0291570 A1 | 10/2016 | Iriguchi et al. |
| 2017/0016678 A1 | 1/2017 | Singh et al. |
| 2017/0051981 A1 | 2/2017 | Singh et al. |
| 2017/0130872 A1 | 5/2017 | Drummond |
| 2017/0336147 A1 | 11/2017 | Dieguez Fortes |
| 2018/0100700 A1 | 4/2018 | Beaver et al. |
| 2018/0322970 A1 | 11/2018 | Singh et al. |
| 2018/0358136 A1 | 12/2018 | Deng |

(56) References Cited

U.S. PATENT DOCUMENTS

| | | |
|---|---|---|
| 2019/0093953 A1 | 3/2019 | Singh et al. |
| 2019/0242660 A1 | 8/2019 | Badin et al. |
| 2020/0027612 A1 | 1/2020 | Singh |

FOREIGN PATENT DOCUMENTS

| | | |
|---|---|---|
| CN | 201772780 | 3/2011 |
| CN | 103673681 | 3/2014 |
| CN | 103954153 | 7/2014 |
| CN | 104110329 | 10/2014 |
| CN | 105620954 A | 6/2016 |
| CN | 106017150 | 10/2016 |
| CN | 205919715 | 2/2017 |
| CN | 106802098 | 6/2017 |
| DE | 3430180 | 2/1986 |
| DE | 102006029773 B3 | 7/2007 |
| DE | 102014112707 | 9/2014 |
| DE | 102014112707 | 3/2016 |
| DE | 102014019773 A1 | 6/2016 |
| EP | 0058956 | 10/1984 |
| JP | S60243494 | 12/1985 |
| JP | 61082035 | 4/1986 |
| JP | H10186074 A | 7/1998 |
| JP | 2006514909 | 5/2006 |
| JP | 2009058144 | 3/2009 |
| JP | 2012073136 | 4/2012 |
| JP | 2015152443 | 8/2015 |
| KR | 810001479 B1 | 10/1981 |
| KR | 100729705 | 6/2007 |
| KR | 20140103333 A | 8/2014 |
| WO | WO 2004/052524 | 6/2004 |
| WO | WO 2014/176289 | 10/2014 |
| WO | WO 2015/061641 | 4/2015 |
| WO | WO 2017/202730 | 11/2017 |

OTHER PUBLICATIONS

International Search Report for Corresponding Application No. PCT/US2018/039528 dated Sep. 18, 2018.
International Search Report and Written Opinion for International Application No. PCT/US2020/038662 dated Sep. 8, 2020.
International Search Report and Written Opinion issued in PCT/US2018/052813 dated Dec. 12, 2018, pp. 1-13.
International Search Report and Written Opinion for International Application No. PCT/US 18/57949 dated Jan. 15, 2019.
International Search Report and Written Opinion for International Application No. PCT/US2019/026898 dated Aug. 2, 2019.
International Search Report and Written Opinion for International Application No. PCT/US20/16330 dated Oct. 13, 2020.
International Search Report and Written Opinion for International Application No. PCT/US20/18515 dated Sep. 18, 2020.

* cited by examiner

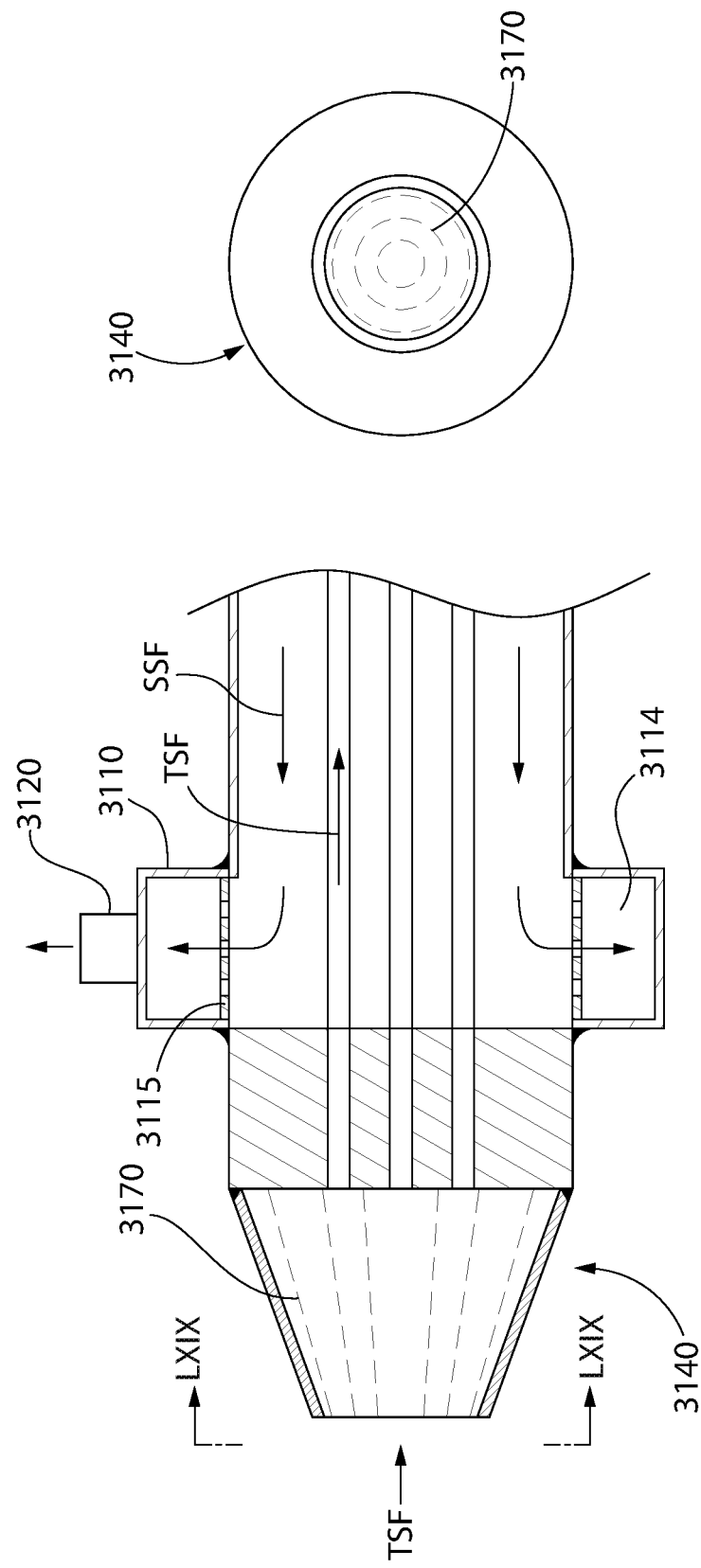

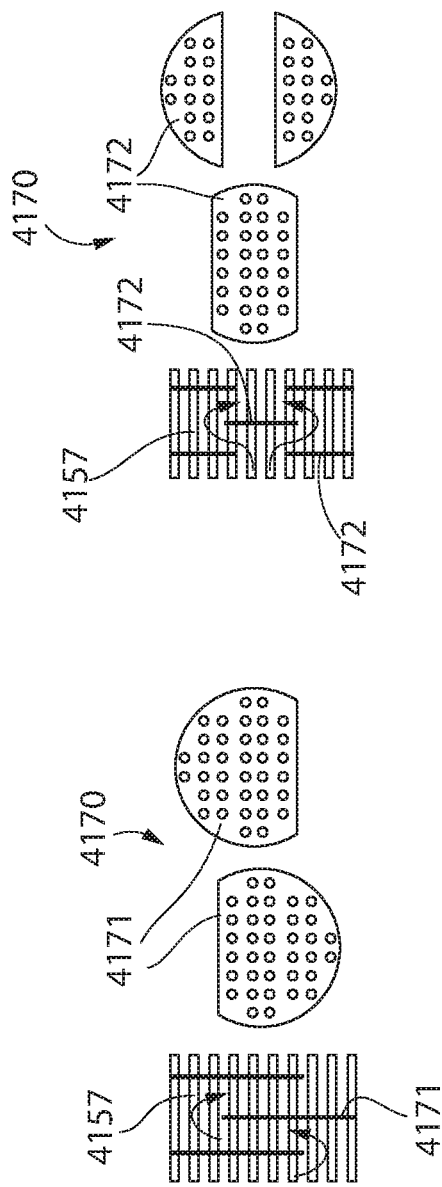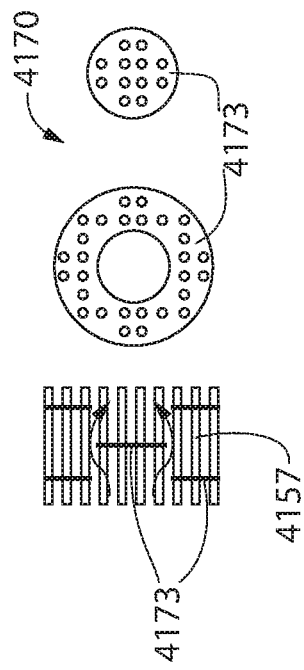
FIG. 77A
FIG. 77B
FIG. 77C

AIR-COOLED CONDENSER WITH DEFLECTION LIMITER BEAMS

CROSS-REFERENCE TO RELATED APPLICATIONS

The present application is a continuation-in-part of U.S. patent application Ser. No. 15/618,774, filed Jun. 9, 2017, which claims priority to U.S. Provisional Patent Application Ser. No. 62/463,319, filed Feb. 24, 2017.

The present application is a continuation-in-part of U.S. patent application Ser. No. 16/018,974, filed Jun. 26, 2018, which claims priority to U.S. Provisional Patent Application Ser. No. 62/526,213, filed Jun. 28, 2017.

The present application is a continuation-in-part of U.S. patent application Ser. No. 16/906,382, filed Jun. 19, 2020, which: (1) claims priority to U.S. Provisional Patent Application Ser. No. 62/863,360, filed Jun. 19, 2019; and (2) is a continuation-in-part of U.S. patent application Ser. No. 16/142,246, filed Sep. 26, 2018, which claims priority to U.S. Provisional Patent Application Ser. No. 62/564,000, filed Sep. 27, 2017.

The present application is a continuation-in-part of U.S. patent application Ser. No. 16/381,728, filed Apr. 11, 2019, which: (1) claims priority to United States. Provisional Patent Application Ser. No. 62/655,858 filed Apr. 11, 2018; and (2) is a continuation-in-part of U.S. patent application Ser. No. 16/173,313 filed Oct. 29, 2018, which claims priority to: (1) U.S. Provisional Patent Application Ser. No. 62/580,125, filed Nov. 1, 2017; and (2) U.S. Provisional Patent Application Ser. No. 62/630,573, filed Feb. 14, 2018.

The present application is a continuation-in-part of U.S. patent application Ser. No. 16/779,908, filed Feb. 3, 2020, which claims priority to U.S. Provisional Patent Application Ser. No. 62/799,868, filed Feb. 1, 2019.

The present application is a continuation-in-part of U.S. patent application Ser. No. 16/792,711, filed Feb. 17, 2020, which claims priority to U.S. Provisional Patent Application Ser. No. 62/806,144, filed Feb. 15, 2019.

The entireties of all of the foregoing applications are incorporated herein by reference.

BACKGROUND

The present invention generally relates, in one aspect, to dry cooling systems, and more particularly to an air-cooled condenser system suitable for steam condensing applications in a Rankine cycle of an electric generating power plant or other non-power generating applications.

An air-cooled condenser (ACC) provides a competent alternative to the water-cooled condenser to condense large quantities of low pressure waste steam from power plants and other industrial installations. Over the past seven decades, the state-of-the art in ACC design has evolved to the single tube row configuration wherein a blower/fan blasts ambient air past an array of inclined finned tubes that emulate a pitched A-frame roof. The angle of inclination of the finned tubes is typically 60 degrees from the horizontal plane. The finned tubes are in the shape of an elongated obround tube with the flat surfaces equipped with tall aluminum fins through which the blower's forced air must traverse to exit the ACC. The above arrangement of the blower and the finned tube bundles for efficient heat transfer is an established and proven technology that is widely used in ACC design. However, it is their structural design and constructability aspects of present and installation design practice that are amenable to innovation.

To frame the structural problem and put things in perspective, it is important to recognize that an ACC is a large massive structure. For a 500 MWe power plant, for example, a typical ACC has a footprint of about 40,000 square feet and rises about 110 feet high. The inclined tube bundles are each attached directly to and fully supported by a structural A-frame, which in turn is supported by a vertically-extending superstructure which elevates the fan and tube bundles above the ground. The heat transfer function of the ACC means that the tube bundles and piping headers of the structure undergoes significant thermal expansion and contraction under the ACC's normal operating conditions. Erecting a large ACC structure on site, particularly building the structural A-frame required to support the tube bundles, requires a significant amount of time and human effort.

An improved air-cooled condenser is therefore desired which minimizes the structural work required on site for erection and concomitantly provides thermal expansion/contraction capabilities to prevent differential thermal expansion induced crack formation particularly of the fluid components which form the pressure boundary for the steam and condensate.

The present invention generally relates, in another aspect, to storage of nuclear fuel, and more particularly to an improved seismic-resistant nuclear fuel storage rack system for a fuel pool in a nuclear generation plant.

A conventional high density nuclear fuel storage rack is a cellular structure supported on a set of pedestals, as shown in FIG. 47A. The bottom extremity of each fuel storage cell is welded to a common baseplate which serves to provide the support surface for the upwardly extending storage cells and stored nuclear fuel therein. The cellular region comprises of a set of narrow prismatic cavities formed by the cells which are each sized to accept a single nuclear fuel assembly comprising either new or spent fuel. The term "active fuel region" denotes the vertical space above the baseplate where the enriched uranium is located. A principal safety function of the fuel rack is to protect the geometry of the "active fuel region" from being adversely affected under any credible accident event, the most severe of them being the plant's postulated earthquake events.

A conventional rack has four or more pedestals (see, e.g. FIG. 47A). Under an earthquake event, the rack behaves as a cantilever beam exerting significant stresses in the bottom pedestals. The standard practice of fastening the pedestals to the fuel pool's bottom concrete slab has the serious drawback of making the removal of the racks at a future date, submerged in about a 40 feet deep pool of water, extremely onerous. The consideration of convenient decommissioning with minimum dose to the plant personnel and the ability to "rerack" (if necessary), has led the industry to install racks in a "free-standing" configuration. The free-standing rack design configuration has become the dominant method over the past 30 years for installing wet storage capacity for used nuclear fuel in plants around the world. As would be expected, the rack modules are made as large as possible, limited only by the constraint of shipping them from the manufacturing facility to the plant and handling them within the plant for in-pool installation. They are also placed as close to each other as possible in the so-called "high density configuration" to maximize the in-pool fuel storage capacity. The inter-module gap between adjacent fuel racks can be as little as 2 inches in some installations.

Free standing fuel racks resist seismic loads primarily by the reactive friction at the pedestal to pool surface interface and the so-called fluid coupling effect. In a conventional free-standing fuel rack, the pedestals are supported on the fuel pool bottom base slab on some type of bearing pad as shown in FIG. 47A. However, if the earthquake is strong, then the interface friction may not be adequate to prevent lateral sliding movement or tipping/twisting of the racks, causing them to collide and creating a risk of damaging the cells and compromising the physical integrity of the stored nuclear fuel.

An improved earth-quake resistant nuclear fuel rack storage system is desired.

The present invention generally relates, in another embodiment, to heat exchangers, and more particularly to a shell and tube type heat exchangers suitable for the power generation industry.

Shell and tube type heat exchangers are used in the power generation and other industries to heat or cool various process fluids. For example, heat exchangers such as feedwater heaters are employed in Rankine power generation cycles in combination with steam turbine-generator sets to produce electric power. In such applications, the shell-side fluid (i.e. fluid flowing within the shell external to the tubes) is typically steam and the tube-side fluid (i.e. fluid flowing inside the tubes) is feedwater. Lower pressure steam exhausted from the turbine is condensed which forms the feedwater. Multiple feedwater heaters are generally employed in a Rankine cycle to sequentially and gradually increase the temperature feedwater using steam extracted from various extraction points in the steam turbine. The heated feedwater is returned to the steam generator where it is converted back to steam to complete the cycle. The heat source used to convert the feedwater to steam in the steam generator may be nuclear or fossil fuels.

In certain operating conditions, high longitudinal stresses in the shell and the tube bundle arise from differential thermal expansion due to differences in the shell and tubing material's coefficients of thermal expansion and fluid temperatures between the two flow streams (tube-side and shell-side). In fixed tubesheet heat exchangers operating under severe service conditions at high temperatures (e.g. temperatures in excess of 500 degrees F.), the differential expansion induced stress is the greatest threat to the unit's integrity and reliability. Other design alternatives used in the industry, such as a straight shell with an in-line bellow type expansion joint, outside packed floating head, etc., suffer from demerits such as risk of leakage (packed head design) or reduced structural ruggedness (expansion joint design).

A need exists for an improved heat exchanger design which can compensate more effectively for differential thermal expansion.

The present invention generally relates, in yet another embodiment, to heat exchangers, and more particularly to shell and tube type heat exchangers suitable for the power generation or other industries.

Shell and tube type heat exchangers are used in the power generation and other industries to heat or cool various process fluids. For example, heat exchangers such as feedwater heaters are employed in Rankine power generation cycles in combination with steam turbine-generator sets to produce electric power. In such applications, the shell-side fluid (i.e. fluid flowing within the shell external to the tubes) is typically steam and the tube-side fluid (i.e. fluid flowing inside the tubes) is feedwater. Lower pressure steam exhausted from the turbine is condensed which forms the feedwater. Multiple feedwater heaters are generally employed in a Rankine cycle to sequentially and gradually increase the temperature feedwater using steam extracted from various extraction points in the steam turbine. The heated feedwater is returned to the steam generator where it is converted back to steam to complete the cycle. The heat source used to convert the feedwater to steam in the steam generator may be nuclear, fossil fuels, solar, biomass, or other sources.

Typical tubular heat exchanger types, shown in the TEMA (Tubular Exchanger Manufacturers Association) standards for example, usually employ either straight tubes or U-tubes. The tubes individually provide the pressure boundary for the tube-side fluid. Tube bundles comprising a multitude of such tubes are commonly enclosed in a straight shell which provides the pressure boundary for the shell-side fluid. The opposite ends of U-tubes in a U-tube bundle are supported by and fluidly sealed to a single tubesheet for support by suitable means to provide a fluid tight seal. The opposite ends of straight tubes in a straight tube bundle are supported by and fluidly sealed to a pair of spaced apart parallel tubesheets provided at opposite ends of the straight shell.

In certain operating conditions, high longitudinal stresses in the shell and the tube bundle arise from differential thermal expansion due to differences in the shell and tubing material's coefficients of thermal expansion and fluid temperatures between the two flow streams (tube-side and shell-side). In fixed tubesheet heat exchangers operating under severe service conditions at high temperatures (e.g. temperatures in excess of 500 degrees F.), the differential expansion induced stress is the greatest threat to the unit's integrity and reliability. Other design alternatives used in the industry, such as a straight shell with an in-line bellow type expansion joint, outside packed floating head, etc., suffer from demerits such as risk of leakage (packed head design) or reduced structural ruggedness (expansion joint design).

A need exists for an improved heat exchanger design which can compensate more effectively for differential thermal expansion and improve reliability.

Cross baffles are also an essential part of shell-and-tube heat exchangers. Examples of the types of cross baffle designs based on TEMA standards include well-known single segmental baffles, double segmental baffles, and triple segmental baffles. The baffles are oriented transversely to the length of the tubes and function to both support the tubes and direct the shell-side fluid flow path. Virtually all baffle types such as those mentioned above direct the shellside fluid (e.g. steam) in a flow configuration or pattern that is largely across and transverse to the rows of tubes in the shell-side space (i.e. cross flow), resulting in greater turbulent flow which enhances heat transfer rate. This cross flow provides the opportunity to expend greater pumping power to realize a high shell-side film coefficient which maximizes heat transfer rates. In many cases, the design choice for maximizing heat transfer rates at the expense of greater pressure loss is the correct approach. However, there are also cases where minimizing the pumping cost with a concomitant reduction in the heat transfer rate may be the right design objective for a heat fluid flow system requiring minimum pressure loss or drop through the heat exchanger. For such a strategy to work, the shell-side flow must be maintained as longitudinal and linear through the shell-side with respect to the tubes' longitudinal axis as possible.

A need further exists for improvements in flow baffles for heat exchangers.

The present invention relates generally, in still another embodiment, to casks used to transport and store spent nuclear fuel created by nuclear generating plants or other facilities.

In the operation of nuclear reactors, the nuclear energy source is in the form of hollow Zircaloy tubes filled with enriched uranium (aka fuel rods), collectively arranged in assemblages referred to as fuel assemblies. Each fuel assembly contains a multitude of the packaged fuel rods. When the energy in the fuel assembly has been depleted to a certain predetermined level, the fuel assembly is removed from the nuclear reactor. The standard structure used to package used or spent nuclear fuel assemblies discharged from light water reactors for off-site shipment or on-site dry storage is known as the fuel basket. The fuel basket is essentially an assemblage of prismatic storage cells, each of which is sized to store one fuel assembly that comprises a plurality of individual spent nuclear fuel rods. The fuel basket is arranged inside a metallic storage canister (typically plain steel cylindrical walls), which in turn is placed inside a ventilated outer overpack or cask for safe transport and storage of the multiple spent fuel assemblies within the canister's inner fuel basket. The walls of the canister are therefore generally unshielded against radiation to minimize the outer diameter of the canister.

The spent nuclear fuel ("SNF") in the fuel assemblies within the canister is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. The canisters are therefore placed inside an outer shielded transport/storage overpack or cask containing radiation shielding. Neutron radiation may be effectively attenuated with the outer storage and transport casks having metallic and polymeric shielding materials typically containing boron. These boron-containing materials however are not effective at attenuating and shielding gamma radiation emitted from the fuel stored in the fuel baskets. Effective gamma radiation shielding requires very dense materials, such as lead, steel, concrete, copper, and combinations thereof which are incorporated into the outer cask. One common cask configuration consists of concentrically arranged steel shells creating an annulus therebetween filled with these dense gamma-blocking materials in addition to neutron shielding materials. The casks which house the spent nuclear fuel canister are thus very heavy and large structures with thick walls, typically weighing about 150 tons, about 15 feet or more high/long, and about 6 feet in internal diameter.

A cask bearing fissile nuclear materials such as for example a "transfer cask" used to move used nuclear fuel from the fuel pool to a storage pad may be vulnerable to overheating of its contents, for example, because of its thick walls (required for radiation shielding) which may inhibit rejection of heat to the ambient. The same situation applies to a "storage cask" used to store the SNF in a "dry state" for long periods of time. A hard limit may be placed on the maximum temperature that the casks contents are permitted to reach. For example, the USNRC, through its Information Notice ISG-11 Rev. 3, limits the peak cladding temperature of used nuclear fuel to 400 Deg. C. For a cask with relatively small heat loads (e.g., below 20 kW), the natural convection from the cask's outer surface may be enough to maintain the temperature of the contents below the limit. However, if the heat load and/or the ambient temperature are high, then natural convection alone may not be sufficient. For such a case, it is necessary to provide an auxiliary means to augment heat rejection from the cask.

For nuclear applications, such an auxiliary cooling system or device should preferably meet the following three requirements. First, the system/device must not rely on any active system such as pump or a blower which makes it vulnerable to loss of electric power. Second, the system/device must be substantially immune to malfunction due to human performance errors. For example, the device should not introduce the risk of a new type of accident. And third, to minimize radiation dosage to the crew or personnel, the system/device should not require the workers to be physically close to the cask for extended periods of time.

Improvements in cooling of casks used to both store and transport spent nuclear fuel which meet the foregoing criteria are needed.

The present invention relates, in a still further embodiment, generally to casks used to transport and store canisters containing high level radioactive waste such as spent nuclear fuel (SNF) created by nuclear generating plants or other facilities.

In the operation of nuclear reactors, the nuclear energy source is in the form of hollow Zircaloy tubes filled with enriched uranium (aka fuel rods), collectively arranged in assemblages referred to as fuel assemblies. Each fuel assembly contains a multitude of the packaged fuel rods. When the energy in the fuel assembly has been depleted to a certain predetermined level, the fuel assembly is removed from the nuclear reactor. The standard structure used to package used or spent nuclear fuel assemblies discharged from light water reactors for off-site shipment or on-site dry storage is known as the fuel basket. The fuel basket is essentially an assemblage of prismatic storage cells, each of which is sized to store one fuel assembly that comprises a plurality of individual spent nuclear fuel rods. The fuel basket is arranged inside a radiation unshielded metallic storage canister (typically stainless steel). The multi-purpose canister (MPC) available from Holtec International of Camden, N.J. is one example of such a fuel storage canister. The canister may be placed in turn inside a radiation shielded outer overpack or cask for safe transport and storage of the multiple spent fuel assemblies within the canister's inner fuel basket.

The spent nuclear fuel ("SNF") in the fuel assemblies within the transport/storage cask is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. Neutron radiation may be effectively attenuated with outer casks having metallic and polymeric shielding materials typically containing boron. These boron-containing materials however are not effective at attenuating and shielding gamma radiation emitted from the fuel baskets. Effective gamma radiation shielding requires very dense materials, such as lead, steel, concrete, copper, and combinations thereof to also be incorporated into the cask construction. The outer casks which house the spent nuclear fuel canister are thus very heavy and large structures with thick walls, typically weighing about 150 tons and about 15 feet or more high/long, and about 6 feet in internal diameter for housing the unshielded canister.

Transfer of the SNF from wet storage in the water impounded spent fuel pool of the nuclear facility to dry storage involves several operations to change the environment around the fuel from complete immersion in water to an inert gas such as helium. For example, the current practice in the United States is to package the SNF in the stainless-steel canister below water within the spent fuel pool which provides radiation shielding. The unshielded canister is placed inside the outer transfer cask which has been lowered into the fuel pool. The transfer cask along with the canister loaded with fuel assemblies and full of water is lifted out of the pool and set on the area often referred to as the "Decontamination and Assembly Station" (DAS) where the cask is pressure washed to remove surface contaminants. Hermetic seal welding of the closure lid to the top of the canister shell is carried out. The SNF in the canister is kept submerged in water. During this process, the canister to transfer cask annulus is also kept filled with water to provide additional shielding and to serve as the heat transmission bridge from the canister to the outside surface of the cask from which the heat is dissipated to the ambient environment by natural convection via the air and radiation.

The key requirement during the foregoing process when the canister still contains water is that the temperature of the water mass in the canister should be assured to remain below boiling. This is necessary because, during the lid-to-canister welding operation, the vapor from boiling water would adversely affect the quality of the lid to shell weld and integrity of the seal. After the lid has been fully welded, it becomes a closed pressure vessel whose internal pressure would rise uncontrollably creating an unsafe condition if the boiling of water continues to raise the internal pressure in the canister. Experience and computer simulations of typical modern canisters show that the natural convection from the transfer cask's external surface is adequate to keep the water sub-cooled, with no time limits on the operations, if the aggregate decay heat load in the canister is not greater than approximately 20 kW (kilowatts). At higher heat loads and under hot ambient conditions, however, the canister water may boil after a certain amount of time has elapsed, because natural thermal convection from the cask alone may not suffice to fully remove the heat generated by the SNF inside the canister.

Improvements in cooling high level radioactive waste such as SNF in the canister to prevent boiling is desired.

SUMMARY

An air-cooled condenser (ACC) system according to the present disclosure provides a novel configuration and support system which overcomes the foregoing disadvantages of prior ACC design. The ACC system may include an ACC comprising a top common steam header and a pair of laterally spaced apart bottom condensate headers. The ACC may be a single row finned tube heat exchanger comprising a plurality of inclined and self-supporting planar tube bundles arranged in an A-shape tube construction or structure in one configuration. An acute angle is formed between opposing walls or panels of tube bundles. In contrast to prior ACC design, the present ACC advantageously does not require a structural A-frame to support the tube bundles. The present design instead leverages the strength of the angled tube bundle panels by providing a unique coupling at the top joint between upper tubesheets of the panels to hingedly couple the panels together which accommodates differential thermal expansion of the tube bundles. In embodiment, the hinge may be formed by an angled seal plate sealably attached to each tubesheet.

In addition, a unique lower support system for the tube bundles provides unfixed and slideable mounting of the condensate headers to which each tube bundle is coupled. This allows the headers (steam and condensate) and tube bundles to grow or contract in the longitudinal direction as a unit thereby negating any significant differential thermal expansion problems.

Each tube bundle is fluidly coupled to the steam header at top and one of the condensate headers at bottom. One or more fans arranged below the A-shaped tube bundles blow ambient cooling air through the tube bundles to condense steam flowing through the tube side of the tubes. The condensed steam (i.e. condensate) collects in the bottom condensate headers. In one implementation, the ACC may be fluidly connected to a Rankine cycle flow loop comprising a steam turbine and performs the duty of a surface condenser. The ACC receives exhaust steam from the steam turbine, which is cooled and condensed before being returned to the Rankine cycle flow loop.

In one embodiment, the ACC may further include a thermal restraint unit which is configured to provide both a longitudinal and vertical restraint feature to arrest growth of the steam header and tube bundles under thermal expansion when heated by steam. The thermal restraint unit may comprise an A-frame in one embodiment fixedly mounted to the fan support frame and spaced apart from the tube bundles. The A-frame is a standalone and self-supporting structure. The thermal restraint unit is configured to provide both longitudinal restraint of the steam header and vertically restraint of the tube bundles when each grow in length due to thermal expansion. In one configuration, the thermal restraint unit includes a longitudinally stationary fixation member fixedly attached to the pair of upper tubesheets (which in turn are structural coupled to the steam header). In one embodiment, the fixation member may be a vertically oriented fixation keel plate. The fixation member is operable to arrest longitudinal growth of the steam header when the steam header grows due to thermal expansion, thereby providing a longitudinal restraint feature. The fixation member may be slideably mounted to the thermal restraint unit via a sliding joint which is configured to allow limited vertical growth and movement of the tube bundles when heated by steam, thereby providing a vertical restraint feature. The fixation member thus moves and down with the upper tubesheets and tube bundles fluidly coupled thereto.

In one aspect, an air-cooled condenser includes: a longitudinal axis; a longitudinally-extending steam header configured for receiving steam from a source of steam; a pair of longitudinally-extending condensate headers positioned below the steam header and spaced laterally apart; a pair of inclined tube bundles each comprising a plurality of tubes connected to an upper tubesheet and a lower tubesheet, the tube bundles disposed at an acute angle to each other; each tube bundle extending between and fluidly coupled to the steam header at top and a different one of the condensate headers at bottom forming an A-shaped tube structure; a fan mounted to a fan support frame and positioned below the tube bundles; wherein the tube structure is self-supporting such that the tube bundles are unsupported by the fan support frame between the upper and lower tubesheets.

In one embodiment, the air-cooled condenser may further include: a top steam flow plenum fluidly coupled between the steam header and the tube bundles, the upper tubesheets of each tube bundle attached to the steam flow plenum which is configured to transfer steam from the steam header to the tube bundles; and a condensate flow plenum fluidly coupled between each condensate header and a respective one of the tube bundles, the lower tubesheet of each tube bundle attached to a respective one of the condensate flow plenums which is configured to transfer condensate from the tube bundles to the condensate headers.

In one embodiment, the upper tubesheets are hingedly connected together by a longitudinally-extending angled seal plate, the seal plate comprising a resiliently flexible metal body operable to expand and contract due to thermal expansion.

In one embodiment, a longitudinally-extending monorail for maintenance of the fan may be provided. The monorail may be suspended overhead from the seal plate in one construction.

In another aspect, an air-cooled condenser includes: a longitudinal axis; a longitudinally-extending steam header configured for receiving steam from a source of steam; a pair of longitudinally-extending condensate headers positioned below the steam header and spaced laterally apart, the steam and condensate headers oriented parallel to each other; a pair of inclined tube bundles each comprising a plurality of tubes connected to an upper tubesheet and a lower tubesheet, the tube bundles disposed at an acute angle to each other; the upper tubesheets being hingedly connected together by a longitudinally-extending angled seal plate, the seal plate comprising a resiliently flexible metal body operable to deform under thermal expansion or contraction; each tube bundle arranged between and in fluid communication with the steam header and a different one of the condensate headers at bottom; a fan arranged for blowing ambient cooling air upwards through the bundles; a fan platform configured to support and raise the fan above a support surface, the fan platform comprising a horizontal fan deck positioned below the tube bundles; wherein the tube bundles, steam header, and condensate headers form a self-supporting tube structure in which the tube bundles are not directly supported by any structural members above the fan deck.

In another aspect, an air-cooled condenser includes: a longitudinal axis; a longitudinally-extending steam header configured for receiving steam from a source of steam; a pair of longitudinally-extending condensate headers positioned below the steam header and spaced laterally apart; a pair of inclined tube bundles each comprising a plurality of tubes connected to an upper tubesheet and a lower tubesheet, the tube bundles disposed at an acute angle to each other; each tube bundle extending between and fluidly coupled to the steam header at top and a different one of the condensate headers at bottom forming an A-shaped tube structure; a fan support frame supporting a fan below the tube bundles; the condensate headers each axially slideably supported by a saddle support fixedly attached to the fan support frame, the saddle supports each comprising an upwardly open arcuately curved support surface which slideably engages the condensate headers; wherein the condensate headers are operable to expand or contract in length in a direction parallel to the longitudinal axis due to thermal expansion or contraction conditions.

An induced draft air-cooled condenser is also disclosed.

According to one aspect, an air-cooled condenser cell comprises: a structural frame defining a longitudinal axis; a pair of longitudinally-extending steam headers supported by the frame and configured for receiving steam from a source of steam; a pair of longitudinally-extending condensate headers positioned below the steam headers and spaced laterally apart; a pair of inclined tube bundles each comprising a plurality of tubes connected to an upper tubesheet and a lower tubesheet, the tube bundles disposed at an acute angle to each other; each tube bundle extending between and fluidly coupled to one of the steam headers at top and a different one of the condensate headers at bottom forming a V-shaped tube structure; a fan mounted to the cell and arranged to flow ambient cooling air through the tube bundles; and a deflection limiter beam rigidly mounted to the frame; wherein the deflection limiter beam is arranged between the tube bundles and coplanar therewith.

According to another aspect, an air-cooled condenser comprises: an array of cooling cells, each cooling cell comprising: a structural frame defining a longitudinal axis and comprising a main beam, a plurality of transversely elongated condensate header support beams affixed to the main beam, and plurality of deflection limiter beams affixed to the condensate header support beams which collectively form a V-shaped structure; a pair of longitudinally-extending steam headers mounted to a top of the frame which receive steam from a source of steam; a pair of longitudinally-extending condensate headers mounted to condensate header support beams, one condensate header being arranged on each side of the main beam; a pair of inclined tube bundles each comprising a plurality of tubes connected to an upper tubesheet and a lower tubesheet, the tube bundles disposed at an acute angle to each other; each tube bundle arranged coplanar with the deflection limiter beams and fluidly coupled to one of the steam headers at top and one of the condensate headers at bottom; a fan mounted at a top of the frame and operable to draw ambient cooling air through the tube bundles; and a floating end cap associated with each deflection limiter beam and rigidly affixed to the upper tubesheet, each deflection limiter beam having a top end slideably inserted in an open channel of the end cap; wherein the end caps are configured to prevent out of plane bowing of the tube bundles via engaging the deflection limiter beams when the tubes thermally expand Embodiments of the present invention provide a seismic-resistant nuclear fuel rack stabilization system for a fuel pool that seeks to limit the kinematics of the racks and prevent damage to their active fuel region within their cellular structure during severe earthquakes. The present system is thus intended for use in high seismic scenarios, for example if the "zero period acceleration" (ZPA) of any of the earthquake's components exceeds 0.5 g. Features of embodiments of the present seismic-resistant design is that the rack modules are not fastened to the pool slab providing "free standing" fuel racks, but advantageously are substantially restrained against lateral horizontal movement during earthquakes and further provide the hardest location in the body of the module—their baseplates—to serve as the bumper to absorb impact loadings from other adjacent racks under earthquakes.

In one aspect, a seismic-resistant nuclear fuel storage system includes: a fuel pool comprising a base slab and plurality of vertical sidewalls collectively defining a cavity configured for wet storage of nuclear fuel; a fuel rack comprising a plurality of vertically elongated tubular cells each defining a prismatic cavity configured for storing nuclear fuel therein, the cells attached to a common baseplate; a plurality of pedestals protruding downwardly from the baseplate; a plurality of spaced apart embedment plates fixedly anchored to the base slab, each embedment plate comprising an upwardly open receptacle having receptacle walls defining a receptacle depth, each receptacle receiving and entrapping one of the pedestals of the fuel rack therein; wherein the embedment plate receptacles are configured such that lateral movement of the fuel rack along the base slab in the event of a seismic event is constrained by engagement between the receptacle walls of each receptacle and the pedestals.

In another aspect, a fuel rack stabilization system for seismic-resistant storage of nuclear fuel includes: a fuel pool comprising a base slab and plurality of vertical sidewalls collectively defining a cavity configured for submerged wet storage of nuclear fuel; a plurality of fuel racks supported on the base slab, each fuel rack comprising a plurality of vertically elongated tubes each defining a prismatic cavity configured for storing nuclear fuel therein, the tubes attached to a common baseplate; each fuel rack comprising a plurality of spaced apart pedestals protruding downwardly from the baseplate; a plurality of spaced apart embedment plates fixedly anchored to the base slab, each embedment plate comprising at least one upwardly open embedment cavity having cavity walls, the cavities each receiving and entrapping a respective one of the pedestals of the fuel racks therein; a pool liner secured to the base slab of the fuel pool, the pool liner extending between the plurality of spaced apart embedment plates and having a thickness less than the embedment plate; wherein a perimeter of the embedment plates is hermetically seal welded to the pool liner around all lateral sides to form an impervious barrier to outward leakage of pool water from the fuel pool; wherein the embedment plate cavities are configured such that lateral movement of the fuel rack along the base slab caused by a seismic event is restricted by engagement between the cavity walls of each cavity and the pedestal such that laterally acting seismic forces are not transmitted to the pool liner.

In another aspect, a method for seismic-resistant storage of nuclear fuel in a fuel pool comprises: staging first and second fuels racks in a nuclear facility, each fuel rack comprising a plurality of tubes each defining a prismatic cavity configured for storing nuclear fuel therein, the tubes supported on a common baseplate comprising a plurality of pedestals protruding downwardly from the baseplate; lowering the first fuel rack into a water-filled fuel pool comprising a base slab and a metal pool liner secured to base slab; and insertably engaging each of the pedestals of the first fuel rack with corresponding upwardly open receptacles formed in a plurality of spaced apart embedment plates fixedly anchored to the base slab of the fuel pool, each embedment plate hermetically seal welded to the pool to form an impervious barrier to outward leakage of pool water through the base slab of the fuel pool; wherein the embedment plates are configured such that lateral movement of the pedestals along the base slab during a seismic event is restricted by engagement between the pedestals and the receptacles of the embedment plates such that laterally acting seismic forces are not transmitted to the pool liner. In some embodiments, the method may further include lowering the second fuel rack into the water-filled fuel pool; insertably engaging each of the pedestals of the second fuel rack with corresponding upwardly open receptacles formed in the plurality of spaced apart embedment plates fixedly coupled to the base slab of the fuel pool; and abuttingly engaging a peripheral edge of the baseplate of the first fuel rack with an adjoining peripheral edge of the baseplate of the second fuel rack.

The present invention generally relates to heat exchangers, and more particularly to a shell and tube type heat exchangers suitable for the power generation industry.

Shell and tube type heat exchangers are used in the power generation and other industries to heat or cool various process fluids. For example, heat exchangers such as feedwater heaters are employed in Rankine power generation cycles in combination with steam turbine-generator sets to produce electric power. In such applications, the shell-side fluid (i.e. fluid flowing within the shell external to the tubes) is typically steam and the tube-side fluid (i.e. fluid flowing inside the tubes) is feedwater. Lower pressure steam exhausted from the turbine is condensed which forms the feedwater. Multiple feedwater heaters are generally employed in a Rankine cycle to sequentially and gradually increase the temperature feedwater using steam extracted from various extraction points in the steam turbine. The heated feedwater is returned to the steam generator where it is converted back to steam to complete the cycle. The heat source used to convert the feedwater to steam in the steam generator may be nuclear or fossil fuels.

In certain operating conditions, high longitudinal stresses in the shell and the tube bundle arise from differential thermal expansion due to differences in the shell and tubing material's coefficients of thermal expansion and fluid temperatures between the two flow streams (tube-side and shell-side). In fixed tubesheet heat exchangers operating under severe service conditions at high temperatures (e.g. temperatures in excess of 500 degrees F.), the differential expansion induced stress is the greatest threat to the unit's integrity and reliability. Other design alternatives used in the industry, such as a straight shell with an in-line bellow type expansion joint, outside packed floating head, etc., suffer from demerits such as risk of leakage (packed head design) or reduced structural ruggedness (expansion joint design).

A need exists for an improved heat exchanger design which can compensate more effectively for differential thermal expansion.

A shell and tube heat exchanger for feedwater heating and other process fluid heating applications according to the present disclosure provides uniquely configured axial flow tube support baffles (axial flow baffles for brevity) which maintain uni-directional longitudinal flow of the shell-side fluid through the shell-side space of the heat exchanger. This minimizes shell-side pressure loss of the shell-side fluid and pumping costs. Additional tube surface area may instead be provided to achieve the desired heat transfer rate in lieu of cross flow. A related method for fabricating the axial flow baffle is provided which is a mechanically simple and low cost process for forming an axial flow baffle.

The axial flow baffles comprise metal plates having a body including an array of tube apertures each comprising a central round or circular tube hole which receives a single tube therethrough and a plurality of primary flow holes spaced circumferentially around the circumference of the tube hole. The primary flow holes penetrate the circular peripheral edge and overlap with the tube holes such that a longitudinal flow area is provided by them which is in intimate relationship with the annulus formed by the tube hole. The size and flow area of the primary flow holes may be selected to achieve the desired the axial flow area requirement. In some embodiments, additional secondary and tertiary flow holes may be formed in the solid ligaments remaining between the tube apertures. These additional flow holes do not overlap the tube holes and provide additional flow area for heat exchanger internal shell-side flow to pass through the baffles to alleviate shell-side fluid pressure loss, but are otherwise inconsequential to the heat exchanger's performance and heat transfer rate.

Each tube aperture includes a plurality of radially inwardly projecting tube support protrusions which each engage and hole the tubes in position in the tube hole. The support protrusions help minimize or avoid flow induced vibration and fretting of the tubes where they pass through the baffles.

The present axial flow baffles may be oriented transversely and perpendicularly to the length of the tubes, which are arranged together in one or more tube bundles. In one embodiment, every tube in the shell-side compartment or space of the heat exchanger advantageously passes through and is supported by full shell-side diameter axial flow baffles. In other words, there are no intentional large open "windows" or areas in the shell-side space around the baffles for the flow to significantly bypass the baffles in a cross-flow pattern similar to what occurs with the "segmental" class of baffles mentioned above used to promote cross flow. Accordingly, in one configuration the present axial flow baffles have a diameter substantially commensurate with the inside diameter of the shell, albeit fractionally smaller to slide and fit inside the shell with the tube bundle(s) when the heat exchanger is assembled. The outer peripheral circumferentially-extending edge of the baffle closely conforms and is positioned proximate to the inside surface of the shell. The axial flow baffles may therefore be circular in shape in one embodiment.

Full support of the tubes at every baffle location advantageously eliminates non-uniform tube support in the shell-side space of the heat exchanger. This advantageously eliminates long unsupported lengths of tubing which are prone to turbulent flow induced vibration, which can cause excessive movement and tube fretting wear at the tube support hole locations in the baffles. This situation can lead to excessive fretting wear of the tube material at the tube hole (i.e. gradual necking down of the tube wall), resulting in premature failure of the tubes and tube-side fluid leaks, thereby requiring the leaking tubes to be plugged at the expense of a reduction in the heat exchangers design heat transfer rate.

The present invention also provides a full-diameter hybrid tube support flow baffle for heat exchanger designs where turbulent shell-side fluid cross-flow is desirable to maximize heat transfer rates with concomitant increase in shell-side pressure loss and higher pumping costs. Such instances may occur where there is limited available space within the confines of the power generation or other type industrial facility (e.g. chemical processing plant). This hybrid cross-flow baffle design replicates and creates the various shell-side fluid cross-flow flow patterns achieved by the foregoing different segmental baffles. However, unlike conventional segmental baffles which comprises less than full diameter baffle "segments" cut from a solid circular plate which support only those tubes passing through the segments at each baffle location and not those in the empty bypass paths around the baffles, the present hybrid baffle fully supports every tube at each baffle location. The hybrid baffles may include various configurations with at least one portion including the present axial flow tube apertures with primary flow holes and remaining portions of the baffle includes conventional circular tube holes alone.

According to one aspect, an axial flow baffle plate for a shell and tube heat exchanger includes: a planar body configured for transverse arrangement in a longitudinally elongated shell of the shell and tube heat exchanger; a plurality of axial flow tube apertures each comprising a central tube hole configured to receive a tube of the heat exchanger, and an array of peripheral primary flow holes circumferentially spaced apart around the tube hole; the primary flow holes each interrupting the tube hole and forming a plurality of radially inward projecting tube support protrusions between the primary flow holes, each tube support protrusion being configured to engage the tube when located in the tube hole; wherein each primary flow hole has a non-polygonal configuration.

According to another aspect, a heat exchanger with axial shell-side flow includes: a longitudinally-extending shell defining a longitudinal axis and a shell-side space; a plurality of longitudinally-extending tubes arranged in the shell-side space; a plurality of transversely oriented baffles supporting the tubes in the shell; each baffle including a plurality of axial flow tube apertures each comprising a tube hole engaging and supporting one of the tubes, and a plurality of primary flow holes arranged circumferentially around and partially intersecting the tube hole; each primary flow hole configured to form a crescent-shaped flow area around the one of the tubes; wherein a shell side fluid flows through the primary flow holes in a parallel direction to the longitudinal axis.

According to another aspect, a method for forming an axial flow baffle for a shell and tube heat exchanger includes: providing a baffle workpiece; locating a centerpoint of a first axial flow tube aperture; drilling a plurality of primary flow holes along a first reference circle arranged concentrically around the centerpoint of the first flow aperture; and drilling a central tube hole at the centerpoint after drilling the primary flow holes such that the tube hole partially overlaps with each of the primary flow holes.

According to another aspect, a segmental flow baffle for a shell and tube heat exchanger includes: a planar body configured for transverse arrangement in a longitudinally elongated shell of the shell and tube heat exchanger; a first region comprising a plurality of first tube apertures having a first configuration; a second region comprising a plurality of second tube apertures having a second configuration different than the first configuration; wherein each of the first and second tube apertures are configured to support a single tube of the heat exchanger.

A shell and tube heat exchangers suitable for feedwater heating and other process fluid heating applications according to the present disclosure can also compensate for differential thermal in a manner which overcomes the foregoing differential thermal expansion problems with past fixed heat exchanger designs. A curved tube bundle heat exchanger design is provided which, for certain operating conditions, may be substantially superior with respect to reliability and thermal efficiency. The curved tube bundle may have generally J-shaped tubes configured as disclosed herein. The J-curved tube bundle serves to substantially eliminate the high longitudinal stresses in the shell and the tube bundle that arise from differential thermal expansion from the differences in the shell and tubing material's coefficients of thermal expansion and fluid temperatures between the two tube-side and shell-side flow streams. In fixed tubesheet heat exchangers operating at high temperatures, the differential expansion induced stress and cracking is the greatest threat to the unit's integrity.

Another operational benefit of the present heat exchanger design is the introduction of the shell side inlet flow into an open (un-tubed) space or plenum, which removes or minimizes the risk of impingement erosion damage common to tubular heat exchangers that have the shell inlet located in close proximity of the tubes. The present design prevents the shell-side flow from impinging directly on the tubes in a concentrated fluid stream (i.e., the flow is not delivered in the congested tubed space and orthogonal to the tubes' axis) by providing room within the shell for the shell-side flow to expand thereby resulting in a reduction in velocity and less erosive effects. This is significant because the shell-side fluid inlet nozzle is typically smaller in diameter than the shell itself.

In one configuration, the heat exchanger includes an integrated shell assembly comprising a longitudinal shell and a transverse shell arranged orthogonally (perpendicularly) or obliquely to the longitudinal shell. The longitudinal shell may be coupled between and inboard of opposing ends of the transverse shell, and may be approximately centered therebetween in some embodiments. The shells may sealably joined and fluidly coupled directly together into a basic T-shaped heat exchanger unit. A variety of other geometrically shaped heat exchanger units or assemblies may be formed by combining and fluidly interconnecting several basic T-shaped heat exchanger units to form a shared common shell-side pressure retention boundary. The J-shaped tube bundle can be readily accommodated in the foregoing shell geometries. The shells may be seal welded together in one construction. The shell-side spaces within each shell of the assembly are in fluid communication forming a contiguous shell-side space through which the tubes of the tube bundle are routed. It bears noting the present assembly of shells collectively form a single heat exchanger unit since each shell is not in itself a discrete or separate heat exchanger with its own dedicated tube bundle. The heat exchanger thus comprises a single tube-side inlet tubesheet and single tube-side outlet tubesheet located within different shells of the T-shaped shell configuration, as further described herein. In one embodiment, the tubesheets are oriented perpendicular to each other.

In one respect, a heat exchanger comprises: an elongated longitudinal shell defining a first shell-side space and a longitudinal axis; an elongated transverse shell defining a second shell-side space and a transverse axis; the transverse shell oriented transversely to the longitudinal shell; the second transverse shell fluidly coupled to a first end of the longitudinal shell such that the second shell-side space is in fluid communication with the first shell-side space; a tube bundle extending through the first and second shell-side spaces, the tube bundle comprising a plurality of tubes each having a first end coupled to a first tubesheet in the first shell-side space of the first longitudinal shell and a second end coupled to a second tubesheet in the second shell-side space of the second transverse shell; wherein the first and second tube-sheets are oriented non-parallel to each other. In one embodiment, the longitudinal shell is coupled to the transverse shell inwards of and between opposing ends of the transverse shell. In the same or another embodiment, the longitudinal shell is oriented perpendicularly to the transverse shell forming a T-shaped heat exchanger.

In another respect, a heat exchanger comprises: an inlet tubesheet and an outlet tubesheet; an elongated longitudinal shell assembly defining a first shell-side space and a longitudinal axis; the longitudinal shell assembly comprising opposing first and second ends, a circumferential sidewall extending between the first and second ends, a tube-side fluid inlet nozzle fluidly coupled to the inlet tubesheet, and a shell-side fluid outlet nozzle fluidly coupled to the circumference sidewall; an elongated transverse shell assembly fluidly coupled to the first end of the longitudinal shell, the transverse shell assembly defining a second shell-side space and a transverse axis oriented perpendicularly to the longitudinal axis of the longitudinal shell, the second shell-side space being in direct fluid communication with the first shell-side space; the transverse shell assembly comprising opposing first and second ends, a circumferential sidewall extending between the first and second ends, a tube-side fluid outlet nozzle fluidly coupled to the outlet tubesheet, and a shell-side fluid inlet nozzle; a J-shaped tube bundle extending through the first and second shell-side spaces between the inlet and outlet tubesheets, the tube bundle comprising a plurality of tubes each having a first end fluidly coupled to the inlet tubesheet in the first shell-side space of the longitudinal shell and a second end fluidly coupled to the outlet tubesheet in the second shell-side space of the transverse shell; a tube-side fluid flowing through the tube bundle and a shell-side fluid flowing through the longitudinal and transverse shell assemblies; wherein the first and second tube-sheets are oriented non-parallel to each other.

In another respect, a heat exchanger comprises: a longitudinally-extending first shell defining a first shell-side space and a first longitudinal axis; a longitudinally-extending second shell defining a second shell-side space and a second longitudinal axis, the second shell arranged parallel to the first shell; a transverse third shell fluidly coupling the first and second shells together, the third shell extending laterally between the first and second shells and defining a third shell-side space in fluid communication with the first and second shell-side spaces; first and second J-shaped tube bundles each comprising a plurality of tubes and each tube defining a tube-side space, the first tube bundle extending through the first and third shells, and the second tube bundle extending through the second and third shells; a first tube-side inlet nozzle disposed on the first shell; a second tube-side inlet nozzle disposed on to the second shell; and at least one shell-side inlet nozzle disposed on the transverse third shell; wherein a shell-side fluid flows in path from the third shell-side space through the first and second shell-side spaces to a shell-side outlet nozzle disposed on each of the first and second shells.

The present application discloses a cooling system for externally cooling a nuclear fuel cask (transport or storage) which overcomes the foregoing problems. In one embodiment, the cooling system comprises a cooling sleeve or jacket is provided which is mounted around and surrounds the exterior of the cask. The cooling jacket may have an annular cylindrical shape in one embodiment which is complementary to the cylindrical shape of cask. The cooling jacket extends circumferentially around the exterior of the cask preferably for a full 360 degrees when disposed on the cask in one embodiment. The jacket may be provided as single prefabricated circular assembly or unit which can be slipped over the end of the cask, or alternatively may be provided as multiple sections or segments which may be assembled together after emplacement laterally around the cask to completely enclose the sides of the cask.

In one embodiment, the cooling jacket may comprise a double shelled or walled structure defining a hollow inter-shell cooling medium cavity between its inner and outer cylindrical shell walls that is configured to hold a cooling medium. Preferably, a sublimating type cooling medium which exists as a solid at normal atmospheric pressure is used which changes phase directly to a gaseous phase by absorbing heat generated by the cask. In one preferred embodiment, the sublimating cooling medium may be for example dry ice (solid carbon dioxide). The dry ice may partially or completely fill the cavity depending on the degree of cask cooling required and energy/heat still generated by the SNF therein. The dry ice may be provided in any suitable solid form, such as for example without limitation pellets or blocks.

The cooling jacket may be maintained at a pre-set distance or spacing from the cylindrical external or outer surface of the cask by spacers. The spacers maintain a uniform annular radial interstitial gap or space between the cask and jacket, which preferably remains empty and air-filled. Externally radiated and convected heat emitted from the cask travels across the empty interstitial space to the cooling jacket wherein it is absorbed by the dry ice therein, which comes heated via the inherently endothermic sublimation process, as further described herein. The heated dry ice rejects the heat in turn to the ambient environment or atmosphere via sublimation as non-toxic gaseous carbon dioxide which is vented from the cooling jacket.

Accordingly, the dry ice inside the cooling jacket acts as a cooler external heat sink to absorb the heat emitted by the cask in a manner more efficient than the ambient air surrounding the cask or other known methods like water cooling. The cooling effectiveness of the external cooling jacket surrounding the cask and dry ice advantageously are unaffected by prevailing ambient temperatures which change with the seasons and time of day. This allows more uniform cask temperatures to be predicted and maintained based on the amount of heat emitted by the cask dependent upon the cask heat load, and is particularly well-suited for warmer climates with higher prevailing ambient temperatures which make either air or water cooling less efficient.

The cooling jacket may be configured to slideably fit over and around the cask, and remains in place without need for any permanent or temporary mechanical coupling or fastening directly to the cask (e.g. welding, soldering, brazing, threaded fasteners, etc.).

The present external jacketed cooling system is suitable for application to a transfer cask used to temporarily move and stage the canister holding the spent nuclear fuel (SNF) assemblies, or for use with a longer term dry storage cask when additional cooling may be needed for a relatively short period of time. More broadly, it will be appreciated that the present jacketed cooling system may be used with any type of container used to house or contain spent nuclear fuel. This includes not only radiation shielded outer overpacks or cask, but also unshielded nuclear canisters such as multi-purpose canisters (MPCs) available from Holtec International of Camden, N.J. which are placed inside such casks. Accordingly, the term "container" used herein shall be broadly construed to cover any type of container which may form a sealed fluidic containment boundary to hold radioactive spent nuclear fuel and/or irradiated nuclear debris/waste materials associated with operation of the nuclear reactor.

In other possible embodiments, the cooling jacket may form an integral and non-separable/non-detachable part of the cask body. Various such constructions are also disclosed herein.

According to one aspect, a system for cooling high level radioactive waste comprises: a cask comprising a storage cavity containing the high level radioactive waste emitting heat; and a cooling jacket at least partially surrounding the cask, the cooling jacket comprising a cooling medium cavity containing a cooling medium that sublimates at normal atmospheric pressure, the cooling medium providing an external heat sink for absorbing the heat emitted from the cask from the high level radioactive waste.

According to another aspect, a system for cooling high level radioactive waste comprises: a cask having a body defining a storage cavity containing the high level radioactive waste; a cooling jacket comprising: an inner shell; an outer shell surrounding the inner shell so that a cooling medium cavity is formed between the inner shell and the outer shell; a cooling medium disposed in the cooling medium cavity; and a central interior space defined by the inner shell; the cask positioned at least partially within the central interior space of the cooling jacket so that an interstitial space is formed between the inner shell of the cooling jacket and the cask.

According to another aspect, a method for cooling high level radioactive waste comprises: circumferentially surrounding at least a portion of a cask containing the high level radioactive waste emitting heat with a cooling jacket, the cooling jacket containing a cooling medium that sublimates at normal atmospheric pressure; and wherein at least a portion of the heat emitted by the high level radioactive waste that exits the cask is absorbed by the cooling jacket.

According to another aspect, a method for cooling a horizontally-oriented cask containing high level radioactive waste emitting heat comprises: (a) lowering a cooling jacket having an arcuately curved shape over the horizontally-oriented cask to at least partially surround a top portion of the cask, the cooling jacket containing a cooling medium in a first phase, the cooling medium changing from a first phase to a second phase at normal atmospheric pressure and normal temperature; and (b) absorbing the heat emitted by the high level radioactive waste that exits the cask with the cooling jacket; wherein the cooling medium changes from the first phase to the second phase during step (b).

According to another aspect, a cooling jacket for cooling a cask containing high level radioactive waste emitting heat comprises: a horizontally elongated body having an arcuate shape, the body including an inner shell, and outer shell, and a cooling medium cavity formed between the shells; a central interior space defined by an inner surface of the inner shell that is configured for receiving the cask at least partially therein; a cooling medium in a first phase disposed in the cooling medium cavity, the cooling medium changing from a first phase to a second phase at normal atmospheric pressure and normal temperature, the cooling medium providing an external heat sink for absorbing the heat emitted by the high level radioactive waste that exits the cask; and wherein the cooling medium upon absorbing the heat that exists the cask undergoes an endothermic phase transition from the first phase to the second phase.

According to another aspect, a system for cooling spent nuclear fuel comprises: a cask comprising a storage cavity configured to hold the spent nuclear fuel; and a cooling jacket at least partially surrounding the cask, the cooling jacket comprising a cooling medium in a first phase and that changes from the first phase to a second phase at normal atmospheric pressure and normal temperature.

According to another aspect, a system for storing and/or transporting high level radioactive waste emitting heat comprises: a hermetically sealed canister containing the high level radioactive waste; and a cask comprising a cask body defining a storage cavity, the canister positioned within the storage cavity, and the cask body comprising one or more cooling medium cavities containing a cooling medium in a first phase, the cooling medium changing from the first phase to a second phase at normal atmospheric pressure and normal temperature.

The present application discloses a system and related method for externally cooling a nuclear fuel cask and the canister with high level radioactive waste held therein which overcomes the foregoing problems. In one embodiment, the system may include a cooling water header which may be detachably and expediently mounted to the cylindrical external surface of the outer cask. The header has an annular circular shape and extends around the circumference of the cask, and may be continuous in structure for a full 360 degrees to completely encircle the cask for uniform cooling the entire external surface of the cask. The cooling water header may be provided as single prefabricated circular unit which can be slipped over the top end of the cask, or alternatively may be provided as multiple arcuately shaped sections or segments which may be assembled and fluidly coupled together in leak-resistant manner via suitable fluid end couplings after emplacement around the cask.

The cooling water header comprises a plurality of dispensing outlets configured to drip or spray cooling water supplied to the header onto the external surface of the cask which is wetted by the water. The outlets may each take the form of simply an opening or orifice in the header, or in other embodiments a spray nozzle configured to drip or spray the cooling water onto the cask.

One objective of the system and related methods proposed herein is to provide an entirely passive means to keep the canister water in a subcooled state under higher heat loads (which can reach as high as 50 kW) with no time limits during the wet transfer operations described above. Accordingly, in some embodiments, the cooling system may be passive in which the cooling water header is fluidly coupled to a water source comprising a reservoir such as a tank holding a supply of water. The tank delivers water at pressure to the header via the static pressure head created in the tank without the assistance of pump, thereby creating a passive system which does not rely on the availability of electric power for operation. The cooling water flows by gravity from the tank to the header and nozzles via the static pressure head. The flow rate of cooling water may decrease over time as cooling water is consumed and the surface level of remaining water in the tank continually drops.

In other embodiments, the header may be fluidly coupled to a pressurized source of water provided by one or more powered cooling water pumps (e.g. electrically driven or gasoline powered) which create a pressure head via operation of the pump. The pumps may take suction from any available source of cooling water, such as a reservoir such as a tank. The pumped cooling water can maintain a substantially uniform cooling water supply pressure to the spray nozzles, but requires the use of gasoline or electric power to drive the cooling water pumps.

In one aspect, a system for cooling high level radioactive waste comprises: a cask comprising an external surface and an internal storage cavity containing the high level radioactive waste; a cooling water header encircling the cask, the cooling water header fluidly coupled to a water source; and a plurality of circumferentially spaced apart water dispensing outlets arranged on the header, the dispensing outlets configured to direct cooling water supplied to the header onto the external surface of the cask to cool the cask.

In another aspect, an apparatus for cooling high level radioactive waste comprises: an annular cooling water header defining a central space configured to receive a cask comprising an external surface and an internal storage cavity containing the high level radioactive waste; a water supply line fluidly coupled to the cooling water header; and a plurality of circumferentially spaced apart water dispensing outlets arranged on the cooling water header, the dispensing outlets configured to direct cooling water inwards towards the central space.

In another aspect, a method of cooling high level radioactive waste comprises: surrounding a cask comprising an external surface and an internal storage cavity containing the high level radioactive waste which emits heat with a cooling water header; and discharging cooling water radially inwards from the cooling water header onto the cask from the plurality of water dispensing outlets arranged on the cooling water header.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the preferred embodiments will be described with reference to the following drawings where like elements are labeled similarly, and in which:

FIG. 68 is a side cross-sectional view of the tube-side inlet nozzle and associated tubesheet, expansion joint, and longitudinal shell;

FIG. 69 is an end view thereof looking towards the inlet nozzle;

FIG. 77A shows a first embodiment of shell-side flow baffles;

FIG. 77B shows a second embodiment of shell-side flow baffles;

FIG. 77C shows a third embodiment of shell-side flow baffles;

FIG. 117 is a side view thereof;

FIG. 118 is a top perspective view of a second embodiment of an external cooling jacket for use with the cask of FIGS. 1 and 2 in a horizontal orientation;

FIG. 119 is a bottom perspective view thereof;

FIG. 120 is an exploded perspective view thereof;

FIG. 121 is an end view thereof;

FIG. 122 is a side view thereof;

FIG. 123 is a top view thereof;

FIG. 124 is a bottom view thereof;

FIG. 125 is a first transverse cross-sectional view thereof;

FIG. 126 is a partial cross-sectional perspective view thereof;

FIG. 127 is an enlarged detail from FIG. 26;

FIG. 128 is a second transverse cross-sectional view of the cooling jacket of FIG. 18

Figure 101:
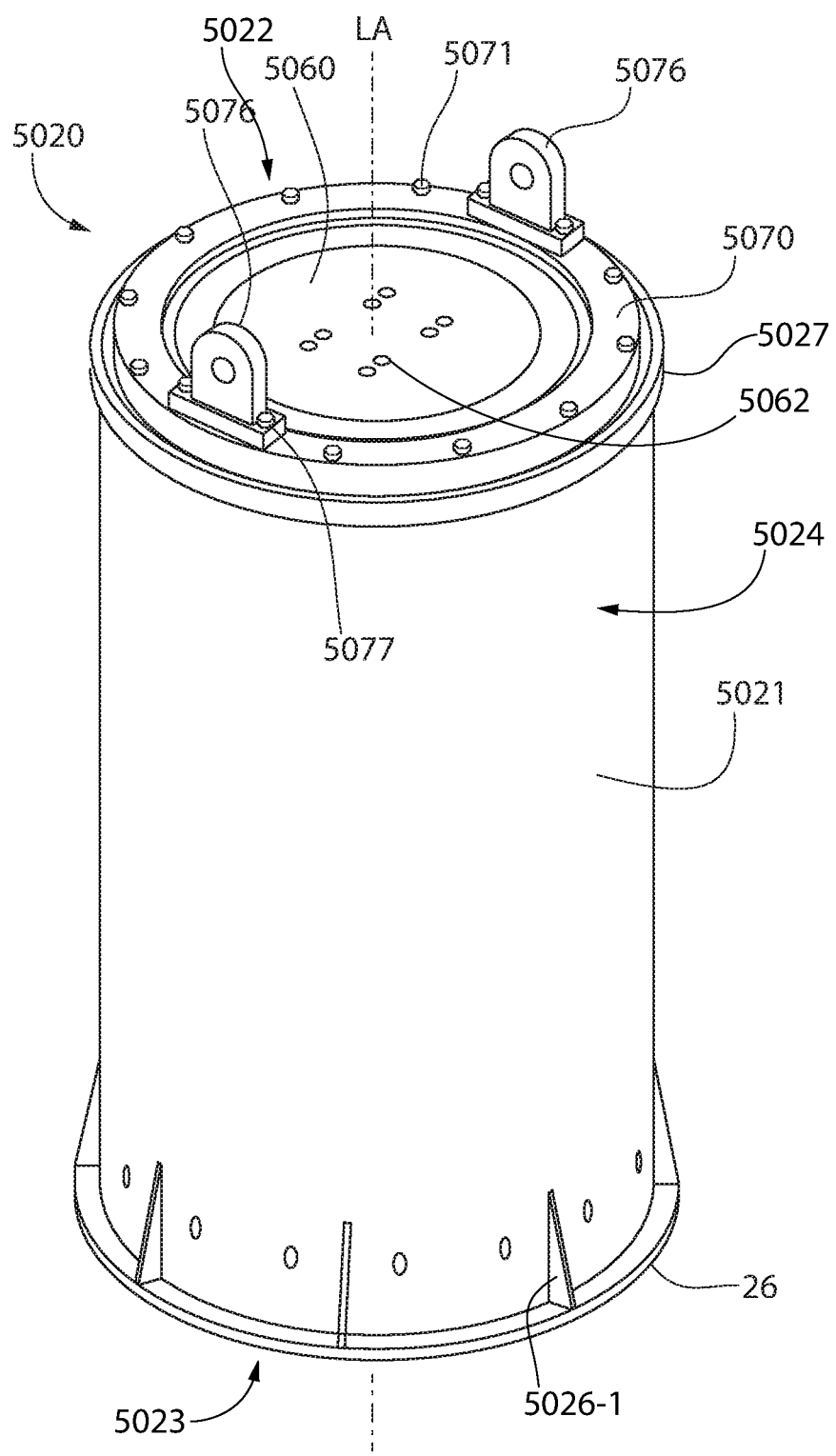
FIG. 101 is a perspective view of a cask for storage and transport of high level nuclear waste such as without limitation spent nuclear fuel having an outer neutron shield cylinder (NSC) and a separable detachable inner gamma blocker cylinder (GBC) nested therein.
Figure 102:
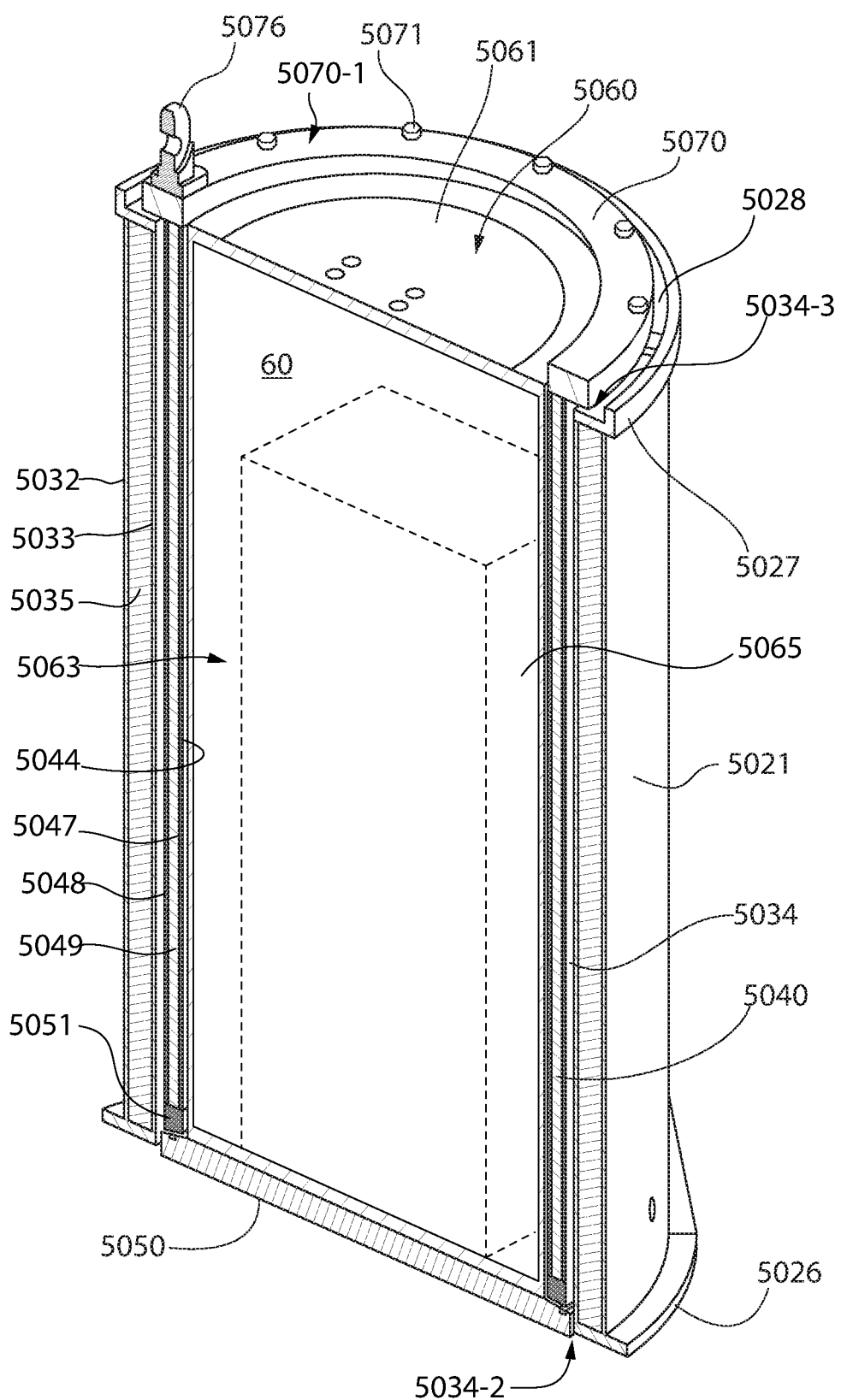
FIG. 102 is a partial cross-sectional view thereof.
Figure 118:
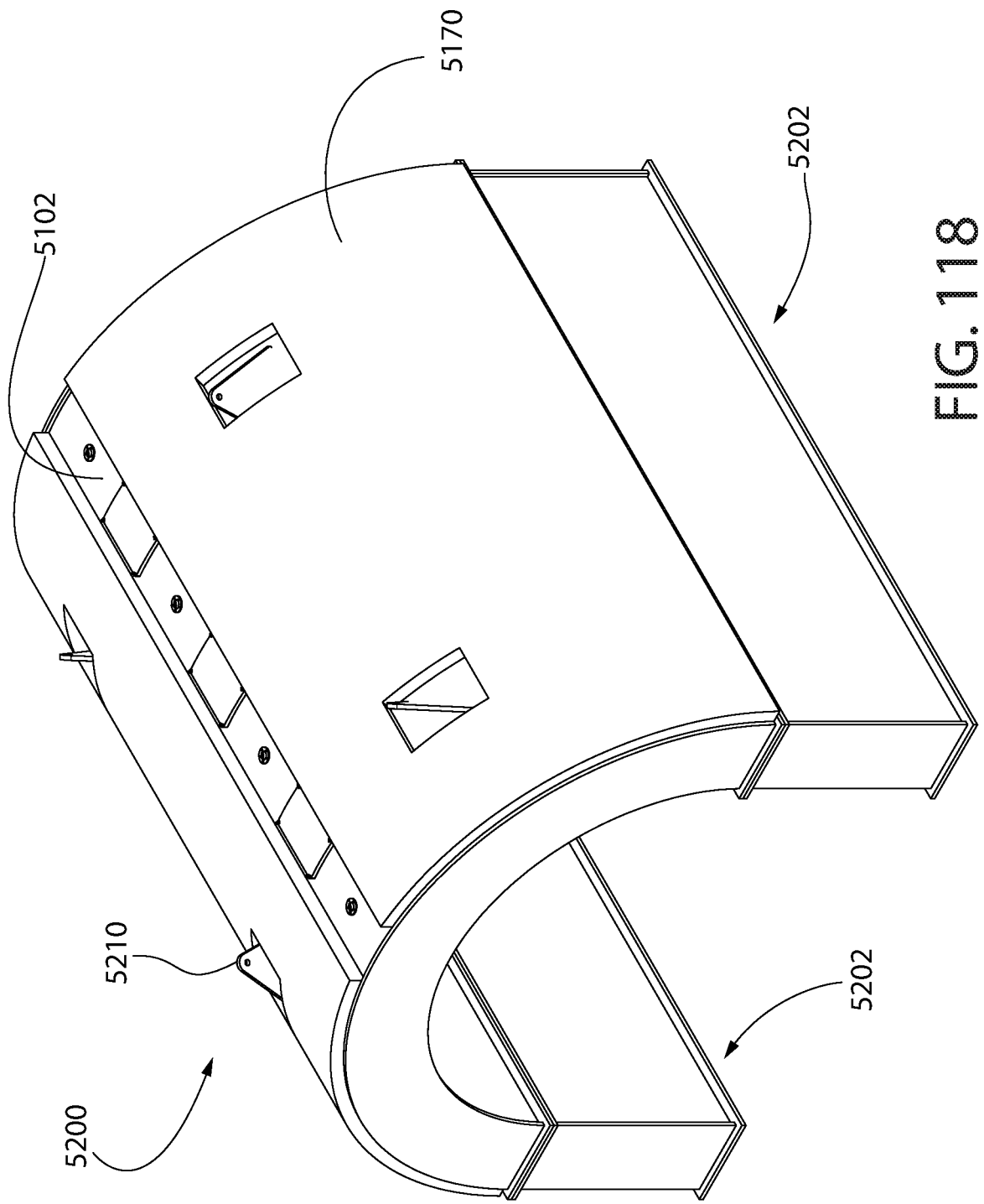
Figure 119:
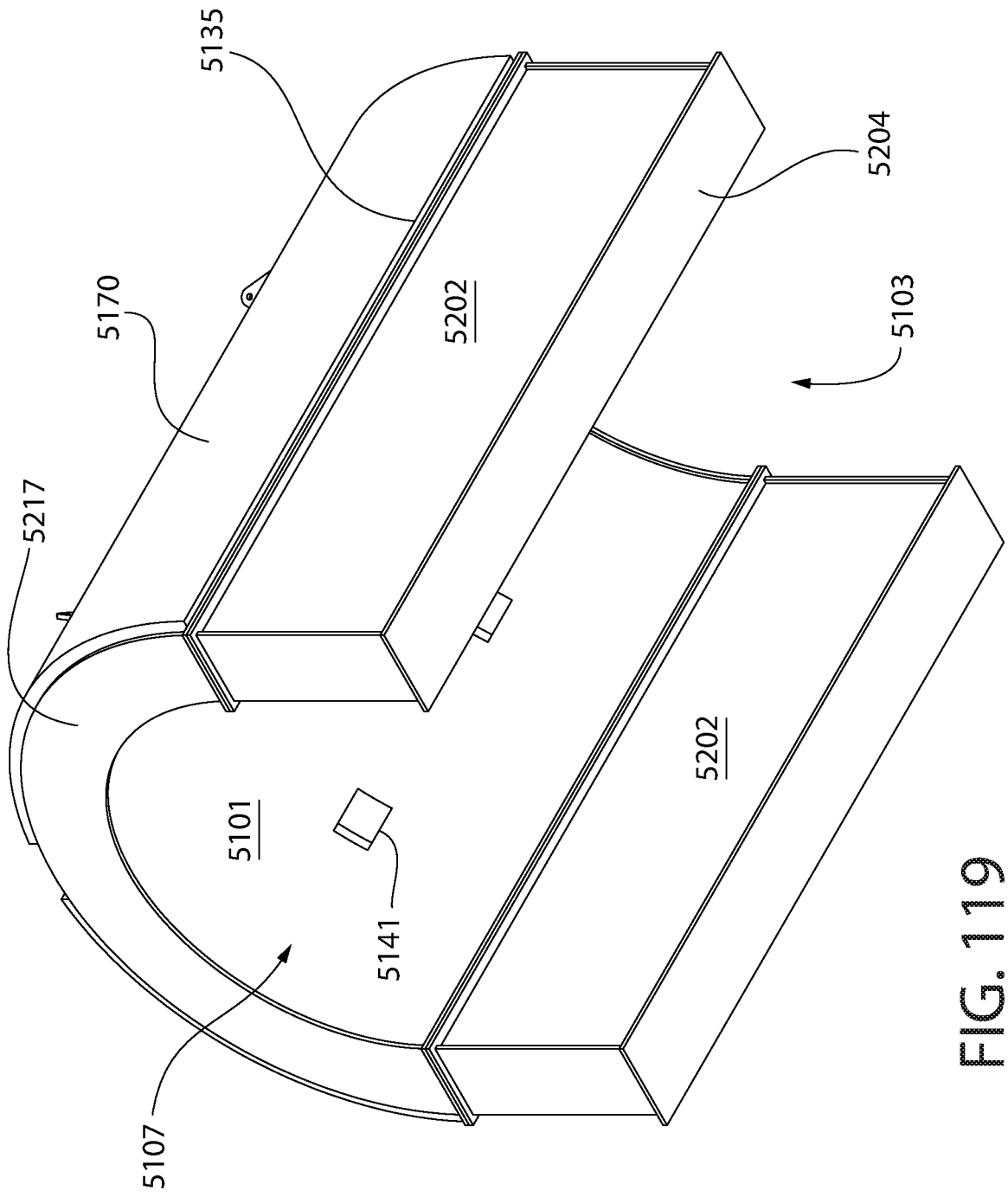
Figure 120:
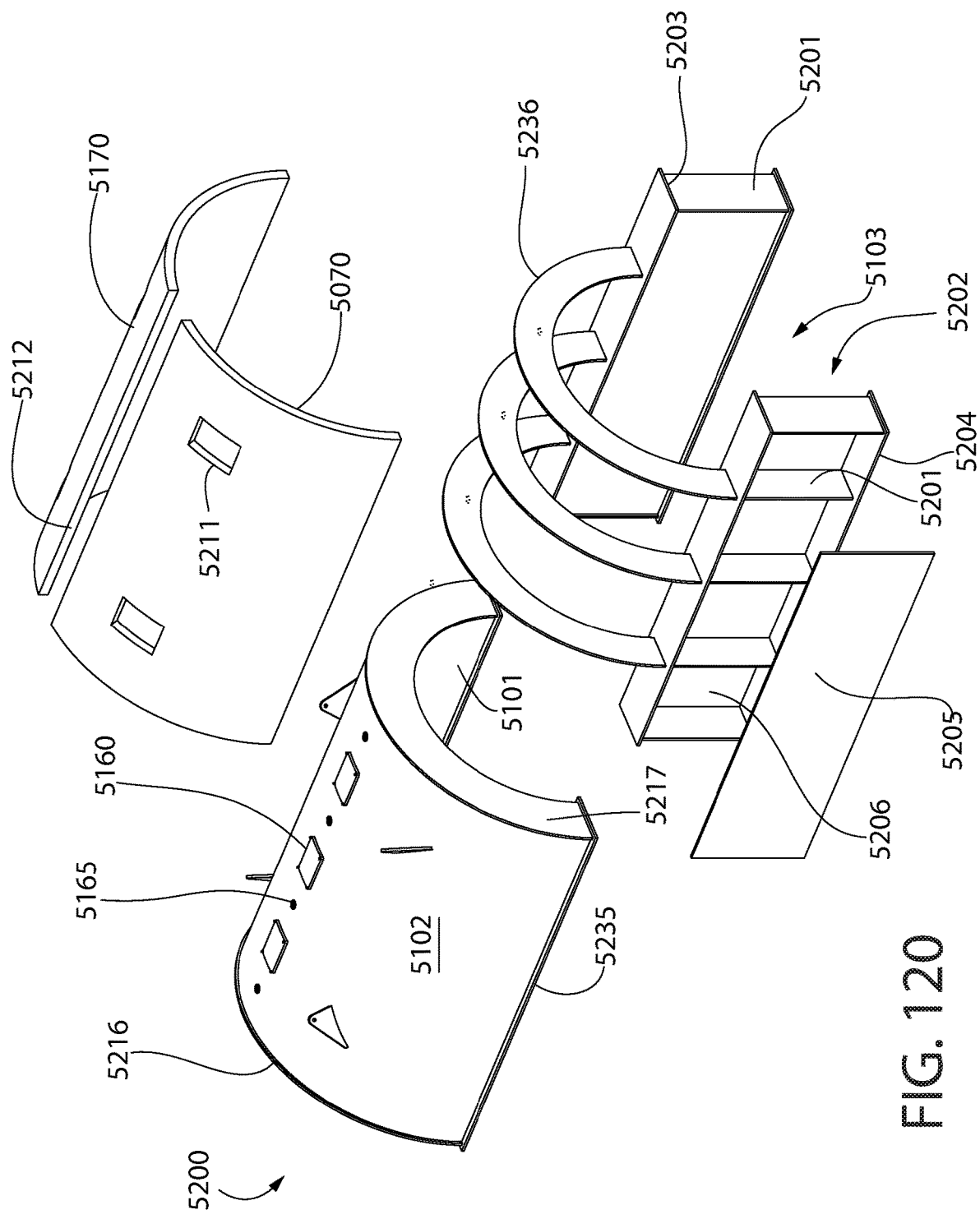
Figure 121:
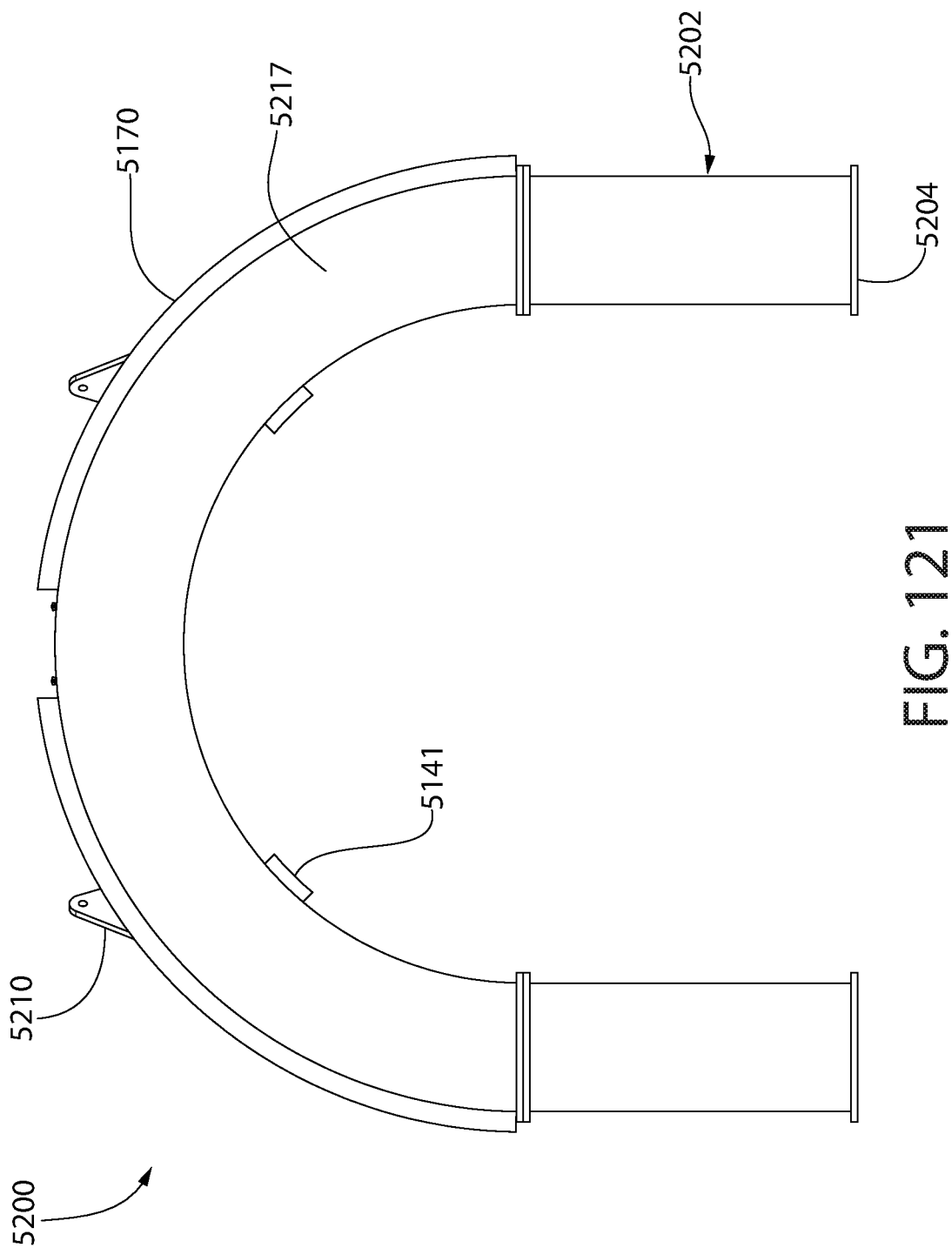
Figure 122:
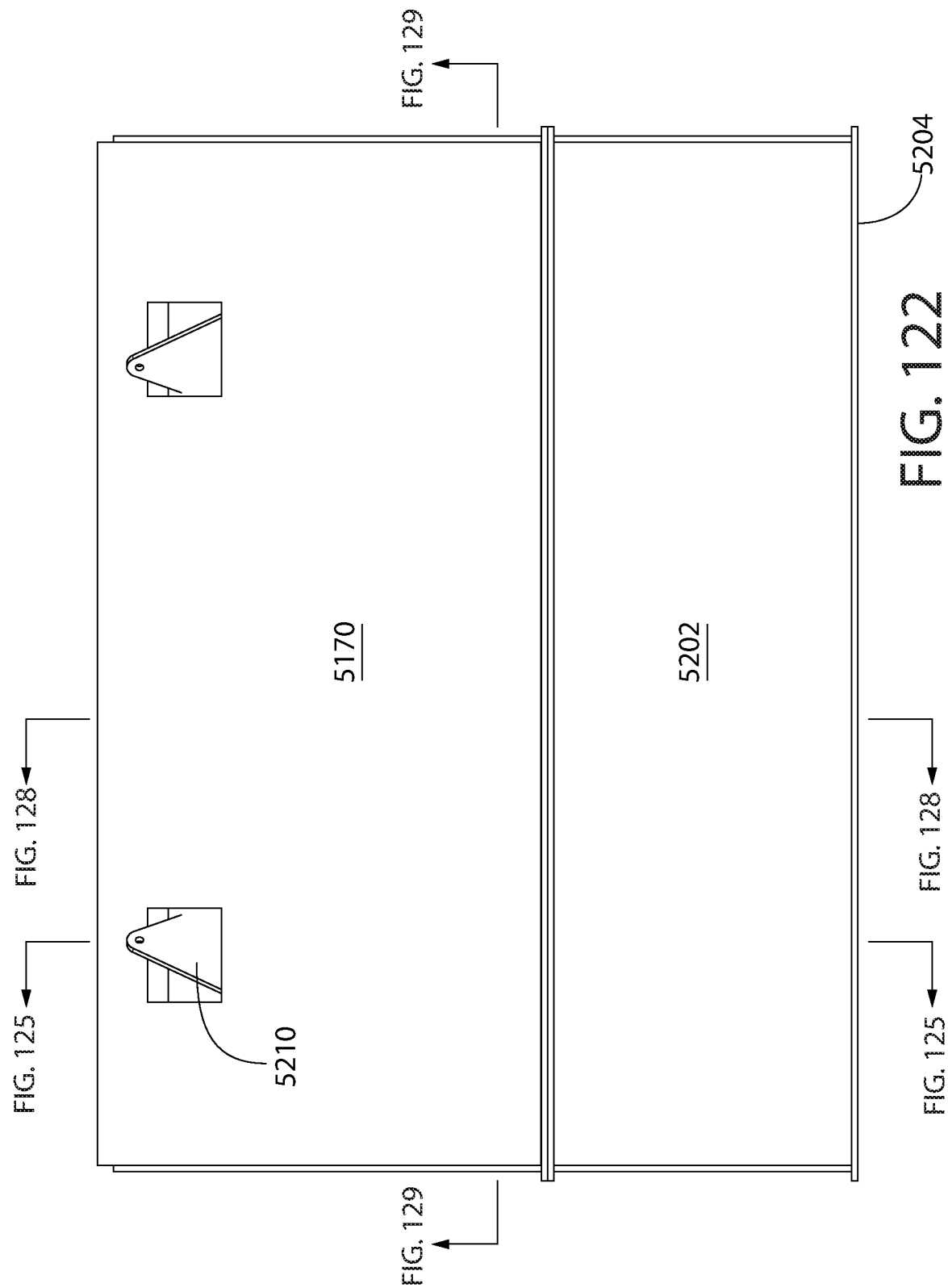
Figure 123:
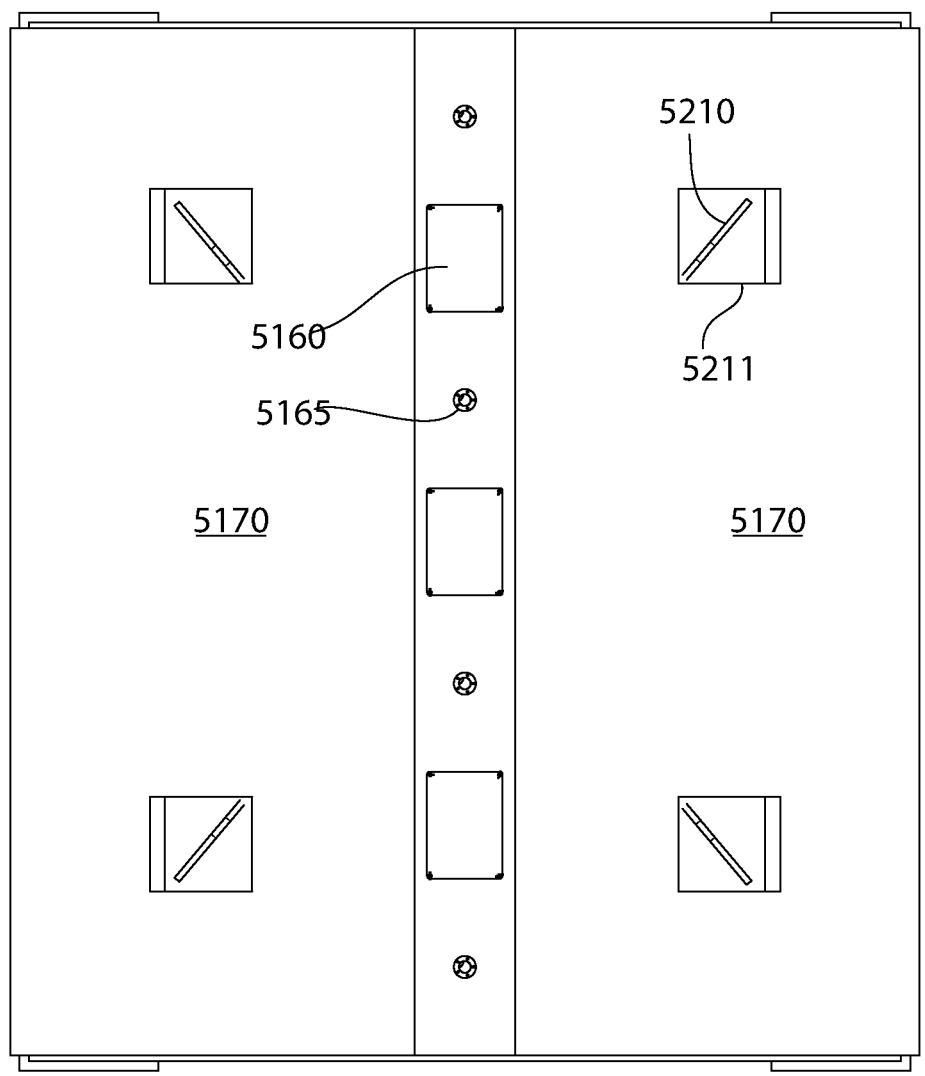
Figure 124:
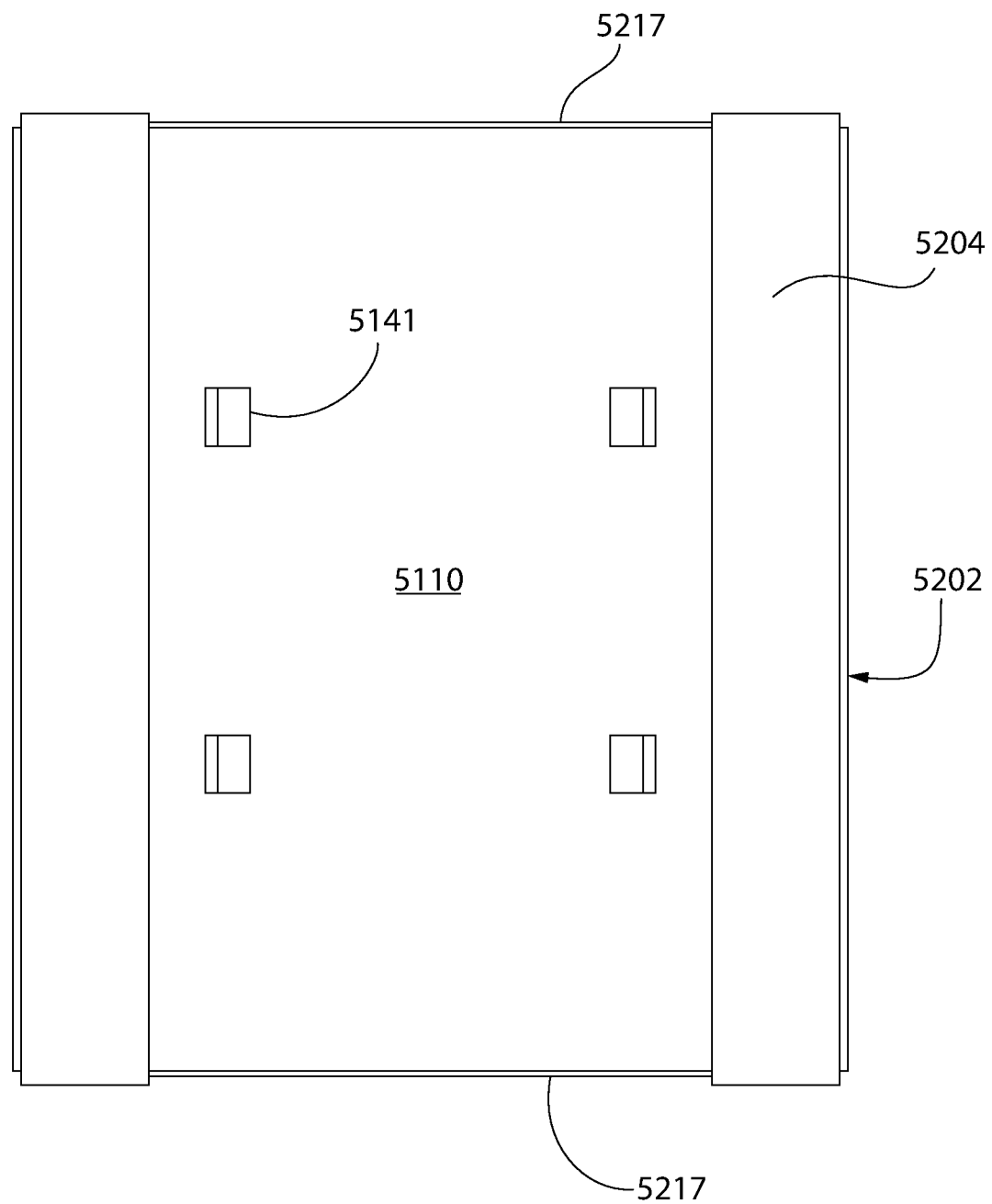
Figure 125:
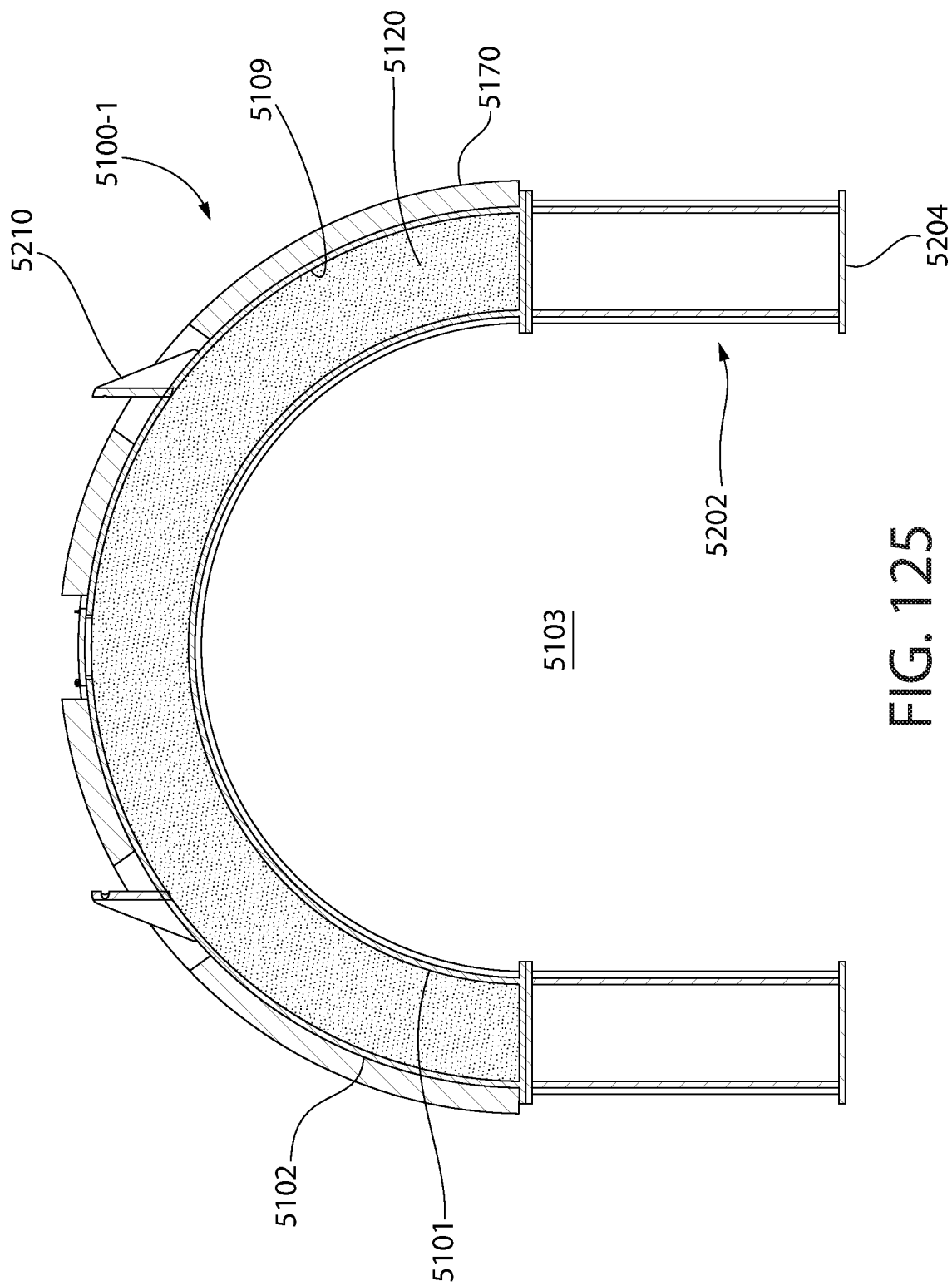
Figure 126:
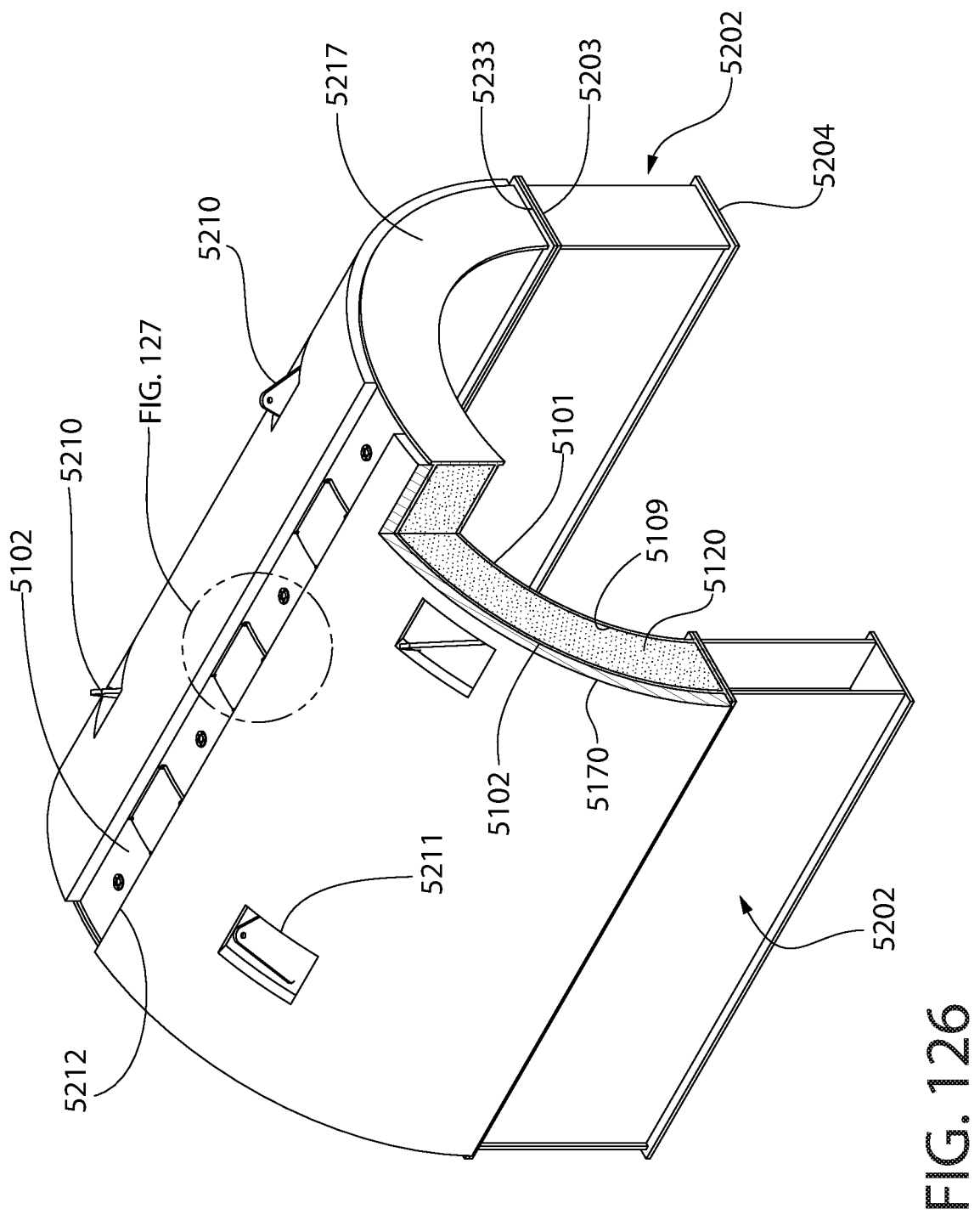
Figure 127:
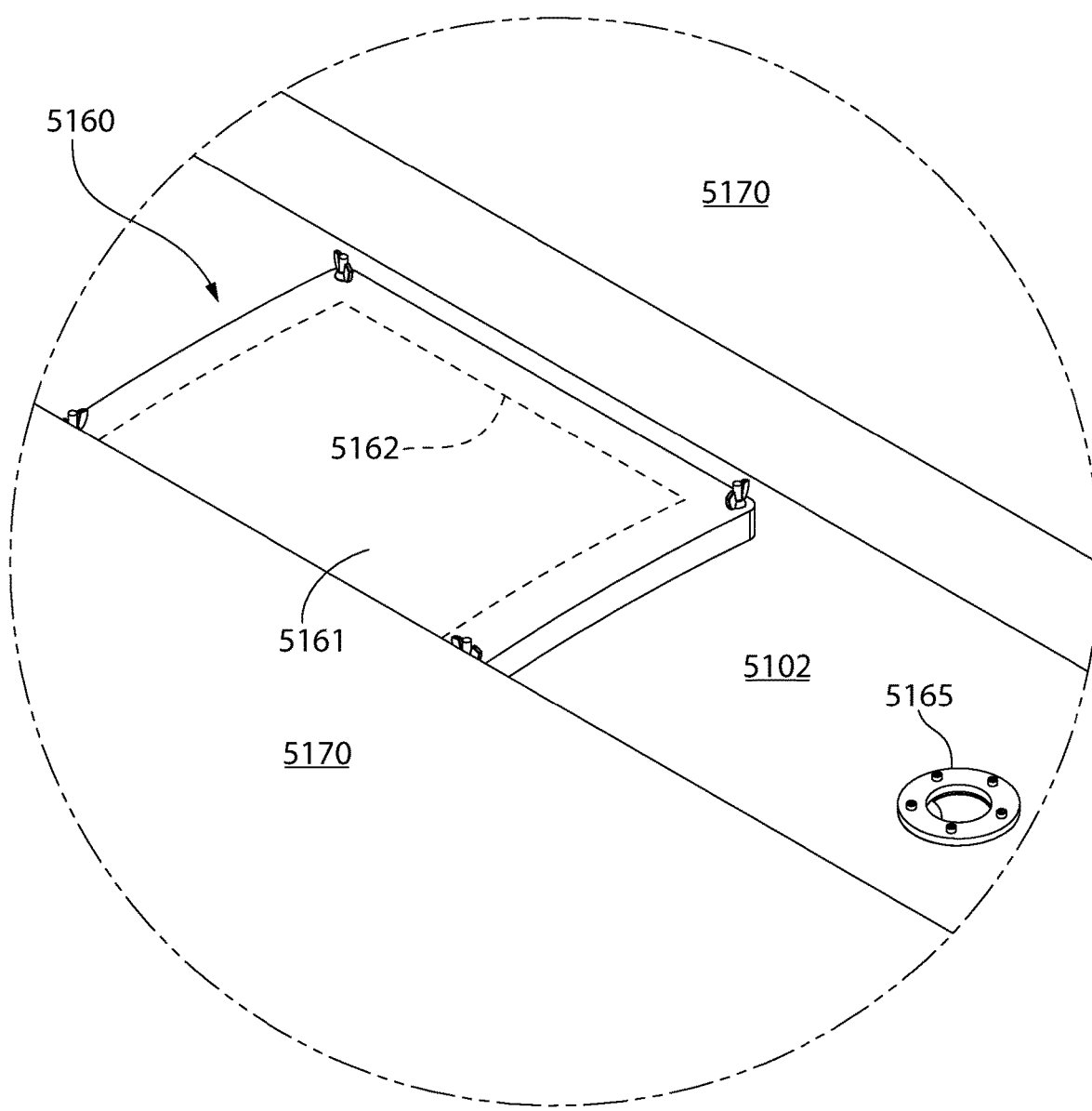
Figure 128:
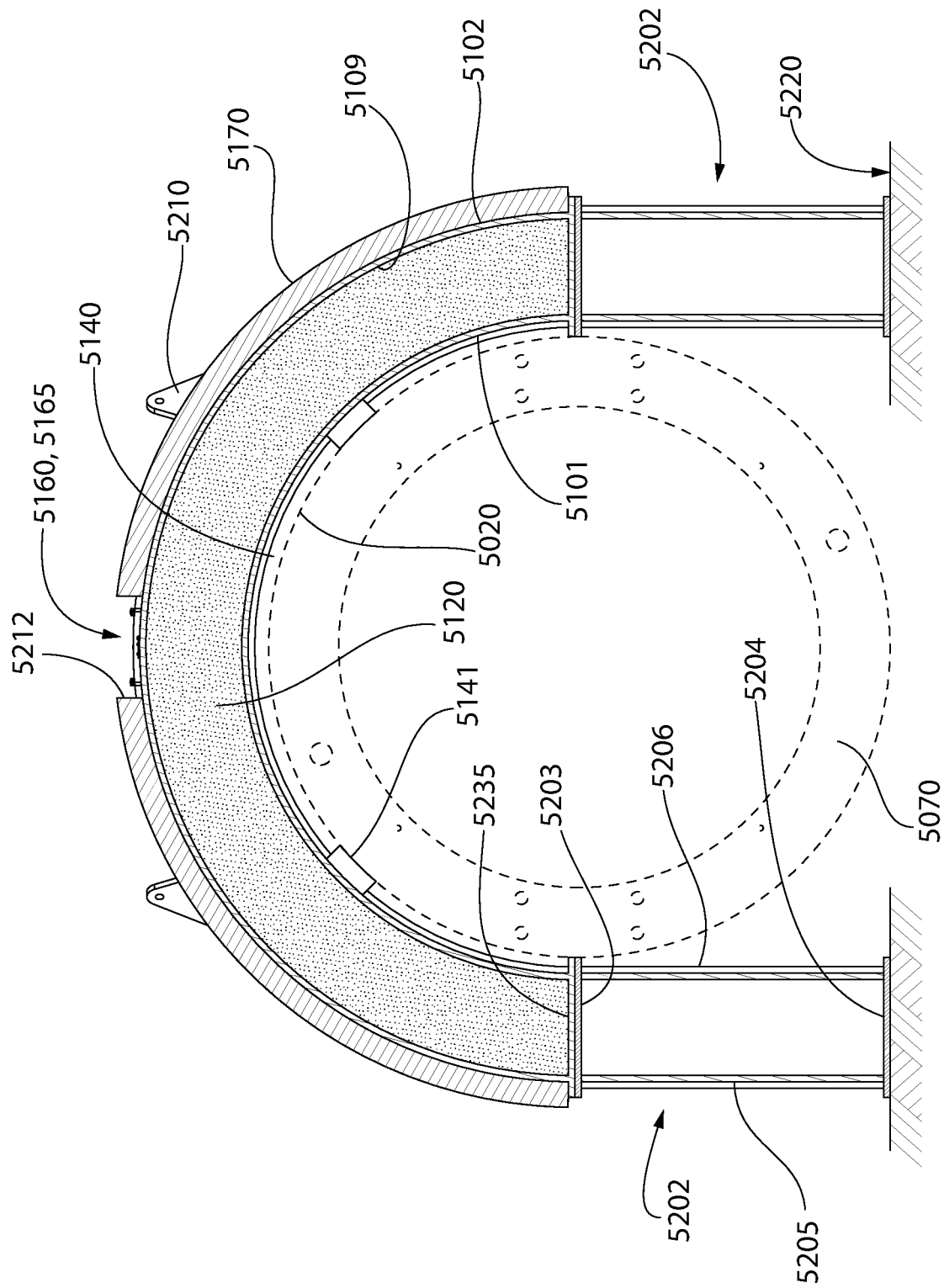
Figure 129:
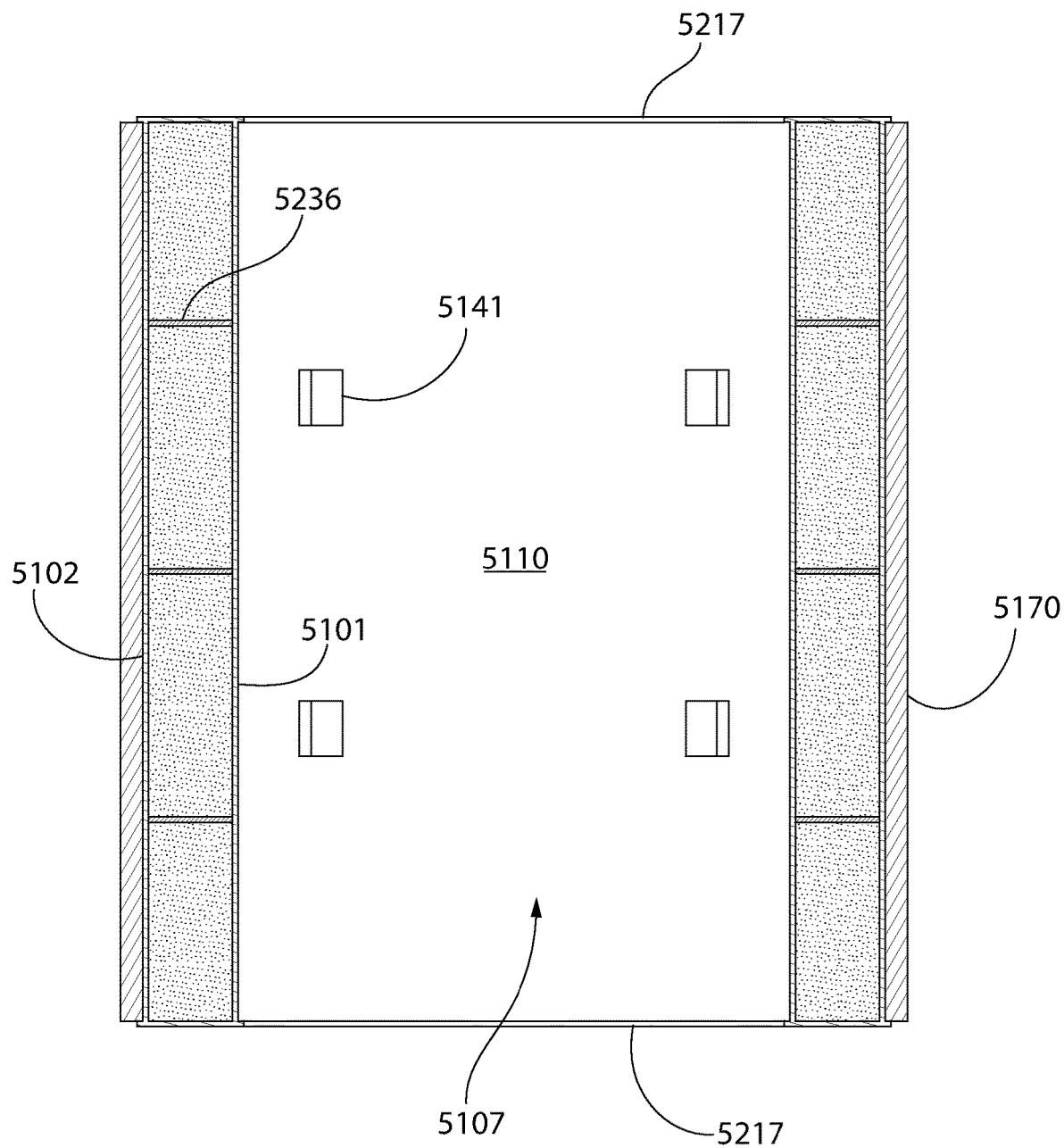
Figure 130:
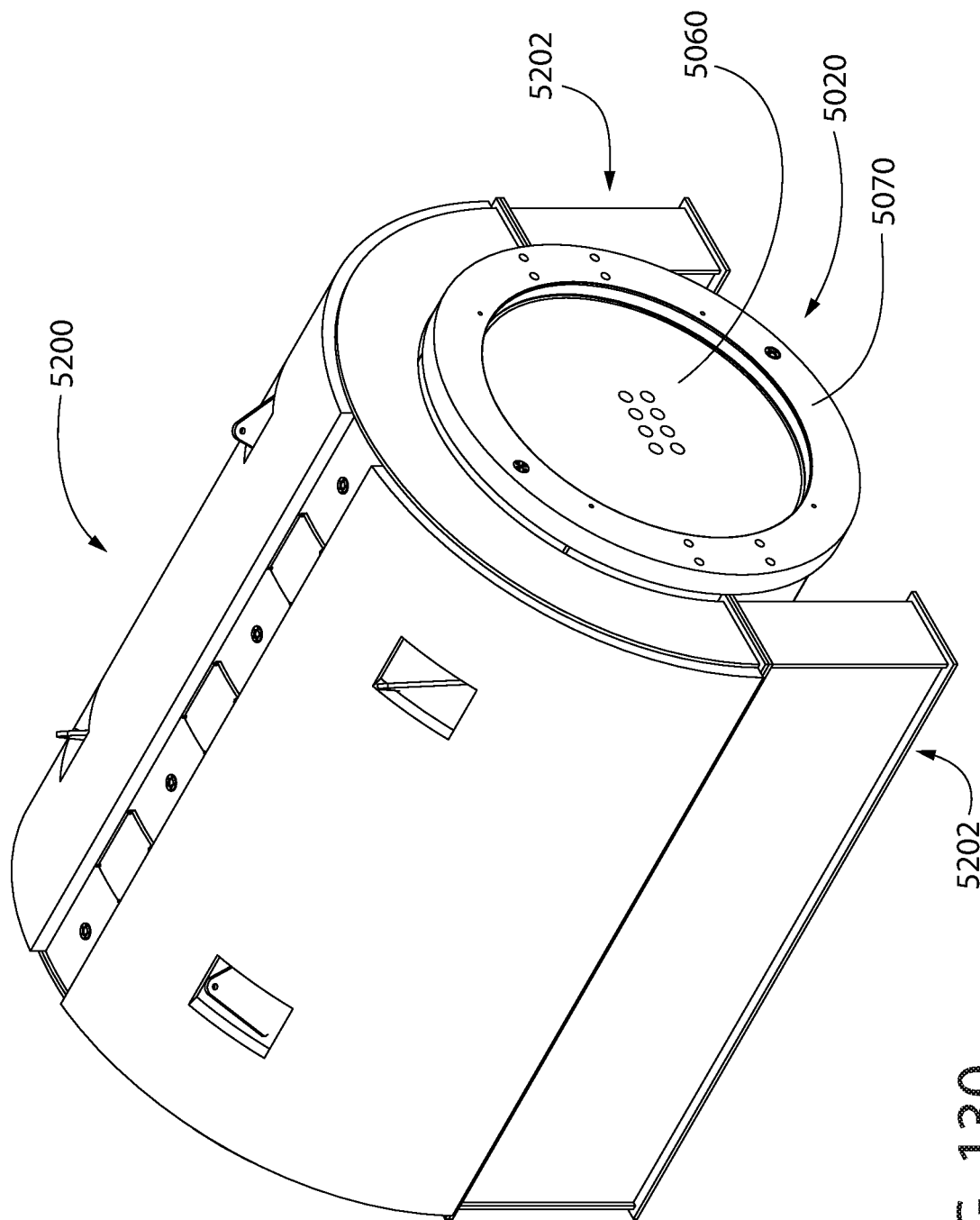
Figure 131:
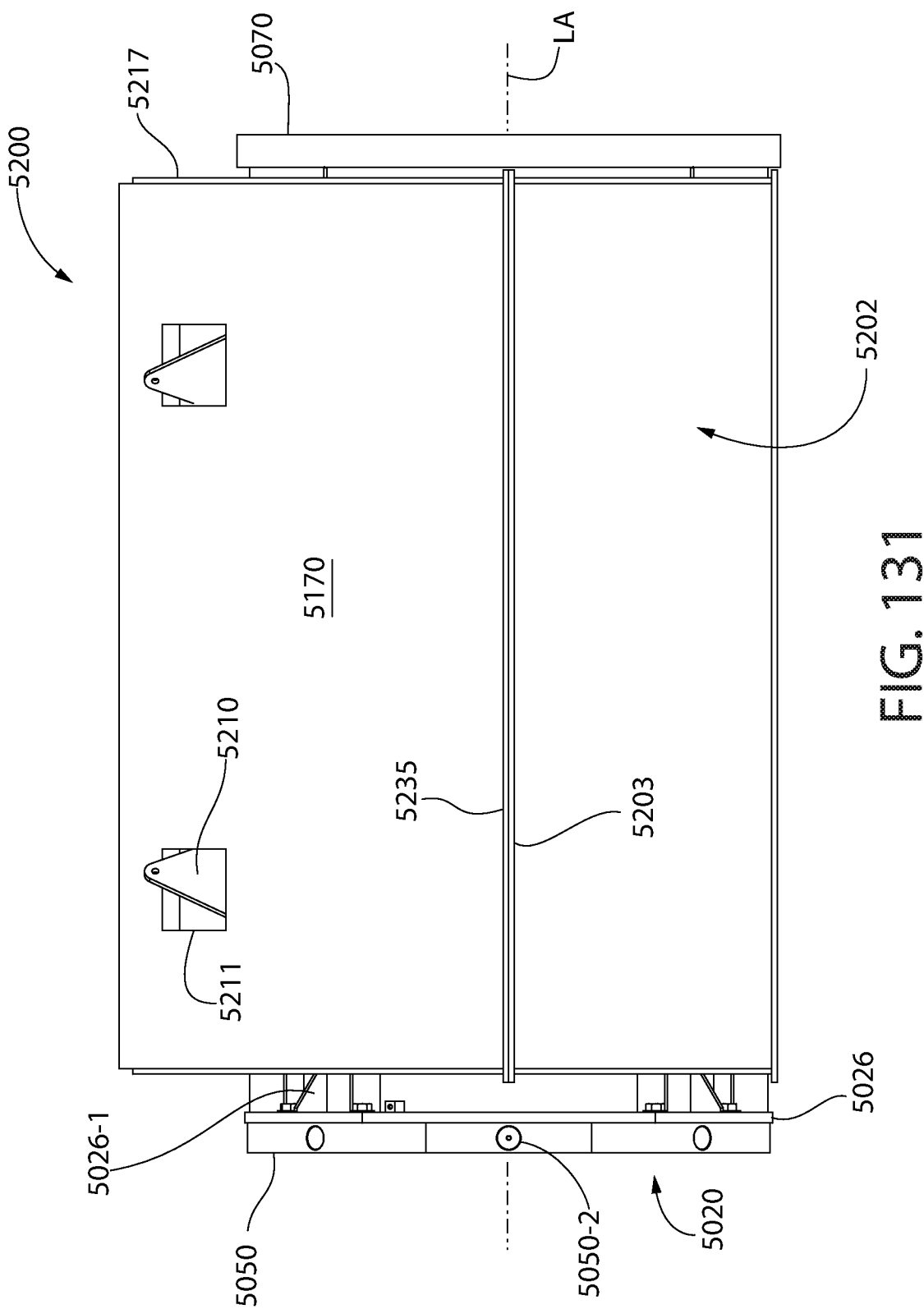
Figure 132:
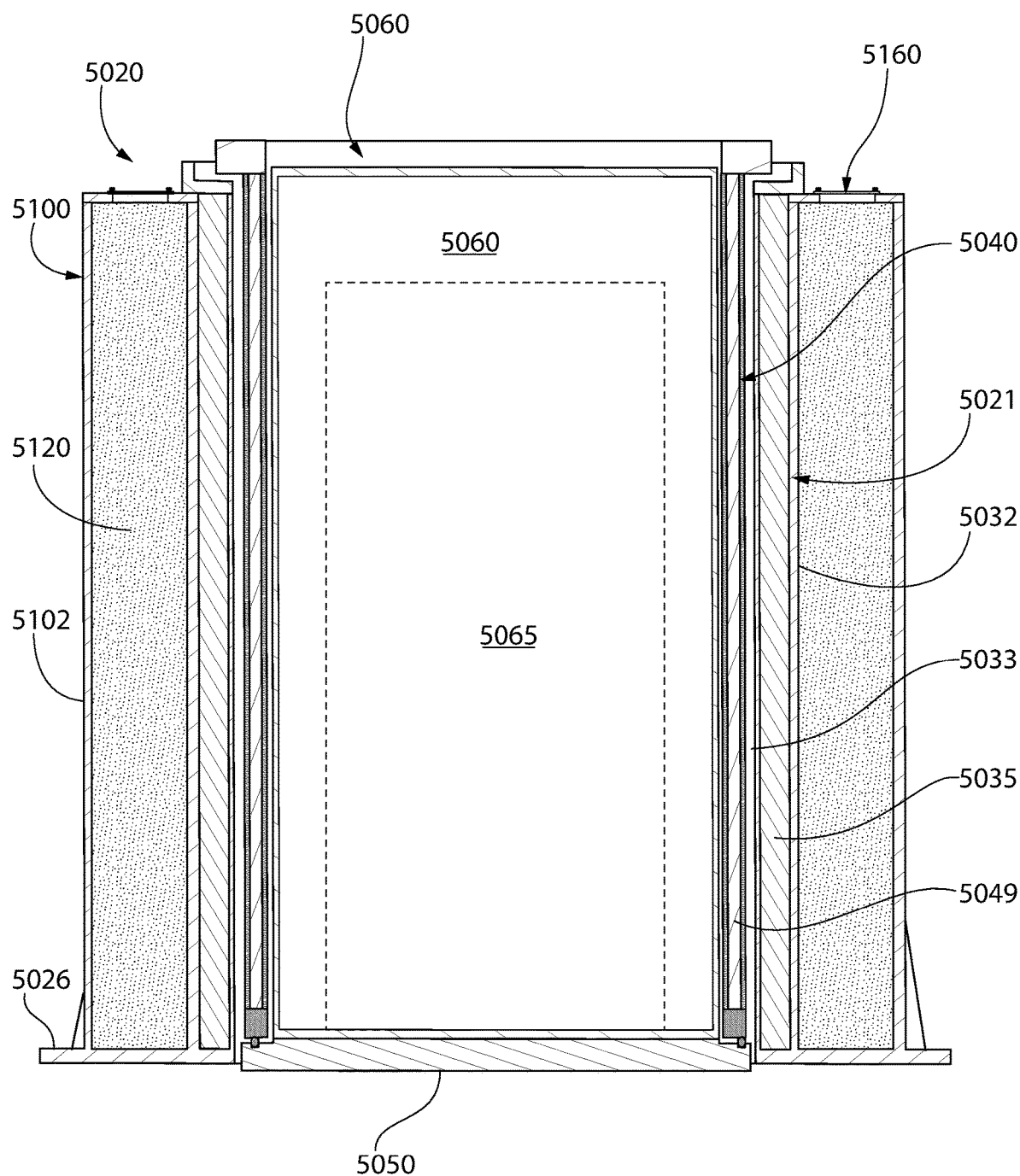
Figure 133:
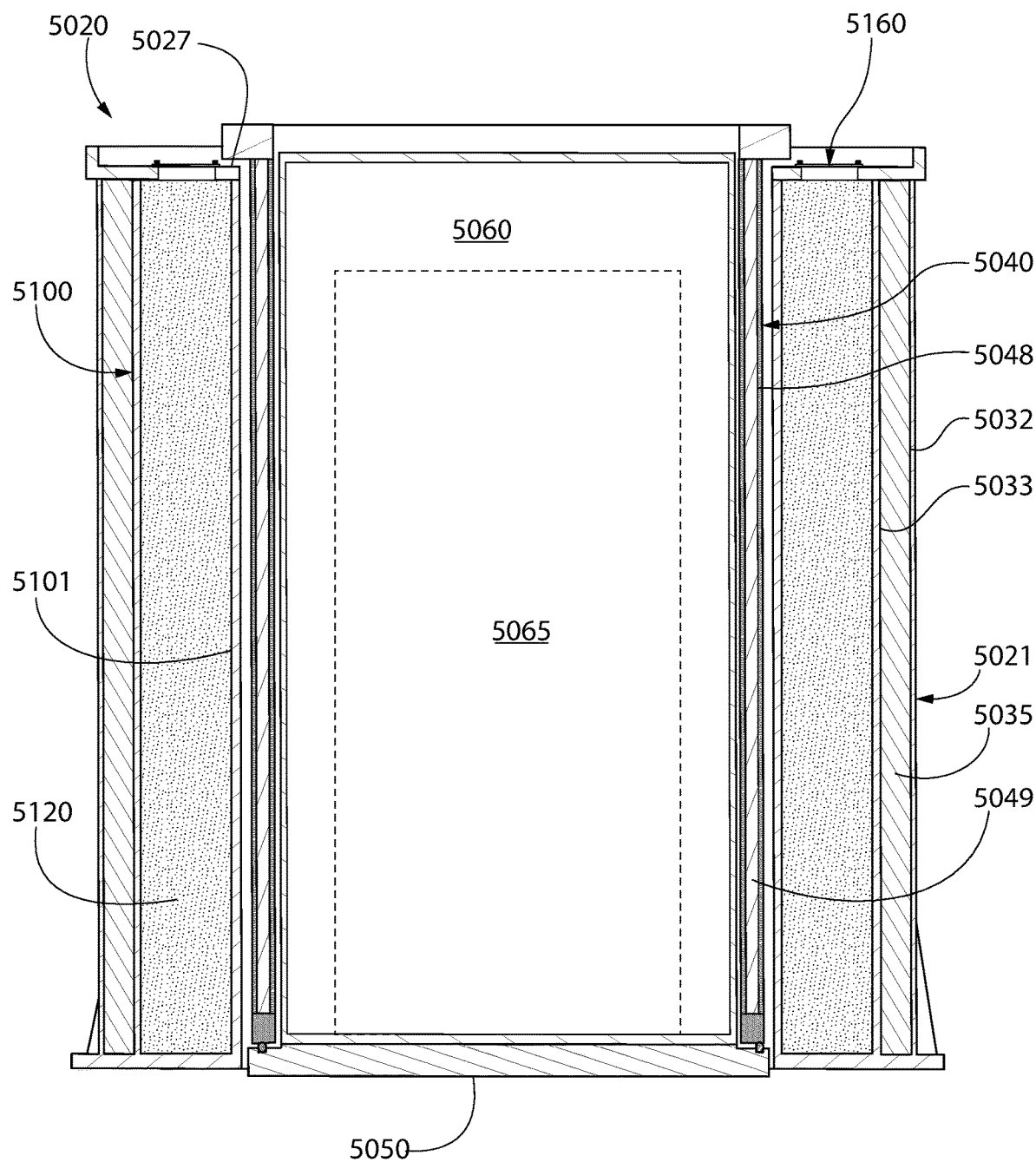
Figure 134:
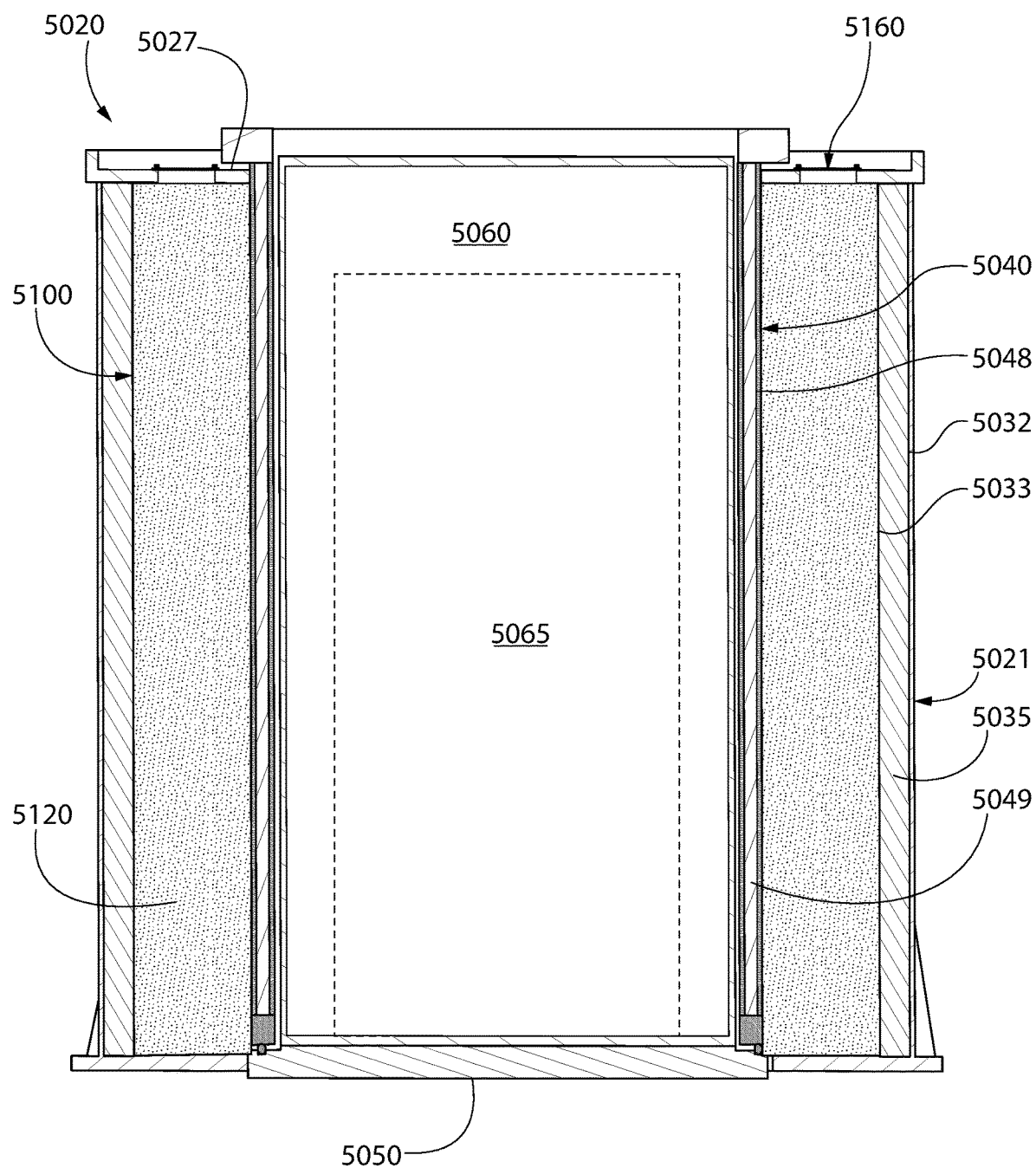

FIG. 129 is a longitudinal cross-sectional view thereof;

FIG. 130 is perspective view showing the cooling jacket of FIG. 118 installed on the cask of FIG. 101;

FIG. 131 is a side view thereof;

FIG. 132 is a side cross-sectional view of a first embodiment of a cask of FIGS. 101 and 102 having a body comprising an integral non-separable cooling jacket;

FIG. 133 is a side cross-sectional view of a second embodiment of the cask of FIGS. 101 and 102 having a body comprising an integral non-separable cooling jacket; and FIG. 134 is a side cross-sectional view of a variation of the cask of FIGS. 101 and 102 having a body comprising an integral and non-separable NSC, GBC, and cooling jacket.

Figure 135:
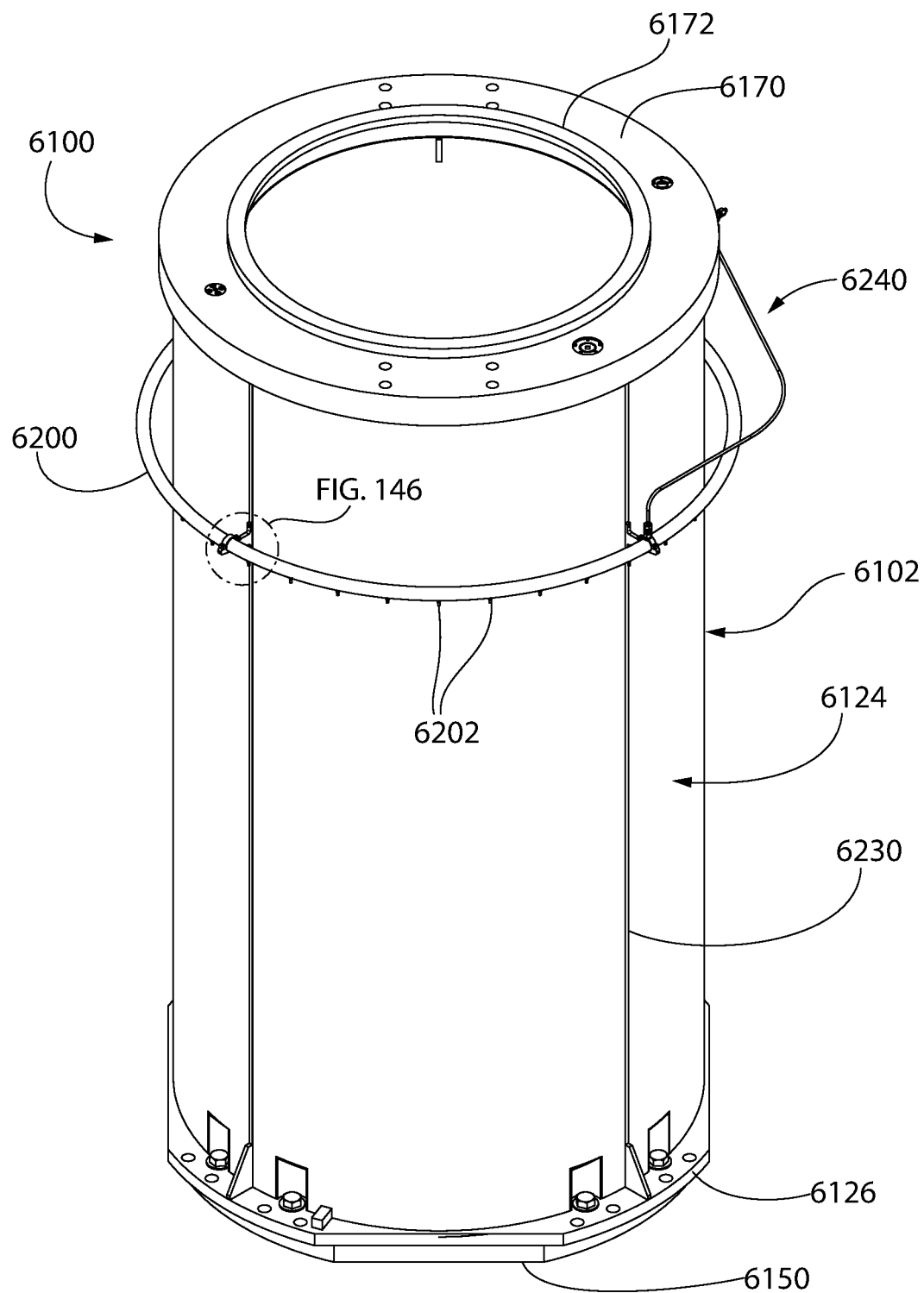
Figure 136:
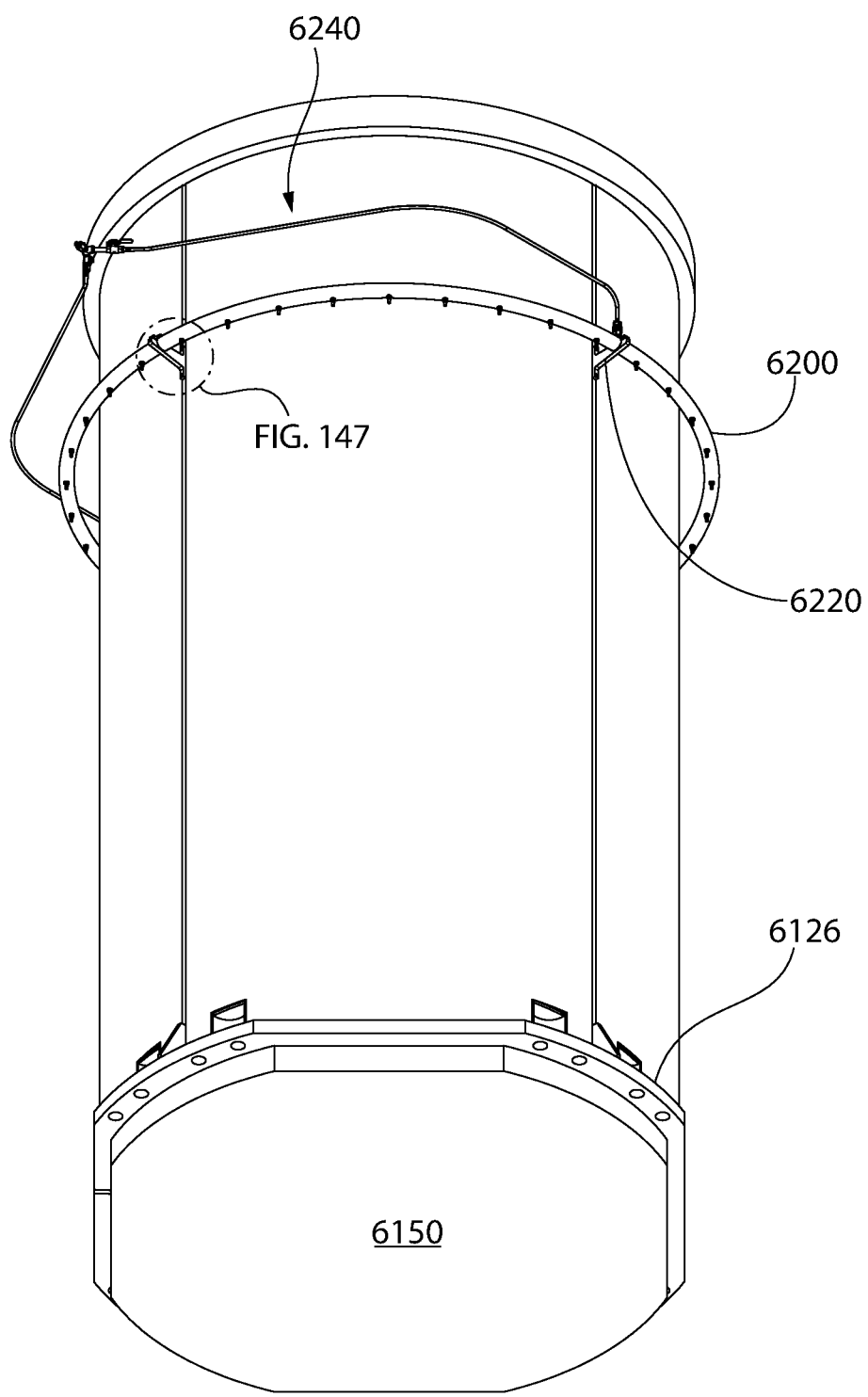
Figure 137:
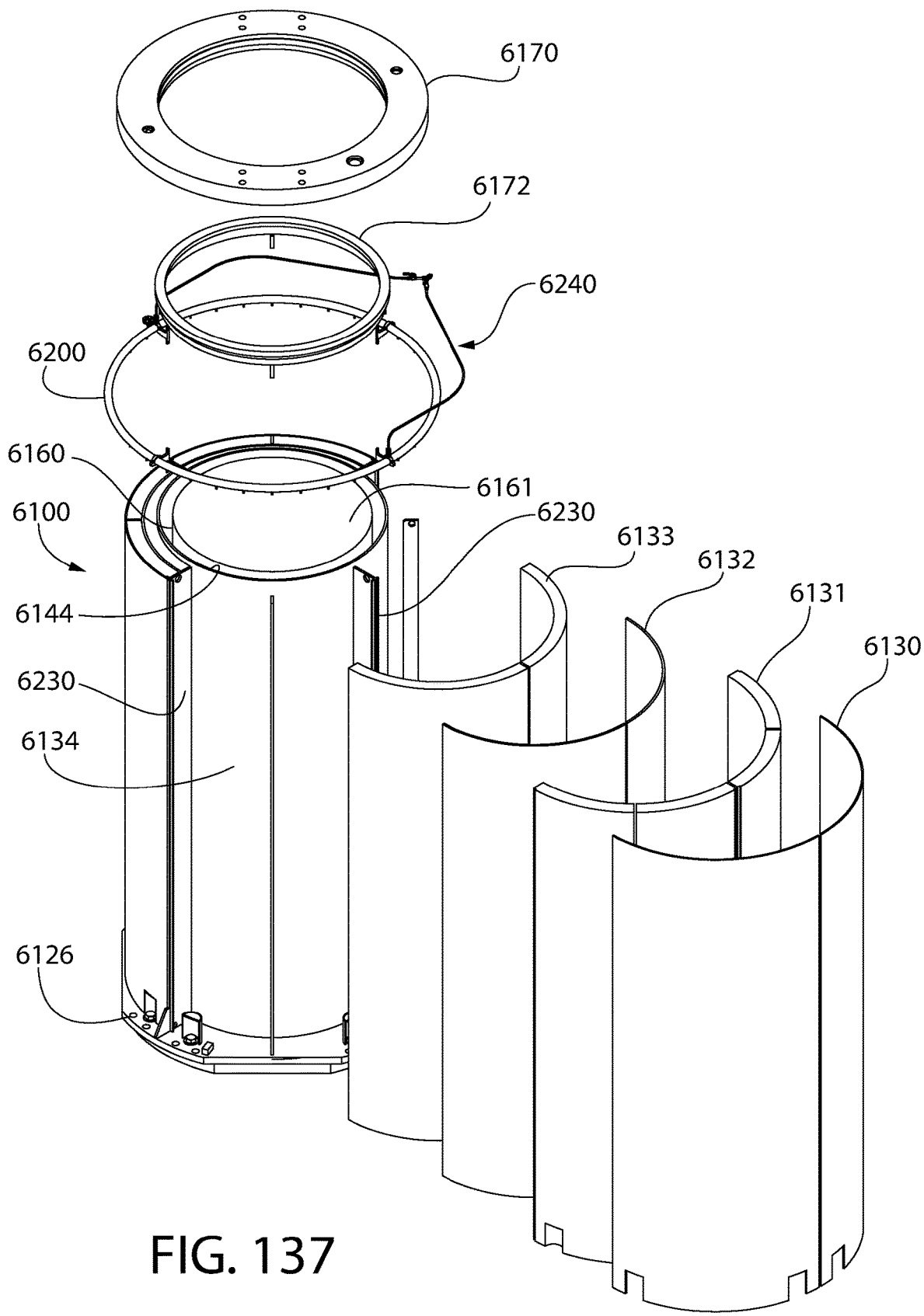
Figure 138:
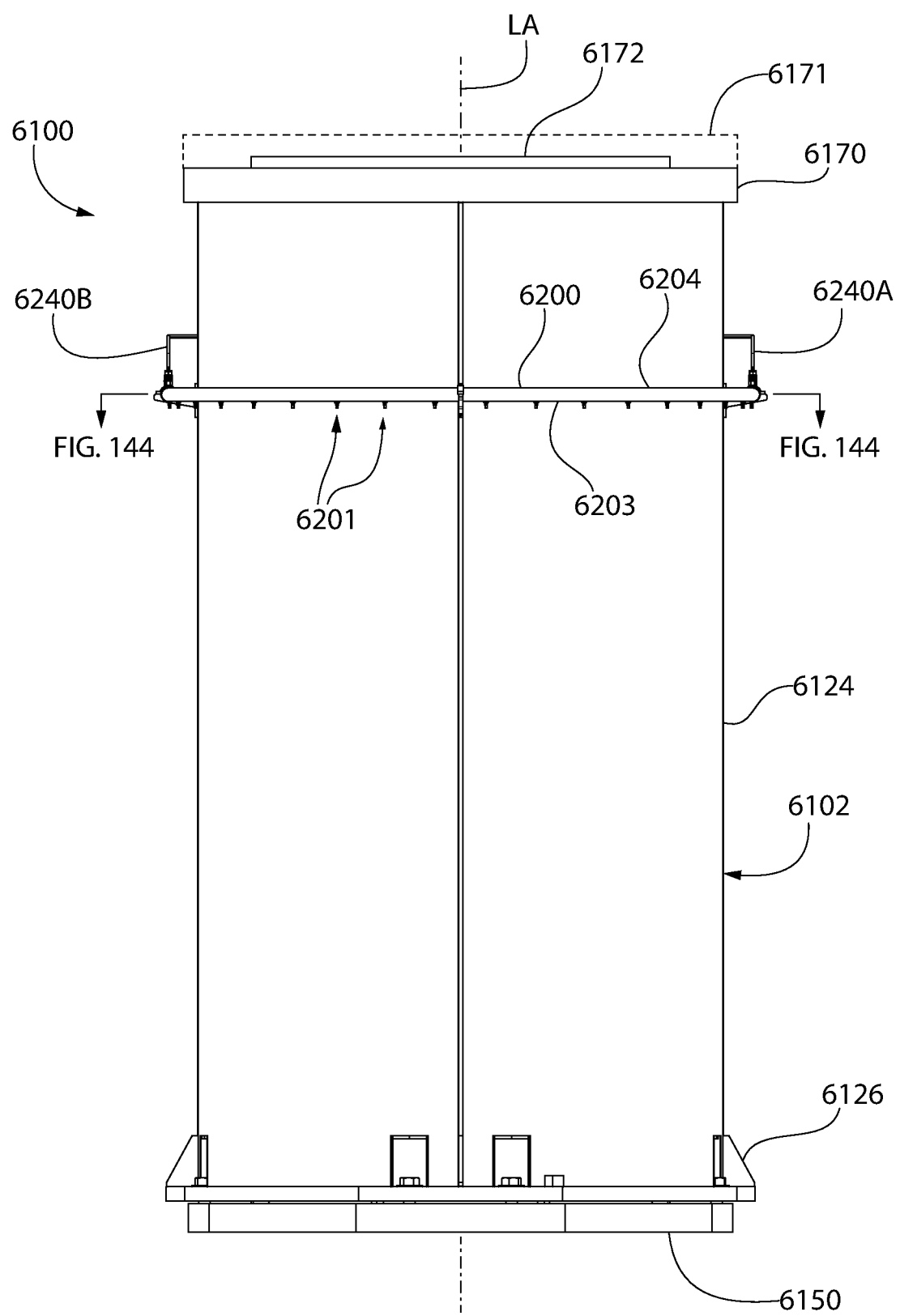
Figure 139:
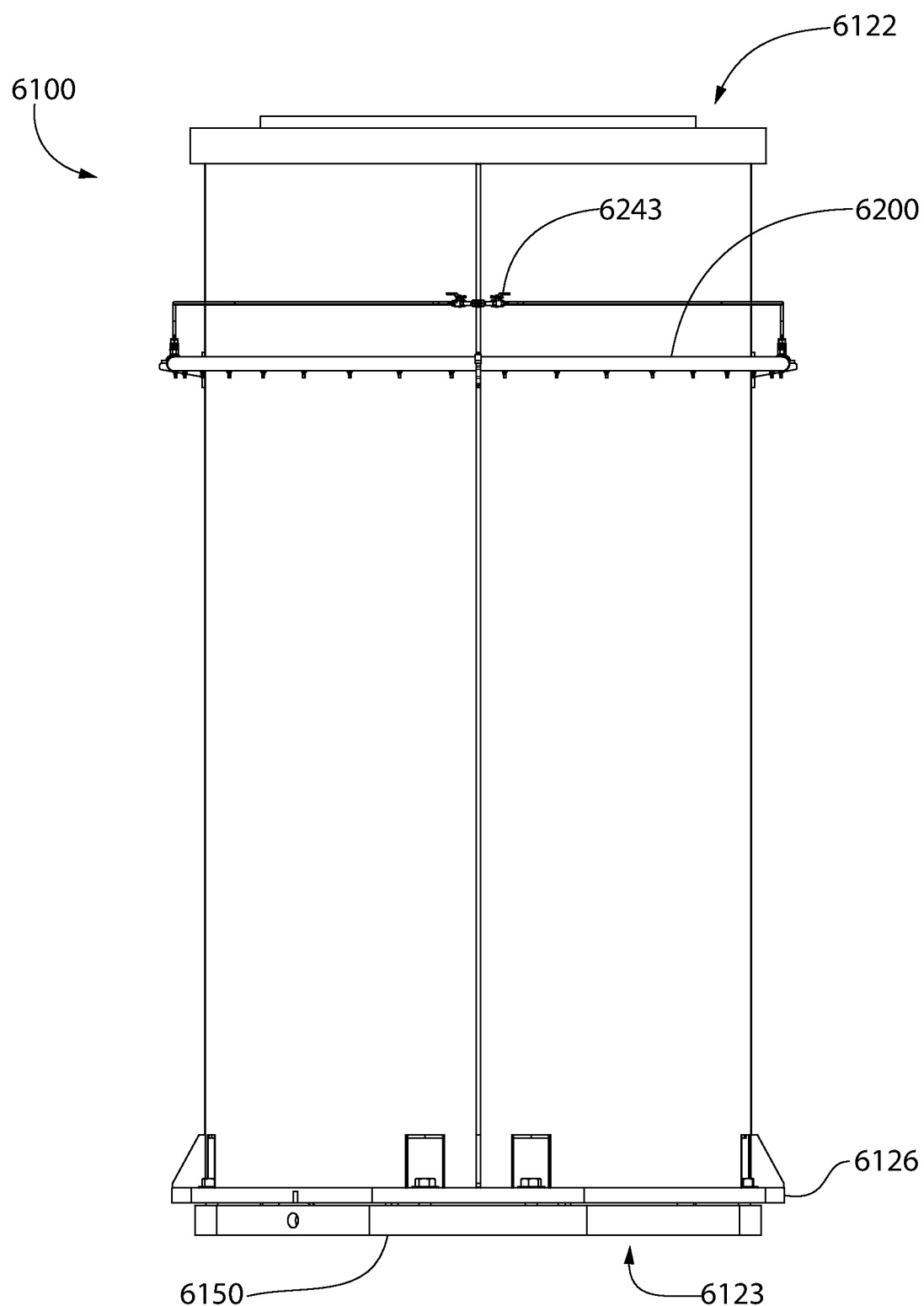
Figure 140:
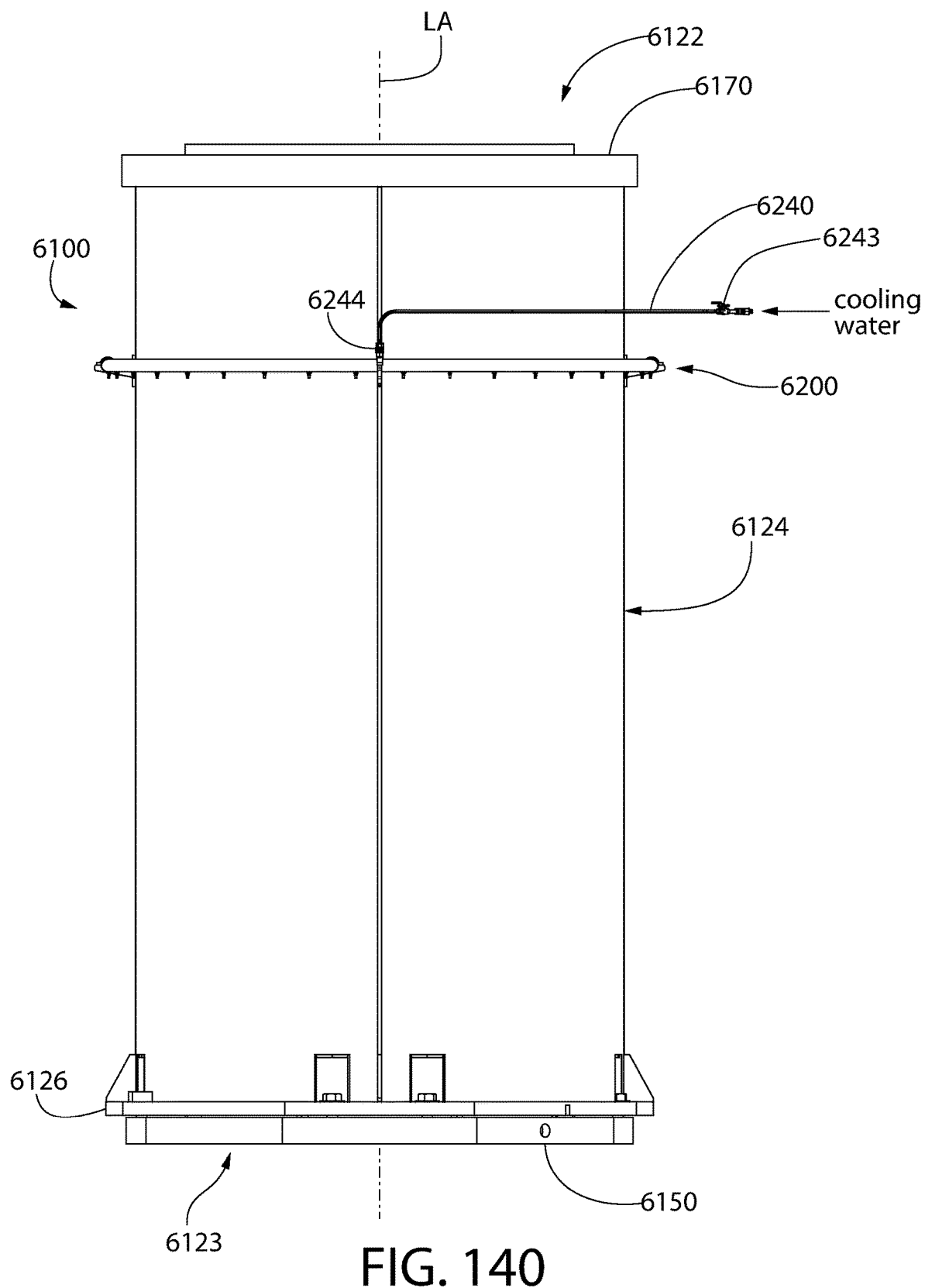
Figure 141:
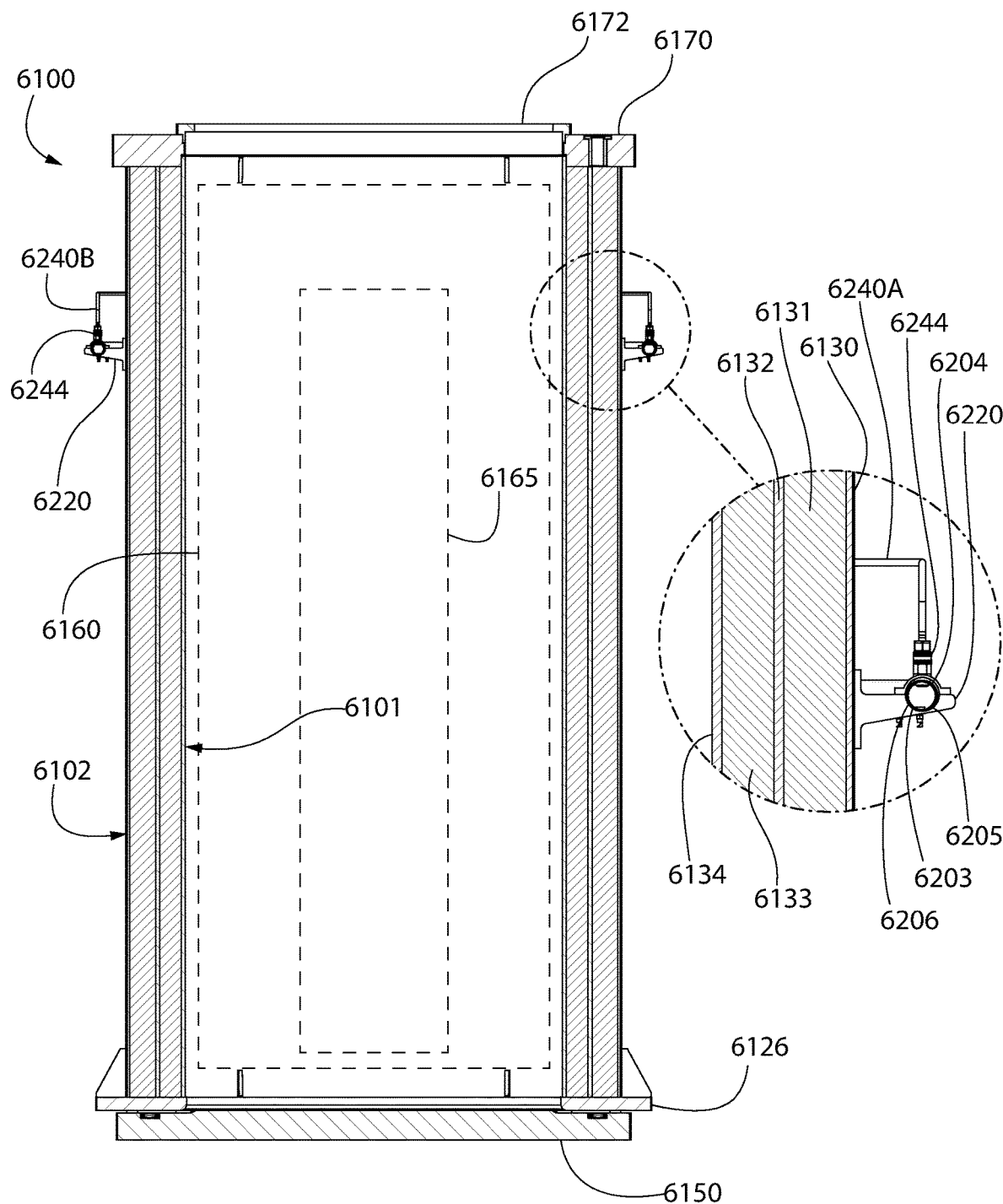
Figure 142:
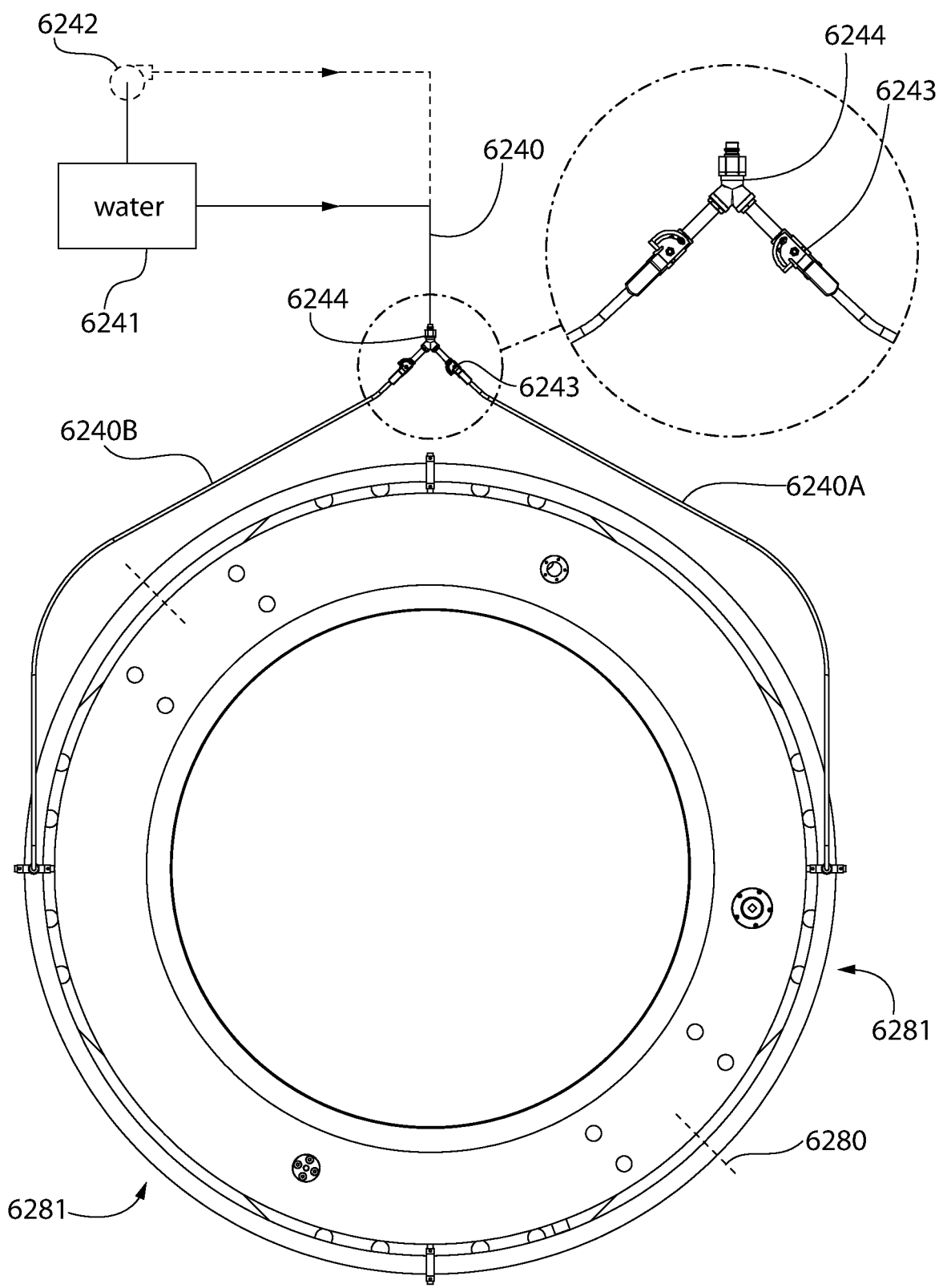
Figure 143:
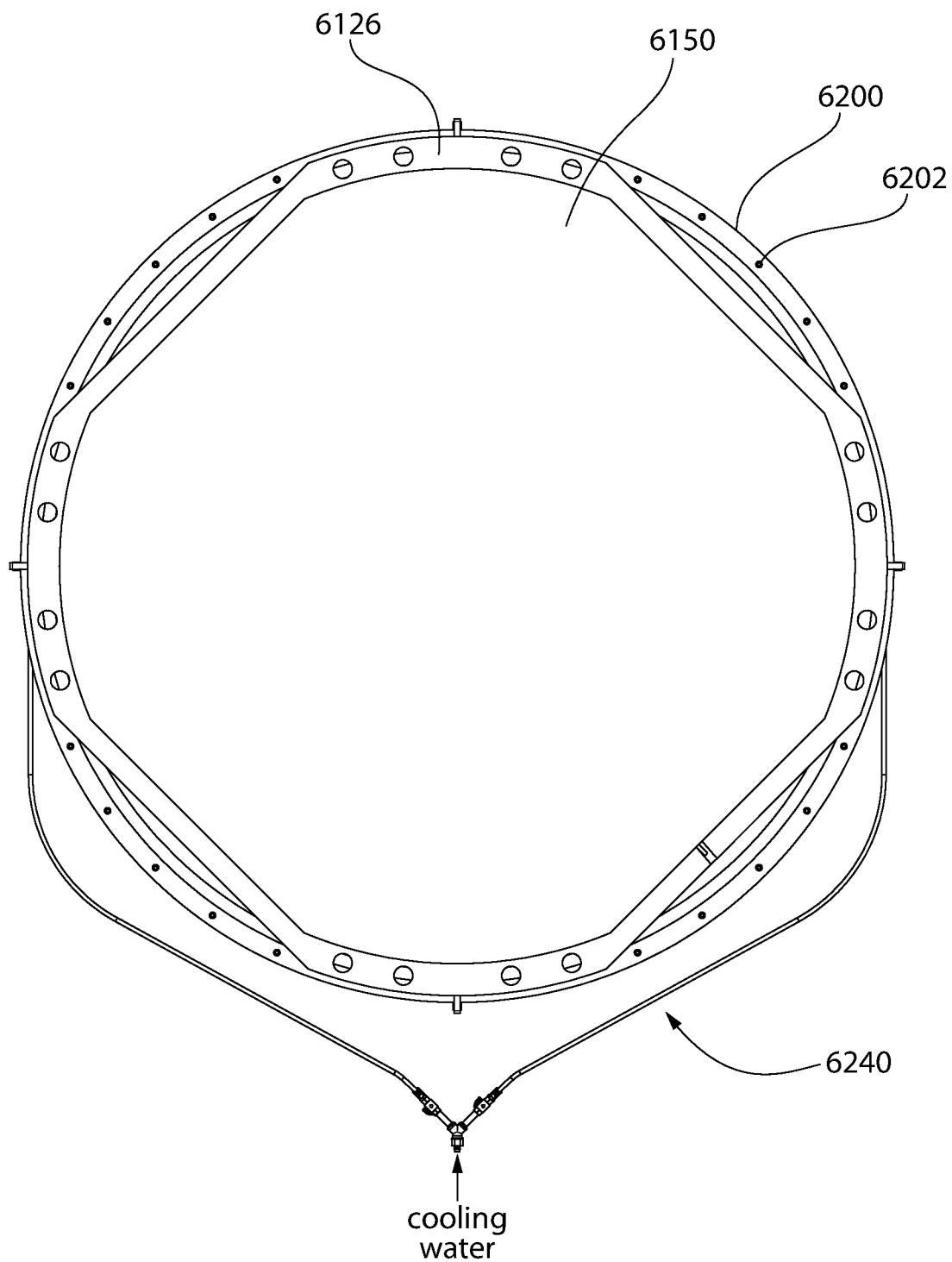
Figure 144:
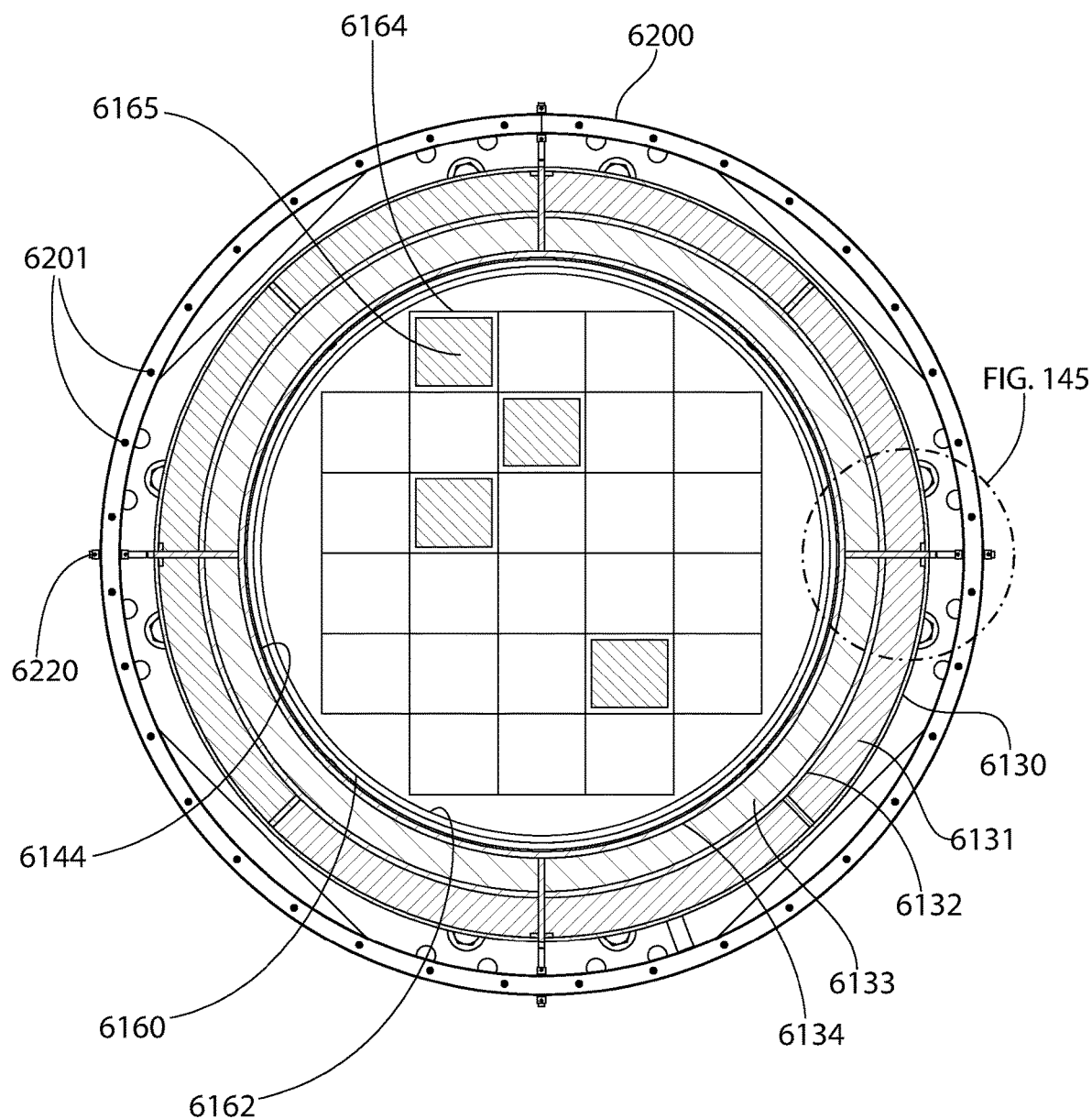
Figure 145:
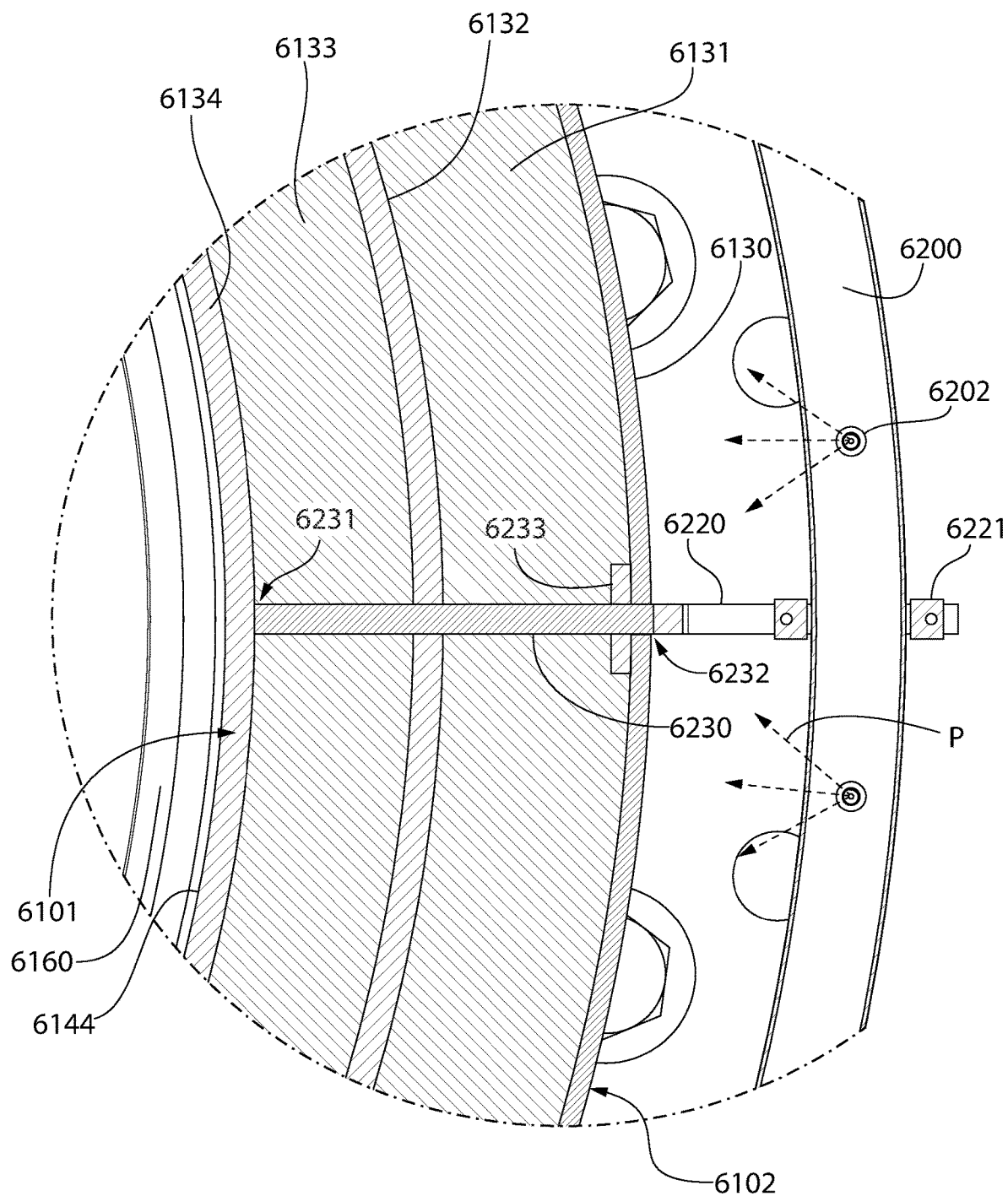
Figure 146:
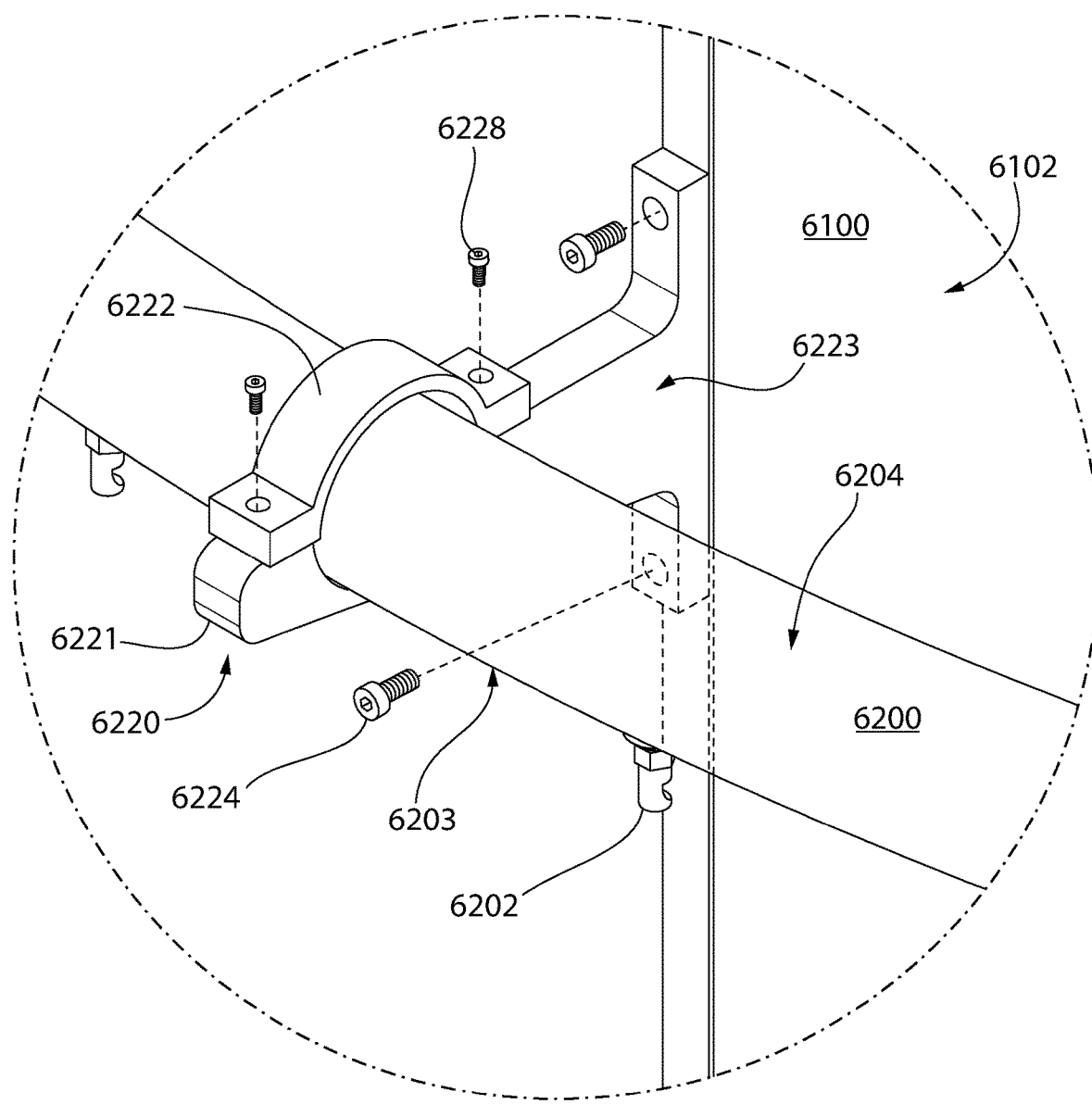
Figure 147:
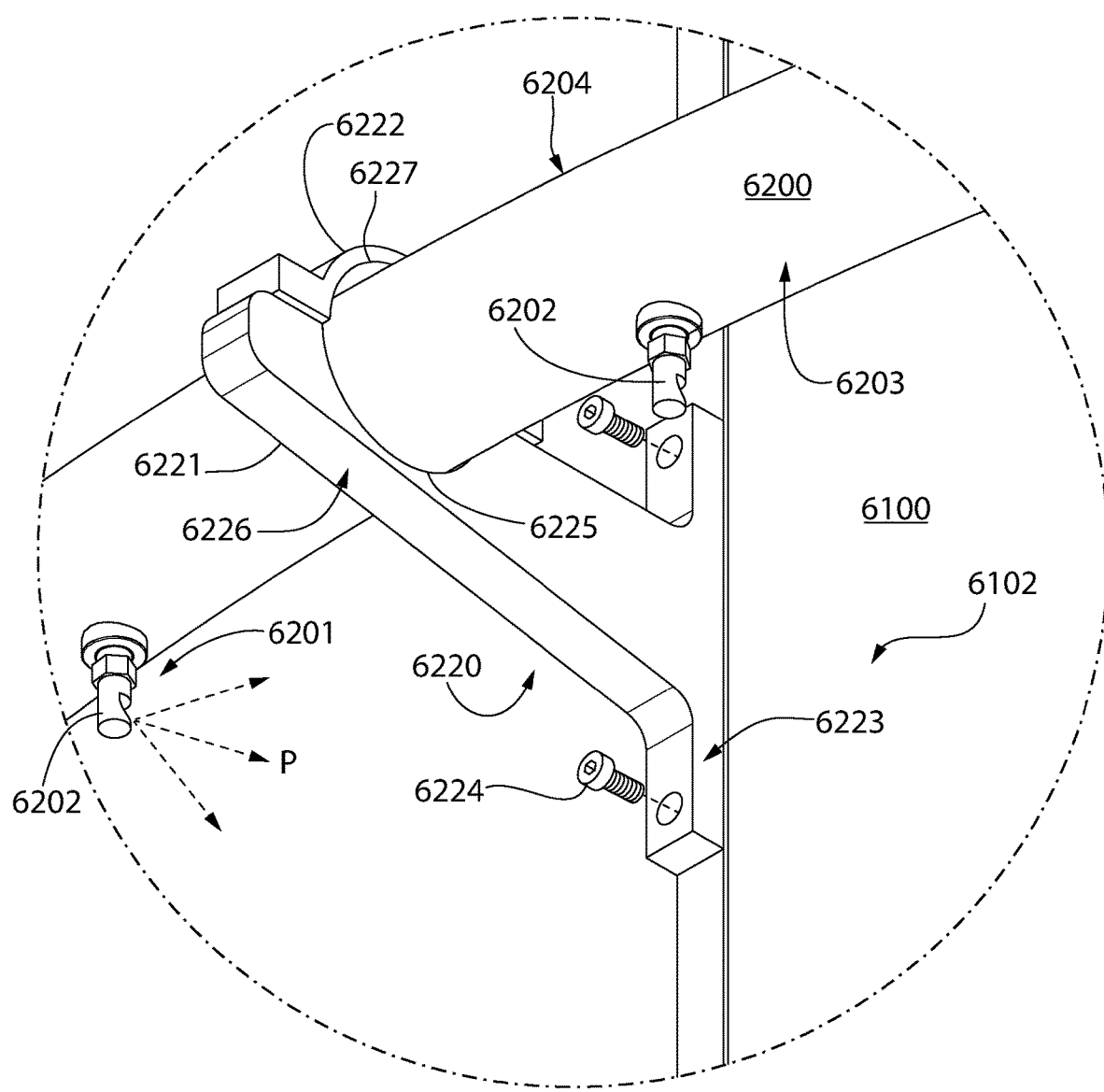
Figure 148:
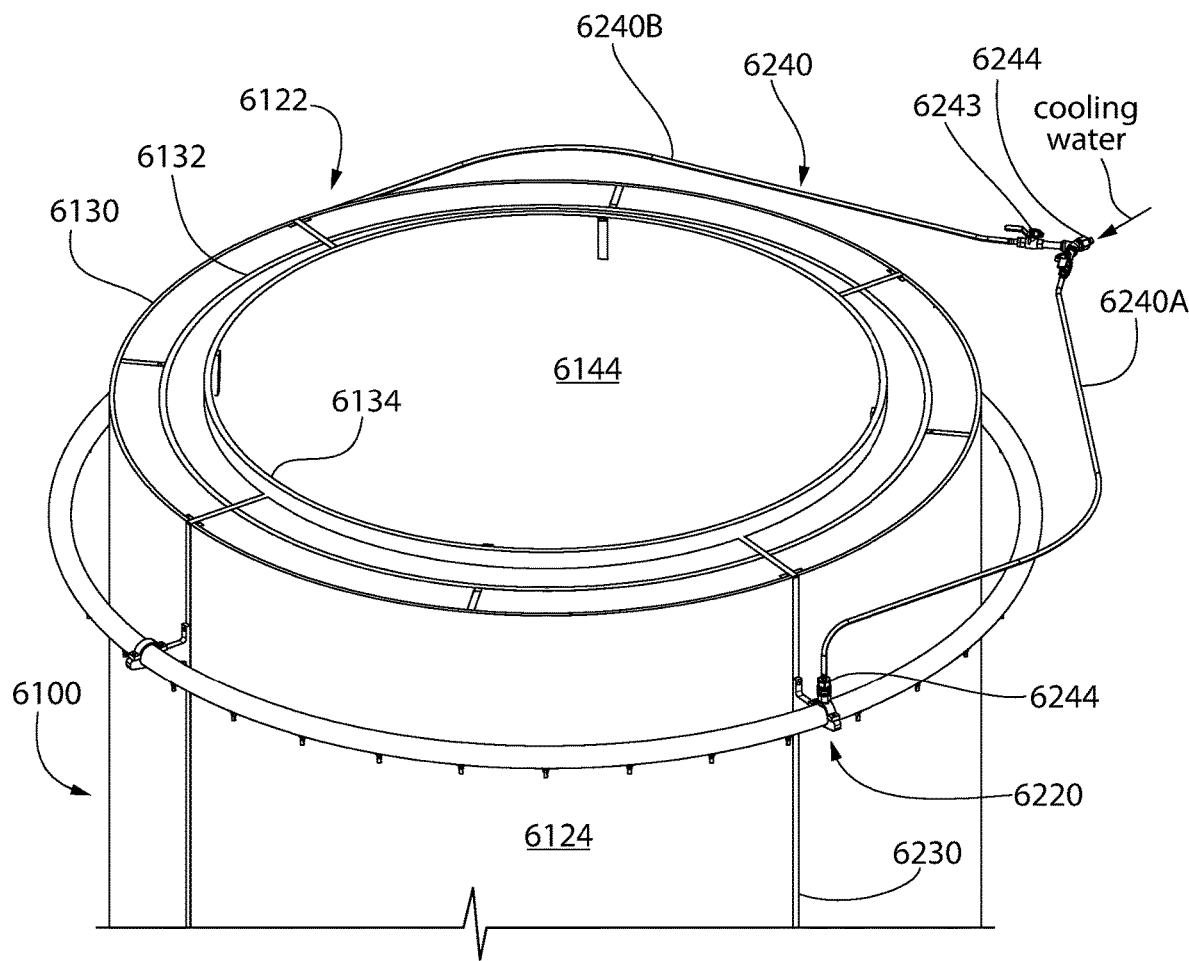
Figure 149:
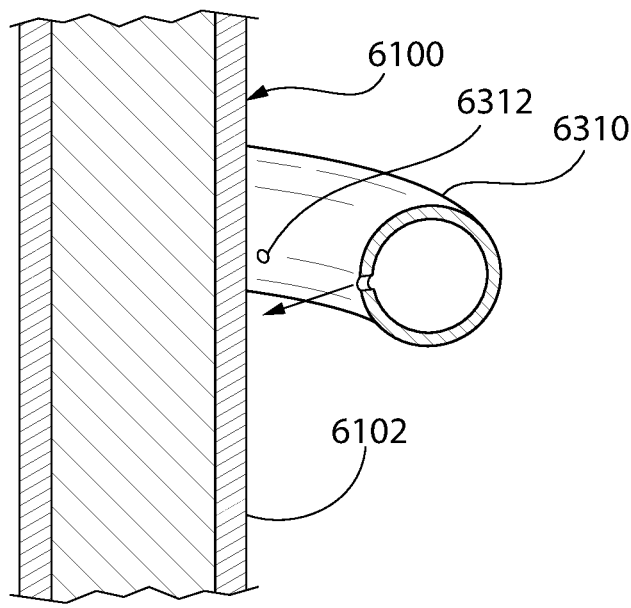

FIG. 135 is a top perspective view of a radiation-shielded cask for storage/transport of high level radioactive waste and showing a cooling water system according to the present disclosure;

FIG. 136 is a bottom perspective view thereof;

FIG. 137 is an exploded top view thereof;

FIG. 138 is a first side view thereof;

FIG. 139 is a second side view thereof;

FIG. 140 is a third side view thereof;

FIG. 141 is a side longitudinal cross-sectional view thereof;

FIG. 142 is a top view thereof;

FIG. 143 is a bottom view thereof;

FIG. 144 is a transverse cross sectional view;

FIG. 145 is an enlarged detail from FIG. 144;

FIG. 146 is an enlarged top perspective view showing mounting details for mounting the cooling water header of the cooling water system to the cask and header water spray nozzles;

FIG. 147 a bottom perspective view thereof;

FIG. 148 is a top perspective view of the cask with cooling water header;

FIG. 149 is a first alternative configuration of the cooling water header; and

Figure 150:
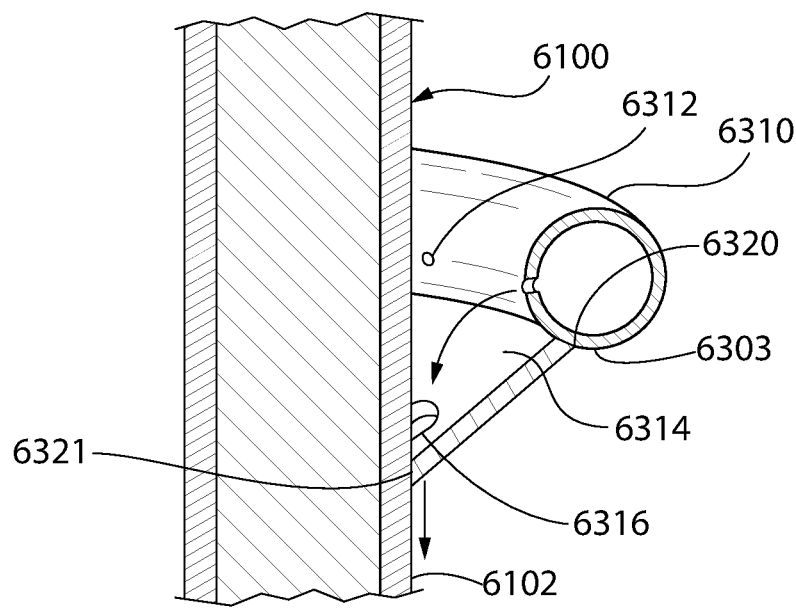

FIG. 150 is a second alternative configuration thereof.

All drawings are schematic and not necessarily to scale. A reference herein to a figure number herein that may include multiple figures of the same number with different alphabetic suffixes shall be construed as a general reference to all those figures unless specifically noted otherwise.

DETAILED DESCRIPTION

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Multiple inventive concepts are described herein and are distinguished from one another using headers in the description that follows. Specifically, FIGS. 1-46 are relevant to a first inventive concept, FIGS. 47A-61 are relevant to a second inventive concept, FIGS. 62-71 are relevant to a third inventive concept, FIGS. 72-100 are relevant to a fourth inventive concept, FIGS. 101-134 are relevant to a fifth inventive concept, and FIGS. 135-150 are relevant to a sixth inventive concept. The first through sixth inventive concepts should be considered in isolation from one another. It is possible that there may be conflicting language or terms used in the description of the first through sixth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-46, a first inventive concept will be described.

The present air-cooled condenser (ACC) is configured and operable to achieve goals of: (a) minimizing the required external support structure around the tube bundles by leveraging the structural strength of the bundle itself, and (b) providing an essentially unrestrained thermal expansion of the tube arrays while imputing the capacity to withstand wind loads and seismic excitation.

In one embodiment, these goals may be accomplished by an ACC design in which the bottom condensate headers (that collect and carry the condensed water cascading down the tubes) are supported in a longitudinally unrestrained manner on curved saddle supports, but are otherwise unconnected. There are no fixed support points associated with the support system for the condensate headers. This arrangement allows the condensate headers and tube bundles to advantageously grow or contract in the longitudinal direction without developing stresses from restraint of thermal expansion or contraction which may induce thermal stress cracking.

The present ACC design further provides a hinged flexible coupling at the junction between the two upper tubesheets of tube bundles at the vertex where they meet at the common steam header. This allows for limited transverse expansion/contraction and vertical growth/contraction of the structure. The flexible joint may comprise a curved or angled seal plate which fluidly and hermetically seals the open joint between the two tubesheets. The angled seal plate also provides ability to absorb lateral expansion to a limited degree. The thermal movement is typically much smaller in the transverse dimension than the vertical direction because of smaller lateral dimensions involved at the tubesheet juncture.

The foregoing aspects of the ACC system are further described below.

Forced Draft Air-Cooled Condenser System

Figure 1:
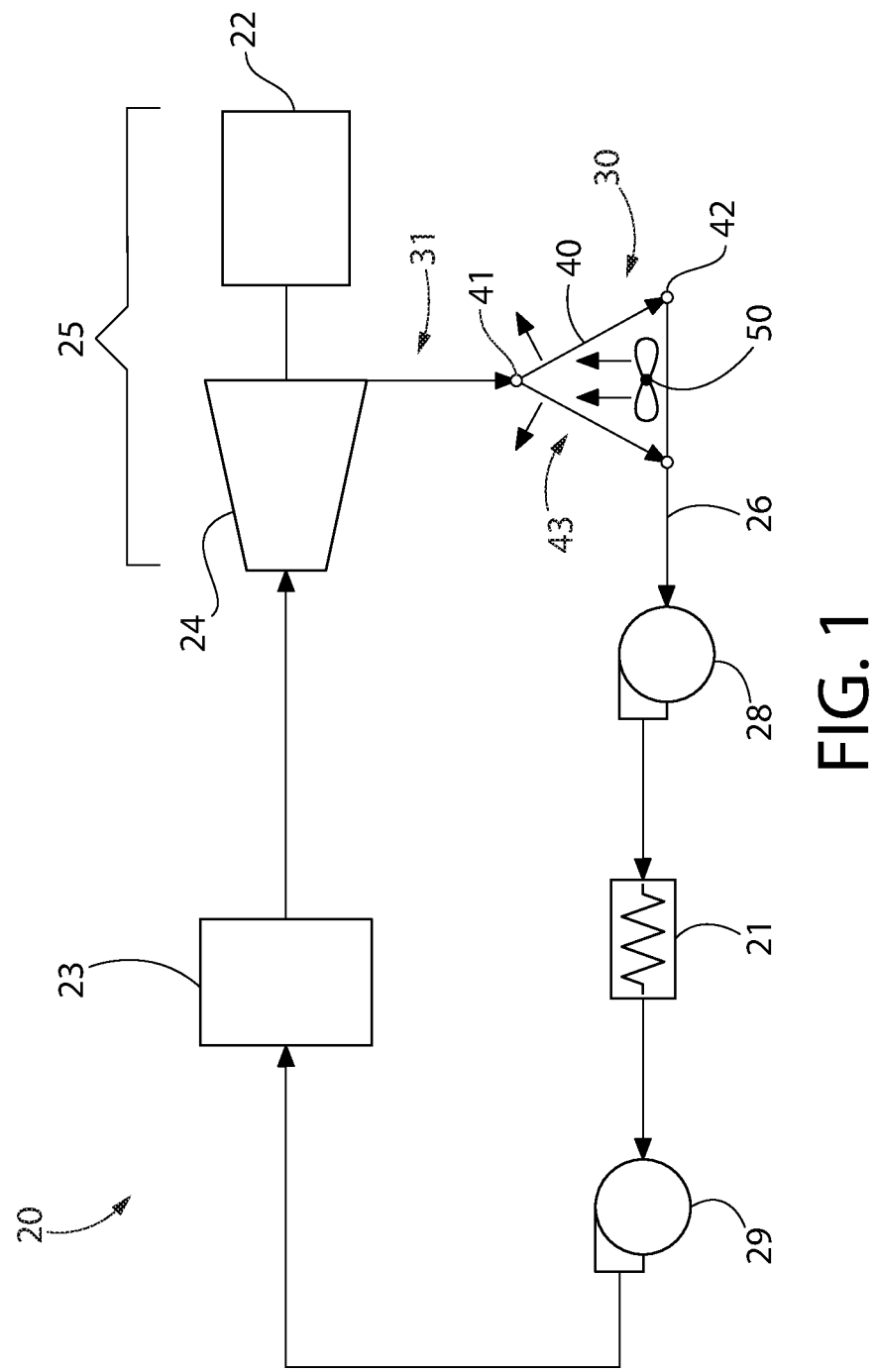
FIG. 1 is a schematic flow diagram of a power generation Rankine cycle comprising a forced draft air-cooled condenser (ACC) according to the present disclosure.

FIG. 1 is a schematic flow diagram of a conventional Rankine cycle flow loop 20 of a thermal electric power generation plant. A forced draft air-cooled condenser system 30 according to the present disclosure comprising air-cooled condenser (ACC) 40 is fluidly coupled to the Rankine cycle flow loop 20 in a steam condensing application. With additional reference to FIG. 2, ACC 40 generally comprises a top common steam header 41, a pair of bottom condensate headers 42, and pair of inclined/angled tube panels or bundles 43 of generally planar configuration extending between the steam and condensate headers forming an A-frame structure. The power generation plant may be a nuclear plant, fossil fired plant, or utilize another other energy source such as renewables including biomass, trash, or solar in various embodiments. The electric power generating portion of the plant comprises a turbine-generator set 25 including an electric generator 22 and steam turbine 24 operably coupled to the generator for rotating a rotor to generate electricity via stationary stator windings in the generator. A steam generator 23 using a heat or energy source heats feedwater to produce the steam. In various embodiments, the source of heat for the steam generator may be a nuclear reactor, or a furnace which burns a fossil fuel (e.g. coal, oil, shale, natural gas, etc.) or other energy source such as biomass. The heat and fuel source do not limit the invention.

The condensate headers 42 are fluidly connected to condensate return piping 26 to route the liquid condensate back to a condensate return pump 28 which pumps the condensate in flow loop 20 to the steam generator. The condensate is generally pumped through one or more feedwater heaters 21 which uses steam extracted from various stages in the steam turbine 24 to pre-heat the condensate. The pre-heated condensate may be referred to as "feedwater" at this stage in cycle. Feedwater pumps 29 further pressurizes and pumps the feedwater to a steam generator 23) where the liquid feedwater is evaporated and converted into steam. The high pressure steam flows through the steam turbine 24 which in turn produces electricity in a known manner via electric generator 22. The pressure of the steam drops as it progressively flows through the turbine converting thermal and kinetic energy into electric energy. The low pressure steam at the outlet or exhaust of the turbine (i.e. "exhaust steam") is routed to the steam header 41 of the ACC 40 where it condenses and flows back to the Rankine cycle flow loop 20 to complete the flow path. A steam condensing closed flow loop 31 comprising the ACC 40 is thus formed and fluidly coupled to the Rankine cycle flow loop 20 between the steam turbine 24 and condensate pump 28 in this example.

Figure 2:
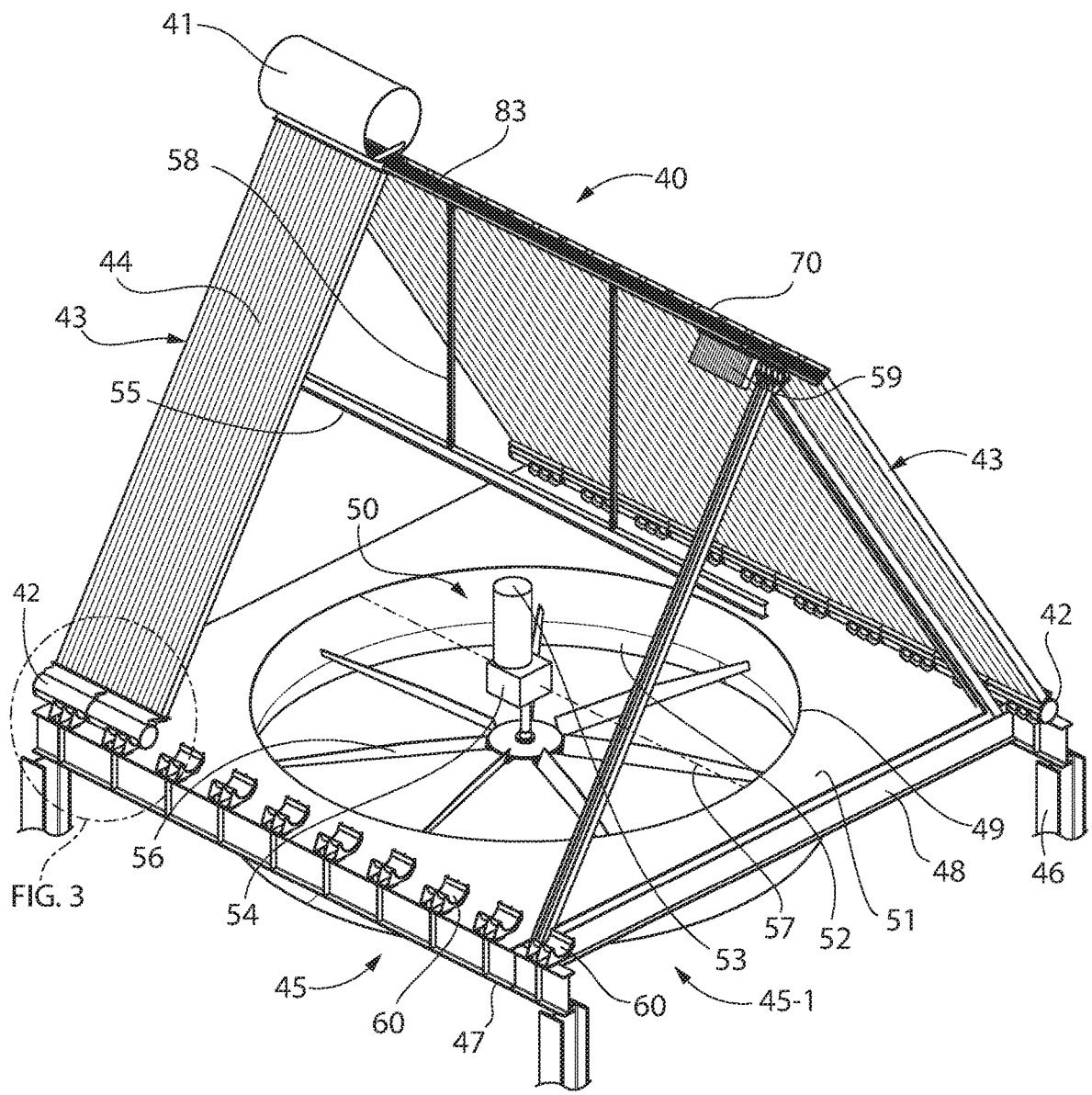
FIG. 2 is a perspective view of the ACC of FIG. 1 with some front tube bundles and structure removed to more clearly show the fan.
Figure 3:
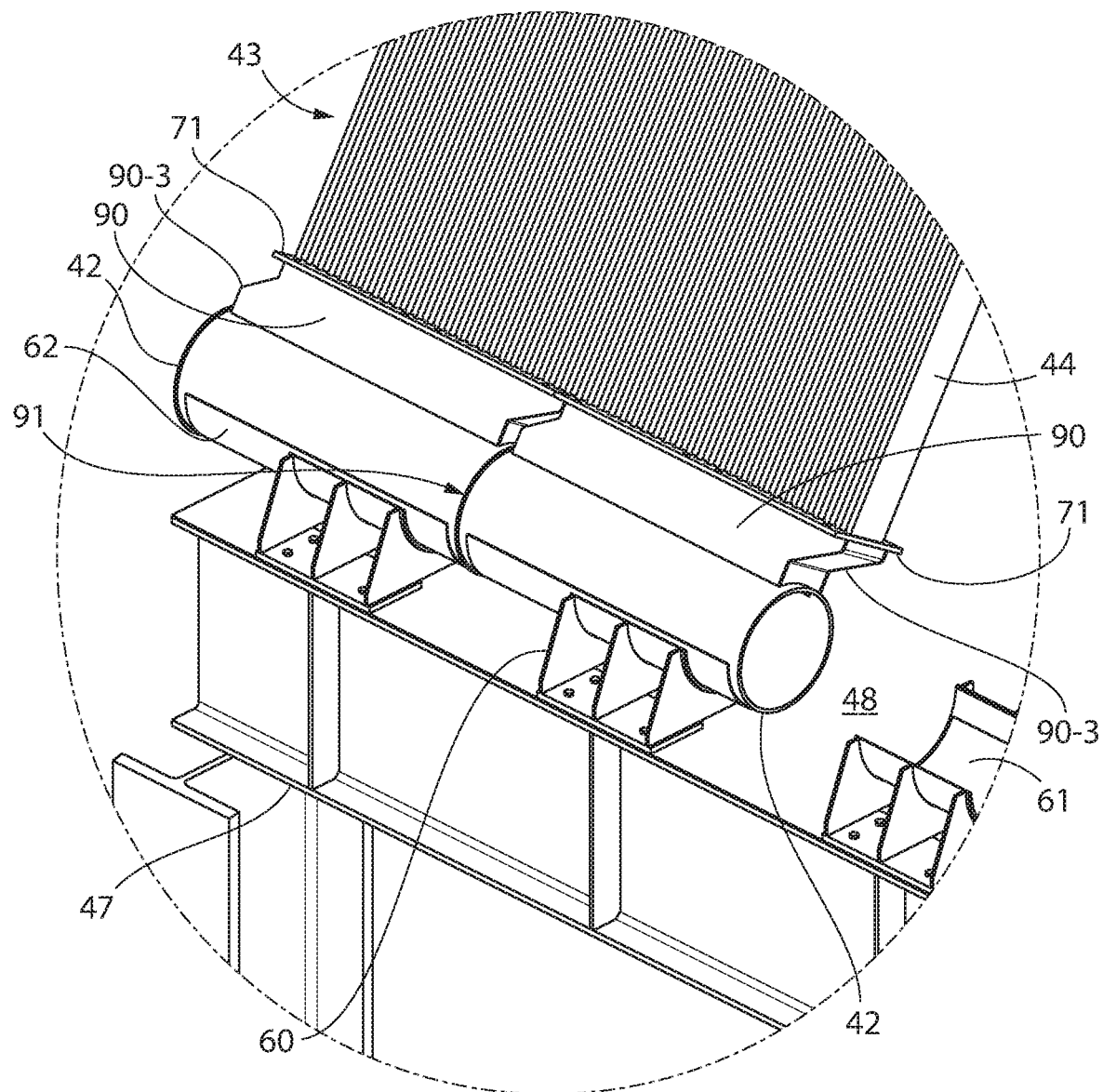
FIG. 3 is detail taken from FIG. 2 of the tube bundle to condensate header fluid connection showing the condensate flow plenums and header saddle supports.

FIG. 2 is a perspective view of a portion of ACC 40 according to the present disclosure showing the general construction and arrangement of the foregoing common steam header 41, condensate headers 42, and inclined tube bundles 43. Part of the front tube bundles are removed for clarity to show interior features of the ACC.

Referring to FIGS. 2-12, the ACC 40 may be a single row finned tube heat exchanger design comprising a plurality of inclined/angled tube bundles 43 arranged in an A-shaped construction in one configuration with an acute angle formed between opposing walls or panels of tube bundles. Each of the tube bundles 43 on the same side of the "A" are arranged in laterally adjoining side-by-side relationship as shown. The number of tube bundles will be dictated by the cooling requirements of the design. Each tube bundle is fluidly coupled to the common steam header 41 at top and one of the condensate headers 42 at bottom. One or more fans 50 arranged below the A-frame tube bundles blow ambient cooling air upwards through the tube bundles 43 to condense steam flowing downwards through the tube side of the tubes 44. Accordingly, each fan 50 has a bottom suction side for drawing ambient cooling air into the fan, and a top discharge side for discharging the air towards the tube bundles 43. The condensed steam now in liquid state (i.e. condensate) collects in the bottom condensate headers 42, as previously described herein.

It bears noting the ACC 40 shown in FIG. 2 is one of multiple ACCs which may be provided in a complete ACC system installation. Each ACC may be thought of as a cooling cell or unit which can be fluidly coupled together in a concatenated fashion in series at the steam and condensate header joints to provide the entire cooling duty required to condense the steam and return the condensate to the Rankine cycle flow loop. Each cooling cell shown in FIG. 2 may include multiple tube bundles 43 on each side (the left-most tube bundle in front showing a single tube bundle and the rear showing multiple tube bundles). The steam and condensate headers 41, 42 may be a single monolithic continuous flow conduit within each cell or be comprised of multiple header sections which are fluidly coupled together within each cell to form the continuous flow conduit.

ACC 40 includes a longitudinal axis LA which is defined by the axial centerline of common steam header 41 for convenience of reference. This also defines a corresponding axial direction which may be referred to herein. A vertical centerline Cv of the ACC is defined by the vertical centerline of the steam header which intersects the longitudinal axis LA (see, e.g. FIG. 4). The steam header further defines a horizontal reference plane Ph which intersects the vertical centerline Cv and longitudinal axis LA. The longitudinal axis, vertical centerline, and horizontal reference plane define a convenient reference system for describing various aspect of ACC 40 and their relationship to one another.

Referring generally to FIGS. 2-12, ACC 40 includes a fan platform 45-1 comprising a support frame 45 which supports the fan 50, condensate headers 42, and other appurtenances. The condensate headers 42 in turn support the tube bundles 43 and steam header 41. The fan support frame 45 may comprise a combination of vertical structural columns 46, longitudinal beams 47, and lateral beams 48 spanning between the longitudinal beams in a conventional manner. Columns 46 are arranged to engage a horizontal support surface typically at ground level (e.g. concrete foundation). The fan platform 45-1 comprises fan deck plate 51 which is supported by the beams 47, 48 to provide access to the fan and its ancillaries. The fan deck plate 51 includes a relatively large vertical opening 49 in which fan 50 is mounted. The fan assembly further comprises an annular fan ring 52 supported from the fan deck plate 51, electric motor 53, and gear box 54 coupled to the hub of the fan 50 from which the fan blades 56 project radially outwards as shown. The motor and gear box may be disposed on top of the fan in one non-limiting construction as shown. The fan 50 may be mounted and supported in the fan ring 52 by supporting the gear box 54 from the frame, such as in some arrangements via horizontally extending fan support beams 57 (represented schematically by a dashed line) tied into the support frame and/or fan deck plate 51. Other fan support structural arrangements may of course be used and does not limit the invention. The fan deck plate 51 is elevated above the ground by support frame 45 to allow cooling air to enter the fan 50 from below and be discharged upwards through the tube bundles 43.

Referring to FIGS. 2-5, the peripheral ends of the fan deck plate 51 may support the condensate headers 42, which in turn support the tube bundles 43 and steam header 41 at the vertex between the bundles. The condensate headers 42 are supported from the fan deck plate 51 by a plurality of axially spaced apart saddle supports 60. Supports 60 may be fixedly attached to the fan deck plate 51 and/or longitudinal beams 47 such as via bolting (shown) or other suitable methods (e.g. welding). A horizontal base plate 63 may be provided on each support 60 which is configured for direct attachment to beams 47 in a fixed and rigid manner. The support thus remains stationary and fixed to the ACC support frame 45 irrespective of an thermal expansion of the fluid pressure boundary components. The fan deck plate 51 may be cut out around the saddle supports 60 (shown) or may extend beneath support base plates 63 in other embodiments contemplated.

Figure 5:
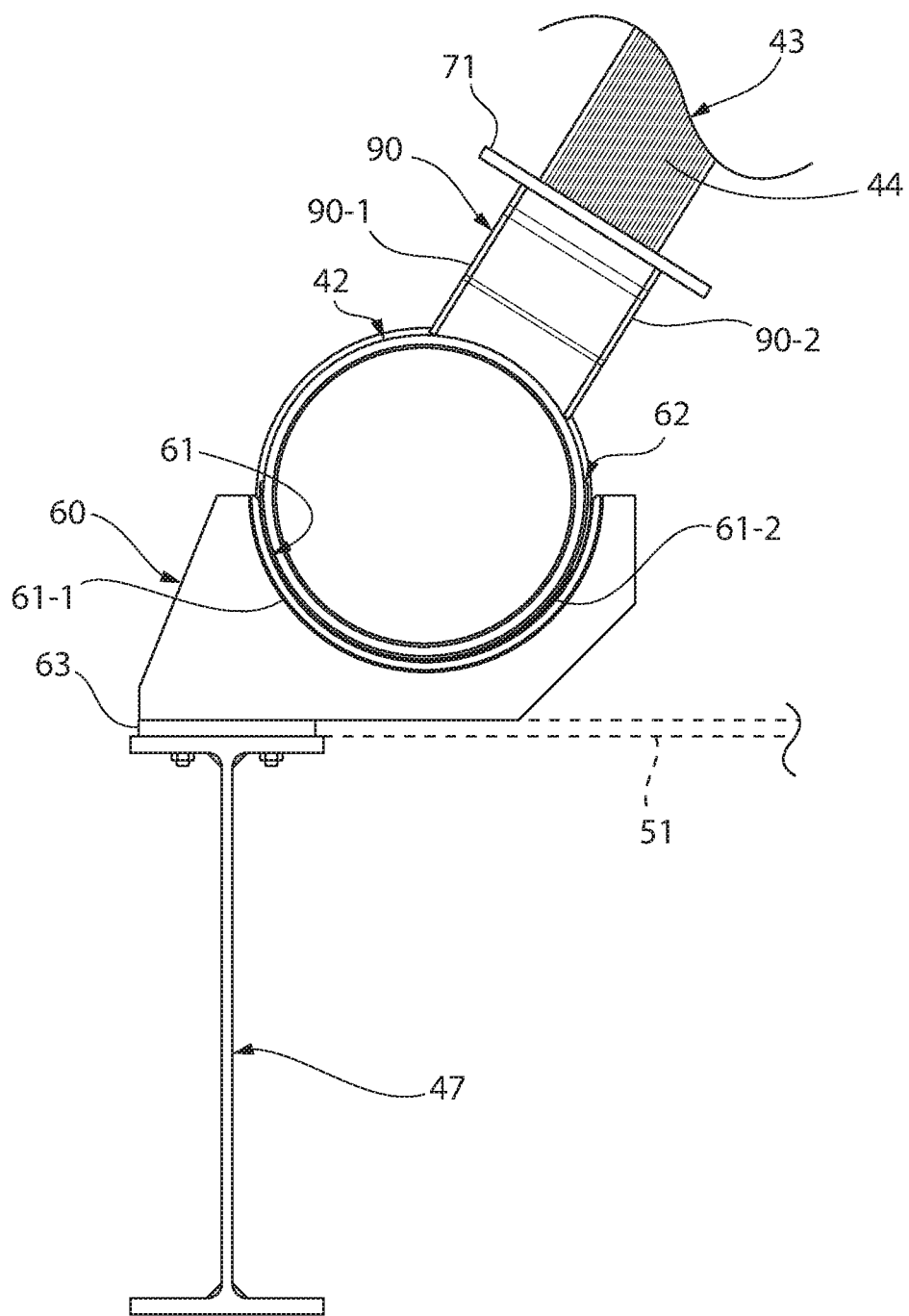
FIG. 5 is an enlarged detail taken from FIG. 4 showing the saddles supports.

Each saddle support 60 includes an upwardly open arcuately curved cradle plate 61-1 defining a concave support surface 61 configured to engage the lower portion of the condensate headers 42 (best shown in FIG. 5). Support surface 61 may be semi-circular in transverse cross section as shown having a complementary configuration to and diameter just slightly larger than the circular condensate headers 42 to produce conformal contact with the header when positioned thereon. The condensate headers 42 are not fixedly attached to the support saddles 60 or any other supports in one embodiment. This supports the condensate headers 42 (and weight of the tube bundles 43 and steam header 41) vertically, but the condensate headers are otherwise longitudinally unrestrained on the curved saddle supports. This arrangement advantageously allows the condensate headers (and tube bundles and steam header) to advantageously grow or contract in the longitudinal direction by sliding on the saddle supports 60 without developing stresses from restraint of thermal expansion or contraction which may induce thermal stress cracking. The headers 42 thus are slideable in the longitudinal direction in relation to the saddle supports.

In one embodiment, the curved support surface 61 may include an anti-friction coating 61-2 such as Teflon® or similar material to allow for smooth sliding engagement at the interface between the condensate headers 42 and saddle supports 60. In one embodiment, an arcuately curved and semi-circular wear plate 62 may be rigidly attached to the bottom half of the headers 42 to facilitate engagement with the saddle support surface 61 and prevent direct wear on the outer pressure boundary of the header. The wear plate 62 may be made of a suitable metal preferably welded to the headers 42, such as stainless steel in one embodiment. Other suitable metals for this application may be used.

Preferably, the saddle supports 60 are configured and constructed to be structurally robust enough to support the entire weight of the condensate headers 42, tube bundles 43 and steam header 41 without reliance upon any direct attachment to or direct support of the tube bundles 43 from the fan support frame 45 or other structural members tied into the support frame unlike prior A-frame ACC designs described in the Background. by contrast, tube bundles in these prior designs are affixed to and directly supported by the structural A-frame. In the present design, the weight of the tube bundles 43 may thus be supported only by the condensate headers 42, which in turn are supported by the saddle supports 60 affixed to the fan support frame 45. Because of the stiffness of the panels of rectangular tubes 44 and the robust saddle supports 60 which allow longitudinal expansion/contraction of the condensate headers 42, the A-shaped geometry of the tube bundles 43 is sufficiently self-supporting and rigid to meet the governing structural requirements (snow, wind & earthquake) at most installation sites. However, in certain installation sites subject to extreme weather-related or seismic conditions, braces and/or guy wires, frequently used to strengthen tall columns against winds and earthquakes, may be used to suitably brace the A-shaped tube bundles if necessary.

The fluid pressure boundary components of ACC 40 will now be further described with general reference to FIGS. 2-12. These components generally include the longitudinally-extending common steam header 41 at top, pair of longitudinally-extending condensate headers 42 at bottom, and tube bundles 43 each extending at an acute angle to vertical centerline Cv of ACC 40 between the steam header and a respective one of the condensate headers. Each tube bundle 43 defines a tube bundle axis Ta (see, e.g. FIG. 6). In the triangular or A-shaped arrangement of the tube bundles 43, the tube bundle axis TA of a first tube bundle on one side of ACC 40 is arranged angularly at an acute angle A1 to the tube bundle axis TA of the second tube bundle. In one embodiment, angle A1 may be between 0 and 90 degrees, and in one representative non-limiting example may be about 60 degrees. Other angles may be used. The tube bundles 43 converge towards each other but the upper tubesheets 70 do not meet. The tube bundle axes TA intersect at a vertex V which is located inside the steam header 41 proximate to the bottom opening 84 of the header in one embodiment (see, e.g. FIG. 6). The tube converging tube bundles form the A-shaped tube bundle configuration.

The tube bundles 43 in one embodiment may be shop-manufactured straight and generally planar/flat tube bundles each comprised of closely spaced apart parallel tubes 44 aligned in a single linear row and arranged in a single plane. Tubes 44 may have an obround or rectangular cross section (see, e.g. FIGS. 8 and 9). Each straight tube is fluidly connected at opposite ends to and supported by an upper tubesheet 70 and lower tubesheet 71. The tubesheets 70, 71 contain a plurality of tube holes or penetrations 1070A for allowing steam or condensate to flow into and out of the tubes 44 on the open interior tube side of the tubes which define flow passageways. The tube ends may fixedly coupled to the tubesheets in a leak-proof manner by being seal welded, brazed, or expanded (e.g. hydraulically or explosively) to the tubesheets to form fluidly sealed connections. The tubesheets 70, 71 may flat in one embodiment and formed of straight metallic plates.

Figures 8, 9:
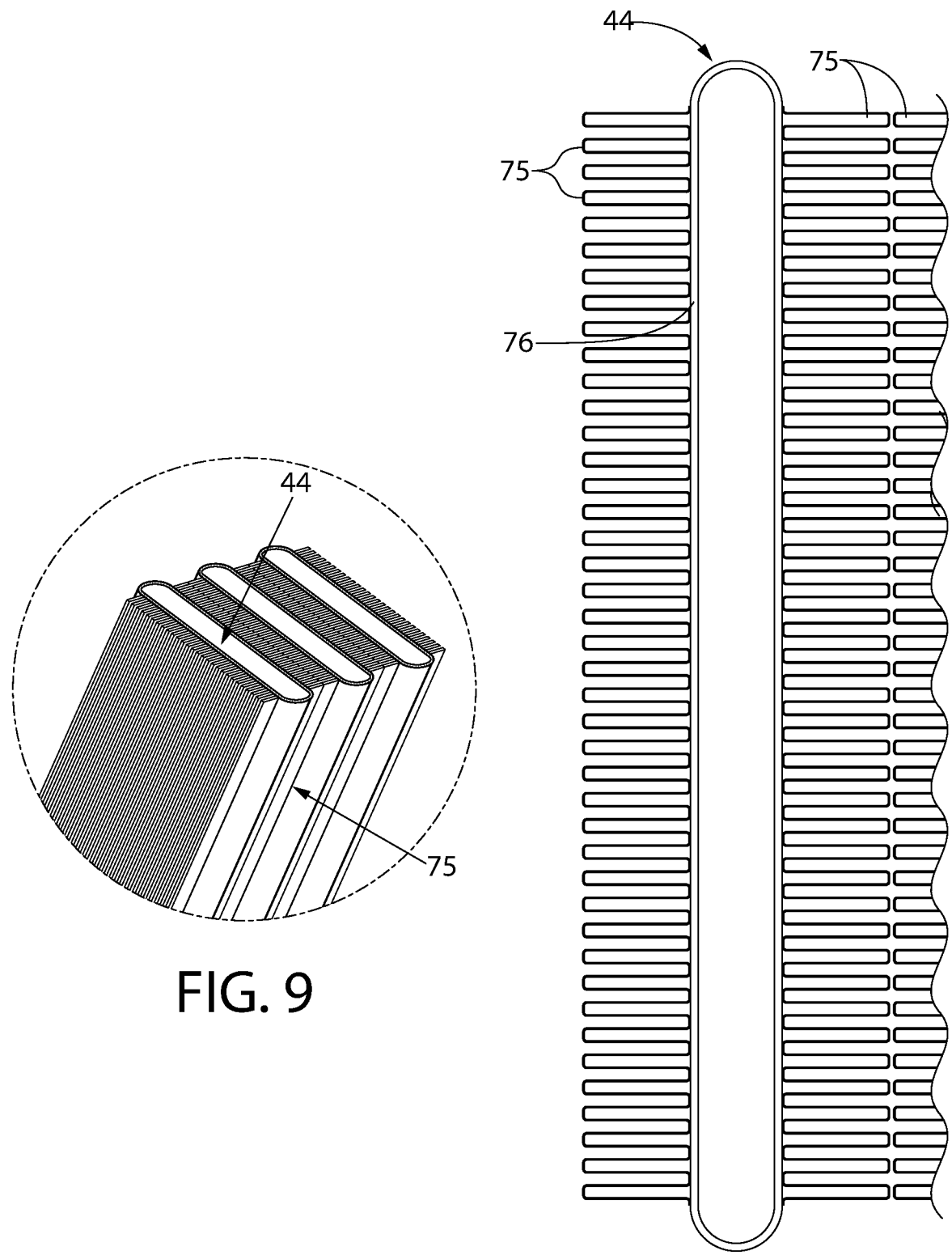
FIG. 8 is a side cross-sectional view of a finned tube of a tube bundle.
FIG. 9 is a perspective view of the ends of some tubes before sealably joined to an upper tubesheet.
Figure 10:
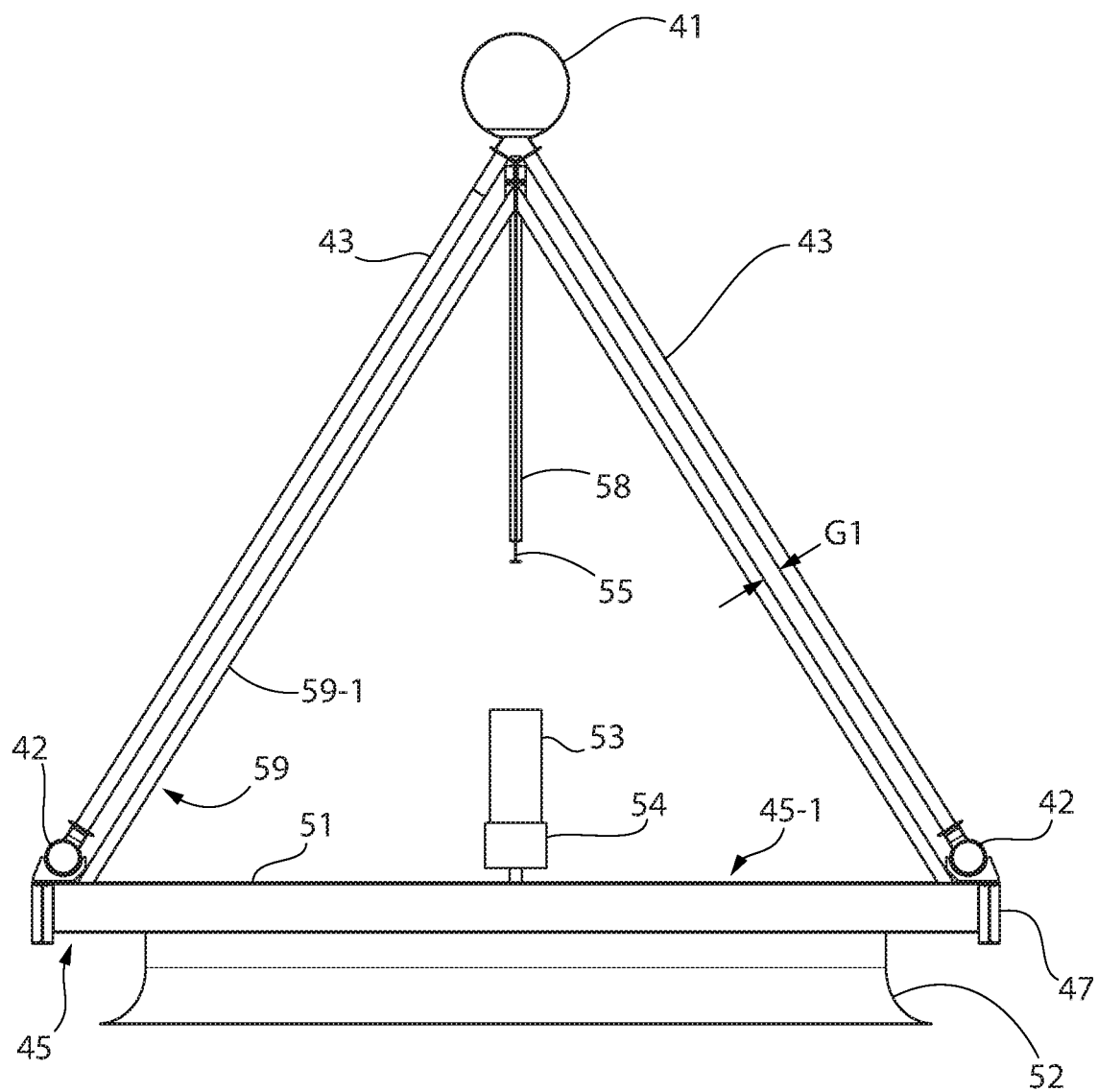
FIG. 10 is an end view of the ACC of FIG. 2.
Figure 11:
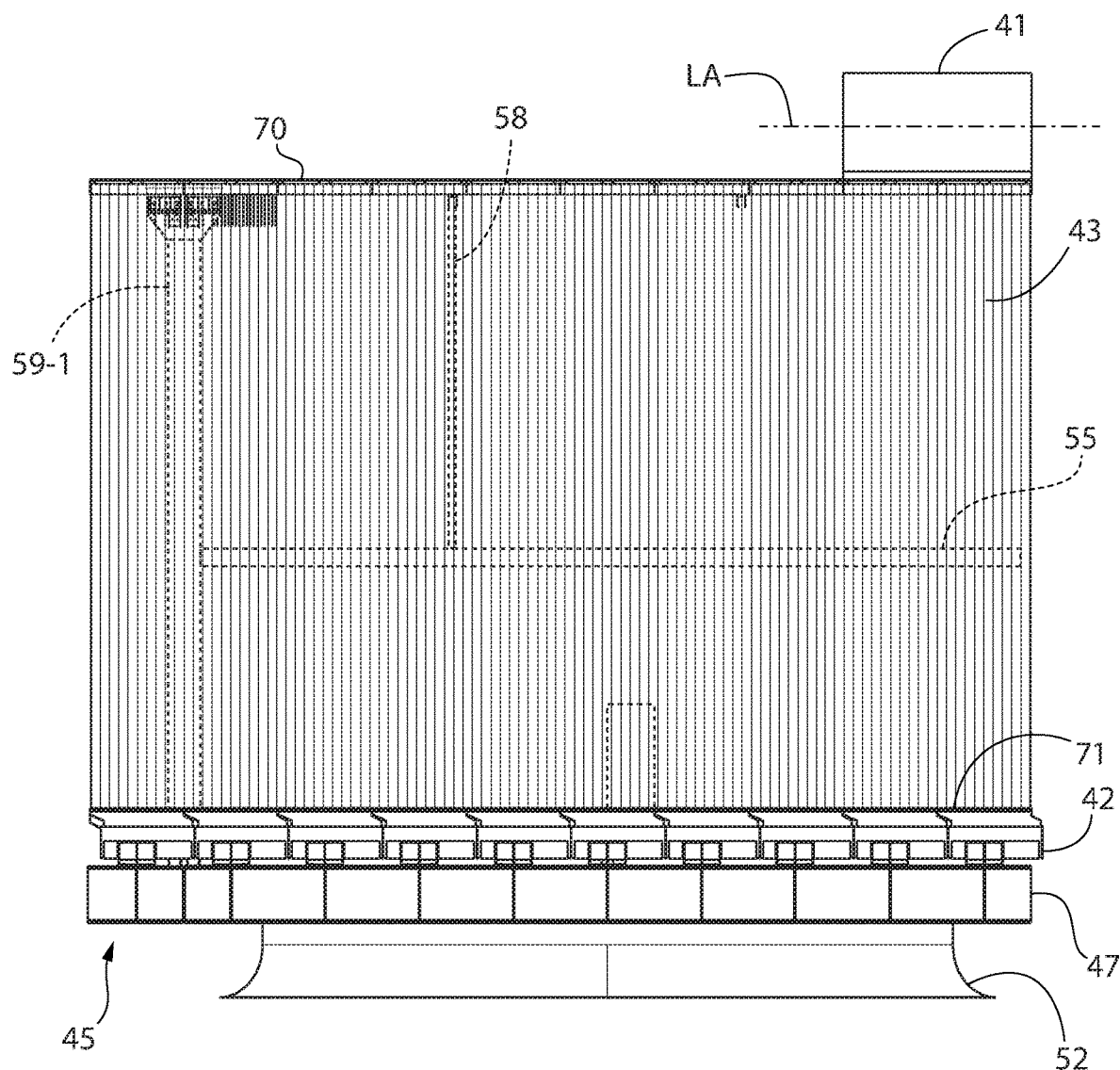
FIG. 11 is a side view of the ACC.
Figure 12:
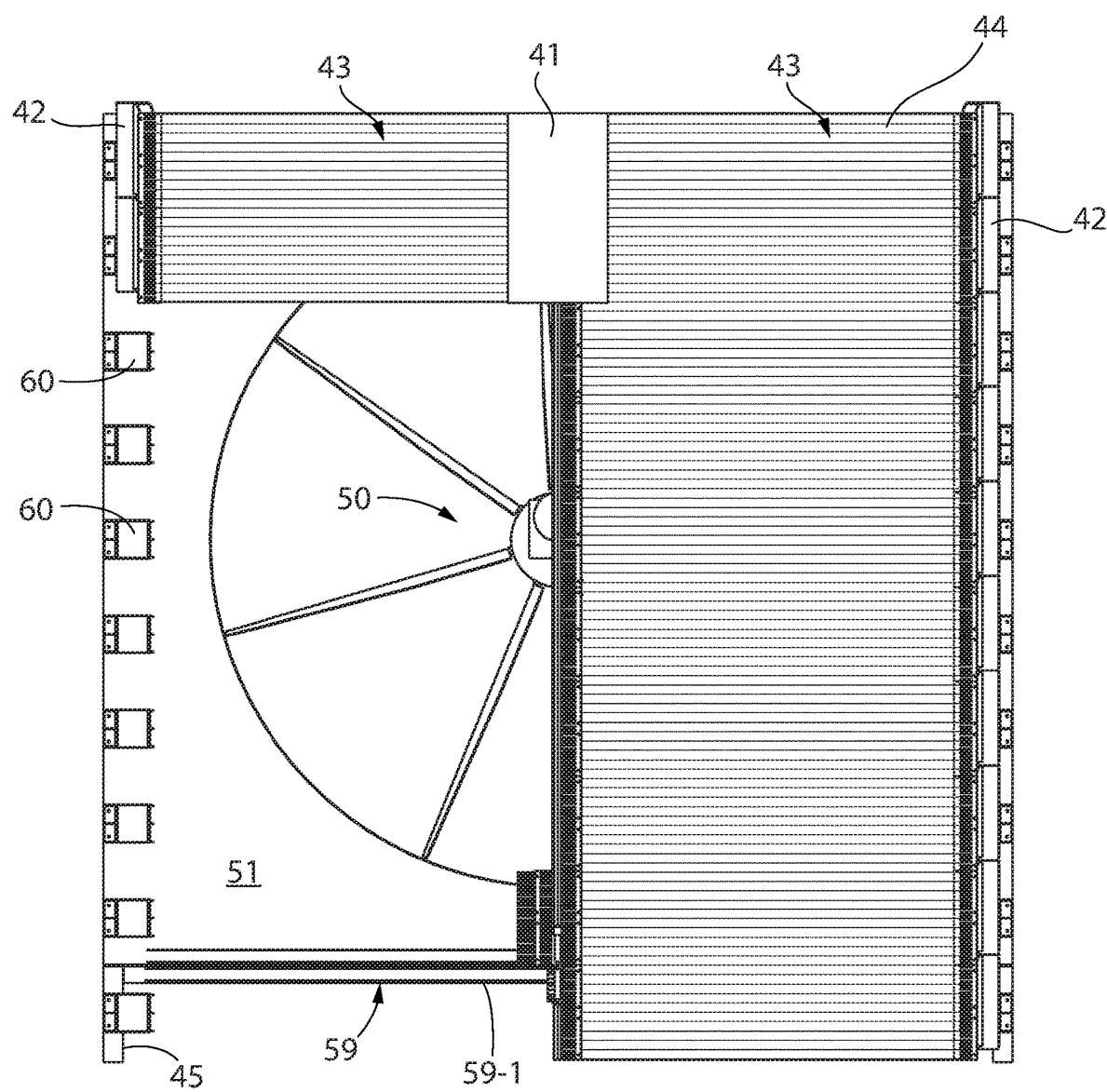
FIG. 12 is a top view of the ACC.
Figure 13:
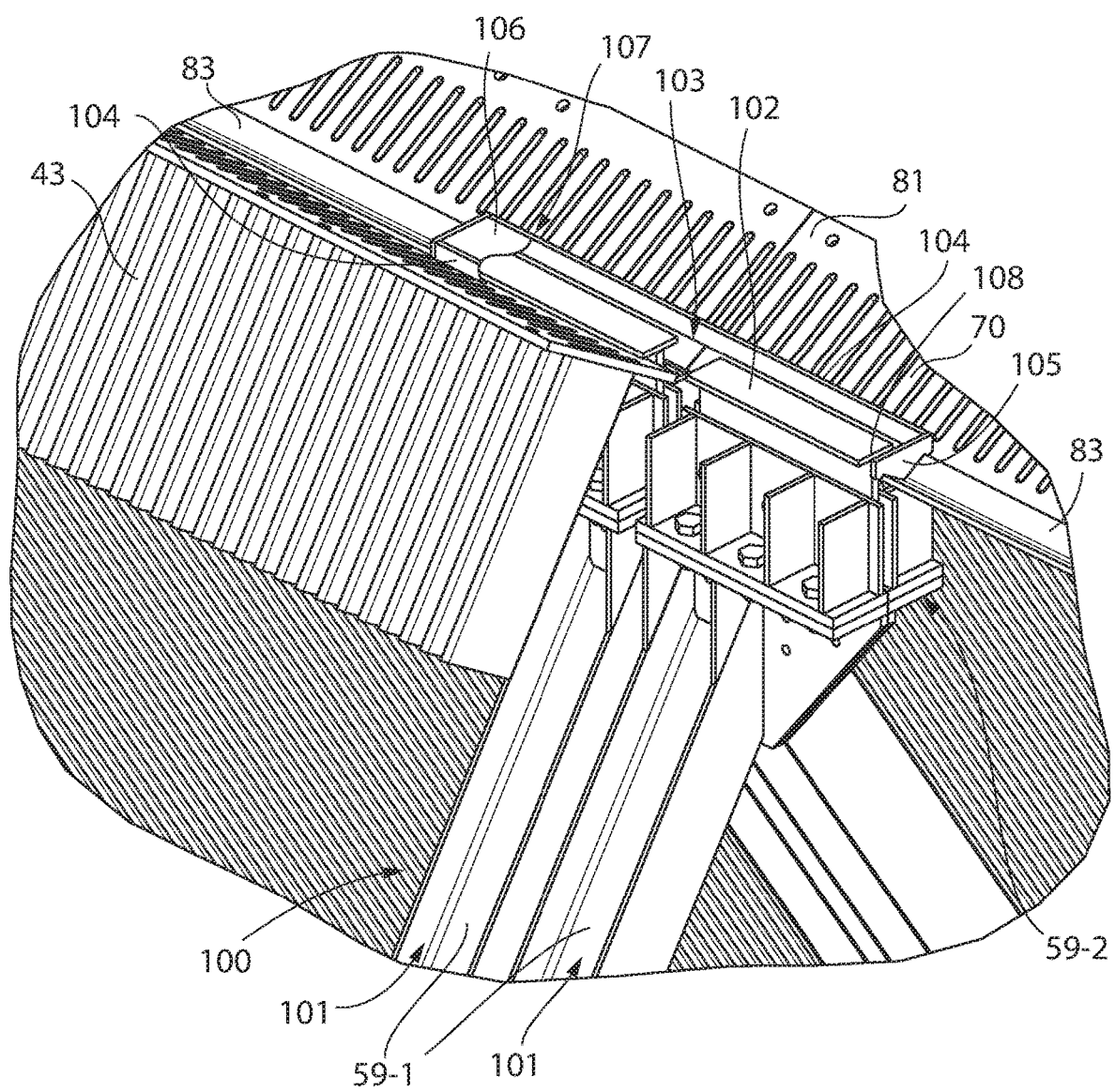
FIG. 13 is a perspective view of the tube bundle upper tubesheets area with steam flow plenum removed to better show a thermal expansion restraint system and upper coupling portion of a thermal restraint unit.
Figure 14:
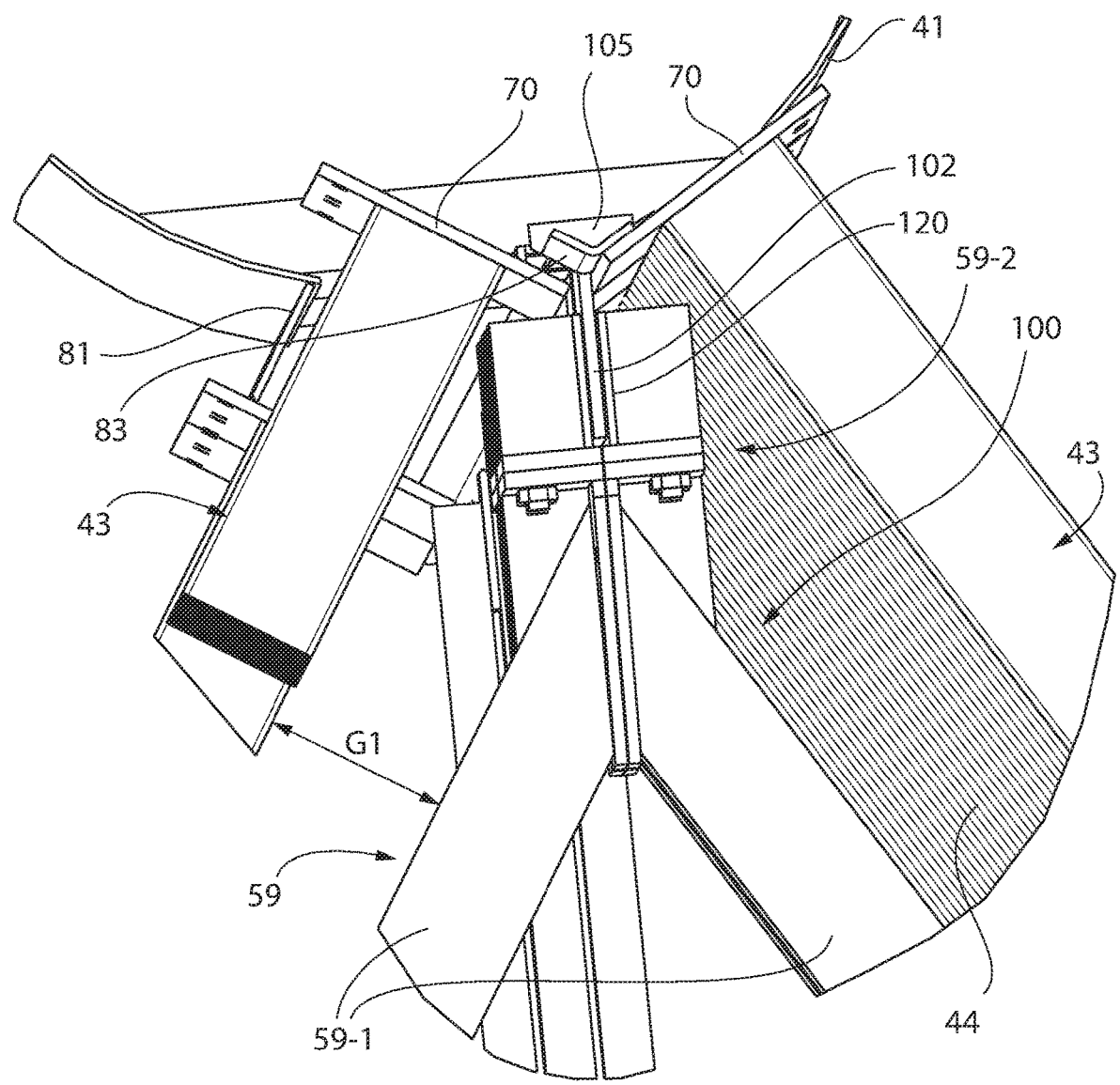
FIG. 14 is an end perspective view thereof.
Figure 15:
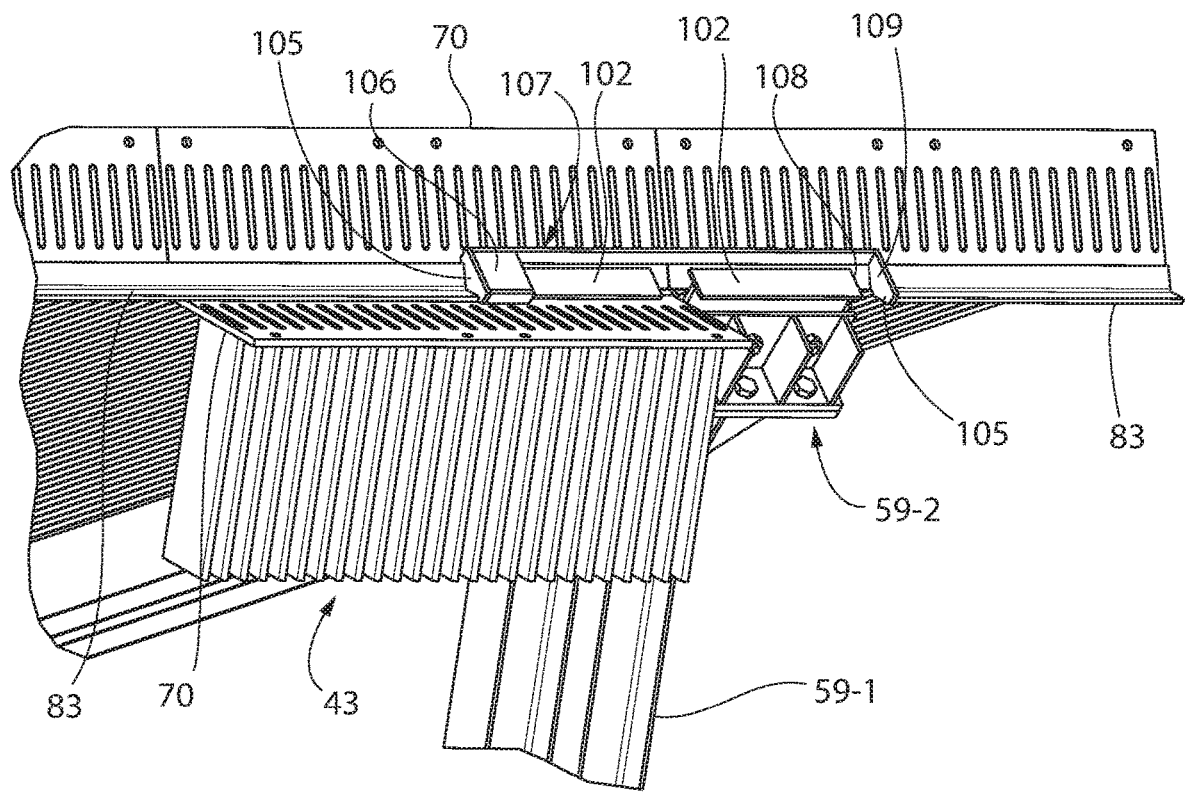
FIG. 15 is a top perspective view thereof.
Figure 16:
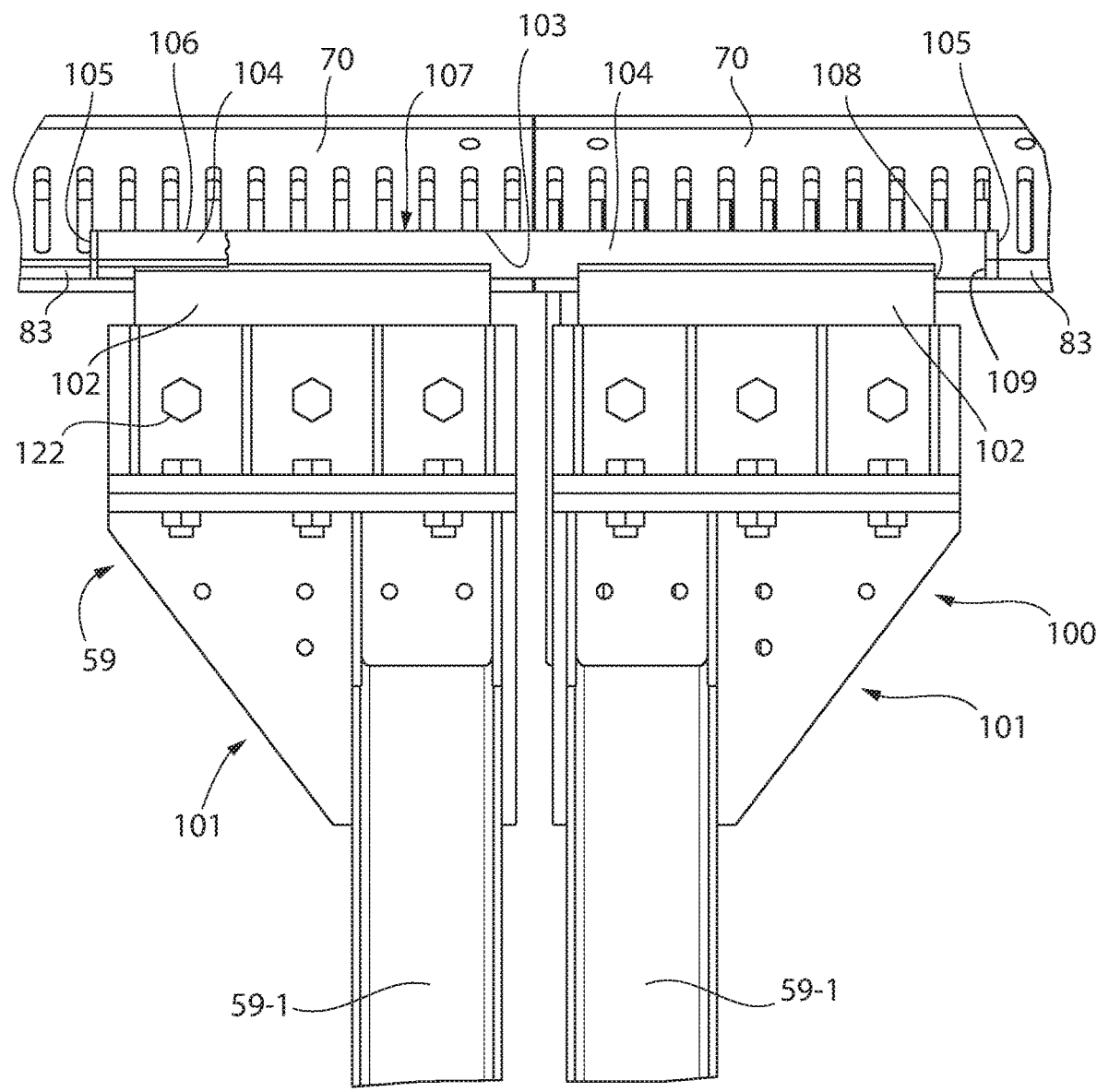
FIG. 16 is a side view thereof.
Figure 17:
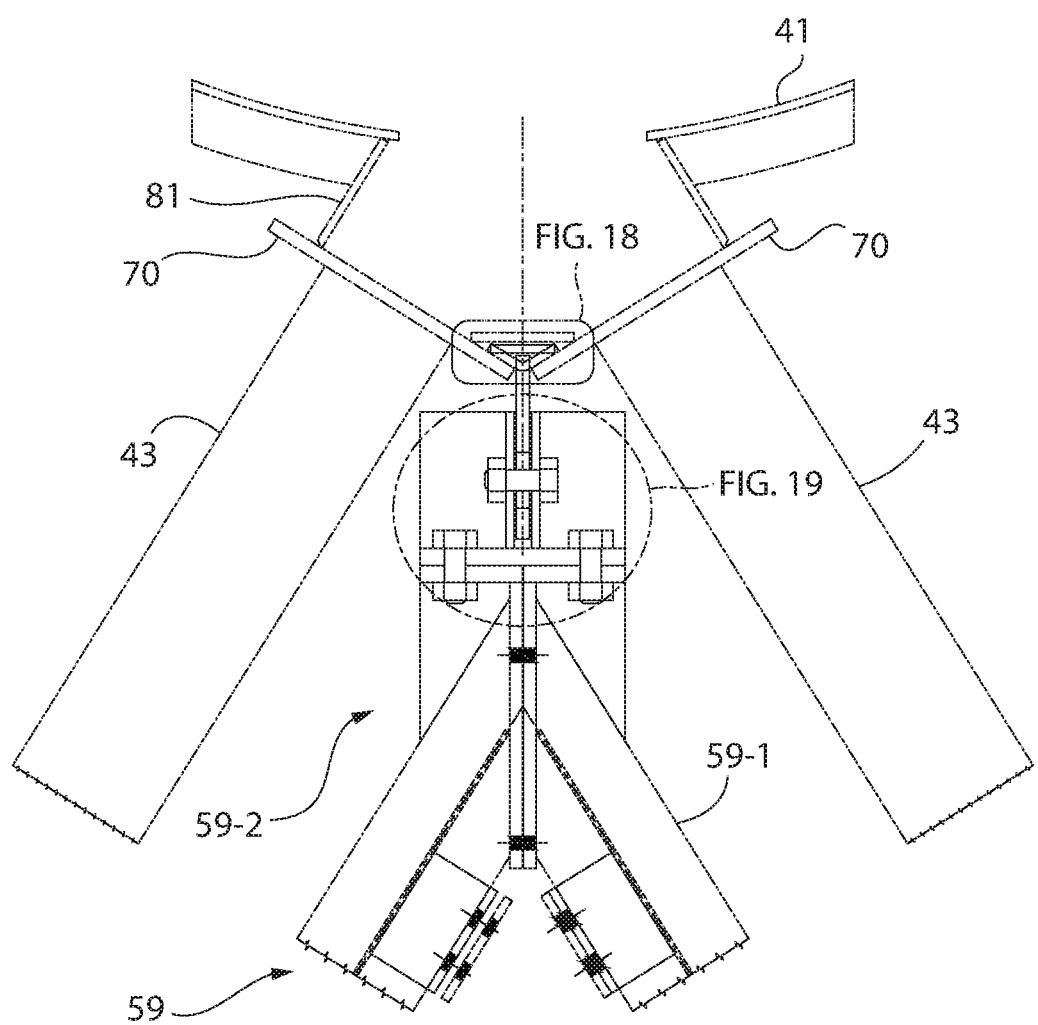
FIG. 17 is an end view of the coupling portion of the thermal restraint unit showing the sliding expansion joint assembly.
Figure 18:
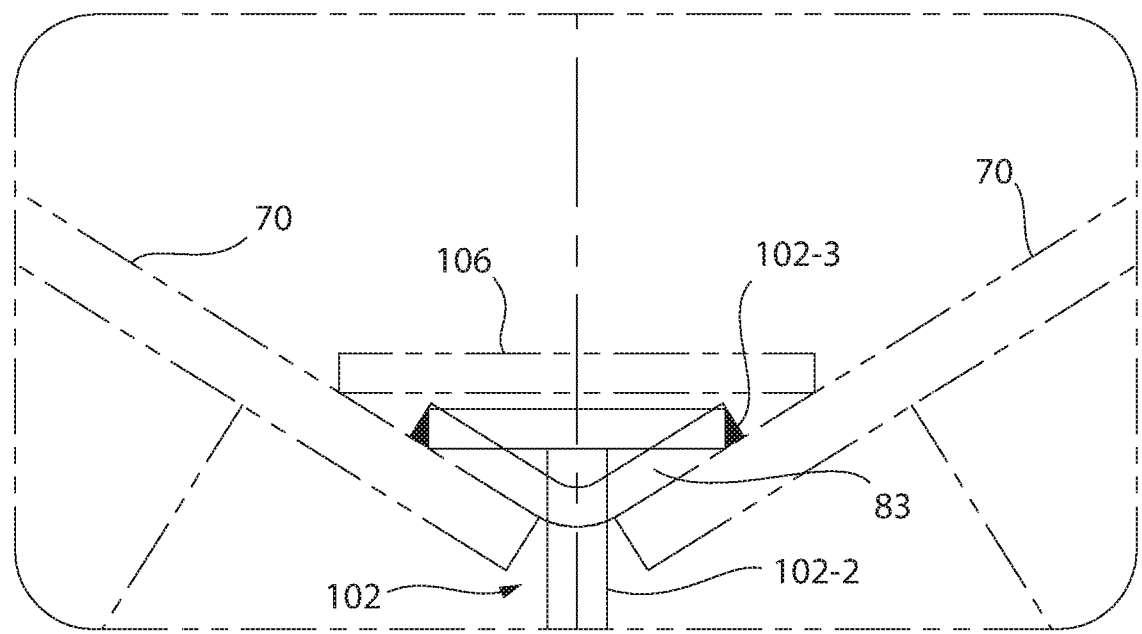
FIG. 18 is an enlarged detail taken from FIG. 17.
Figure 19:
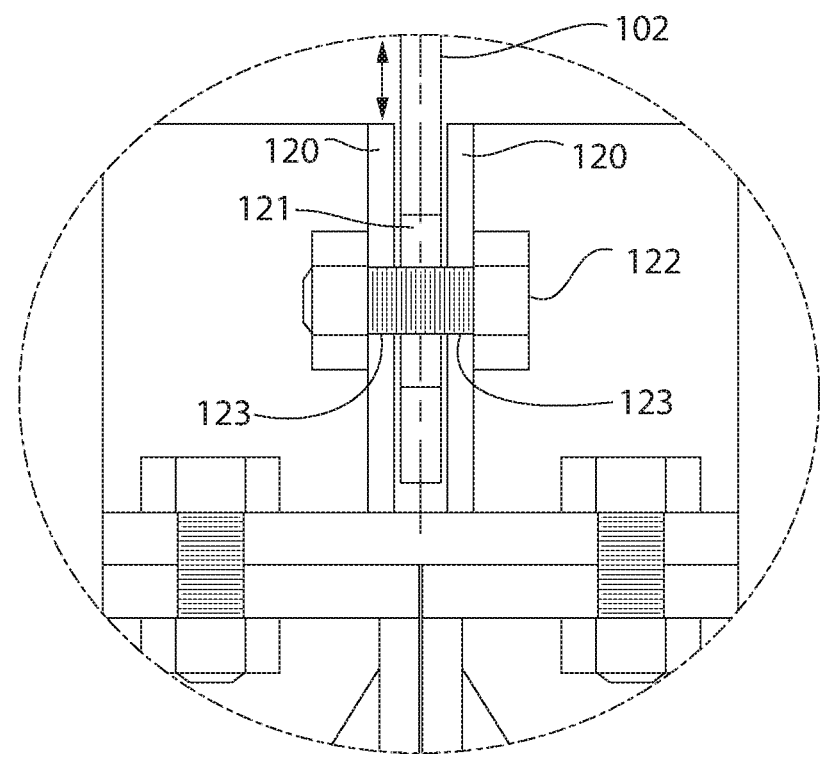
FIG. 19 is another enlarged detail taken from FIG. 17.
Figure 20:
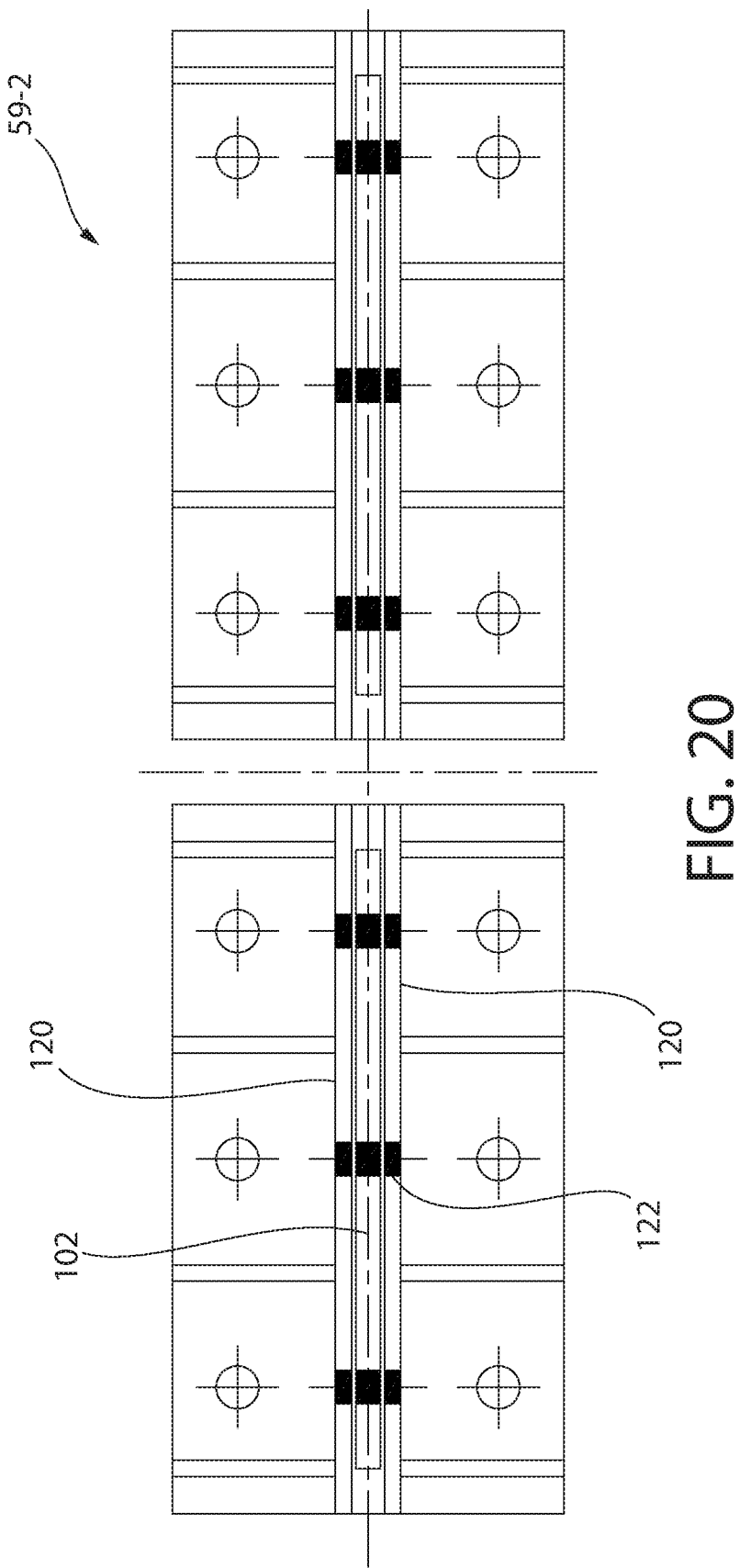
FIG. 20 is a top view of the sliding expansion joint assembly of FIG. 17.
Figure 21:
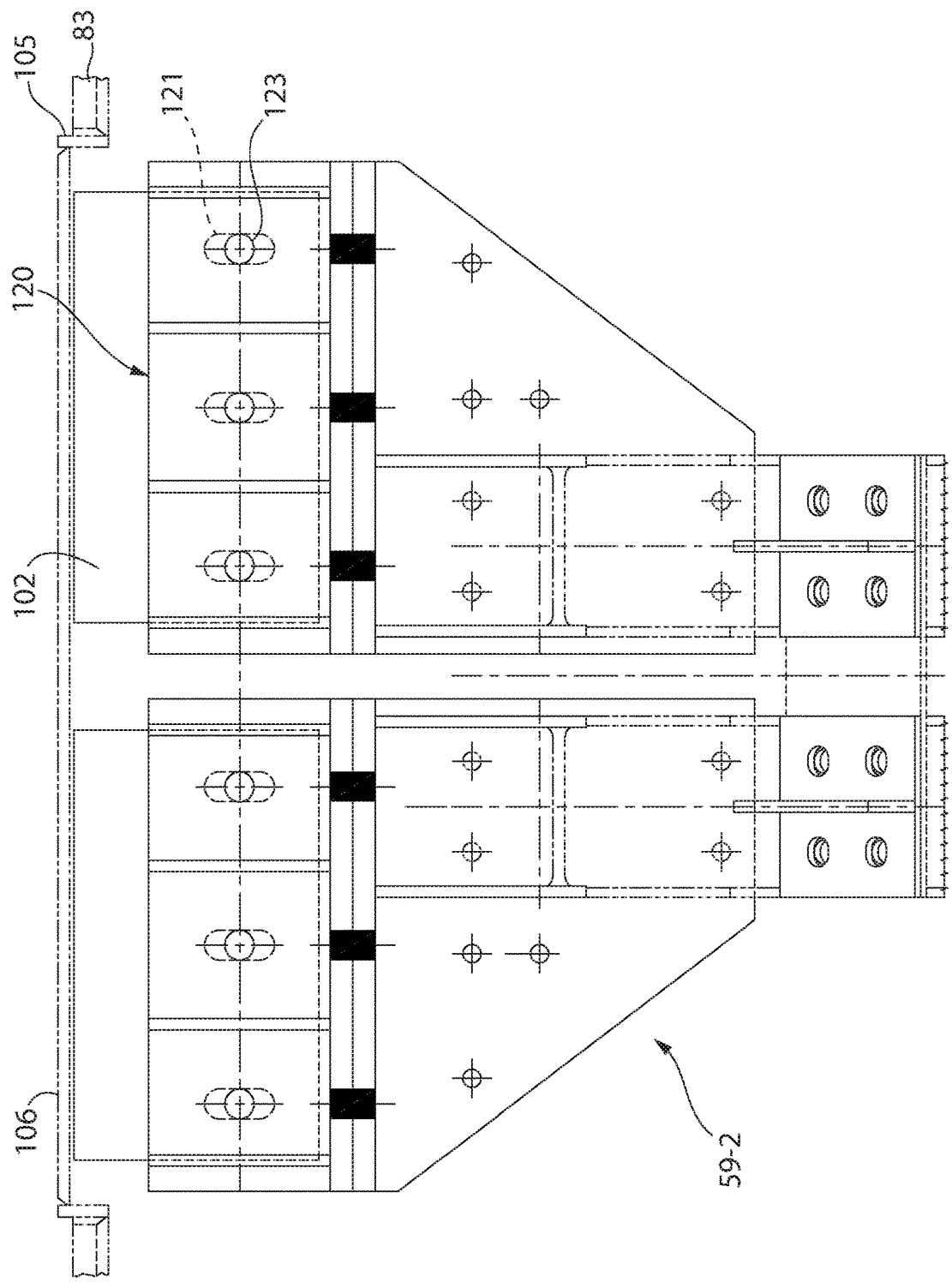
FIG. 21 is a side view thereof.

In one embodiment, the tubes 44 may include heat transfer fins 75 attached to opposing flat sides 76 of the tubes and projecting perpendicularly outwards therefrom in opposing directions, as shown in FIGS. 8 and 9. When the tube bundles 43 are assembled, the fins of one tube 44 preferably are very closely spaced in relation to the fins of an adjoining tube to ensure cooling airflow generated by fan 50 through the tube bundle comes into maximum surface contact with the fins for optimum heat exchange and steam condensing. In other implementations, the tubes may be finless.

Referring generally to FIGS. 2-12, each tube bundle 43 is fluidly coupled to a longitudinally-extending steam flow plenum 80 at top and a respective longitudinally-extending condensate flow plenum 90 at bottom. The steam and condensate flow plenums each forms a transition from the flat upper and lower tubesheets 70, 71 to the arcuately curved sidewalls of the steam and condensate headers 41, 42.

Condensate flow plenum 90 may be generally a rectilinear box-like structure in one embodiment arranged to fluidly couple each tube bundle 43 to a respective condensate header 42 (see, e.g. FIGS. 2-5) on each side of ACC 40. The lower tubesheets 71 are sealably attached or joined (e.g. seal welded) to the condensate flow plenums 90, and form an integral top end portion of the flow plenums 90. Each tube 44 is in fluid communication with the condensate flow plenum interior volume. The bottom end portion of flow plenums 90 penetrate are sealably joined (e.g. seal welded) to condensate headers 42 forming a fluid passageway between the tube bundles and condensate headers. The four sidewalls of the condensate flow plenums are solid and closed to complete the pressure retention boundary of the condensate flow plenums 90. The opposing front and rear lateral sidewalls 90-1, 90-2 may be flat and parallel to each other. In one embodiment best seen in FIG. 3, the top ends of each condensate flow plenum 90 may be laterally offset from the bottom end. Accordingly, the zig-zag shape of the flow plenums 90 (e.g. lateral sidewalls 90-3) create laterally open recesses between the plenums which allow one plenum 90 to at least partially nest within the adjacent condensate flow plenum 90 to facilitate assembling the tube bundles 43 in the field.

Figure 4:
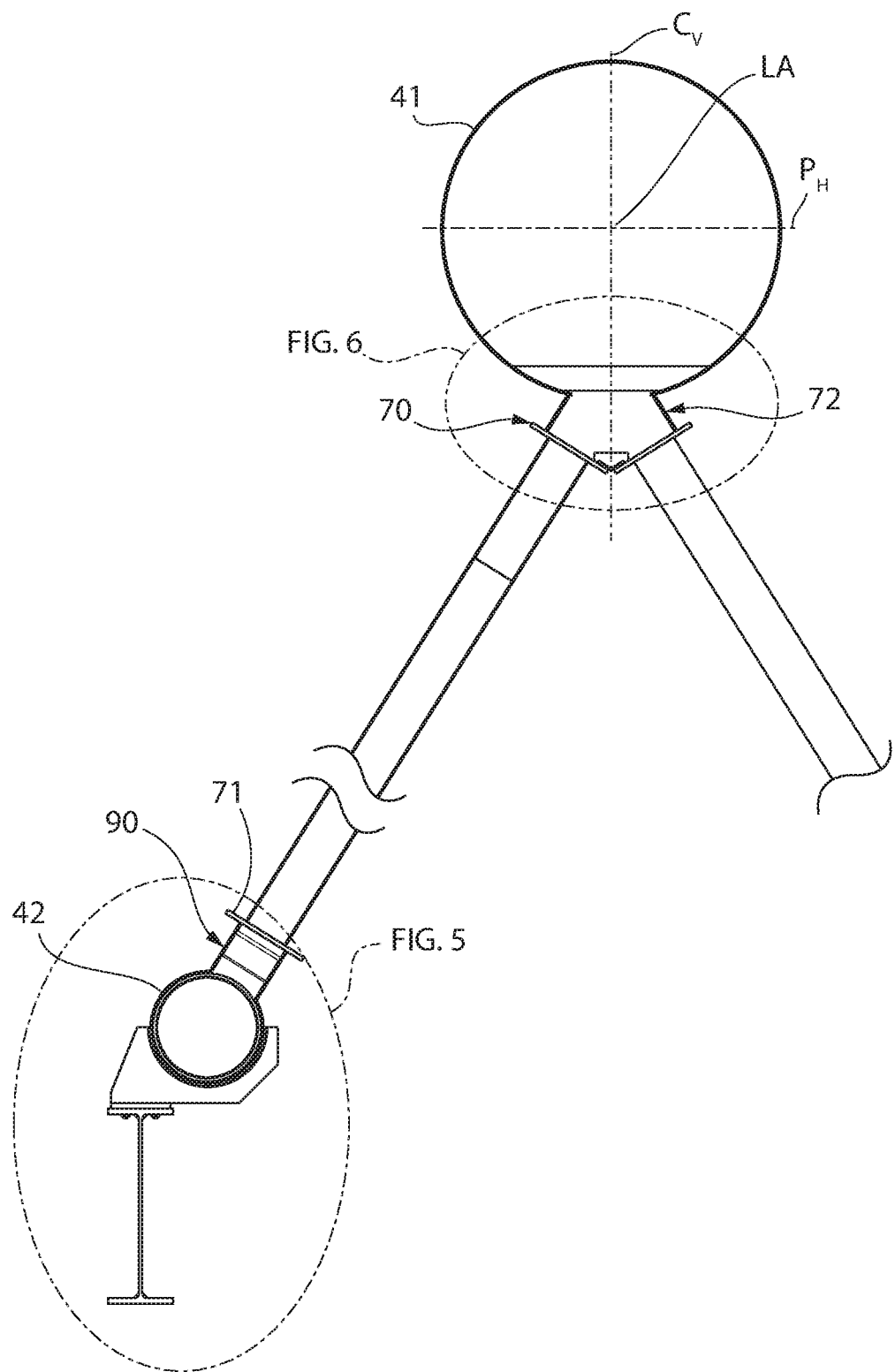
FIG. 4 is a partial end view of the ACC showing the steam and condensate header arrangement.
Figure 6:
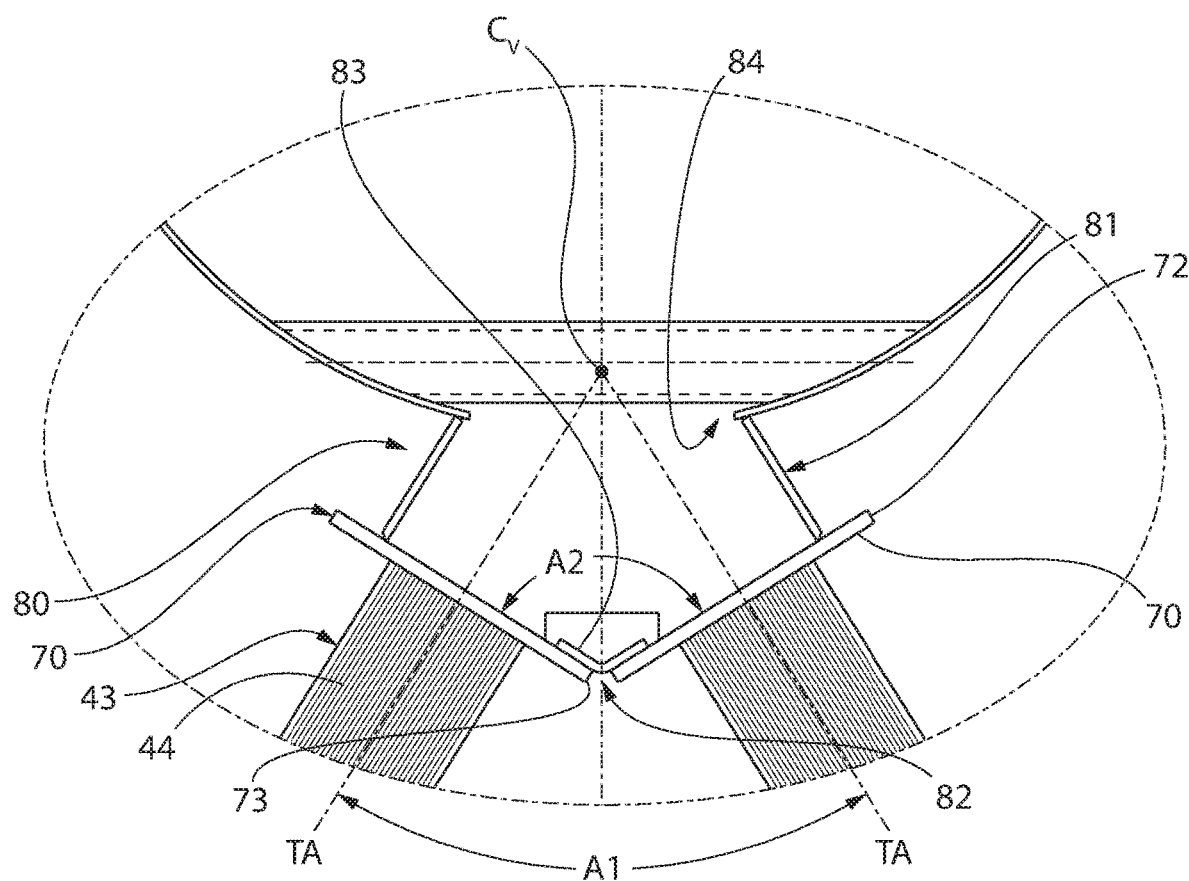
FIG. 6 is an enlarged detail taken from FIG. 4 showing the steam header and its associated plenum.
Figure 7:
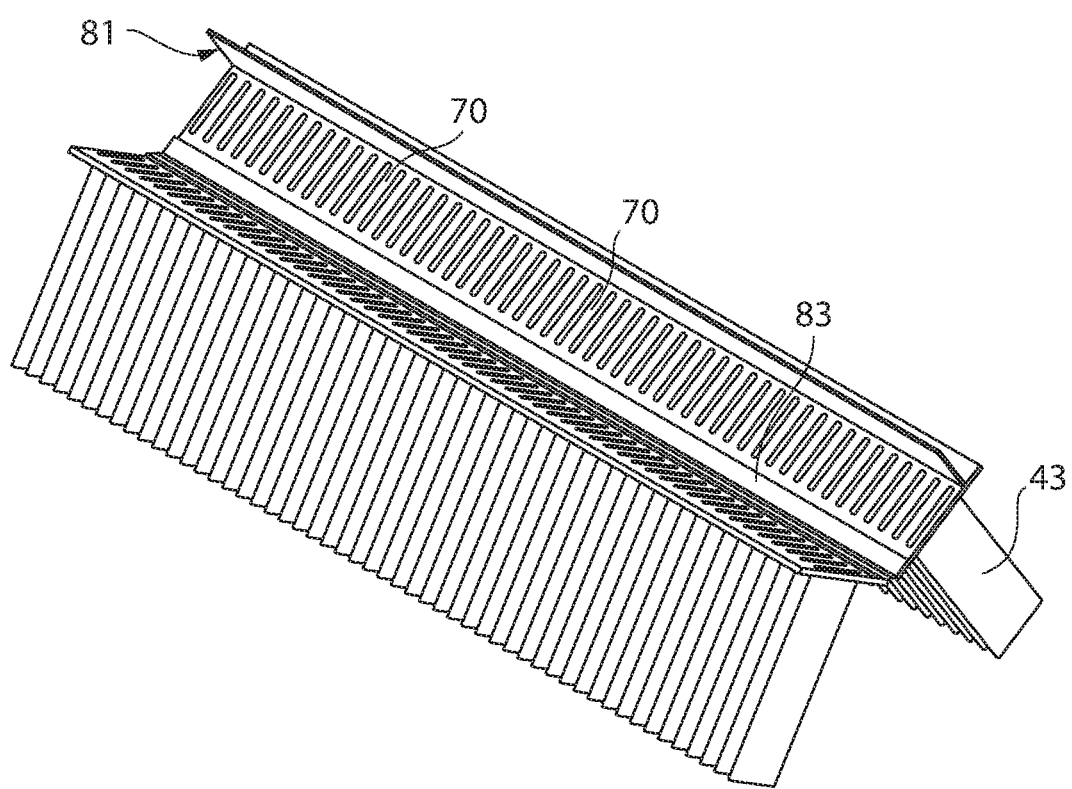
FIG. 7 is a perspective view of the upper portion of the tube bundles showing the upper tubesheet arrangement between the pair of the acutely angled tube bundles and seal plate therebetween.

Referring to FIGS. 2, 4, and 6, steam flow plenum 80 may be a generally rectilinear box-like configuration in one embodiment as illustrated. Plenum 80 is arranged to fluidly couple each tube bundle 43 to the steam header 41. The steam flow plenum comprises an opposing pair of longitudinally-extending side skirt plates 81 seal welded to the steam header 41. Skirt plates 81 extend downwards from the steam header. In one configuration, skirt plates 81 may each be disposed at an acute angle to the vertical centerline Cv of the ACC defined by centerline of the steam header 41. In other possible configurations, the skirt plates 81 may instead be oriented parallel to centerline Cv. The upper tubesheets 70 of each tube bundle are each sealably attached or joined to one of the skirt plates 81 such as via seal welding, thereby forming a longitudinally-extending integral and angled bottom wall at the bottom end of the fluidly sealed steam flow plenum. Each tube 44 is in fluid communication with the steam flow plenum interior volume. The top end portion of flow plenum 80 penetrates and is sealably joined or welded to steam header 41 forming a fluid passageway between the tube bundles and header for introducing steam into the tubes 44.

In one embodiment, steam flow plenum 80 may be a pentagon-shaped in transverse cross section as best shown in FIG. 6. Each upper tubesheet 70 is acutely angled to each other at angle A2 (previously described herein) to define a V-shaped bottom wall of the flow plenum 80. Skirt plates 81 are be oriented perpendicularly to each of their respective tubesheet 70 to which they are seal welded to form the pressure retention boundary. The skirt plates 81 may be attached to each upper tubesheet 70 proximate to the outboard longitudinal edges 72 of the tubesheets.

A longitudinally-extending bottom opening 84 in steam header 41 allows steam entering the header to turn and flow downwards through the opening into the plenum 80. Bottom opening may be continuous along the length of the header 41 or be comprised of intermittent openings spaced axially apart on the bottom of the header.

The inner longitudinal edges 73 of the upper tubesheets 71 may be spaced apart forming a longitudinally-extending open joint 82 between the adjacent tubesheets. In one embodiment, the joint is closed and fluidly sealed by a hinged flexible coupling comprising a resiliently deformable curved or angled metallic seal plate 83 which extends longitudinally along the tubesheets. The angled seal plate 83 has a resiliently flexible monolithic metal body with an elastic memory which provides limited deformation capabilities thus allowing for some degree of transverse expansion/contraction and vertical growth/contraction of the tube bundles 43. The seal plate fluidly and hermetically seals the open joint 82 between the two upper tubesheets 70. Accordingly, seal plate 83 includes opposing and parallel longitudinal edges each of which are sealed welded to one of the upper tubesheets to form a fluidly sealed interface with the steam plenum 80, thereby closing the plenum. Seal plate 83 is a continuous structure having a length coextensive with the longitudinal lengths of the upper tubesheets 70 and joint 82 therebetween to fluidly seal the steam flow plenum 80 at the bottom between the tubesheets. In one embodiment, the seal plate may be a metal structural angle having an obtusely angled configuration in transverse cross section (best shown in FIG. 6). The bottom peripheral edge surface of the seal plate abuts and rests flatly on the tubesheets 70 as shown. The two angled sides of the seal plate are disposed at the same angle A2 to each other as formed between the two tubesheets 70.

Each of the steam and condensate headers 41, 42 may be formed from discrete sections of preferably circular piping for hoop stress resistance in one embodiment having adjoining ends which are abutted together at joints 91. The steam header will be larger than either of the condensate headers. The bottom condensate and the steam headers 42, 41 may be oriented parallel to each other in the illustrated embodiment. The condensate headers 42 in one configuration may be laterally spaced apart on opposite sides of ACC 40.

Each pair of condensate header 42 sections with associate condensate flow plenum 90, steam header section 41 with associated steam flow plenum 80, a first tube bundle 43, and an opposing second tube bundle 43 forming an A-shaped tube bundle structure may be considered to be a discrete cooling cell for condensing steam which may be shop fabricated to allow for tight control of tolerances and fit-up. This construction forms a self-supporting tube bundle structure. The cooling cells may be arrayed and fluidly interconnected in a series forming a linear row of cooling cells. Multiple parallel, perpendicular, or other arrangements of cooling cells may be provided to achieve the required heat transfer surface area of tubes necessary for the cooling duty of the ACC. The joints 91 between headers 41, 42 of adjoining cooling cells are fluidly and sealably coupled together to form contiguous header flow passageways between cells for both steam and condensate flow. The ends of the headers may be coupled together at joints 91 therebetween by any suitable means such as bolted piping flanges, welded piping connections, or combinations thereof. In one embodiment, bolted and gasketed flanges may be used to minimize piping field welds.

In operation on the pressure boundary side of the ACC, steam enters the steam header 41 from the turbine exhaust flowing in a longitudinal direction along axis LA within the header. The steam may enter on end of the contiguous steam header formed from the multiple cooling cells fluidly coupled together at by the steam and condensate headers. The steam cascades along the steam header 41 and flows downwards into the steam flow plenum 80 beneath the header. From the plenum 80, the steam then enters to open top end of each tube 44 in each opposing pair of first and second tube bundles 43 in each cooling cell. The steam condenses and transitions from the vaporous water state to the liquid state ("condensate") as it progressively flows downward inside the tubes. The condensing steam actually may create a partial vacuum region within the tubes, which helps draw steam into the tubes. The heat liberated from the steam is rejected to ambient cooling air blown through the tube bundles 43 by fan 50, which forms the heat sink. The condensate flows into the condensate flow plenums 90 exiting the open bottom ends of the tubes in each bundle. The condensate is collected from the plenums 90 by the condensate headers 42 at the bottom and flows back to the Rankine cycle flow loop 20 previously described herein with respect to FIG. 1.

In one aspect of the invention, a thermal expansion lock or restraint system 100 is provided which both: (1) limits the longitudinal/horizontal growth of the steam header 41 (and in turn associated angularly opposed upper tubesheets 70 and steam flow plenum 80); and (2) limits the vertical growth of the tube bundles 43. The restraint system thus provides a fixed point or expansion stop in the support structure for the pressure retaining components which is referred to herein as a dual purpose "Lock Point" design. The Lock Point design thus limits longitudinal movement or growth of the steam header initially at ambient temperatures in the direction of and parallel to longitudinal axis LA due to thermal expansion when heated by the inflow of higher temperature turbine exhaust steam. The Lock Point design further limits the vertical growth and movement of the tube bundles 43 under thermal expansion when initially heated by the steam flow. The thermal expansion restraint system is designed to allow a controlled degree of growth in the longitudinal direction and vertical direction, then stops the growth at stress levels in the component materials which will avoid cracking or mechanical failure.

In one embodiment, with reference to FIGS. 2, 10, and 13-20, the thermal expansion restraint system 100 with Lock Point design may comprise one or more thermal restraint units 101 each comprising a standalone structural A-frame 59 comprising mating pairs of angled beams 59-1. Beams 59-1 may be I-beams which extend from the vicinity of the upper tubesheets 70/steam flow plenum 80 down to the fan platform 45-1. The angled beams 59-1 may be rigidly and fixedly mounted at bottom to the fan platform 45-1 (e.g. deck plate 51 and/or longitudinal beams 47) via welded and/or bolted connections. The angled beams 59-1 are laterally spaced apart from the tube bundles and may be oriented generally parallel thereto in one embodiment (recognizing slight field installation tolerances).

At top, the beams 59-1 may be coupled together by a structural coupling assembly 59-2 defining an apex of the thermal restraint unit 101. The coupling assembly 59-2 may comprise a plurality of plates, stiffener plates, and gusset plates as shown welded and/or bolted together in a suitable configuration which rigidly secures the top ends of the beams 59-1 to the coupling assembly via bolted and/or welded connections. Any suitable arrangement of the structural elements in the coupling assembly 59-2 may be used to structurally lock and tie the angled beams 59-1 together in a manner which will resist a bending moment in the thermal restraint unit 101 created by the longitudinal growth of the steam header 41. The steam header generally produces the largest longitudinally acting thermal expansion forces which must be counteracted by the thermal restraint unit 101.

In one embodiment, both the vertical and longitudinal restraint features of the thermal expansion restraint system 100 are provided by a vertically oriented fixation member such as fixation keel plate 102 in one embodiment which serves both purposes. The dual duty keel plate 102 is slideably mounted to the top coupling assembly 59-1 of A-frame 59 for limited unidirectional sliding movement in the vertical direction only. However, keel plate 102 is fixed axially in position (horizontal direction) along the longitudinal axis LA to restrain the thermal growth of the steam header 41. This arrangement and dual functionality may be achieved as explained below in one embodiment.

Referring to FIGS. 13-20, keel plate 102 is coupled to and protrudes upwards from and above the structural coupling assembly 59-2. Keel plate 102 may be T-shaped plate in one non-limiting design comprising a horizontal flange 102-1 and vertical flange 102-2 in one embodiment. In one embodiment, keel plate 102 may be a short section of a T-shaped structural beam oriented horizontally. Other shape and types of conventional structural members may be used for keel plate 102 in other embodiments. Vertical flange 102-2 is received between a pair of vertical upstanding guide plates 120 fixedly attached to the coupling assembly 59-2 of the rigid stationary A-frame 59. Guide plates 120 thus also remain stationary when the ACC 40 is heated by steam and do not undergo an substantial thermal expansion caused by direct with the flowing steam.

The combination and sandwiched arrangement of the vertically slideable keel plate 102 and stationary guide plates 120 are configured to provide a vertical expansion joint operable to arrest upwards expansion/growth of the tube bundles 43 affixed to the angled pair of upper tubesheets 70 after providing limited vertical movement. The guide plates 120 include a plurality of guide holes 123 each of which are aligned with a respective mating vertical guide slot 121 formed in the vertical flange 102-2 of keel plate 102. A guide bolt 122 is inserted through each of the mating slots and holes and secured thereto. In one non-limiting example as illustrated, keel plate 102 may include three guide slots 121 recognizing that more or less guide slots may be provided. The purpose of the vertical slots 121 in the keel plate is to allow the tube bundles 43 to grow a limited degree in the vertically direction. The slots 121 provide the vertical expansion stop of the thermal expansion restraint system 100 to limit further vertical tube bundle 43 expansion (noting that the bundles are actually angled in orientation).

Keel plate 102 is seal welded on each side to the angled upper tubesheets 70 for the entire length of the keel plate. In one construction, each opposite longitudinal edge of the horizontal flange 102-1 of the keel plate may be welded to the upper tubesheets 70 via fillet seal welds 102-3 (see, e.g. FIG. 18). This maintains the leak proof construction of the steam flow plenum 80. Notably, this physically locks the keel plate 102 to the upper tubesheets 70 such that the keel plate will move vertically upwards in unison with the tubesheets when the tube bundles 43 grow in length vertically upwards when heated by steam.

The slideable coupling assembly described above between the fixed/stationary guide plates 120 on the A-frame 59 and the keel plate provided by vertical slots 121 in the keel plate allows limited vertical movement of both the keel plate and tube bundles commensurate with the length of the slots. As the tube bundles 43 grow and the rigidly joined assembly of the upper tubesheets 70 and keel plate 102 move upward under thermal expansion, the keel plate will slide upwards along the guide bolts 122 until the bolts bottom out in the slots. Further vertically movement of tube bundles, tubesheets, and keel plate is thus arrested. This represents the vertical restraint feature or expansion stop.

The longitudinal restraint feature or expansion stop also involves the keel plate 102 as well, as alluded to above. Keel plate 102 represents a longitudinally stationary part of the thermal restraint unit 101 which is fixed in longitudinal/horizontal position along the longitudinal axis LA via the guide assembly of vertical guide slots 121, guide bolts 122, and guide holes 123 in the guide plates 120. The vertical slots of course do not permit longitudinal/horizontal movement of the keel plate 102 relative to the stationary guide plates 120 on the structural coupling assembly 59-2 of the A-frame 59, thereby fixedly mounting the keel plate to the structural A-frame 59 of thermal restraint unit 101 in axial position along the longitudinal axis. Because the upper tubesheets 70 are fixedly coupled to the steam flow plenum 80, which in turn is fixedly coupled to the steam header 41, the fixation keel plate 102 which is fixedly welded to upper tubesheets 70 locks the steam header in axial position along the longitudinal axis LA. Since the thermal restraint unit 101 is unaffected by whether the ACC is in the hot operating condition receiving steam or cold shutdown condition, the keel beam 102 will always maintain the same axial (longitudinal) position as the A-frame 59 which is rigidly mounted to the fan platform.

To prevent interaction of the fixation keel plate 102 with the steam flow plenum 80, the keel plate protrudes upwards from coupling assembly 59-2 into a downwardly open receptacle 103 formed in a boxed-out portion at the bottom of steam flow plenum. The top keel plate horizontal flange 102-1 may be disposed inside the receptacle along with the upper portion of vertical flange 102-2. The boxed-out portion of the steam flow plenum 80 may be formed by a polygonal shaped seal box 107 comprising a pair of laterally/transversely spaced apart longitudinal sidewalls 104, an opposing pair of end walls 105, and a top wall 106 extending between the sidewalls and end walls which closes the top of the box. The sidewalls, end walls, and top wall of seal box 107 are sealed welded together, and in turn the seal box is seal welded to the seal plate 83 and each of the upper tubesheets 70 forming a fluid-tight sealed receptacle 103. The seal plate 83, in specific, may be welded to the exterior surface of each end wall 105 of the seal box.

The end walls 105 of seal box 107 define a pair of opposing interior surfaces 109 vertically oriented and facing inwards towards the receptacle 103. The ends of the keel plates 102 define corresponding end surfaces 108 which remain spaced apart from the interior surfaces 108 of end walls 105 which the seal box 107 moves longitudinally with the steam header 41 under thermal expansion when the ACC 40 is heated by receiving steam.

In operation of the thermal expansion restraint system 100 with respect to longitudinal growth of the steam header 41, the fixation keel plate 102 does not come into any or at least substantial contact with the seal box 107 (i.e. sidewalls, end walls, or top wall) within the receptacle 103 when the pressure retention components described above are in their cold condition in the absence of steam flow to the ACC (i.e. not subjected to thermal expansion). In the cold condition, the seal box end walls 105 are longitudinally spaced apart from the keel plate end surfaces 108 (see, e.g. FIG. 16). When steam flow is initiated through and heats the steam header 41, steam flow plenum 80, and upper tubesheets 70 during normal operation of the ACC, these flow components will grow longitudinally due to thermal expansion of these metal components. This causes the tube structure to grow and expand longitudinally in length. This expansion causes the seal box 107 with end walls 105 to move and shift in longitudinal axial position relative to the keel plate 102 of the thermal restraint. However, the keel plate 102 restrains and locks the upper tubesheet 70 and steam header 41 coupled thereto in axial position along the longitudinal axis LA. This prevents the stationary keel plate end surface 108 from engaging the interior surfaces 109 of the seal box end walls 105, thereby maintaining a spaced apart relationship. Seal box 107 has a sufficient length to prevent engagement with the fixation keel plate 102 when the steam header 41 is either in a linear contracted cold or expanded hot position.

In a preferred embodiment, it is significant to note that the A-frame 59 of thermal restraint unit 101 is a self-supporting and free-standing structure which does not engage any structure or pressure retention component above the fan deck plate 51 where the A-frame is fixedly mounted to the fan support frame 45. Accordingly, the A-frame 59 comprising the angled beams 59-1 and coupling assembly 59-2 of each thermal restraint unit 101 are unconnected to and do not engage any portion of the tube bundles 43, upper and lower tubesheets 70, 71, steam and condensate headers 41, 42, or steam and condensate flow plenums 80, 90 either directly or indirectly via intermediate structural elements. Particularly, it bears noting that tube bundles 43 receive no support whatsoever from the angled beams 59-1 and are spatially separated therefrom by a physical gap G1 (see, e.g. FIGS. 10 and 14). Each thermal restraint unit 101 is therefore structurally a standalone and independent structure for thermal expansion restraint purposes only in the preferred embodiment which is nested inside and beneath the tube bundles 43 and headers 41, 42 as shown. Accordingly, the tube bundles 43 and headers 41, 42 form parts of an A-shaped "tube structure" which is independently self-supporting from the thermal restraint A-frame 59 such that the tube bundles are unsupported by the angled beams 59-1, or any portion of the fan support frame 45 between the upper and lower tubesheets 70, 71 above the fan deck plate 51.

A plurality of thermal restraint units 101 may be provided for each cooling cell (which comprises the components shown in FIG. 2 et al.). For example, in the non-limiting illustrated embodiment, a pair of thermal restraint units 101 may be provided. The units may be closely spaced apart and proximate to each other and share a common axially elongated receptacle 103 into which keel plates 102 from each thermal restraint unit 101 is received (best shown in FIG. 16). For a series of cooling cells or units each comprising an assembly of steam headers 41, condensate header 42, and tube bundles 43 generally shown in FIG. 2, a single Lock Point thermal expansion restraint system 100 may be provided preferably towards the center of the longitudinally-extending trains of cooling cells with axially and fluidly interconnected steam headers 41 joined together in a contiguous concatenated or series fashion. This causes the steam headers to grow in two opposing directions from the Lock Point once the longitudinal growth of the steam header has been arrested by the thermal expansion restraint system 100. This type of bi-directional thermal expansion control arrangement is preferred over allowing a completely unrestrained and long steam contiguous header assembly to simply grow in a single direction over a significantly greater length at the free end.

Other arrangements and spacings of thermal restraint units may be provided in other implementations.

According to another aspect, the ACC 40 may also include a longitudinally-extending overhead trolley monorail 55 which provides support for a wheeled trolley hoist (not shown) to facilitate maintenance on the fan for lifting and maneuvering the motor and gear box. Monorail 55 is spaced and mounted above the fan 50 as shown. In one embodiment, the monorail 55 may be suspended overhead and supported by a plurality of vertical support hangers 58 spaced intermittently along the monorail. In one embodiment, the hangers 58 may comprises structural angles attached to the angle seal plate 83 at top and monorail 55 at bottom such as via welding or bolted connections.

Induced Draft Air-Cooled Condenser System

FIGS. 22-46 depict an embodiment of an induced draft air-cooled condenser system which may be used in the Rankine cycle flow loop 20 of the thermal electric power generation plant shown in FIG. 1 lieu of the forced draft air-cooled condenser system previously described herein. In this arrangement, ambient cooling air is drawn through the tube bundles as opposed to be forced and blown through by the fan 50.

A conventional induced draft air-cooled condenser draws the ambient cooling air from across the planform of the inclined tube bundles. The fan/motor assembly is positioned above the elevated V-shaped tube bundles such that the incoming air is distributed as uniformly across the finned tube bundles' surfaces as possible. The V-shaped structures, formed by the tube bundles, which are made up of an array of slender obround tubes, have limited in-plane structural strength and as such, have not been historically relied on to render a structural function. In addition to the self-weight of the bundles themselves, the dead weight of the fan/motor/gearbox assembly, the steam distribution header, decks/walkways and the like are additional overhead commodities that need to be supported under normal, abnormal, and accident event conditions (such as the power generation plant site's Design Basis Earthquake, high wind, and other extreme environmental phenomena. To contend with these loads, the traditional design used heretofore requires a network of beams and trusses to support the tube bundles, which tend to interfere with air flow thereby reducing heat exchange efficiency and requiring extensive on-site construction work. A typical induced draft air-cooled condenser system is so rich in structural members that the cost of erecting the system often outweighs the hardware cost.

The induced draft air-cooled condenser design disclosed herein seeks to minimize the turnkey cost of the ACC system while also overcoming the above shortcomings of convention designs. The unique structural support arrangement and features disclosed herein advantageously reduces the amount of superstructure beams/trusses required and contributes to enhanced heat exchange efficiency by not substantially blocking the cooling air flow through the inclined tube bundles. The present air-cooled condenser design permits assembly methods disclosed herein which allow the heavy components to be efficiently and conveniently assembled at ground level, and then simply lifted into position by construction vehicles/equipment on site (e.g. cranes, hoists, etc.). This minimizes the need for workers to assembly many structural components at elevated levels or heights, thereby reducing in installation costs and enhancing safety.

A number of components of the present induced draft air-cooled condenser are similar to those already described herein for the forced draft air-cooled condenser 40. The arrangement within the cooling cell may be different however. For the sake of brevity, the components of the induced draft air-cooled condenser will therefore be designated with "1000" series numerical references in the drawings and written description recognizing that the component design is similar to those previously described herein unless differences are specifically noted. New and/or different components added will be designated with "1100" series numerical references.

Referring generally to FIGS. 22-46, the present induced draft air-cooled condenser system 1030 according to the present disclosure comprising air-cooled condenser (ACC) 1040 is fluidly coupled to the Rankine cycle flow loop 20 of FIG. 1 in a steam condensing application in one embodiment. The ACC disclosed herein however may be used in other heat transfer applications. Similarly to the force draft ACC 40 previously described herein, the induced draft ACC 1040 shown in FIG. 22 comprises a plurality or array of discrete cooling cells 1040A which may be fluidly and physically coupled together in a similar manner to the cooling cells of the force draft ACC 40 previously described herein. The number of cooling cells required in the array will be dependent upon the steam condensing heat load requirements and ambient site conditions with respect to available cooling air and its temperature. The steam condensing closed flow loop 31 (see also FIG. 1) provides steam to ACC 1040 from the low pressure section of the steam turbine 24 via steam piping 1131A which may include branched sections or manifolds.

Figure 23:
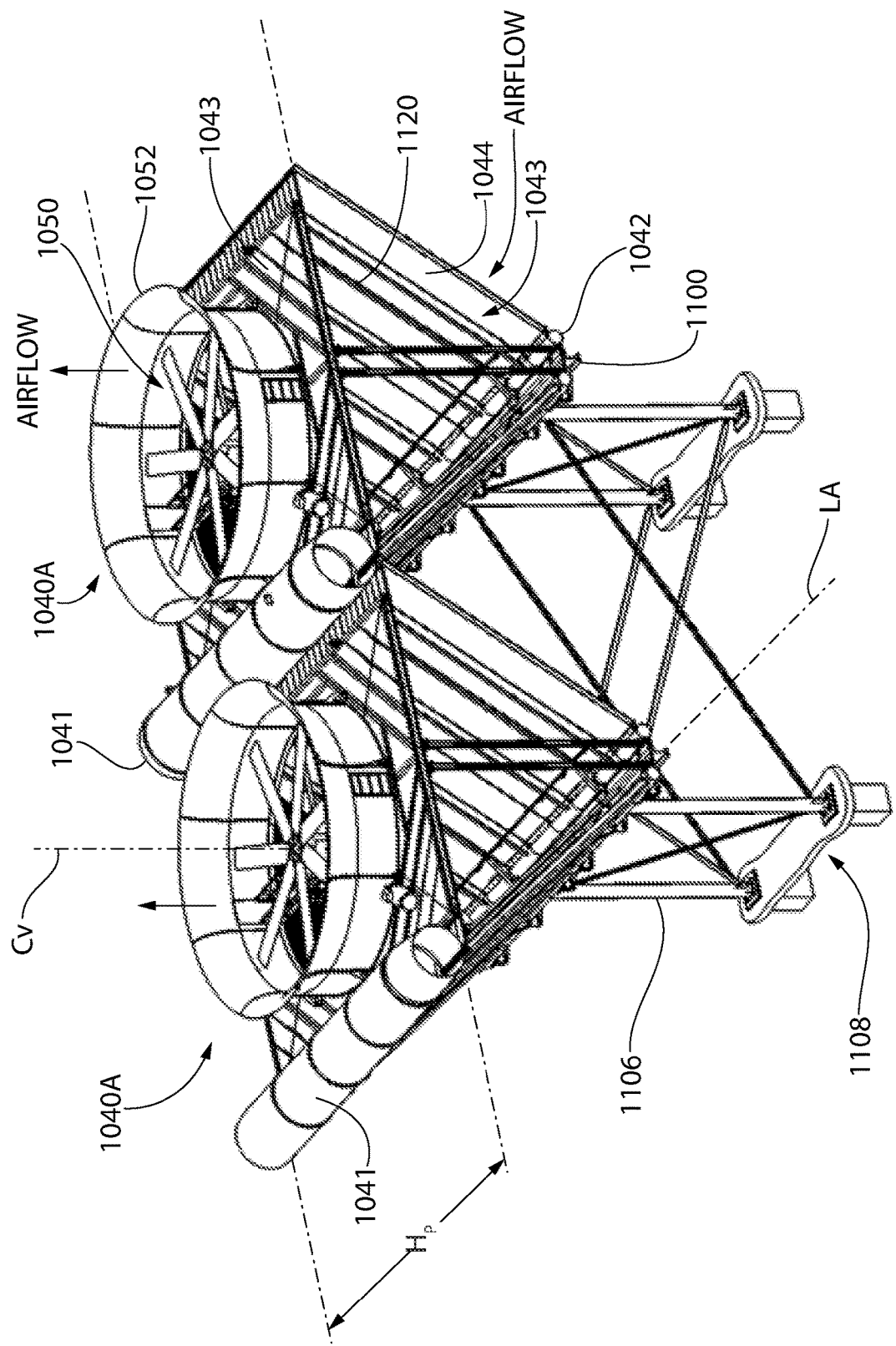
FIG. 23 is a perspective view of a pair of coupled cooling cells thereof.

FIG. 23 shows a structurally coupled pair of lateral adjacent cooling cells 1040A. Each cooling cell 1040A of the ACC 1040 generally comprises a pair of laterally spaced substantially parallel steam headers 1041 at the top of the cooling cell 1040A, a pair of laterally spaced parallel bottom condensate headers 1042 at the bottom of the cooling cell, and at least one pair of inclined/angled tube panels or bundles 1043 of generally planar configuration extending between the steam and condensate headers and forming a V-shaped frame structure. Each tube bundle comprises a plurality of obround or rectangular tubes 1044 similar to tubes 44 previously described herein. A plurality of longitudinally arranged tube bundles may be provided on each side of the "V" as shown in the figures.

The steam and condensate headers may be cylindrical and are arranged substantially parallel to each other. The term "substantially" used in this context and within this disclose recognizes that slight installation variations/deviations in alignment and position naturally occurs in the final assembled ACC during field erection of the superstructure and foregoing flow components. One steam header 1041 may be larger than the other and forms a common steam header shared with the laterally adjacent cooling cell 1040A (see, e.g. FIG. 22). The larger diameter shared common steam header 1041 between adjacent cells provides enough flow capacity to deliver steam from the generating plant to one tube bundle 1043 of each adjacent cell. This provided an efficient arranged and reduced capital component costs. In other possible embodiments, however, each cooling cell may have its own pair of steam headers fluidly isolated from those of an adjacent cell.

Figure 22:
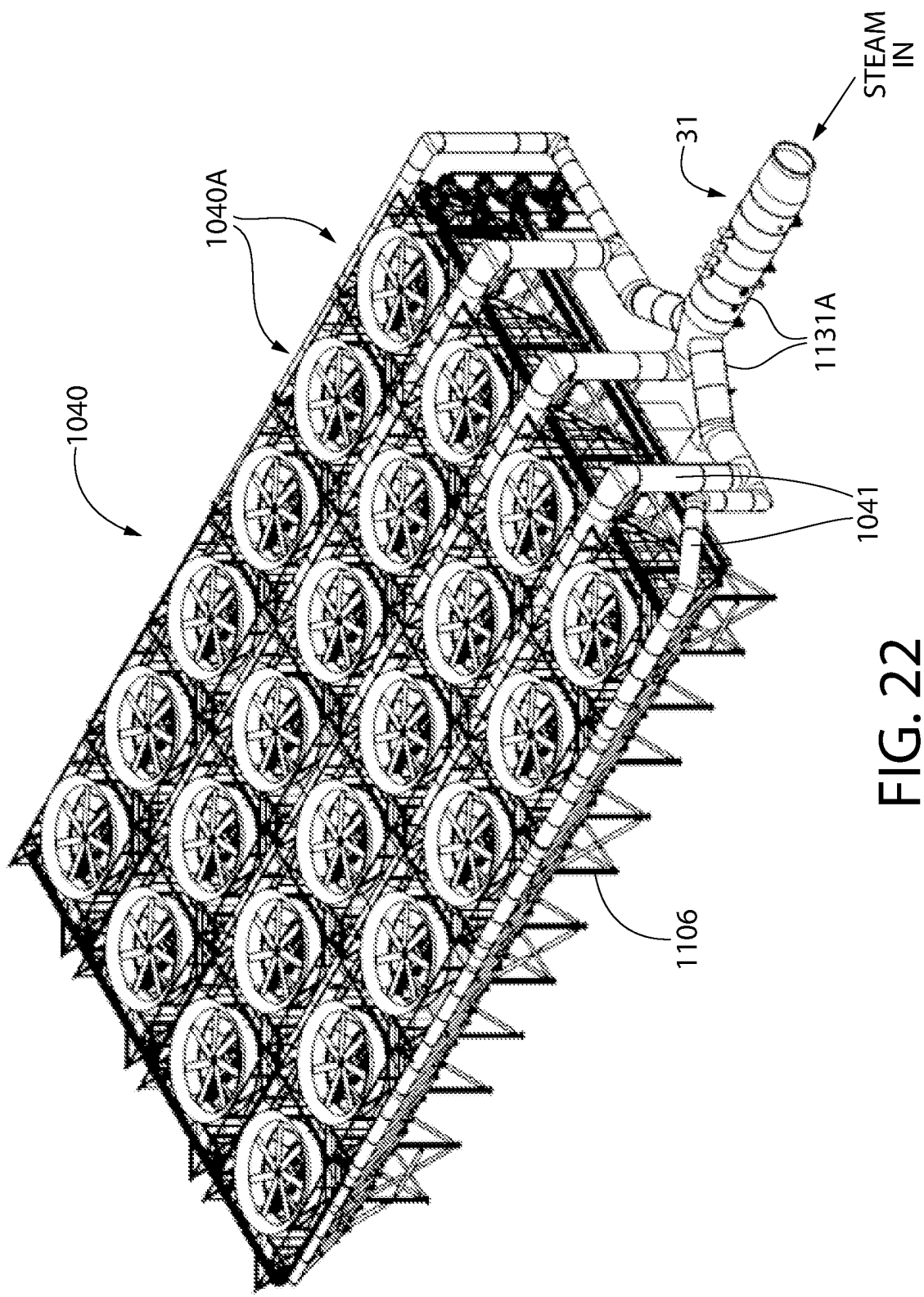
FIG. 22 is a perspective view of an induced draft air-cooled condenser (ACC) comprising an array of cooling cells according to the present disclosure.

It bear noting that each of the laterally cooling cells 1040A shown in FIG. 22 would be fluidly coupled to a longitudinally adjacent cell such that the steam and condensate headers would be fluidly coupled together in the longitudinal direction to form continuous linear flow passageways or conduits, in a manner similar to forced draft ACC 40 described above.

For convenience of description and reference, each ACC cooling cell 1040A of ACC 1040 includes a longitudinal axis LA which may be defined as passing through the vertical geometric centerline of the main beam 1100 of the ACC (see, e.g. FIGS. 23-24 and further described below) and parallel to the steam headers 1041 and condensate headers 1042. This also defines a corresponding axial direction which may be referred to herein. The term "lateral" as used herein indicates a direction or position transverse to one side or the other of the longitudinal axis in a horizontal direction. However, "transverse" broadly means a direction perpendicular to the longitudinal axis in any direction horizontal, vertical, or at an angle therebetween. A vertical centerline Cv of the ACC 1040 may be is defined by the vertical centerline of the fan shaft and intersects the longitudinal axis LA in one arrangement (see, e.g. FIG. 23). The fan deck 1051 defines a horizontal reference plane Hp which intersects the vertical centerline Cv and longitudinal axis LA. The longitudinal axis, vertical centerline, and horizontal reference plane define a convenient reference system for describing various aspect of ACC 1040 and their relationship to one another.

The support structure of each ACC cooling cell 1040A which comprises an assembly of structural elements that support the foregoing fluid components (e.g. steam headers, condensate headers, and tube bundles) includes longitudinally-extending main beam 1100 which forms the structural spine of the cell, a plurality of transversely orientated and laterally elongated condensate header support beams 1102, and a longitudinally-extending bottom walkway platform 1104 supported by the main beam and/or header support beams. The condensate header support beams 1102 are longitudinally spaced apart as shown which structurally may be viewed as forming the ribs coupled to the main beam spine. The main beam 1100 may be vertically aligned with and intersects the vertical centerline Cv of cell. Each main beam of the cells rests on and is supported in turn by a plurality of longitudinally spaced apart structural columns 1106. In some embodiments, the columns may comprise a steel outer pipe 1106A filled with an inner core 1106B of concrete. In other embodiments, a variety of commercially available structural steel shapes (e.g. wide flange I-beams, etc.) may be used. The main beam 1100 may be mounted to the tops of the columns on site via bolting or welding. In one non-limiting embodiment, two columns 1106 may be used to support the main beam 1100; however, more than two columns may be used as needed depending on the longitudinal length of the cooling cell and main beam, and dead weight loads imposed on the main beam by the fan, headers, tube bundles, structural members, various other appurtenances, etc. above which may be provided. The main beam transfers all these loads to the columns which are supported on concrete foundation 1108 of suitable design and configuration. The columns 1106 may be laterally braced by diagonal cross-bracing struts 1110 as shown in FIG. 22.

Figure 24:
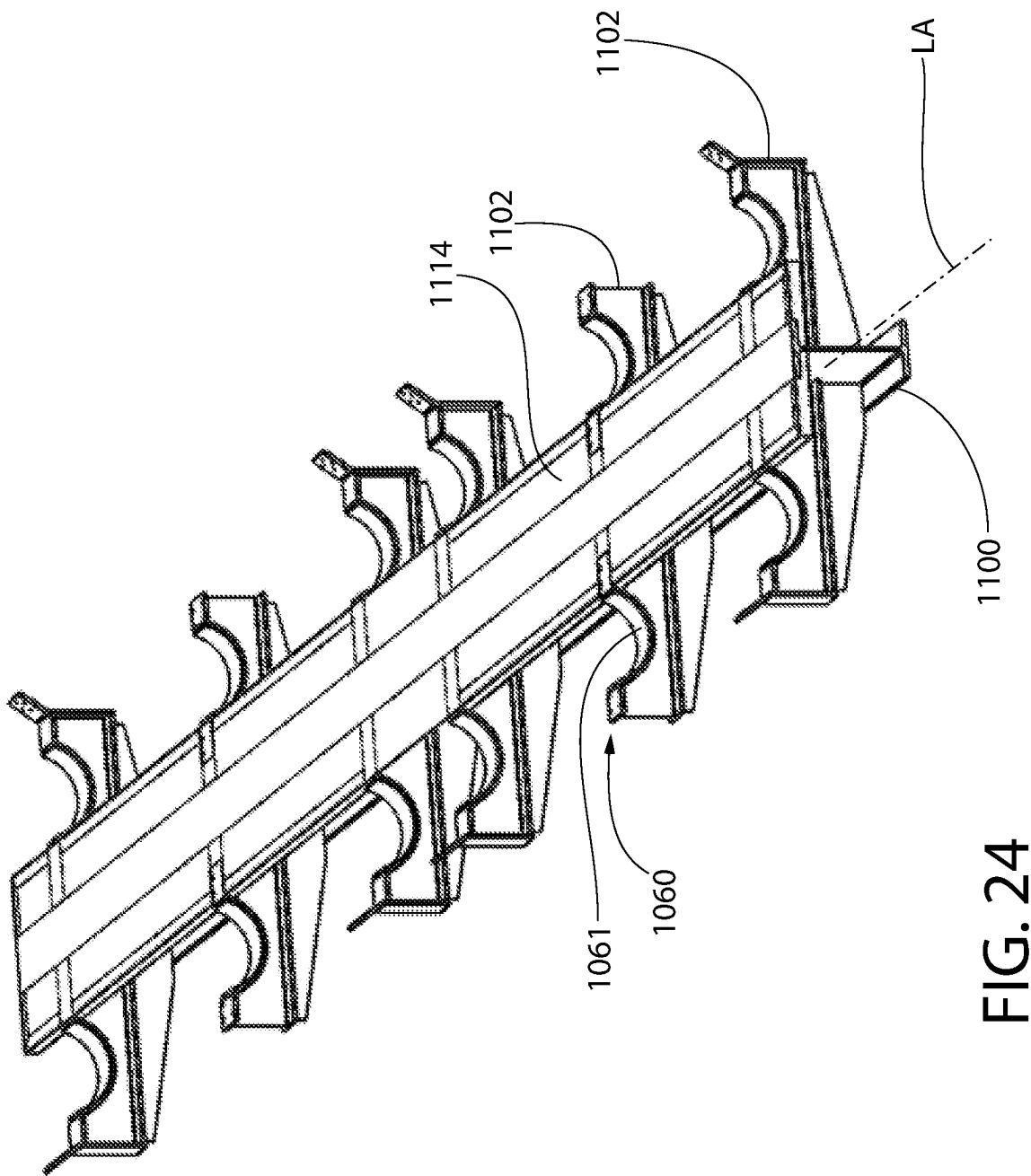
FIG. 24 is a perspective view of a main beam and condensate header support beams assembly of the ACC.

The condensate header support beams 1102 effectively create a continuous beam that straddles the structural main beam 1100 of the cooling cell 1040A to facilitate separate manufacturing, galvanizing, and bolt up assembly of the condensate support saddle structures at the plant site. Each condensate header support beam 1102 may be transversely centered on and welded/bolted to the main beam 1100 as best shown in FIG. 24. The condensate header support beam 1102 may be considered to have a generally pentagon shape (see, e.g. FIGS. 24 and 26). Main beam 1100 may be a wide flange I-beam in one embodiment; however, other suitable structural shapes may be used. The condensate header support beams 1102 at each location may include mirror image right and left lateral sections which are welded/bolted to the main beam therebetween as shown.

Condensate header support beam 1102 includes a pair of integral saddle supports 1060 of slightly different configuration than saddle supports 60 previously described herein. One saddle support is located on each side of main beam 1100 and spaced laterally apart therefrom by a distance. Each saddle support 1060 has a radius which defines an generally upward facing concave support surface 1061 configured to complement the diameter of the condensate headers 1042 such that the headers are seated on and abuttingly engaged with the support surfaces. The saddle supports 1060 may be formed of steel plate of suitable thickness and longitudinal width rolled to match the diameter of the condensate headers. In one non-limiting example, the saddle support plates may be about 1 inch thick and 12 inches in longitudinal width to support the headers. Condensate headers 1042 may optionally include semi-circular wear plates 62 previously described herein (see, e.g. FIG. 5). The saddle supports 1060 function in the same manner as saddle supports 60 to allow the condensate headers to thermally grow or shrink longitudinally by sliding along the supports without being axially restrained. This prevents thermal expansion stress-induced cracking of the headers. The main beam 1100 and condensate header support beams 1102 support a longitudinally-extending flat walkway 1114 which may be formed by one or more sections of steel plating. This provides access to the condensate header support beams 1102 and inside surfaces of the tube bundles and tubes for use during erection of ACC 1040 and for maintenance and inspection.

As noted above, the fluid pressure boundary components of ACC 1040 (headers and tubes) are similar to ACC 40 previously described herein albeit arranged differently and will therefore not be discussed in great detail for sake of brevity. Referring with general initial reference to FIGS. 32-39, the straight tubes 1044 of each tube bundle 1043 are fluidly coupled to a flat longitudinally-extending upper tubesheet 1070 at top and a respective flat longitudinally-extending lower tubesheet 1071 at bottom forming part of the condensate flow plenum 1090 coupled directly to each condensate header 1042. The tube bundles 43 in one embodiment may be shop-manufactured straight and generally planar/flat tube bundles each comprised of closely spaced apart parallel tubes 1044 aligned in a single linear row and arranged in a single plane. Tubes 1044 may have an obround or rectangular cross section (see, e.g. FIGS. 8 and 9). The tubesheets 1070, 1071 contain a plurality of tube penetrations or openings for allowing steam or condensate to flow into and out of the tubes 1044 on the open interior tube side of the tubes which define flow passageways. The tube ends may similarly be fixedly coupled to the tubesheets in a leak-proof manner by being seal welded, brazed, or expanded (e.g. hydraulically or explosively) to the tubesheets to form fluidly sealed connections. The tubesheets 1070, 1071 may flat in one embodiment and formed of straight metallic plates.

Figure 30:
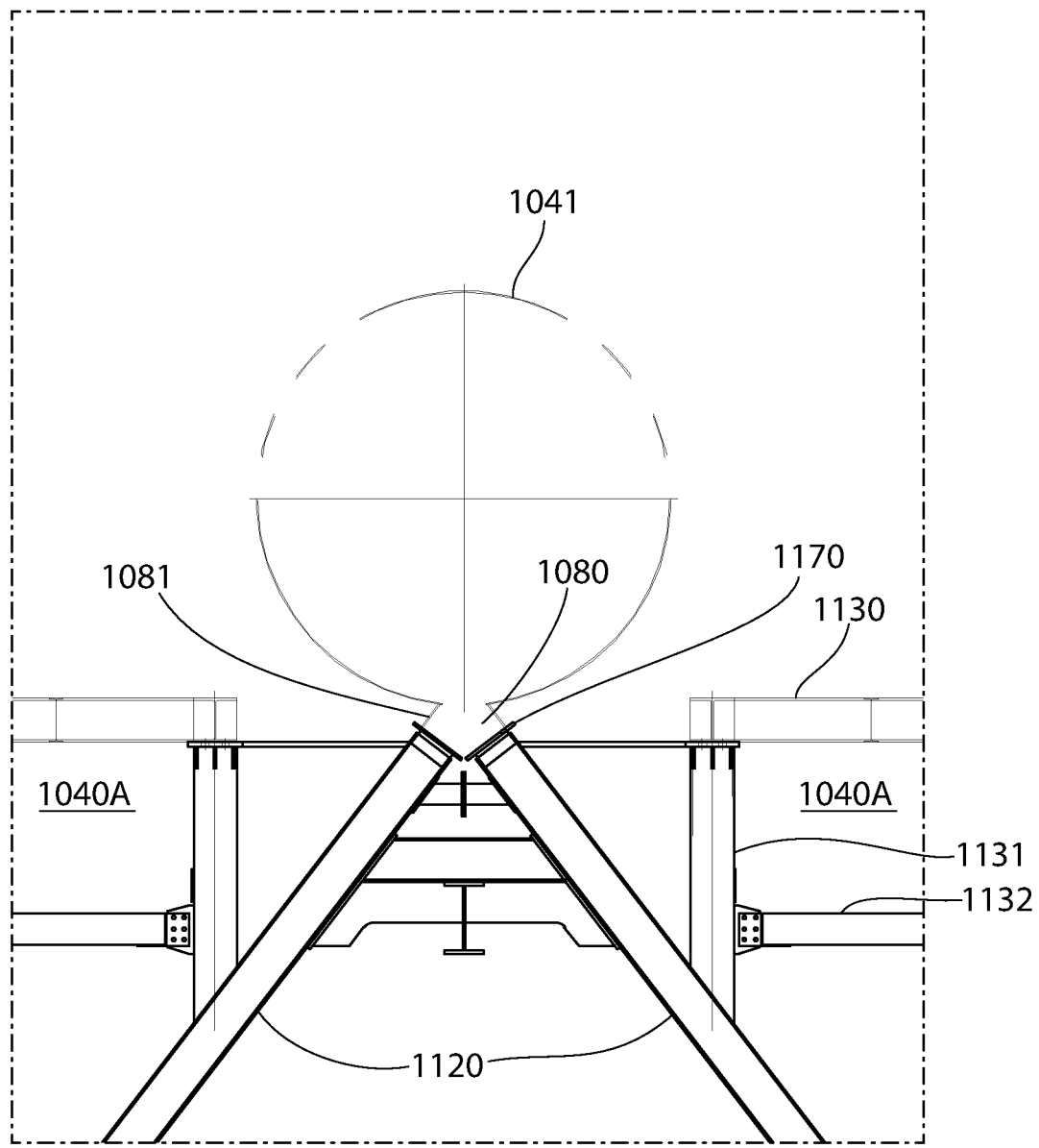
FIG. 30 is a front view of a steam header and deflection limiter beams.
Figure 31:
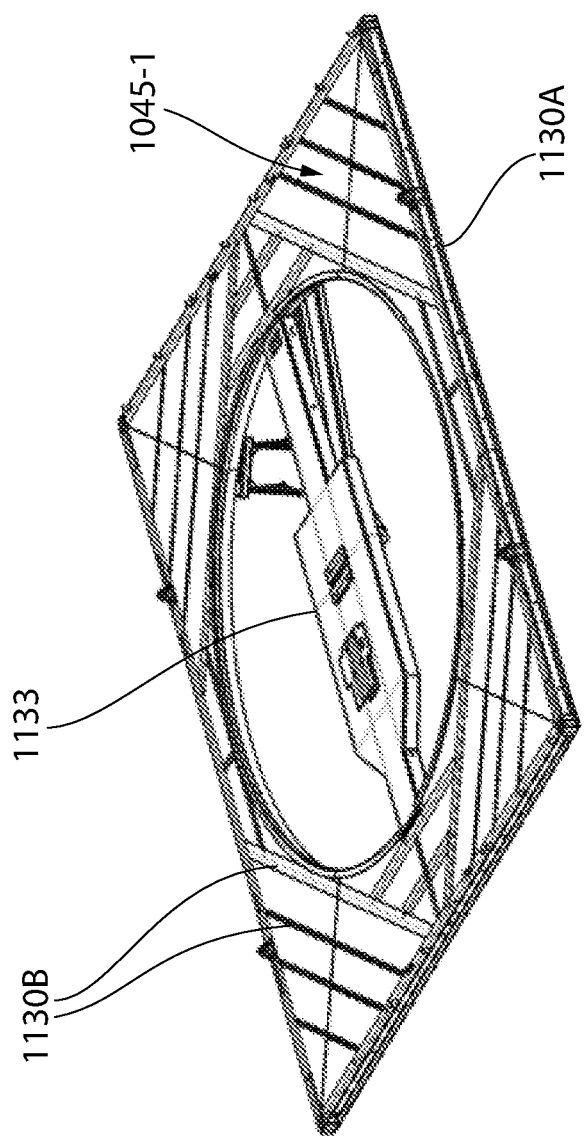
FIG. 31 is a perspective view of the fan deck and fan support bridge of the ACC.
Figure 32:
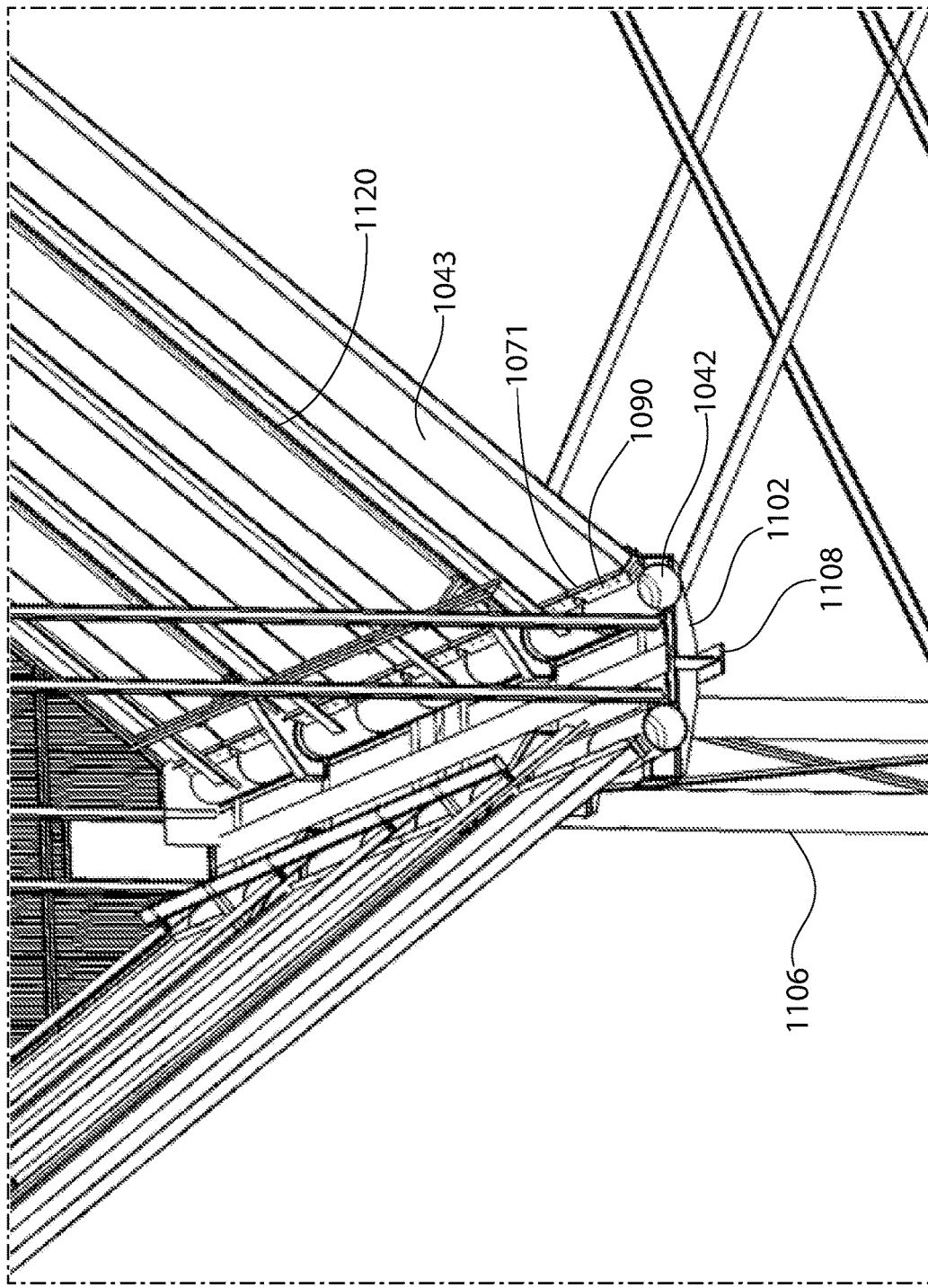
FIG. 32 is a perspective view of the lower portion of the tube bundles and condensate headers.
Figure 33:
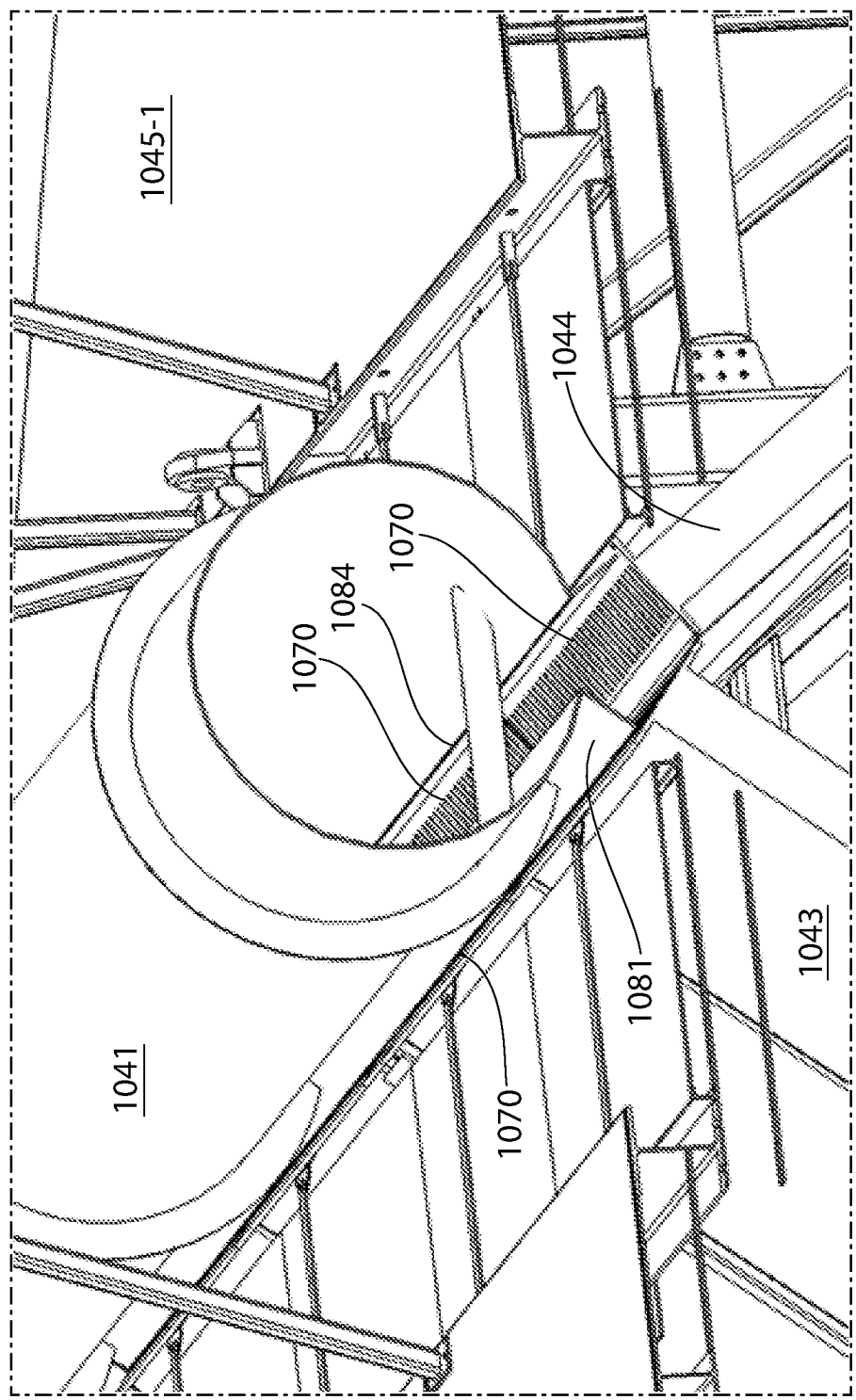
FIG. 33 is a perspective view of the upper portion of the tube bundles and one of the pair of steam headers.
Figure 34:
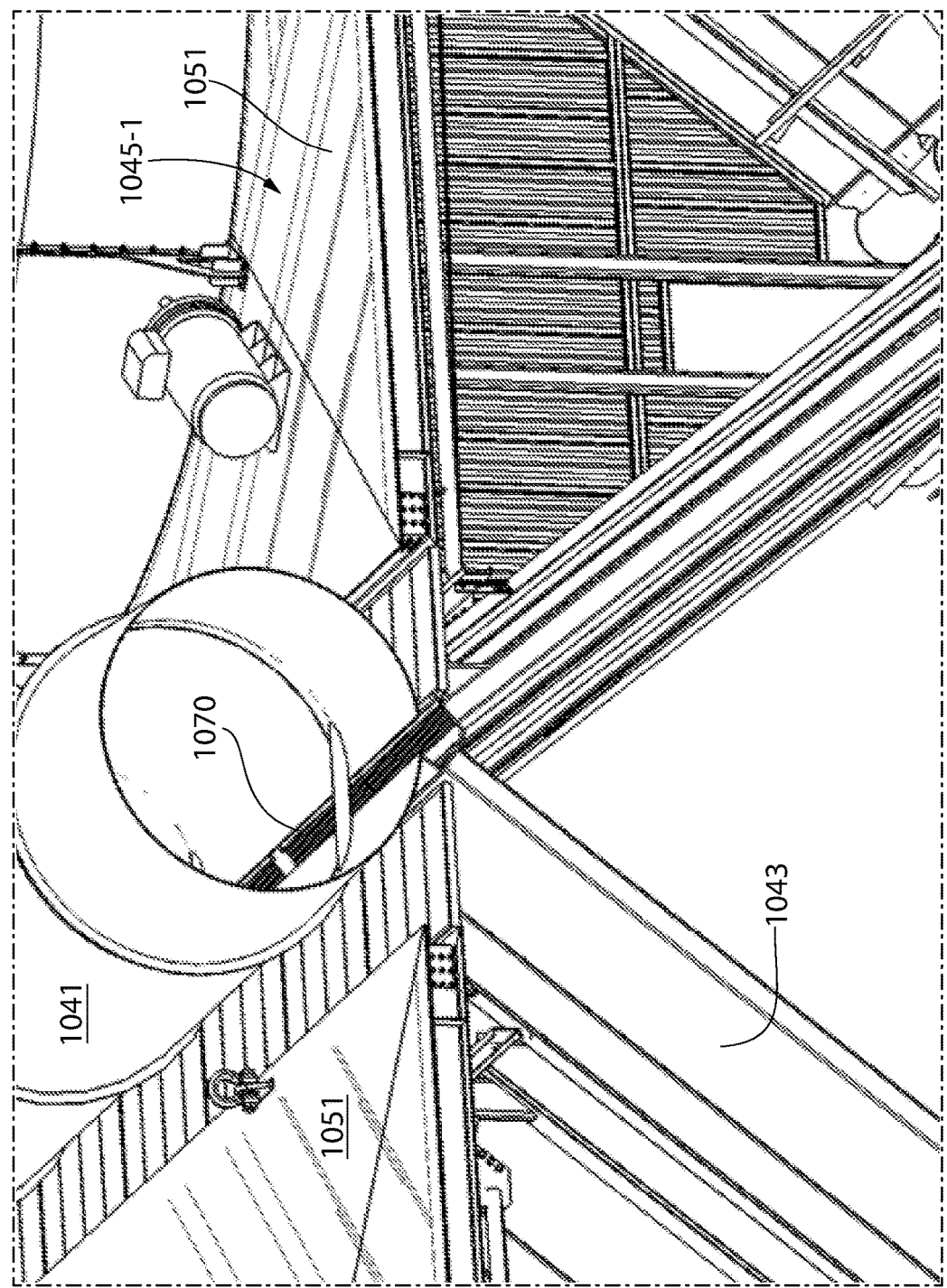
FIG. 34 is another perspective view thereof.

In one embodiment, the tubes 1044 may include heat transfer fins 75 attached to opposing flat sides 76 of the tubes and projecting perpendicularly outwards therefrom in opposing directions, as shown in FIGS. 8 and 9. When the tube bundles 1043 are assembled, the fins of one tube 1044 preferably are very closely spaced in relation to the fins of an adjoining tube to ensure cooling airflow generated by fan 1050 through the tube bundle comes into maximum surface contact with the fins for optimum heat exchange and steam condensing. In other implementations, the tubes may be finless.

Where a common steam header 1041 is shared between two laterally adjacent cooling cells 1040A (see, e.g. FIGS. 30 and 33-34, the upper tubesheets 1070 are arranged in a converging V-pattern. The common steam header 1041 has a corresponding pair of laterally spaced and longitudinally-extending skirt plates 1081 arranged in a converging inverted V-pattern similarly to steam header 41 previously described herein (see also FIG. 17). This forms a perpendicular interface between the skirt plates and tubesheets which are seal welded or brazed to form a leak resistant seal. The mating lower longitudinal edges between the adjoining upper tubesheets 1070 of each cell may be sealed via seal welding or brazing, or the use of sealing members of suitable design. Where the outermost side cooling cells 1040A are located, the skirt plates 1081 may be oriented parallel to each other and sealed to the single upper tubesheet 1070 (see, e.g. FIG. 29) in a similar manner. Each steam header 1041 includes longitudinally-extending bottom opening 1084 which allow the steam to enter the upper flow plenum and enter the tube openings in a manner similar to steam header 41 previously described herein (see also FIG. 6).

ACC 1040 further includes a plurality of Deflection Limiter Beams (DLBs) 1120. In one embodiment, the DLBs may each be wide flange I-beams; however, other structural beam shape may be used. Each DLB is a beam that is essentially coplanar with the plane of the tube bundles 1043 and located between longitudinally adjacent bundles on each side of the "V". The DLBs are intentionally designed to be slightly shorter than the bundles such that it will not actively engage and carry any load unless the bundles deflects. It is known from the theory of buckling of columns that because of the long aspect ratio of the tube bundles, they will elastically buckle before reaching the material compressive strength. Elastic buckling means the tube bundle will revert to its planar (undeformed) configuration when the axial load is withdrawn. Thus, when subjected to excessive axial loads, the tube bundles will bow and deflect out-of-plane slightly at which point the DLBs will be engaged, thereby advantageously preventing further deflection which might structurally damage the tube bundles. Each DLB is sized to carry the axial load in the bundles without excessive compressive stress levels. Because the DLB is axially uncoupled from the tube bundle, there is no risk of restraint of thermal expansion of the tube bundle as it receives hot steam from the steam turbine.

In order to permit thermal expansion or shrinkage of the tube bundles 1043 formed by grouped tubes 1044 as previously described herein, a sliding interface is formed between the tube bundles and longitudinally adjacent DLBs interspersed periodically therebetween. Referring particularly to FIGS. 36-39, in one embodiment each DLB 1120 includes an associated floating cap 1145. The caps may be rigidly welded on opposing sides to the upper tubesheet 1170 via a weld joint 1146. The floating caps may be rectilinear (e.g. square or rectangular) in configuration and the weld joints may be linear (see, e.g. FIG. 36). Each floating cap 1145 defines a downward open channel 1145B defined by a pair of structurally robust and downwardly depending tenons or protrusions 1145A. The web 1120B of each DLB is slideably received in the channel. Each protrusion 1145A in turn is slideably received between the opposing flanges 1120A of the DLB. The DLBs 1120 are the fixed/stationary rigid component being coupled at bottom to the condensate header support beams 1102. The DLB floating caps 1145 move upwards/downwards with the upper tubesheet as the tube bundles 1143 thermally grow when heated by the steam entering the tubes through the upper tubesheet.

Figure 37:
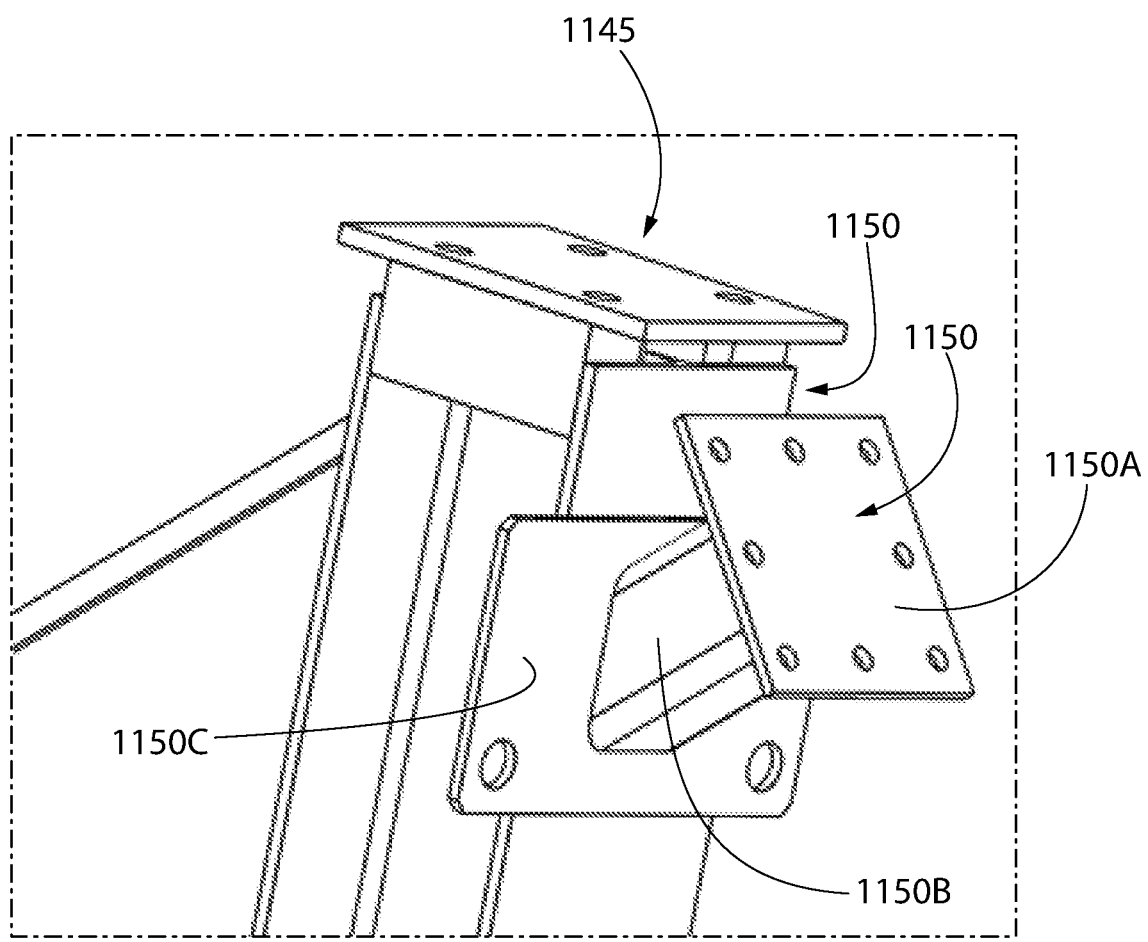
FIG. 37 is an alternate perspective view thereof without the tubesheet shown.
Figure 38:
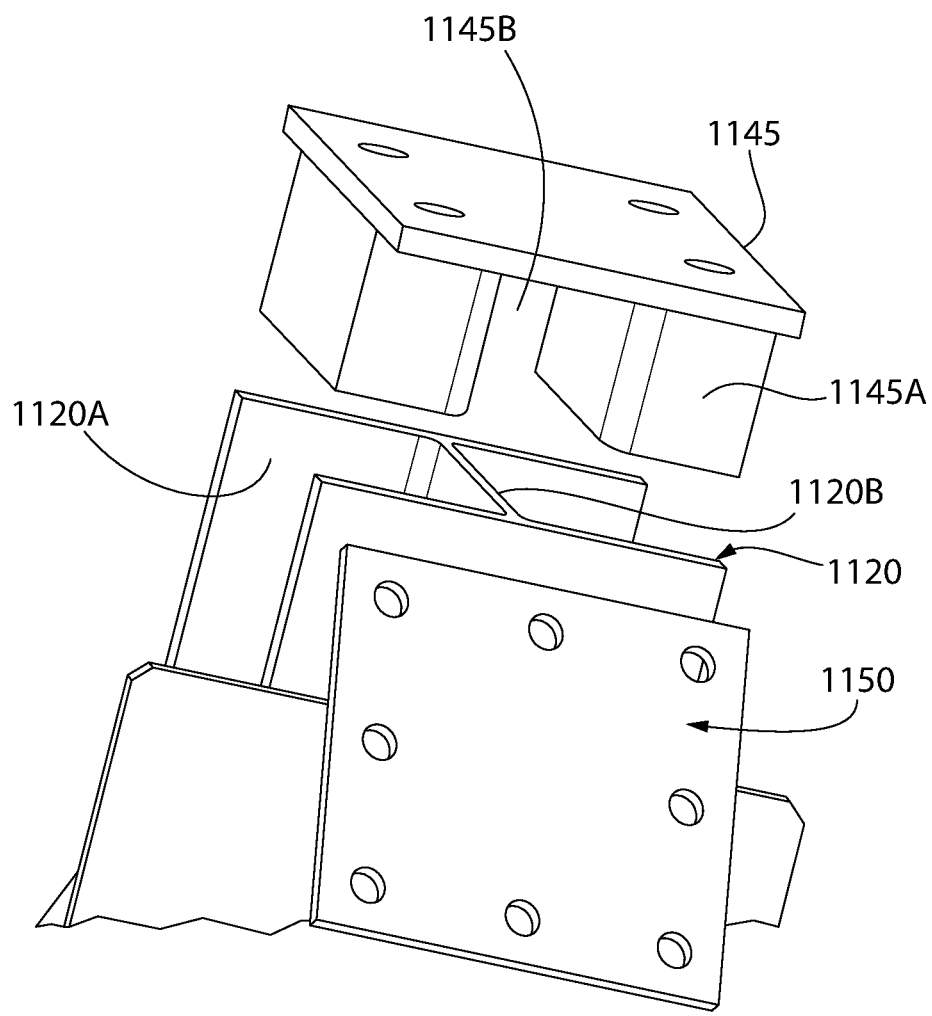
FIG. 38 is an exploded view thereof.
Figure 39:
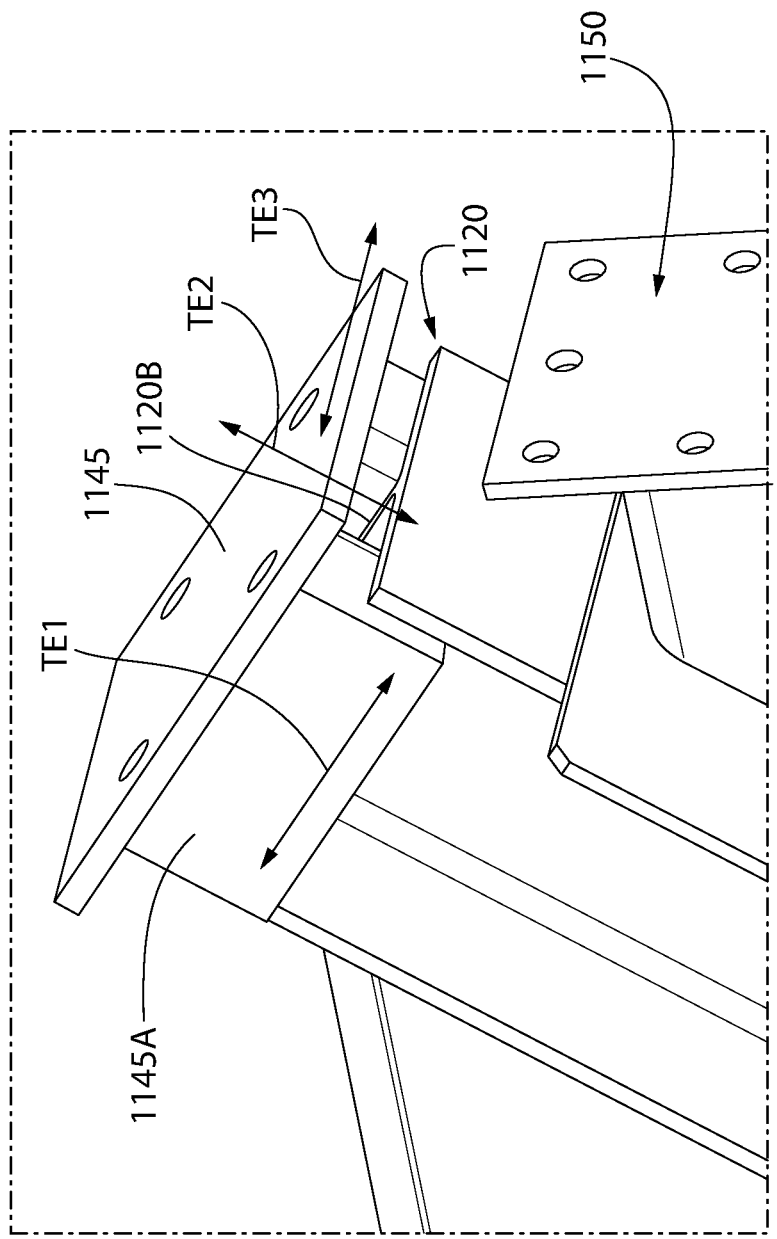
FIG. 39 is a perspective view thereof including directional arrows.

The DLB floating cap 1145 is loosely fitted on the end of the DLB in a non-fixed manner. As seen in FIG. 37, the protrusions 1145A tenons are spaced apart far enough to allow for in-plane thermal expansion of the tube bundles along the street direction (arrow TE2—note longitudinal width of channel 1145B is greater than width of web 1120B) and in-plane thermal expansion along the length of the tube bundle (arrow TE3), but restrict movement in the out-of-plane direction (arrow TE1) perpendicular to the street direction thermal expansion TE2. The terms "in" and "out of" plane refer to the plane defined by the angle tube bundles 1043. If the tube bundles attempt to bow out of plane due to thermal expansion when heated, floating caps 1145 will engage the DLBs and prevent out of plan bowing. The tube bundles are not shown in FIGS. 36-39 for purposes of clarity. The longitudinal width of channel 1145B (along the street direction TE2) can be adjusted to restrict a certain degree of movement along that direction.

Figure 25:
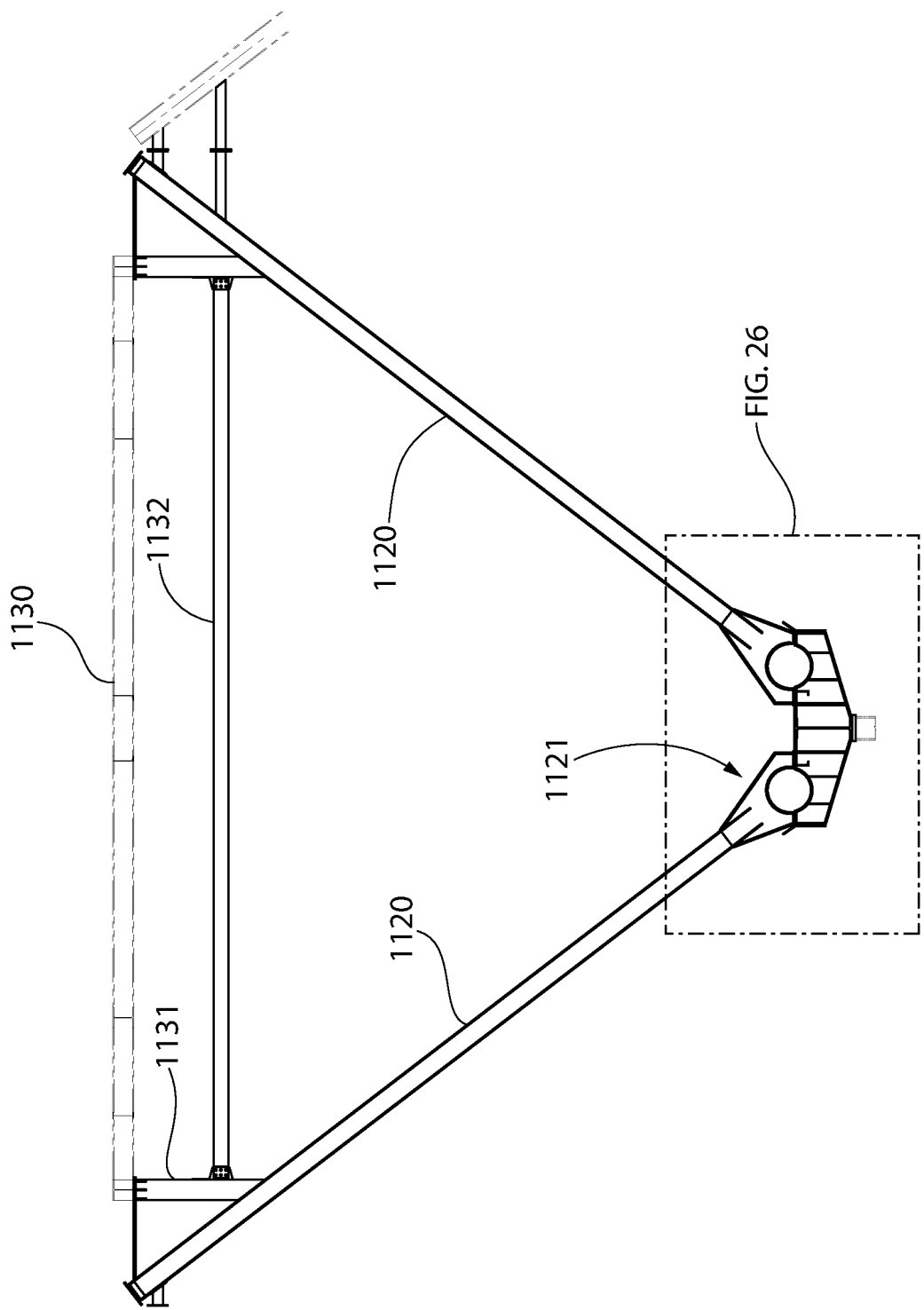
FIG. 25 is a side view of a deflection limiter beam assembly of the support frame of the ACC.
Figure 26:
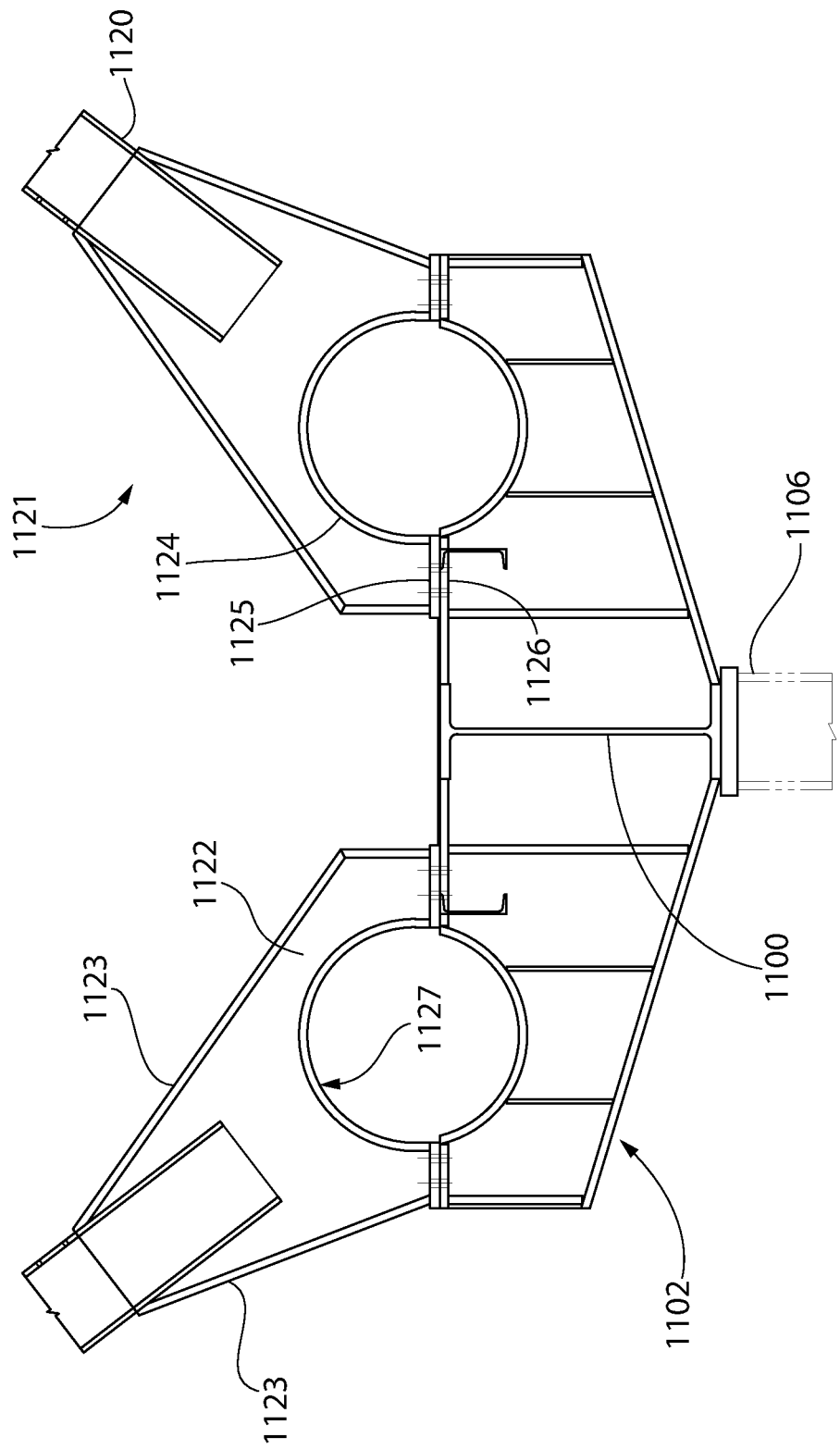
FIG. 26 is a front view of a condensate header support beam of FIG. 24.
Figure 27:
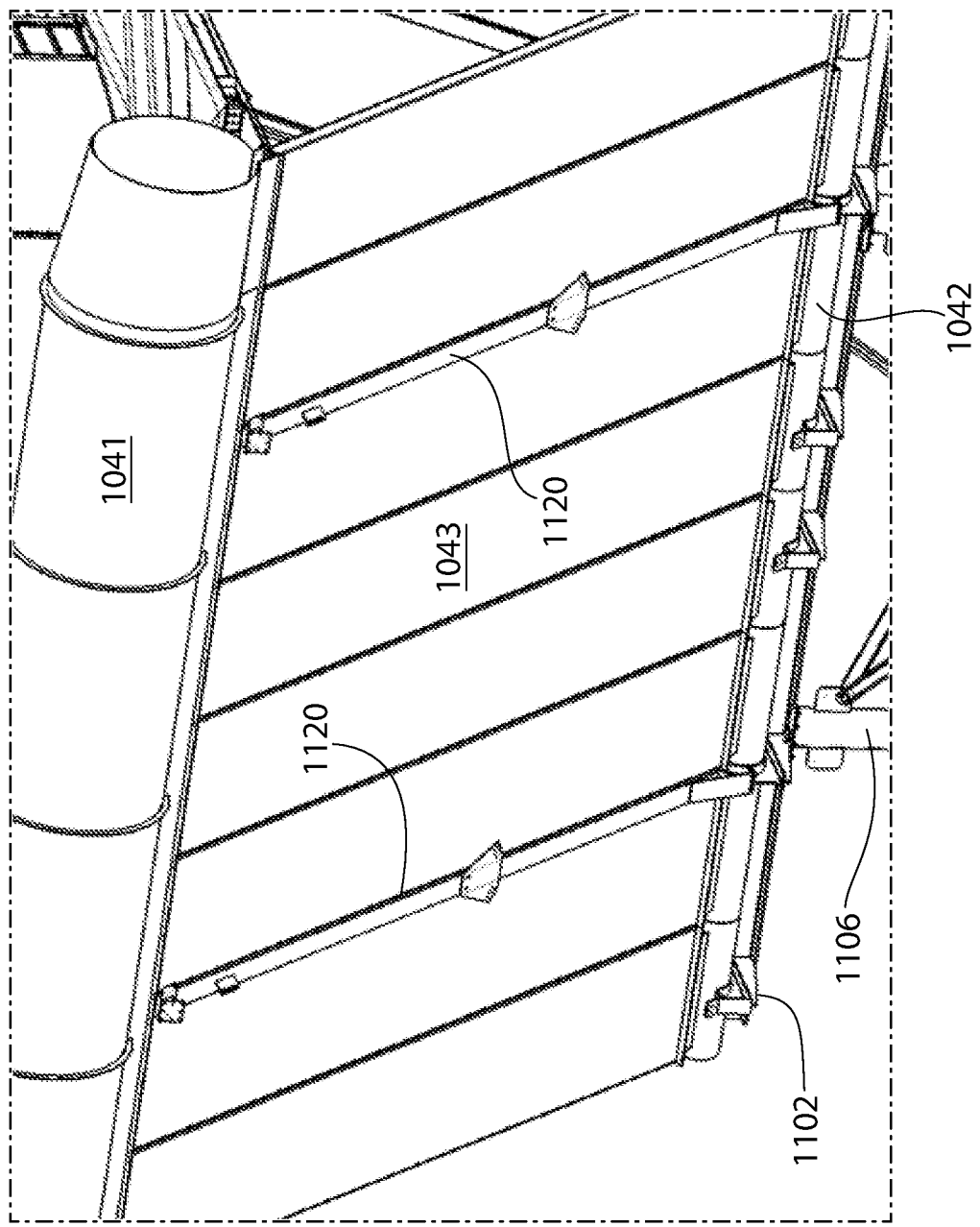
FIG. 27 is a side perspective view of a portion of the ACC showing the inclined tube bundles and deflection limiter beams.
Figure 28:
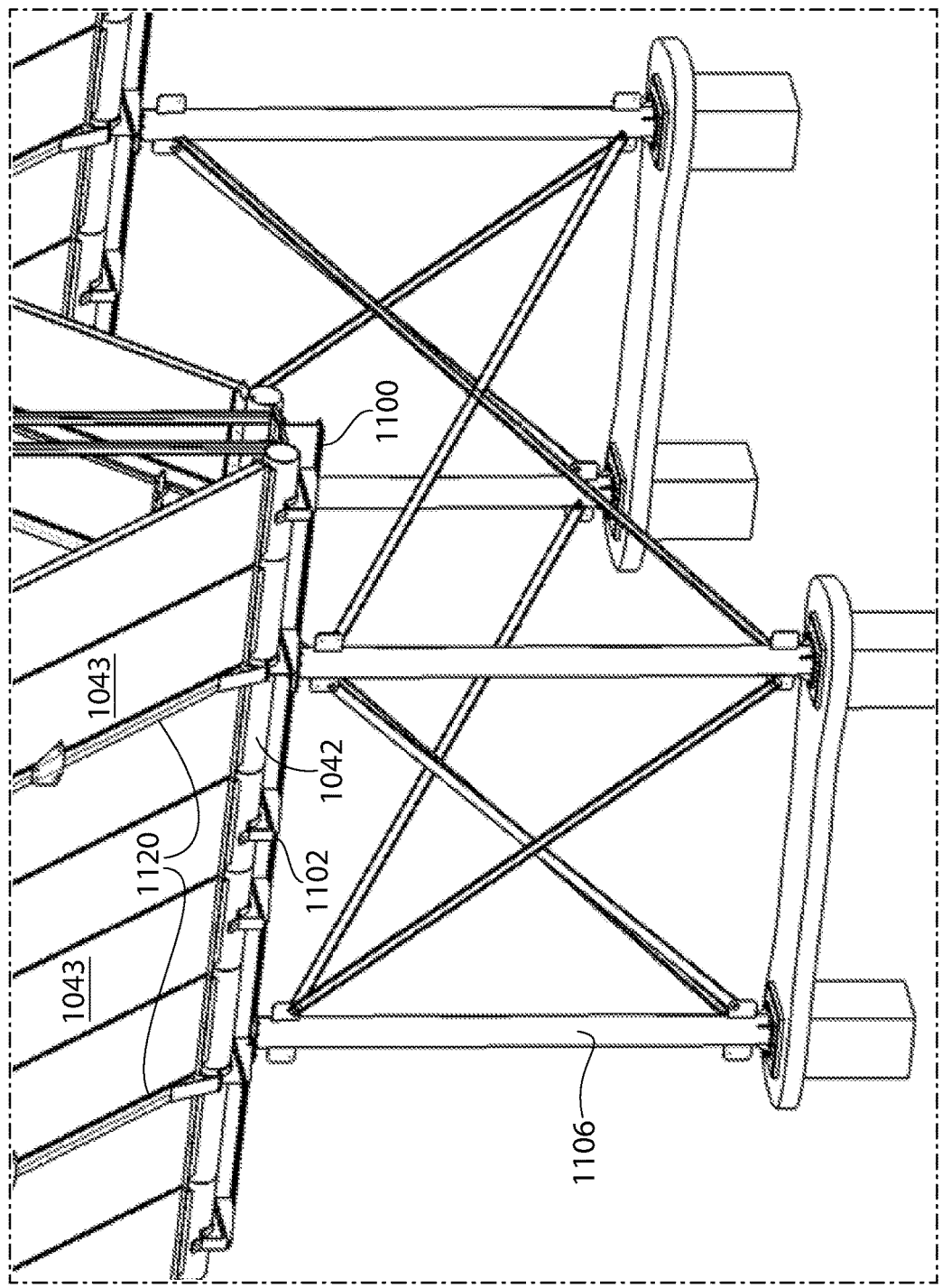
FIG. 28 is a perspective view thereof showing the support columns.
Figure 29:
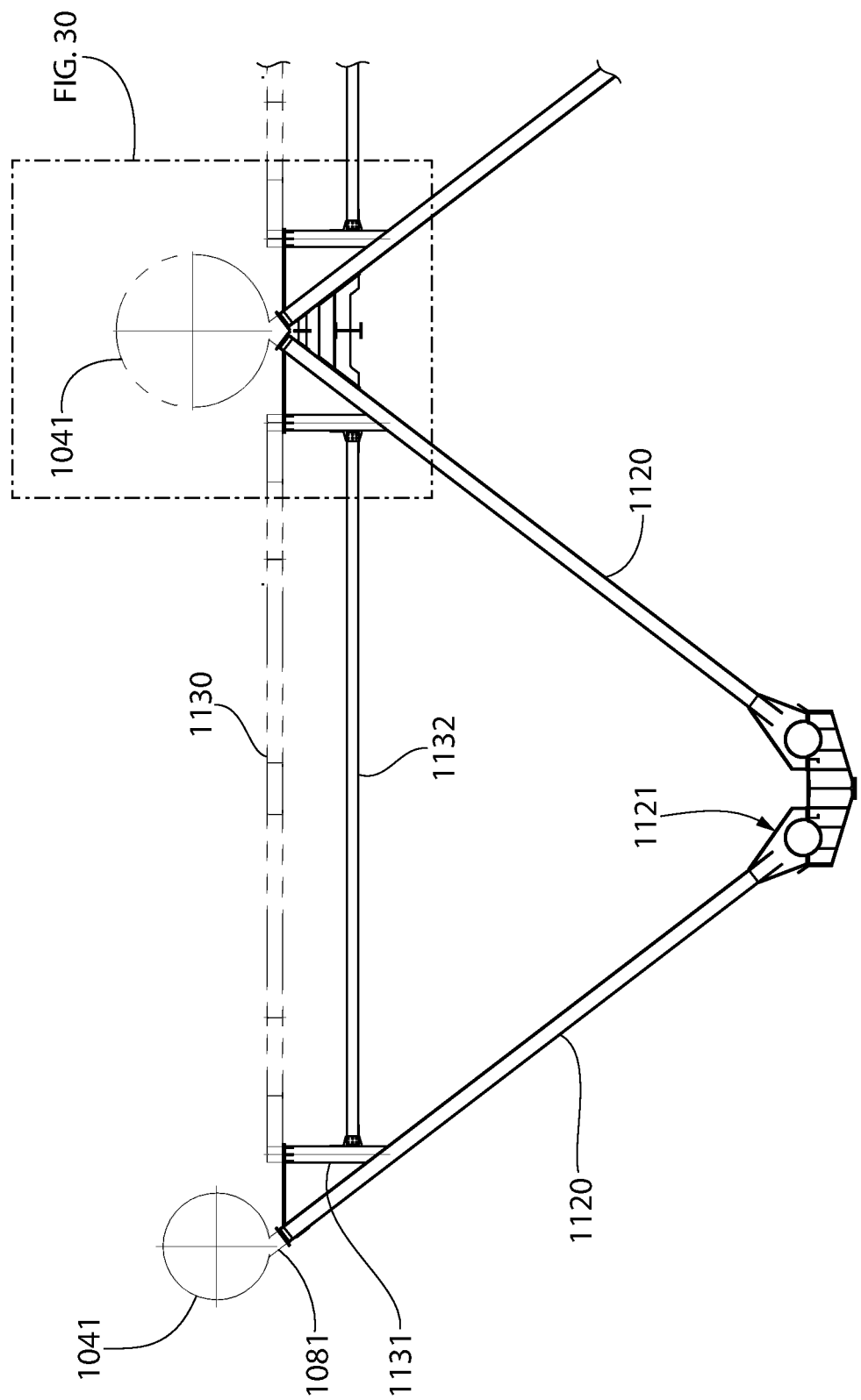
FIG. 29 is a side view of a deflection limiter beam assembly of the support frame of the ACC also showing the top steam headers.

Referring particularly to FIGS. 24-26, the bottom ends of each DLB 1120 comprise a physically robust and enlarged structural mounting end assembly 1121 configured for mounting directly to the condensate header support beams 1102. The mounting end assemblies 1121 may be considered to have a generally trapezoidal shape with a narrow upper portion and wider lower portion as best shown in FIG. 26. Each mounting end assembly may comprise a generally trapezoid shaped flat face plate 1122 surrounded on the top and lateral sides by a perpendicularly oriented peripheral flange plates 1123 which extend perimetrically around the face plate. The bottom of the face plate may include a perpendicularly oriented bottom mounting flange 1125 which mates with a corresponding top mounting flange 1126 on each condensate header support beam 1102 forming a flat-to-flat interface and abutting engagement. The mounting flanges 1125, 1126 may be preferably be bolted together to provide a detachable coupling. In other embodiments, however, the flanges may be welded together.

Each structural mounting end assembly 1121 further comprises a generally downward facing upper concave entrapment surface 1127 which is complementary configured to the lower support surfaces 1061 of saddle supports 1060 (best shown in FIG. 26). Accordingly, the entrapment surface 1127 of the mounting end assemblies are also configured to complement the diameter of the condensate headers 1042 such that the headers are trapped beneath and abuttingly engaged with the support surfaces 1127 when the mounting end assemblies are mounted to the condensate header support beams 1102. The structural mounting end assemblies 1121 of the DLBs 1120 therefore locking each condensate header 1042 to the ACC in a manner which resists and prevents movement in the vertical and lateral directions perpendicular to longitudinal axis LA. The condensate headers 1042 however are not longitudinally restrained by the mating concave support and entrapment surfaces 1061, 1127 and thus are free to slide and grow/contract in the longitudinal direction parallel to longitudinal axis LA. The concave entrapment surfaces 1127 of each structural coupling assembly 1121 may be formed of steel plate 1124 of suitable thickness and longitudinal width rolled to match the diameter of the condensate headers similarly to the saddle support surfaces 1061. Since the weight of the condensate headers 1042 rests on the lower support surface 1061 instead of the upper entrapment surface 1127, the plate for the entrapment surfaces 1127 may have a shorter longitudinal width than the lower support surfaces. In one non-limiting example, the saddle support plates may be about 1 inch thick and 3 inches in longitudinal width sufficient to entrap the condensate headers 1042. It bear noting that when the structural mounting end assemblies 1121 are mounted to the condensate header support beams 1102, the opposing concave support and entrapment surfaces 1061, 1127 form a complete circumferentially-extending continuous circle which encircles the condensate headers 1042.

It bears noting that each condensate header support beam 1102 is not coupled to a DLB 1120. The number of DLBs required on each side of the "V" of each ACC cooling cell 1040A will depend on the weight of the fan assembly/motor/gear box, steam headers 1041, and other structural components which might transfer load to the fan deck 1051. Accordingly, there may be a few number of DLBs provided for each cooling cell than condensate header support beams 1102 (see, e.g. FIGS. 27-28).

Referring generally to FIGS. 22-46, ACC 1040 also includes fan platform 1045-1 which supports the fan 1050. Fan 1050 may be similar to fan 50 and includes electric motor 53, and gear box 54 coupled to the hub of the fan from which the fan blades 56 project radially outwards (see, e.g. FIG. 3). The fan 1050 in this embodiment is mounted at the top of the cooling cell 1040A such that the motor and gear box (not shown in FIGS. 22-46) may be mounted below the fan blades 1056 instead of above. The DLBs 1120 create a support structure for the fan/motor/gear box assembly such that their weight is transferred to the main beam 1100, columns 1106, and to the foundation 1108 via the DLBs without passing loads through the tube bundles 1043; albeit the DLBs are arranged coplanar with and interspersed between selected tube bundles. The fan platform may be formed by a plurality of abutted flat fan deck plates 1051 similarly to fan platform 45-1 previously described herein. Fan 1050 is supported by a structural fan bridge 1133 of suitable construction to support the weight of the fan and related appurtenances such as the gear box and motor. The bridge and fan deck plate are mounted to and supported by a deck structure comprising plurality of horizontal support beams 1130 including some exterior support beams 1130A which extend perimetrically to form a rectilinear peripheral frame, and some interior support beams 1130B which extend through the interior between the peripheral frame (see, e.g. FIGS. 29-31). Exterior support beams 1130A are supported directly to the DLBs 1120 by vertical structural members 1131 which transfer the load directly to the DLBs. Horizontal bracing 1132 may be provided between laterally opposed pairs of vertical structural members. The foregoing deck structure ensures that no weight load is transmitted to the tube bundles 1043 or headers 1041, 1042. The fan platform 1045-1 is also supported in part by pairs of vertical posts mounted at their bottom ends to the lower walkway 1114 and condensate header support beams 1102 and at top to the horizontal exterior support beams 1130A.

Figure 35:
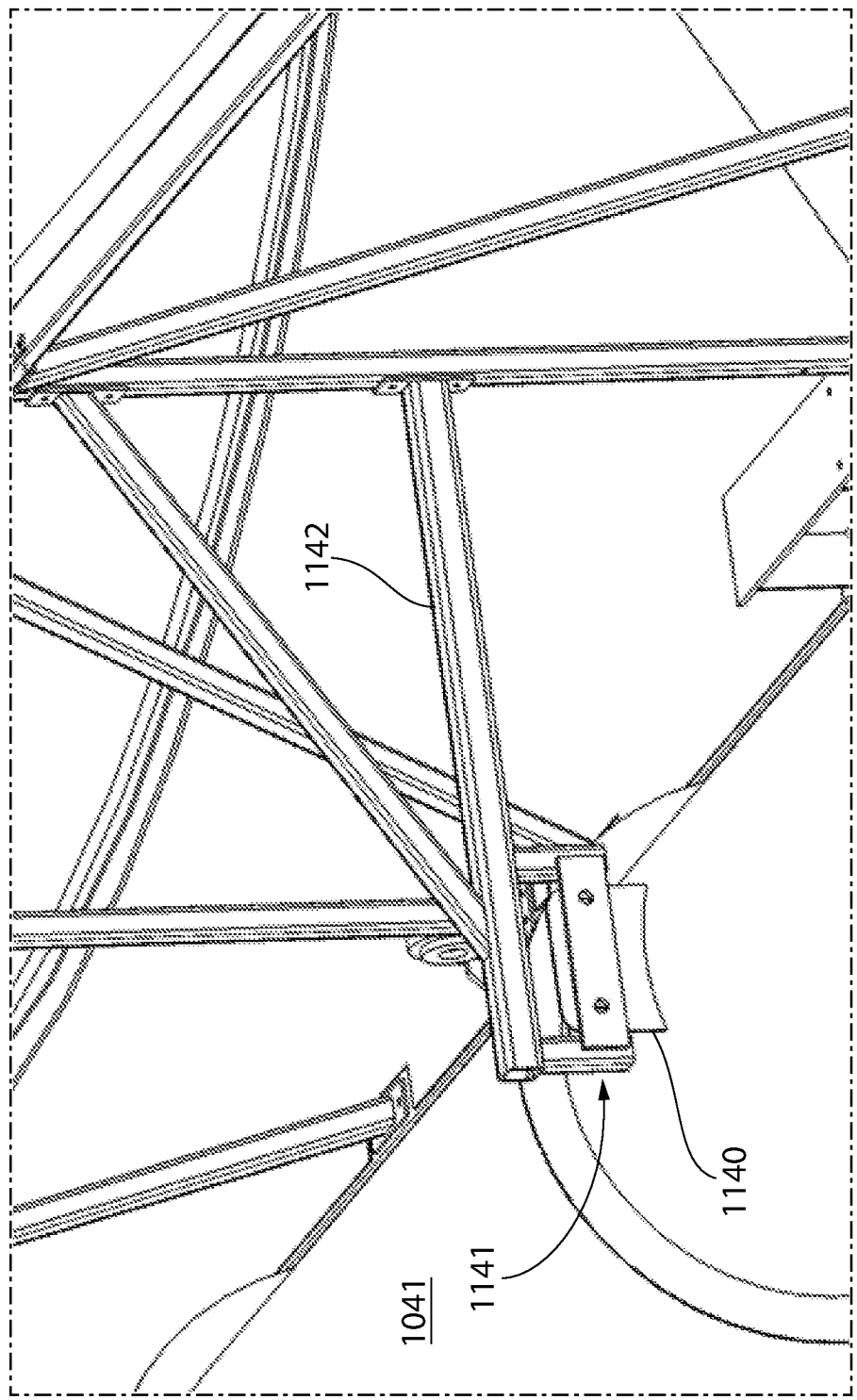
FIG. 35 is a perspective view of a guide tab system of the steam headers.
Figure 36:
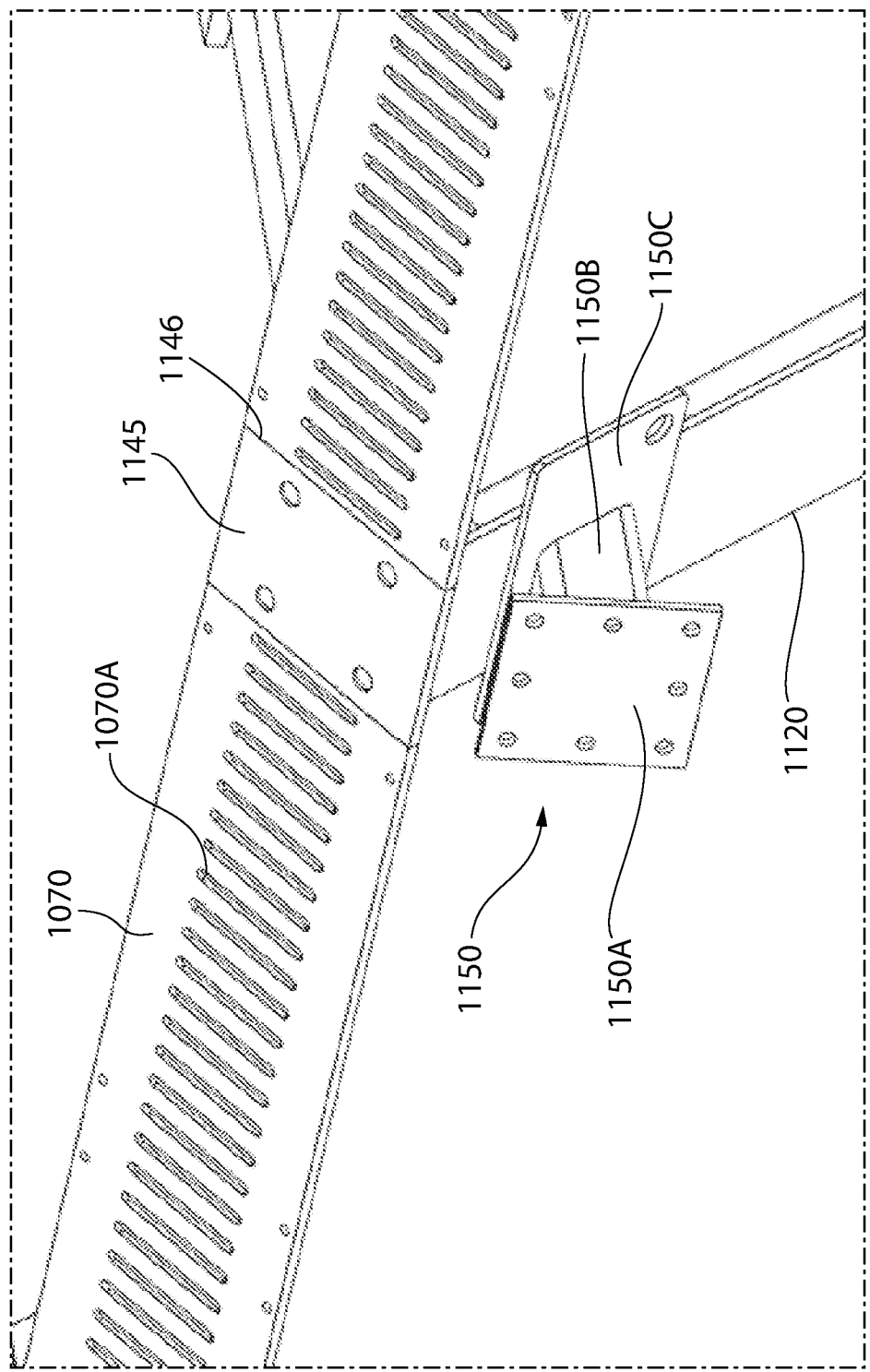
FIG. 36 is a perspective view of the upper end of a deflection limiter beam and associated floating end cap affixed to the upper tubesheet.

Referring to FIG. 35, in some embodiments the steam headers may include upward projecting restraint tabs 1140 which are slideably received in a guide structure 1141. The tabs limit the longitudinal growth of the steam headers 1041, but the guide structure is configured to allow diametrical growth and expansion of the headers as steam is introduced.

Figure 40:
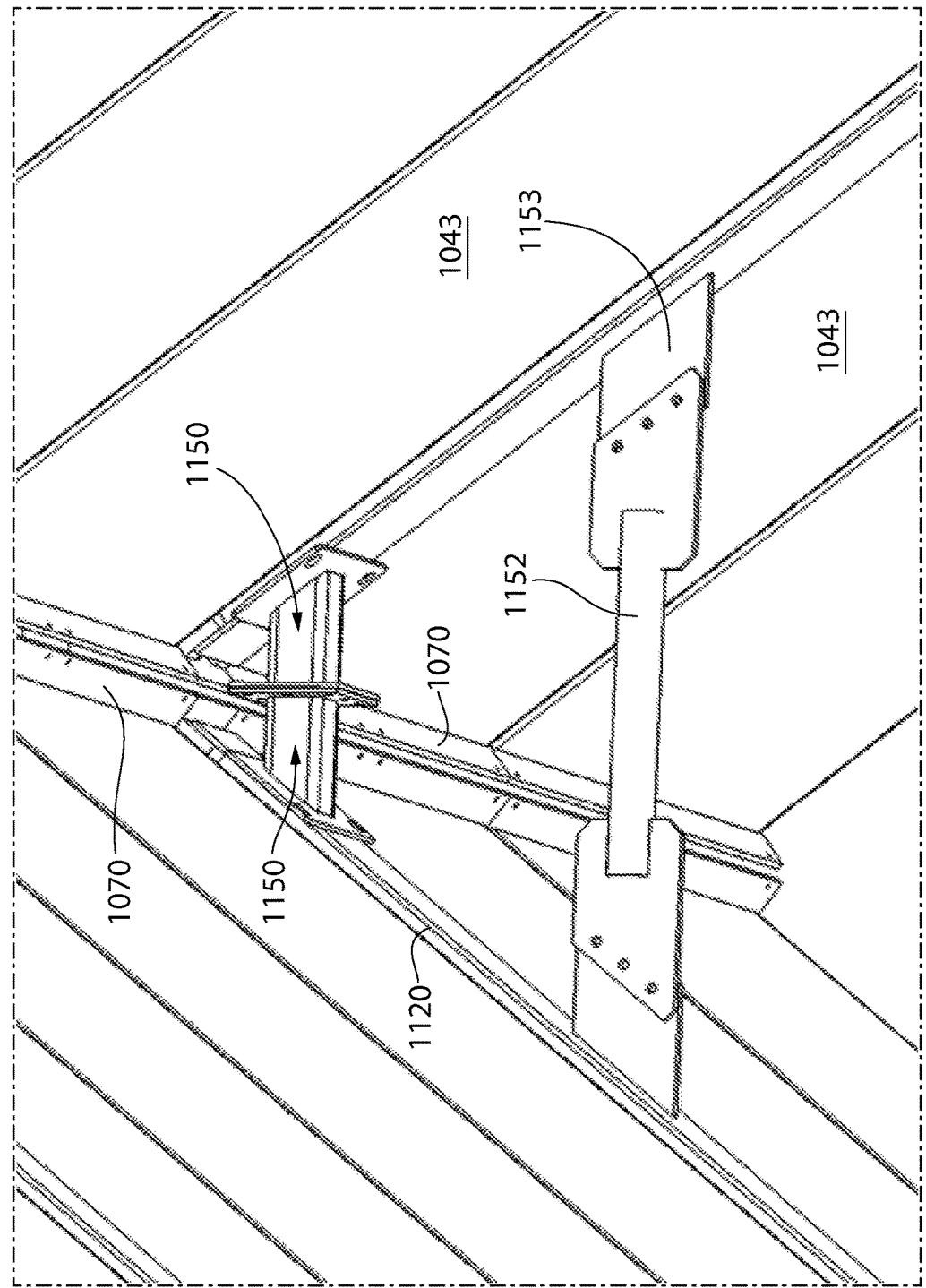
FIG. 40 is a perspective view of a cooling cell coupling or joining system.
Figure 41:
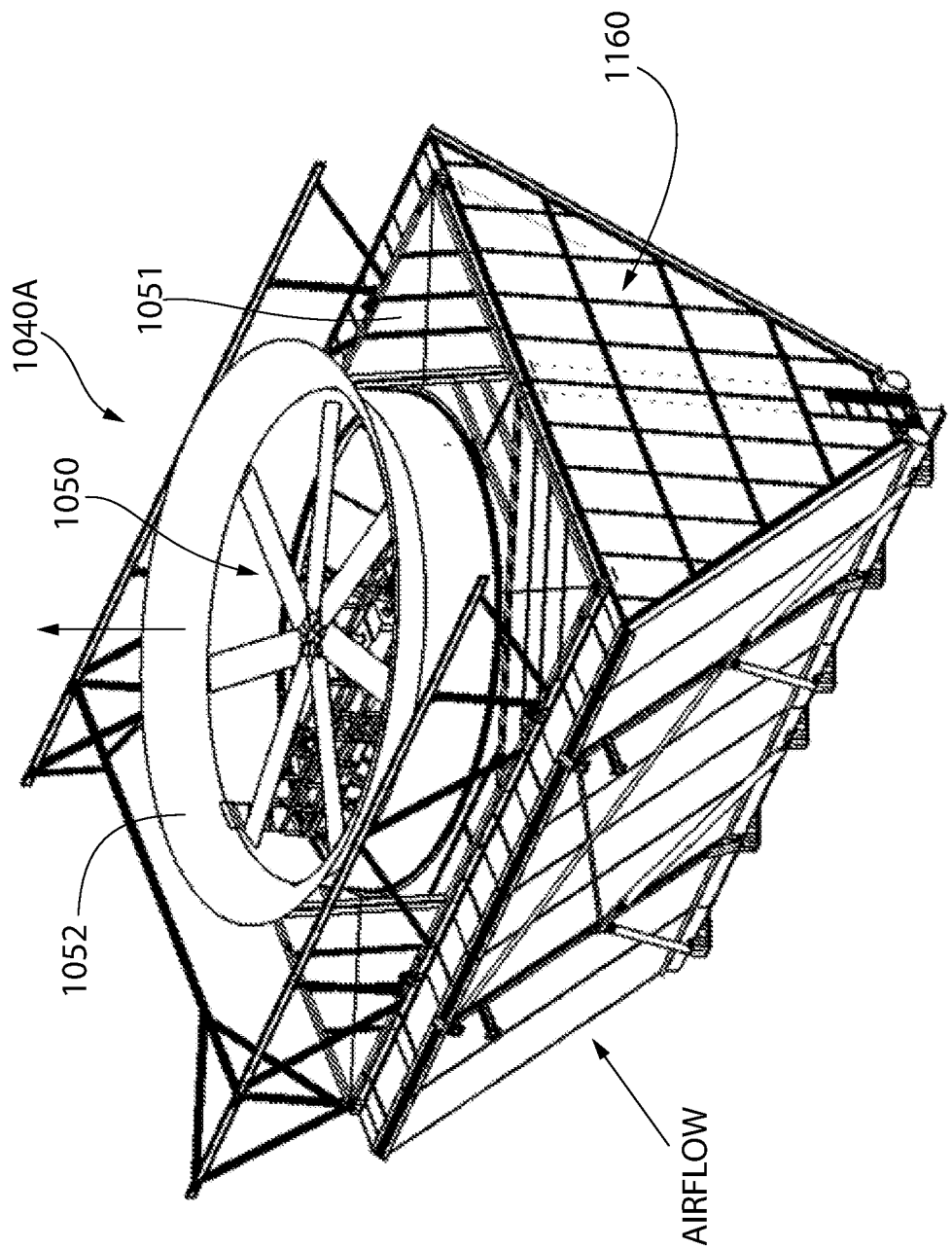
FIG. 41 is a perspective view of a single V-shaped cooling cell.
Figure 42:
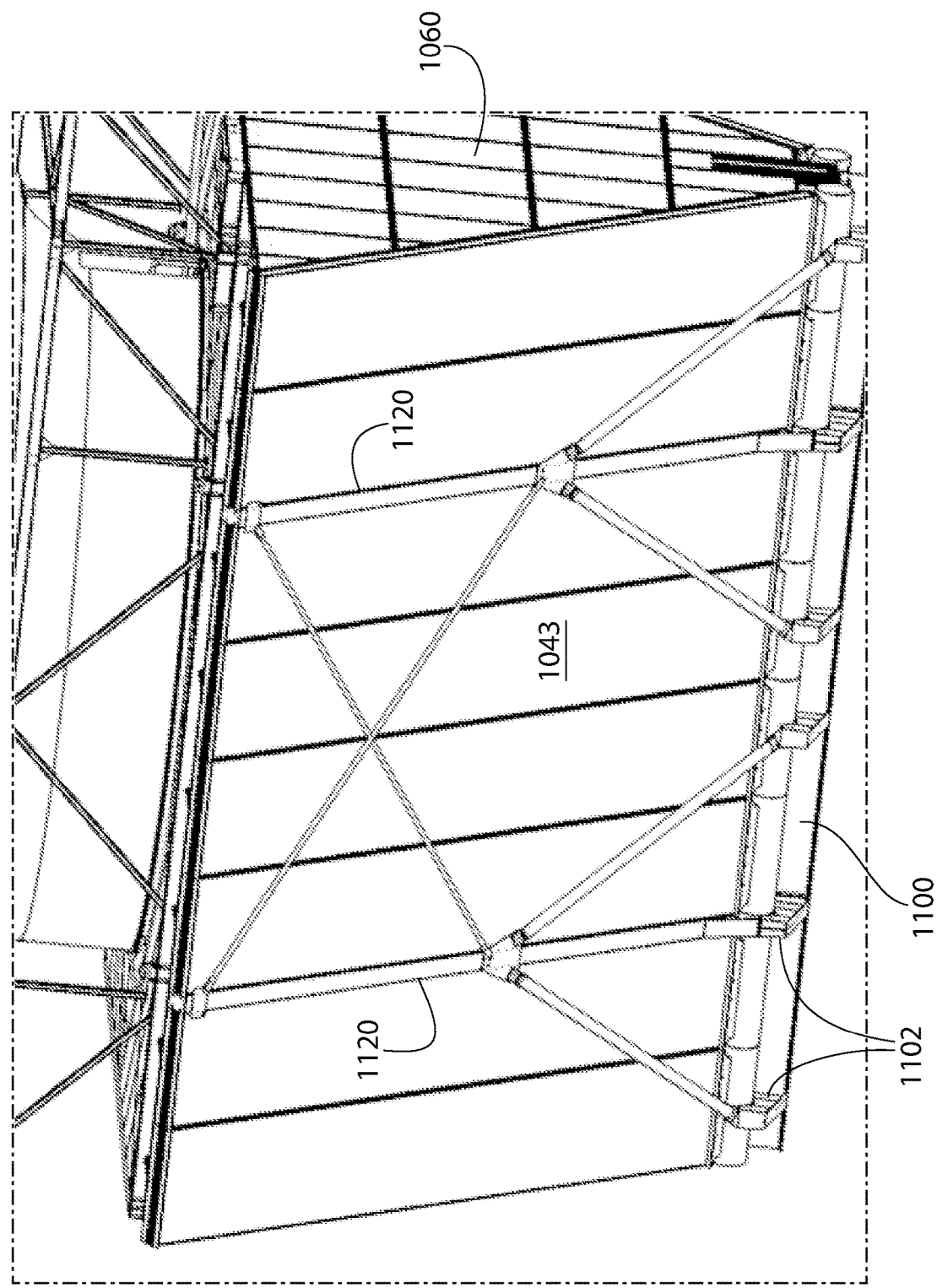
FIG. 42 is an enlarged detailed view thereof.
Figure 43:
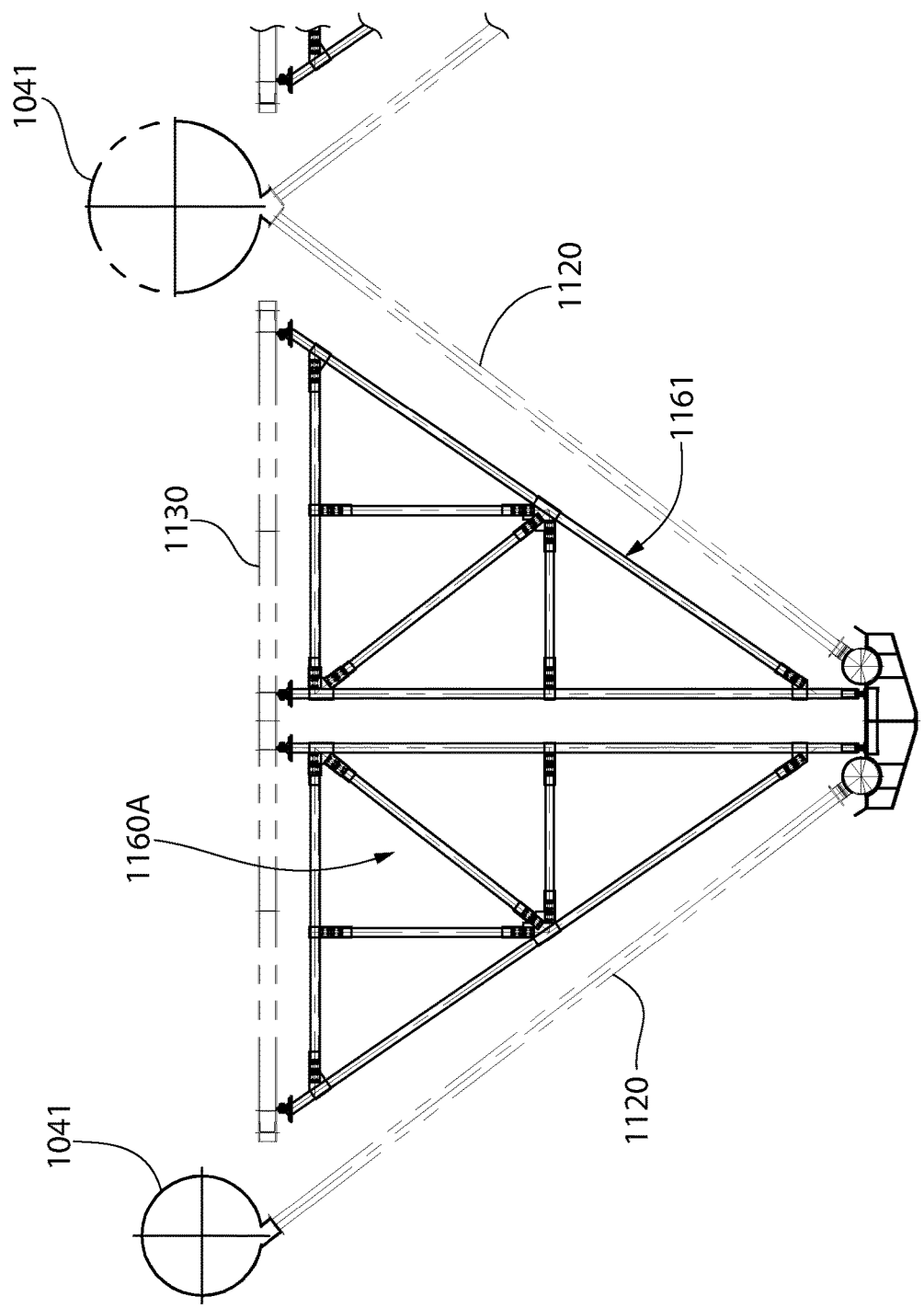
FIG. 43 is a side view of a cooling cell end wall support frame.
Figure 44:
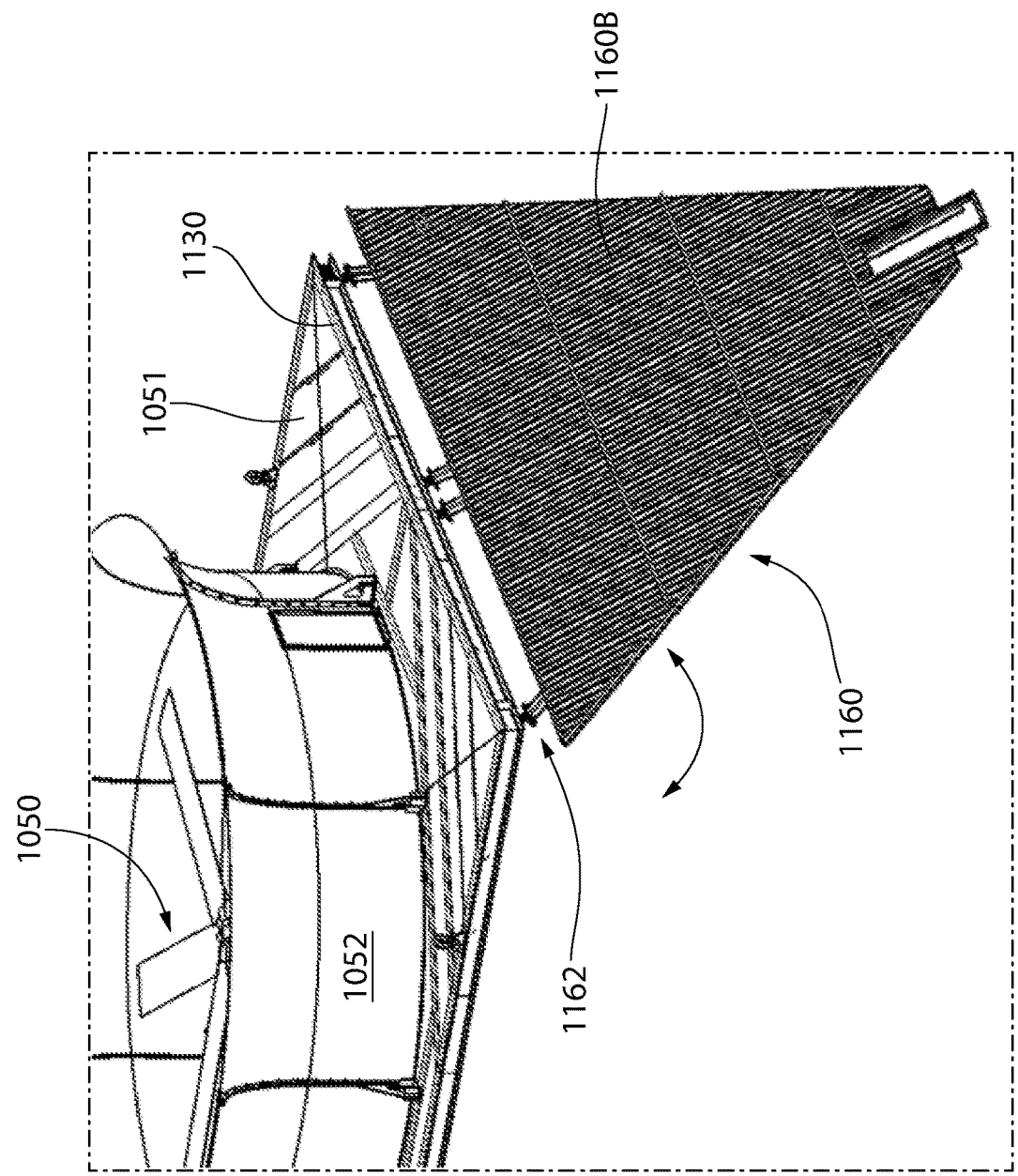
FIG. 44 is a perspective view of the end wall hinged mounting features showing the end wall in a partially mounted angled position.
Figure 45:
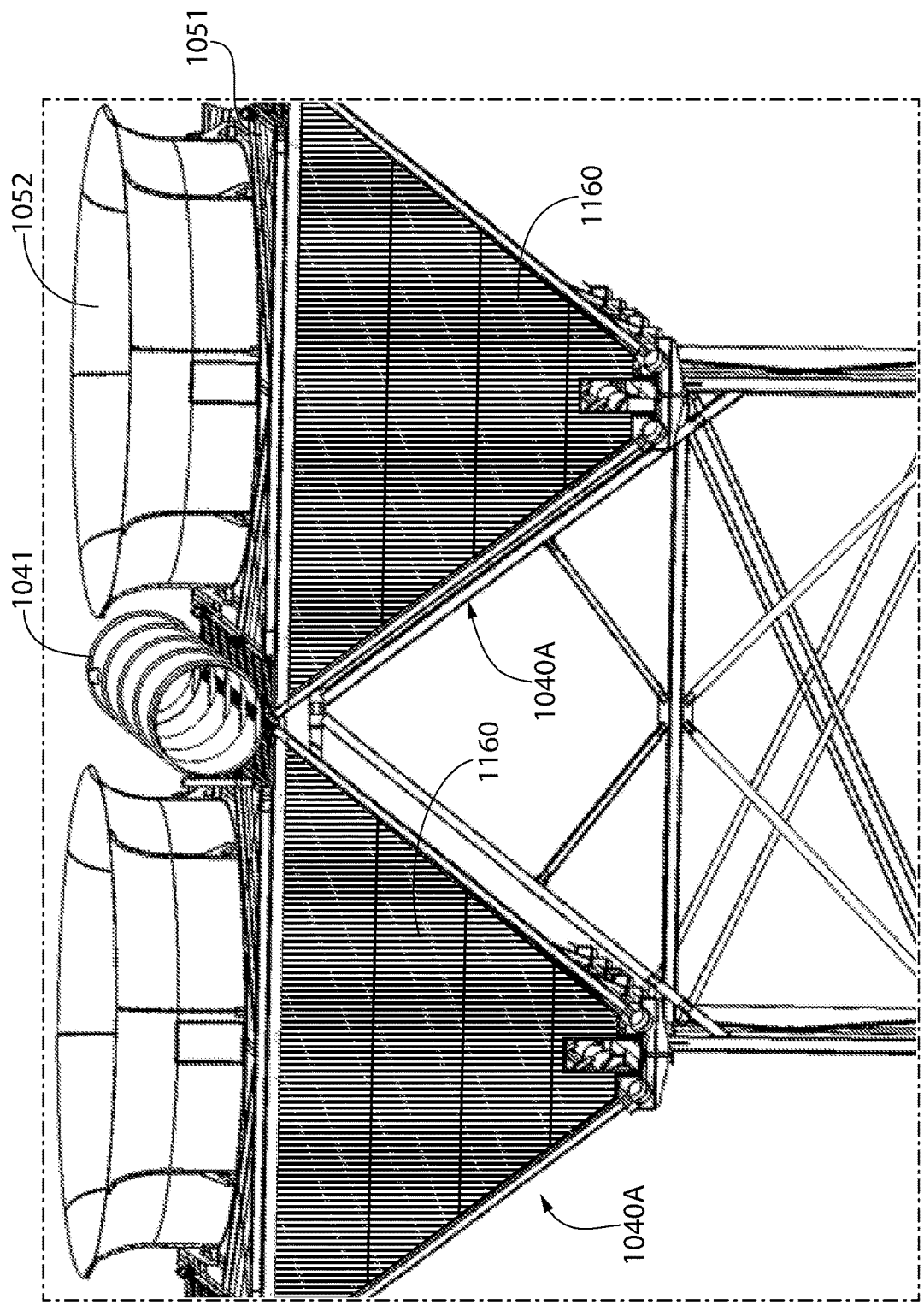
FIG. 45 is a perspective view of a pair of laterally adjacent cooling cell showing the end walls in a fully mounted vertical position.
Figure 46:
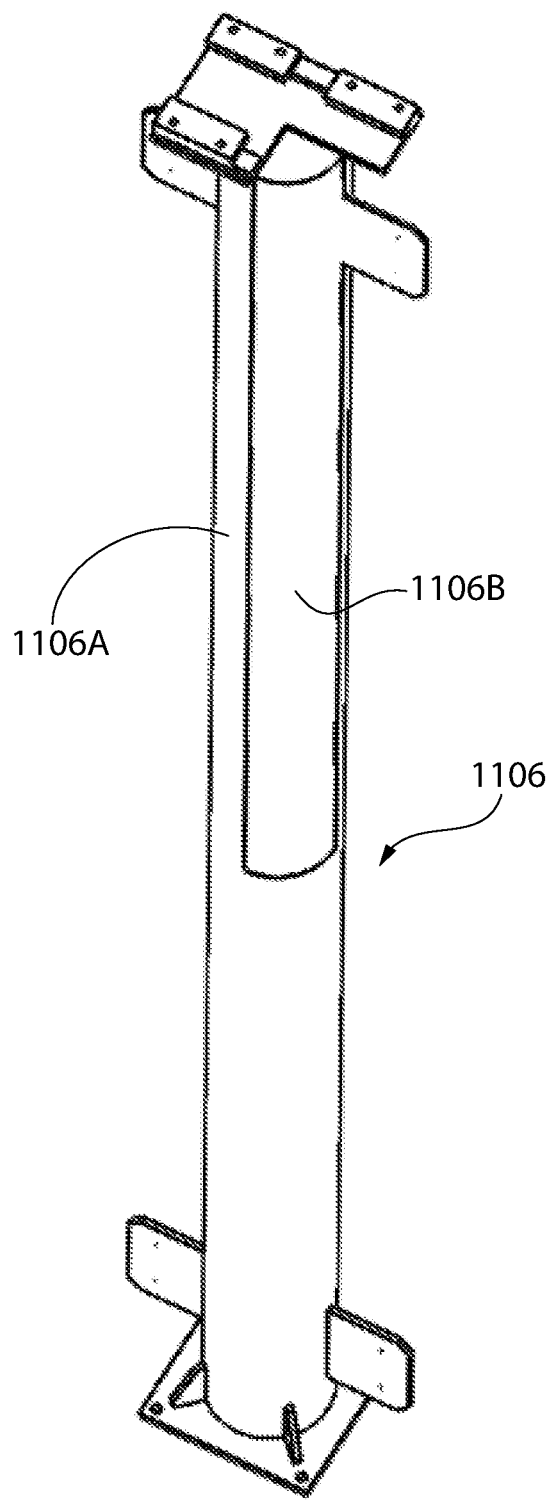
FIG. 46 is a perspective view of a hybrid support column including a steel outer pipe and inner concrete core for supporting the cooling cell.

Referring to FIG. 40, the inter cell assembly features are shown. Each cooling cell 1040A includes an upper cell coupling member 1150 and lower cell coupling lug 1153. The coupling member 1150 comprises a tube and perpendicularly oriented flat coupling plate with bolt holes at one free end of the tube (see also FIGS. 36-39). The other fixed end of the tube is attached to the DLB 1120 as shown. The lower cell coupling lugs 1153 of two adjacent cooling cells are coupled together via a tie bar 1152 with fasteners. When two laterally adjacent cooling cells 1040A are erected and coupled together at the installation site, shim plates (not shown) may be added between the adjoining upper cell coupling members 1150 of both cells to compensate for horizontal gaps between the coupling members. Horizontal gaps between lower cell coupling lugs 1153 may be accommodated by the tie bar 1152.

According to another aspect of the disclosure, the opposing end walls 1160 of each cooling cell 1040A may be erected via pivoting coupling mechanism. The end walls prevent ambient air from flowing directly through the ends of the cells to the fan, thereby forcing the ambient air to flow through the tube bundles 1043 instead to condense the steam. Referring to FIGS. 41-45, the end walls are formed of a structural frame 1160A of generally triangular configuration. Sheathing 1060B is applied to each frame to formed a solid end wall. A plurality of hinged joints 1162 are formed between the top peripheral edge of the end wall and the edge of the fan deck 1051. A related method of attaching each end wall 1160 to each longitudinal end of a cooling cell 1040A includes erecting a cooling cell at an installation site, lifting an end wall via a crane or other suitable equipment, aligning a first set of first hinge members (e.g. round barrels or knuckles defining through holes) on the top of the end wall with a corresponding second set of second hinge members on an upper portion of the cooling cell (e.g. fan deck), and inserting a pin through each set of first and second sets of hinge members defining a plurality of hinge joints. The method may also comprise pivoting the end wall from an open position to a closed position.

The headers, tubes and fins, flow plenums, fan platform and its support frame, saddle supports, monorail and its support system, and other fluid related or structural members described herein may preferably be made of an appropriate metallic material suitable for the service conditions encountered.

II. Inventive Concept 2

With reference to FIGS. 47A-61, a second inventive concept will be described.

Figure 49A:
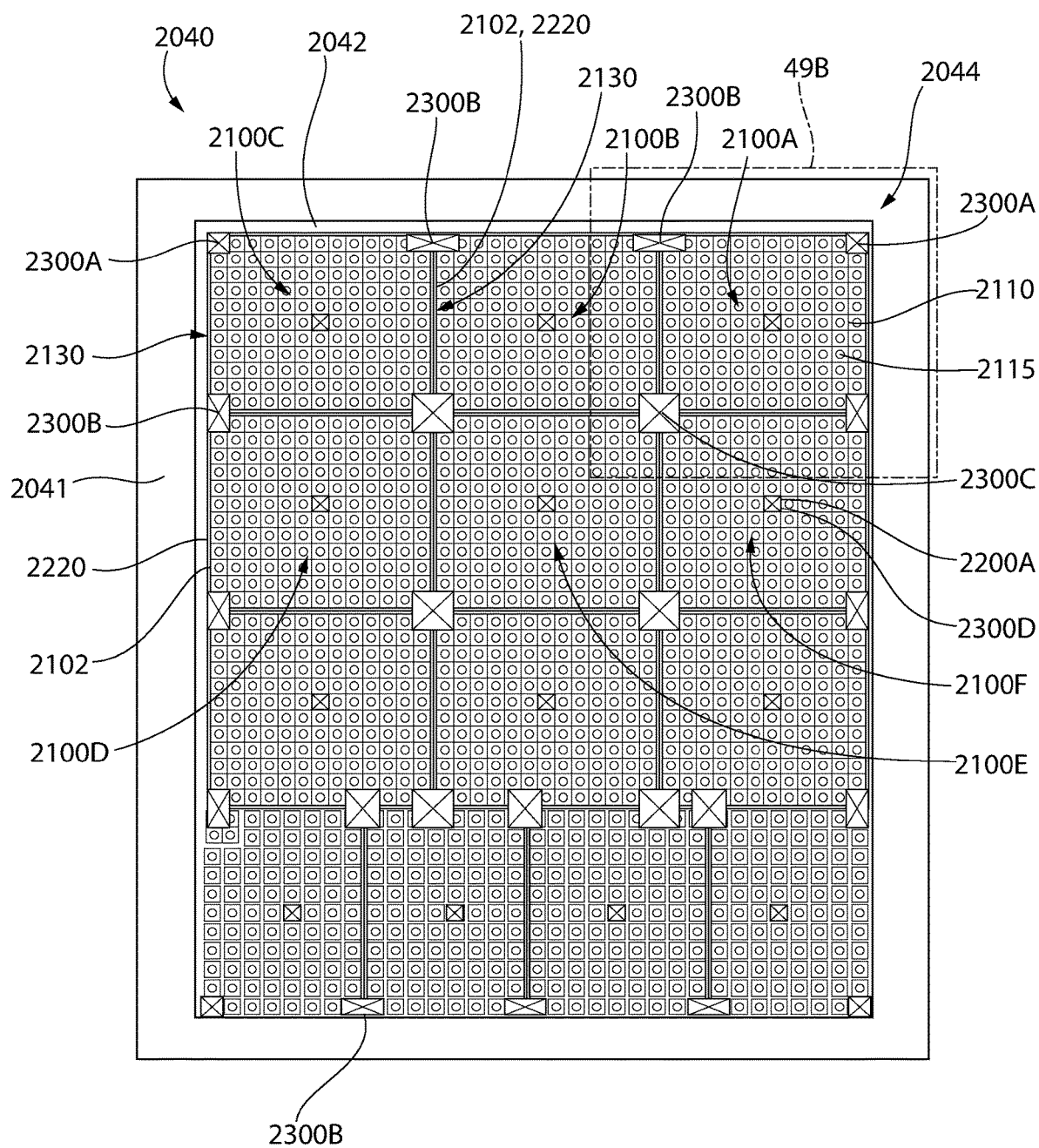
FIG. 49A is a top plan view of a nuclear fuel wet storage system comprising a nuclear fuel pool containing multiple fuel racks of FIG. 48A forming a wet nuclear fuel storage system.
Figure 49B:
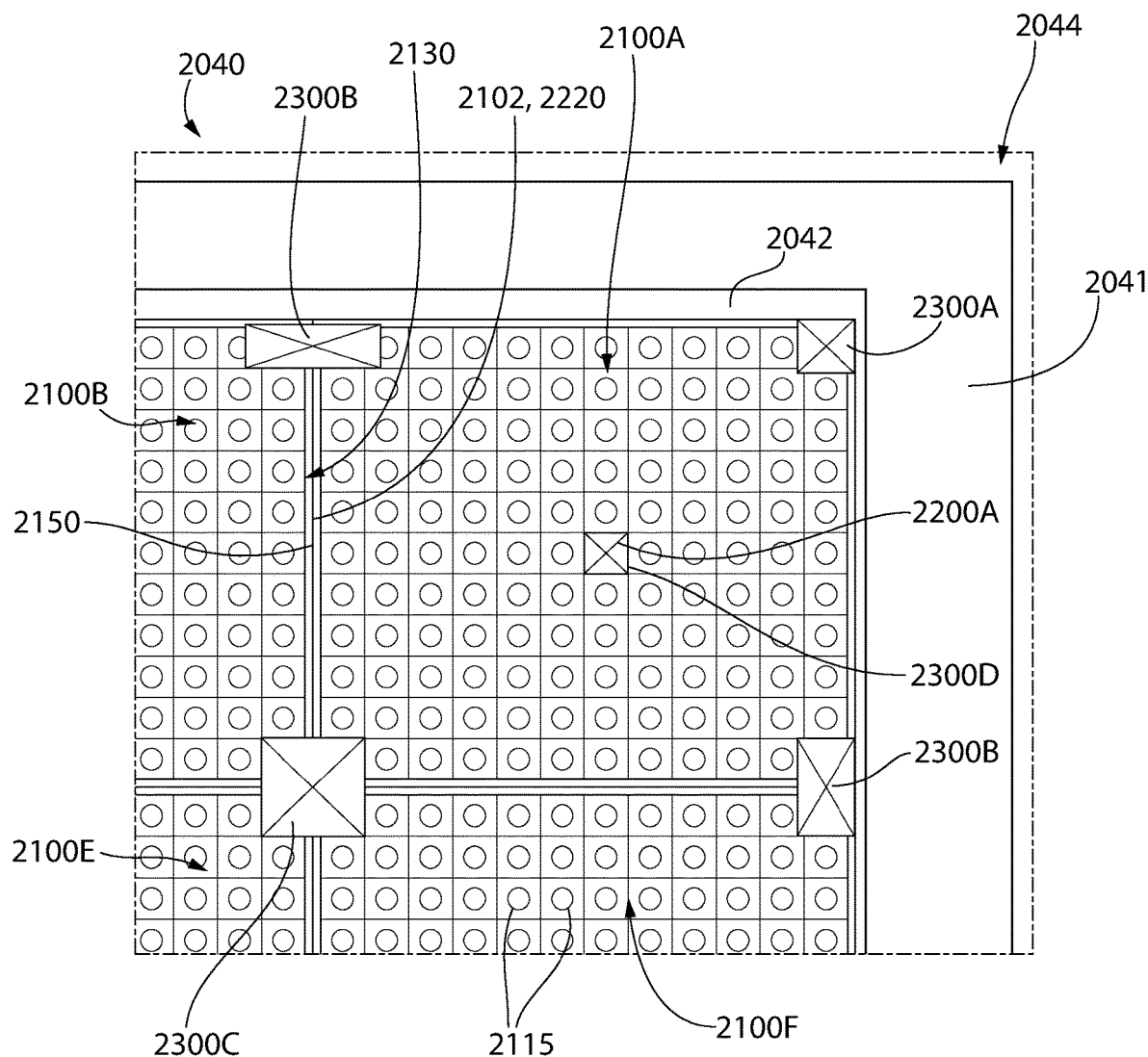
FIG. 49B is a detail taken from FIG. 49A.
Figure 52:
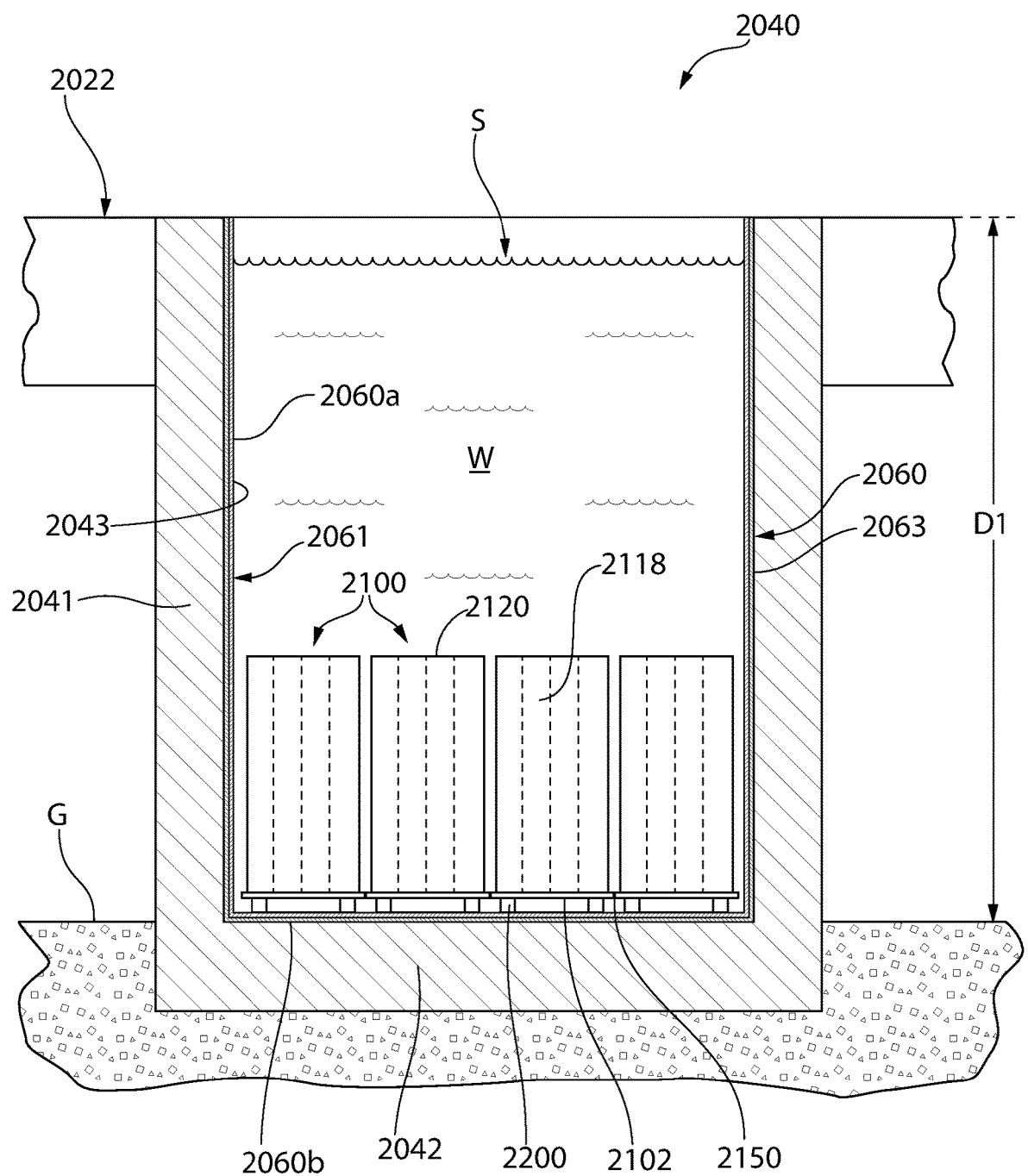
FIG. 52 is a side elevation partial cross sectional view of a nuclear fuel wet storage system comprising the fuel pool and multiple fuel racks.

Referring to FIGS. 49 and 52, a nuclear facility which may be a nuclear generating plant includes a fuel pool 2040 according to the present disclosure configured for storing a plurality of nuclear fuel racks 2100. The fuel pool 2040 may comprise a plurality of vertical sidewalls 2041 rising upwards from an adjoining substantially horizontal bottom base wall or slab 2042 (recognizing that some slope may intentionally be provided in the upper surface of the base slab for drainage toward a low point if the pool is to be emptied and rinsed/decontaminated at some time and due to installation tolerances). The base slab 2042 and sidewalls 2041 may be formed of reinforced concrete in one non-limiting embodiment. The fuel pool base slab 2042 may be formed in and rest on the soil sub-grade 2026, the top surface of which defines grade G. In this embodiment illustrated in the present application, the sidewalls are elevated above grade. The base slab 2042 may be located at grade G as illustrated, below grade, or elevated above grade. In other possible embodiments contemplated, the base slab 2042 and sidewalls 2041 may alternatively be buried in sub-grade 2026 which surrounds the outer surfaces of the sidewalls. Any of the foregoing arrangements or others may be used depending on the layout of the nuclear facility and does not limit of the invention.

In one embodiment, the fuel pool 2040 may have a rectilinear shape in top plan view. Four sidewalls 2041 may be provided in which the pool has an elongated rectangular shape (in top plan view) with two longer opposing sidewalls and two shorter opposing sidewalls (e.g. end walls). Other configurations of the fuel pool 2040 are possible such as square shapes, other polygonal shapes, and non-polygonal shapes.

Figure 59:
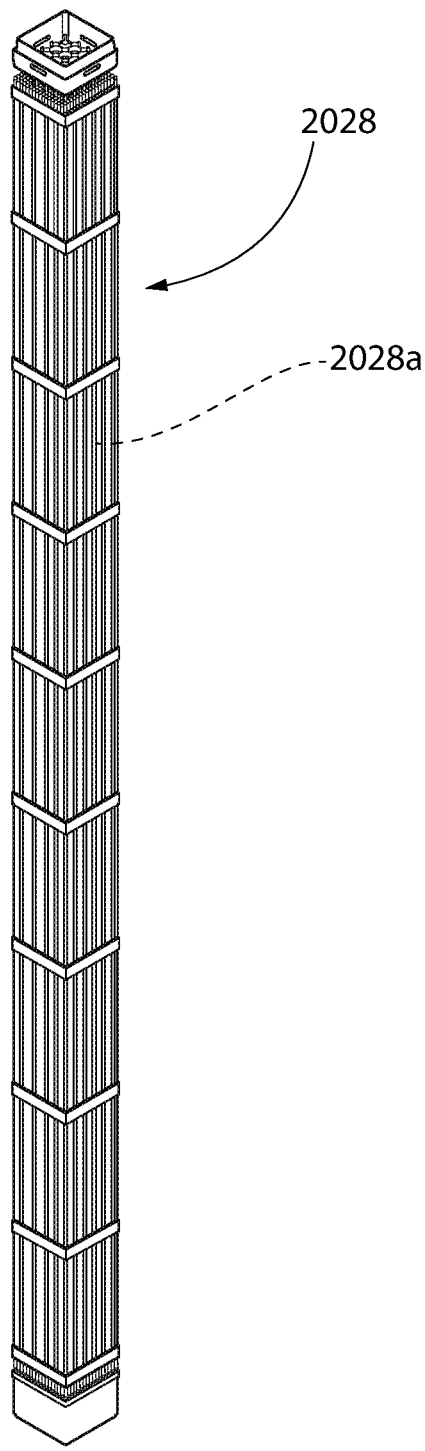
FIG. 59 is a perspective view of a nuclear assembly.

The sidewalls 2041 and base slab 2042 of the fuel pool 2040 define an upwardly open well or cavity 2043 configured to hold cooling pool water W and the plurality of submerged nuclear fuel racks 2100 each holding multiple nuclear fuel bundles or assemblies 2028 (a typical one shown in FIG. 59). Each fuel assembly 2028 contains multiple individual new or spent uranium fuel rods 2028a. Fuel assemblies are further described in commonly assigned U.S. patent application Ser. No. 14/413,807 filed Jul. 9, 2013, which is incorporated herein by reference in its entirety. Typical fuel assemblies 2028 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each. The fuel racks 2100 storing the fuel assemblies are emplaced on the base slab 2042 in a high-density arrangement in the horizontally-abutting manner as further described herein.

The fuel pool 2040 extends from an operating deck 2022 surrounding the fuel pool 2040 downwards to a sufficient vertical depth D1 to submerge the fuel assemblies 2028 in the fuel rack (see, e.g. FIG. 52) beneath the surface level S of the pool water W for proper radiation shielding purposes. The substantially horizontal operating deck 2022 that circumscribes the sidewalls 2041 and pool 2040 on all sides in one embodiment may be formed of steel and/or reinforced concrete. In one implementation, the fuel pool may have a depth such that at least 10 feet of water is present above the top of the fuel assembly. Other suitable depths for the pool and water may be used of course. The surface level of pool water W (i.e. liquid coolant) in the pool 2040 may be spaced below the operating deck 2022 by a sufficient amount to prevent spillage onto the deck during fuel assembly loading or unloading operations and to account to seismic event. In one non-limiting embodiment, for example, the surface of the operating deck 2022 may be at least 5 feet above the maximum 100 year flood level for the site in one embodiment. The fuel pool 2040 extending below the operating deck level may be approximately 40 feet or more deep (e.g. 42 feet in one embodiment). The fuel pool 2040 is long and wide enough to accommodate as many fuel racks 2100 and fuel assemblies 2028 stored therein as required. There is sufficient operating deck space around the pool to provide space for the work crew and for staging necessary tools and equipment for the facility's maintenance. There may be no penetrations in the fuel pool 2040 within the bottom 30 feet of depth to prevent accidental draining of water and uncovering of the fuel.

In some embodiments, a nuclear fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877,217 filed Oct. 7, 2015, which is incorporated herein by reference in its entirety.

The liner system in one embodiment may comprise a liner 2060 attached to the inner surfaces 2063 of the fuel pool sidewalls 2041 and the base slab 2042. The inside surface 2061 of liner is contacted and wetted by the fuel pool water W. The liner 2060 may be made of any suitable metal of suitable thickness T2 which is preferably resistant to corrosion, including for example without limitation stainless steel, aluminum, or other. Typical liner thicknesses T2 may range from about and including 3/16 inch to 5/16 inch thick. Typical stainless steel liner plates include ASTM 240-304 or 304L.

In some embodiments, the liner 2060 may be comprised of multiple substantially flat metal plates or sections which are hermetically seal welded together via seal welds along their contiguous peripheral edges to form a continuous liner system completely encapsulating the sidewalls 2041 and base slab 2042 of the fuel pool 2040 and impervious to the egress of pool water W. The liner 2060 extends around and along the vertical sidewalls 2041 of the fuel pool 2040 and completely across the horizontal base slab 2042 to completely cover the wetted surface area of the pool. This forms horizontal sections 2060b and vertical sections 2060a of the liner to provide an impervious barrier to out-leakage of pool water W from fuel pool 2040. The horizontal sections of liners 2060b on the base slab 2042 may be joined to the vertical sections 2060a along perimeter corner seams therebetween by hermetic seal welding. The liner 2060 may be fixedly secured to the base slab 2042 and sidewalls 2041 of the fuel pool 2040 by any suitable method such as fasteners.

Referring now to FIGS. 48-52, a perspective view of a fuel rack 2100 according to one embodiment of the present invention is disclosed. The fuel rack 2100 is a cellular, upright, prismatic module. Fuel rack 2100 may be a high density, tightly packed non-flux type rack as illustrated which is designed to be used with fuel assemblies that do not require the presence of a neutron flux trap between adjacent cells 2110. Thus, the inclusion of neutron flux traps (e.g. gaps) in fuel racks when not needed is undesirable because valuable fuel pool floor area is unnecessarily wasted. Of course, both non-flux and flux fuel rack types may be stored side by side in the same pool using the seismic-resistant fuel storage system according to the present disclosure. The invention is therefore not limited to use of any particular type of rack.

Fuel rack 2100 defines a vertical longitudinal axis LA and comprises a grid array of closely packed open cells 2110 formed by a plurality of adjacent elongated tubes 2120 arranged in parallel axial relationship to each other. The rack comprises peripherally arranged outboard tubes 2120A which define a perimeter of the fuel rack and inboard tubes 2120B located between the outboard tubes. Tubes 2120 are coupled at their bottom ends 2114 to a planar top surface of a baseplate 2102 and extend upwards in a substantially vertical orientation therefrom. In this embodiment, the vertical or central axis of each tube 2120 is not only substantially vertical, but also substantially perpendicular to the top surface of the baseplate 102. In one embodiment, tubes 2120 may be fastened to baseplate 2102 by welding and/or mechanical coupling such as bolting, clamping, threading, etc.

Tubes 2120 include a top end 2112, bottom end 2114, and a plurality of longitudinally extending vertical sidewalls 2116 between the ends defining a height H1. Each tube 2120 defines an internal cavity 2118 extending longitudinally between the top and bottom ends 2112, 2114. In the embodiment shown in FIG. 48A-B, four tube sidewalls 2116 arranged in rectilinear polygonal relationship are provided forming either a square or rectangular tube 2120 in lateral or transverse cross section (i.e. transverse or orthogonal to longitudinal axis LA) in plan or horizontal view (see also FIG. 59). Cells 2110 and internal cavities 2118 accordingly have a corresponding rectangular configuration in lateral cross section. The top ends of the tubes 2120 are open so that a fuel assembly can be slid down into the internal cavity 2118 formed by the inner surfaces of the tube sidewalls 2116. Each cell 2110 and its cavity 2118 are configured for holding only a single nuclear fuel assembly 2028.

It will be appreciated that each tube 2120 can be formed as a single unitary structural component that extends the entire desired height H1 or can be constructed of multiple partial height tubes that are vertically stacked and connected together such as by welding or mechanical means which collectively add up to the desired height H1. It is preferred that the height H1 of the tubes 2120 be sufficient so that the entire height of a fuel assembly may be contained within the tube when the fuel assembly is inserted into the tube. The top ends 2112 of tubes 2120 may preferably but not necessarily terminate in substantially the same horizontal plane (defined perpendicular to longitudinal axis LA) so that the tops of the tube are level with each other. The baseplate 2102 at the bottom ends 2114 of the tubes defines a second horizontal reference plane HR.

Figure 48A:
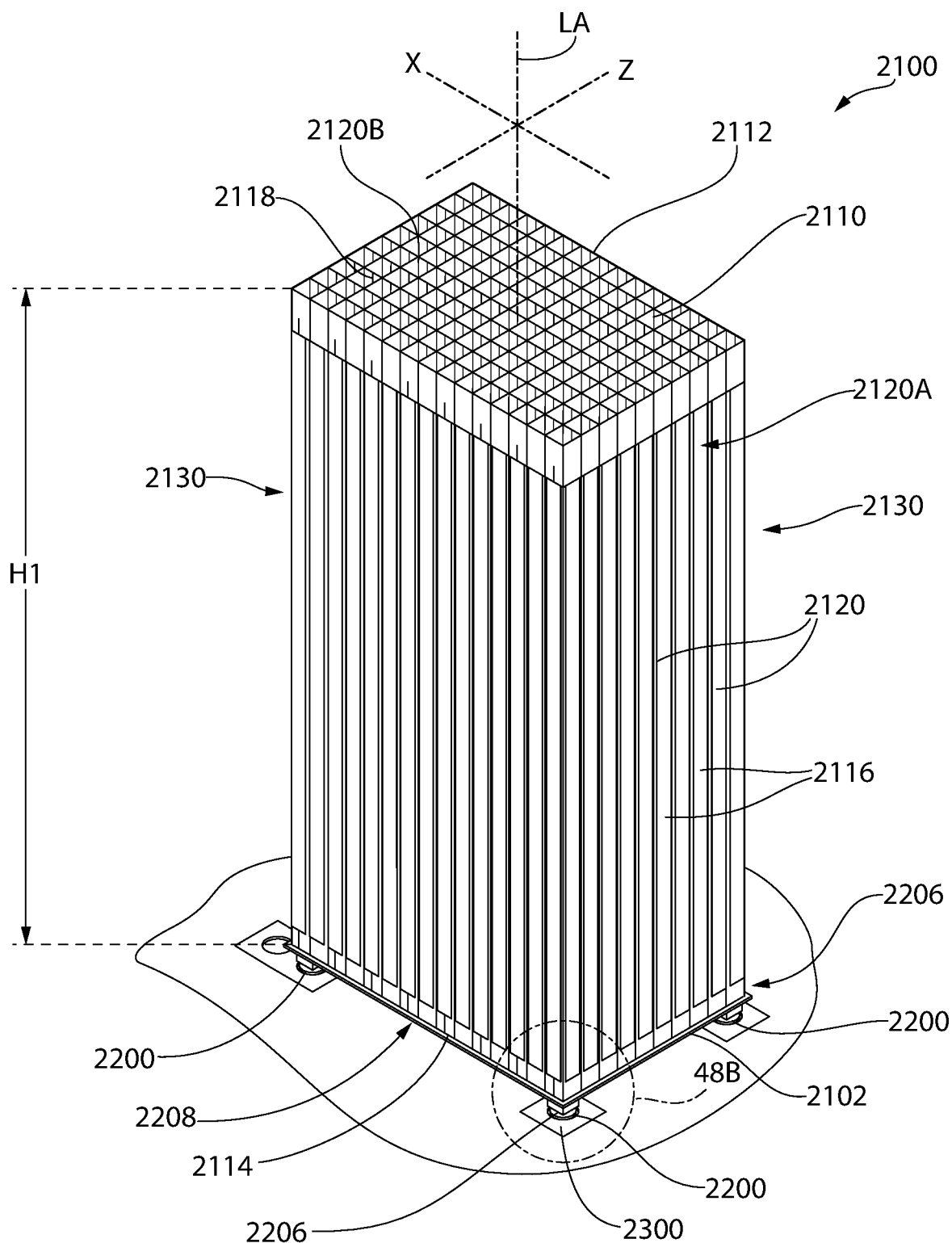
FIG. 48A is a perspective view of a nuclear fuel storage system for a fuel pool according to the present disclosure.
Figure 48B:
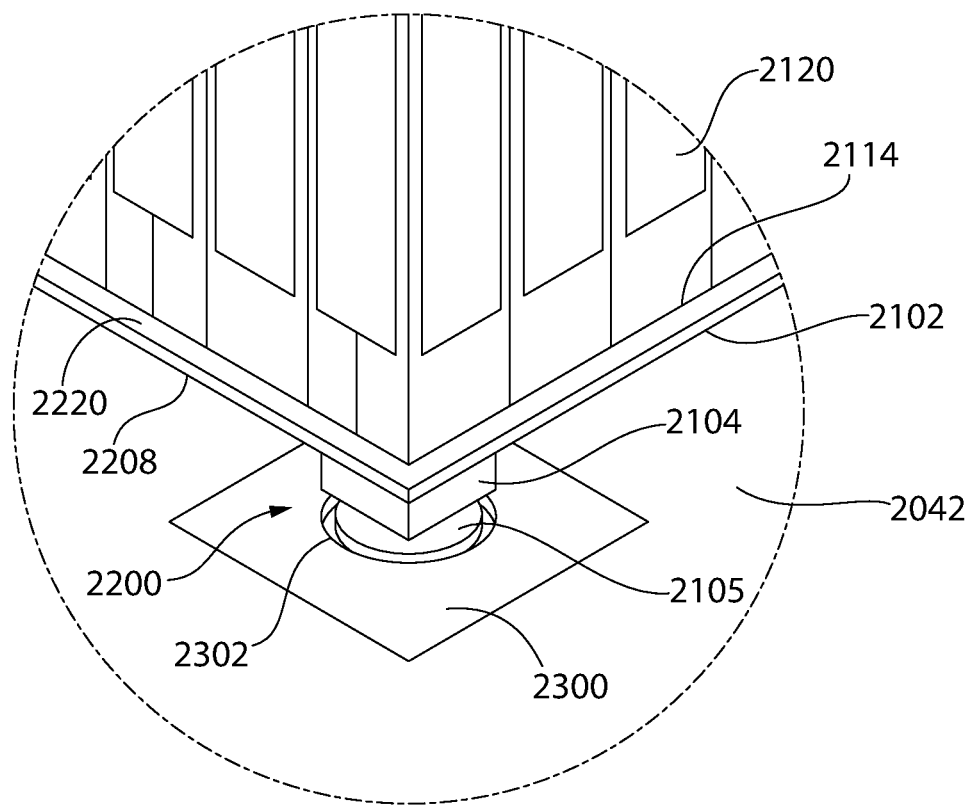
FIG. 48B is a detail taken from FIG. 48A.

As best shown in FIGS. 48A-B, tubes 2120 are geometrically arranged atop the baseplate 2102 in rows and columns along the Z-axis and X-axis respectively. Any suitable array size including equal or unequal numbers of tubes in each row and column may be provided depending on the horizontal length and width of the pool base slab 2042 and number of fuel racks 2100 to be provided. In some arrangements, some or all of the fuel racks 2100 may have unequal lateral width and lateral length as to best make use of a maximum amount of available slab surface area as possible for each installation.

For convenience of reference, the outward facing sidewalls 2116 of the outboard tubes 2120A may be considered to collectively define a plurality of lateral sides 2130 of the fuel rack 2100 extending around the rack's perimeter as shown in FIGS. 48A-B.

Tubes 2120 may be constructed of any suitable material usable in a nuclear fuel storage rack. In one embodiment, without limitation, the tubes may be formed of a metal-matrix composite material, and preferably a discontinuously reinforced aluminum/boron carbide metal matrix composite material, and more preferably a boron impregnated aluminum. One such suitable material is sold under the tradename Metamic™. The tubes 2120 perform the dual function of reactivity control as well as structural support. Advantageously, tube material incorporating the neutron absorber material allows a smaller cross sectional (i.e. lateral or transverse to longitudinal axis LA) thickness of tube sidewalls 2116 thereby permitting tighter packing of cells allowing for a greater number of cells per fuel rack to be provided. The baselate 2102 is preferably constructed of a metal that is metallurgically compatible with the material of which the tubes 2120 are constructed to facilitate welding.

Referring to FIGS. 48-52 (inclusive of all alphabetic subparts), each fuel rack 2100 comprises a plurality of legs or pedestals 2200 which support rack from the base slab 2042 of the fuel pool 2040. Pedestals 2200 each have a preferably flat bottom end 2204 to engage the pool base slab 2042 and a top end 2202 fixedly attached to the bottom of the baseplate 2102. The pedestals 2200 protrude downwards from baseplate 2102. This elevates the baseplates 2102 of the rack off the base slab 2042, thereby forming a gap therebetween which defines a bottom flow plenum P beneath rack 2100. The plenum P allows cooling water W in the pool to create a natural convective circulation flow path through each of the fuel storage tubes 2120 (see e.g. flow directional arrows in FIG. 51). A plurality of flow holes 2115 are formed in the rack through baseplate 2102 in a conventional manner to allow cooling water to flow upwards through the cavity 2118 of each tube 2120 and outward through the open top ends 2112 of the tubes. Commonly owned U.S. patent application Ser. No. 14/367,705 filed Jun. 20, 2014 shows fuel rack baseplates with flow holes, and is incorporated herein by reference in its entirety. The pool water W flowing through the tubes is heated by the nuclear fuel in fuel assemblies, thereby creating the motive force driving the natural thermal convective flow scheme.

Figure 51:
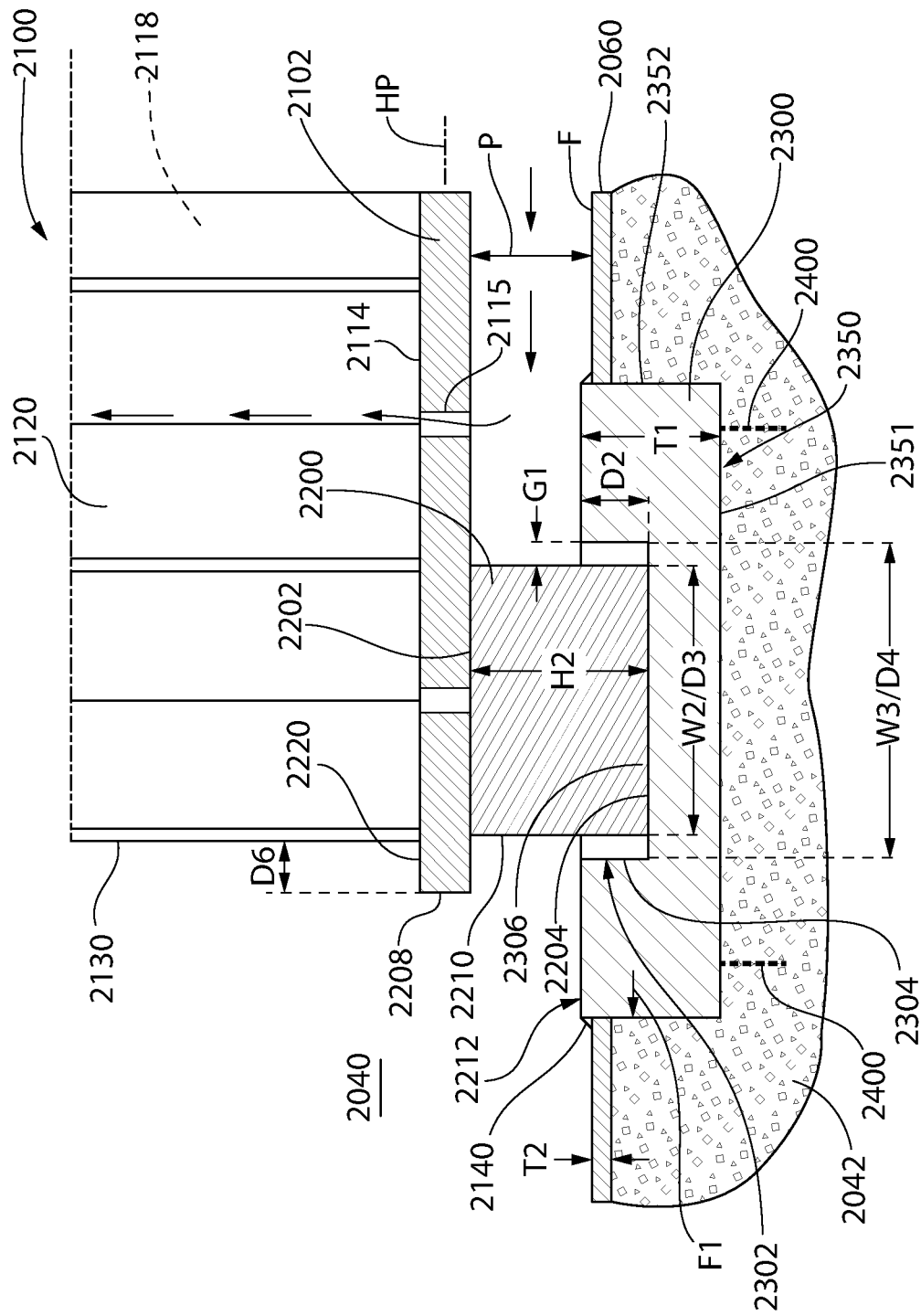
FIG. 51 is a detailed side elevation view showing a fuel rack support leg or pedestal embedment system configured for damage mitigation between two adjacent fuel racks in the fuel pool during a seismic event.

Referring now then to FIGS. 49 and 51, flow holes 2115 create passageways from below the base plate 2102 into the cells 2110 formed by the tubes 2120. Preferably, a single flow hole 2115 is provided for each cell 2110, however, more may be used as needed to create sufficient flow through the tubes. The flow holes 2115 are provided as inlets to facilitate natural thermosiphon flow of pool water through the cells 2110 when fuel assemblies having a heat load are positioned therein. More specifically, when heated fuel assemblies are positioned in the cells 2110 in a submerged environment, the water within the cells 2110 surrounding the fuel assemblies becomes heated, thereby rising due to decrease in density and increased buoyancy creating a natural upflow pattern. As this heated water rises and exits the cells 2110 via the tube open top ends 2112 (see FIG. 47), cooler water is drawn into the bottom of the cells through the flow holes 2115. This heat induced water flow and circulation pattern along the fuel assemblies then continues naturally to dissipate heat generated by the fuel assemblies Pedestals 2200 may therefore have a height H2 selected to form a bottom flow plenum P of generally commensurate height to ensure that sufficient thermally-induced circulation is created to adequately cool the fuel assembly. In one non-limiting example, height H2 of the plenum P may be about 2 to 2.5 inches (including the listed values and those therebetween of this range).

Figure 47A:
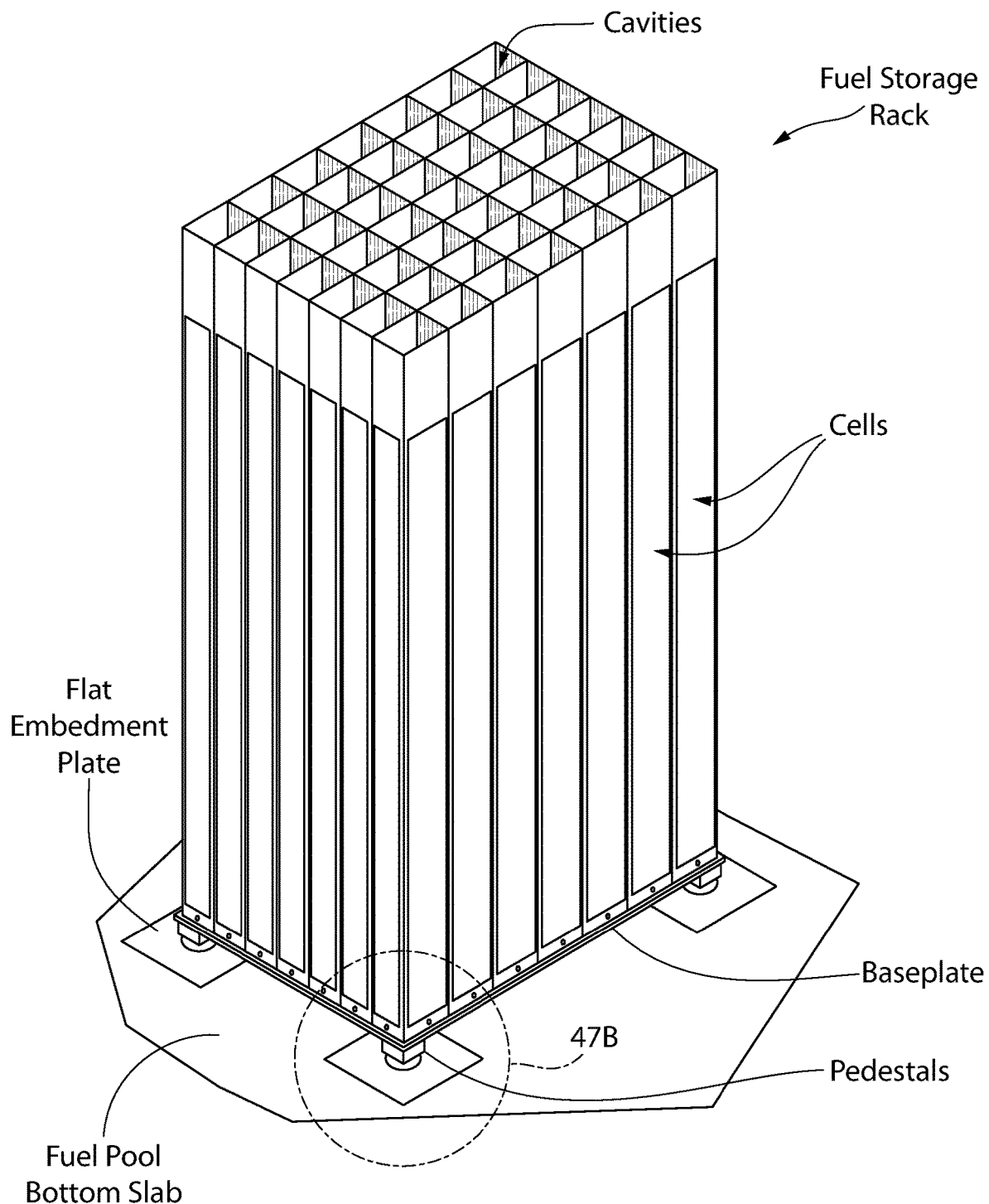
FIG. 47A is a perspective view of a conventional nuclear fuel storage system for a fuel pool.
Figure 47B:
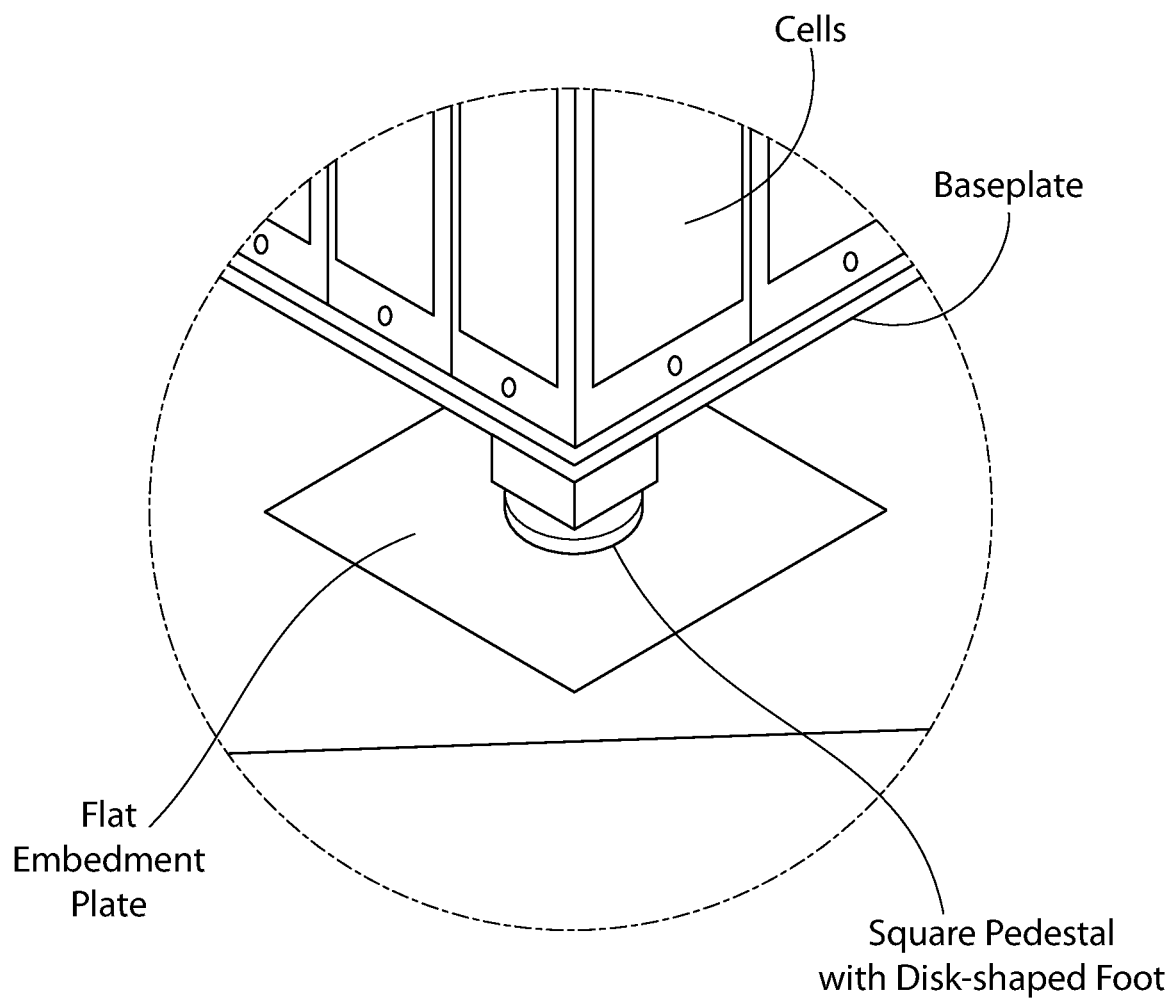
FIG. 47B is a detail taken from FIG. 47A.
Figure 50:
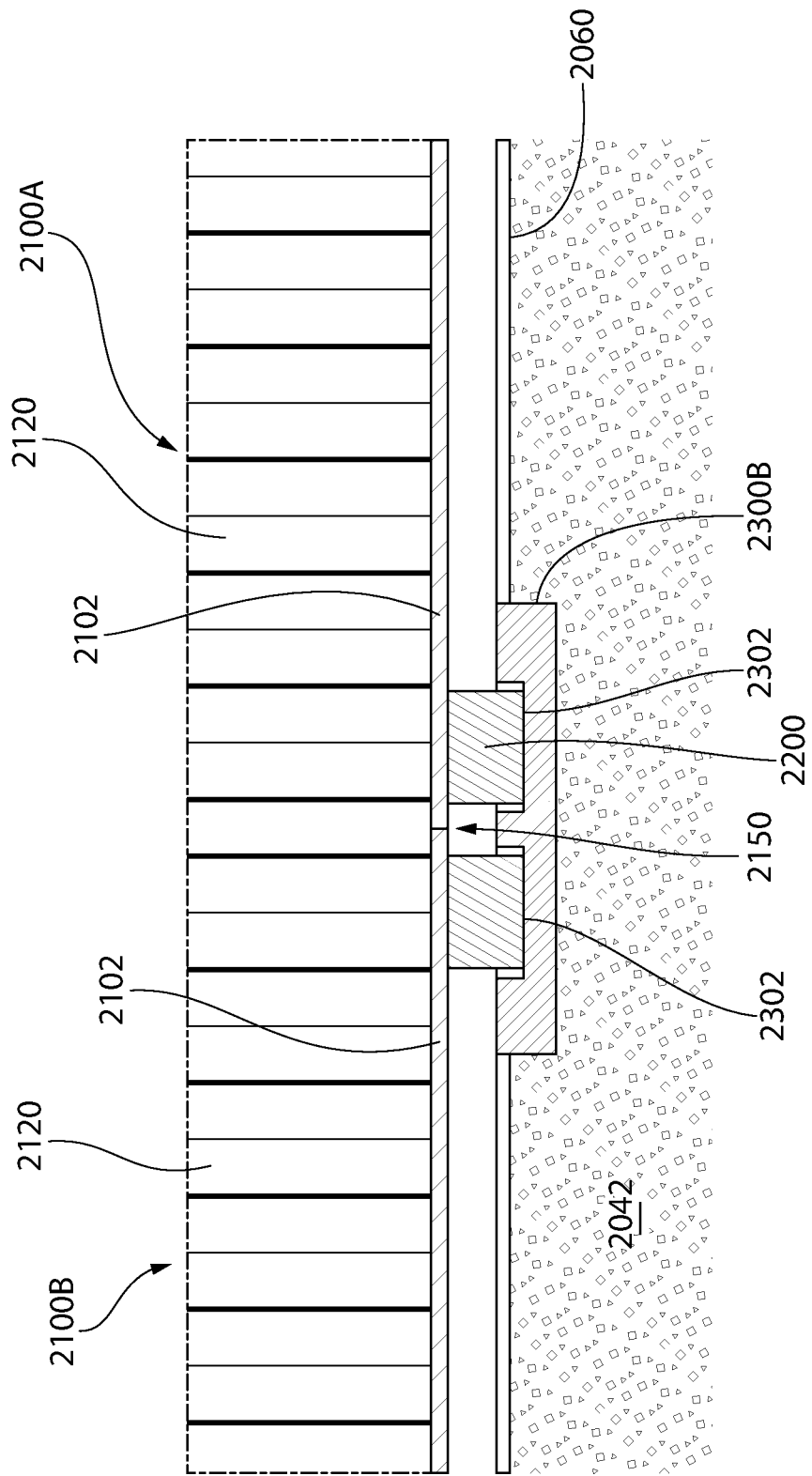
FIG. 50 is a side cross sectional view showing a baseplate edge contact system configured for damage mitigation between two adjacent fuel racks in the fuel pool during a seismic event.

Pedestals 2200 may have any suitable configuration or shape and be of any suitable type. Some non-limiting examples of shapes that may be used include rectangular or square with a rectilinear lateral/transverse cross sectional shape, cylindrical with a circular cross sectional shape, polygonal with a polygonal cross sectional shape, non-polygonal with a non-polygonal cross sectional shape, or combinations thereof. One combination shown in FIG. 47 is a fixed height pedestal including a rectangular upper portion attached to the fuel rack baseplate 2102 and enlarged cylindrical disk-shaped lower portion forming a circular cylindrical foot pad for engaging the fuel pool 2040 in a stable manner. FIGS. 58A and 58B show an adjustable pedestal 2200, as further described herein. FIGS. 50 and 51 show a fixed height pedestal 2200 which may have any of the foregoing mentioned shapes or others.

It should be noted that the pedestals 2200 described herein for a seismic-resistant fuel rack storage system according to the present disclosure are configured for a "free standing" fuel rack 2100 as described in the Background (i.e. no provisions such as holes for use in in providing fasteners to affix the pedestals and fuel racks to the bottom of the fuel pool).

Pedestals 2200 preferably may be made of a corrosion resistant metal of suitable dimension and thickness to provide the strength necessary to adequately support the weight of the fuel assemblies 2028 and storage tubes 2120 supported by the baseplate 2102. Each fuel rack 2100 may include a plurality of peripheral pedestals 2200 spaced apart and arranged along the peripheral edges and perimeter of the baseplate 2102, and optionally one or more interior pedestals if required to provide supplemental support for the inboard fuel assemblies and tubes 2120B. In one non-limiting embodiment, four peripheral pedestals 2200 may be provided each of which is located proximate to one of the four corners 2206 of the baseplate. Additional peripheral pedestals may of course be provided as necessary between the corner pedestals on the perimeter of the baseplate. The pedestals are preferably located as outboard as possible proximate to the peripheral edges 2208 of the baseplates 2102 of each fuel rack or module to give maximum rotational stability to the modules.

With continuing reference to FIGS. 48-52, a seismic resistant nuclear fuel storage rack system further comprises a plurality of specially-configured embedment plates 2300 fixedly coupled to the base slab 2042 of the fuel pool 2040 for engaging the fuel rack pedestals 2200. Accordingly, the embedment plates 2300 are not movable in relation to the base slab 2042 or pool adjoining pool liner 2060. Embedment plates 2300 are arranged in a laterally spaced apart pattern around the pool base slab 2042 and each is positioned to coincide with the location of at least one of the fuel rack pedestals 2200. This forms a discontinuous pedestal support system in which no two embedment plates 2300 are in contact with each other in certain embodiments. The pool liner 2060 is interspersed and extends between the embedment plates in one embodiment. The embedment plates 2300 each have a smaller lateral dimension in all directions that the than the fuel racks 2100 or sections of the liner.

The laterally spaced apart embedment plates 2300 are each hermetically seal welded together via seal welds 2140 along all of their peripheral lateral sides as shown in FIG. 51 to form a continuous hermetically-sealed liner system completely encapsulating the base slab 2042 of the fuel pool 2040. In one configuration, the embedment plates 2300 may protrude upwards beyond a top surface (floor F) of adjacent portions of the pool liner 2060 as shown in FIG. 51 to facilitate forming fillet welds around the entire perimeter of the embedment plate to the liner. Other arrangements and types of welds are possible. The hermetically seal-welded embedment plates 2300 and bottom sections of liner 2060 thus collectively form a pool bottom which is an impervious barrier to out-leakage of pool water W through the base slab from fuel pool 2040.

The embedment plates 2300 include a preferably flat top wall 2212 defining a top surface and have suitable thickness to support a pedestal 2200 and a portion of the total dead weight of the fuel rack seated thereon. In the illustrated and preferred embedment, the embedment plates 2300 are preferably fixedly attached and anchored directly to the base slab 2042 of the fuel pool 2040 independently of the liner 2060 and without any intervening structures therebetween (best shown in FIGS. 50 and 51). There is no relative movement between the embedment plates 2300 and the pool liner 2060 or base slab 2042. This ensures optimal anchoring and stabilization of the embedment plates 2300 to the pool's base slab 2042 during of a seismic event (e.g. earthquake) such that the embedment plates cannot slide or move with respect to the base slab or liner 2060. This also ensures that horizontally-directed lateral forces F1 produced by a seismic event and the vertical dead weight of a completely filled fuel rack 2100 are transmitted directly to the steel-reinforced (e.g. rebar) base slab 2042 of the fuel pool 2040 without transferring lateral or vertical forces to and adversely affecting the integrity of the liner 2060. This permits the liner 2060 to be thinner than the embedment plate 2300 and designed for only the non-load bearing function of the pool water containment. Due to the structural nature and load bearing function of the embedment plates 2300, the plates preferably have a substantially greater thickness T1 than the pool liner 2060 thickness T2 (see, e.g. FIG. 51) such as for example at least twice the thickness T2. Embedment plate 2300 may have a minimum thickness of 1 inch or more.

Each embedment plate 2300 may be received in a complementary-configured upwardly open anchorage recess 2350 including a bottom 2351 and vertically extending sidewalls 2352. A conformal fit is preferably provided if possible between the embedment plates 2300 and anchorage recess 2350 such that the material of fuel pool's concrete base slab 2042 on the bottom and sidewalls of the recess 2350 is in intimate conformal contact with bottom and sides of the embedment plate (see, e.g. FIG. 51). This can be readily achieved if the embedment plates 2300 are installed before the concrete for the base slab is poured, or if concrete grout is added in gaps around the perimeter of the plates 2300 between the sides of the plate and sidewalls 2352 of a slightly enlarged recess. In any of these construction scenarios, laterally and horizontally acting seismic loads or forces F1 acting on the embedment plate created by engagement between shifting pedestals 2200 and sidewalls 2204 of the embedment cavity 2302 (described below) are laterally transferred directly to the base slab 2042 via the vertical sidewalls 2352 of the slab contacting the sides of embedment plate 2300 without transferring these loads or forces to the thinner less structurally robust pool liner 2060 which could otherwise result in damage to and compromise the leak-proof integrity of the pool liner system.

Alternatively in some embodiments, if embedment plates 2300 are added after the base slab 2042 is poured and the perimeter concrete grouting is not added as described above, a minimal appreciable gap preferably should be provided between the sides of the embedment plates 2300 and the sidewalls 2352 of the recess 2350 to allow formation of the perimeter seal welds 2140 describe elsewhere herein between the plates and pool liner 2060. In addition, one or more through anchors 2400 similar to those shown in FIG. 60 and further described herein (represented in dashed lines in present FIG. 51) preferably should be added for anchoring the embedment plate 2300 through the bottom 2351 of the anchorage recesses 2350 into the concrete base slab 2042 beneath the embedment plates. Laterally acting seismic loads or forces F1 in this configuration will then be transferred from the embedment plates 2300 through anchors 2400 into the base slab 2042 so that none of these seismic forces are transmitted to the thinner pool liner 2060 to protect the integrity of the liner system.

To minimize sliding engagement and impact loads between adjacent fuel racks 2100 during a seismic event which may damage the racks and fuel storage tubes 2120, each embedment plate 2300 includes at least one engineered recessed receptacle or cavity 2302 configured to capture and engage a pedestal 2200 of the fuel rack 2100. Each embedment cavity 2302 is configured (i.e. shaped and dimensioned) to receive and abuttingly engage the terminal bottom end 2204 of a pedestal 2300 to restrain lateral/horizontal movement of the pedestal during a seismic event. This is best shown in FIGS. 50 and 51. Each cavity 2302 is collectively defined by a flat bottom wall 2306 defining a vertically upward facing horizontal bearing surface for engaging the bottom end of a pedestal 2200 and plurality of preferably flat sidewalls 2304 extending upwards therefrom at a right angles and defining inward facing vertical bearing surfaces for engaging the sides of a pedestal. The cavities 2302 have an open top for receiving the pedestals 2200 of the fuel racks 2100 when they are emplaced in the fuel pool 240.

Preferably each embedment plate cavity 2302 may be located in the central region of the embedment plate 2300 such that a portion of the top wall 2212 and surface completely circumscribes and surrounds the cavity on all sides (see, e.g. FIGS. 50-51 and 53-48). This arrangement ensures that portions of the embedment plate 2300 surrounding cavity 2302 have adequate structural strength to withstand lateral impacts forces acting against the sidewalls 2304 of the cavity in a horizontal direction due to impact by a sliding pedestal 2200 during a seismic event.

Each embedment plate cavity 2302 has a depth D2 selected to receive and entrap or restrain a sufficient lower portion of the pedestal 2200 within the confines of the cavity. A proper cavity depth D2 may be selected by weighing the competing interests of keeping the pedestal as short as possible to resist cantilevered bending moments imparted to the pedestals during a seismic event on one hand (recognizing that a lower portion of the pedestal will extend in the embedment plate cavity below the floor F of the pool bottom defined by the top surface of the pool liner 2060), and maintaining a bottom flow plenum P of adequate height to induce the needed amount of natural thermal pool water circulation through the fuel rack 2100 on the other hand to cool the fuel. The depth D2 must also be sufficiently deep enough so that the pedestals 2200 do not "jump" out of the cavities during shaking caused the seismic event. In one non-limiting example, depth D2 of the embedment cavity 2302 may preferably be about 1-3 inches, more preferably about 1-2 inches, and most preferably about 1-1.5 inches (including the listed values and those therebetween of these ranges).

The embedment plate cavities 2302 each further have a complementary configuration to the transverse or lateral cross sectional shape of the pedestal 2200. Each cavity 2302 is preferably sized minimally larger in the lateral or horizontal dimensions than the comparable width or diameter of the pedestal to minimize the amount of lateral movement permitted for the pedestals, and hence the entire fuel rack 2100. The maximum transverse cross sectional dimension of lower portion of the pedestal 2200 that fits within the cavity 2302 may be considered to define a transverse width W2 or diameter D3 as applicable depending on the shape of the lower portion (e.g. rectilinear, polygonal, circular, etc.). The nomenclature used is not important and merely descriptive of this maximum transverse dimension. In a similar vane, depending on transverse cross sectional shape of the embedment cavity 2302, the cavity may be defined as having a transverse width W3 or diameter D4. In one embodiment, cavity 2302 preferably without limitation may have a maximum transverse cross sectional dimension (e.g. width W3 or diameter D4) which is no more than 5-50% larger (including or therebetween these percentages) than the maximum transverse cross sectional dimension (e.g. width W2 or diameter D3) of the pedestal 2200, and more preferably no more than 10-30%. Considered another way, the physical annular clearance or gap G1 formed between the pedestal 2200 and the sidewalls 2304 of embedment cavity 2302 (measured from the maximum transverse cross sectional dimension of the lower portion of the pedestal to the sidewall) preferably may be no more than 0.5-4 inches (including or therebetween these distances), and more preferably no more than 0.5-2 inches. Preferably, the gap G1 is less than ½ the maximum transverse cross sectional dimension (W2/D3) of pedestal 2200, more preferably less than ⅓, and most preferably less than ¼ that maximum transverse cross sectional dimension of the pedestal. The maximum transverse dimension of the embedment cavity 2302 preferably is as small as possible from a practical standpoint allowing enough clearance for insertion of the lower portion of each pedestal 2200 into the cavity when maneuvering the fuel rack 2100 via an overhead crane which is typically the method used to emplace or remove fuel racks from the fuel pool 2040.

In operation, pedestals 2200 of the fuel rack 2100 are each non-fixedly seated in a cavity 2302 of an embedment plate 2300 as shown in FIGS. 48A-B, 50, and 51. During a seismic event, the fuel rack 2100 will tend to be moved laterally and horizontal by the event. When the frictional interactive force between the bottom end 2204 of the pedestal 2200 and the bottom wall 2306 of the cavity surfaces is exceeded, the fuel rack and pedestals will start to slide laterally/horizontally across the cavities of the embedment plates. If movement is sufficient, the lateral sides 2210 of the pedestals 2200 which define a first bearing surface will abuttingly engage the sidewalls 2304 of the cavity 2302 which define a second bearing surface. The pedestals are thus entrapped by the mutual engagement to prevent any further lateral/horizontal movement of the fuel rack to prevent or minimize impact forces between adjacent fuel racks 2100. In some embodiments where possible, the sides 2210 of at least the lower portion of the pedestals 2200 inserted within the embedment plate cavities 2302 are configured to be parallel in orientation to the sidewalls 2304 of the cavities to maximize the contact area between the colliding bearing surfaces.

In some embodiments, at least all the outboard/exterior perimeter or peripheral pedestals 2200 at the edges of the fuel rack baseplates 2102 are preferably received in a corresponding embedment plate cavity 2302 which is sufficient to restraint lateral/horizontal movement of the fuel rack 2100 during a seismic event. Any inboard/interior pedestals that may be provided to support the central regions of the fuel racks may optionally be constrained from movement via engagement with embedment plate cavities, but need not necessarily be so constrained. Such inboard/interior pedestals may therefore be engaged by a conventional flat embedment plate without a cavity.

Figures 53, 54:
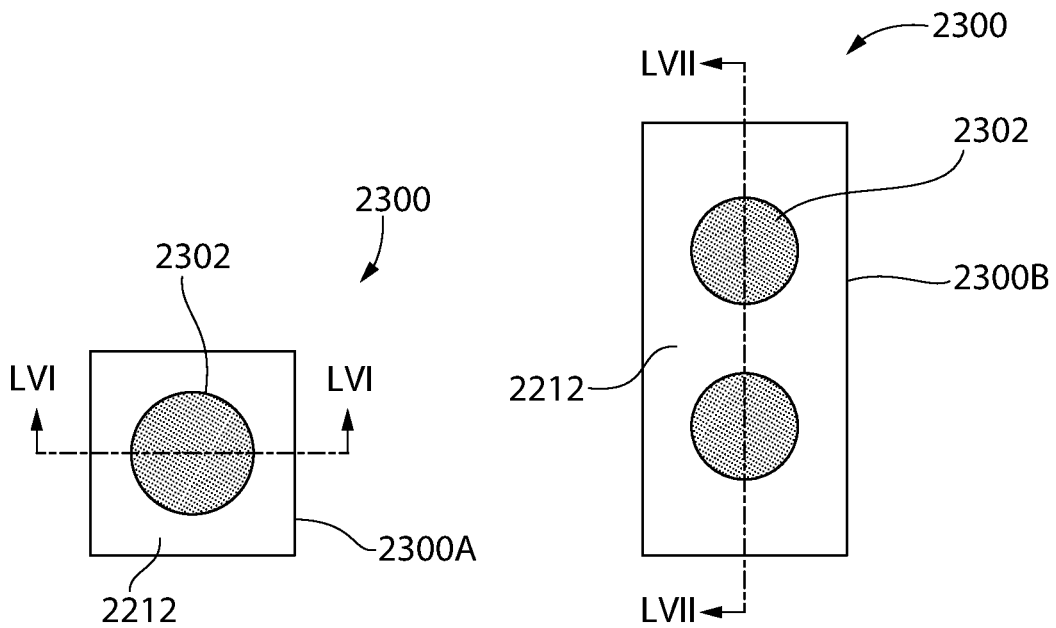
FIG. 53 is a top plan view of a first embedment plate according to the present disclosure for laterally constraining movement of a fuel rack pedestal.
FIG. 54 is a top plan view of a second embedment plate.
Figure 58:
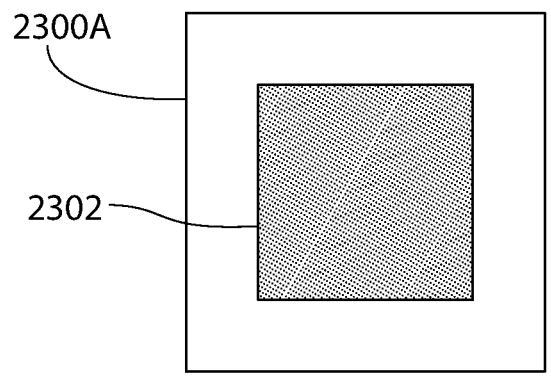
FIG. 58 is a top plan view of a fourth embedment plate.

Various configurations of embedment plates 2300 may be provided depending on the layout of fuel racks 2100 in the fuel pool 2040. Each seismic resistant embedment plate 2300 includes at least one embedment cavity 2302 as shown in FIGS. 51, 53, and 58 for example. In a typical fuel pool, the fuel racks 2100 are tightly spaced so that at least the corner regions of two or more fuel racks are located proximate to each other as shown in FIG. 49 which is a top plan view of an example fuel pool 2040. The vertically lateral sides 2130 and upwardly exposed baseplate protruding ledges 2220 described herein between adjacent fuel racks are marked (numbered) and appear as double parallel lines to discern the outlines of each fuel rack. The lateral sides 2130 of perimeter or peripheral fuel racks in the pool appear as a single line where they lie adjacent to the fuel pool sidewalls 2041.

Figure 55:
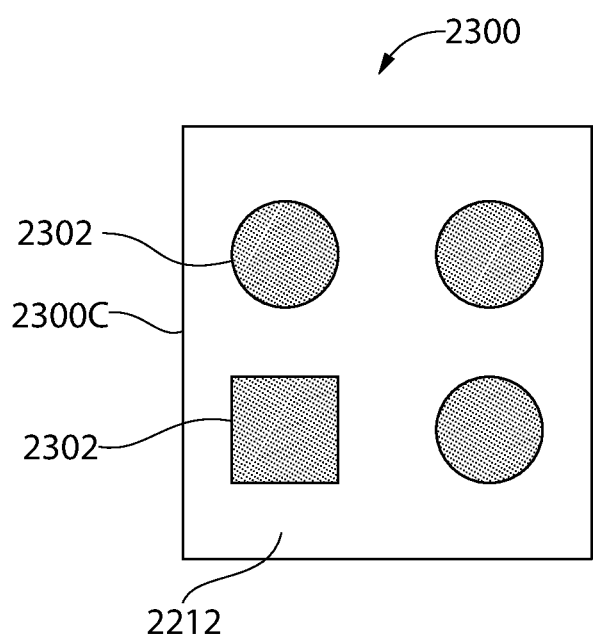
FIG. 55 is a top plan view of a third embedment plate.
Figure 56:
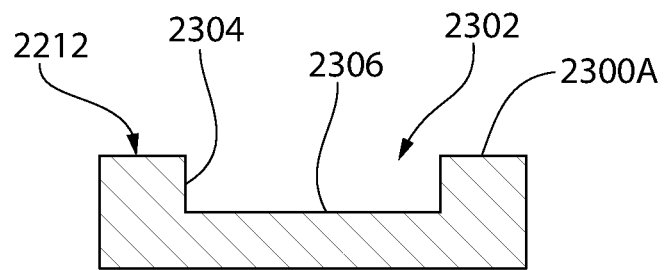
FIG. 56 is a side cross sectional view taken along lines LVI-LVI in FIG. 53.
Figure 57:
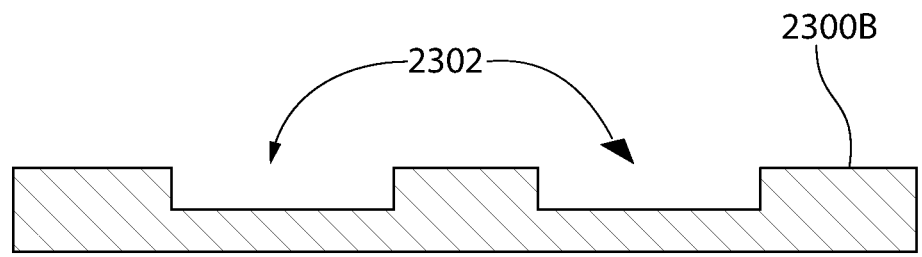
FIG. 57 is a side cross sectional view taken along lines LVII-LVII in FIG. 46.

At some locations in the fuel pool 2040, economies and stability of installation may be achieved by providing a single larger embedment plate 2300 having multiple pedestal-restraint cavities 2302 for capturing two or more pedestals 2200 from two or more fuel racks 2100. Non-limiting examples of such embedment plates with multiple cavities are shown in FIGS. 54 and 55 to illustrate the concept. Each cavity 2302 is spatially separated from another cavity on the same embedment plate 2300 so that a portion of the plate top wall 2212 lies between the cavities as shown. The cavities 2302 are spaced apart by a suitable distance to account for the dimensions of the adjacent fuel racks 2100 and their pedestal 2200 locations in accordance with principles of the present disclosure.

In FIG. 49, embedment plates 2300 are marked by an "X" which would generally coincide of course with the location of one or more pedestals engaging the embedment plates 2300 and their cavities 2302. As an illustrative example, a cluster of six adjacent fuel racks 2100A, 2100B, 2100C, 2100D, 2100E, and 2100F have been labelled for explanation. A single-cavity embedment plate 2300A (e.g. FIG. 53 or 58) is shown in each sidewall 2041 corner region 2044 of the fuel pool 2040 which has a single embedment or restraint cavity 2302 configured to receive a single corner pedestal 2200 of racks 2100A and 2100C, for example. A double-cavity embedment plate 2300B (e.g. FIGS. 50 and 54) is located along the sidewall 2041 of the fuel pool at the perimeter interface or intersection between two adjacent fuel racks 2100A and 2100B, 2100B and 2100C, 2100C and 2100D, and 2100A and 2100F. A quadruple-cavity embedment plate 2300C (e.g. FIG. 55) is located in the interior region of the fuel pool where the corners of four fuel racks meet, such as at the corner interface or intersection between fuel racks 2100A, 2100B, 2100E, and 2100F, and racks 2100B, 2100C, 2100D, and 2100E. It will be appreciated that the cavities in each multi-cavity embedment plate 2300B or 2300C do not all have to be of the same shape and will depend on the shape of the fuel rack pedestal 2200 to be received in each cavity. FIG. 5, as an example without limitation, shows an embedment plate 2300C having three circular cavities 2302 and one rectilinear (e.g. square) cavity 2302. Accordingly, numerous variations of embedment plates and embedment cavities are possible depending on the design of the fuel racks and their pedestal cross sectional shapes to be accommodated.

In FIG. 49, examples of interior or inboard pedestals 2200A of each fuel rack 2100 are illustrated. These interior pedestals preferably engage a mating embedment plate 2300D, which may include a pedestal-restraint cavity 2302 or alternatively may be a completely flat conventional embedment plate without any top recesses for inserting the pedestal 2200A. As described elsewhere herein, providing the exterior or outboard pedestals of the fuel racks with mating embedment plates 2300 having cavities is sufficient to restrain movement of the fuel racks in all horizontal/lateral directions in the event of a seismic occurrence. In the fuel racks shown in FIG. 49, each rack has four exterior corner pedestals for example (other possible embodiments of larger fuel racks may have intermediate exterior pedestals between the corner pedestals).

The embedment plates 2300 are preferably formed of a suitable corrosion resistant metal of suitable strength such as without limitation stainless steel, aluminum, or another metal. The metal selected may optionally be selected to be compatible for welding to the type of metal used to construct the pool liner 2060 without requiring dissimilar metal welding which facilitates installation.

According to another aspect of a seismic resistant fuel pool with reference to FIGS. 50-52, the fuel racks 2100 may each be configured so that their baseplates 2102 protrude horizontally and laterally outwards for a distance D6 beyond the vertical lateral sides 2130 of the racks, thereby creating a protruding peripheral ledge 2220. Ledge 2220 may circumscribe and extend completely around the entire perimeter of the fuel rack 2100 to protect the lateral sides of each rack (e.g. tube sidewalls 2116) from damage during a seismic event. Each pedestal may be of a predetermined fixed height, shimmed at the bottom if necessary, so that the baseplates 2102 of all fuel racks or modules are essentially coplanar falling within the same horizontal plane HP (referenced in FIG. 51). During a seismic event, this positioning of baseplates substantially within the same horizontal plane (recognizing installation tolerances) and the set-back or offset distance D6 of the tube sidewalls 2116 from baseplate peripheral edges 2208 advantageously protects the cells 2110 from damage ensuring that any contact between adjacent sliding fuel racks occurs between the peripheral edges of the racks alone. Typical offset distances D6 used may be for example without limitation 1-3 inches. Larger or smaller offset distances may be used in other embodiments.

Alternatively, an adjustable pedestal configuration may be used to avoid the need for shims. Such adjustable pedestals typically equipped with a two-piece threaded leg or pedestal for making vertically height adjustments are well known in the art. FIGS. 48A and 48B show an example of an adjustable pedestal design. These adjustable height pedestals 2200 are connected to the bottom surface of the baseplate 2102. In one embodiment, for example without limitation, the adjustment means may be accomplished via a threaded pedestal assembly. The adjustable height pedestals 2200 ensure that a space exists between the base slab 2042 of the fuel pool 2040 and the bottom surface of the base plate 2102, thereby creating an inlet plenum P for water to flow upwards through the flow holes 2115 and cells 2110 as described elsewhere herein.

The adjustable height pedestals 2200 are spaced to provide uniform support of the base plate 2102 and thus the fuel rack 2100. Each such pedestal 2200 is preferably individually adjustable to level and support the fuel rack on a non-uniform spent fuel pool base slab 2042 surface, thereby avoiding the need for shims to ensure that the baseplates 2102 of all fuel racks 2100 are substantially coplanar. In one example of many possible configurations, the pedestals 2200 may each comprise a block-shaped rectilinear upper mounting portion 2104 affixed rigidly to the bottom surface of the fuel rack baseplate 2102 and an adjustable lower base portion 2105 threadably coupled to the mounting portion and moveable vertically with respect to thereto. The base portion 2105 may be circular cylindrical in one embodiment as shown to provide a stable base pad for engaging bottom wall 2306 of embedment plate cavity 2302; however, other suitable shapes may be used. The pedestals mounting portion 2104 may be bolted to the baseplate 2102 in some embodiments. Of course, in other embodiments, the mounting portions 2104 can be attached to baseplate 2102 by other means, including without limitation welding or threaded attachment as just two examples.

In some embodiments, an additional measure may be provide according to another aspect of the invention that further minimizes or prevents the likelihood of damage between laterally sliding or moving fuel racks during a seismic event. The fuel racks 2100 may be arranged on the base slab 2042 of the fuel pool 2040 such that the proximate facing and mating peripheral edges 2208 between baseplates 2102 (e.g. horizontal protruding ledges 2220) of adjacent fuel racks 2100 are placed in abutting mutual edge contact or engagement upon emplacement in the fuel pool under normal operating conditions prior to the occurrence of a seismic event. Such an edge contact arrangement with abutment joints 2150 formed between mating baseplate peripheral edges 2208 is shown for example in FIGS. 49, 50, and 52. FIG. 50 shows best shows first and second fuel racks 2100A and 2100B with baseplate abutment joint 2150 therebetween.

The foregoing edge contact arrangement between baseplates 2102 of adjoining fuel racks 2100 advantageously precludes any substantial degree of movement between adjacent fuel racks into each other. This eliminates initial impact forces between adjoining baseplates caused lateral shifting of the fuel racks due to seismic activity because the baseplates are pre-engaged. Because of the pre-seismic event edge contact arrangement, the fuel racks 2100 so coupled would laterally move or slide in unison together under seismic activity a distance to the point where the entrapped fuel rack pedestals 2200 engage the embedment plate cavity walls 2204. Advantageously, there is no differential movement of one fuel rack 2100 with respect to adjoining fuel racks in the entire array of racks in the fuel pool 40 thereby eliminating any substantial damage to the racks.

It will be appreciated that because of metal fabrication tolerances, complete conformal contact although desirable may not be possible along the entire horizontal peripheral edge interface length between two abutting baseplates 2102. A minimal gap of for example without limitation no more than ¼ inch is reasonably obtainable at those interspersed locations if any between the adjoining fuel rack baseplates 2102 where complete abutting conformal contact might not be fully achieved due to metal fabrication limitations. Preferably, however, abutting conformal contact is achieved for a majority of the length of each abutment joint 2150 between mutually engaged pairs of fuel rack baseplate peripheral edges 2208 (whether the conformal contact is measured contiguously or dis-contiguously at intermediate lengths along the mating baseplates separated by minor non-conformal contact areas).

It bears noting that conformal contact between adjoining fuel rack baseplates may be used in some embodiments as an alternative to the embedment plate cavities 2302 described herein, or preferably in other embodiments in conjunction with the cavities to provide dual protection against fuel rack damage during a seismic event.

A process or method for seismic-resistant storage of nuclear fuel in a fuel pool will now be briefly described based on seismic resistant fuel storage system described herein. In one embodiment, the method may comprise transporting and staging a plurality of fuels racks 2100 proximate to the fuel pool 2040 in a nuclear facility for loading the racks into the pool. The first fuel rack 2100 is lifted via a crane (not shown) or other suitable piece of lifting equipment and maneuvered over the fuel pool 2040. The first fuel rack 2100 is oriented so that the perimeter pedestals 2200 are each vertically aligned with a corresponding embedment plate 2300 on the base slab 2042 of the pool. The next step is lowering the first fuel rack into the water-filled fuel pool and insertably engaging each of the pedestals of the first fuel rack with corresponding upwardly open embedment receptacles or cavities 2302 formed in a plurality of embedment plates 2300 already fixedly coupled to the base slab of the fuel pool. The bottom ends of the pedestals 2200 are seated on the recessed bottom wall 2306 of the cavities and the sidewalls 2304 trap the pedestals therein. Lateral movement of the pedestals 2200 and hence fuel racks along the base slab 2042 during a seismic event is restricted by engagement between the pedestals and the sidewalls of the embedment cavities of the embedment plates.

After the first fuel rack is positioned in the fuel pool 2040, the method may continue with lowering a second fuel rack 2100 into the fuel pool, insertably engaging each of the pedestals 2200 of the second fuel rack with corresponding upwardly open receptacles or cavities 2302 formed in the plurality of embedment plates 2300 fixedly coupled to the base slab 2042 of the fuel pool, and abuttingly engaging a peripheral edge 2208 of the baseplate 2102 of the first fuel rack with an adjoining peripheral edge of the baseplate of the second fuel rack. The baseplates 2102 of the first and second fuel racks are substantially coplanar as already described herein to ensure mutual engagement. In some situations, at least one pedestal 2200 of the second fuel rack 2100 and at least one pedestal of the first rack may be engaged with separate receptacles formed in a single shared embedment plate, such as without limitation embedment plates 2300B or 2300C shown in FIGS. 54 and 55, respectively. Numerous variations in the foregoing method are possible.

Figure 60:
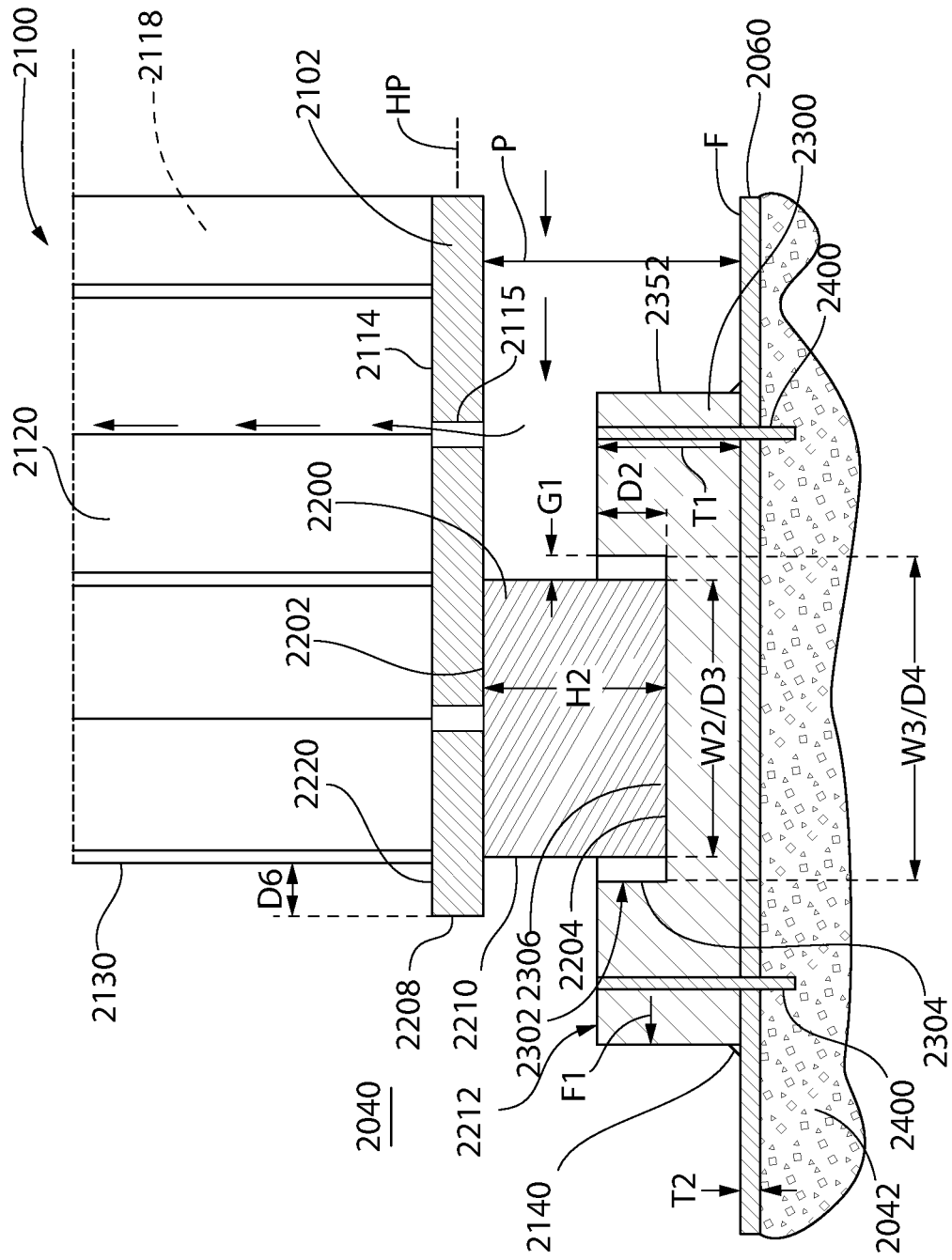
FIG. 60 is detailed side elevation view showing an alternative arrangement of a fuel rack support pedestal embedment system.

FIG. 60 shows an alternative embodiment of an embedment plate system in which embedment plates 2300 are anchored to the base slab 2042 of the fuel pool 2040 through the pool liner 2060 plate interposed therebetween. The bottom surface of the embedment plate 2300 is seated directly on the top surface of the pool liner 2060. One or more through metal anchors 2400 are provided which vertically extend completely through the embedment plates and liner 2060 into base slab 2042. In one embodiment, the anchors 2400 may be threaded masonry fasteners such as lag bolts threadably secured at their bottom ends into the base slab 2042 of fuel pool 2040 and having an exposed enlarged head at the opposite end configured for engaging a tightening tool such as a wrench. Use of other types of anchors is of course possible. This embodiment similarly prevents any relative movement between the pool liner 2060 and the embedment plates 2300. Although direct embedment of the embedment plates 2300 in the pool base slab 2042 shown in FIG. 51 is preferred when possible, this embodiment is useful for retrofit installations where an embedment plate system according to the present disclosure is added to an existing fuel pool 2040 having a liner 2060. This eliminates the need to cutout the existing pool liner 2060 at the embedment plate locations. The embedment plates 2300 may be hermetically sealed welded to the liner 2060 completely around their perimeters using fillet welds 2140 in a similar manner to that already described herein.

Figure 61:
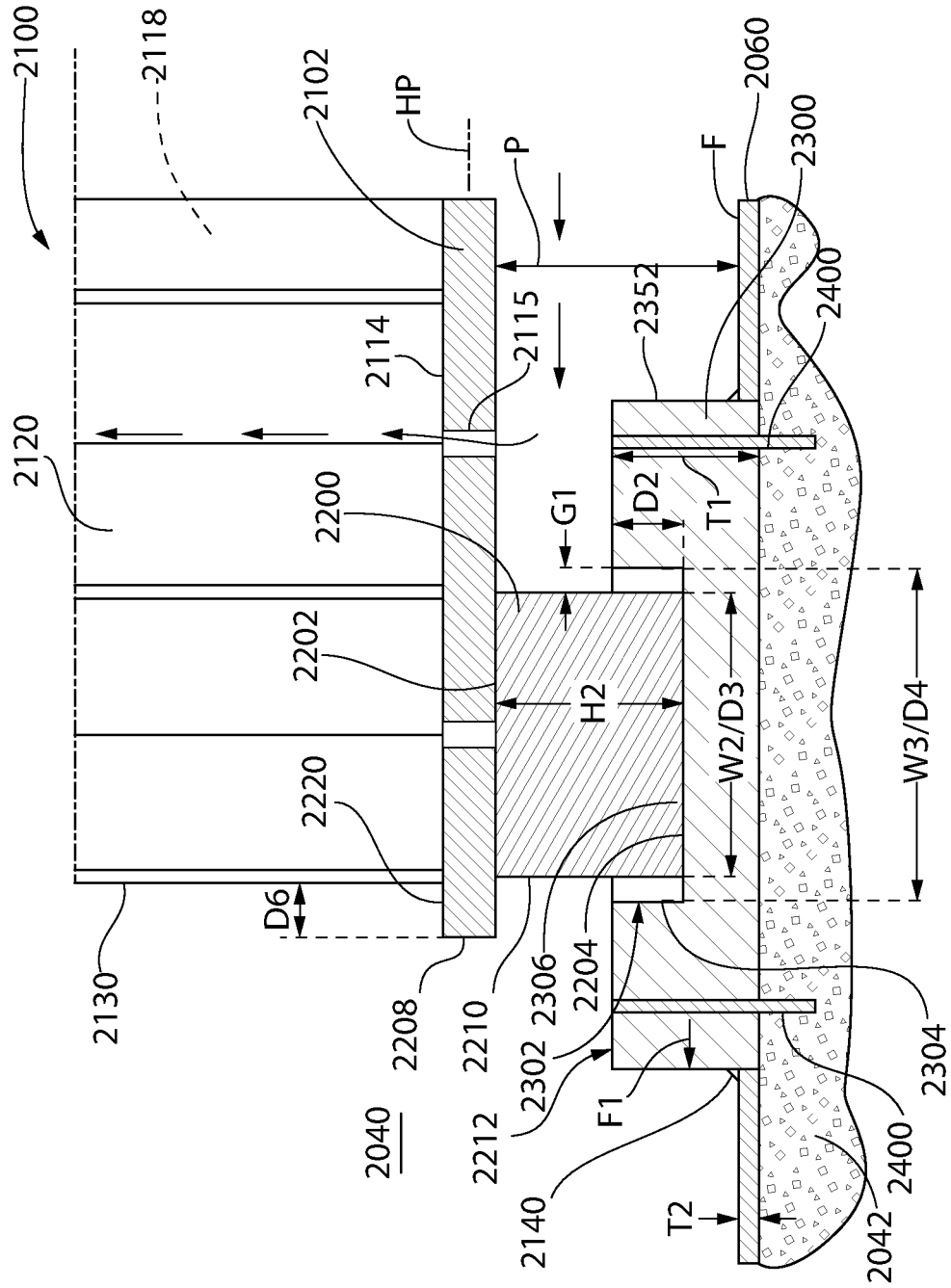
FIG. 61 is detailed side elevation view showing a second alternative arrangement of a fuel rack support pedestal embedment system.

FIG. 61 shows a second alternative embodiment of an embedment plate system in which embedment plates 2300 are anchored directly to the base slab 2042 of the fuel pool 2040. In contrast to the embodiment of FIG. 60, in this embodiment no portion of the pool liner 2060 plate is interposed between the embedment plate 2300 and slab. The bottom surface of the embedment plate 2300 is seated directly on the top surface of the base slab 2042. One or more through metal anchors 2400 are provided which vertically extend completely through the embedment plate into base slab 2042. This embodiment similarly prevents any relative movement between the pool liner 2060 and the embedment plates 2300. The embedment plates 2300 may be hermetically sealed welded to the liner 2060 completely around their perimeters using fillet welds 2140 in a similar manner to that already described herein.

III. Inventive Concept 3

With reference to FIGS. 62-71, a third inventive concept will be described.

FIGS. 62-70 depict a first embodiment of a shell and tube heat exchanger 3100 according to the present disclosure. Heat exchanger 3100 includes a first longitudinal shell 3101 defining a longitudinal axis LA1, second longitudinal shell 3102 defining a longitudinal axis LA2, and a transverse shell 3103 defining a transverse axis TAL. Longitudinal shells 3101 and 3102 are cylindrical and define internal open shell-side spaces 3108a, 3108c respectively of the same configuration for receiving and circulating a shell-side fluid SSF. Transverse shell 3103 is cylindrical and defines an internal open shell-side space 3108b of the same configuration. The shell-side spaces 3108a-3108c are in fluid communication such that each shell-side space fully opens into adjoining shell-side spaces to form a single curvilinear and contiguous common shell-side space for holding a tube bundle.

Each shell 3101-3103 is linearly elongated and straight having a greater length than diameter. Longitudinal shells 3101, 3102 may be longer than transverse shell 3103, which in some embodiments has a length greater than the diameters of the longitudinal shells combined. In some embodiments, longitudinal shells 3101 and 3102 each have a length greater than twice the length of the transverse shell 3103. In the illustrated embodiment, the longitudinal shells 3101, 3102 have substantially the same length. In other embodiments, it is possible that one longitudinal shell has a shorter length than the other longitudinal shell.

Figure 62:
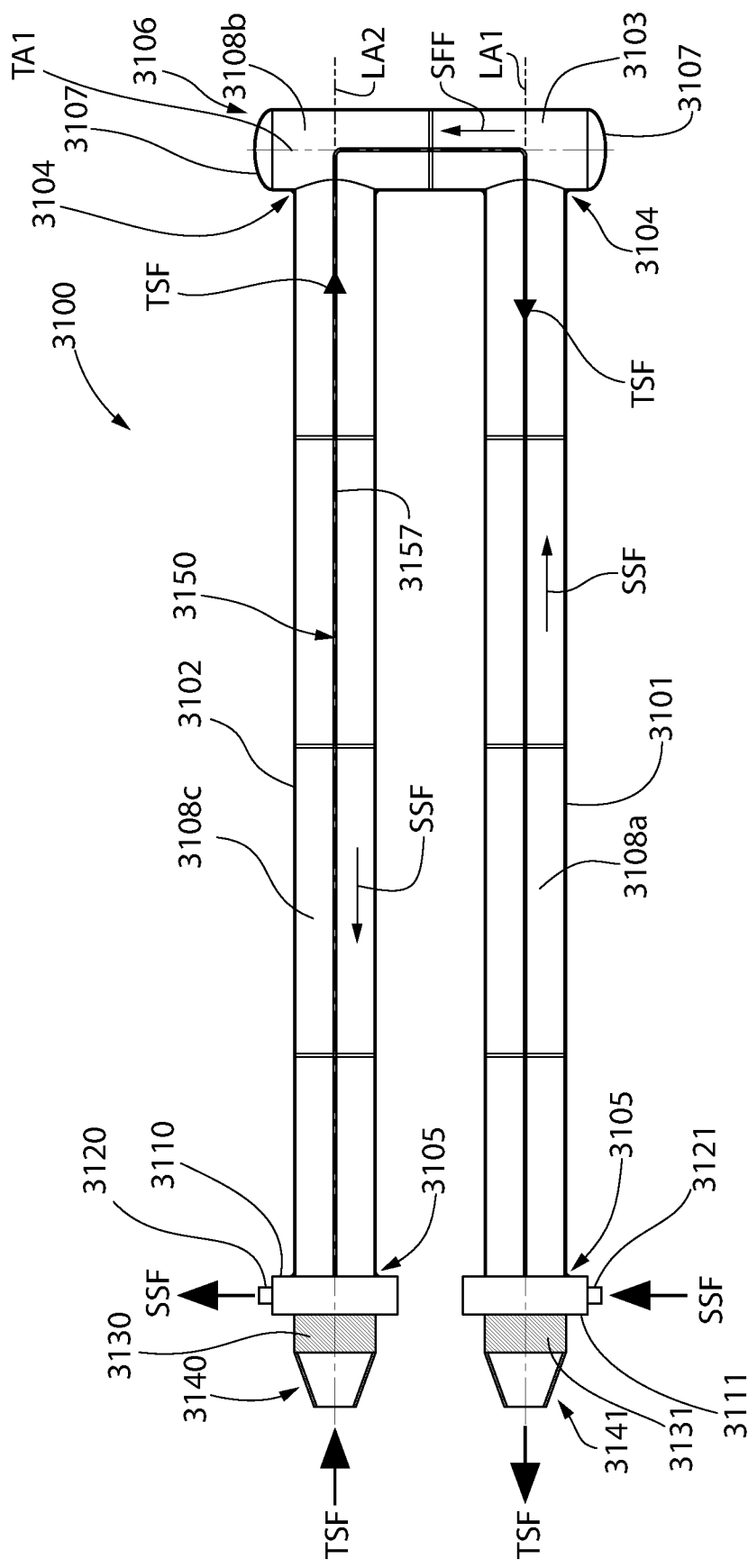
FIG. 62 is a plan view of a heat exchanger according to the present disclosure.

In the present configuration, the shells 3101-3103 are collectively arranged in the general shape of a "U" form, or more specifically in the illustrated embodiment in a "PI" shape (as in the Greek letter Π). Each of the longitudinal shells 3101, 3102 has a first terminal end 3104 fluidly joined or coupled directly to the transverse shell 3103 without any intermediary piping or structures, and an opposite second terminal end 3105 attached and fluidly coupled to a respective tubesheet 3111 and 3110, as best shown in FIG. 62. Shells 3101 and 3102 may be welded to transverse shell 3103 in one embodiment to form a sealed leak-proof fluid connection and pressure retention boundary. Longitudinal shells 3101 and 3102 are laterally spaced apart and arranged parallel to each other. Transverse shell 3103 extends laterally and transversely between the longitudinal shells at shell ends 3104. In one embodiment, transverse shell 3103 is oriented perpendicularly to shells 3101 and 3102. The transverse shell 3103 includes a pair of opposing cantilevered end portions 3103a each extending laterally outwards beyond the first and second shells which define opposing ends 3106. An end cap 3107 is attached to each cantilevered end by a suitable leak proof joining method such as welding. End caps 3107 may be any ASME Boiler & Pressure Vessel Code (B&PVC) compliant heads including commonly used head types such as hemispherical ("hemi heads"), semi-elliptical (see, e.g. FIG. 67), flanged and dished, and flat. The shells and other portions of the heat exchanger 3100 are also constructed to produce an ASME B&PVC compliant construction.

The heat exchanger 3100 is essentially a planar structure or assembly in which the shells 3101, 3102, and 3103 lie in substantially the same plane. Heat exchanger 3100 can advantageously be mounted in any orientation in an available three-dimensional space in the facility to best accord with the plant's architectural and mechanical needs (piping runs, support foundation locations, vent & drain lines, etc.). Accordingly, the heat exchanger shown in FIG. 62 may be mounted vertically, horizontally, or at any angle therebetween. Although the shell-side inlet and outlet nozzles 3121, 3120 are illustrated as coplanar with the shells 3101 and 3102 in FIG. 62, in other embodiments the shell nozzles can be rotated and positioned at any angle, as desired, to accommodate piping runs to and from the heat exchanger without loss in performance efficacy and efficiency. In other possible embodiments, one of the longitudinal shells 3101 or 3102 may be oriented non-planar with the other longitudinal shell by rotating the position of one of the longitudinal shells on the transverse shell 3103. For example, the longitudinal shell 3101 may be in the horizontal position shown in FIG. 62 while the remaining longitudinal shell 3102 may instead be in a vertical position disposed perpendicularly to shell 3101, or at any angle between 0 and 90 degrees to shell 3101. The tubes would therefore be formed to have a complementary configuration to the layout and orientation of the shells 3101-3103 selected.

Figure 63:
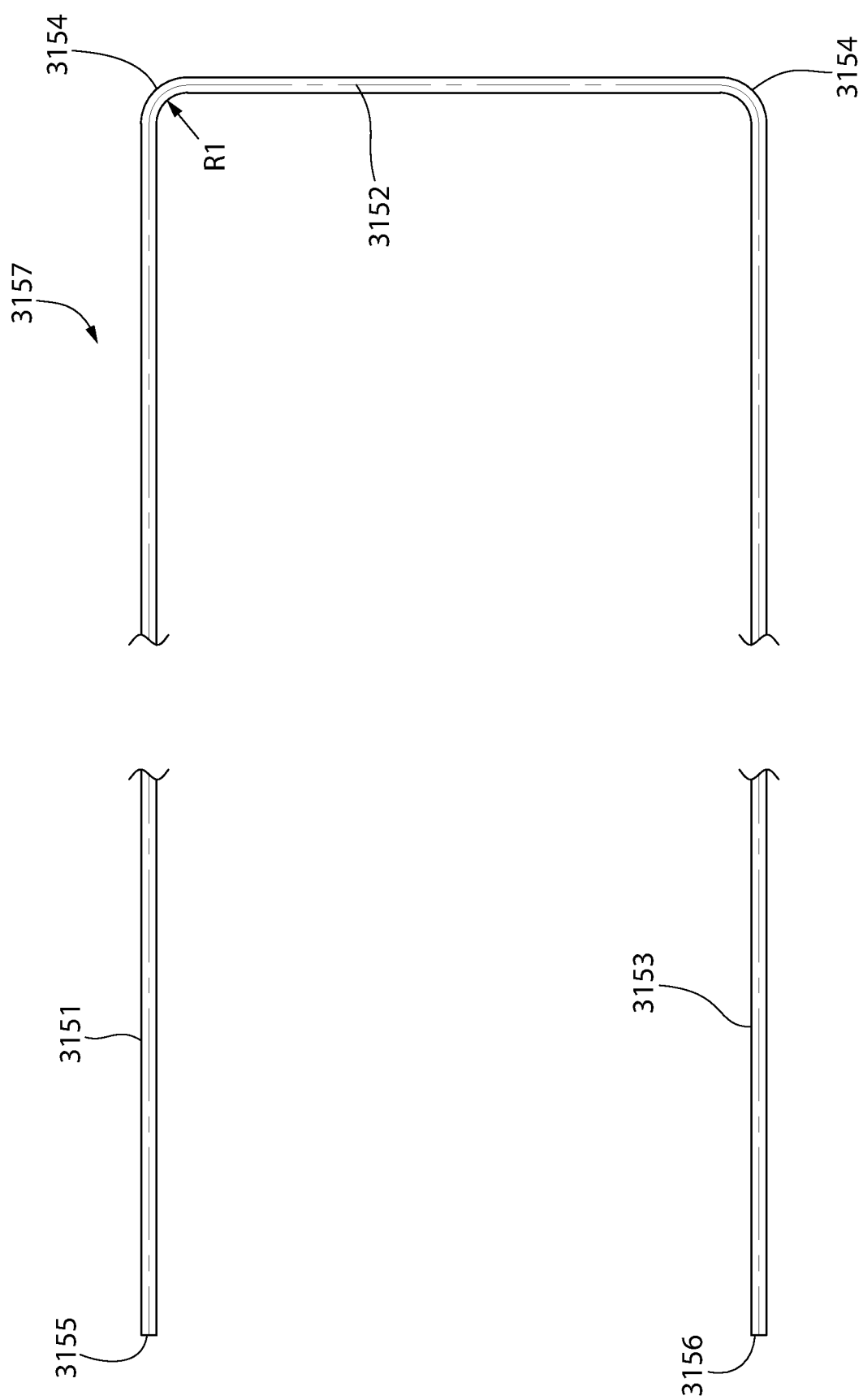
FIG. 63 is a plan view of a tube of the heat exchanger of FIG. 62.

With continuing general reference to FIGS. 62-70, a generally "squared" U-shaped tube bundle 3150 is disposed in the longitudinal and transverse shells 3101-3103. The tube bundle 3150 comprises a plurality of squared U-shaped tubes 3157 which extend contiguously from tube-side inlet tubesheet 3130 of longitudinal shell 3102 through the shell-side spaces 3108a, 3108b, and 3108c to tube-side outlet tubesheet 3131 of longitudinal shell 3101. FIG. 63 depicts a single tube 3157, recognizing that the tube bundle 3150 comprises multiple tubes of similar shape arranged in parallel to each other to form a tightly packed tube bundle. Tubes 3157 are cylindrical with a circular or round cross section. Tubes 3157 each include a pair of laterally spaced apart and parallel straight tube legs 3151 and 3153, and a transversely and perpendicularly extending straight crossover tube leg 3152 fluidly coupled between legs 3150, 3151 by 90-degree arcuately curved and radiused tube bends 3154. Tube bends 3154 preferably have a radius R1 equal to or greater than 2.5 times the tube diameter. Crossover tube leg 3152 may have a length less than the two straight tube legs 3151, 3153. It bears noting that tube legs 3151-3153 form a continuous and contiguous tube structure and tube-side space. It bears noting that the present construction differs from conventional U-tube bundles which have large radiused 180 degree curved tube bends to connect each straight tube leg. The convention construction therefore lacks the third straight section and 90 degree tube bends 3154.

Figure 64:
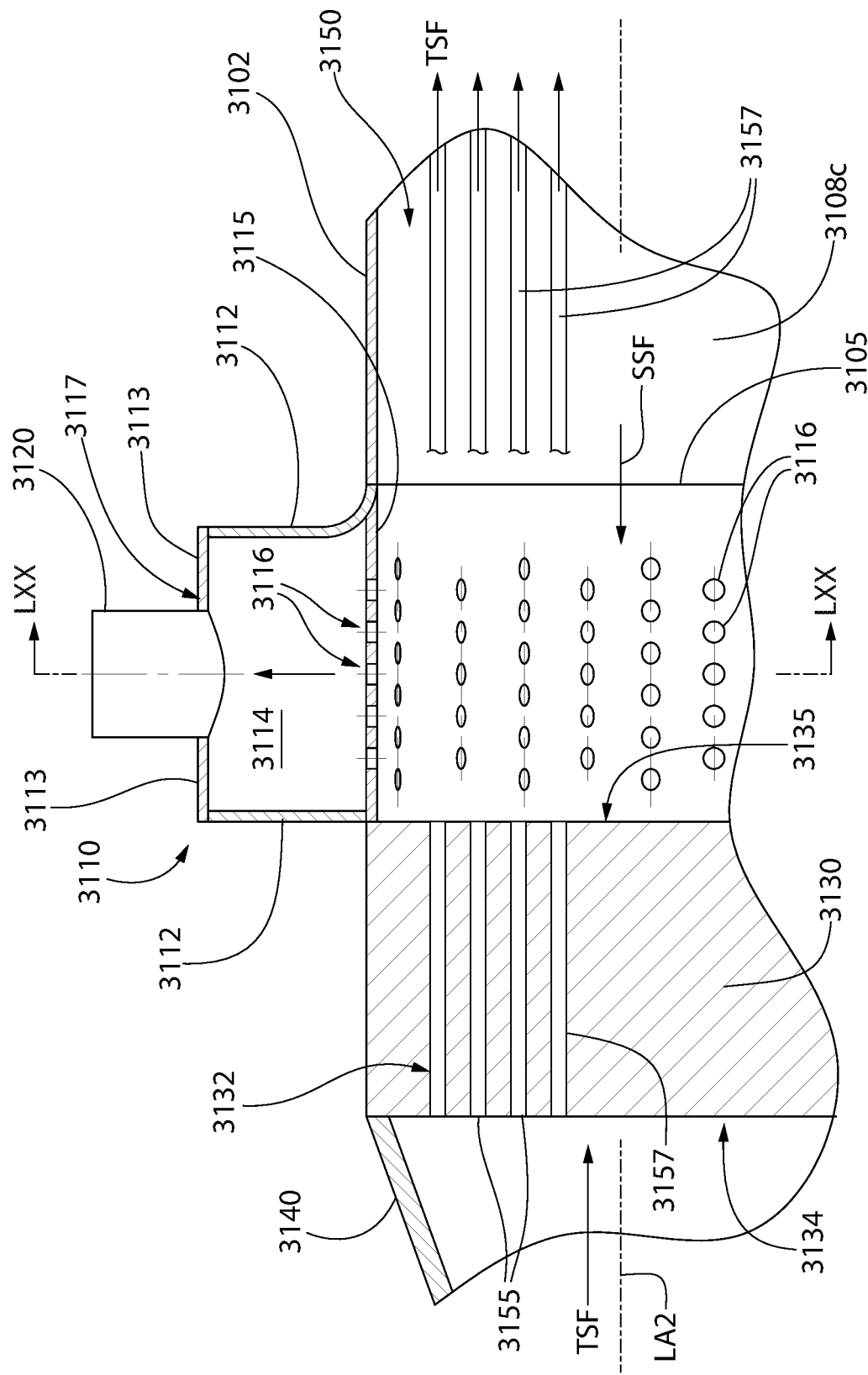
FIG. 64 is a partial side cross-sectional view of an expansion joint and shell-side inlet nozzle configuration of the heat exchanger of FIG. 62.

Tubes 3157 each include a first end 3155 defined by leg 3151 which extends through tubesheet 3130 and a second end 3156 defined by leg 3153 which extends through tubesheet 3131 (see, e.g. FIG. 64). Tubesheets 3130, 3131 each include a plurality of axially extending and parallel through bores 3132 oriented parallel to longitudinal axes LA1 and LA2 of shells 3101 and 3102 respectively. Terminal end portions of tubes 3157 are received in and extend completely through and inside through bores 3132 to the outboard surface or face 3134 of tubesheets 3130, 3131 (an example of the face 3134 of tubesheet 3130 being shown in FIG. 64). The open ends 3155 of tubes 3157 in tubesheet 3130 receive the tube-side fluid TSF. Conversely, the other open ends 3156 of tubes 3157 in tubesheet 3131 discharge the tube-side fluid. The tubesheets 3130, 3131 support the terminal end portions of the tubes in a rigid manner.

The tubes 3157 are fixedly coupled to tubesheets 3130, 3131 in a sealed leak-proof manner to prevent leakage from the higher pressure tube-side fluid TSF to the lower pressure shell-side fluid SSF. The pressure differential between shell side and tube side may be extremely great for some high pressure heaters creating higher exposure for tube-to-tubesheet joint leaks. For example, tube-side design pressures can range from about 300 psig to over 5000 psig for high pressure feedwater heaters, while the shell-side design pressures can range from about 50 psig to 1500 psig for higher pressure heaters. In some embodiments, the tubes 3157 may rigidly coupled to the tubesheets 3130, 3131 via expansion or expansion and welding; these techniques being well known in the art without further elaboration required. Tube expansion processes that may be used include explosive, roller, and hydraulic expansion.

The tubes 3157 may be formed of a suitable high-strength metal selected for considerations such as for example the service temperature and pressure, tube-side and shell-side fluids, heat transfer requirements, heat exchanger size considerations, etc. In some non-limiting examples, the tubes may be formed of stainless steel, Inconel, nickel alloy, or other metals typically used for power generation heat exchangers which generally excludes copper which lacks the mechanical strength for such applications.

The tubesheets 3130, 3131 have a circular disk-like structure and an axial thickness suitable to withstand cyclical thermal stresses and provide proper support for the tubes 3157. The tubesheets may each have a thickness substantially greater than the thickness of their respective shells 3101, 3102 (e.g. 5 times or greater) as illustrated in FIG. 64. Tubesheets 3130, 3131 include a vertical outboard surface or face 3134 and inboard surface or face 3135. The tubesheets 3130, 3131 may be formed of a suitable metal, such as steel including alloys thereof. The tubesheets may be formed of stainless steel in one embodiment.

The outer rim of tubesheets 3130, 3131 is preferably made as thin (radially) as possible within the limitations of the machining equipment so that the differential thermal expansion in the radial direction due to the temperature difference between the perforated region of the tubesheets containing through bores 3132 and the solid outer peripheral rim does not produce high interface stresses. The outer peripheral rim may be machined, as practicable, to reduce the rim thickness. Typically, the rim can be made as little as ¼-inch thick in some instances (measured from the outermost tube bore).

Figure 65:
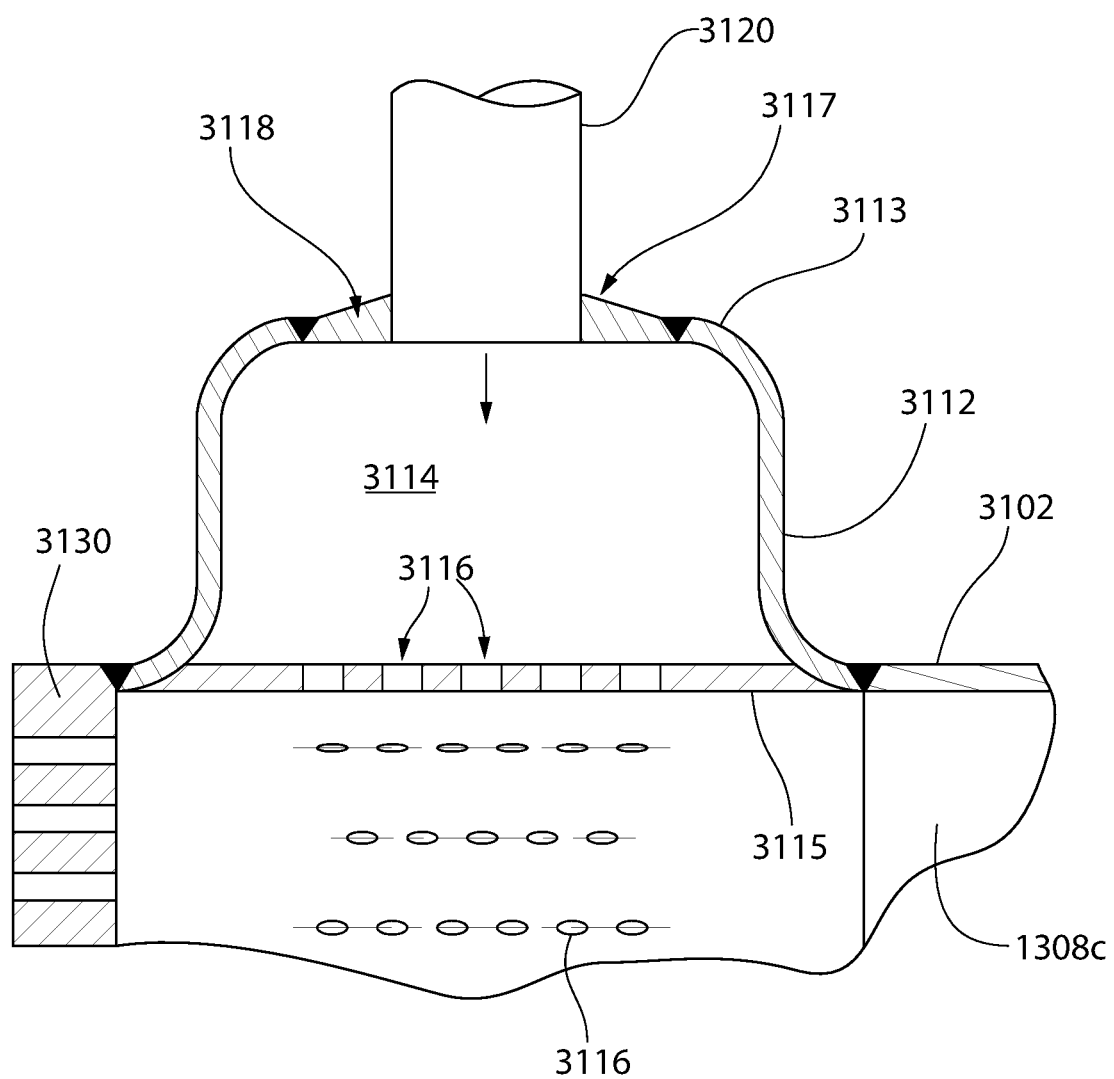
FIG. 65 is a partial side cross-sectional view of an alternative expansion joint and shell-side inlet nozzle configuration.
Figure 66:
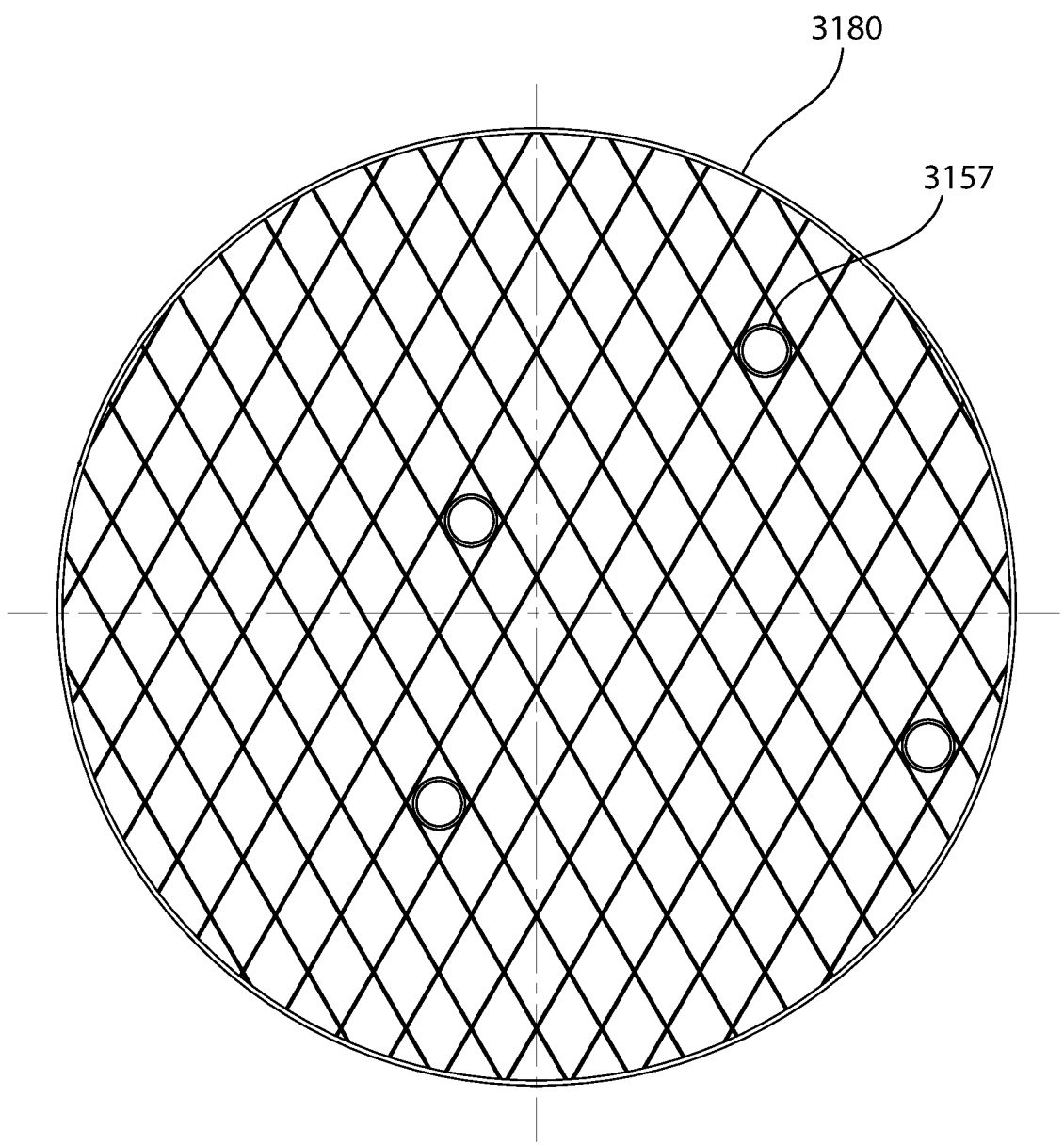
FIG. 66 is a side view of a baffle of the heat exchanger of FIG. 62.

According to one aspect of the present invention, each longitudinal shell 3101, 3102 is preferably joined to its tubesheet 3130, 3131 in a flexible manner by an intervening "flexible shell element assembly" such as expansion joints 3110 and 3111 (see, e.g. FIGS. 62, 64, and 65). Expansion joints 3110, 3111 may flanged and flued expansion joints which provide a structurally robust construction and reliable leak-proof service in contrast to bellows type expansion joints used for heat exchanger shells which are generally more susceptible to failure and leakage. The expansion joints 3110, 3111 mitigate stress levels from the differential thermal expansion (radial) between the shell and the tubesheet at their interface unlike directly welding the shell to the tubesheet in a rigid fixed tubesheet arrangement with no flexibility to accommodate differential thermal expansion.

Referring particularly to FIGS. 64 and 65, a flanged and flued expansion joint 3110, 3111 is formed in two halves (e.g. first and second half sections) each including a radially extending flanged portion 3112 arranged perpendicularly to longitudinal axes LA1 or LA2 of longitudinal shells 3101, 3102, and a flued portion 3113 extending axially and parallel to axes LA1 or LA2. The flanged portion 3112 is fixedly attached such as via welding to the flued portion 3113, or may be formed integrally with the flued portion as an integral unitary structural part of thereof which is produced from an annular workpiece forged or bent to define both the flanged and flued portions of each half. The two flued portions 3113 are rigidly connected together such as for example via welding. The expansion joints 3110, 3111 extend circumferentially around the shell and have an annular construction. Expansion joints 3110, 3111 protrude radially outward beyond the exterior surface of the shells 3101 and 3102 as shown.

One flanged portion 3112 of a first half of expansion joint 3110 is rigidly and fixedly attached such as via welding to end 3105 of longitudinal shell or 3102. The other flanged portion 3112 of the second half of expansion joint 3110 is rigidly and fixedly attached such as via welding to tubesheet 3130 (see, e.g. FIGS. 64 and 65). The inboard surface or face 3135 of tubesheet 3130 faces inwards to the expansion joint 3110. The same construction and joining method is applicable to the other expansion joint 3111 arranged on longitudinal shell 3101.

FIG. 64 depicts one exemplary construction of expansion joints 3110, 3111 in which a single flued portion 3113 is provided that bridges between the two flanged portions 3112. The single flued portion may be welded to each flanged portion 3112 in one embodiment. FIG. 65 depicts another exemplary construction in which an intervening annular ring 3118 is welded between each flued portion 3113 of expansion joint 3110. It bears noting that the constructions of either FIGS. 64 and 65 may be used for one or both of expansion joints 3110, 3111. Other constructions however are possible. The constituent portions of expansion joints 3110, 3111 are preferably formed of a metal suitable for the service conditions encountered. Metals usable for the expansion joints include carbon steel, stainless steel, and nickel alloys as some non-limiting examples.

As illustrated in FIG. 64, the relatively large diameter of the expansion joints 3130, 3131 provides the ideal location to introduce (or extract) the shell-side fluid SSF into heat exchanger 3100 without the excessively high local velocities and pressure loss that are endemic to the typical locations of shell-side inlets and outlets on the shells of heat exchangers. In addition, the introduction of a hot shell-side fluid into the heat exchanger through the expansion joint is also desirable because the expansion joint is best suited to accommodate differential thermal expansion between the shell and tube bundle.

In one embodiment, the expansion joints 3110, 3111 associated with shell-side outlet and inlet respectively each define an outward facing and longitudinally-extending annular nozzle mounting wall 3117. Wall 3117 is substantially straight in the axial direction and parallel to longitudinal axes LA1 and LA2 for mounting a shell-side inlet nozzle 3121 and shell-side outlet nozzle 3120. Wall 3117 is of course arcuately and convexly curved in the radial direction.

The expansion joints 3110, 3111 each further define an annular flow plenum 3114 formed inside each expansion joint. Flow plenums 3114 extend circumferentially around the longitudinal shells 3101, 3102 and are positioned radially farther outwards and beyond the exterior surface of the shells as shown. The flow plenums 3114 therefore are formed by the portions of the expansion joints 3110, 3111 that protrude radially outwards beyond the shells 3101 and 3102. The flow plenum 3114 in expansion joint 3110 defines a shell-side outlet flow plenum and plenum 3114 in expansion joint 3111 defines a shell-side inlet flow plenum. The inlet and outlet shell-side nozzles 3121, 3120 are in fluid communication with their respective flow plenum 3114.

Referring to FIGS. 62, 64, and 65, a shell-side inlet nozzle 3121 is fixedly and fluidly coupled to nozzle mounting wall 3117 of expansion joint 3111. Similarly, a shell-side outlet nozzle 3120 is fixedly and fluidly coupled to nozzle mounting wall 3117 of expansion joint 3111. Each nozzle 3120, 3121 completely penetrates its respective nozzle mounting wall 3117 and is in fluid communication with its associated flow plenum 3114 formed inside expansion joints 3110 and 3111. In one embodiment, nozzles 3120 and 3121 are oriented perpendicularly to longitudinal axes LA1 and LA2 to introduce or extract the shell-side fluid transversely into/from the heat exchanger 3100 as shown in FIG. 62 (note directional shell-side fluid SSF flow arrows). The shell-side fluid flows from the inlet nozzle 3121 into the shell-side inlet flow plenum 3114 of expansion joint 3111. The shell-side fluid flows from the shell-side outlet flow plenum 3114 in expansion joint 3110 into the outlet nozzle 3120.

Figure 70:
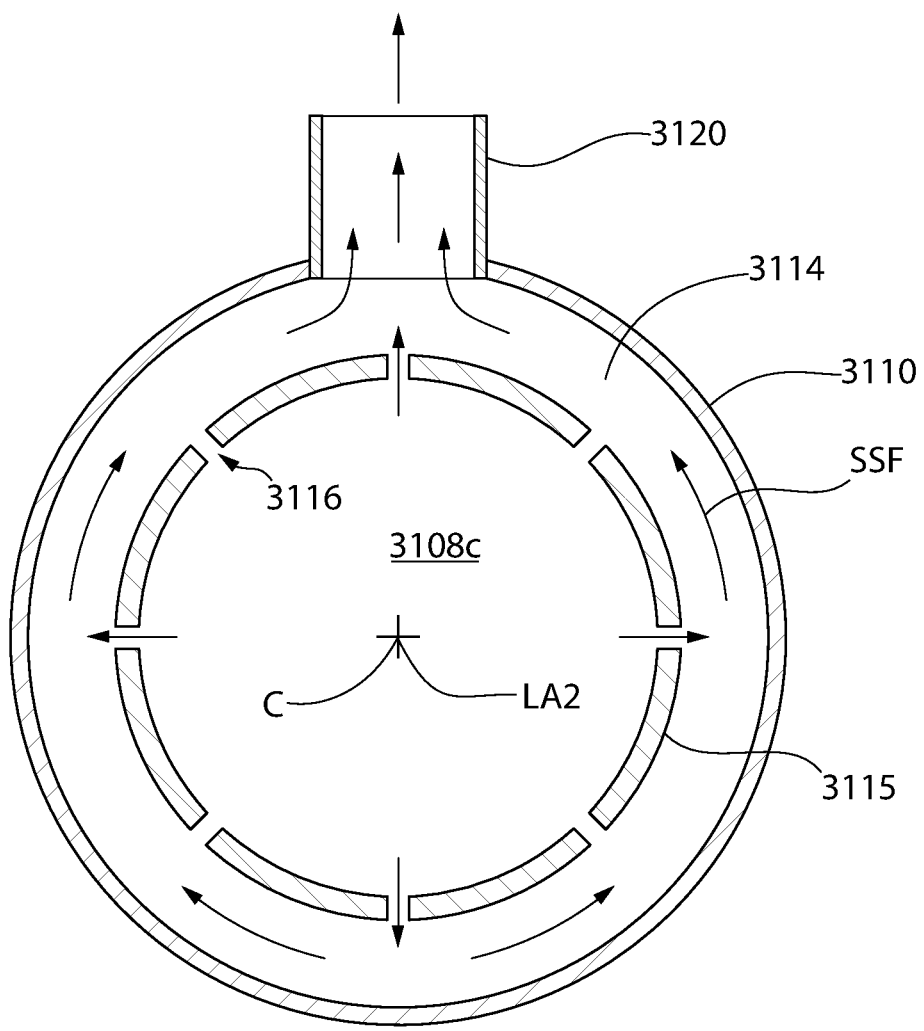
FIG. 70 is a transverse cross-sectional view taken through the expansion joints of FIG. 3 or 4.

To aid in uniformly introducing the shell-side fluid into or extracting the shell-side fluid from the shell-side spaces 3108a and 3108c of heat exchanger 3100, perforated shell-side annular inlet and outlet flow distribution sleeves 3115 are provided. FIGS. 64, 65, and 70 depict an example of the outlet flow distribution sleeve 3115 recognizing that the inlet flow distribution sleeve (not separately illustrated for brevity) is identical in the present embodiment. The inlet flow distribution sleeve 3115 is disposed inside expansion joint 3111 and concentrically aligned with the longitudinal shell 3101 and coaxial with longitudinal axis LAL. Outlet flow distribution sleeve 3115 is disposed inside expansion joint 3110 and concentrically aligned with longitudinal shell 3102 and coaxial longitudinal axis LA2. Accordingly, the axial centerline C of each sleeve 3115 coincides with its respective longitudinal axis (see, e.g. FIG. 70).

The inlet flow distribution sleeve 3115 is interspersed between the shell-side inlet flow plenum 3114 and shell-side space 3108a that extends into the expansion joint 3111. The outlet flow distribution shell 3115 is interspersed between the shell-side outlet flow plenum 3114 and shell-side space 3108c that extends into the expansion joint 3110. The inlet flow distribution sleeve 3115 is in fluid communication with the shell-side inlet nozzle 3121 and shell-side space 3108a of longitudinal shell 3101. Outlet flow distribution sleeve 3115 is in fluid communication with the shell-side outlet nozzle 3120 and shell-side space 3108c of longitudinal shell 3102. On the shell-side fluid inlet side, the flow distribution sleeve 3115 forces the fluid to circulate circumferentially around the shell-side inlet flow plenum 3114 before entering shell-side space 3108a of longitudinal shell 3101 (opposite to directional shell-side flow arrows SSF shown in FIG. 70). On the shell-side fluid outlet side, the flow distribution sleeve 3115 forces the fluid to enter the shell-side outlet flow plenum 3114 from shell-side space 3108c of longitudinal shell 3102 in a uniform circumferential flow pattern around the sleeve (as shown in FIG. 70).

Each of the inlet and outlet flow distribution sleeves 3115 includes a plurality of holes or perforations 3116 for introducing or extracting the shell-side fluid into or from its respective longitudinal shell 3101, 3102. The flow distribution sleeves 3115 may have a diameter substantially coextensive with the diameter of its respective shell (see, e.g. FIG. 64 or 65). The perforations 3116 may be arranged in any suitable uniform or non-uniform pattern and may have any suitable diameter. Preferably, the perforations are distributed around the entire circumference of the flow distribution sleeve 3115 to promote even distribution of the shell-side fluid into or out of the respective shell-side spaces 3108a and 3108c. The sleeves 3115 may be made of any suitable metal, such as steel, stainless steel, nickel alloy, or other. Sleeves 3115 may be fixedly attached to their respective expansion joints 3110 or 3111 such as via welding.

Referring to FIGS. 62-70, the tube-side flow path originates with tube-side inlet nozzle 3140 fluidly coupled to inlet tubesheet 3130 for introducing the tube-side fluid TSF into the portion of the tube bundle 3150 disposed in longitudinal shell 3102 associated with the outlet of the shell-side fluid from heat exchanger 3100. The tube-side fluid flows into the tubes 3157 in tubesheet 3130 from nozzle 3140 and through the tube bundle 3150 to outlet tubesheet 3131 associated with longitudinal shell 3101 and the inlet of the shell-side fluid into the heat exchanger 3100. Tube-side outlet nozzle 3141 is fluidly coupled to outlet tubesheet 3131 for discharging the tube-side fluid from the heat exchanger. Nozzles 3140 and 3141 may be welded to their respective tubesheets 3130, 3131 to form a leak proof fluid connection. Nozzles 3140 and 3141 are each provided with free ends configured for fluid connection to external piping such as via welding, flanged and bolted joints, or other types of mechanical fluid couplings. Nozzles 3140 and 3141 may be made of any suitable metal such as steel and alloys thereof as some non-limiting examples. In one embodiment, nozzles 3140 and 3141 may be frustoconical in shape as shown if minimizing the pressure loss in the tube-side stream is important.

In some embodiments, a plurality concentrically aligned and arranged flow straighteners 3170 may optionally be provided inside nozzle 3140 and/or nozzle 3141 as shown in FIGS. 68 and 69 for uniform tube-side flow distribution (in the case of inlet nozzle 3140) or collection (in the case of outlet nozzle 3141). The flow straighteners 3170 advantageously reduce turbulence in the fluid stream thereby minimizing pressure loss. Preferably, flow straighteners 3170 are complementary configured to the shape of nozzles 3140 and 3141. In one embodiment where nozzles 3140, 3141 have a frustoconical shape as shown, the flow straighteners 3170 each also have a similar shape but with different diameters. Flow straighteners 3170 are radially spaced apart forming a plurality of annular flow passages through each nozzle between the flow straighteners. In other possible embodiments where nozzles 3140, 3141 may be straight walled in lieu of frustoconical shaped, the flow straighteners 3170 similarly may be straight walled.

Heat exchanger 3100 further includes a plurality of baffles arranged transversely inside the longitudinal shells 3101, 3102 and transverse shell 3103 which support the tube bundle 3150 and maintain spacing between the tubes. Where minimization of the shell side pressure loss is an important consideration, non-segmental baffles 3180 (see, e.g. FIGS. 62 and 66) may be utilized to maintain the shell-side fluid flow in an essentially axial configuration (i.e. parallel to longitudinal axes LA1, LA2 and transverse axis TAL. Baffles 3180 comprise an open latticed structure formed by a plurality diagonally intersecting straps or plates forming diamond shaped openings as shown. Dummy tubes may be utilized to block any portion of the shell-side flow from bypassing intimate contact and convective interaction with the tubes. The number and spacing of the baffles is selected to insure freedom from and minimize flow induced destructive tube vibrations which can lead to tube ruptures.

In other embodiments, the tube bundle 3150 and its individual tubes 3157 may be supported at suitable intervals by a combination of non-segmental and "segmented" cross baffles which are well known in the art without undue elaboration. A number of segmented baffle configurations are available, commonly known as single segmental, double segmental, triple segmental, disc and donut, etc. A mix of baffle types may be chosen to leverage most of the allowable pressure loss so as to maximize the shell side film coefficient while insuring adequate margin against the various destructive vibration modes such a fluid-elastic whirling, and turbulent buffeting. The tubes 3157 facing and proximate to the shell-side outlet nozzle 3120 generally require additional lateral support to protect them from the risk of flow induced tube vibration from increased localized cross flow velocities.

Where flow distribution sleeve 3115 as previously described herein are used in expansion joint 3110 at the shell-side outlet nozzle 3120, the sleeve advantageously acts to reduce cross flow of the shell-side fluid stream to minimize flow induced tube vibration. The same safeguard against cross flow induced tube vibration applies to the shell-side fluid inlet flow distribution sleeve 3115 in expansion joint 3111.

Figure 67:
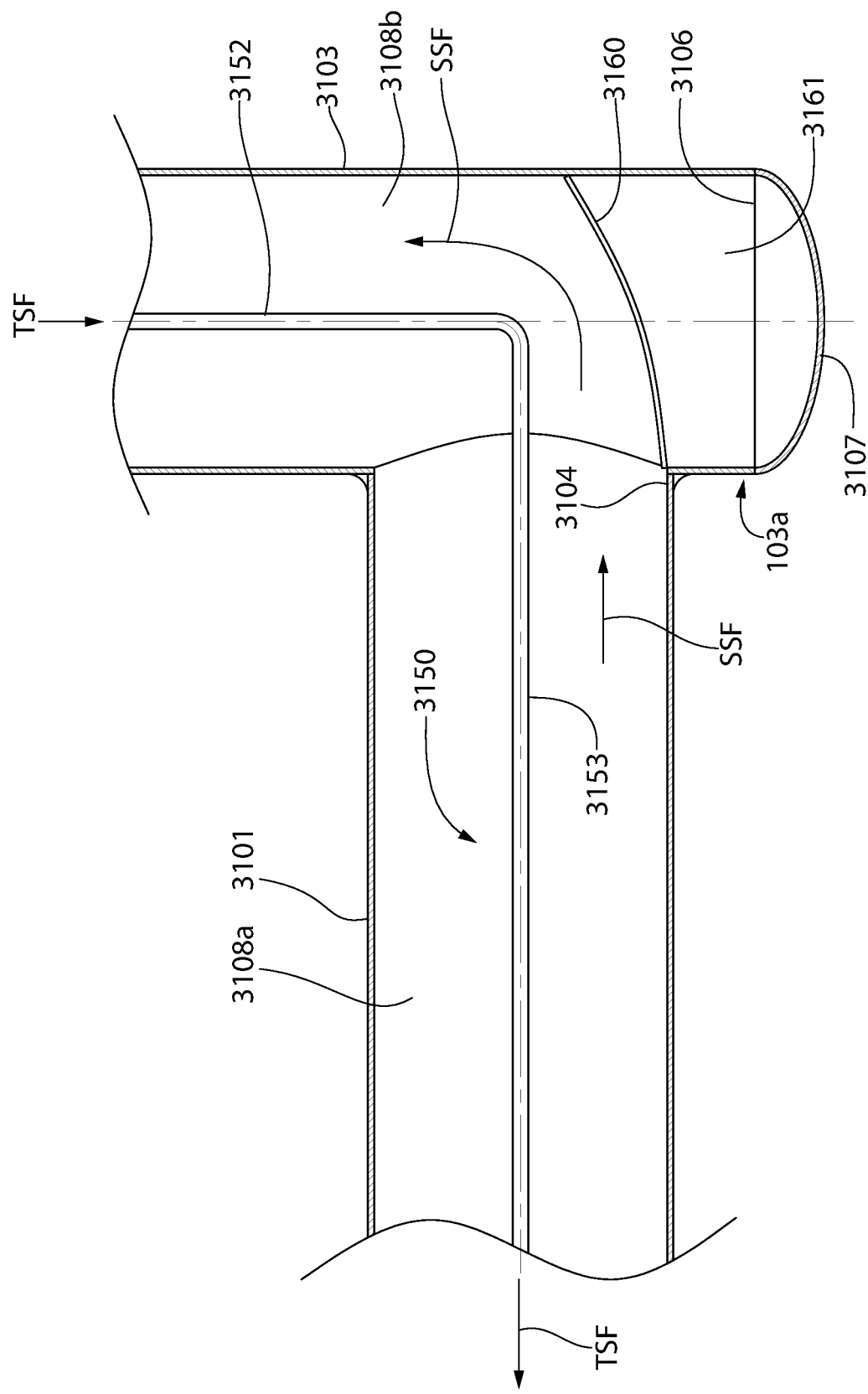
FIG. 67 is a cross-sectional view of a joint between a longitudinal and transverse shell of the heat exchanger of FIG. 62 showing a shell-side flow deflector plate.

In some embodiments, deflector plates 3160 as shown in FIG. 67 may optionally be added to the region between the longitudinal shells 3101, 3102 and the transverse shell 3103 to minimize eddies and vortices where the flow undergoes a change in direction. The flow deflector plates 3160 are disposed proximate to each end 3106 of transverse shell 3103 at the joints connecting the longitudinal shells 3101, 3102 to the transverse shell. These are the locations where shell-side flow enter or leaves the transverse shell. A flow deflector plate 3160 is preferably disposed inside the third shell-side space 3108*b* of each end portion of the transverse shell 3103 and extends transversely to the transverse shell. The flow deflector plates have one end or side positioned and welded to transverse shell 3103 at the terminal end 3104 of the longitudinal shells 3101, 3102. The remaining sides of the deflector plates 3160 are welded all around to other portions of the transverse shell. Deflector plates 3160 have an arcuately curved circular disk shape in some embodiments (the side or edge of plates 3160 being shown in FIG. 67). The deflector plates 3160 may be configured to completely seal off the cantilevered end portions of the transverse shell 3103 extending laterally beyond the longitudinal shells such that the shell-side fluid is prevented from contacting the end caps 3107. The deflector plates 3160 therefor create fully enclosed and sealed fluid dead spaces 3161 at the ends 3106 of the transverse shell 3103 between the end caps 3107 and deflector plates. Deflector plates 3160 may be made of any suitable metal compatible for welding to the shells, such as for example without limitation steel and alloys thereof.

Heat exchanger 3100 may be arranged to produce counter-flow between the shell-side and tube-side fluids SSF, TSF as shown in FIG. 62 to maximize heat transfer efficiency. The tube-side fluid enters and leaves the heat exchanger in an axial direction parallel to and coinciding with longitudinal axes LA2 and LA1, respectively. The shell-side fluid enters and leave the heat exchanger in a radial direction perpendicularly to longitudinal axes LA1 and LA2, respectively. In other possible embodiments, co-flow may be used in which the shell-side and tube-side fluids flow in the same direction.

Figure 71:
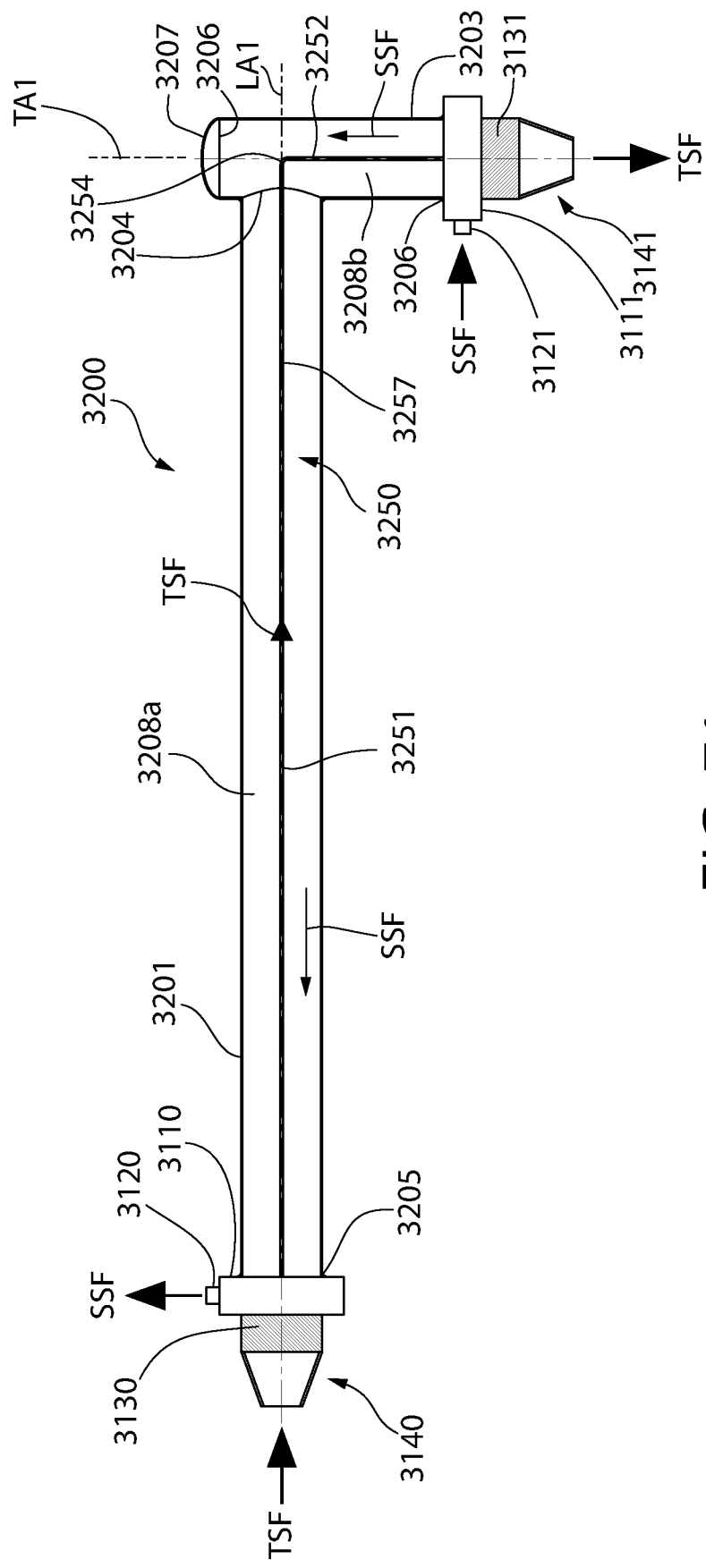
FIG. 71 is a plan view of a second embodiment of a heat exchanger according to the present disclosure.

FIG. 71 depicts an alternative embodiment of a heat exchanger 3200 constructed in accordance with same principles and features already described herein for heat exchanger 3100. Heat exchanger 3200, however, has an L-shaped arrangement of shells 3201, 3203 and tube bundle 3250. Other features are the same as heat exchanger 3100. Generally, heat exchanger 3200 includes a single longitudinal shell 3201 defining an internal shell-side space 3208*a* and transverse shell 3203 defining a shell-side space 3208*b* in fluid communication with shell-side space 3208*a*. Transverse shell 3203 is oriented perpendicularly to and fluidly coupled to terminal end 3204 of shell 3201. The other end of shell 3201 is fluidly coupled to expansion joint 3110 which includes the shell-side outlet nozzle 3120. Expansion joint 3110 is fluidly coupled to tube-side inlet tubesheet 3130 which is fluidly coupled to tube-side inlet nozzle 3140.

Expansion joint 3111 is fluidly coupled between one terminal end 3206 of transverse shell 3203 and tube-side outlet tubesheet 3131 which is connected to tube-side outlet nozzle 3141. End cap 3207 is attached to the remaining end 3206 of transverse shell 3203 which is formed on a cantilevered end portion of shell 3203 that extends laterally beyond longitudinal shell 3201 as shown.

Longitudinal shells 3201 may each be longer than transverse shell 3203, which in some embodiments has a length greater than the diameter of the longitudinal shell, and in some cases a length greater than twice the diameter of the longitudinal shell. In some embodiments, longitudinal shell 3201 has a length greater than twice the length of the transverse shell 3203.

Tube bundle 3250 is L-shaped comprising a plurality of tubes 3257 of the same configuration. Tubes 3257 comprise a straight tube leg 3251 in shell 3201 and a straight tube leg 3252 in shell 3203. The straight tube legs 3251 and 3252 are fluidly coupled together by a radiused tube bend 3254 to form a continuous tube-side flow path for the tube-side fluid between the tubesheets.

The expansion joints 3110 and 3111 may be the same as previously described herein with respect to heat exchanger 3100 including flow distribution sleeves 3115 and flow plenums 3114. Tube-side inlet and outlet nozzles 3140, 3141 may be the same and can include concentric flow straighteners 3170. A single deflector plate 3160 may be disposed in transverse shell 3203 at the same position described for transverse shell 3103 near end cap 3207 at the junction with longitudinal shell 3201. Heat exchanger 3200 provides the same benefits as heat exchanger 3100 including the ability to accommodate differential thermal expansion between the tube bundle and shells. Heat exchanger 3200 may be arranged to produce countercurrent flow between the shell-side and tube-side fluids as shown in FIG. 71 to maximize heat transfer efficiency. In other embodiments, the flow may be co-flow.

Additional advantages of the heat exchangers 3100 and 3200 disclosed herein include: a compact space requirement; maximum flexibility with respect to installation and orientation; reduced risk of severe stresses from restraint of thermal expansion; ability to withstand thermal and pressure transients is enhanced; and the shell-side pressure loss in the flow stream is minimized for optimal heat transfer performance by use of non-segmental baffles.

IV. Inventive Concept 4

With reference to FIGS. 72-100, a fourth inventive concept will be described.

Figure 72:
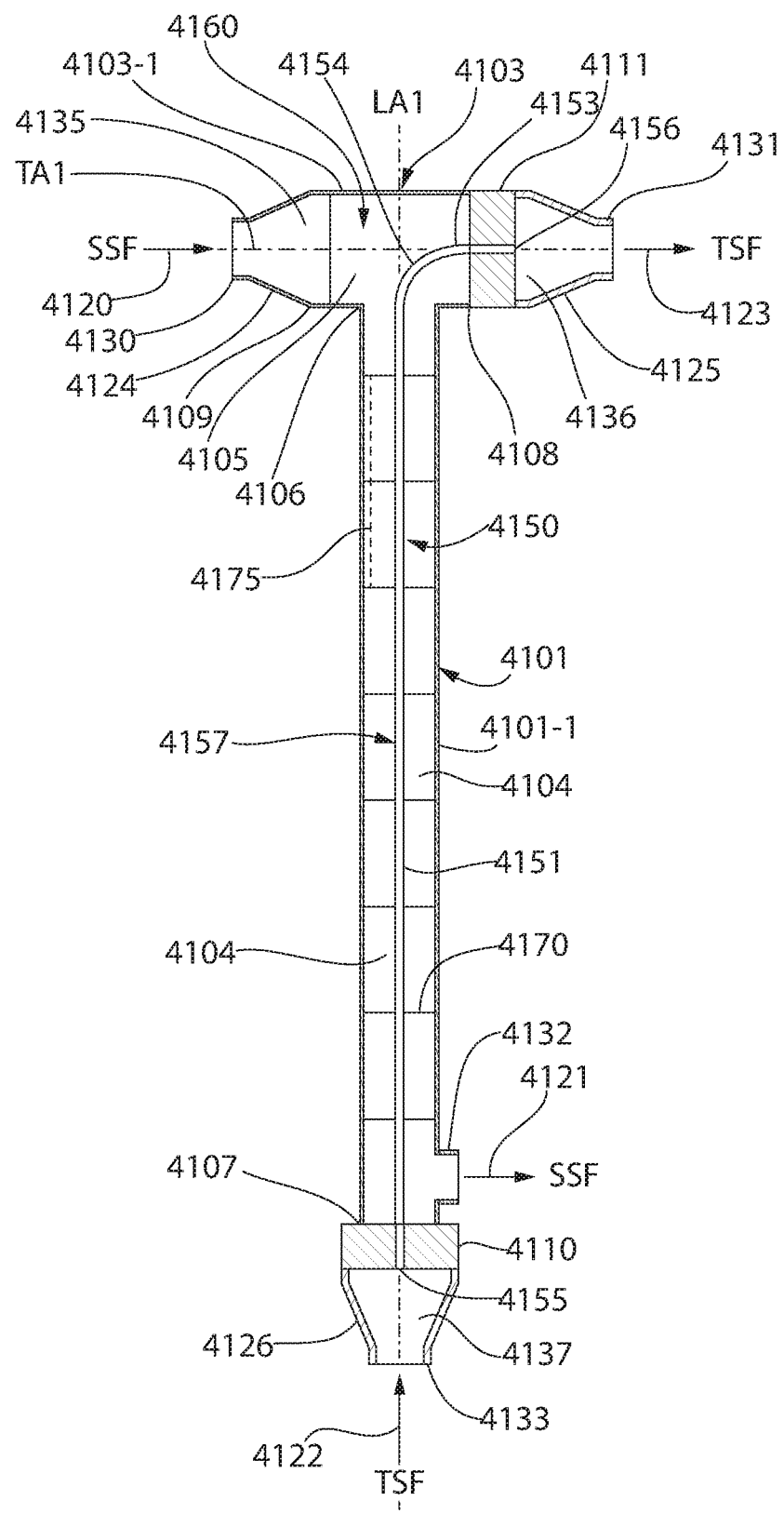
FIG. 72 is a cross-sectional view of a curved tube heat exchanger according to the present disclosure including a longitudinal shell and a transverse shell.
Figure 73:
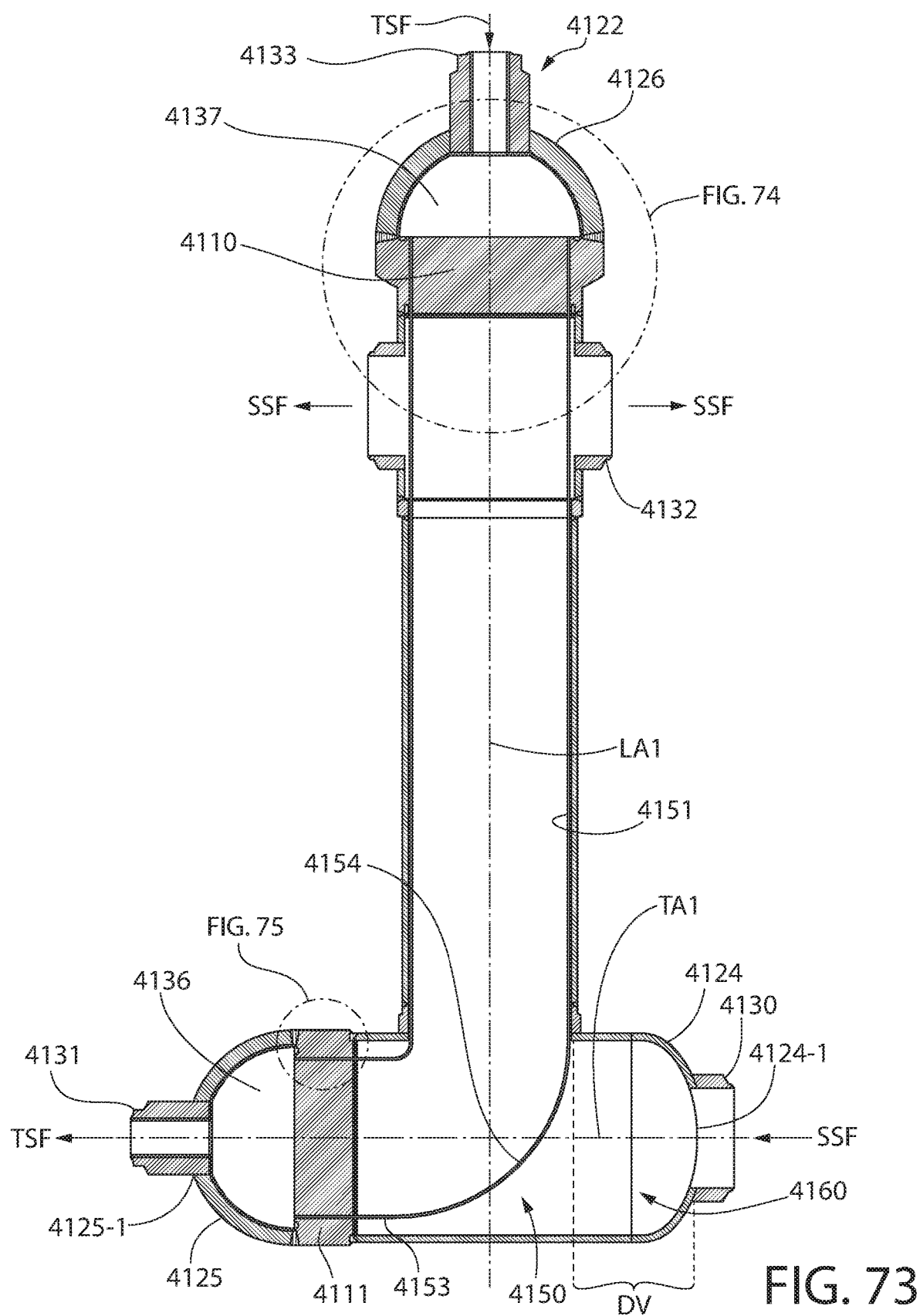
FIG. 73 is a cross-sectional view of the curved tube heat exchanger showing an alternative orientation.
Figure 74:
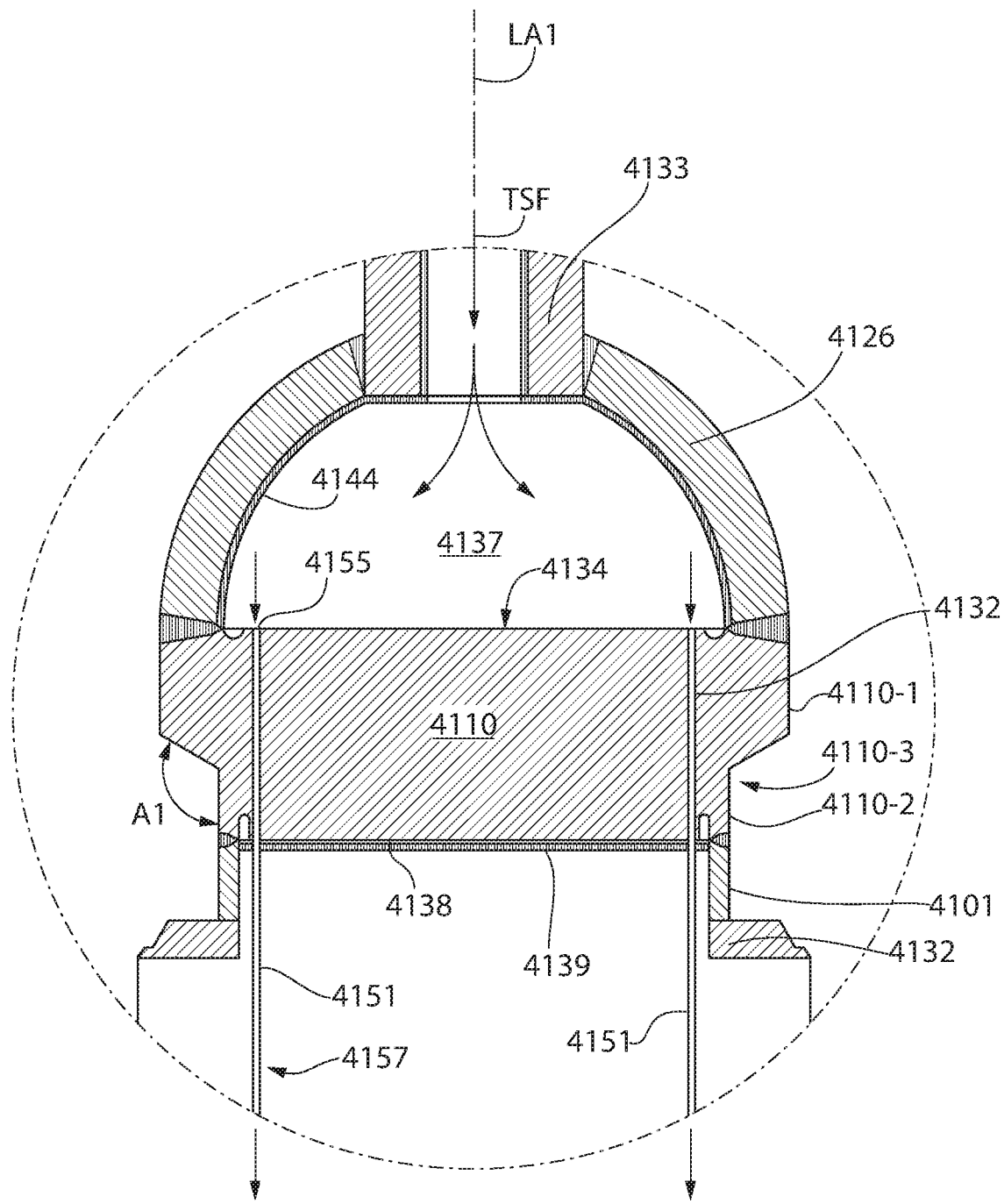
FIG. 74 is an enlarged detail from FIG. 73 showing the tube-side inlet head and tubesheet construction.
Figure 75:
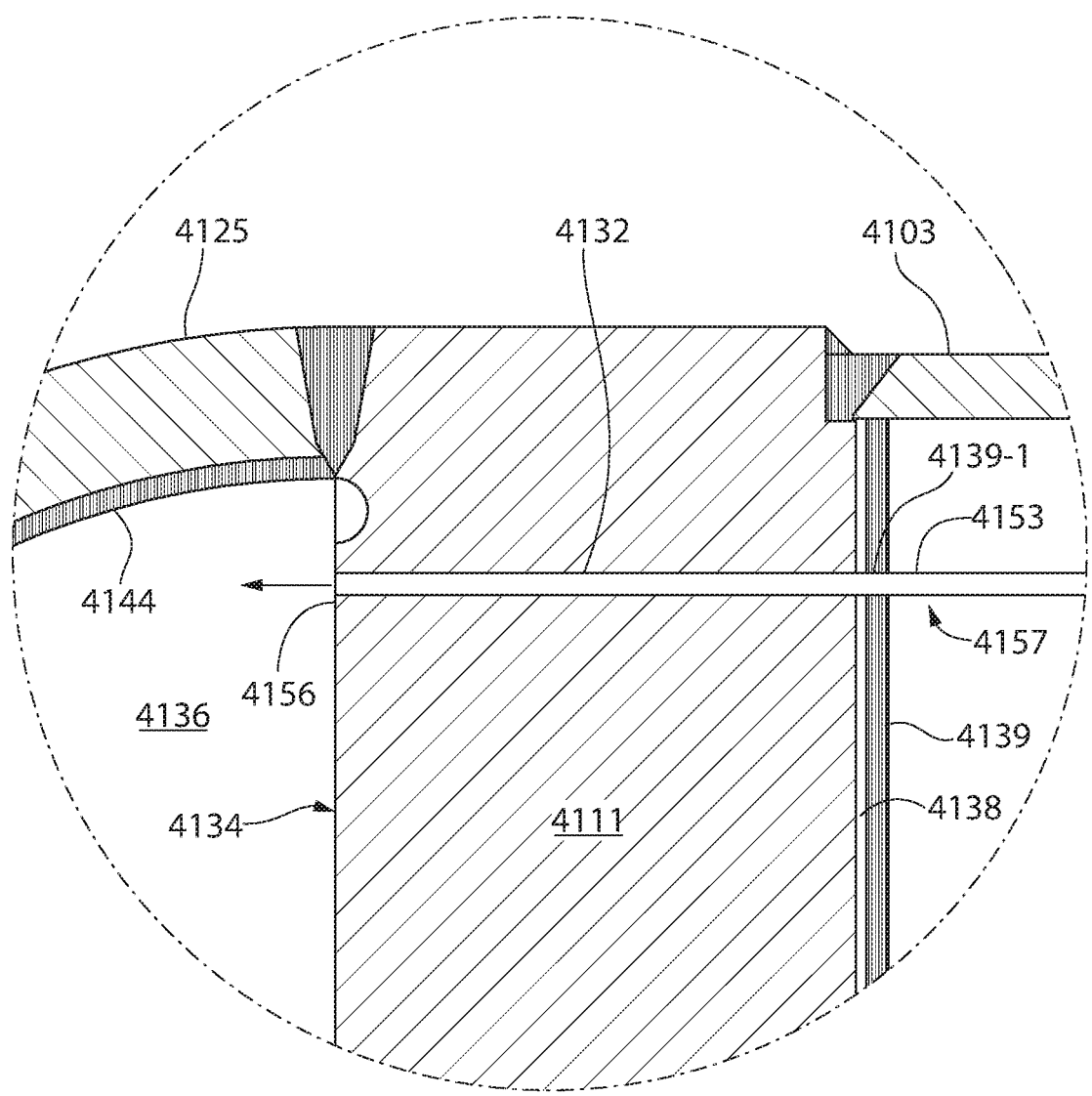
FIG. 75 is an enlarged detail from FIG. 73 showing a portion of tube-side outlet tubesheet construction.

FIGS. 72 and 73 depict one non-limiting embodiment of a shell and tube heat exchanger 6100 according to the present disclosure. FIGS. 74 and 75 depict construction details of the heat exchanger. Heat exchanger 4100 may be an ASME Boiler & Pressure Vessel Code (B&PVC) compliant construction.

Heat exchanger 4100 includes an integrally formed shell assembly comprising an elongated longitudinal shell 4101 defining a longitudinal axis LA1 and an elongated transverse shell 4103 defining a transverse axis TAL. Longitudinal and transverse shells 4101 and 4103 are cylindrical in one embodiment each including axially straight and circumferentially-extending sidewalls 4101-1 and 4103-1 respectively. Longitudinal shell 4101 includes terminal opposing ends 4106, 4107. Transverse shell 4103 includes terminal first and second ends 4108, 4109. The longitudinal and transverse shells may have the same or different diameters. The longitudinal shell and transverse shell define respective internal open shell-side spaces 4104 and 4105 for receiving, circulating, and discharging a shell-side fluid SSF. The shell-side spaces 4104 and 4105 are in fluid communication such that each shell-side space fully opens into the adjoining shell-side space to form a singular and contiguous common shell-side space for housing a tube bundle.

It bears noting that although the longitudinal and transverse shells 4101 and 4103 are depicted as vertically and horizontally oriented respectively for convenience of reference only, the heat exchanger 4100 may be used in any suitable orientation since both the tube-side and shell-side fluids are generally pressurized. Furthermore, it is apparent by comparing FIGS. 72 and 73 that the transverse shell 4103 may be arranged at the top or bottom of the shell assembly, or on either side in other embodiment in which the longitudinal shell 4101 may be horizontally oriented and the transverse shell vertically oriented instead. Any orientation or location of either shells 4101, 4103 may be used to suit the particular installation needs and available site space for the heat exchanger particularly in heat exchanger retrofit applications.

Each of the longitudinal and transverse shell 4101, 4103 is linearly elongated and straight having a substantially greater length than diameter. Longitudinal shell 4101 may be longer than transverse shell 4103 in length. In some embodiments, longitudinal shell 4101 may have a length greater than two times or more the length of the transverse shell 4103 (see, e.g. FIG. 72).

In the present configuration, the longitudinal and transverse shells 4101, 4103 are collectively arranged to form an integrated T-shaped shell assembly. Terminal end 4106 of longitudinal shell 4101 is fluidly and sealably joined or coupled directly to the transverse shell 4103 between ends 4108, 4109 of the transverse shell without any intermediary piping or structures. In one implementation, the longitudinal shell is coupled to transverse shell 4103 approximately midway between its ends 4108, 4109 as shown. In other possible embodiments, the longitudinal shell 4101 may be offset from the midpoint of the transverse shell 4103. The opposite second terminal end 4107 of the longitudinal shell 4101 is sealably joined directly to a first inlet tubesheet 4110 (see, e.g. FIG. 74), which is oriented transversely across the end and to the longitudinal axis LAL. Longitudinal shell 4101 may be seal welded via circumferential welds to both the transverse shell 4103 and first tubesheet 4110 in one construction to form a sealed leak-proof fluid connection and pressure retention boundary.

The shell-side fluid outlet 4121 and a tube-side fluid TSF inlet 4122 may be disposed on longitudinal shell 4101. The shell-side fluid outlet 4121 may comprise one or more outlet nozzles 4132 which may be welded to or formed integrally with the longitudinal shell as a unitary structural part thereof. In one embodiment, the outlet nozzle(s) is/are radially oriented and located proximate to the first tubesheet 4110 as shown to maximize the distance and heat between the shell-side fluid inlet and outlet of the heat exchanger 4100 for optimizing heat transfer to the tube-side fluid.

The tube-side fluid inlet 4122 may comprise a welded assembly including tube-side inlet channel or head 4126 seal welded to tubesheet 4110, and a tube-side fluid inlet nozzle 4133 seal welded to the head as shown. The cavity within head 4126 defines a tube-side inlet plenum 4137.

The shell-side fluid inlet 4120 and a tube-side fluid TSF outlet 4123 may be disposed on transverse shell 4103. The shell-side fluid inlet 4120 may comprise a welded assembly including shell-side inlet channel or head 4124 seal welded to second end 4109 of transverse shell 4103, and a shell-side inlet nozzle 4130 seal welded to the head as shown. Head 4124 defines a shell-side inlet plenum 4135.

The second terminal end 4108 of the transverse shell 4103 is sealably joined or coupled directly to a second outlet tubesheet 4111 oriented transversely across the end and to the transverse axis TA1 of the shell. The tube-side fluid outlet 4123 may comprise a welded assembly including tube-side outlet channel or head 4125 seal welded to tubesheet 4111, and a tube-side fluid outlet nozzle 4131 seal welded to the head as shown. Head 4125 defines a tube-side outlet plenum 4136.

The first tubesheet 4110 in longitudinal shell 4101 and second tubesheet 4111 in transverse shell 4103 may be oriented perpendicularly to each other as shown. In other configurations where the transverse shell may be oriented obliquely to the longitudinal shell, the tubesheets 4110, 4111 may be oriented at an oblique angle to each other.

In one embodiment, the tube-side fluid nozzles 4131, 4133, and shell-side fluid nozzle 4130 preferably may be centered on their respective heads 4125, 4126, and 4124. The nozzles 4131 and 4130 are thus coaxial with the transverse axis TA1 of the transverse shell 4103. Nozzle 4133 preferably may be coaxial with the longitudinal axis LA1 of longitudinal shell 4101. The coaxial introduction or extraction of flow to/from the heat exchanger 4100 contributes to less turbulent flow regimes within the heat exchanger. In other possible embodiments, however, the nozzles 4130, 4131, and 4133 may be non-coaxially oriented with their respective axes such as obliquely angled or perpendicularly/radially oriented to their respective axes. These later arrangements may be necessary depending on available space within the power generation or other industrial facility and existing/new piping runs to/from the heat exchanger.

Any suitable type and shape of heat exchanger channel or head used in the art may be used for heads 4124-4126. The heads may be ASME Boiler & Pressure Vessel Code (B&PVC) compliant heads. Examples of commonly used heat exchanger head types include without limitation a bonnet (dished or frustoconical as shown), straight, hemispherical ("hemi heads"), semi-elliptical, or flanged and dished heads as some non-limiting examples. The type/shape of the heads do not limit the invention in any way. In some embodiments, the heads 4125 and 4126 may be bolted via flanges to their respective tubesheets 4111, 4110 where frequent access to inspect and non-destructively examine the tubesheets is required. In some embodiments, a removable cover plate may be used with a straight channel/head welded to the tubesheet instead to facilitate inspection. Accordingly, numerous variations in design are possible to suit particular needs and installation circumstances.

Heat exchanger 4100 can advantageously be mounted in any suitable orientation in an available three-dimensional space in the power generation or other industrial facility to best accord with the plant's architectural and mechanical needs (piping runs, support foundation locations, vent & drain lines, etc.). Accordingly, the heat exchanger shown in FIGS. 72 and 73 may be mounted vertically, horizontally, or at any angle therebetween. Although the shell-side outlet nozzle(s) are illustrated as coplanar with the transverse shell 4103, in other embodiments the outlet nozzles can be rotated and positioned at any other angled position obliquely to the transverse axis TA1 of the transverse shell to accommodate piping runs to and from the heat exchanger without loss in performance efficacy and efficiency.

The shells 4101, 4103 of heat exchanger 4100 may be formed of any suitable metal used in the art for heat exchanger shells. In one example, the shells may be formed of steel such as stainless steel for corrosion protection. Other suitable metal including various steel or other alloys may of course be used depending on the service conditions encountered (e.g. type of fluid, pressure, and temperature), which may in part dictate the choice of material along with cost. The heads and tubesheets may be made of similar materials or different materials.

The direction of flow of the shell-side and tube-side fluids within the heat exchanger may be countercurrent or co-current. In FIGS. 72 and 73, the tube-side and shell-side fluid flows are in a countercurrent arrangement (i.e. flowing in opposite directions) thereby providing thermally efficient countercurrent flow arrangement with protection of the tube bundle from potentially deleterious effects of impingement from the incoming shellside flow via auxiliary plenum 4160 previously described herein. However, if tube damage from shell flow impingement is not a concern, then it may be possible to switch shell-side fluid and tube-side fluid inlets and outlets on both shell and tube sides preserving counter-currency. In some rather infrequent cases, it is desired to have a co-current flow arrangement which can be readily realized by switching either the shellside or the tubeside inlet/outlet nozzles as required. Accordingly, the present heat exchanger is not limited to either countercurrent or co-current flow arrangements.

Although heat exchanger 4100 has been discussed and illustrated by a single tube-side tube-pass configuration, in certain applications multiple tubeside pass (multi-pass) arrangements may be employed without difficulty in manners well known in the art. Extension of this design to multi-tube pass can be readily carried out by providing multi-pass bonnets or heads in a similar manner to what is done in straight tube heat exchangers. Thus, for example, for a two-tube pass arrangement, the inlet bonnet or head 4126 on the longitudinal shell 4101 would be divided into two separate internal chambers, and both inlet and outlet tube-side nozzle connections will be located within the inlet head 4126 while the head 4125 on the transverse shell 4103 serves merely as the return header. For example, heat exchanger head 4125 (previously associated with tube-side outlet 4123) may be replaced by a fully closed head (i.e. no tube-side fluid outlet nozzle 4131). A pass partition plate (not shown) may be mounted within the inlet tube-side flow plenum 4137 of inlet head 4126 to divide the plenum evenly into an inlet side and an outlet side of the flow plenum. The single inlet nozzle 4133 may be replaced by a new tube-side fluid inlet nozzle communicating with the inlet side of the plenum 4137 and adding a new separate tube-side fluid outlet nozzle communicating with the outlet side of the plenum. Such nozzles may be radially oriented (i.e. transversely to longitudinal axis LA1) if a straight head design is used, or obliquely to longitudinal axis LA1 if a curved or hemispherical head design is used. These nozzle and partition plate arrangements are well known in the art and commonly used without undue elaboration herein. Accordingly, the T-shaped heat exchanger 4100 may be reconfigured in a multitude of ways to fit the particular needs of virtually any application.

In one embodiment, the shell-side fluid may be steam and the tube-side fluid may be feedwater of a Rankine cycle used in a power plant for producing electricity. Other states of fluids and/or types of fluids such as petroleum or chemicals may be processed using heat exchanger 4100. For example, both the shell-side and tube-side fluids may be liquid in some applications. Heat exchanger 4100 is therefore not limited in the breadth of its applicability and use in an industrial process for heating fluids.

The longitudinal and transverse shells 4101, 4103 may be thought of as forming shell assemblies when fully constructed and assembled together including the heads, tubesheets, and nozzles. For example, a longitudinal shell 4101 assembly comprises the opposing ends 4106 and 4107, circumferential sidewall 4101-1 extending between the ends, tube-side fluid inlet nozzle 4133 fluidly coupled to the inlet tubesheet 4110, and a shell-side fluid outlet nozzle 4132 fluidly coupled to the circumferential sidewall. The transverse shell 4103 assembly comprises opposing ends 4108 and 4109, a circumferential sidewall 4103-1 extending between the ends, tube-side fluid outlet nozzle 4131 fluidly coupled to the outlet tubesheet 4111, and a shell-side fluid inlet nozzle 4130.

Figure 76:
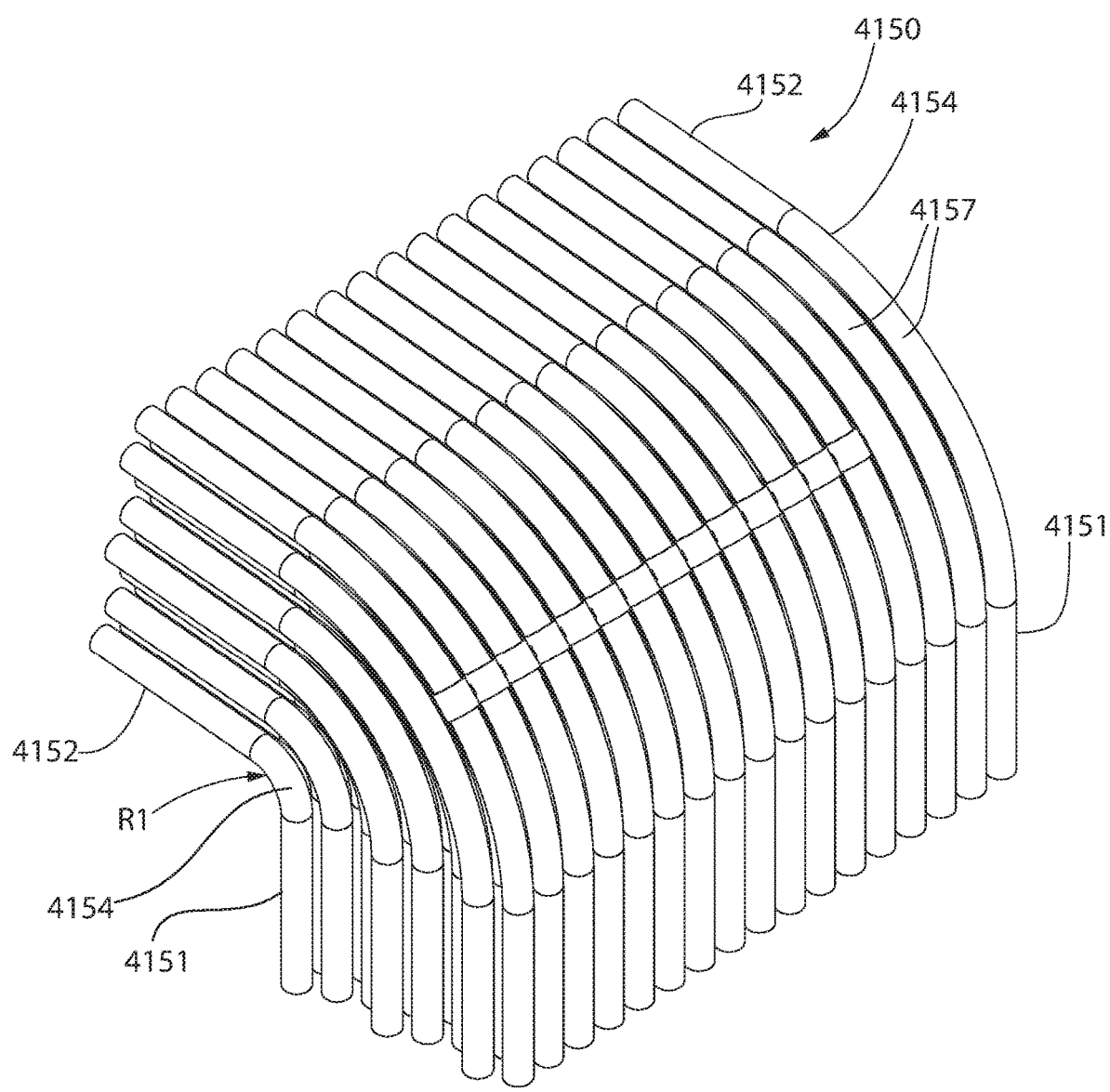
FIG. 76 is a perspective view of the tube bend portion of the J-shaped tube bundle of FIGS. 72 and 73.

With additional reference to FIG. 76 showing the bend area of the tubes, a generally "J-shaped" tube bundle 4150 is disposed in the longitudinal and transverse shells 4101, 4103. The tube bundle 4150 comprises a plurality of relatively closely spaced J-shaped tubes 4157 which extend contiguously from tube-side inlet tubesheet 4110 of longitudinal shell 4101 through the shell-side spaces 4104 and 4105 to tube-side outlet tubesheet 4111 of transverse shell 4103. FIGS. 72 and 73 depict only a single or a few tubes 4157 for brevity, recognizing that the tube bundle 4150 comprises multiple tubes of similar shape arranged in parallel to each other to form a tightly packed tube bundle. Tubes 4157 are cylindrical with a circular or round cross section. Tubes 4157 each include a long leg 4151 disposed in longitudinal shell 4101 and a short leg 4153 disposed in transverse shell 4103. The long and short legs 4151, 4153 are fluidly coupled together by 90-degree arcuately curved and radiused tube bends 4154 such that the short leg 4153 is perpendicular to the long leg 4151. The tube bends 4154 may have a minimum centerline bend radius R1 equal to or greater than 2.5 times the tube diameter as an example. Other suitable radiuses may be used. It bears noting that tube legs 4151, 4153 and bends 4154 form a continuous and contiguous tube structure and tube-side space from the inlet of the tubes 4157 fluidly coupled to tubesheet 4110 to the outlet of the tubes fluidly coupled to outlet tubesheet 4111.

Tubes 4157 each include a first inlet end 4155 defined by long leg 4151 which extends through tubesheet 4110 to inlet plenum 4137 and a second outlet end 4156 defined by short leg 4153 which extends through tubesheet 4111 to plenum 4136 (see also FIGS. 72-75). Tubesheets 4110, 4111 each include a plurality of axially extending and parallel through bores 4132 oriented parallel to longitudinal axis LA1 of longitudinal shell 4101. Terminal end portions of tubes 4157 are received in and extend completely through and inside through bores 4132 to the outboard surface or face 4134 of each tubesheet 4110, 4111 (an example of one face 4134 of tubesheet 4110 being shown in FIG. 74—the other tubesheet 4111 having the same arrangement). The open ends 4155 of tubes 4157 in tubesheet 4110 receive the tube-side fluid from inlet nozzle 4133 and plenum 4137. Conversely, the other open ends 4156 of tubes 4157 in tubesheet 4111 discharge the tube-side fluid into plenum 4136 and through outlet nozzle 4131. The tubesheets 4110, 4111 support the terminal end portions of the tubes in a rigid manner.

The tubes 4157 are fixedly coupled to tubesheets 4110, 4111 in a permanently sealed leak-proof manner to prevent leakage from the generally higher pressure tube-side fluid TSF to the lower pressure shell-side fluid SSF. The pressure differential between shell side and tube side may be extremely great for some high pressure heaters creating higher exposure for tube-to-tubesheet joint leaks. For example, tube-side design pressures can range from about 300 psig to over 5000 psig for high pressure feedwater heaters, while the shell-side design pressures can range from about 50 psig to 1500 psig for higher pressure heaters. In some embodiments, the tubes 4157 may rigidly coupled to the tubesheets 4130, 4131 via expansion or expansion and welding; these techniques being well known in the art without further elaboration required. Commonly employed tube expansion processes that may be used include explosive, roller, and hydraulic expansion.

The tubes 4157 may be formed of a suitable high-strength metal selected for considerations such as for example the service temperature and pressure, tube-side and shell-side fluids, heat transfer requirements, heat exchanger size considerations, etc. In some non-limiting examples, the tubes may be formed of stainless steel, Inconel, nickel alloy, or other metals typically used for power generation heat exchangers which generally excludes copper which lacks the mechanical strength for such applications.

Advantageously, the J-shaped curved tubes 4157 of tube bundle 4150 serve to substantially eliminate the high longitudinal stresses in the shell and the tube bundle that arise from differential thermal expansion from the differences in the shell & tubing material's coefficients of thermal expansion and fluid temperatures between the two flow streams (tube-side and shell-side). In fixed tubesheet heat exchangers operating at high temperatures, the differential expansion induced stress is the greatest threat to the unit's integrity. Another operational benefit is the introduction of the shell side inlet flow into an open (un-tubed) space within the shell which removes or mitigates the risk of impingement damage common to tubular heat exchangers that have the shell inlet located in close proximity to the tubes. This present design prevents the shellside flow from impinging directly on the tubes (i.e., the flow is not delivered in the congested tubed space within the shell thus precluding or minimizing impingement or erosion damage to the tubes).

The inlet and outlet tubesheets 4110, 4111 have a circular disk-like structure and an axial thickness suitable to withstand cyclical thermal stresses and provide proper support for the tubes 4157. The tubesheets may each have a thickness substantially greater than the thickness of their respective shells 4101, 4130 (e.g. 5 times or greater) as illustrated in the figures. Tubesheets 4110, 4111 each include a outboard surface or face 4134 and inboard surface or face 4138. The tubesheets 4110, 4111 may be formed of a suitable metal, such as steel including alloys thereof. The tubesheets may be formed of stainless steel in one embodiment.

The outer rim of tubesheets 4110, 4111 is preferably made as thin (radially) as possible within the limitations of the machining equipment so that the differential thermal expansion in the radial direction due to the temperature difference between the perforated region of the tubesheets containing through bores 4132 and the solid outer peripheral rim does not produce high interface stresses. The outer peripheral rim may be machined, as practicable, to reduce the rim thickness. Typically, the rim can be made as little as ¼-inch thick in some instances (measured from the outermost tube bore).

Referring to FIGS. 72-75, the tube-side flow path originates with tube-side inlet nozzle 4133 fluidly coupled to inlet tubesheet 4110 via inlet plenum 4137 for introducing the tube-side fluid TSF into the portion of the tube bundle 4150 disposed in longitudinal shell 4101 (also associated with the outlet of the shell-side fluid from heat exchanger 4100). The tube-side fluid enters inlet plenum 4137 from inlet nozzle 4133 and flows into the tubes 4157 in tubesheet 4110 and through the tube bundle 4150 to outlet tubesheet 4111 disposed on transverse shell 4103 (also including the inlet 4120 of the shell-side fluid into the heat exchanger 4100). Tube-side outlet nozzle 4131 is fluidly coupled to outlet tubesheet 4111 via outlet plenum 4136 for discharging the tube-side fluid from the heat exchanger. It bears noting that with the J-shaped tube bundle 4150, the tube-side fluid is discharged from heat exchanger 4100 in a direction which is 90 degrees to the inlet of the tube-side fluid.

The shell-side fluid shell-side fluid flow path originates with shell-side inlet nozzle 4130 of transverse shell 4103. In a preferred embodiment, the internal shell-side cavity or space 4105 within transverse shell 4103 receives the shell-side fluid from the shell inlet nozzle 4130 in an open un-tubed volume or space (e.g. referred to as auxiliary plenum 4160 herein) in the transverse shell (see, e.g. FIGS. 72 and 73). The auxiliary plenum 4160 is a cumulative volume collectively defined by volumes in the tubeless end portion of the internal shell-side space 4105 of transverse shell 4103 at the shell-side inlet 4120 and by the inlet head 4124. The operational benefit is that auxiliary plenum 4160 provides a distance and void in the transverse shell 4103 for introduction of the shell side inlet flow in a manner which removes or mitigates the risk of impingement erosive damage to the tubes 4157 which is a common problem in shell and tube heat exchangers having the shell-side fluid inlet located in close proximity or directly into the tubes. This present design prevents the shell-side fluid flow from impinging directly on the tubes while at its highest velocity directly from the shell-side fluid inlet nozzle 4130 by providing extra volume in auxiliary plenum 4160 of the transverse shell 4103 which is free of tubes. The extra volume provided by the shell-side auxiliary plenum 4160 allows the shell-side fluid to expand, thereby reducing its velocity to ameliorate the erosive effects of the fluid stream. In other words, the second plenum 4160 provides that the shell-side fluid stream or flow is not delivered in the congested tubed space within the transverse shell thus precluding or minimizing impingement and erosive damage to the tube bends). The auxiliary plenum 4160 may be adjusted by increasing/decreasing the axial length of the transverse shell 4103 and concomitantly the plenum therein to provide the necessary protection for the tube bundle 4150 from erosion by the shell-side fluid.

In one embodiment, the shell-side fluid auxiliary flow plenum 4160 in transverse shell 4103 has an axial length DV measured along transverse axis TA1 which extends horizontally from the terminal end 4124-1 of the shell-side fluid inlet head 4124 to the nearest point on shell 4103 where the longitudinal shell 4101 is attached (as identified in FIG. 73). In one embodiment, DV is at least ¼ the axial length of the transverse shell 4103 measured between the terminal ends 4124-1, 4125-1 of its opposing heads 4124, 4125 respectively to provide space for expanding the inlet shell-side fluid.

The shell-side fluid flow is introduced in a flow direction axially aligned and parallel to transverse axis TA1 and short sections 4153 of tubes 4157. The shell-side fluid is thus introduced to flow in an axially straight direction in line with and directly towards the outlet tubesheet 4111 as shown in FIGS. 72 and 73. The shell-side fluid flow is directed towards and encounters the tube bends 4154 of tube bundle 4150 before changing direction 90 degrees and flowing through the longitudinal shell 4101 in a flow direction axially aligned and parallel to longitudinal axis LAL. The tube bends 4154 are thus subjected to shell-side fluid at its highest temperature from shell-side inlet 4120 thus providing final heating and increase in temperature of the tube-side fluid immediately before exiting the tubes 4157 from the tubesheet 4111 into the tube-side fluid outlet flow plenum 4136.

With continuing reference to FIGS. 72 and 73, the shell-side fluid SSF enters the auxiliary plenum 4160 of transverse shell 4103 from the shell-side inlet nozzle 4130 at the shell-side inlet 4120. The shell-side fluid changes direction and flows 90 degrees through the longitudinal shell 4101 to the outlet nozzle(s) 4132 where the shell-side fluid leaves the heat exchanger 4100 in a radial direction oriented parallel to the inlet direction of the fluid into the heat exchanger. In one embodiment, the shell-side fluid may leave the heat exchanger in the same direction as the shell-side fluid inlet flow (albeit spaced apart and not in the same horizontal plane).

Tube-side nozzles 4133 and 4131 may be seal welded to their respective heads 4126, 4125 to form a leak proof fluid connection. Heads 4126, 4125 are in turn seal joined via welded connections or flanged bolted connections to their respective tubesheets 4110, 4111. Shell-side nozzles 4130 and 4132 are similarly seal welded to head 4124 and the circumferential wall of shell 4101 respectively. Nozzles 4130, 4131, 4132, and 4133 are each provided with terminal ends configured for fluid connection to external piping such as via welding, flanged and bolted joints, or other types of mechanical fluid couplings. In one embodiment, each of the nozzles 4130-4133 may be provided with weld end preparations for connection to external piping. Nozzles 4130-4133 are relatively short fluid coupling structure generally having a length less than a diameter of their respective shells 4101 or 4103 to which they are attached or integrally formed therewith. Nozzles 4130-4133 may be made of any suitable metal such as steel and alloys thereof as some non-limiting examples.

Referring to FIGS. 72 and 77A-77C, heat exchanger 4100 further includes a plurality of baffles 4170 arranged transversely inside the longitudinal shell 4101 to support the tube bundle 4150 and maintain lateral spacing between the tubes 4157. Each baffle is formed of a suitable flat metal plate which includes a plurality holes to allow the tubes to pass through the baffles. Portions of the baffle plates where tubes are not present may of course be solid. The baffles may be supported by longitudinally-extending tie rods 4175 coupled between the baffles for added stability against the shell-side fluid flow (schematic example of which is shown in FIG. 72 represented by dashed lines). The tie rods 4175 maintain the longitudinal spacing between the baffles 4170.

The baffles 4170 force the shell-side fluid to change direction and flow transversely across the tubes while increasing velocity to improve heat transfer performance and efficiency. FIGS. 77A-C show the typical shell-side fluid flow represented by directional flow arrows that is produced by some of the example baffles shown. Any type or combination of different types of baffles 4170 may be used. Examples of commonly used baffles 4170 well known in the art include single segmental baffles 4171 (FIG. 77A), double segmental baffles 4172 (FIG. 7B), triple segmental baffles (not shown), disc and donut baffles (FIG. 7C), etc. Where minimization of the shell side pressure loss is an important consideration, non-segmental baffles (not shown) may be utilized to maintain the shell-side fluid flow in an essentially axial direction. Such baffles, well known in the art without undue elaboration, generally comprise an open latticed structure formed by a plurality diagonally intersecting straps or plates forming diamond shaped openings as shown. The heat exchanger tubes pass through the openings. Regardless of the type(s) of baffles used, the number and longitudinal spacing between the baffles may be selected to insure freedom from and minimize of flow induced destructive tube vibrations which can lead to tube ruptures.

In some embodiments as shown in FIG. 72, baffles 4170 may be omitted from the transverse shell 4103 due to the relatively short length of the shell in contrast to the longer longitudinal shell 4101. As shown, there are no straight sections of tubing 4157 within the transverse shell 4103 other than the end portions of the tubes which extend through the outlet tubesheet 4111. In other embodiments where the transverse shell 4103 may have greater lengths, baffles may be added as necessary to reduce shell-side fluid flow induced vibrations in the tubes. In yet other possible embodiments regardless of the length of the transverse shell 4103, the curved tube bends 4154 may be supported by an appropriately configured baffle 4170.

In order to further protect the tubesheets 4110, 4111 from erosion caused by the flow of shell-side fluid, the inboard surface or face 4138 may be protected by a flow blocker plate 4139. Referring to FIGS. 73-75, the flow blocker plates 4139 are substantially flat or planar and rigidly-sealably coupled to the longitudinal and transverse shells 4101, 4103 such as via circumferential welds. The block plates 4139 are circular and have a diameter coextensive with the diameter of the tubesheets 4110, 4111 at their inboard faces 4138 (which may be less than the outside diameters of the tubesheets) within the shell-side spaces 4104, 4105. Blocker plates 4139 are oriented parallel to the tubesheet inboard faces 4138 and preferably may be spaced apart as shown forming discrete structures separate from the tubesheets 4110, 4111. Each plate 4139 includes a multitude of circular through holes 4139-1 through which the tubes 4157 may pass to the tubesheets. The blocker plates 4139 are not connected in any way to the tubesheets in preferred embodiments.

In heat exchangers subject to thermal transients, special attention preferably should be given to the bonnet or channel (e.g. head) to tubesheet/shell joint where the parts may be at significantly different temperatures. The differential temperature problem may be most prevalent at the tubesheet/shell joint at the tube-side fluid inlet 4122 end of the longitudinal shell 4101. A joint design detail that minimizes the thickness of the tubesheet's rim (peripheral un-tubed region) and provides for radial flexibility to accommodate differential radial expansion may therefore be necessary. FIG. 74 shows such an exemplary detail. The tubesheet 4110 may include a first portion 4110-1 welded to head 4126 having a first diameter and a second portion 4110-2 welded to longitudinal shell 4101 having a second diameter smaller than the first diameter. An annular stepped transition portion 4110-3 is formed between portions 4110-1 and 4110-2 which extends circumferentially around the outer surface of the tubesheet 4110. Transition portion 4110-3 may be angled in one embodiment as shown to minimize the stress concentration factor in the tubesheet base material at the transition (as opposed to a 90-degree transition). An oblique transition angle A1 is formed between the larger and smaller diameter portions 4110-1 and 4110-2 for such an angled transition portion 4110-3. Angle A1 is between 90 and 180 degrees, preferably between 110 and 170 degrees, and more preferably between 120 and 160 degrees. In one non-limiting example, angle A1 may be about 120 degrees.

In those applications where the heat exchanging streams undergo a significant temperature change, the two tubesheets 4110, 4111 may be at significantly different temperatures. In such cases, it may be commercially advantageous to utilize two different tubesheet materials. In some embodiments, a thermal liner 4144 may also be employed in the tubesheet-related heads 4125, 4126 to alleviate the effect of transients in the tubeside fluid (see, e.g. FIGS. 74 and 75). The liner 4144 may be configured for and in conformal contact with the interior surface of the heads 4125, 4126 thereby conforming to the shape of head interior surface. The liners 4144 may be formed of the same or a different material than the heads. The liners may be formed of metal in one embodiment. Any suitable method of applying or attaching the liners to the heads may be used. In some embodiments, the liners 4144 may be a metallic coating conformably applied to the interior surface of the heads 4125, 4126.

It also bears noting the use of flow blocker plates 4139 previously described herein, which are spaced apart from the inboard faces 4138 of the tubesheets 4110, 4111, creates a stagnant flow space or area at the shell/tube-sheet interface region that may also help mitigate the effect of thermal transients in addition to protecting the tubesheets from shell-side flow erosion.

According to another aspect of the invention, a plurality of the basic T-shaped heat exchanger 4100 may be combined and closely coupled together physically and fluidly in a variety of different ways to produce a compound heat exchanger unit comprising an assembly of multiple heat exchanger 4100 to suit particular application needs. The T-shaped heat exchangers 4100, which forms the basic building block for constructing multi-unit heat exchanger systems or assemblies, is particularly amenable to such use.

Figure 78:
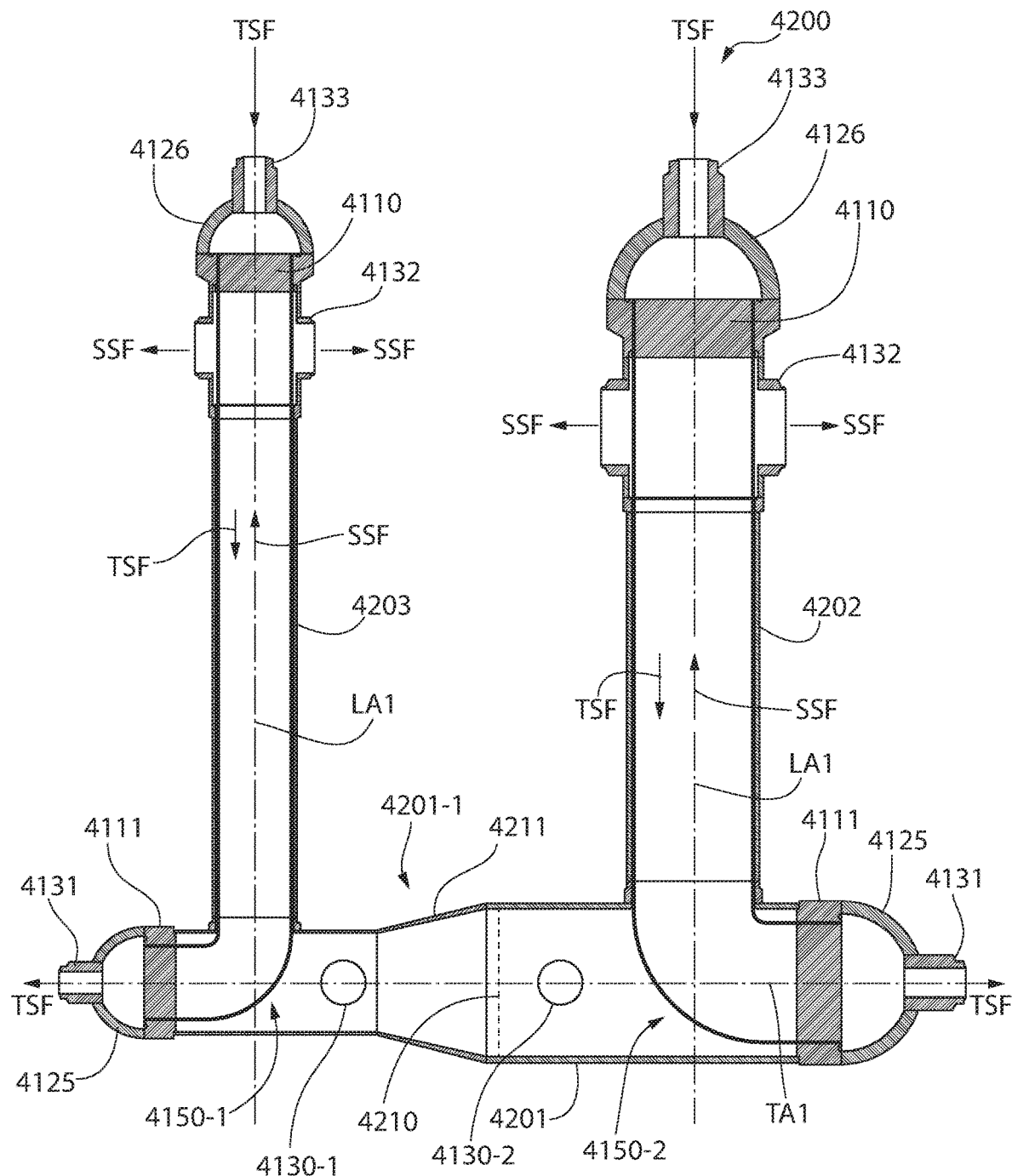
FIG. 78 shows a heat exchanger unit combining two heat exchangers of FIG. 73 sharing a common transverse shell.

One example of a double/dual heat exchanger unit 4200 is shown in FIG. 78. In this embodiment, the transverse shells of the two heat exchangers 4100 are combined into an elongated single common transverse shell 4201. Transverse shell 4201 may be horizontally oriented as shown in this non-limiting orientation (recognizing that heat exchanger unit 4200 and transverse shell 4201 can have any orientation such as vertical or angles between horizontal and vertical similarly to transverse shell 4103). Heat exchanger unit 4200 includes two vertically oriented longitudinal shells 4202, 4203 structured similarly to and having the same appurtenances as longitudinal shell 4101 (e.g. tubesheets, heads, liners, nozzles, etc.). Longitudinal shells 4202, 4203 may be the same or different lengths/heights. Transverse shell 4201 is structured similarly to and has the same appurtenances as two combined transverse shells 4103 with an opposing pair of axially aligned tubesheets 4111 (one at each end of the shell 4201). Additional reference is made back to FIGS. 72 and 73 and previous description herein for details of the heat exchanger basic unit and construction.

Longitudinal shells 4202 and 4203 of heat exchanger unit 4200 are horizontally/laterally spaced apart forming an intermediate section 4201-1 in transverse shell 4201 therebetween. Heat exchanger unit 4200 has a generally U-shaped structure. The two upright longitudinal shells 4202, 4203 may have an orientation such as vertical (shown), horizontal in the same plane as transverse shell 4201, or rotated to any angle between vertical and horizontal. The transverse shell 4201 may similarly have any of the foregoing orientations, which will then dictate the orientation of the longitudinal shells 4202, 4203 coupled thereto. The entire heat exchanger 4200 therefore may have any suitable orientation.

In one embodiment, a pair of shell-side fluid inlet nozzles 4130-1, 4130-2 are provided in intermediate section 4201-1 which introduce the shell-side fluid (SSF) flow into the transverse shell 4201 between the pair of tube-side outlet tubesheets 4150. One inlet nozzle 4130-1 may be proximate to J-shaped tube bundle 4150-1 and the other nozzle 4130-2 may be proximate to the other J-shaped tube bundle 4150-2. The two separate shell-side fluid inlet flows may mix and combine within the transverse shell 4201 to a certain degree because the transverse shell 4201 is in fluid communication with each of the longitudinal shells 4202, 4203. However, basic flow dynamics provides that there will be a flow bias which directs the shell-side fluid to flow more preferentially towards the longitudinal shell which is nearest to each shell-side fluid inlet nozzle.

The foregoing dual shell-side fluid inlet nozzles 4130-1, 4130-2 allows shell-side fluid to be introduced into the heat exchanger unit 4200 from two different sources (e.g. different steam extraction stages with different temperatures/pressures from a steam turbine of a Rankine cycle power generation plant). The dual SSF flows may mix and equalize in pressure and temperature within the transverse shell 4201. In other embodiments, a flow partition plate 4210 (shown in dashed lines in FIG. 78) may be provided which divides the intermediate section 4201-1 of transverse shell 4201 into two separate shell-side spaces to keep the shell-side fluid inlet flow fluidly isolated from one another. Alternatively, a shell-side fluid from a single common source may simply be bifurcated in piping upstream of the heat exchanger unit 4200 and supplied to each inlet nozzle to better distribute the SSF flow in the transverse shell 4201. In yet other embodiments, a single shell-side fluid inlet nozzle may be provided which is fluidly coupled to intermediate section 4201-1 of transverse shell 4201 without any internal partition plate to supply shell-side fluid flow to each longitudinal shell 4202 and 4203. Numerous options are therefore possible for introducing and sourcing a shell-side fluid for heat exchanger unit 4200.

Both the shell-side fluid and tube-side fluid flow paths are indicated by the directional flow arrows shown in FIG. 78 and comport with the countercurrent flow arrangement depicted in FIGS. 72 and 73, as previously described herein. It will not be repeated here for sake of brevity.

The two basic T-shaped heat exchangers 4100 combined in the heat exchanger unit 4200 of FIG. 78 may be of the same or different size/heat transfer capacity depending on the particular application needs. FIG. 78 shows an example of two different size heat exchangers 4100 each with different diameter longitudinal and transverse shells than the other that have been combined and joined via the common transverse shell 4201. In such an embodiment, a reducer 4211 may be provided between the larger diameter portion of the transverse shell 4201 associated with longitudinal shell 4202 on the right and the smaller diameter portion of the transverse associated with longitudinal shell 4203 on the left. In other possible embodiments, a single diameter transverse shell 4201 may be provided even if the individual heat exchanger 4100 used in heat exchanger unit 4200 have different diameters thereby eliminating the reducer. Because the two tube bundles 4150-1, 4150-2 will have different outer diameters (defined collectively by the individual tubes 4157 in each bundle), this latter single diameter transverse shell might not be optimum to extract the most heat from the shell-side fluid in the smaller diameter heat exchanger 4100.

Figure 79:
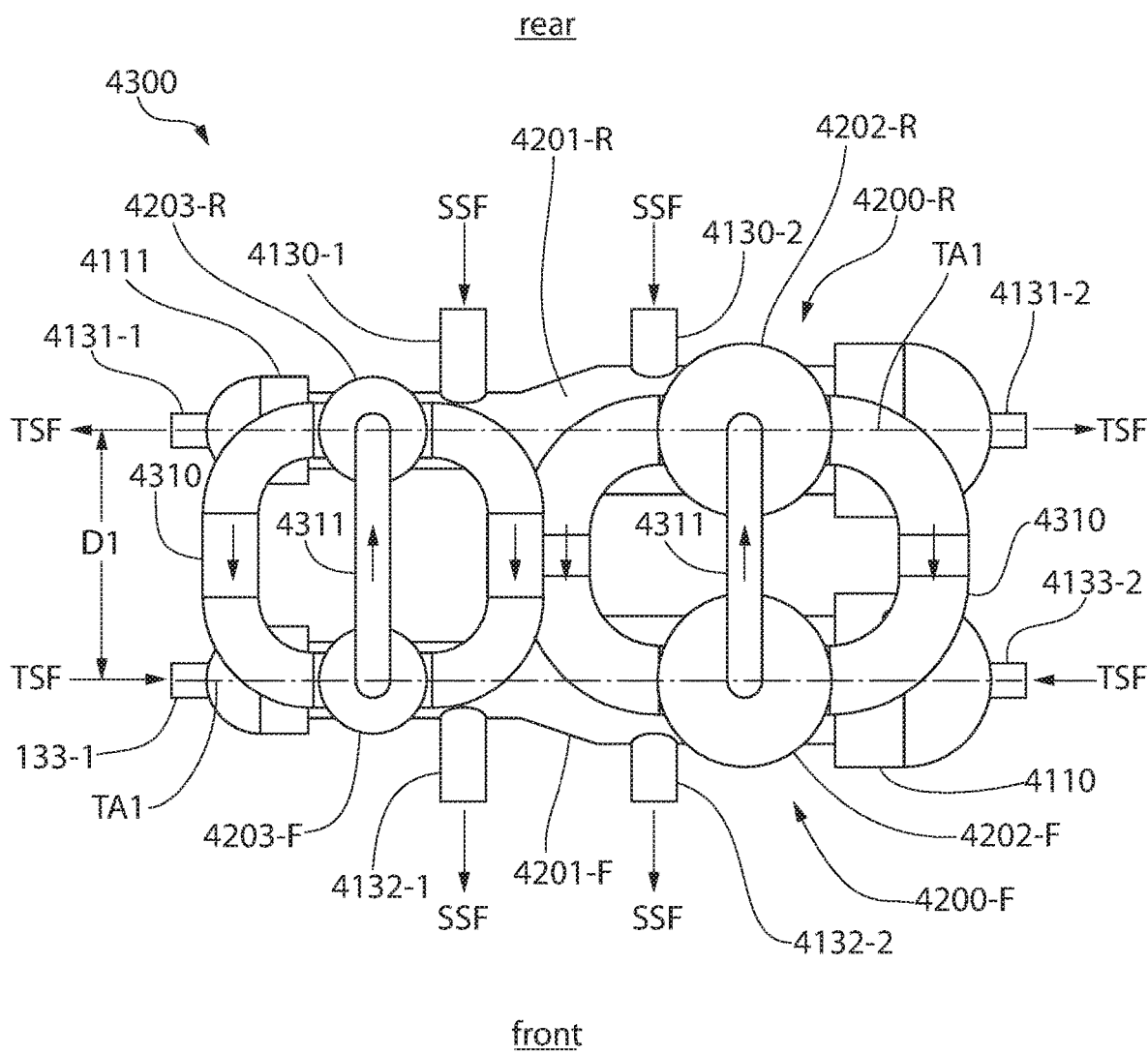
FIG. 79 is top plan view of a heat exchanger system combining two heat exchanger units of FIG. 78.
Figure 80:
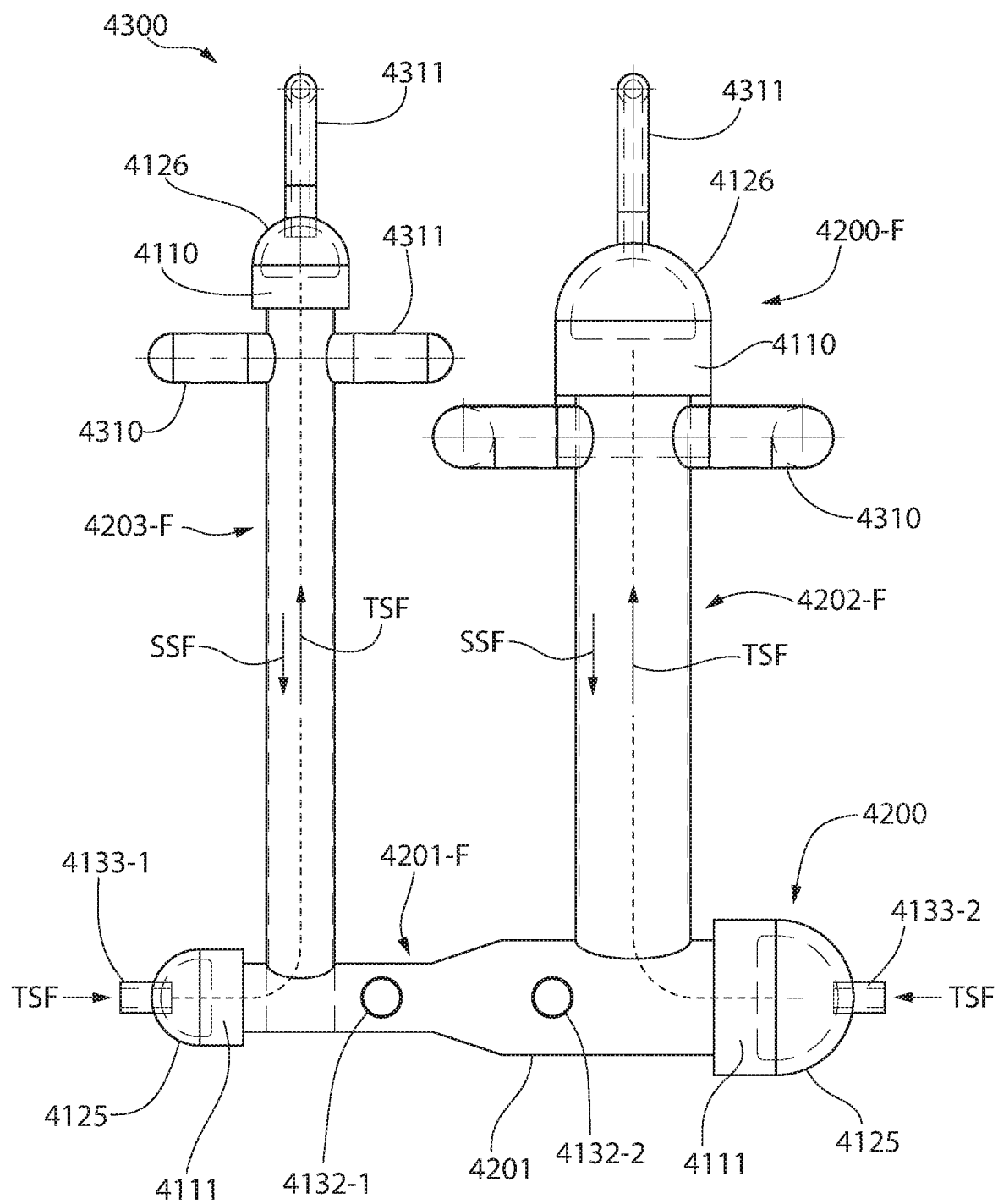
FIG. 80 is front view thereof.
Figure 81:
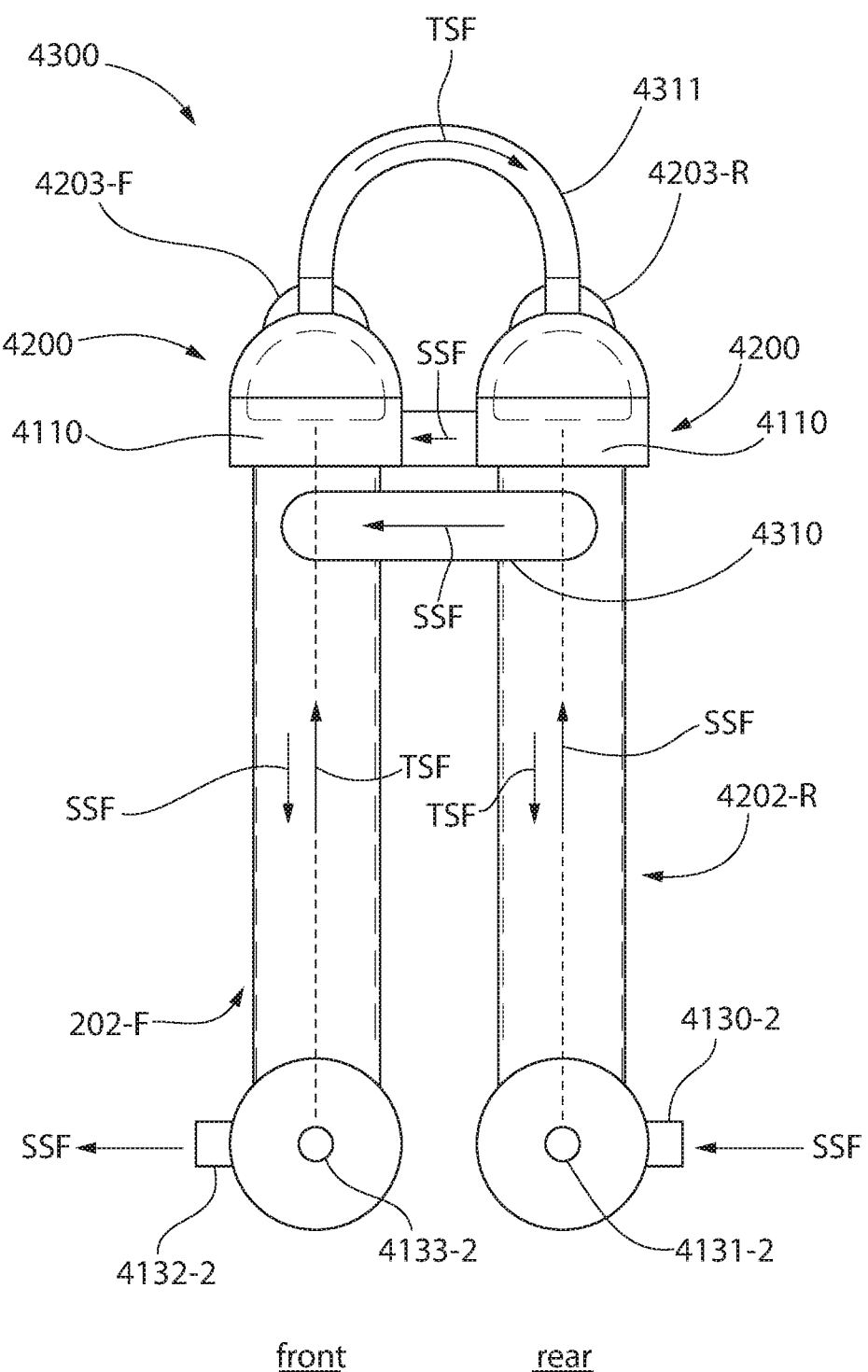
FIG. 81 is a right side view thereof.

According to another aspect of the invention, the dual heat exchanger assembly or unit 4200 of FIG. 78 may be used in turn to construct a modular heat exchanger system 4300 comprising two or more heat exchanger units 4200. FIGS. 79-81 shows a non-limiting exemplary arrangement of a modular heat exchanger system 4300 combining two heat exchanger units 4200 to provide a set of four J-tube heat exchangers 4100 in total. The J-tube heat exchangers can be installed in at least partial series flow arrangement to facilitate the segregation of heat exchanger materials commensurate with their strength versus temperature capabilities for the shell-side and tube-side fluids encountered. The number of tubes 4157 in each shell, tube diameter, and tube material as well as the shell diameters may each be the same or different in the multiple heat exchanger unit to provide design flexibility.

In some embodiments, both low and high pressure heat exchangers may be combined in a single assembly of a modular heat exchanger system 4300 when at least the shell-side fluids are isolated using flow partition plates 4210 in the transverse shells 4201 as previously described herein. As shown in FIGS. 79-81, as one non-limiting example, the smaller diameter shells shown may correspond to higher shell-side pressure heat exchangers and the larger diameter shells shown may correspond to lower shell-side pressure heat exchangers. Because the higher pressure heat exchangers receive a shell-side fluid (e.g. steam, liquid water, or other fluid) that will generally have a higher temperature and pressure, the thermal energy in this fluid is greater requiring less tube surface area to effectively heat the tube-side fluid with the shell-side fluid to the desired temperature. The tube bundles in higher pressure heat exchangers may therefore comprise a smaller number of tubes to achieve the desired heat transfer which translates into a smaller diameter shell requirement.

For convenience of reference, the pair of heat exchanger units 4200 combined in FIGS. 79-81 will be described as a "front" unit 4200-F and a "rear" unit 4200-R for convenience of reference in describing the modular heat exchanger system 4300. Each heat exchanger unit may be shop prefabricated in whole or at least partially and shipped to the installation site. Advantageously, this reduces field work and allows a majority of the heat exchanger units to be fabricated under controlled factory conditions.

Front heat exchanger unit 4200-F includes longitudinal shells 4202-F and 4203-F axially spaced apart on the common front transverse shell 4201-F. Similarly, rear heat exchanger unit 4200-R includes longitudinal shells 4202-R and 4203-R axially spaced apart on the common front transverse shell 4201-R. Transverse shells 4201-F, 4201-R may be shaped similarly to common transverse shell 4201 shown in FIG. 78. The heat exchanger units 4200-F, 4200-R are preferably closely coupled together and tightly spaced apart to form an integrated compact multi-heat exchanger assembly or unit amenable to complete or partial shop prefabrication. This is distinct from merely fluidly connecting several discrete heat exchanger together via long piping runs as in past heat exchanger installation practices in the power generation industry which consume a significant amount of valuable and limited available floor space. For example, in some preferred embodiments the front and rear transverse shells 4201-F, 4201-R may be spaced apart by a distance D1 measured between their respective transverse axes TA1 which is less than 4 times the largest diameter of the transverse shells, preferably less than 3 times the largest diameter. In a certain example, distance D1 may be about 2 times the largest diameter as shown in FIG. 79.

Advantageously, the multi-unit heat exchanger system 4300 therefore combines several heat exchangers into a single compact package having a relatively small footprint attributable in part to the direct coupling of some of the transverse shells together as described herein. This preserves valuable available space within the power generation or other plant for other system equipment.

With reference to FIG. 78 showing the basic heat exchanger unit 4200 and FIGS. 79-81, the front heat exchanger unit 4200-F includes a pair of opposed tube-side fluid inlet nozzles 4133-1, 4133-2 and a pair of shell-side fluid outlet nozzles 4132-1, 4132-2. The rear heat exchanger unit 4200-R includes a pair of opposed tube-side fluid outlet nozzles 4131-1, 4131-2 and pair of shell-side fluid inlet nozzles 4130-1, 4130-2. The arrangement of heads 4125, 4126 and tubesheets 4110, 4111 is shown in FIG. 78.

In the foregoing figures, the two larger shell diameter longitudinal shells 4202-F, 4202-R are fluidly coupled together on both the shell-side and tube-side by external cross flow piping segments 4310, 4311. The shell-side cross flow piping segments are designated 4310 and the tube-side cross flow piping segments are designated 4311. The two smaller diameter longitudinal shells 4203-F, 4203-R are similarly fluidly coupled together by external cross flow piping segments 4310, 4311. The flow arrows show the flow direction of both the shell-side and tube-side fluids. Each of the cross flow piping segments 4310, 4311 may be U-shaped piping segments, which may preferably be shop fabricated as piping spools for preferably field welding and/or flanged/bolted connection directly to their respective nozzles of longitudinal shells. The tube-side cross flow piping segments 4311 may be vertically oriented as shown in one embodiment. The shell-side cross flow piping segments 4310 may be horizontal oriented as shown in one embodiment. Any suitable type of metal such as preferably steel piping may be used for the cross flow piping segments.

In some embodiments, partition plates 4210 as previously described herein may be disposed inside both front and rear common transverse shells 4201-F, 4201-R to fluidly isolate the shell-side fluids flowing the longitudinal shells 4202-F, 4202-R and the longitudinal shells 4203-F, 4203-R. The partition plate option is useful when combining both low and high pressure heat exchangers in the multi-unit modular heat exchanger assembly or system 4300.

It bears noting the pairs of transverse shells 4201-F, 4201-R, larger diameter longitudinal shells 4202-F, 4202-R, and smaller diameter longitudinal shells 4203-F, 4203-R need not be identical in diameter, exterior dimensions (height/length), and/or configuration in each pair as shown in FIGS. 79-81. Accordingly, they may be customized and different in certain other embodiments to fit a particular application need.

Figure 82:
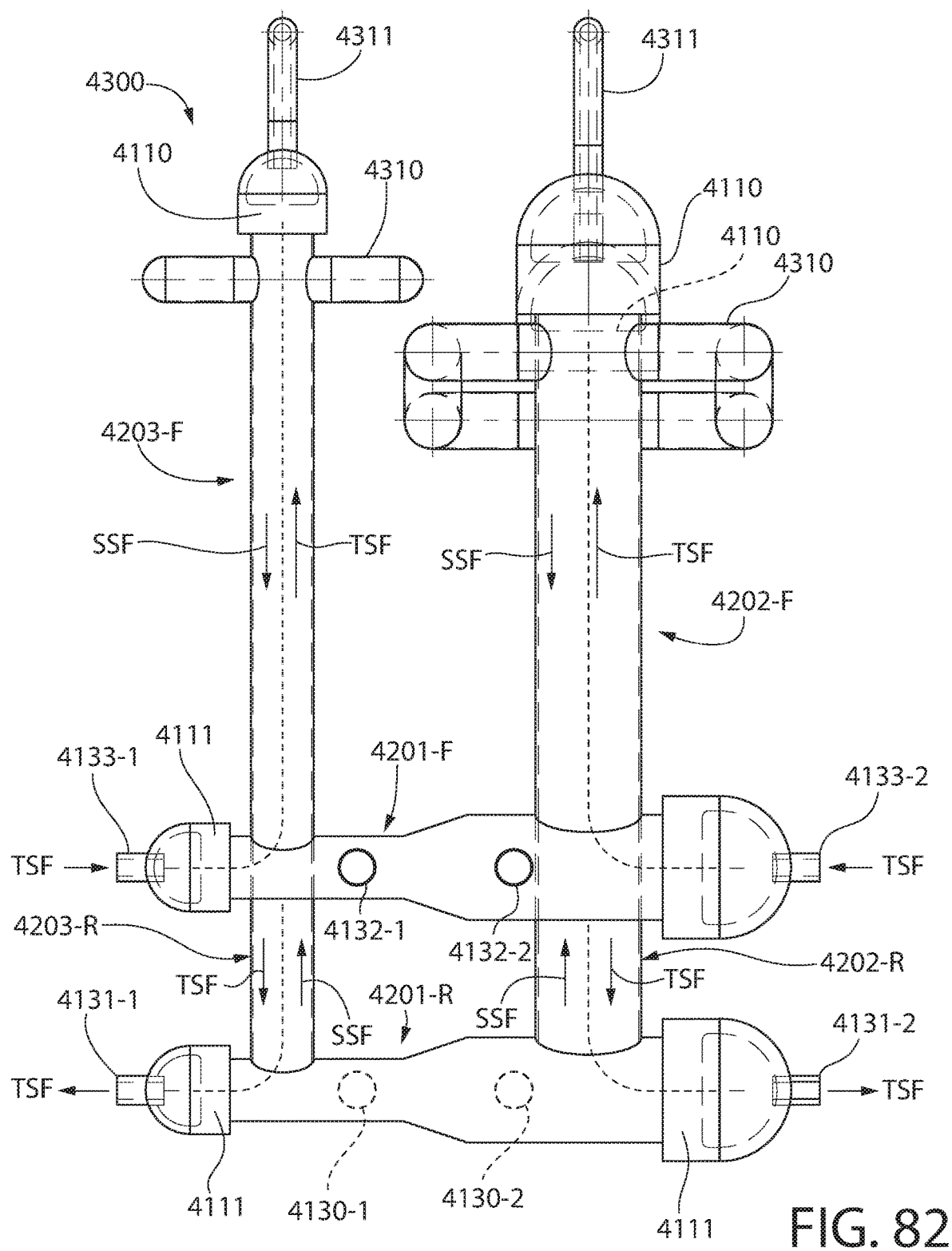
FIG. 82 is a front view thereof showing an alternative arrangement of vertically offset front and rear common transverse shells.
Figure 83:
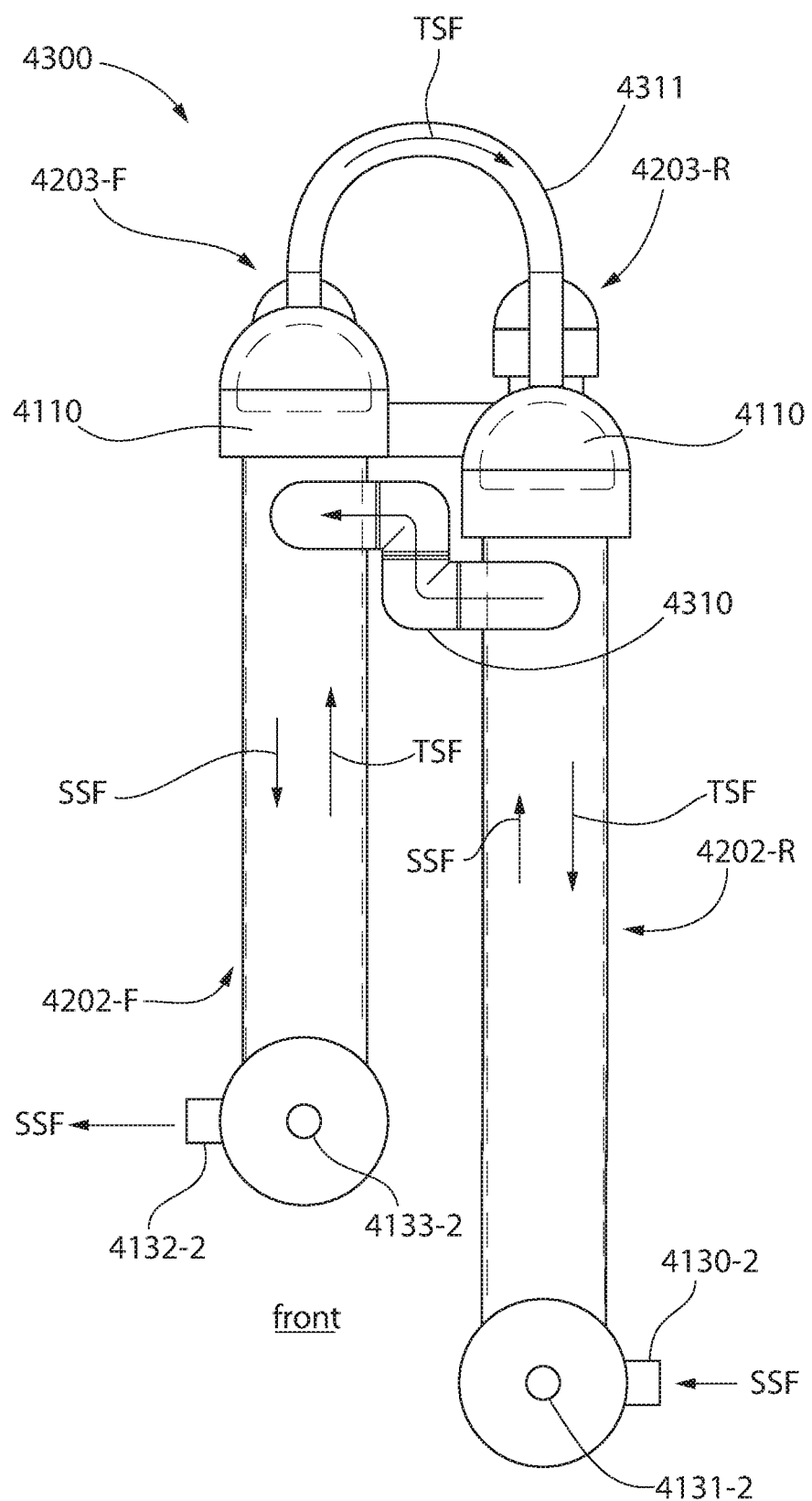
FIG. 83 is right side view of the alternative arrangement.
Figure 84:
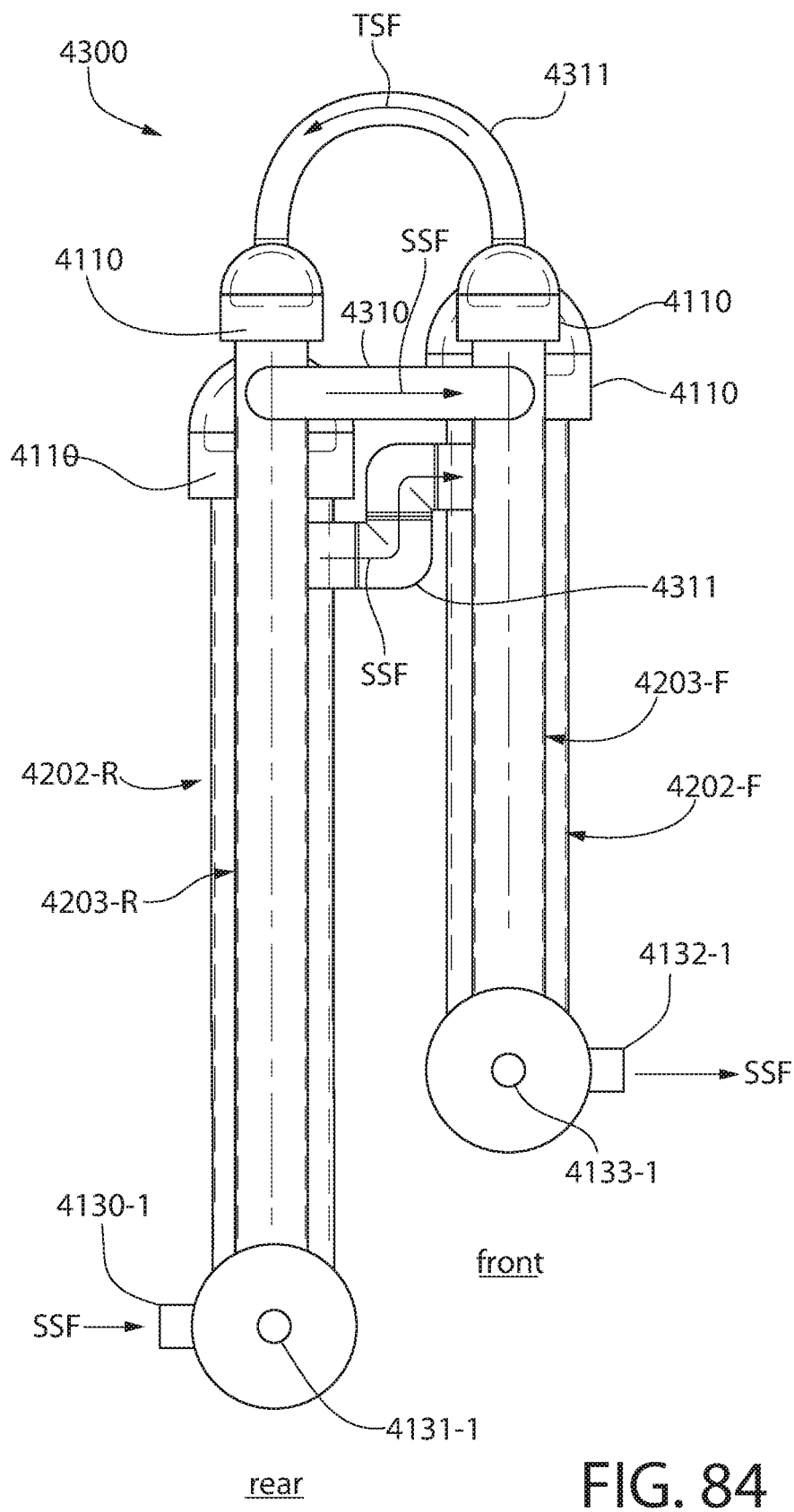
FIG. 84 is a left side view of the alternative arrangement.

In FIGS. 79-81, the common traverse shells 4201-F, 4201-R are arranged at the same elevation. This may be acceptable for new installations. However, in other embodiments the common transverse shells 4201-F, 4201-R may instead be located at different elevations relative to each other as shown in FIGS. 82-84. Some of the longitudinal shells may be vertically offset from each other if not compensated for by a decrease/increase in height/length. As an example, the two larger diameter longitudinal shells 4202-F, 4202-R are depicted as vertically offset such that the cross piping segment 4311 is will require a pair of 90 degree elbows as shown due to the SSF outlet nozzles 4132 being vertically offset. Such an alternative arrangement as shown in FIGS. 82-84 may be useful or required in retrofit applications to avoid existing building structure and equipment. In top view, this alternative embodiment would appear the same as in FIG. 79 which should be referenced additionally. In short, the modular heat exchanger system 4300 has considerable flexibility in design to accommodate a variety of installation requirements. This latter alternative arrangement is constructed in accordance with same principles and features already described herein for heat exchanger system of FIGS. 79-81, which will not be repeated here for sake of brevity.

The heat exchangers 4100, dual heat exchanger unit 4200, and modular heat exchanger system 4300 may be supported in any manner via suitable structural supports mounted to the flooring, decks, or superstructure. Use of spring type supports to reduce thermal constraint, while supporting heat exchanger weight may be used, in conjunction with selection of sufficiently flexible interconnecting pipe spools used for the cross flow piping connections.

The heat exchangers 4100, dual heat exchanger unit 4200, and modular heat exchanger system 4300 disclosed herein may be used in numerous applications where it is intended to heat/cool a first tube-side fluid with a second shell-side fluid. In one application, the present heat exchangers may be used in a nuclear power, fossil fuel, biomass, solar, or power generation station operating a Rankine cycle for electric power production (see, e.g. FIG. 85). The present heat exchanger or multi-unit heat exchangers may be used for any or all of the high and/or lower pressure feedwater heaters depicted using water as the tube-side fluid and steam as the shell-side fluid. The present heat exchangers however may be used in numerous other applications and industry for fluid heating applications, such as for example without limitation petroleum refining, chemical production plants, or various industrial applications. Accordingly, the invention is not limited to any particular application alone in its scope or applicability.

Additional advantages of the heat exchangers 4100 and 4200 disclosed herein include: a compact space requirement; maximum flexibility with respect to installation and orientation; reduced risk of severe stresses from restraint of thermal expansion; ability to withstand thermal and pressure transients is enhanced; and the shell-side pressure loss in the flow stream is minimized for optimal heat transfer performance by use of non-segmental baffles.

Any of the foregoing heat exchangers when used in a Rankine cycle of a power generations plant may be used as feedwater heaters, various process heaters, and/or steam generators in the case of a nuclear power plant. Other applications not associated with a power plant such as in the chemical industry or other may of course used the heat exchangers.

Figure 85:
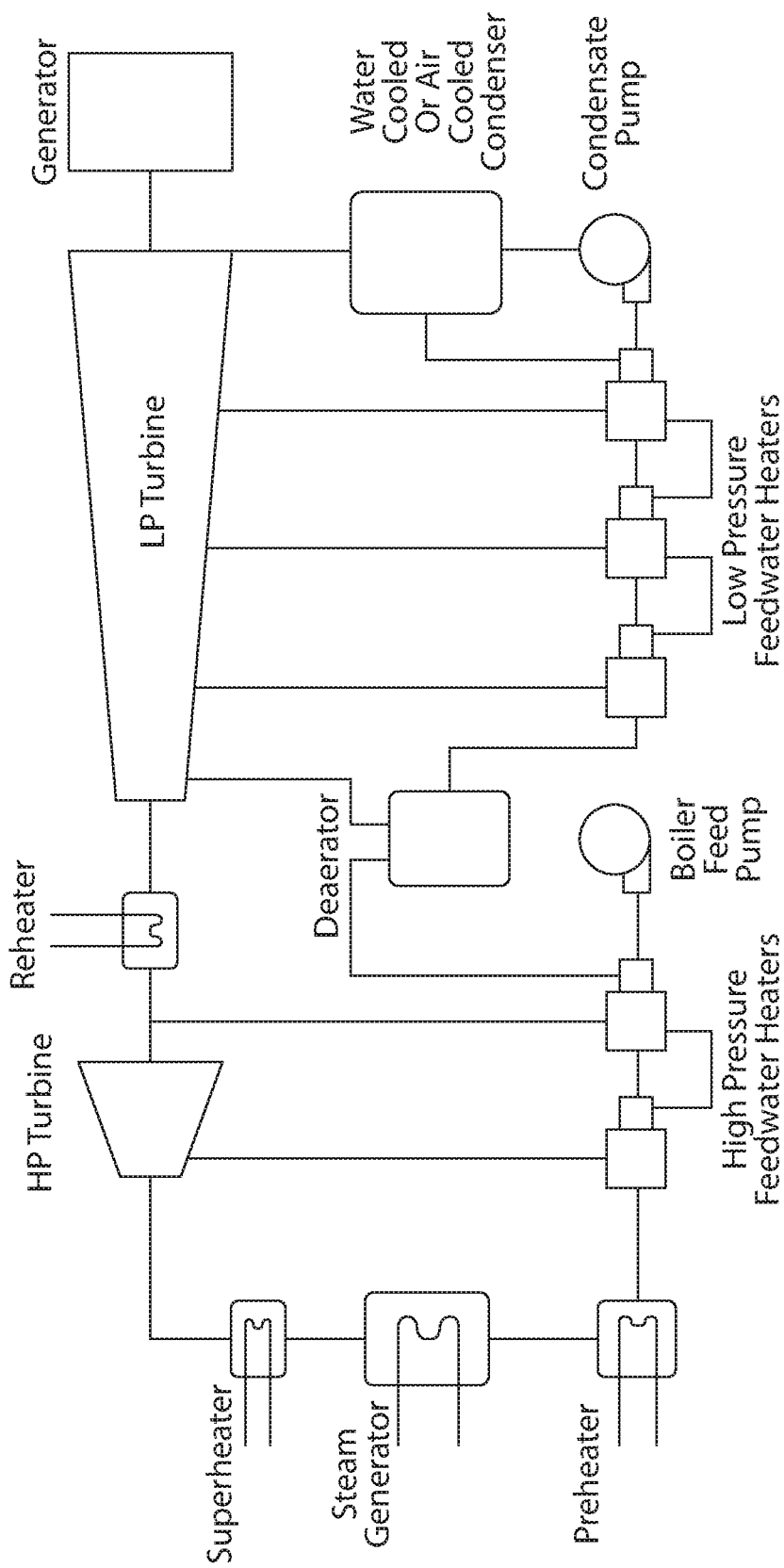
FIG. 85 is a schematic diagram of a Rankine power generation cycle.

According to another aspect of the present disclosure, axial flow tube support baffles are disclosed which maintain uni-directional longitudinal flow of the shell-side fluid through the shell-side space of the heat exchanger in order to advantageously achieve a reduction in shell-side fluid pressure drop. This minimizes pumping requirements and associated costs of the fluid feedwater system in a Rankine power cycle as depicted in FIG. 85. The present axial flow baffles may be used in the foregoing unique heat exchanger configurations with multiple shells sharing common shell-side spaces that benefit significantly from minimum shell-side pressure loss as the shell-side fluid flows through the circuitously flow path arrangement of heat exchanger shells. The present axial flow baffles may also be used with heat exchangers having a singular longitudinally-extending shell (see, e.g. FIGS. 93-95 as some non-limiting examples) where minimal shell-side pressure drop or loss might be beneficial.

According to another aspect of the invention, an axial flow baffle 4420 for a heat exchanger is provided which is compatible with the foregoing heat exchangers for minimizing the pumping cost and shell-side pressure loss or drop through the heat exchanger. The complex shell geometries of some of the foregoing heat exchanger designs may generally benefit from a reduction in shell-side pressure loss. The present axial flow baffles is configured to maintain the shell-side fluid flow in a substantially longitudinal and linear path through the shell(s). The present axial flow baffles may also be used in standard single straight shell applications; some non-limiting examples of which are shown in FIGS. 96-99.

Figure 96:
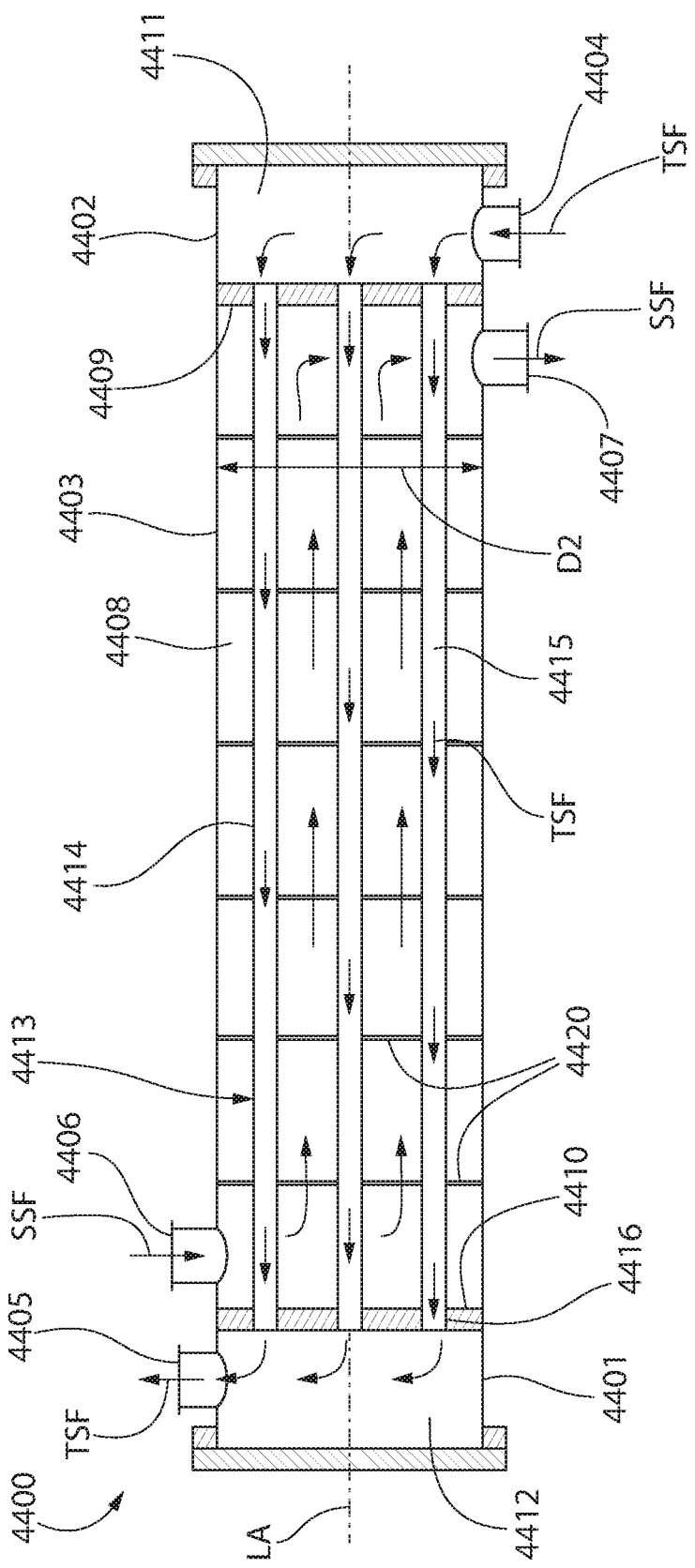
FIG. 96 shows an embodiment of a shell and tube heat exchanger including the axial flow baffles of FIG. 1.

FIG. 96 depicts a non-limiting example of a shell and tube heat exchanger 4400 including axial flow baffles 4420 to produce longitudinal shell-side flow of the shell-side fluid SSF. Heat exchanger 4400 generally includes an elongated longitudinal shell 4403 defining an internal shell-side space 4408 and a longitudinal axis LA. Shell 4403 extends axially between opposing first and second channels or heads 4401 and 4402 mechanically coupled and sealed to the opposite ends of the shell. Head 4402 defines an internal tube-side fluid TSF inlet plenum 4411. Head 4401 defines an internal tube-side fluid outlet plenum 4412. Any suitable form of leak-proof coupling may be used, including for example without limitation seal welding (shown) and mechanical couplings such as gasketed flanged and bolted joints both of which are commonly used in shell and tube heat exchangers depending on the shell-side design pressure. Any other suitable type of leak-proof coupling may be used.

A tube bundle 4413 extends through the shell-side space 4408 between first and second tubesheets 4409, 4410. Each tubesheet is sealably coupled to opposing ends of the shell 4403 as shown. Tube bundle 4413 includes a plurality of parallel tubes 4414; the interior of which defines the tube-side space 4415 for conveying the tube-side fluid TSF. The opposing ends of the tubes 4414 are sealably coupled to the tubesheets 4409, 4410 by any suitable method known in the art to form leak-proof joints. In some embodiments, the tubes 4414 may rigidly and sealably coupled to the tubesheets 4409, 4410 via expansion, welding, or expansion and welding; these techniques being well known in the art without further elaboration required. Commonly employed tube expansion processes that may be used include explosive, roller, and hydraulic expansion.

The tubes 4414 are received through a plurality of through tube penetrations 4416 extending completely through the thickness of the tubesheets from side to side which place the tubes in fluid communication with the tube-side fluid inlet and outlet plenums 4411, 4412 in known fashion. In one embodiment, as shown, the tube bundle 4413 may be a straight tube bundle comprising straight tubes. In other embodiments, heat exchangers with U-shaped tube bundles may be used.

The axial flow baffles 4420 are spaced axially/longitudinally apart in shell 4403 and held in position in the shell and tube bundle by conventional longitudinally-extending tie rods and spacers (not shown). The tie rods are typically cylindrical metal rods or pipes. Such tie rods are well known in the art and subject to TEMA standards regarding number and spacing.

Heat exchanger 4400 includes shell-side fluid inlet and outlet nozzles 4406, 4407 and tube-side fluid inlet and outlet nozzles 4404, 4405. Nozzles 4406, 4407 open into and are in fluid communication with shell-side space 4408 of shell 4403. Tube-side fluid inlet and outlet nozzles 4404, 4405 are in fluid communication with inlet and outlet plenums 4411, 4412 in the heads 4402, 4401. The nozzles each have ends configured for sealed leak-proof fluid coupling to related piping systems of the facility, such as weld ends for weld joints or flanged ends (shown) for gasketed and bolted flange joints. The tube-side and shell-side nozzles may be oriented perpendicularly to the longitudinal axis LA of heat exchanger 4400 for introducing or extracting the fluids in a transverse direction to the longitudinal axis. Other arrangements and orientations of nozzles commonly used in the art may of course be used.

The heat exchanger 4400 shown is a single pass counter-flow design in which the tube-side fluid TSF passes once through the shell-side space 4408 inside the tubes 4414. The tube-side fluid flows in an opposing longitudinal direction to the shell-side fluid SSF. Any suitable fluids may used for the shell-side and tube-side fluids. In one embodiment, the shell-side fluid may be steam and the tube-side fluid may be feedwater of a Rankine cycle (see, e.g. FIG. 85) used in a nuclear, fossil, solar, or other type power plant for producing electricity. Other states of fluids and/or types of fluids such as petroleum or chemicals may be processed using heat exchanger 4100. For example, both the shell-side and tube-side fluids may be liquid in some applications. Heat exchanger 4100 is therefore not limited in the breadth of its applicability and use in an industrial process for heating fluids.

Figure 87:
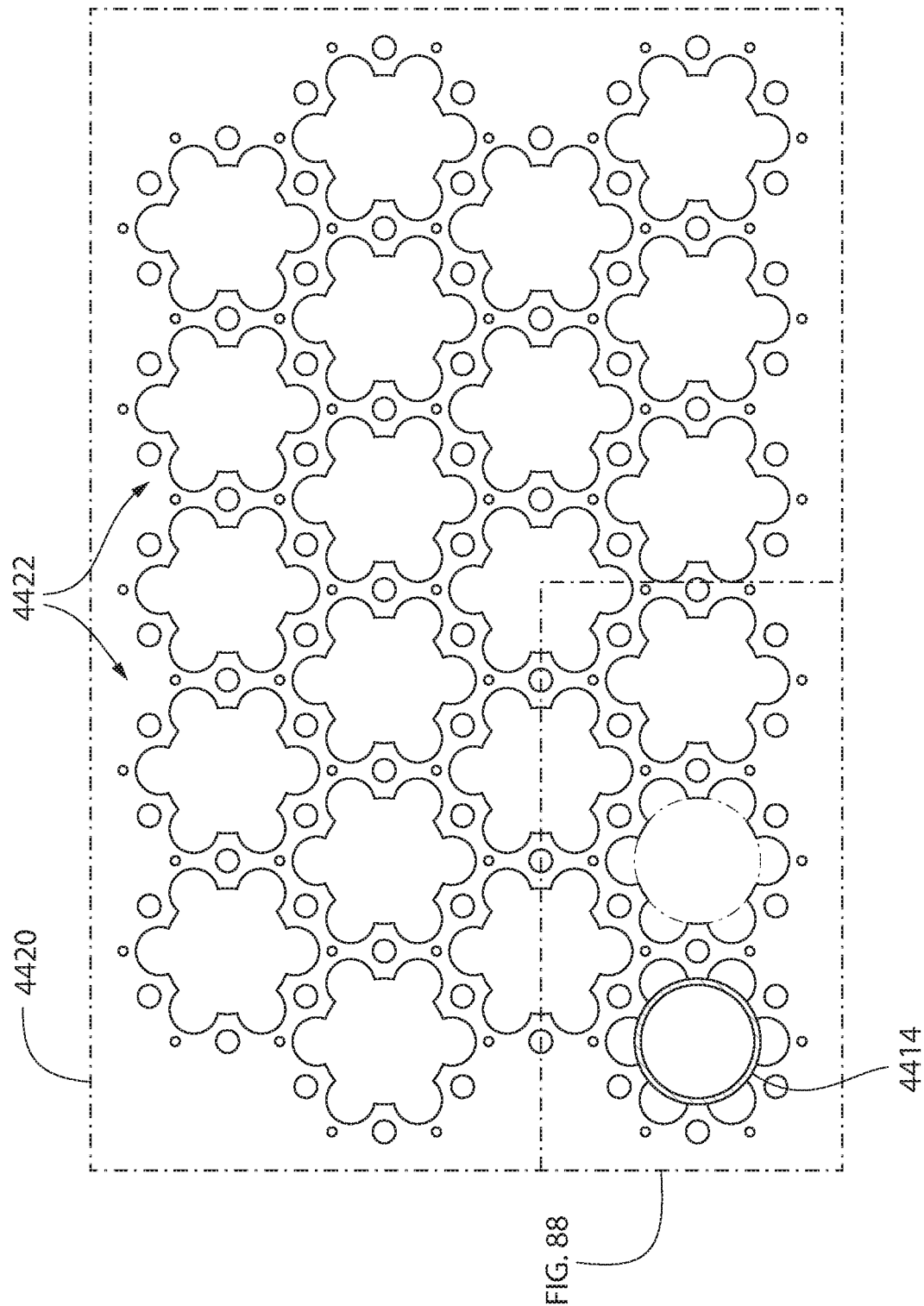
FIG. 87 is an enlarged partial section thereof.

It bears noting in FIG. 87 that axial flow baffles 4420 in heat exchanger 4400 create longitudinal flow substantially parallel to longitudinal axis LA through the shell 4403. The shell-side and tube-side fluid flows are shown by directional flow arrows. The only cross flow in the shell-side space 4408 which is not related to or induced by the baffles 4420 occurs with the shell-side fluid flow entering or leaving the terminal end portions of the shell at the tubesheets 4409, 4410 via the shell-side fluid inlet and outlet nozzles 4406, 4407.

Any suitable metallic materials may be used for the heat exchanger shell, head, tubesheets, and other components; some non-limiting examples of which were previously described herein.

Referring now to FIGS. 86-89A-B, details of axial flow baffle 4420 according to the present disclosure are shown. Axial flow baffles 4420 are comprised of substantially planar or flat metallic plates defining a circular body including a first major surface 4423, a second major surface 4424 opposite the first major surface, and a plurality of axial flow tube apertures 4422 extending through and between the major surfaces. The major surfaces may be parallel to each other and define a substantially uniform thickness T1 in one embodiment. The foregoing uses of the term "substantially" in this paragraph connote normal mechanical fabrication tolerances and dimensional variations inherent in fabrication and machining operations.

Baffle 4420 has a circumferentially-extending peripheral edge 4421 of circular shape which defines a diameter D1 of the baffle. Diameter D1 is marginally or just slightly less than the interior diameter D2 of the heat exchanger shell to allow the baffles 4420 to be inserted into the shell along with the tube bundle (see, e.g. FIGS. 96-98). The peripheral edge 4421 of baffle 4420 substantially conforms in shape and is proximate to the interior surface of the shell along all portions of the peripheral edge to prevent any substantially open gaps therebetween which might allow shell-side flow to unintentionally bypass the flow holes in the baffle.

Figure 86:
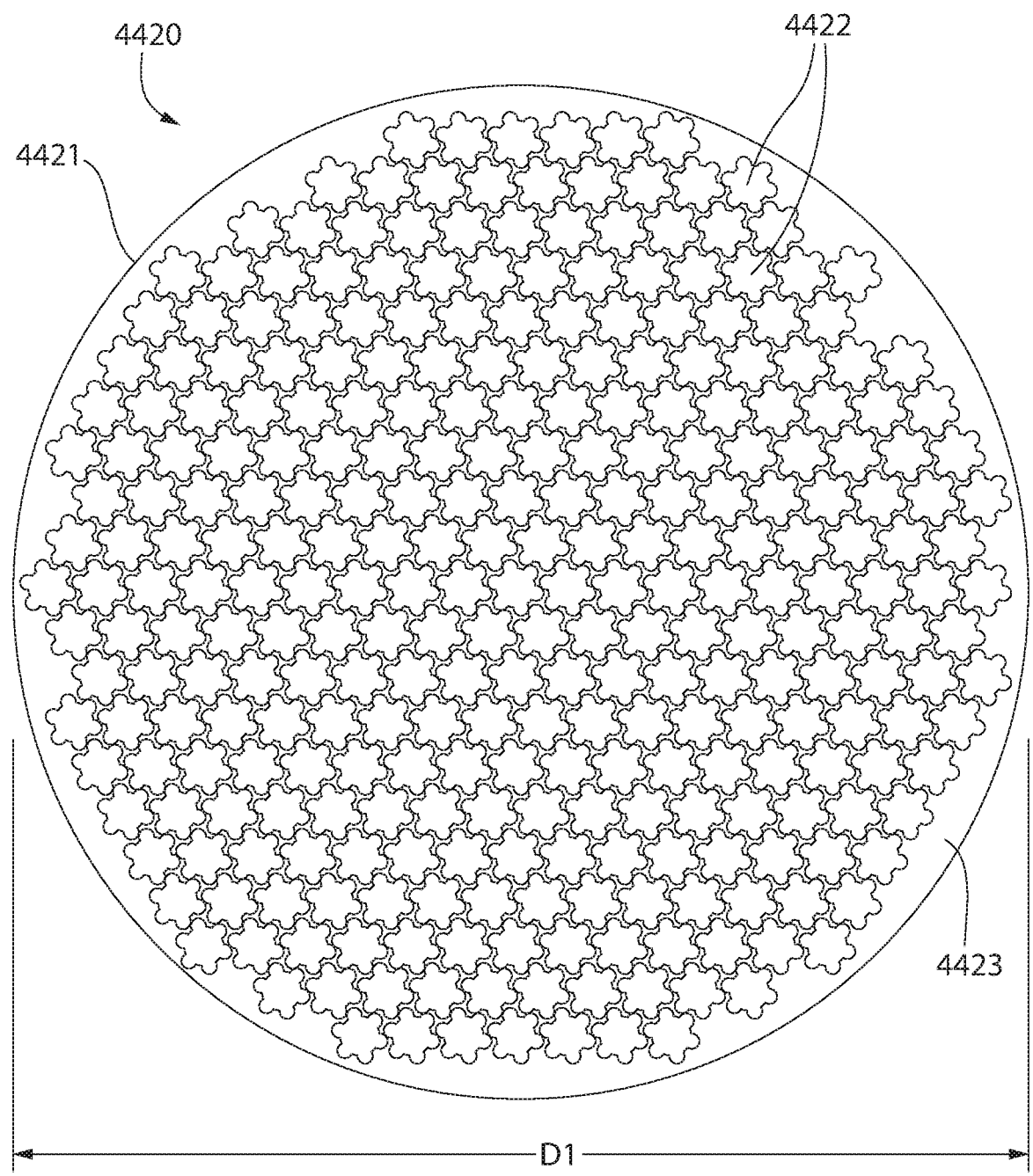
FIG. 86 is a plan view of an axial flow tube support baffle for a shell and tube heat exchanger according to the present disclosure including a plurality of axial flow tube apertures.

In the baffle plate embodiment shown in FIG. 86, the array of tube apertures 4422 are dispersed throughout and substantially fills the entire field or face of the axial flow baffle 4420 (i.e. major surfaces 4423, 4424) within the peripheral edge 4421. The tube apertures 4422 are configured to create longitudinal axial shell-side fluid flow in the shell-side space parallel to longitudinal axis LA. For convenience of description and reference, each tube aperture 4422 defines a vertical axis VA and a horizontal axis HA which intersect at the geometric centerpoint C of the aperture (see, e.g. FIG. 88).

Figure 88:
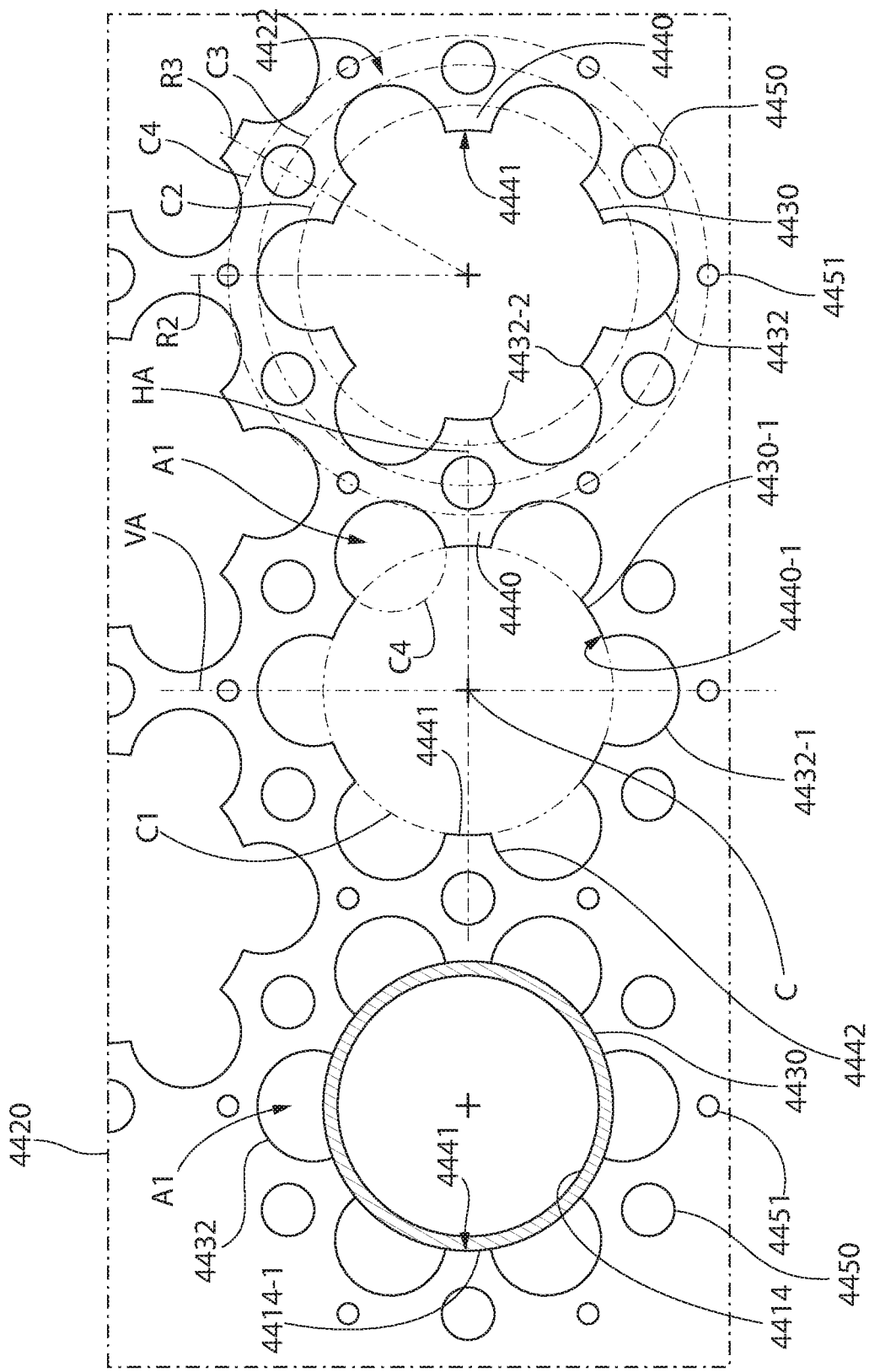
FIG. 88 is a further enlarged partial section thereof taken from FIG. 87.

Referring to FIGS. 86-88, each tube aperture 4422 comprises a central tube hole 4430 and an associated plurality of intimately adjoining peripheral primary flow holes 4432 in communication with the tube hole. Tube holes 4430 each are configured and dimensioned to receive and support a single tube 4414. The center of tube hole 4430 coincides with common centerpoint C.

Flow holes 4432 are arrayed around the circumference and perimeter of each tube hole 4430 in a circumferentially spaced apart arrangement along a circle or ring. The flow holes 4432 each interrupt and penetrate the circular peripheral edge 4430-1 of tube holes 4430 defined by the axial flow baffle plate 4420 as shown. The primary flow holes 4432 admit and allow shell-side fluid SSF to pass longitudinally/axially through the baffle plates along the tubes 4414 at select circumferential locations adjoining the tube when located in the tube hole 4430. The exterior surfaces of the tubes 4414 are thus exposed in primary flow holes 4432 and contacted by the shell-side fluid SSF flowing through the primary flow holes.

In one embodiment, primary flow holes 4432 may be uniformly spaced around the perimeter of tube hole 4430 in a circular array or pattern. An even number of primary flow holes 4432 may be provided in which pairs of diametrically opposed flow holes are formed (see, e.g. FIG. 88). In one embodiment, three pairs of flow holes 4432 may be provided. In other embodiments, more of less flow holes 4432 and/or odd numbers of flow holes may be provided.

Primary flow holes 4432 preferably have a non-polygonal semi-circular shape which is concavely and arcuately curved in a non-limiting preferred embodiment. Described another way, the primary flow holes may be considered to each have a partial circular configuration forming a portion of, but not a complete circle. Described yet another way, each primary flow hole 4432 may be considered to form a crescent-shaped flow hole and corresponding flow area A1 for passage of the shell-side fluid SSF through the baffles 4420.

The entire circular peripheral edge 4432-1 of each primary flow hole 4432 defined by the baffle plate is continuously arcuately curved from terminal end to end 4432-2 where the primary flow hole 4432 intersects the circular peripheral edge 4430-1 of the tube hole 4430 at two different circumferential locations (see, e.g. FIG. 88). There are no linear or straight portions of the flow holes 4432 or its peripheral edge 4432-1 as can be seen. Accordingly, the peripheral edge 4432-1 of each primary flow hole has a first end at the peripheral edge 4430-1 of the tube hole 4430, and a second end at another at peripheral edge 4430-1; the first and second ends of each primary flow hole being at circumferentially spaced apart points on the peripheral edge 4430-1 of the tube hole 4430. Advantageously, the continuously curved profile of the flow hole peripheral edge 4432-1 eliminates any angled corners between its ends which might induce the formation of shell-side flow eddies and dead zones. The intersection of the circular flow hole peripheral edge 4432-1 with the circular tube hole peripheral edge 4430-1 forms angled corners 4440-1 therebetween coinciding with the terminal ends 4432-2 of each primary flow hole 4432. However, these corners 4440-1 lie adjacent to the tube 4414 and are not between the ends 4432-2 of the flow holes 4432 as shown, thereby preserving the continuously arcuate shape of the flow holes 4432.

In one embodiment, the geometric center of each flow hole 4432 may lie on or adjacent to an imaginary reference circle C1 defined by the circumference of the tube hole 4430. Reference circle C1 of tube hole 4430 intersects the imaginary reference circles C4 defined by each primary flow hole 4432 at two circumferentially spaced apart points (see, e.g. FIG. 88). The two points of intersection define the terminal ends of each primary flow hole 4432. When the tube 4414 is positioned in the tube hole as shown in FIG. 8, left image, a flow area A1 of each primary flow hole 4432 is defined. Flow area A1 may be considered crescent shaped in one embodiment as illustrated due the primary flow holes 4432 overlapping and intersecting the tube hole 4430.

Figure 89A:
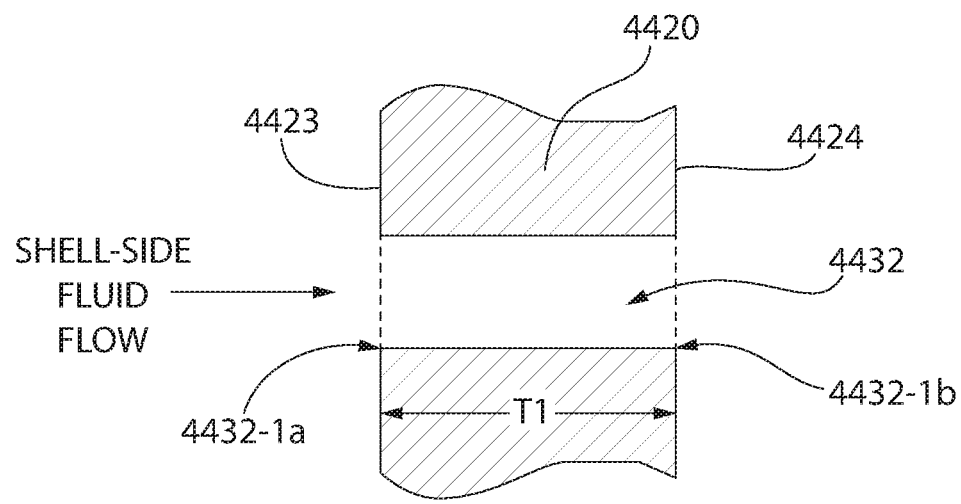
FIG. 89A is transverse cross-sectional view of one of the primary flow holes of the tube apertures of FIG. 88.
Figure 89B:
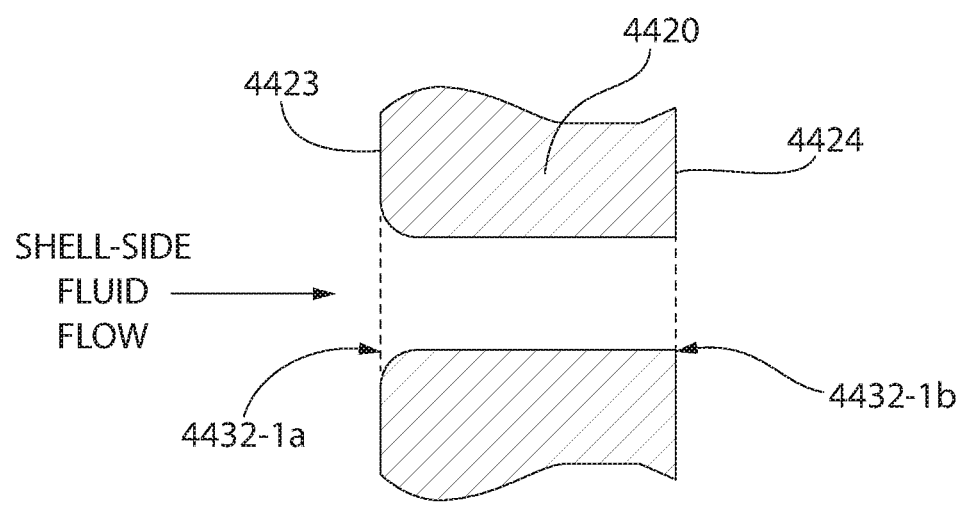
FIG. 89B is a second transverse cross-sectional view of a primary flow hole including a rounded entrance portion.

The leading peripheral edge 4432-1a of the primary flow holes 4432 may be sharp edged forming a 90 degree angle as shown in FIG. 89A, or preferably may be chamfered or radiused (i.e. rounded) as shown in FIG. 89B to decrease the pressure loss due to sudden contraction of the shell-side fluid through the hole. Experimental results have shown that the rounded leading edge reduces the overall pressure drop by about 27% for just hand filing the edges. The trailing peripheral edge 4432-1b of the primary flow holes 4432 may be sharp edged or rounded with no significant detriment to pressure drop.

In one embodiment, every primary flow hole 4432 of each axial flow baffle 4420 may be longitudinally and concentrically aligned with corresponding primary flow holes 4432 in every other baffle. Such an arrangement creates a substantially linear shell-side fluid SSF flow path through the shell-side space 4408 of the shell 4403 of the heat exchanger 4400 between sets of matched primary flow holes 4432 in each baffle. Accordingly, in one embodiment each baffle 4420, and the arrangement and orientation of each of the tube apertures 4422 in each baffle, may be identical to achieve the described longitudinal alignment of primary flow holes 4432.

Referring to FIGS. 86-88, the peripheral edge 4430-1 of tube hole 4430 has a castellated configuration in one embodiment. The ligaments of the baffle 4420 plate between the primary flow holes 4432 of each tube aperture 4422 define radially inward projecting tube support protrusions 4440 circumferentially spaced apart about the central flow hole 4430 at intervals. Protrusions 4440 may be formed integrally with the axial flow baffle plate as a monolithic unitary structural part thereof in one embodiment as shown.

Support protrusions 4440 each define arcuately curved bearing surfaces 4441 which conformably engage and contact the exterior of the tubes 4414 when located in the circular tube holes 4430. It bears noting that the arcuate bearing surfaces 4441 actually are formed by remaining portions of the peripheral edge 4430-1 of the tube hole 4430 which remain after forming the semi-circular primary flow holes 4432. In one embodiment, each and every support protrusion 4440 preferably engages the exterior surface 4414-1 of the tube 4414. When the axial flow baffles 4420 are subjected to the hot shell-side fluid SSF (typically hotter than the tube-side fluid TSF which is heated by the shell-side fluid), the metal baffle plates will expand to ensure conformal engagement between the tubes and the arcuate support protrusion bearing surfaces 4441.

As best shown in FIG. 88, each tube support protrusion 4440 includes a pair of opposing sidewalls 4442 adjoining the arcuate bearing surface 4441. In one embodiment, the sidewalls 4442 are arcuately and concavely curved in shape.

Because the primary flow holes 4432 holes reduce the surface contact area between the baffle 4420 plate and the tube 4414 at the tube hole 4430, it is necessary to ensure that preferably at least ⅓rd of the circumference and peripheral edge 4430-1 of the baffle plate at the tube hole remains available for providing lateral support to the tube to protect against flow induced vibration related wear to the tube. Accordingly, the radial tube support protrusions 4440 preferably have a collective bearing surface 4441 area which is at least ⅓rd of the circumference of the tube hole 4430. In addition, the radial tube support protrusions 4440 are preferably evenly spaced apart around the circumference of the tube hole 4430 (see, e.g. FIG. 88). This provides uniform support of the tube 4414 all around it exterior surface 4414-1. In one embodiment, the upper half of the tube 4414 above the aperture horizontal axis HA of each tube aperture 4422 is supported by at least two tube support protrusions 4440 and the lower half of the tube below horizontal axis HA is supported by at least two protrusions 4440 as shown. In one embodiment, the right half of tube 4414 to the right of the aperture vertical axis VA of each tube aperture 4422 is supported by at least three tube support protrusions 4440 and the left half of the tube to the right of vertical axis VA is supported by at least three protrusions 4440 as shown Adjusting the radial position of the primary flow holes 4432 inwards or outwards relative to the tube hole 4430 to alter the flow area A1 of the flow holes concomitantly decreases or increases the circumferential width of the arcuate bearing surfaces of the tube support protrusions 4440.

In comparison to mechanically broached polygonal flow holes which provide axial flow, the present arcuately rounded non-polygonal flow holes 4432 provides advantages. First, the axial flow baffle provides greater and more uniform surface contact with and support of the tubes (e.g. lateral support) via the tube support protrusions 4440 compared to broached tube support plates which typically provide line contact or reduced surface contact depending on their design. The increased surface of contact with the tubes provides greater margin of safety to avoid flow induced vibration damage to the tubes at the baffle locations particularly under flow rates higher than design conditions or due to transient operation of the heat exchanger. Heat exchangers that are expected to have transient flow conditions exceeding design conditions greatly benefit from the present axial flow baffles 4420 ability to provide greater margin of safety to flow induced vibration related tube damage. In addition, the non-polygonal crescent or semi-circular shaped primary flow holes 4432 eliminate angles within the primary flow holes which reduces formation of flow eddies at the openings which may increase pressure drop of the shell-side fluid across the baffles.

In some embodiments, additional optional secondary flow holes 4450 and also tertiary flow holes 4451 may be formed in the solid ligaments of the baffle plate material remaining between the tube apertures 4422 as shown in FIGS. 87 and 88. These additional flow holes do not overlap the tube holes 4430 of each tube aperture 4422, and provide additional flow area for heat exchanger internal shell-side fluid SSF to pass through the baffles to alleviate shell-side fluid pressure loss. The secondary and tertiary flow holes 4450, 4451 are otherwise inconsequential to the heat exchanger's performance and heat transfer rate. In some embodiments, only secondary flow holes 4450 may be used without need for tertiary flow holes 4451 depending on the reduction is shell-side pressure loss necessary across each baffle. In some embodiments, only some of the baffles may have secondary or secondary and tertiary flow holes. In addition, not every flow aperture 4422 in a single baffle 4420 has secondary or secondary and tertiary flow holes if used. According, at least some of the tube apertures 4422 in some embodiments may optionally include secondary or secondary and tertiary flow holes to minimize the shell-side fluid pressure drop across each axial flow baffle 4420 if required.

In one embodiment, the secondary flow holes 4450 may be arranged in a circular array or pattern around each tube hole 4430 and spaced radially apart from the tube hole. Similarly, the tertiary flow holes 4451 may be arranged in a circular array or pattern around each tube hole 4430 and spaced radially apart from the tube hole, and further may be spaced radially apart from the secondary flow holes 4450. The primary, secondary, and tertiary flow holes 4432, 4450, and 4451 are concentrically aligned with the tube hole 4430 defining respective reference rings or circles C2, C3, and C4 (see, e.g. FIG. 88). Reference circles C2, C3, and C4 are thus concentrically aligned with reference circle C1 defined by the tube hole 430.

In some embodiments, the tertiary flow holes 4451 and primary flow holes 4432 may lie on the same radius line R2 originating at the centerpoint C of the tube hole 4430 and are axially aligned (with respect to the centers of the holes). The secondary flow holes 4450 may lie on a different radius line R3, which is interspersed between the radius lines R2 and the primary and tertiary flow holes 4432, 451 (see, e.g. FIG. 88). This arrangement of flow holes advantageously preserves as much ligament of baffle plate material between the various holes to maintain strength and rigidity of the baffles 4420. The secondary flow holes 4450 may be formed at least partially in the ligaments of the baffle 4420 and between the primary flow holes 4432 that defines the tube support protrusions 4440. The reference circle C3 of the secondary flow holes 4450 may intersect the outermost peripheral edge 4432-1 distal-most from centerpoint C of each flow aperture 4422 in some embodiments as shown in FIG. 88.

A process or method for fabricating an axial flow baffle 4420 will now be briefly described. The following method or process may advantageously be performed using only a single type of machine tool comprising a drill press or vertical milling machine to drill a variety of circular holes of different diameters in the workpiece for forming the necessary tube support and flow holes.

Figure 100:
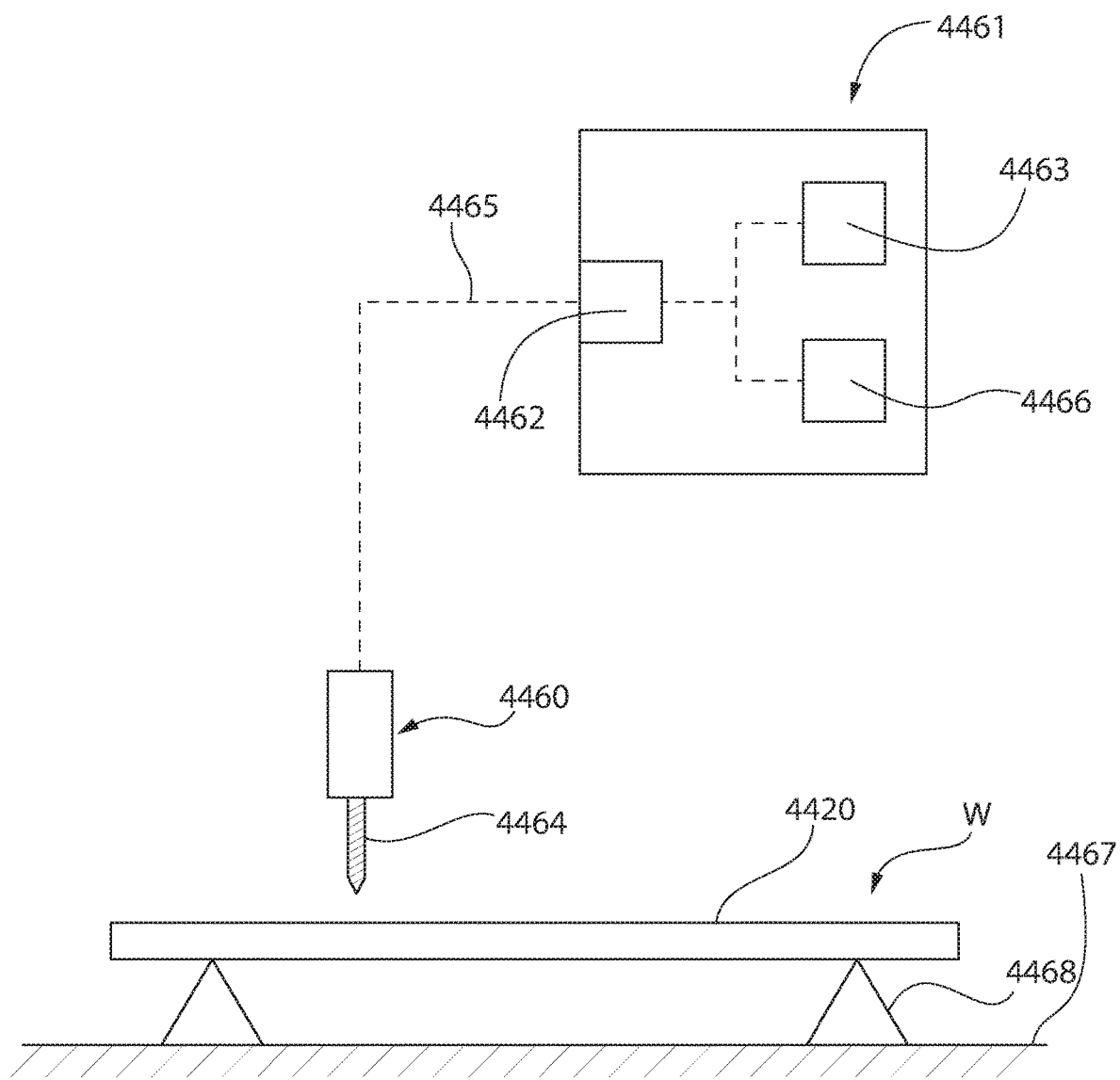
FIG. 100 is a schematic diagram of a heat exchanger baffle fabrication system according to the present disclosure.

Referring to the schematic system diagram of FIG. 100. the following axial flow baffle 4420 fabrication process preferably is performed using a CNC (computer numeric control) machine tool 4460 with drilling bit 4464 (e.g. drill press or milling machine) under the control and direction of a control system including computer 4461 with programmable central processor 4462, non-transient tangible computer-readable medium 4463, various input/output peripherals and interfaces 4466 (e.g. communication modules or input/output connectors, etc.), and all other conventional appurtenances and ancillary devices and components (e.g. power supply, etc.) necessary to form a fully function process controller. The processor 4462 is programmed with and operable to execute program instructions or code (e.g. control logic or software) configured to direct operation of the machine tool 4460 to perform the steps and processes described below via wireless and/or wired communication pathways 4465. Computer readable medium 4463 may include volatile memory and non-volatile memory operably and communicably coupled to the processor(s). Any suitable combination and types of volatile or non-volatile memory may be used including as examples, without limitation, random access memory (RAM) and various types thereof, read-only memory (ROM) and various types thereof, flash memory, or other memory which may be written to and/or read by the processor operably connected to the medium. Both the volatile memory and the non-volatile memory may be used for storing the program instructions or software.

It is well within the ambit of one skilled in the art to provide and configure the control system with all the required appurtenances to provide a fully function control system for operating the machine tool 4460 in the manner disclosed herein. It will be appreciated that various aspects of control system and functionality may be embodied in software, firmware, or hardware.

General reference is now be made to FIG. 88 which provides an enlarged view of a section of the axial flow baffle 4420 and tube apertures 4422, secondary flow holes 4450, and tertiary flow holes 4451 along with reference circles used to direct operation of the machine tool 4460 via the processor 4462. Reference is also made to forgoing system diagram FIG. 100.

The method comprises first providing and supporting a substantially flat metallic baffle 4420 plate workpiece W from a support surface 4467 via suitable supports 4468. Although FIG. 100 depicts horizontal orientation of the workpiece, in other embodiments it may be vertical. The baffle plate may be horizontal oriented in one embodiment; however, in other embodiments the baffle workpiece may be vertically oriented. In one embodiment, the baffle plate workpiece may be circular in shape with circumferentially extending perimeter. The baffle plate may be made of any suitable metal for the service conditions of the heat exchanger. Some non-limiting examples include carbon steel, stainless steel, Nitronic® 60, and others. Any suitable thickness of the baffle plate may be provided for the service conditions. Some typical non-limiting ranges used include generally about ⅛ to ¾ inches for heat exchangers, and generally about 1-1 to 1½ inches for larger diameter (e.g. 10 feet or more) for steam generators such as those that may be used in nuclear power generation facilities. The invention is not limited to foregoing examples of thicknesses and material types.

The method continues with the processor 4462 next locating the centerpoint C of a first tube aperture 4422. Next, the circular primary flow holes 4432 are first drilled with machine tool 4460 (e.g. drill press or milling machine) under the direction of processor 4462 preferably before forming the tube hole 4430. Otherwise, if the order is reversed, the drill or milling bit would tend to migrate inwards in the workpiece towards an already drilled void of the central larger diameter tube hole 4430, thereby rendering control of the bit and formation of an accurate circular cut difficult for each primary flow hole 4432. The primary flow holes 4432 are drilled in a circumferentially spaced pattern along reference circle C3.

After drilling the primary flow holes 4432 of each tube aperture 4422, the central tube hole 4430 is then drilled using the same machine tool with a larger diameter drill bit. The tube hole 4430 is drilled so that its center is at the geometric centerpoint C of tube aperture 4422 corresponding also to the center of the circular array of primary flow holes 4432 already formed. The tube hole 4430 has a diameter selected and cut to partially overlap and intersect each of the primary flow holes. The workpiece material removed by formation of the center tube hole 4430 creates and leaves the non-polygonal, semi-circular shaped primary flow holes 4432 which represent the finished crescent-shaped geometry of the primary flow holes. Primary flow holes 4432 are concentrically arranged to the tube hole 4430 as shown. The tube hole 4430 and primary flow holes 4432 are now completed. The process and steps may be repeated for each of the tube aperture locations by the CNC machine tool.

It bears noting that in some fabrication sequences, the primary flow holes and center tube hole need not be completed for one tube aperture 4422 before proceeding to the next tube aperture. Accordingly, in some fabrication sequences the centerpoints C of all of the primary flow holes 4432 may be located and drilled first in the baffle workpiece W by the CNC machine tool 4460, followed next by then drilling all of the tube holes 4430 for each tube aperture 4422 in the manner described above.

In one embodiment, the secondary and tertiary flow holes 4450, 4451 may next be cut (i.e. drilled) and completed in any order after drilling the primary flow holes 4432 and center tube holes 4430 of each tube aperture 4422. Alternatively, in another embodiment, the secondary and tertiary flow holes may be formed before drilling the center tube holes 4430 either after drilling the primary flow holes 4432 or before. Because the secondary and tertiary flow holes do not overlap the primary flow holes 4432 or tube holes 4430, their formation is independent of forming the latter two holes.

The secondary flow holes 4450 are located and drilled along reference circle C3 in circumferentially spaced apart relationship. The tertiary flow holes 4451 are located and drilled along reference circle C4 in circumferentially spaced apart relationship. In one embodiment, the tertiary flow holes 4451 may be smaller in diameter than the secondary flow holes 4450. The secondary flow holes 4450 may be smaller in diameter than the primary flow holes 4432 in in the same or another embodiment. The diameters of the secondary and tertiary flow holes are selected to not reduce the remaining ligaments of the baffle 4420 between various holes to the point where the structural integrity of the baffle plate is compromised. The sizing, lateral spacing, and arrangement of the primary, secondary, and tertiary flow holes previously described herein helps preserve sufficient ligament dimensions to avoid structural integrity problems. In some embodiment, the ligament between the holes can be as small as ¹⁄₁₆ (or lower as practicable by the machining process) depending in part on the thickness of the baffle plate and strength of the metal selected.

The centerpoints C of each tube aperture 4422 and concentric arrangement of the primary flow holes 4432 and second and tertiary flow holes 4450, 4451 if provided which are arranged circumferentially along reference circles C2, C3, C4 advantageously provides a convenient mapping system for controlling drilling of the various apertures/holes by the CNC machine tool 4460.

It further bears noting that the foregoing fabrication process for forming the tube apertures 4422 each with a tube hole 4430 and associated array of primary flow holes 4432 is advantageously mechanically simpler, quicker, and less expensive than forming broached axial flow holes in a baffle. The broaching process forms polygonal shaped auxiliary flow openings using a separate broaching chisel or bit. In general, the circular center tube hole must first be drilled using a first drill bit and rotational cutting action. Next, the first drill bit is removed and replaced with a second drill bit having a larger diameter which is used to form a recessed edge chamfer around the central tube hole. This is necessary to keep the broaching bit centered with respect to the tube hole and prevent it from wandering when used. Next, the second drill bit is removed and replaced with a special broaching bit housing which causes the broaching bit to oscillate and wobble, but not rotate creating a metal cutting chiseling action up/down normal to the major face or surface of the baffle plate. The broaching bit chisels away at the sides of the already formed tube hole gradually removing strips or shavings of metal from the tube hole to form the polygonal shaped flow openings as the broaching bit advances slowly downwards along the tube hole wall. It bears noting that the broaching bit is incapable of penetrating virgin solid metal without the aid of the central tube hole, which must necessarily be formed first in a metal broaching operation. The broaching operation also requires extreme downward pressure and force normal to the major surface of the baffle plate to chisel out the metal, which can cause the baffle plate to bow and deform around the tube holes. This can adversely affect proper alignment and seating of the heat exchanger tubes in the tube holes of the baffle, thereby leaving such dimensionally skewed openings more susceptible to flow induced tube vibration damage and fretting wear in some instances.

According to another aspect of the invention, the present axial flow baffle hole concept can be extended to the traditional cross-flow baffle designs where in lieu of the bypass windows or openings cut out of the segmental or other type baffle (e.g. disk and donut, etc.), a uniquely configured full-diameter hybrid cross-flow baffle is provided which accommodates cross-flow of the shell-side fluid over the tubes to increase heat transfer rates and efficiency. The hybrid baffle replaces the bypass windows or openings at conventional segmental or other cross-flow baffle location with select portions or regions having an array of the tube apertures 4422 previously described herein. This provides the axial flow in those regions to replicate the desired bypass cross flow over the tubes. However, unlike conventional segmental or other cross-flow baffles, all tubes in the tube bundle are now advantageously fully supported at each baffle location including those previously unsupported tubes in the conventional bypass window or opening baffle arrangements. The heretofore unsupported long tube spans between baffles for the traditional cross-flow baffles with open bypass windows or openings can be reduced at least in half in comparison to traditional single segmental baffles, and even more for double and triple segmental baffles. There is a small penalty for reduced flow in the bypass cross-flow regions of the present hybrid baffle window area. This can be compensated for by the design of the heat exchanger and provision of primary, secondary, and tertiary flow holes 432, 450, 451 previously described herein as needed.

The conventional circular tube holes are retained in the remaining portions of full diameter circular hybrid baffles which do not permit axial shell-side fluid flow and divert the flow transversely to the axial flow portions or regions of each baffle to obtain the desired bypass cross-flow pattern.

FIGS. 90-95 show several non-limiting examples of hybrid baffles, as further described below.

Figure 90:
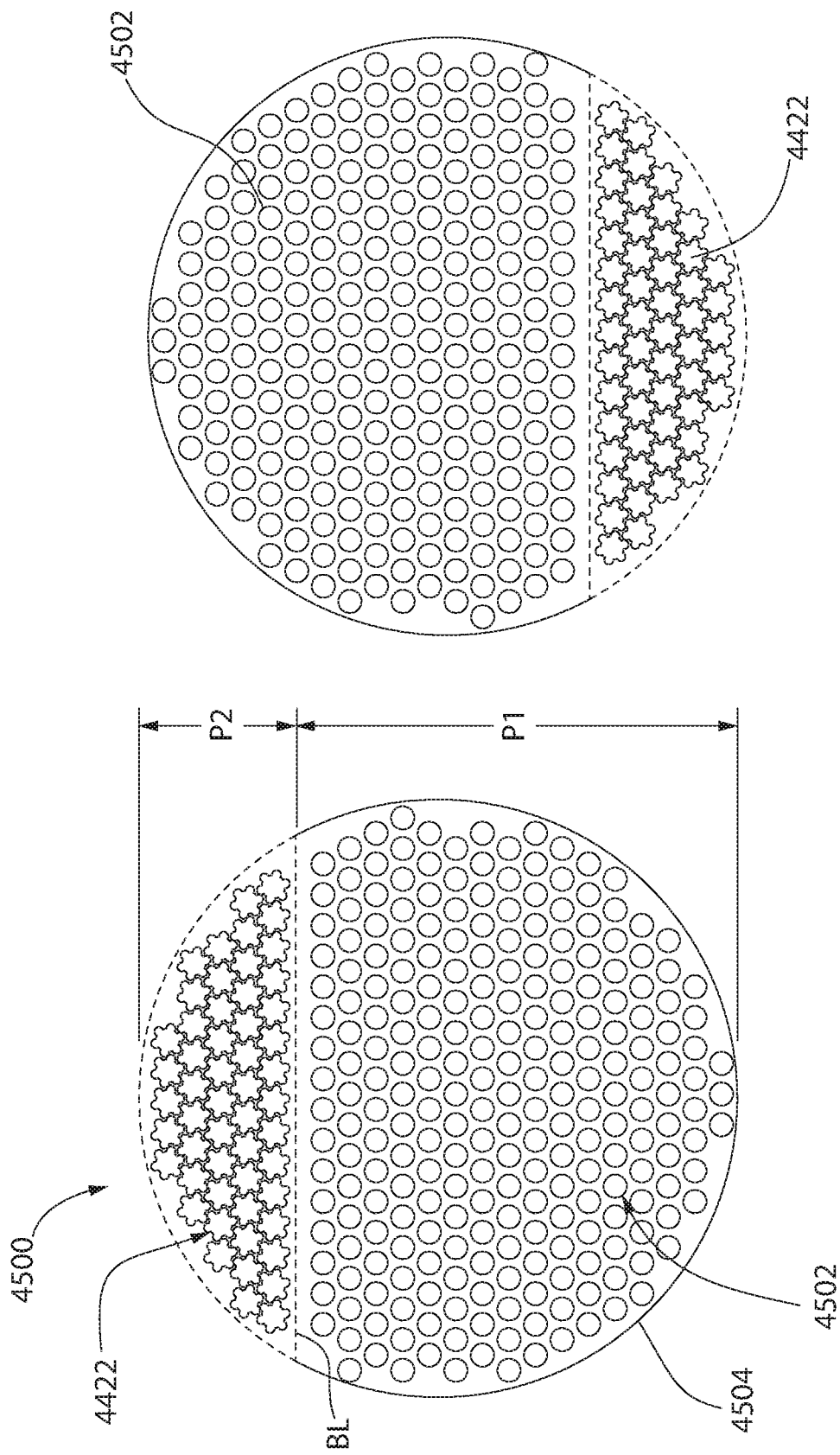
FIG. 90 shows plan views of a first embodiment of a hybrid cross-flow baffle for a shell and tube heat exchanger according to the present disclosure.
Figure 91:
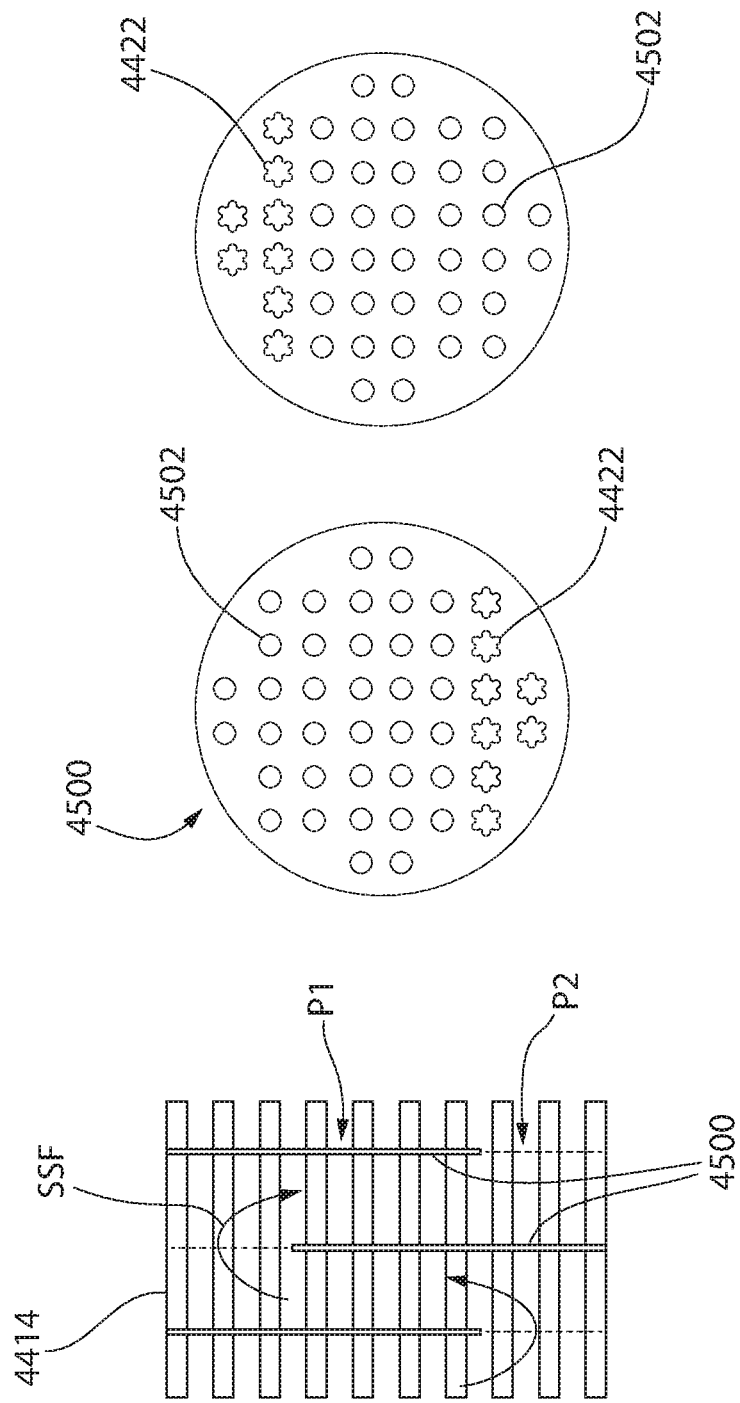
FIG. 91 shows additional plan views thereof and the resulting shell-side fluid flow pattern produced.

FIG. 90 shows an example for a single segmental type hybrid cross-flow baffle 4500 according to the present disclosure. Baffle 4500 has a full diameter circular shape defining a concomitant circumferentially-extending peripheral edge 4504 which is positioned in close proximity to the interior surface of the heat exchanger shell in the same manner as baffle 4420 previously described herein to minimize flow around the peripheral edge of the baffle. Baffle 4500 includes a first portion or region P1 comprising an array of a plurality of conventional circular tube holes 4502 and a second axial flow portion or region P2 comprising an array of a plurality of the tube apertures 4422 previously described herein (star-shaped openings in the figure). Each tube aperture 4422 includes a central tube support hole 4430 and primary flow holes 4432. Secondary and tertiary flow holes 4450, 4451 may be included as needed to achieve the desired axial bypass flow of the shell-side fluid SSF while minimizing pressure drop across the baffle. The regions P1 and P2 are separated by an imaginary linear boundary line BL (shown dashed) forming a secant of the circular baffle full diameter baffle. In this single segmental hybrid baffle, the axial flow region P2 comprises less than half of the surface area of the hybrid baffle plate. Though of another way, the axial flow region P2 comprises a minority of the surface area normal to the longitudinal flow of the shell-side fluid and the region P1 comprises a majority of the surface area as shown.

The single segmental hybrid baffles 4500 shown in FIG. 90 have reverse orientations, but are the same baffle. Each of these oppositely oriented baffles are alternated along the length of and inside the heat exchanger shell to produce the traditional single segmental shell-side fluid SSF cross flow pattern 4403 over tubes 4414 shown schematically in FIG. 91 (see directly shell-side flow arrows). The heat exchanger 4600 of FIG. 97 demonstrates the same traditional single segmental type cross-flow pattern using hybrid baffle 4500.

Figure 92:
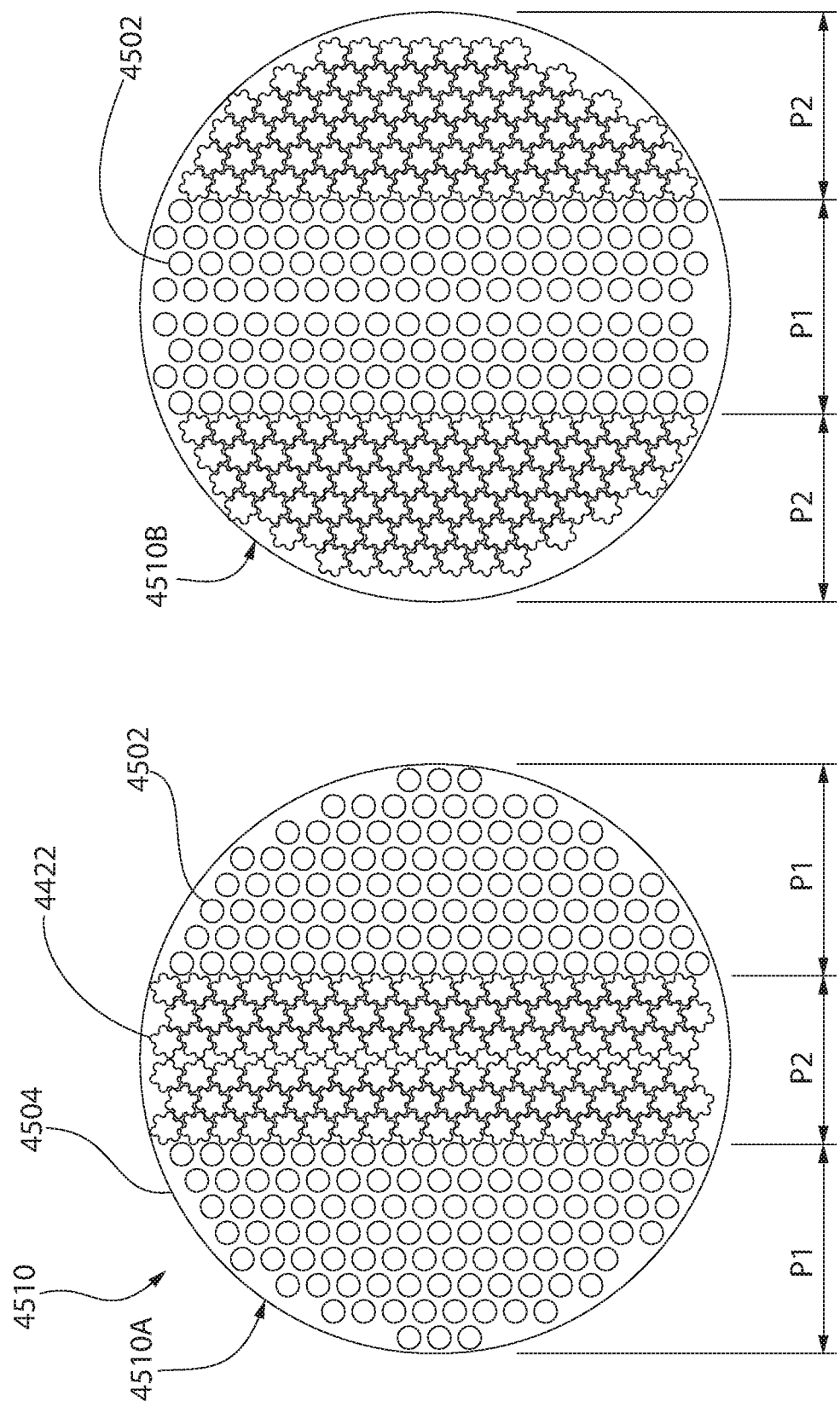
FIG. 92 shows a plan view of a second embodiment of a hybrid cross-flow baffle for a shell and tube heat exchanger according to the present disclosure.
Figure 93:
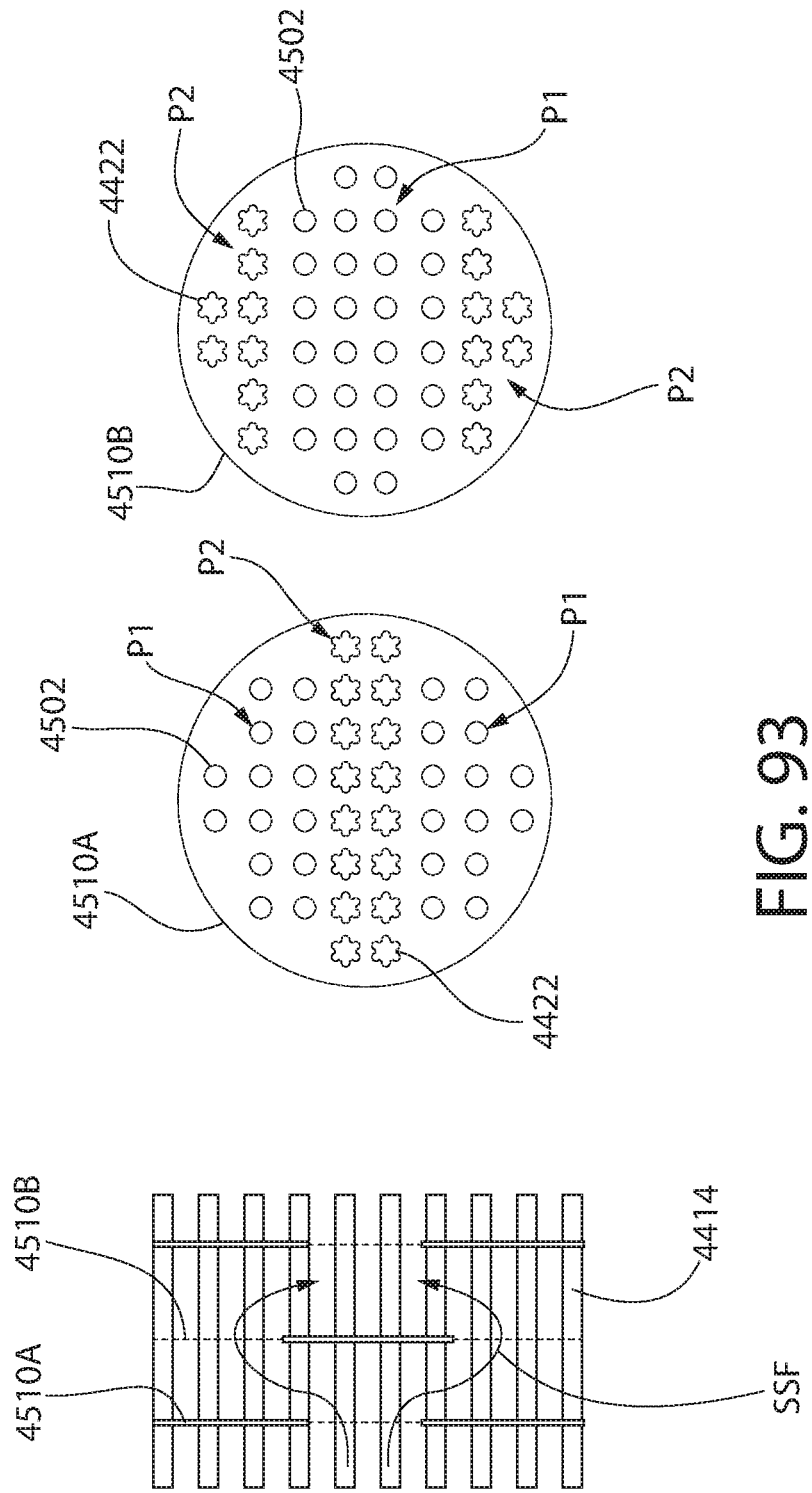
FIG. 93 shows additional plan views thereof and the resulting shell-side fluid flow pattern produced.

FIGS. 92 and 93 show an example for a double segmental type hybrid cross-flow baffle 4510 according to the present disclosure. Each baffle 4510 is full diameter and includes a circumferentially-extending circular peripheral edge 4504. Unlike single segmental hybrid baffle 4500, two different configurations of baffle 4510 are provided as shown to create the traditional double segmental shell-side fluid SSF cross flow pattern shown in FIG. 93. In FIG. 92, the baffle 4510A on the left has a strip-shaped central axial flow region P2 comprising flow apertures 4422 and two outer semi-circular conventional tube hole regions P1 comprising circular tube holes 4502 on each outer side of region P2. The baffle 4510B on the right has the opposite arrangement. Each baffle 4510A and 4510B configuration is alternated longitudinally along the length of the heat exchanger shell.

It bears noting that in FIG. 93, the baffles 4510 are shown oriented such that each of the regions P1 and P2 are horizontal oriented instead of vertically oriented as shown in FIG. 92. This is intentional to demonstrate that the baffles can have any orientation when mounted in the shell of the heat exchanger including horizontal, vertical, and any angle therebetween so long as each baffle preferably has the same relative orientation to each other to achieve the shell-side flow patterns shown for the respective type of segmental baffle (e.g. single, double, or triple). This applies to all segmental type hybrid baffles presently being described in FIGS. 90-94.

Figure 94:
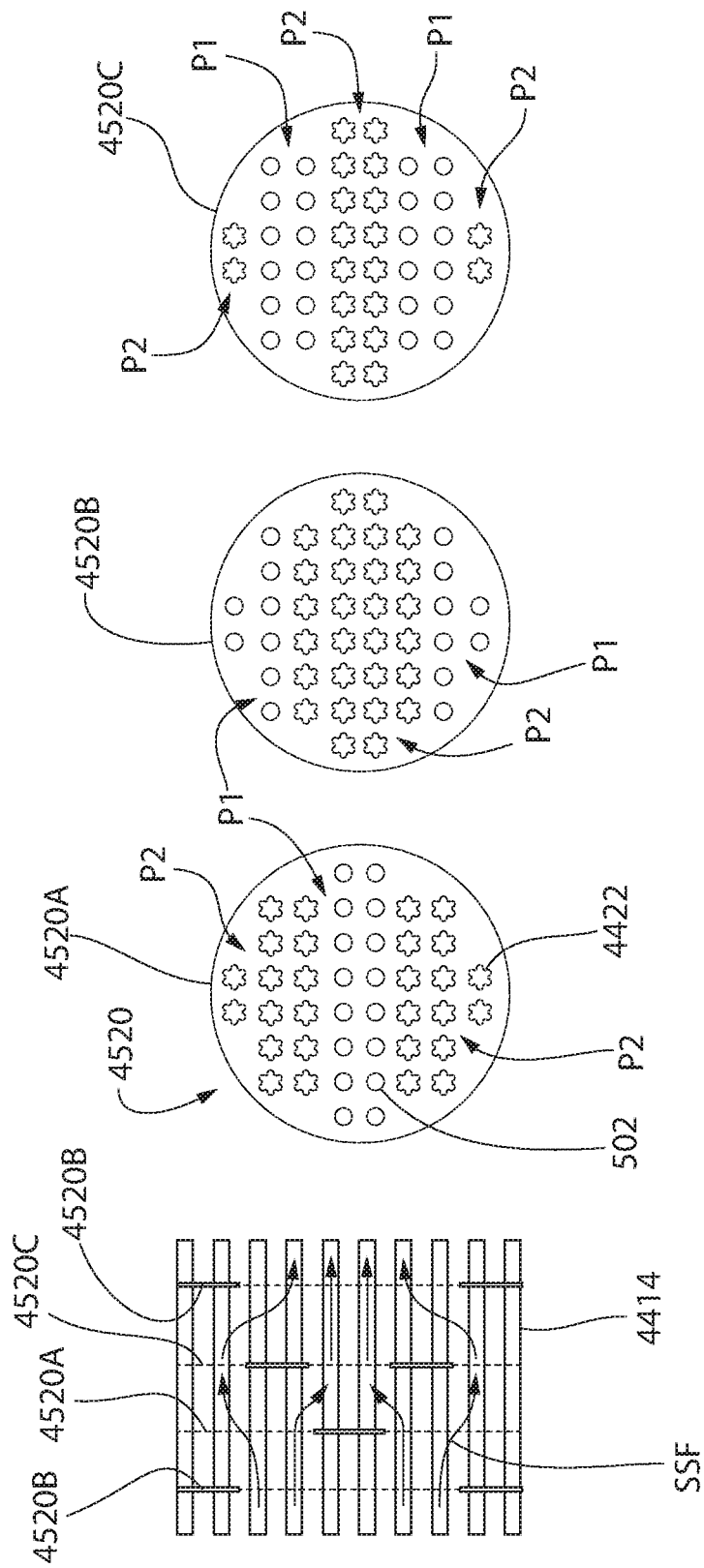
FIG. 94 shows a plan view of a third embodiment of a hybrid cross-flow baffle for a shell and tube heat exchanger according to the present disclosure and the resulting shell-side fluid flow pattern produced.

FIG. 94 shows an example for a triple segmental type hybrid cross-flow baffle 4520 according to the present disclosure. Each baffle 4520 is full diameter and includes a circumferentially-extending circular peripheral edge 4504. The triple segmental type hybrid baffle has three different configurations of baffle 4520 to create the traditional triple segmental shell-side fluid SSF cross flow pattern shown in FIG. 94. In FIG. 94, the left-most circular baffle 4520A has a strip-shaped central conventional tube hole region P1 comprising circular tube holes 4502 flanked by two outer semi-circular axial flow region P2 comprising flow apertures 4422 on each outer side of region P1. The circular baffle 4520B shown in the center has a strip-shaped central axial flow region P2 comprising flow apertures 4422 and two outer semi-circular conventional tube hole regions P1 each comprising circular tube holes 4502 on each outer side of region P2. The right-most circular baffle 4520C has a strip-shaped central conventional tube hole region P1 comprising circular tube holes 4502 flanked by two strip-shaped axial flow region P2 comprising flow apertures 4422 on each side of region P1, and two outermost semi-circular shaped conventional tube hole regions P1 on each outer side of the two strip-shaped axial flow regions P2. Each of the three baffles 4520A, 4520B, and 4520C are alternated longitudinally along the length of the heat exchanger shell to produce traditional triple segmental shell-side fluid SSF cross flow pattern as shown.

Figure 95:
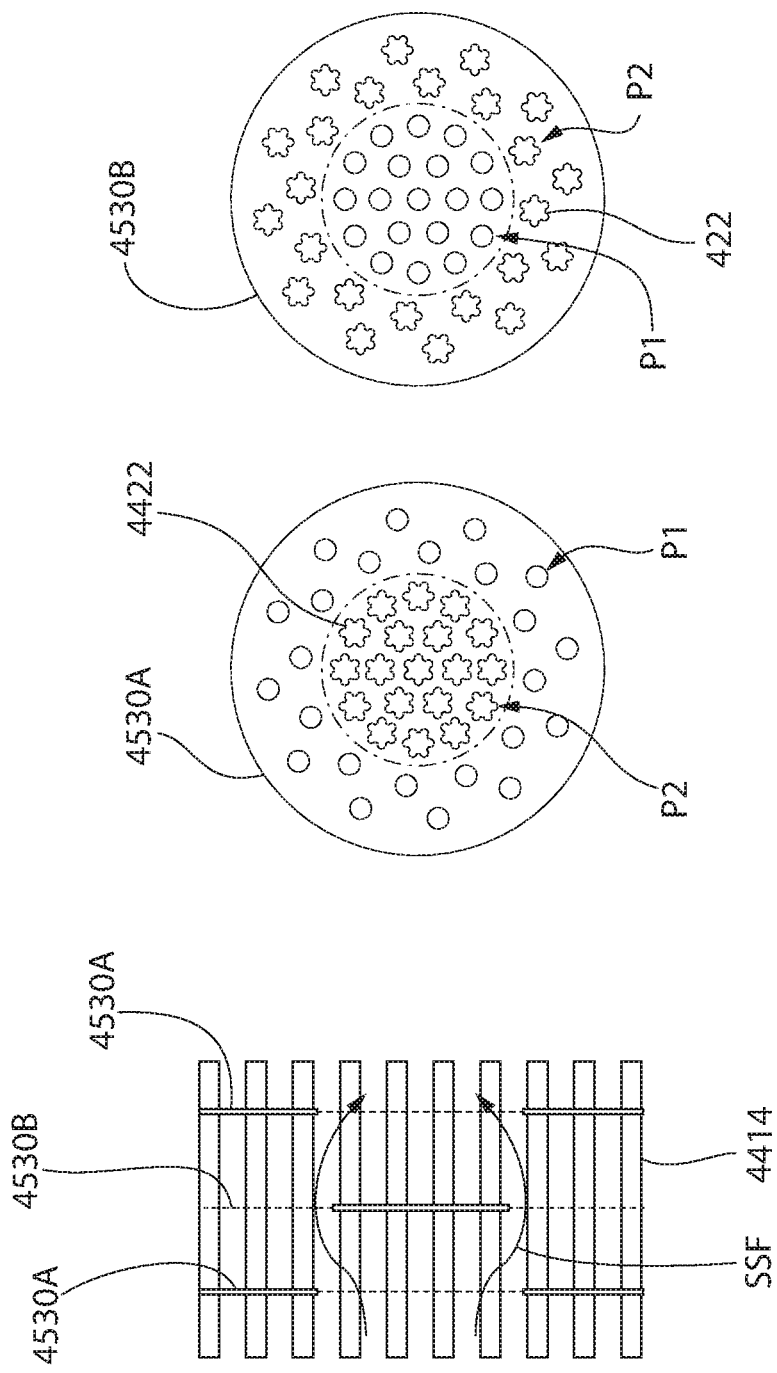
FIG. 95 shows a plan view of a fourth embodiment of a hybrid cross-flow baffle for a shell and tube heat exchanger according to the present disclosure and the resulting shell-side fluid flow pattern produced.

FIG. 95 shows a non-segmental disk and donut type hybrid baffle 4530 according to the present disclosure. Each baffle 4530 is full diameter and includes a circumferentially-extending circular peripheral edge 4504. Two different configurations of baffles 4530 are provided in this set of baffles as shown to create the traditional disk and donut shell-side fluid SSF cross flow pattern shown in FIG. 95. The baffle 4530A on the left has a circular central axial flow region P2 comprising flow apertures 4422 which is surrounded by a concentric annular conventional tube hole region P1 comprising circular tube holes 4502. The baffle 4530B on the right has the opposite arrangement. Each baffle 4530A and 4530B configuration is alternated longitudinally along the length of the heat exchanger shell. The resultant shell-side fluid flow with this hybrid baffle design will be the same regarding of the orientation of the baffles.

The foregoing full-diameter cross-flow hybrid baffles provide the advantage that the entire length of tubes exposed in the shell are uniformly supported at every baffle location even those in shell-side fluid bypass areas or portions of the baffles. Compared to traditional cross-flow baffles, there are no long unsupported lengths of tubes at each baffle which are more susceptible to flow induced tube vibration resulting in fretting wear of the tubes at the baffles and premature tube failures and tube-side fluid leaks requiring such tubes to be plugged, thereby reducing the heat transfer efficiency.

Figure 97:
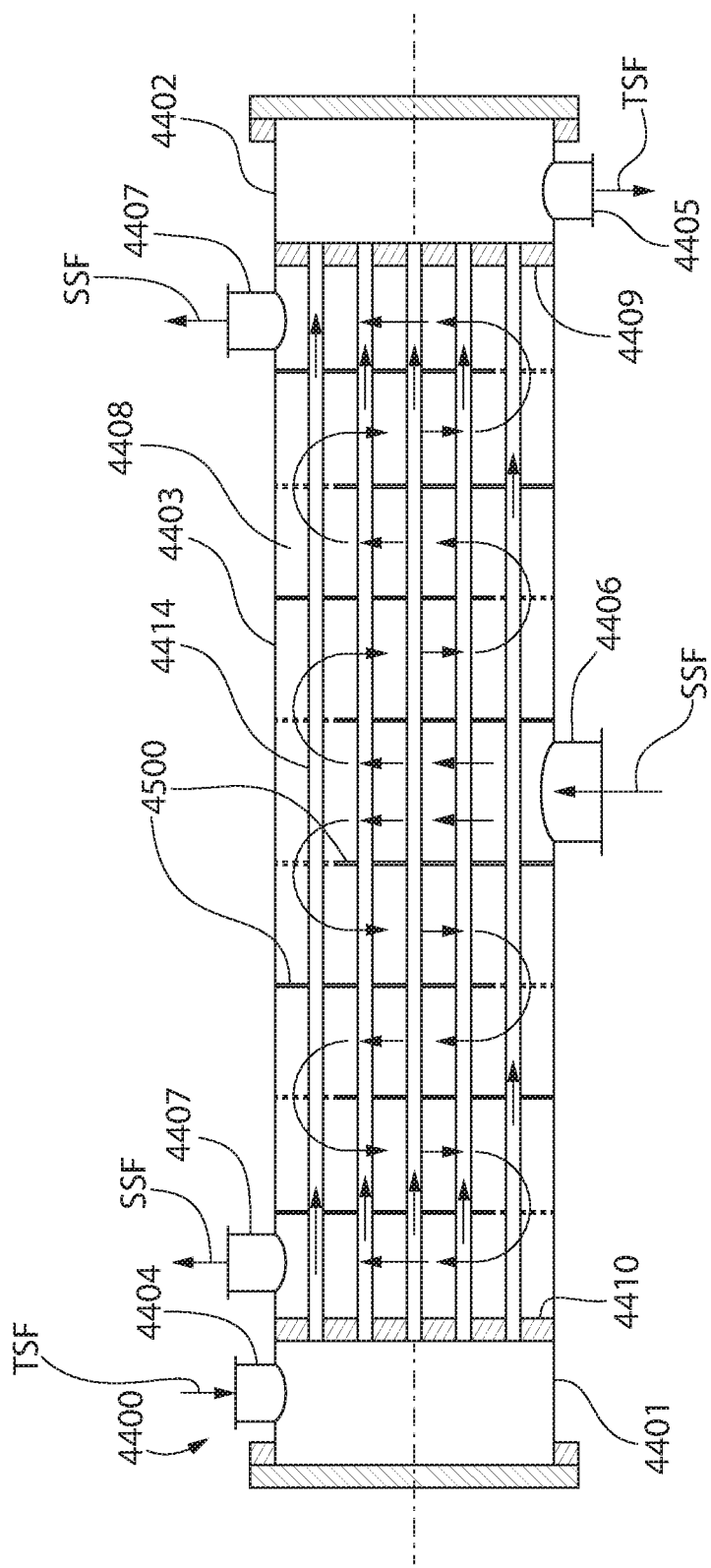
FIG. 97 shows an embodiment of a single shell-side pass shell and tube heat exchanger including the hybrid cross-flow baffles of FIG. 90.
Figure 98:
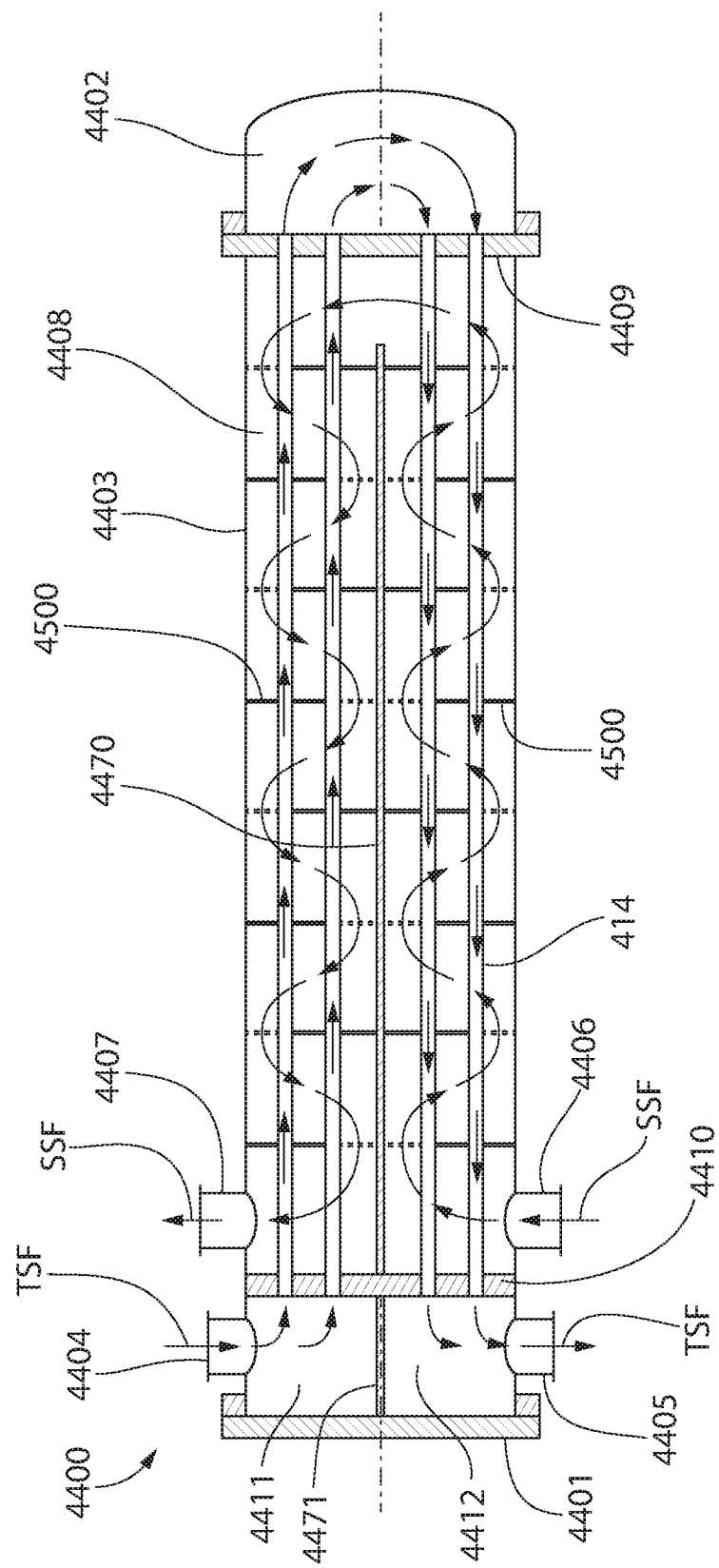
FIG. 98 shows an embodiment of a double shell-side pass shell and tube heat exchanger including the hybrid cross-flow baffles of FIG. 90.
Figure 99:
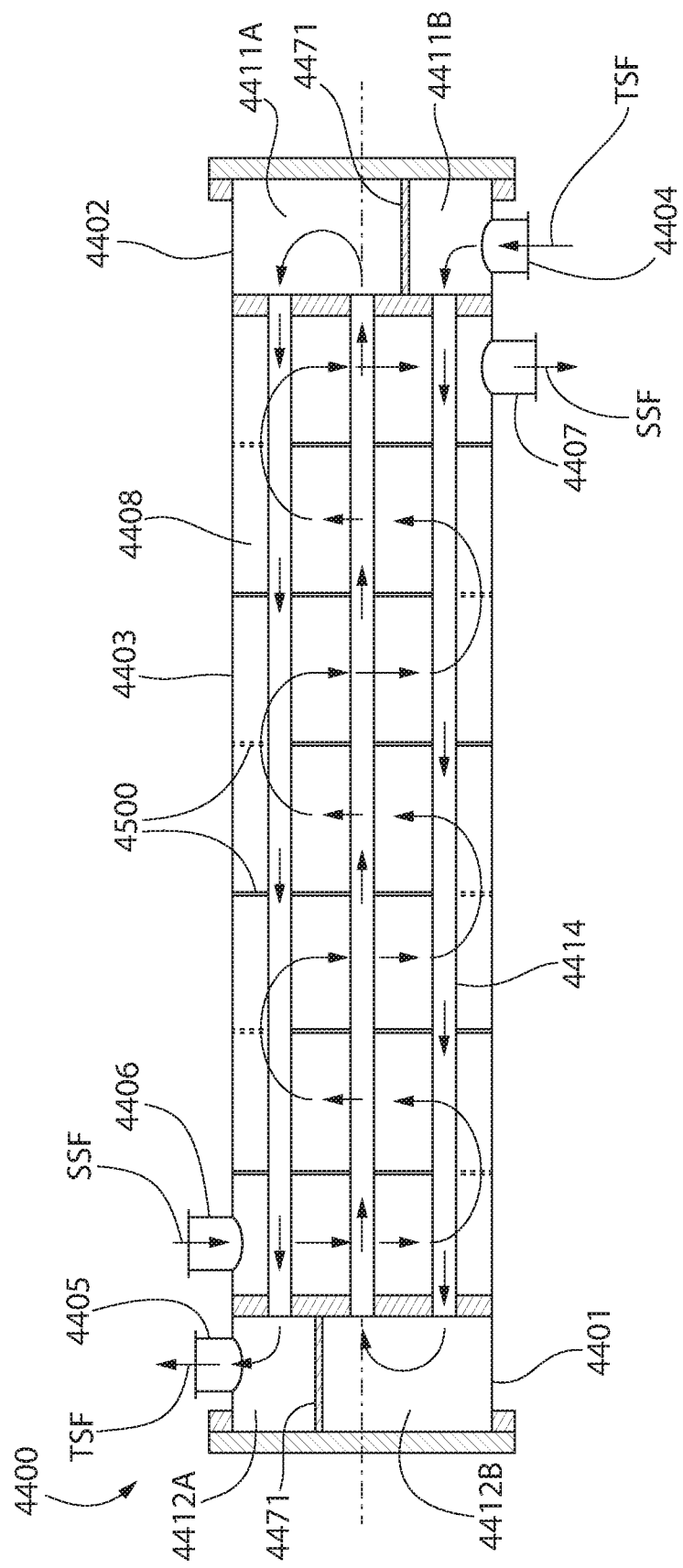
FIG. 99 shows an embodiment of a triple shell-side pass shell and tube heat exchanger including the hybrid cross-flow baffles of FIG. 90.

FIGS. 97-99 show non-limiting examples of the shell and tube heat exchanger 4400 of FIG. 96 previously described herein which is slightly modified to employ single segmental type hybrid baffles 4500 for creating shell-side cross-flow pattern inside shell 4403 in different shell-side pass arrangements of the tube-side fluid TSF (in lieu of pure shell-side axial flow in FIG. 96). For the sake of brevity, not all components are numbered again in FIGS. 97-99 to avoid repetition with FIG. 96 but are the same components unless noted otherwise.

FIG. 97 shows a shell-side single-pass heat exchanger 4400 using single segmental type hybrid baffles 4500. Baffles 4500 create a cross-flow pattern of the shell-side fluid SSF throughout the shell 4403 of the heat exchanger as indicated by the directional shell-side flow arrows. The tube-side fluid TSF makes a single pass through the shell from end to end as indicated by the tube-side fluid TSF directional flow arrows.

FIG. 98 shows a shell-side double-pass heat exchanger 4400 using single segmental type hybrid baffles 4500. A longitudinal baffle 4470 divides the shell-side space 4408 evenly into upper and lower sections 4408A and 4408B which are in fluid connection only at one end of the shell near tubesheet 4409 by a vertical shell-side passage opposite the shell-side fluid inlet and outlet nozzles 4406, 4407, as shown. Baffles 4500 create a cross-flow pattern of the shell-side fluid SSF throughout the shell 4403 in each of the upper and lower sections 4408A, 4408B of the heat exchanger as indicated by the directional shell-side flow arrows. The tube-side fluid TSF makes a double pass through the shell 4403 from end to end as indicated by the tube-side fluid TSF directional flow arrows. To accomplish this double pass flow arrangement, the plenum inside head 4401 is divided into an upper tube-side fluid inlet plenum 4411 and lower tube-side fluid outlet plenum 4412 by horizontal pass partition plate 4471 which fluidly isolates the plenums inside the head as shown. The tube-side fluid inlet and outlet nozzles 4404, 4405 are located on head 4401 and in fluid communication with their respective plenums. Partition plate 4471 is sealed around its perimeter to the head to create the fluid isolation in conventional manner. Head 4401 contains both the tube-side fluid inlet and outlet nozzles 4404, 4405. In addition, opposite head 4402 is completely closed without any tube-side fluid inlet or outlet connections to reverse the direction of the tube-side fluid TSF after traversing the shell during the first pass. Head 4401 may be a flanged and dish type head as shown, or any other conventional type head commonly used for shell and tube heat exchangers.

FIG. 99 shows a shell-side triple-pass heat exchanger 4400 using single segmental type hybrid baffles 4500. Baffles 4500 create a cross-flow pattern of the shell-side fluid SSF throughout the shell 4403. The tube-side fluid TSF makes a triple pass through the shell 4403 from end to end as indicated by the tube-side fluid TSF directional flow arrows. To accomplish this triple pass flow arrangement, the plenum inside each head 4401, 4402 is divided into upper and lower plenum sections 4411A and 4411B, and 4412A and 4412B as shown by horizontal pass partition plates 4471. The partition plates fluidly isolates the plenum sections inside each of the heads from each other as shown. The tube-side fluid inlet nozzle 4404 may be located on head 4402 and in fluid communication with lower plenum section 4411B. The tube-side fluid outlet nozzle may be located on opposing head 4401 and in fluid communication with upper plenum section 4411B. Partition plates 4471 are sealed around their perimeter to the heads to create the fluid isolation in conventional manner. It bears noting that the partition plates 4471 are unevenly located inside each head such that the volume of the upper and lower plenum sections is not equal as shown for apparent reasons.

V. Inventive Concept 5

With reference to FIGS. 101-134, a fifth inventive concept will be described.

For non-limiting exemplary purposes, the cask cooling system and related methods discussed herein will be described in connection with storage and/or transport casks used to the transport, store and handle spent nuclear fuel ("SNF"). However, the invention is not limited in its applicability to casks handling SNF alone, and can be utilized to cool casks emitting heat used to handle any type of high level nuclear waste, including for example without limitation without limitation burnable poison rod assemblies ("BPRA"), thimble plug devices ("TPD"), control rod assemblies ("CRA"), axial power shaping rods ("APSR"), wet annular burnable absorbers ("WABA"), rod cluster control assemblies ("RCCA"), control element assemblies ("CEA"), water displacement guide tube plugs, orifice rod assemblies, vibration suppressor inserts and any other radioactive materials. The SNF and foregoing waste materials may collectively be referred to as "nuclear waste" herein all of which are radioactive. Moreover, while this invention is focused on cooling of casks containing high level nuclear waste, it can be applied to cool any type of nuclear-related or non-nuclear vessels with heat producing contents that need to be kept cool for operational reasons.

FIGS. 101 and 102 show one non-limiting embodiment of a vertically oriented cask 5020 containing spent nuclear fuel (SNF) which may utilize an external cooling system according to the present disclosure. However, the present cooling system can be used with a cask in other orientations such as casks in a horizontal or inclined orientation. The heat extraction effectiveness of the cask cooling system may be influenced by the orientation of the cask, but the present invention is equally applicable to such alternate orientations. An embodiment of the cask cooling system for horizontally orientated nuclear fuel storage/transport casks is disclosed later herein.

Referring now to FIGS. 101-102 and 116-117, cask 5020 may be an elongated vessel having a cylindrical body defining a longitudinal axis LA. Cask 5020 includes a top end 5022, a bottom end 5023, cylindrical sidewall 5024 extending between the ends and defining an outer or external surface of the cask, and an internal longitudinal storage cavity 5044. Cavity 5044 extends for substantially a full height of the cask along the longitudinal axis from the top to bottom end. Cavity 5044 is configured to hold and support a conventional nuclear spent fuel (SNF) canister 5060 therein. Canister 5060 may be a multi-purpose canister (MPC) such as those available from Holtec International of Camden, N.J. The cavity 5044 of cask 5020 preferably has a transverse cross-sectional area configured to hold no more than a single spent nuclear fuel canister 5060, which in turn defines an internal storage cavity 5065 of its own that holds a plurality of conventional SNF assemblies 5063 each of which contain multiple fuel rods. The fuel assemblies 5063 are represented schematically in FIG. 102 by hatching as such assemblies are well known in the art. Canister 5060 includes a cylindrical body and a sealable lid 5061 to close cavity 5065 and provide access to the interior of the canister and fuel assemblies 5063 stored therein. A typical nuclear fuel canister may hold approximately 5089 fuel assemblies at full capacity. A plurality of vent holes 5062 may be formed in lid 5061 to allow the escape of heated air from the canister 5060 created by the decay heat emitted by the SNF stored therein.

The cask 5020 may have a composite wall construction and be comprised of an outer neutron shield cylinder (NSC) 5021 and a concentrically arranged inner gamma blocker cylinder (GBC) 5040 nested therein as shown. Such a construction is shown in commonly owned pending U.S. application Ser. No. 16/434,620 filed Jun. 7, 2019, which is incorporated herein by reference in its entirety. In one embodiment, the inner cylinder may be detachably and removably positioned and inserted inside the outer cylinder. The inner GBC 5040 may have a composite wall construction including an inner cylindrical shell 5047 and outer cylindrical shell 5048 with a gamma blocking liner 5049 interposed and sandwiched therebetween. GBC 5040 defines cavity 5044 of the cask 5020 for holding the nuclear fuel canister 5060. The outer NSC 5021 may similarly have a composite wall construction including an inner cylindrical shell 5033 and outer cylindrical shell 5032 with a neutron attenuation shielding media 5035 sandwiched therebetween. The shells may be formed of a suitable metal of sufficient structural strength and thickness such as without limitation stainless steel for corrosion protection.

A cooling air ventilation annulus 5034 may be formed between the inner and outer cylinders 5040, 5021 of cask 5020 to provide natural convective cooling of the cask and assist with dissipating the heat produced by the decaying nuclear fuel inside canister 5060 in conjunction with the present cask cooling system. An annular lower cooling air inlet opening 5034-2 into the air ventilation annulus 5034 is provided between the cylinders 5040, 5021 at the bottom of the cask to draw and introduce ambient cooling air into the annulus. Similarly, an annular upper cooling air outlet opening 5034-3 is provided between the cylinders at the top of the cask to vent the heated air rising up in annulus 5034 via natural convection to atmosphere.

Although the illustrated cask 5020 is shown as comprising a detachable double cylinder construction with both a neutron attenuation shielding media 5035 and a gamma blocking liner 5049 housed in separate cylinders, the cask cooling system disclosed herein is not limited to such an application alone. According, the cooling system may be used with single cylinder cask constructions having neutron shielding and/or gamma blocking materials embedded between its inner and outer shells without being separable cylinders.

The gamma blocking liner 5049 in GBC 5040 may be preferably constructed of a high density and high thermally conductive metallic material(s) selected and operable to block gamma radiation. Suitable materials which may be used that meet those criteria include steel, lead, or copper as some non-limiting examples. In one embodiment, the liner 5049 may comprise lead. The neutron shielding media 5035 in NSC 5021 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 5035 may be liquid such as water containing boric acid. In either the case of a solid or liquid neutron shielding media, the media may be completely enclosed or encased between the shells.

The bottom end 5023 of neutron shield cylinder 5021 may include a gusseted annular bottom support flange 5026 for support of the NSC and cask 5020 during transport and stiffening of the sidewall 5024 of the cylinder. The flange 5026 may extend radially outwards beyond the outer shell 5032 of the outer NSC 5021 and circumferentially completely around the cask. Vertical gusset plates 5026-1 spaced circumferentially apart around the flange are welded to the top of the flange and adjoining lower portions of the outer/external surface of the cylinder sidewall 5024. In one embodiment, the gusset plates may have a triangular configuration defining an upwardly facing angled edge as shown (see also FIG. 117). The flange 5026 is configured and arranged to engage a platform surrounding a receptacle of a self-propelled wheeled or tracked vertical cask transport vehicle or crawler used to transport the fully loaded cask 20 with loaded fuel canister, GBC, and NSC. Such cask transporters are well known in the art and commercially available from manufacturers such as Enerpac Heavy Lifting Technology and others. When the inner gamma block cylinder 5040 loaded with a fuel canister 5060 is mounted inside the outer NSC 5021, the bottom end of the GBC projects downwards below support flange 5026 into the upwardly open receptacle of the crawler and may not engage any structural surface of the transport vehicle for support. Accordingly, the bottom support flange 5026 of the outer NSC supports the entire weight of the cask 5020 and spent fuel therein.

The cavity 5044 at the bottom end 5042 of GBC 5040 may be closed by a detachable bottom lid 5050. Lid 5050 protrudes vertically downwards below the bottom support flange 5026 and bottom end 5023 of the outer neutron shield cylinder 5021 when the inner gamma block cylinder 5040 is placed therein. The bottom lid 5050 is constructed to support the spent fuel canister 5060 which rests on the planar horizontal top surface of lid, which is of suitable thickness for this purpose without undue deflection from the weight of the canister.

Figure 117:
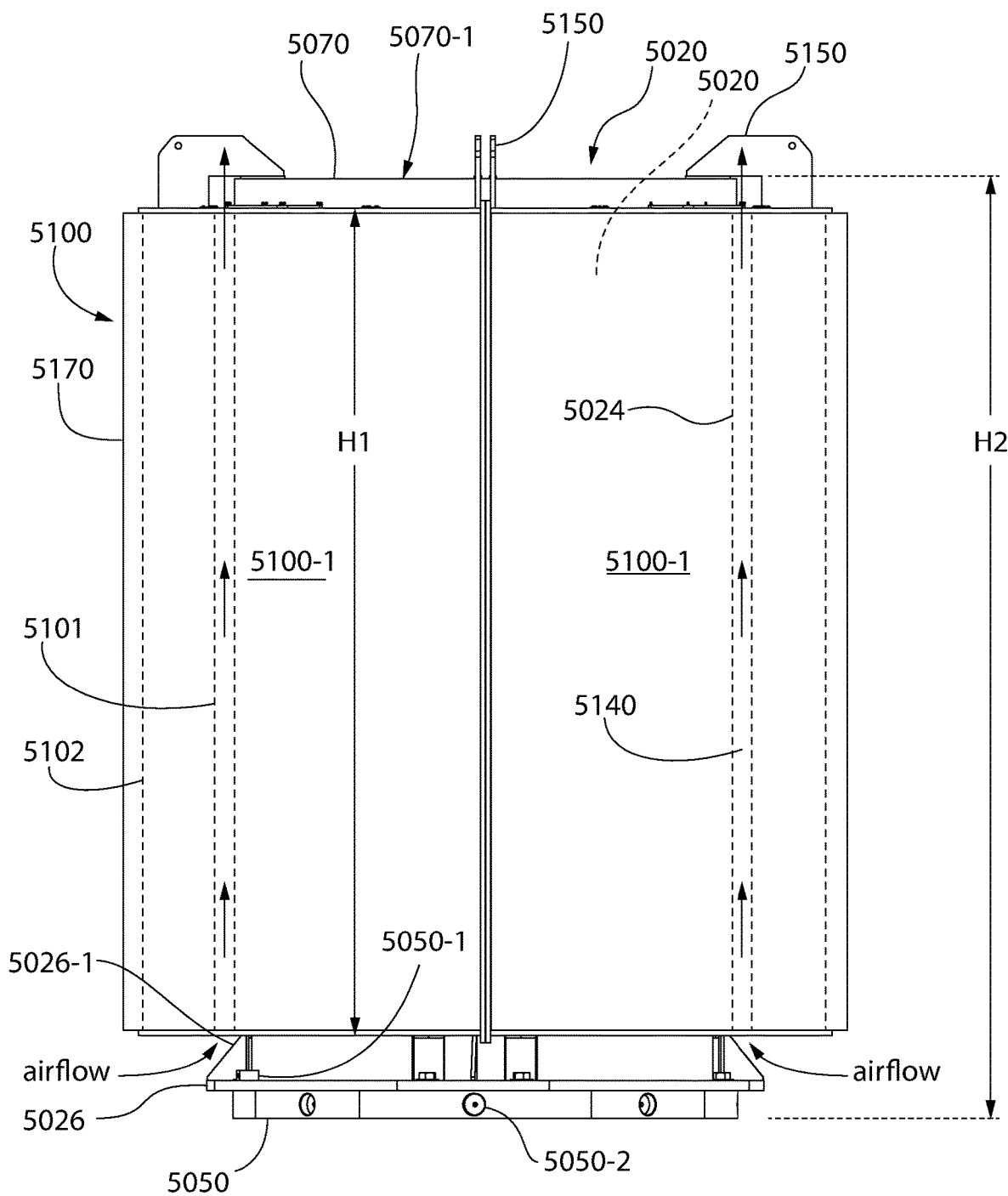

Bottom lid 5050 may be removably coupled to bottom support flange 5026 of NSC 5021 via by suitable fasteners such as threaded fasteners 5050-1 as shown (see, e.g. FIG. 117). In such an arrangement, the lid 5050 may include a plurality of radially open auxiliary air inlets 5050-2 as shown which are in fluid communication with the lower cooling air inlets 5034-2 to introduce ambient cooling air into the internal cooling air ventilation annulus 5034 of the cask 5020. The lid 5050 in this arrangement shown in FIG. 117 may have a diameter larger than the outer shell 48 of the inner GBC 5040. Alternatively, the bottom lid 5050 may be detachably fastened to an annular bottom closure ring 5051 (see, e.g. FIG. 102) on the inner GBC 5040 by suitable fastening means and have a diameter preferably not substantially larger than the outer shell 5048 of the GBC to avoid blocking the lower cooling air inlets 5034-2 (see, e.g. FIG. 102). In this arrangement, the lid 5050 does not require the radial auxiliary air inlets 5050-2. Suitable fasteners include threaded fasteners, interlocking key and key slot arrangements, or other. In either of the foregoing lid construction scenarios, the bottom lid 5050 may be considered detachably coupled to the bottom end of the cask 5020.

Figure 105:
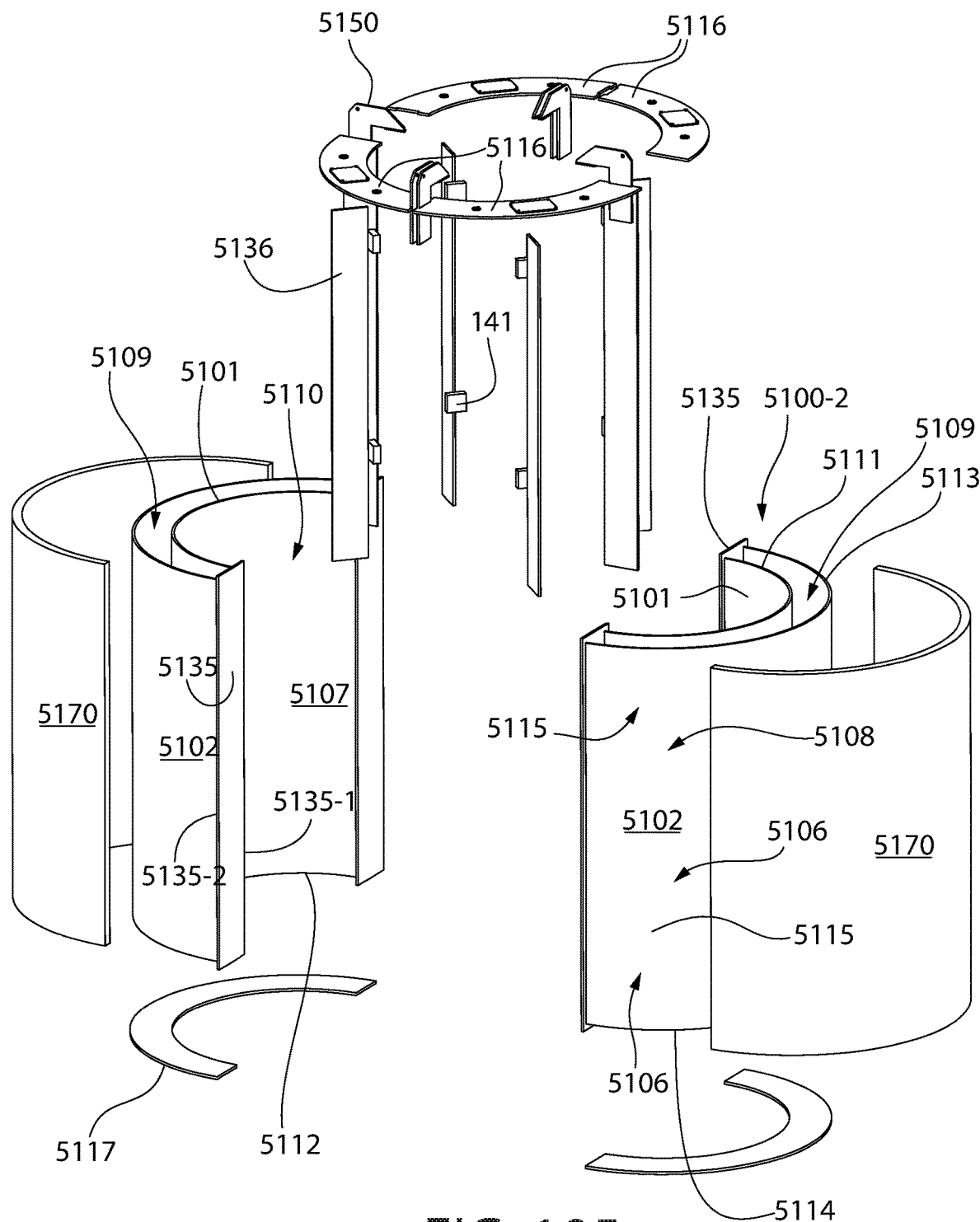
FIG. 105 is an exploded perspective view thereof.
Figure 106:
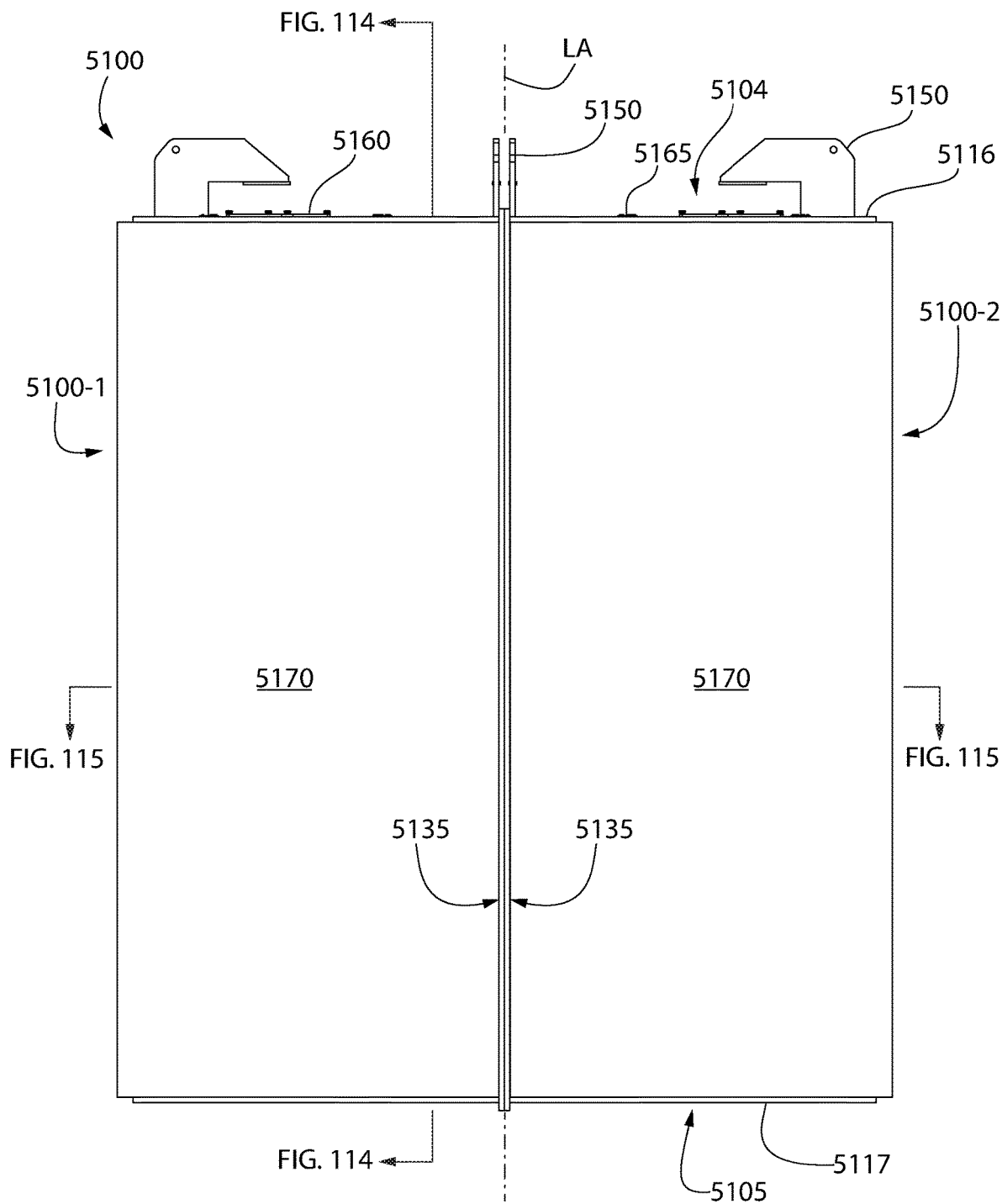
FIG. 106 is a first side view thereof.
Figure 107:
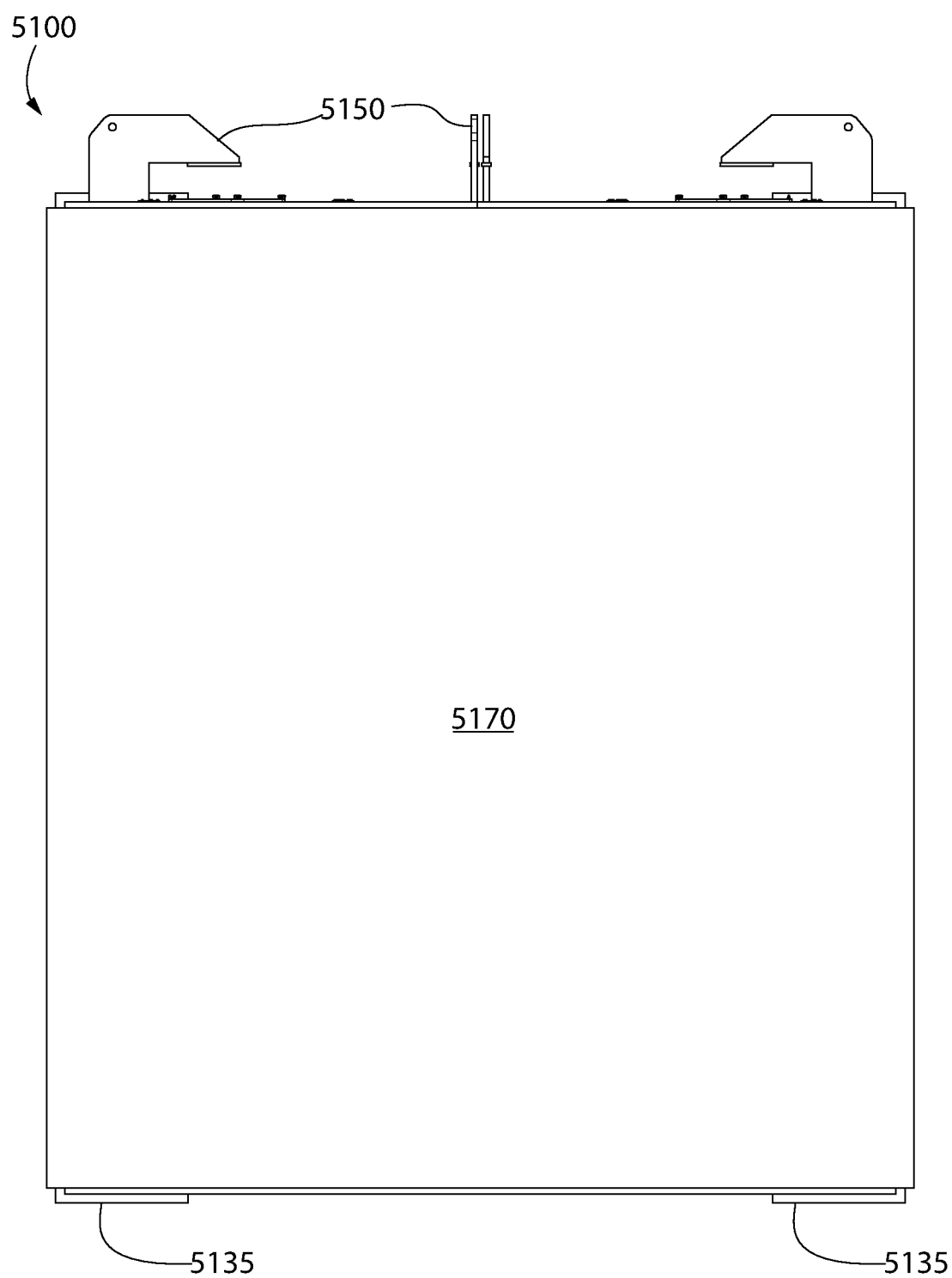
FIG. 107 is a second side view thereof.

With continuing reference generally to FIGS. 101-102 and 116-117, the top end of the inner gamma block cylinder 5040 may be terminated by an annular top mounting flange 5070. Flange 5070 may be considered to define a planar top surface 5070-1 of the cask 5020. Flange 5070 projects radially/laterally outwards beyond the sidewall of gamma blocker cylinder 5040 (GBC) defined by its outer shell 5048 to engage the top flange 5027 of the outer neutron shield cylinder 5021 (NSC) as shown in FIGS. 105 and 106. The GBC mounting flange 5041 is detachably mounted to the NSC annular top flange 5027 by a plurality of mounting fasteners 5071 such as threaded bolts in one non-limiting embodiment, thereby detachably coupling the inner and outer cylinders together (see also FIGS. 104 and 111). Fasteners 5071 extend vertically completely through GBC mounting flange 5070 and engage corresponding upwardly open threaded bores 5072 formed in the NSC top flange 5027. Top mounting flange 5070 may include at least two of lifting lug assemblies 5076 as shown to raise and maneuver the cask 5020.

In the illustrated embodiment, the annular radial top flange 5027 of the outer NSC 5021 may include an upwardly open top recess 5028. Both the top and bottom flanges 5026 and 5027 of NSC 5021 are rigidly coupled to the sidewall 5024 of the neutron shield cylinder 5021 such as via welding. Each flange 5026, 5027 may further protrude radially outward beyond the sidewall defined by outer shell 5032 of NSC 5021 in one non-limiting embodiment.

A system for cooling a container containing SNF such as cask 5020 according to the present disclosure will now be described.

Referring now to FIGS. 103-117, the cooling system generally comprises cooling jacket 5100 having a body comprised of an inner shell 5101 defining an inner surface 5107, an outer shell 5102 defining an outer surface 5108, a top 5104, and a bottom 5105. The inner shell 5101 defines an interior central space 5103 which is configured for receiving the cask 5020 at least partially therein (see, e.g. FIGS. 116-117). Space 5103 has a transverse cross-sectional area configured to hold no more than a single cask. Space 5103 has a diameter (defined by jacket inner shell 5101) larger than the outer diameter of the cask to allow the cooling jacket to be slid over the end of the cask and placed thereon. The interior central space 5103 may have substantially uniform diameter inclusive of the open top and bottom ends of the cooling jacket which open into central space 5103 and form the sleeve-like structure illustrated for surrounding at least the central portions of the cask 5020 holding the heat-emitting SNF canister 5060.

The inner shell 5101 is arranged concentrically to the outer shell 5102 and spaced radially apart defining an internal cooling medium cavity 5109 therebetween configured to hold a cooling medium 5120 which can operate a heat sink to absorb the heat emitted from the cask 5020. The inner shell 5101 includes a top end 5111, bottom end 5112, and cylindrical sidewall 5110 extending between the ends. Similarly, outer shell 5102 includes a top end 5113, bottom end 5114, and cylindrical sidewall 5115 extending between the ends. An annular top closure plate 5116 encloses the top of the cooling medium cavity 5109. Closure plate 5116 defines an upwardly facing top surface 5116-1 which may be substantially planar in one embodiment. An annular bottom closure plate 5117 encloses the bottom of cooling medium cavity 5109 and defines a downward facing substantially planar surface 5117-1 in one embodiment.

The cooling medium cavity 5109 may extend axially/longitudinally along longitudinal axis LA between the top and bottom ends of the shells 5101, 5102. Cavity 5109 may be vertically continuous between the shells without interruption by any intermediate lateral or radial structures. In other possible embodiments, one or more transversely oriented annular partition plates 5118 (represented by dashed lines in FIG. 11) may be provided if it is determined that only a certain vertical portion of the cask 5020 requires cooling and/or to more precisely manage the cooling medium or application thereof to certain portions of the cask. The partition plates divide cavity 5109 into two or more vertically stacked horizontal portions depending on the number of partition plates used. The radial depth D1 of cooling medium cavity 5109 (identified in FIG. 114) of the cooling jacket 5100 is sized to hold a sufficient quantity of dry ice to serve the heat sink function for the desired required duration to cool the cask 5020. In some typical non-limiting embodiments, D1 may be from about and including 12-18 inches.

In one embodiment, the cooling jacket 5100 (inner and outer shells 5101, 5102) may be circular and circumferentially continuous assemblies forming an annular sleeve-like structure. Such a sleeve-like construction may be slipped over the top or bottom ends of the cask 5020 when deployed.

Figure 103:
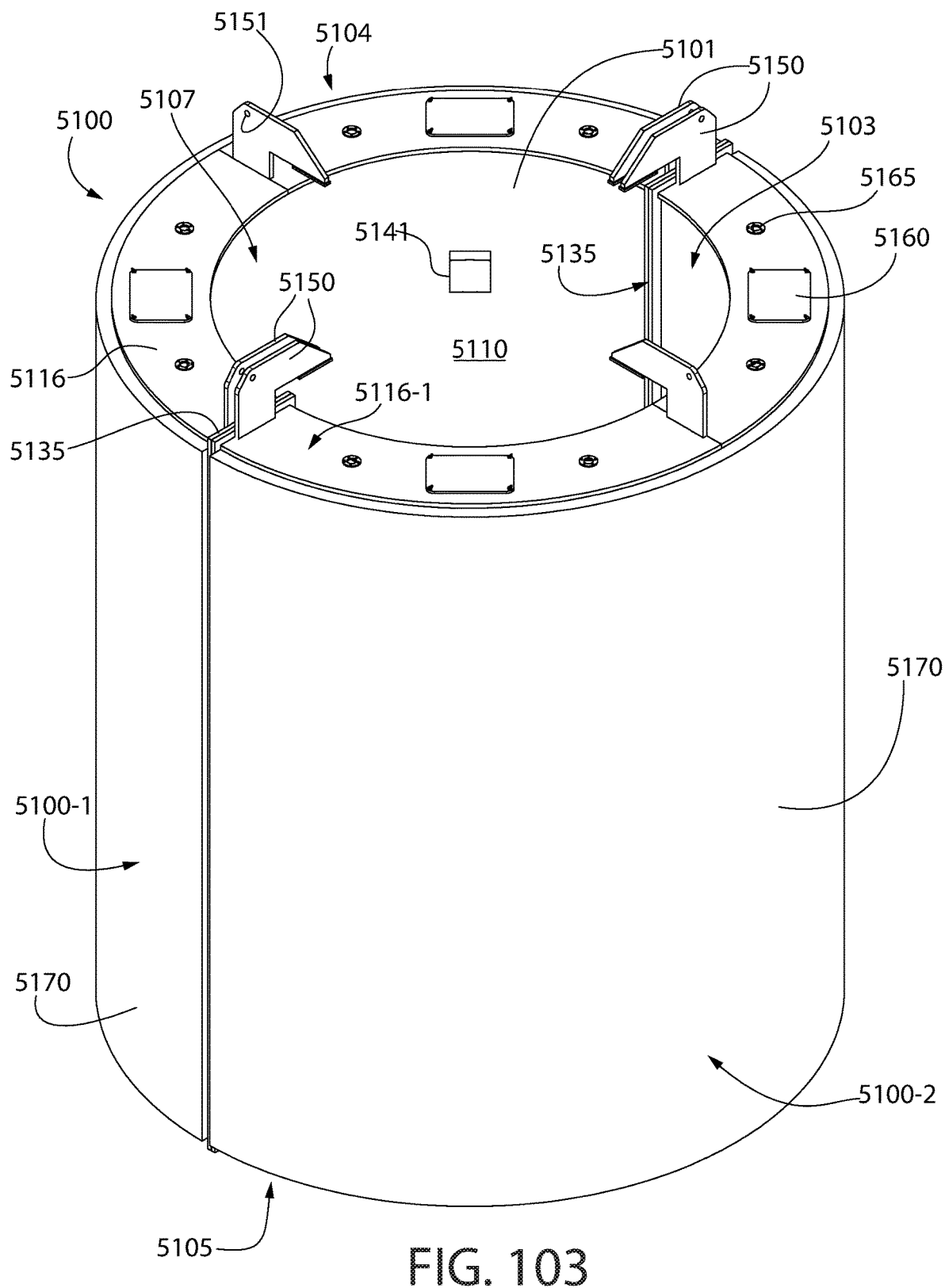
FIG. 103 is a top perspective view of a first embodiment of an external cooling jacket for use with the cask of FIGS. 101 and 102 in a vertical orientation.
Figure 104:
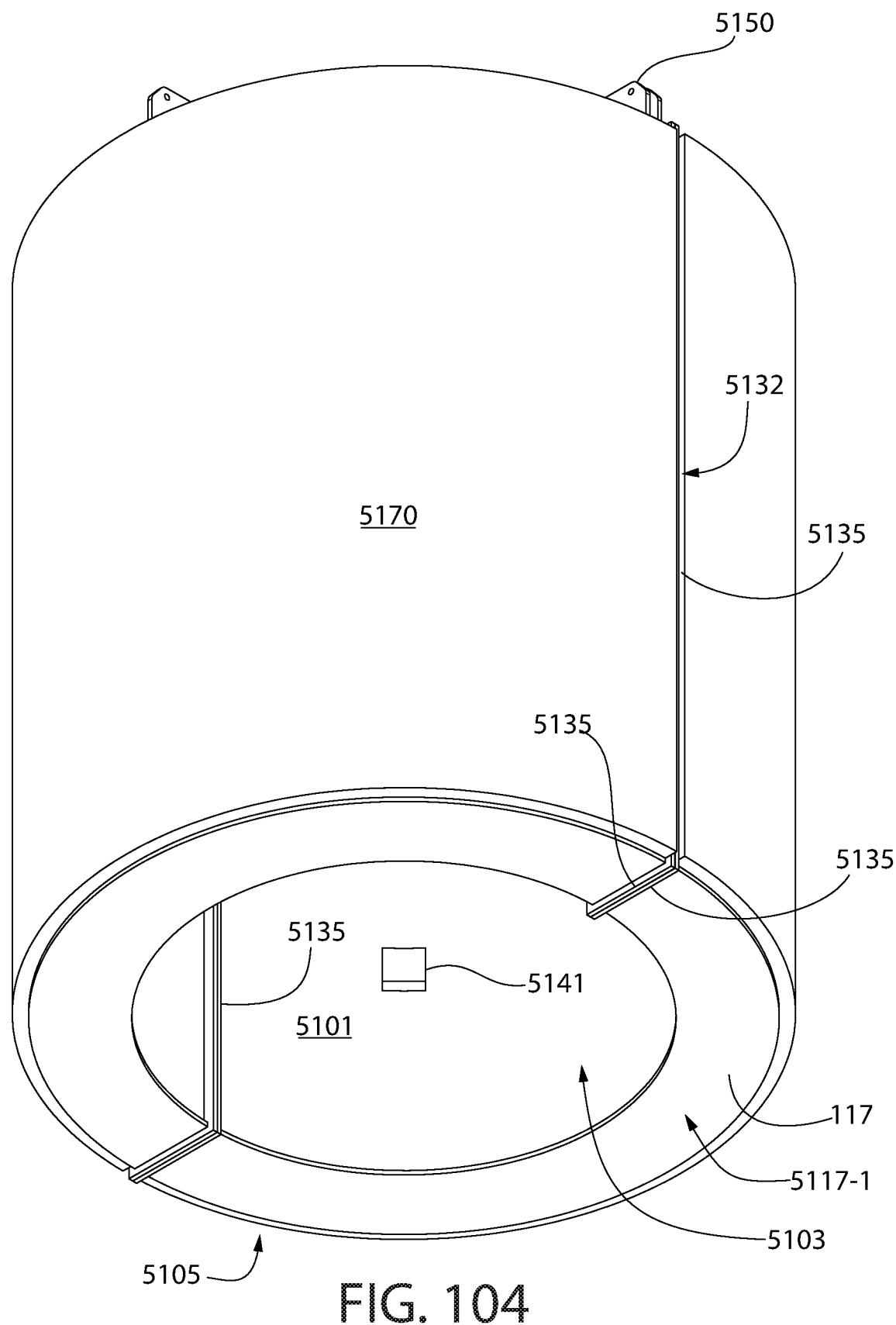
FIG. 104 is a bottom perspective view thereof.

In other possible embodiments, as illustrated herein, the cooling jacket 5100 may be formed by two or more sections or segments 5100-1, 5100-2 which are assembled together (see, e.g. FIGS. 103 and 105). In such a construction, the segments may be provided separately and assembled laterally around the cask 5020 in the field in an abutted arrangement as shown in the figures. The segments 5100-1 and 5100-2 may optionally be then be detachably coupled together once emplaced around the cask by any suitable mechanical fastening means, such as for example without limitation a plurality of angle clips 5130 and threaded fastener sets 5131 (bolts and nuts) spaced longitudinal apart along the height of the cooling jacket at each of the joints 5132 between segments 5100-1 and 5100-2 (shown in dashed lines in FIG. 108). Other detachable fastening means and arrangements may be used and does not limit the invention. Illustrated is only one non-limiting example.

Figure 108:
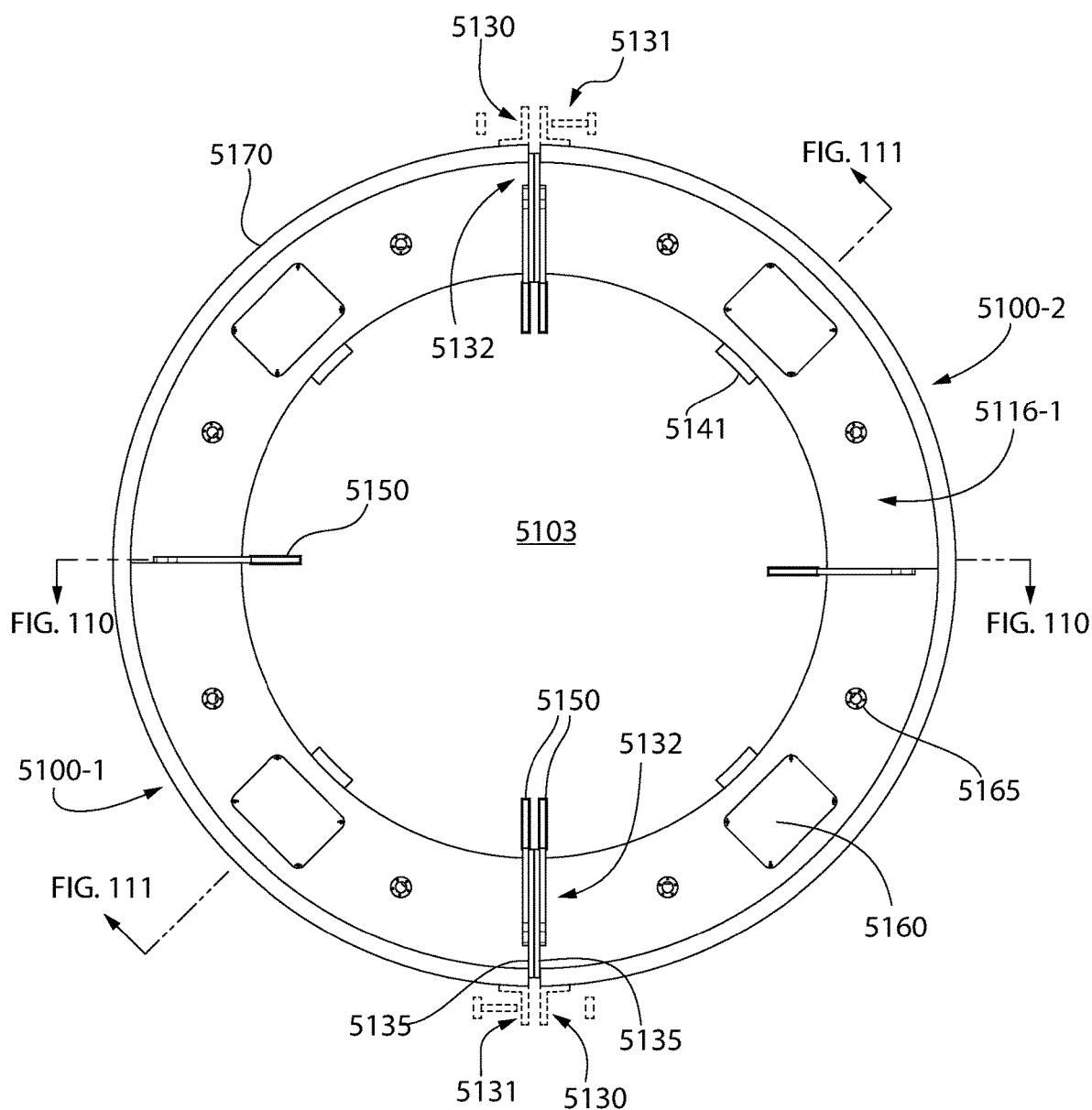
FIG. 108 is a top view thereof.
Figure 109:
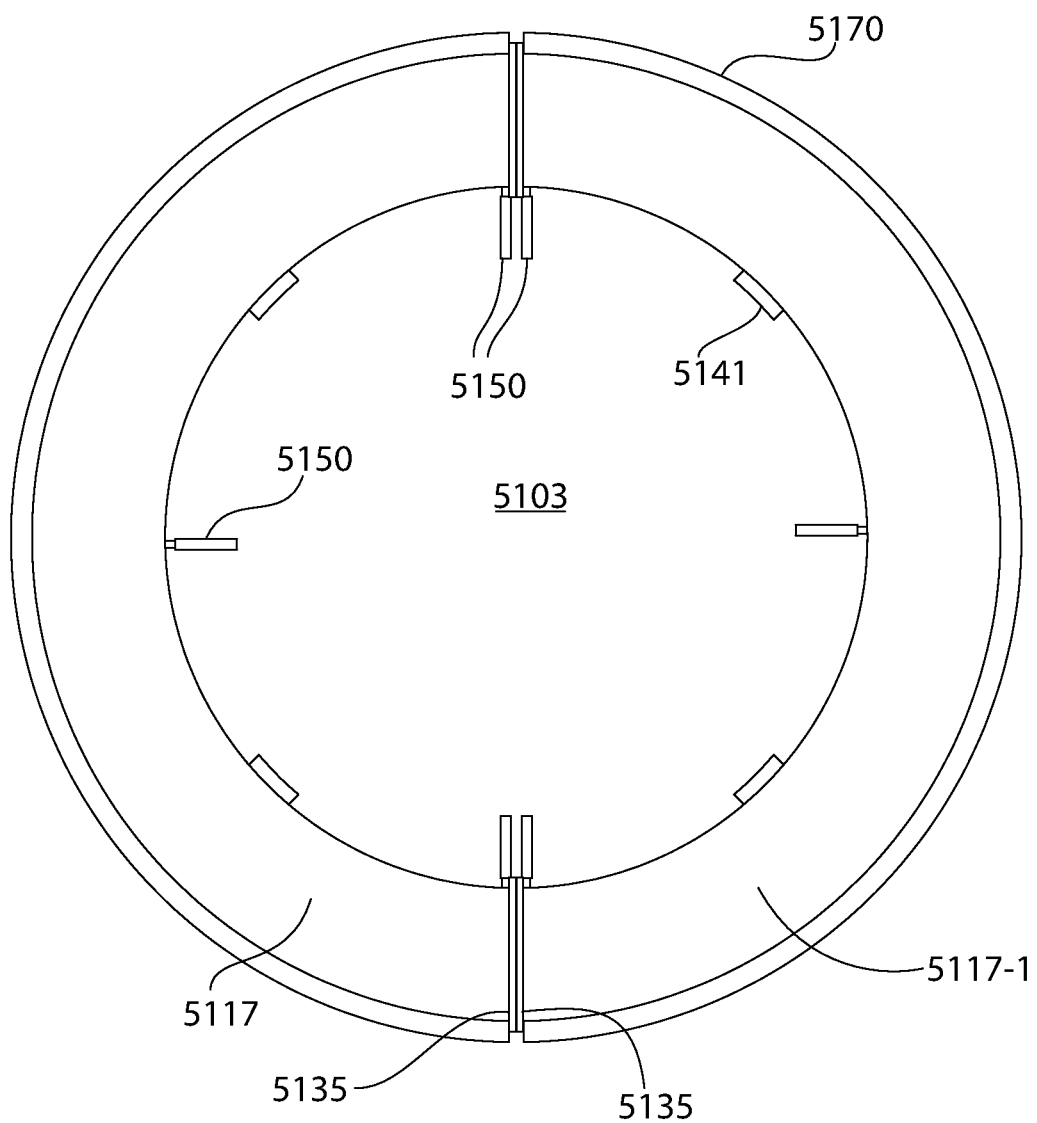
FIG. 109 is a bottom view thereof.
Figure 110:
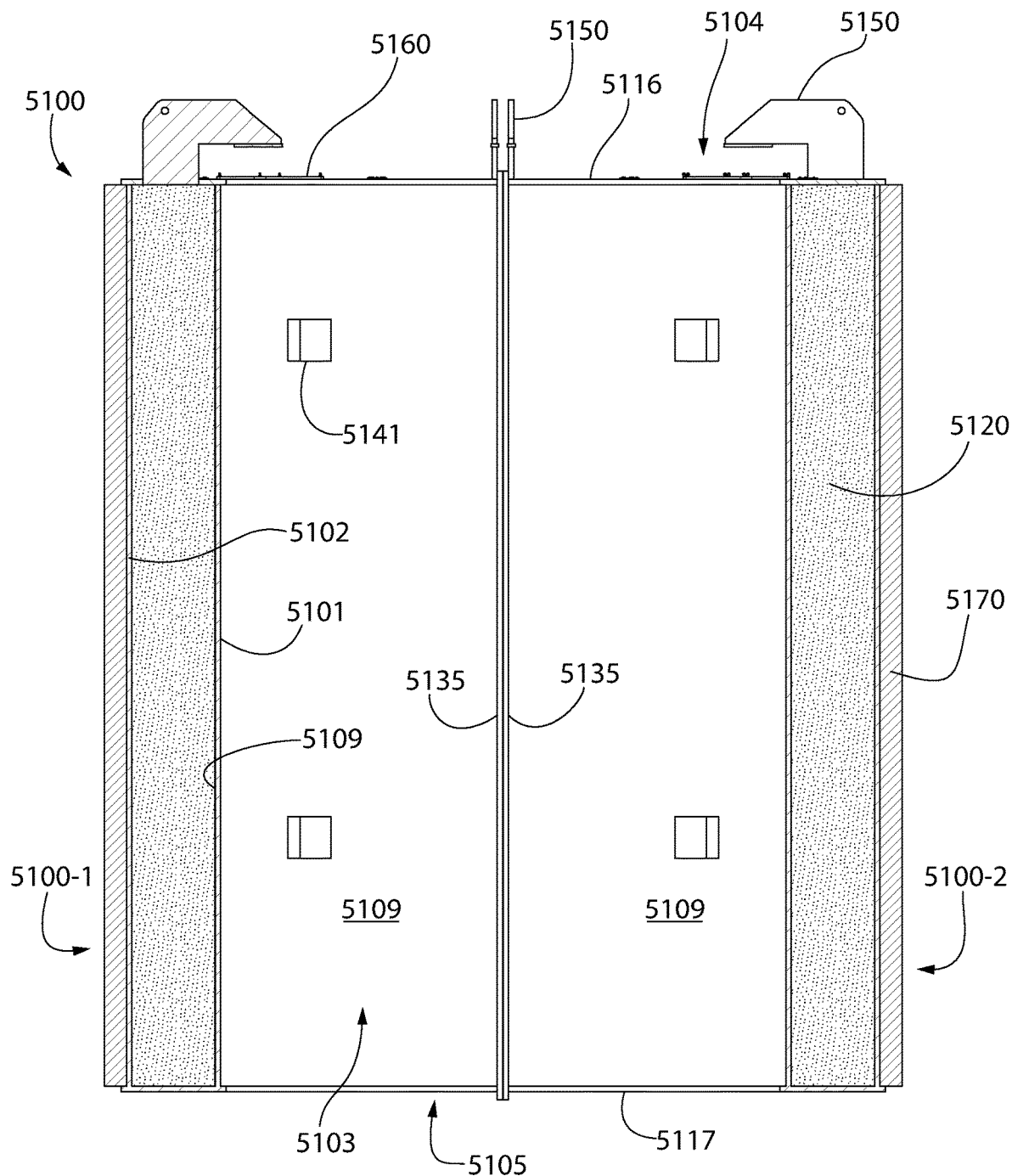
FIG. 110 is a first side cross-sectional view thereof.
Figure 115:
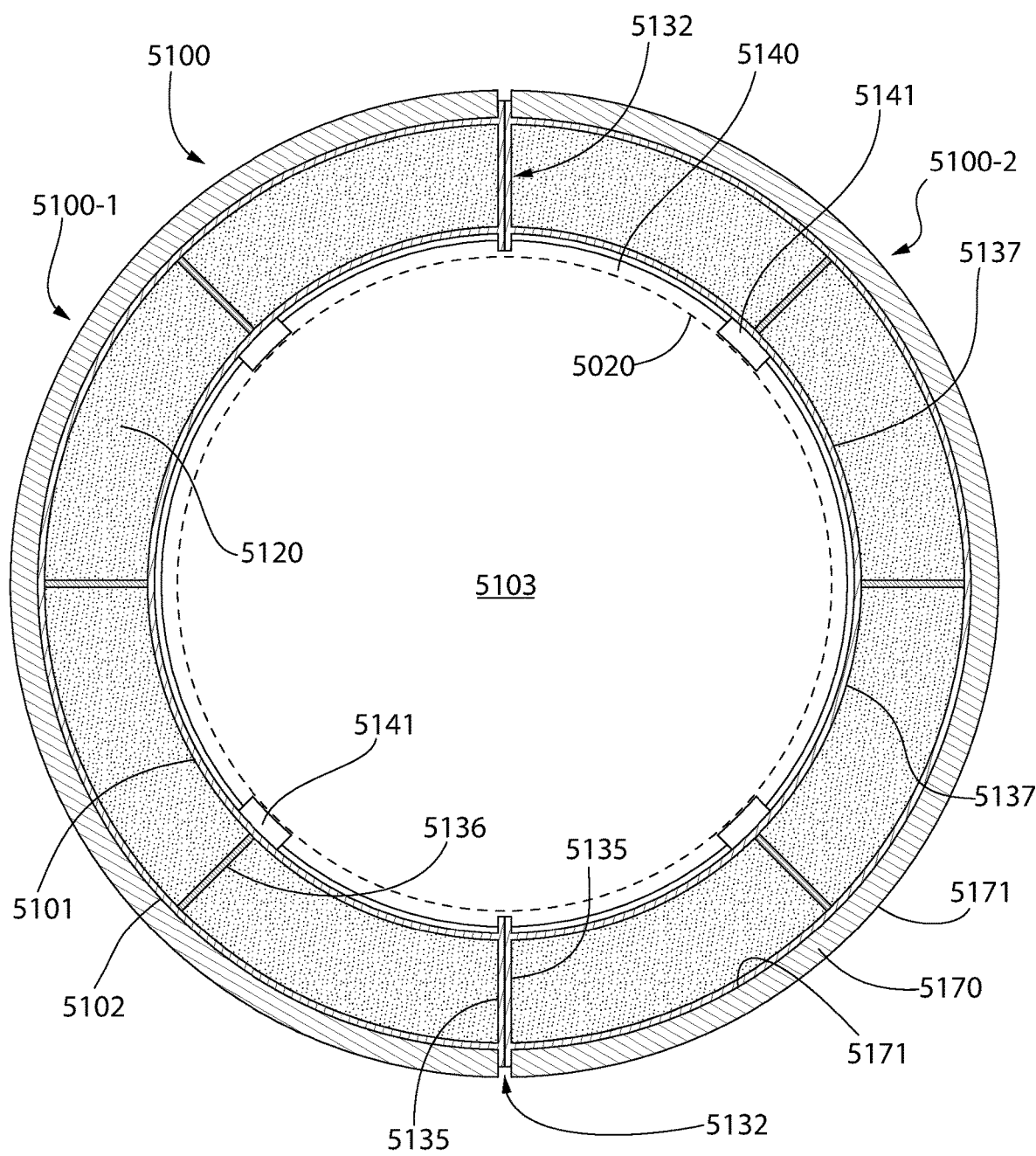
FIG. 115 is a transverse cross-sectional view thereof.

Each cooling jacket segment 5100-1, 5100-2 has an arcuately curved shape (in top plan view, see, e.g. FIGS. 108 and 115, thereby forming an arc portion of a complete circle. Each segment further has a separate top and bottom closure plate 5116, 5117 also having a complementary arc shape.

Where two segments 5100-1 and 5100-2 are provided as shown, each segment has a semi-circular shape forming half of a circle. In other embodiments where more than two cooling jacket segments are provided, each segment will have an arcuately curved shape forming less than half of a circle.

When the cooling jacket 5100 is provided in multiple segments, the opposite side ends of each segment 5100-1, 5100-2 may include a longitudinally elongated end wall plate 5135 to enclose the sides of the cooling medium cavity 5109 of each cooling jacket segment. In the illustrated embodiment, the end wall plates 5135 are vertically oriented and extend radially between the vertically oriented longitudinal ends of the inner and outer shells 5101, 5102 in each cooling jacket segment (see particularly FIG. 105). The inboard vertical longitudinal edges 5135-1 of the end wall plates 5135 may project radially inwards towards the interior central space 5103 of the cooling jacket 5100 beyond the inner surface 5107 of the jacket. Similarly, the outboard vertical longitudinal edges 5135-2 of the end wall plates 5135 may also project radially outwards away from and beyond the outer surface 5108 of the jacket. In other possible embodiments, the longitudinal edges may be flush with the inner and outer surfaces 5107, 5108. In either scenario, the mating end wall plates 5135 of each cooling jacket segment 5100-1, 5100-2 are preferably abutted against each other as shown when the segments encircle the cask 5020 positioned in the interior central space 5103 of the jacket. This forms a continuous external cooling loop surrounding the sides of the cask.

Figure 111:
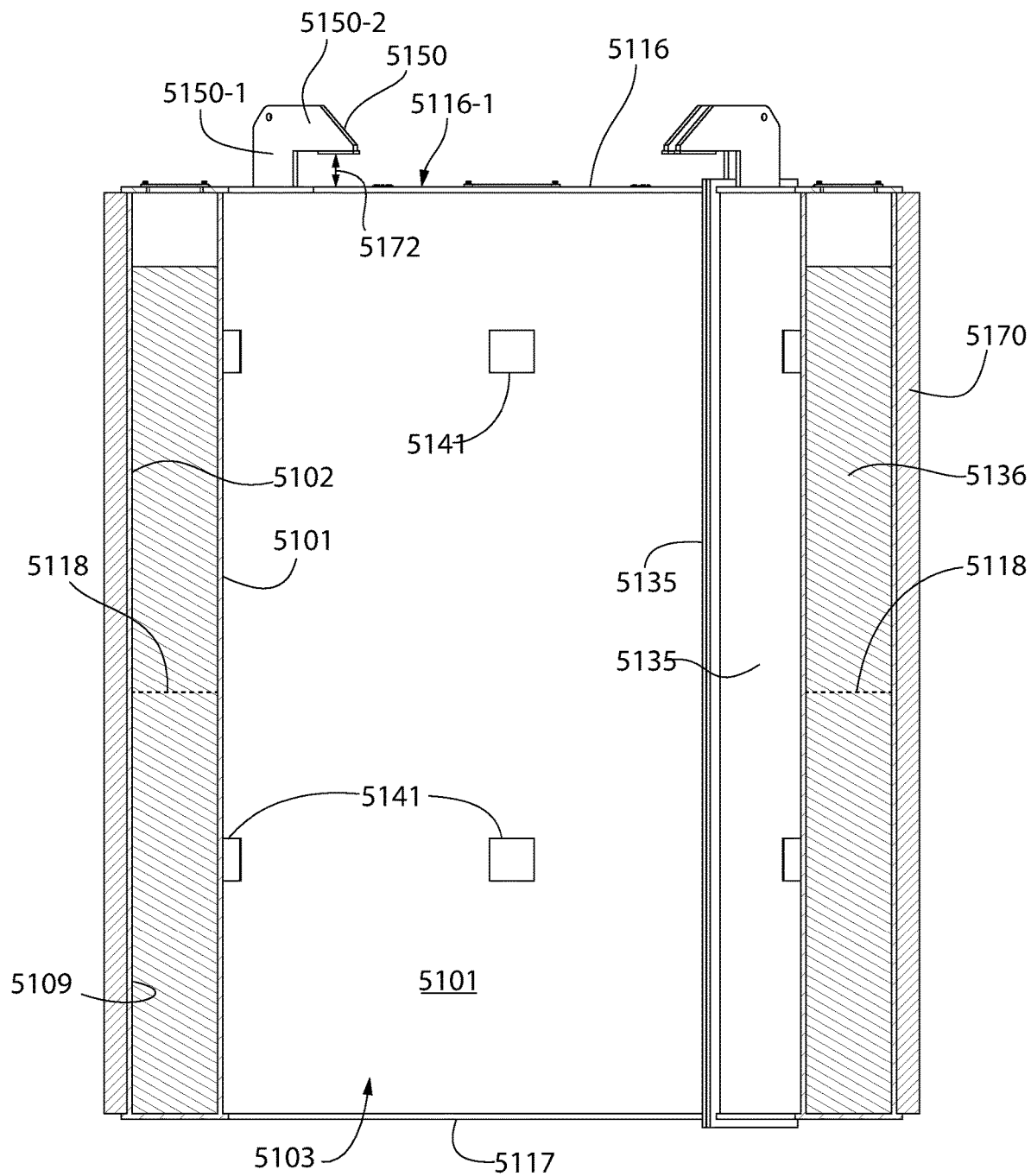
FIG. 111 is a second side cross-sectional view thereof.
Figure 112:
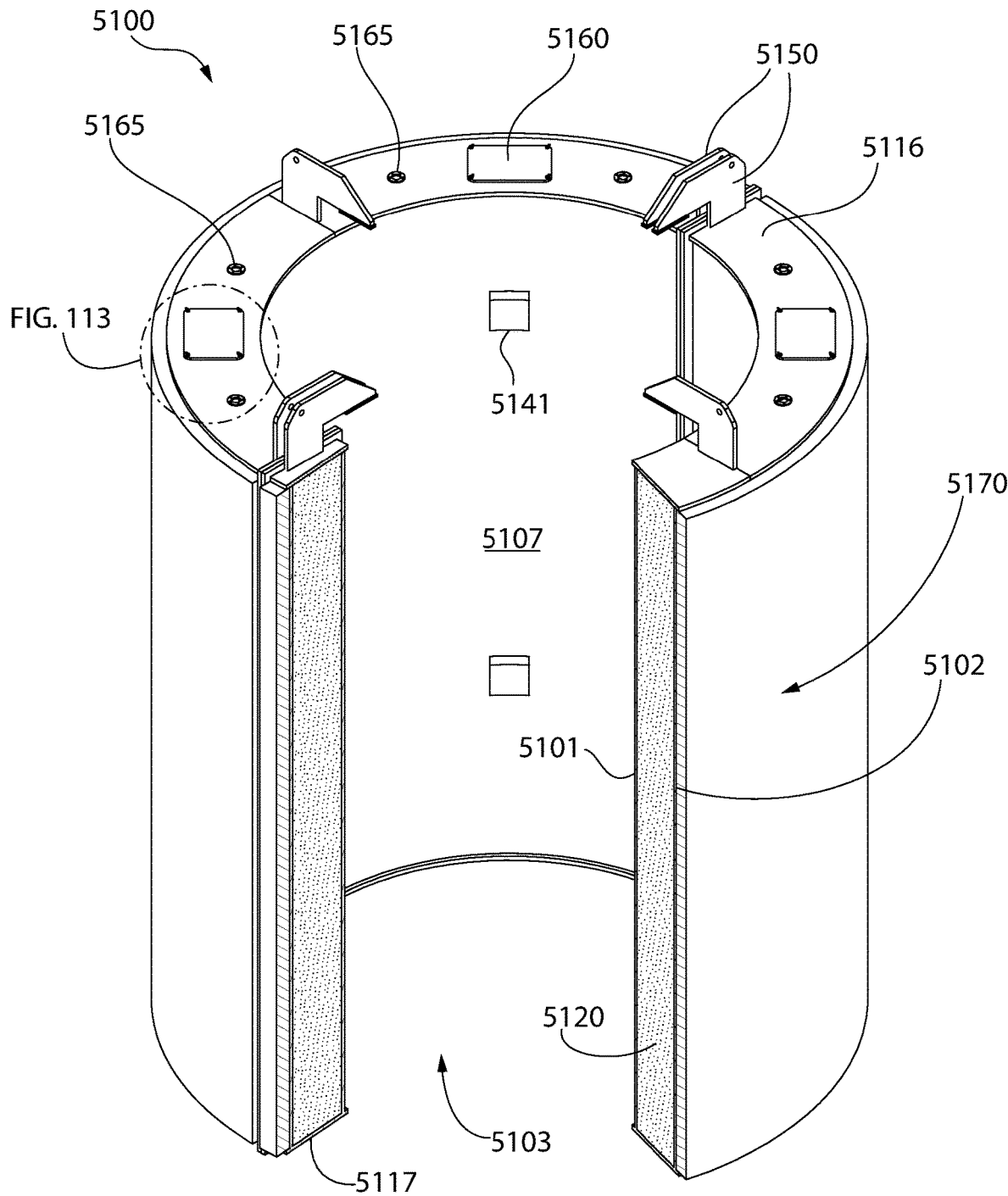
FIG. 112 is a partial cross-sectional perspective view thereof.

In order to further structurally strengthen the cooling jacket 5100 beyond the top and bottom closure plates and end wall plates depending on the diameter and size of the jacket, the jacket may also include a plurality of circumferentially spaced apart longitudinal stiffening plates 5136 arranged in the internal cooling medium cavity of the jacket (see, e.g. FIGS. 105, 111, and 115). Stiffening plates 5136 are vertically oriented when a vertical cask 5020 is used as shown in the presently described embodiment. Stiffening plates 5136 extend in a radial direction between the inner and outer shells 5101, 5102, whether either in the circumferentially continuous construction or segmented construction of the cooling jacket 5100. Stiffening plates 5136 are preferably rigidly attached along their longitudinal edges to the inner and outer shells 5101, 5102 such as via welding, brazing, soldering, fasteners and clips, etc. The method used depends on the selection of metallic material for the inner and outer shells.

The stiffening plates 5136 may extend for a majority of the height of the inner and outer shells 5101, 5102, and preferably in the illustrated embodiment for more than ¾ the height of the shells as shown in FIG. 111. In the illustrated embodiment, the stiffening plates 5136 are rigidly attached to bottom closure plate 5117 and have a height 90% or more of the height of cooling jacket 5100 and is unattached to the top closure plate 5116. This forms an upper plenum area beneath top closure plate 5116 and the top edges of the stiffening plates 5136 for collecting the accumulating $CO_2$ gas from sublimation of the dry ice in cooling jacket cavity 5109. In some embodiments (not shown), the stiffening plates may extend for the entire height of the shell to divide the internal cooling medium cavity 5103 into a plurality of isolated cooling compartments 5137 each configured for holding the cooling medium 5120. Stiffening plates 5136 may be rigidly attached to the bottom closure plate 5117 by any of the above example methods. Where stiffening plates 5136 extend for the full height of the shells 5101, 5102 and cooling medium cavity 5109, the plates may also be rigidly attached to top closure plate 5116 in a similar manner.

When cask 5020 is placed inside the interior central space 5103 of cooling jacket 5100, an annular radial interstitial space 5140 is formed between the inner shell 5101 of the cooling jacket and cask (see, e.g. FIG. 115 (cask represented by dashed circle). The interstitial space 5140 is pre-determined and preset to achieve the desired air temperature in the interstitial space for cooling the cask. A typical range for the interstitial space 5140 may be about 1 inch to about 6 inches; however, different size or depth interstitial spaces 5140 may be used as desired.

The cooling jacket 5100 may be maintained at a pre-set distance or spacing for interstitial space 5140 from the external side surface of the cask by a plurality of radial spacers 5141. The spacers 5141 advantageously center the cask in the central space 5103 of cooling jacket 5100 and maintain a relatively uniform annular interstitial gap between the cask and jacket. Spacers 5141 are circumferentially spaced apart around and rigidly attached to the inner surface 5107 of the cooling jacket 5100 (defined by inner shell 5101). An array of spacers preferably are provided in at least two elevations; one in the upper half and one in the lower half of the cooling jacket (see, e.g. FIG. 111).

In one embodiment, the spacers 5141 may be in the form of metallic pads or blocks which are rigidly affixed to inner surface 5107 of inner shell 5101 by welding, brazing, soldering, fasteners, or other methods depending on the material used for the inner shell. Spacers 5141 may be about 1 inch to about 6 inches in the radial dimension depending on the radial depth of the interstitial space 5140 desired between the cask 5020 and cooling jacket 5100. The spacers 5141 have a height and width which is no greater than about 6 inches to form pads/blocks which are not continuous either circumferentially or longitudinally on the inner surface 5107 of the cooling jacket 5100 as shown (see, e.g. FIGS. 103-105 and 110 as examples). Accordingly, the spacers 5141 do not have continuous longitudinal portions which extend between both the upper and lower halves of the cooling jacket. In some embodiments, the spacers may be optionally omitted albeit they are preferred to facilitate proper placement of the cooling jacket and a uniform interstitial space around the cask for even cooling.

It bears noting that in other possible embodiments, the cooling jacket segments 5100-1, 5100-2 may simply be positioned around the cask 5020 without fastening to each other. In yet other embodiments, the two cooling jacket segments 5100-1, 5100-2 may be detachably or permanently secured together (e.g. via welding, brazing, etc.) in the fabrication shop before shipment to work site. Because typical storage/transfer casks are larger structures in height and diameter, the segmented cooling jacket design advantageously allows easier handling and deployment of the cooling jacket at the work site.

Cooling jacket 5100 preferably has a height that covers a majority of the height of the body of the cask 5020 as best shown in FIG. 117. In one embodiment jacket 5100 has a height H1 which is greater than at least 75% of the height H2 of the cask, and in one embodiment preferably greater than 85% of H2. This ensures effective external cooling of the heat-emitting cask.

Figure 116:
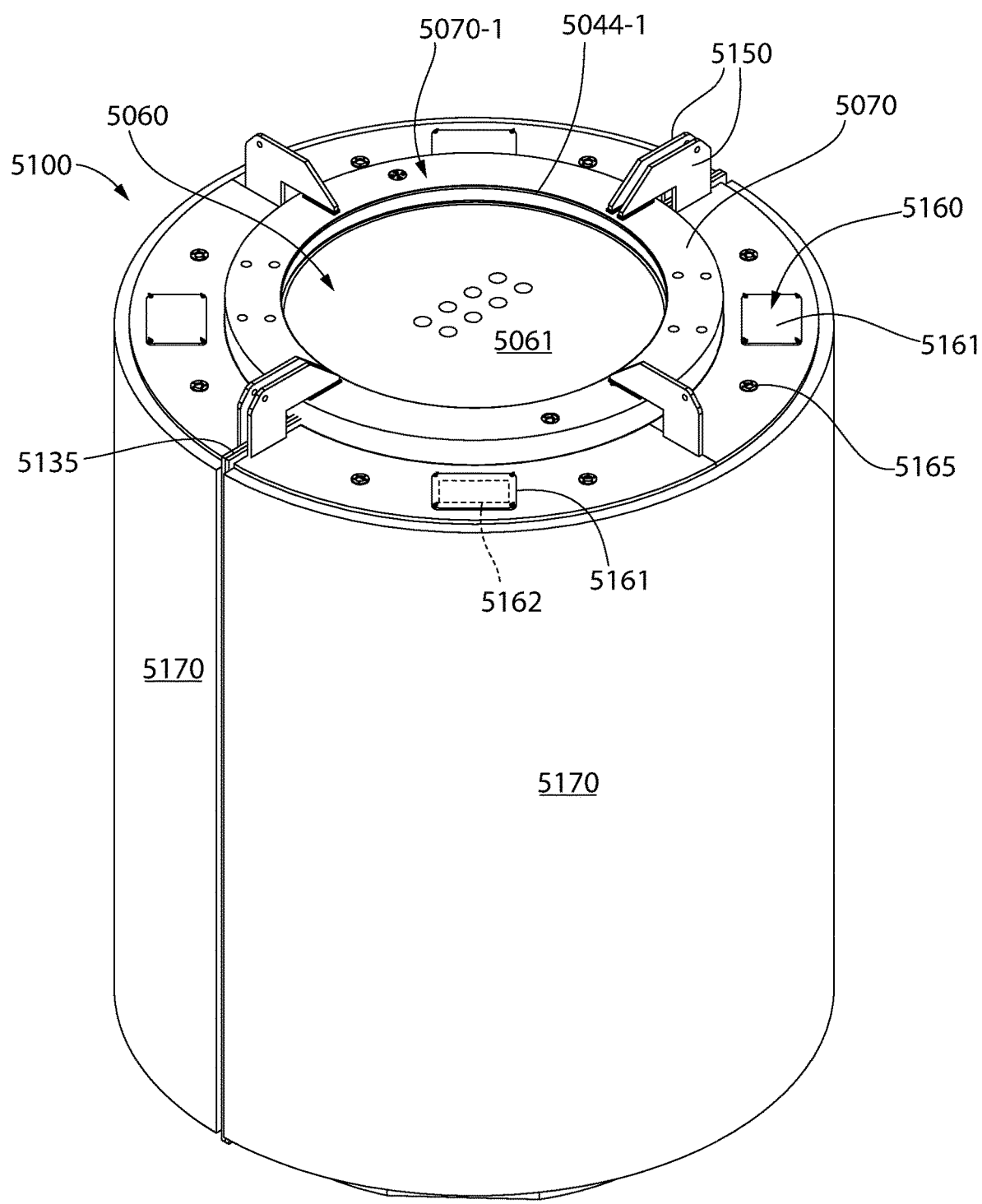
FIG. 116 is perspective view showing the cooling jacket of FIG. 103 installed on the cask of FIG. 101.

Cooling jacket 5100 may be detachably mounted to and supported entirely by the cask 5020 as shown in FIGS. 116-117. With additional reference to FIGS. 101-112, the cooling jacket may include a plurality of metallic mounting hangers 5150 rigidly attached to the top of the cooling jacket. Hangers 5150 are circumferentially spaced apart around the top closure plate 5116 at the top periphery of the cooling jacket.

In one embodiment, the hangers 5150 may comprise L-shaped brackets as shown which include a vertical section 5150-1 rigidly/fixedly attached at a bottom end to a top surface 5116-1 of the top annular closure plate 5116, and a horizontal section 5150-2 extending perpendicularly and radially inwards to engage a peripheral portion of the top of the cask such as top surface 5070-1 in one embodiment. The bottom edge of horizontal section 5150-2 may engage top surface 5070-1 of cask 5020 as shown. The horizontal section 5150-2 may be elevated above and separated from top surface 5116-1 of cooling jacket 5100 by a vertical gap 5172. This positions the top closure plate 5116 of cooling jacket 5100 below the top surface 5070-1 of the cask top mounting flange 5070. In one embodiment, hangers 5150 may include a rigging hole 5151 for use in lifting and maneuvering the cooling jacket 5100 into position about the cask. In one embodiment, hangers 5150 may be welded, brazed, soldered, mechanically fastened, or otherwise fixedly attached to top closure plate 5116 of the cooling jacket by any suitable means to provide a rigid coupling. Threaded fasteners may be used embodiments particularly if the metal composition of hangers 5150 is dissimilar to the metal used to form the top closure plate 5116 which may involve more complex dissimilar welding. In some embodiments, the hangers 5150 may be welded, brazed, soldered, or mechanically fastened to the sides of the stiffening plates 5136 and/or end plates 5135 for added reinforcement and rigidity. In a non-limiting preferred embodiment, at least four hangers 5150 are provided; however, more or less may be provided as needed depending on the weight of cooling jacket 5100 and diameter of the cask 5020.

FIGS. 116-117 show the mounted position of the cooling jacket 5100 on cask 5020. The hangers 5150 in one embodiment may support the cooling jacket 5100 from the cask 5020 in a suspended manner as shown. The top mounting flange 5070 of cask 5020 is at least partially exposed or fully exposed and protrudes above the top closure plate 5116 of the cooling jacket. This is because the flange does not require cooling as the nuclear fuel canister 5060 is position below the flange inside the cask. The cooling jacket 5100 does not extend to the bottom of the cask as shown. The bottom closure plate 5117 of cooling jacket 5100 is elevated above the bottom lid 5050 and bottom flange 5026 of the cask 5020. Where gusset plates 5026-1 are provided with the bottom flange 5026, the bottom closure plate 5117 of the cooling jacket may at least partially engage the angled gusset plates in some embodiments which helps center the bottom of the cooling jacket about the cask 5020. Termination of the cooling jacket 5100 above the bottom lid and bottom flange of cask 5020 avoids interference with the natural cooling air flow which cools the cask internally as previously described herein.

In one embodiment as shown, the peripherally mounted hangers 5150 on cooling jacket 5100 do not extend radially inwards beyond the inner edge of the cask top mounting flange 5070. This advantageously avoids interference with top central opening 5044-1 defined by the mounting flange which leads into cavity 5044 of cask 5020 and through which the nuclear fuel canister 5060 may be inserted into or removed from the cask while the cooling jacket 5100 remains in place.

It bears noting that when the cooling jacket 5100 is placed around the cask 5020 (or another nuclear fuel container such as a canister previously described herein), the cooling jacket is not sealed at its top or bottom to the cask. Accordingly, the interstitial space 5140 between the cask and cooling jacket is at least partially open to atmosphere and may be configured to form a ventilation annulus through which ambient cooling air flows to further enhance cooling the cask in addition to the cooling jacket 5100. FIG. 117 shows such a convectively cooled cask and cooling jacket arrangement, which is external to the cask and not to confused with any internal cooling air flow inside the cask. As shown by the directional flow arrows, ambient cooling air is drawn into the annular interstitial space 5140 at the bottom of the cooling jacket 5100, and is heated by cask, creating an upward air flow via natural thermosiphon circulation and exits the top of the interstitial space. This cooling air provision advantageously continues to cool the cask 5020 even after the reserve of dry ice inside cooling jacket 5100 is depleted. This provides time for the dry ice to be replenished by the operator if necessary.

Figure 113:
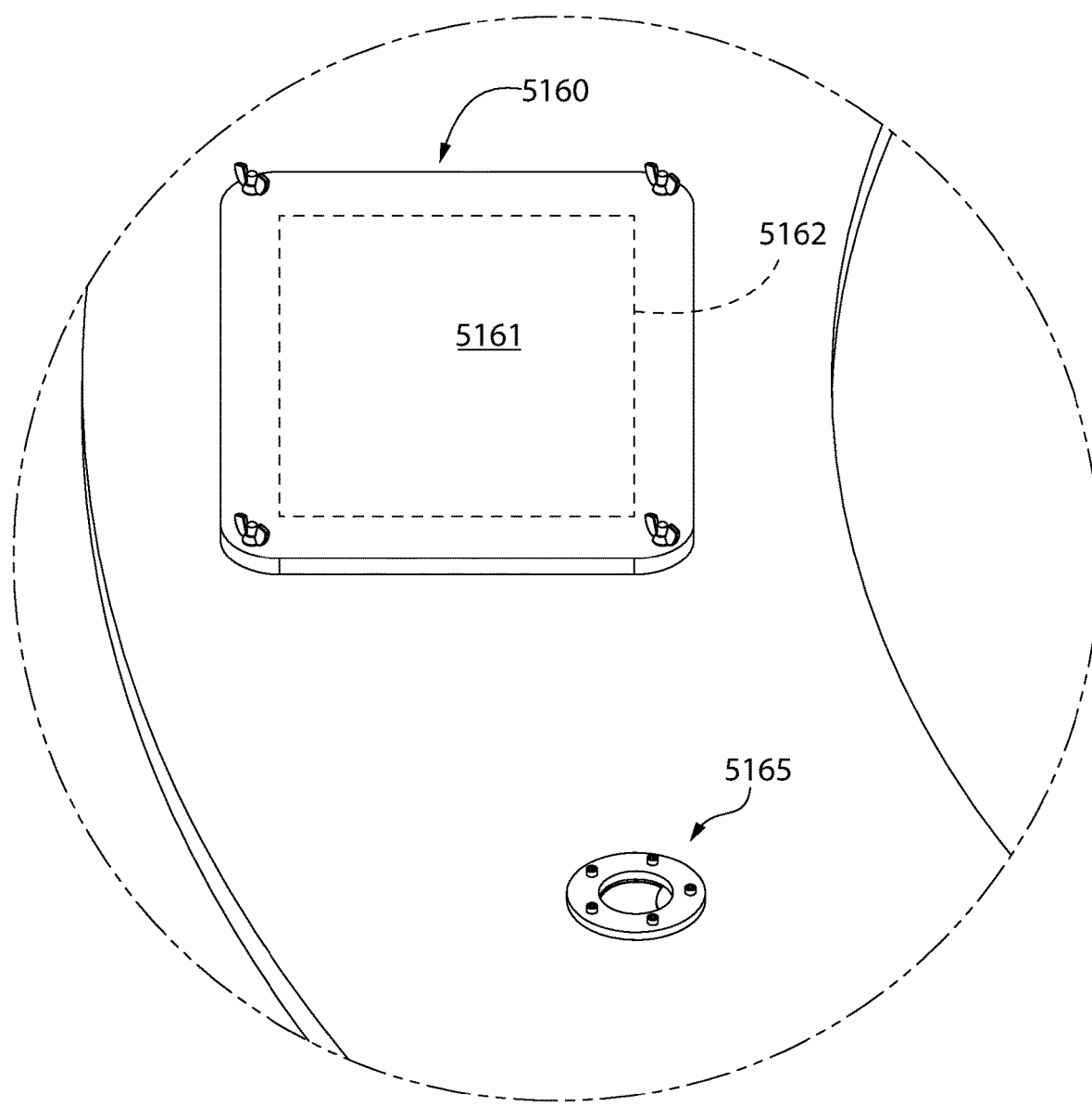
FIG. 113 is an enlarged detail from FIG. 112.
Figure 114:
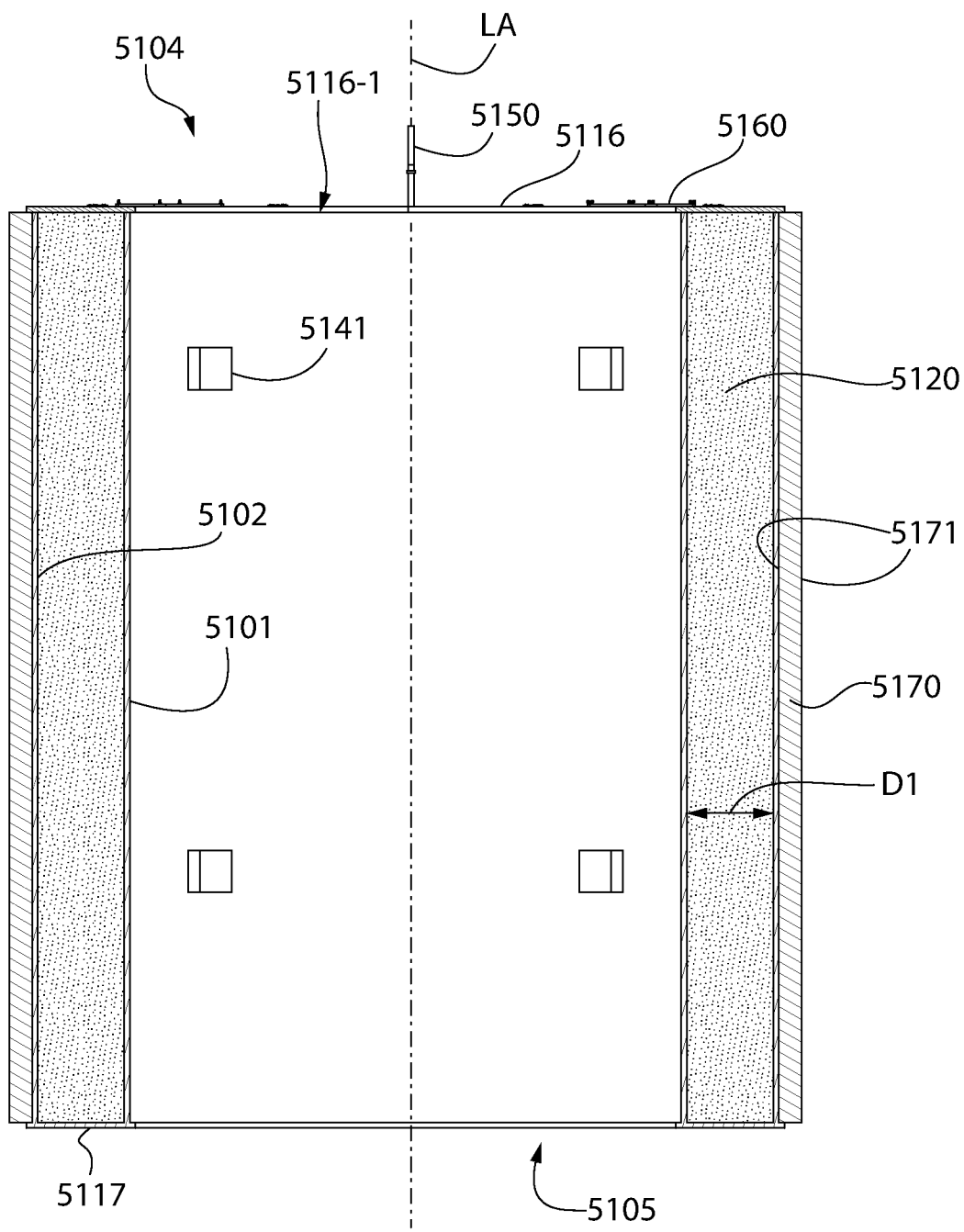
FIG. 114 is third side cross-sectional view of the cooling jacket of FIG. 103.

According to another aspect, the top closure plate 5116 of cooling jacket 5100 may include a plurality of openable and closeable access hatches 5160 for filling the inter-shell cooling medium cavity 5109 of the cooling jacket with the cooling medium 5120. Each hatch 5160 includes a removable hatch cover plate 5161 which covers a hatch opening 5162 below (see, e.g. FIGS. 113 and 116 showing opening 5162 in dashed lines). Any mechanical means may be used to secure each hatch cover plate 5161 to the top closure plate 5116 of cooling jacket 5100, such as threaded fasteners (bolts and wing nuts as shown, bolts and conventional nuts, clips, etc.) as one non-limiting example. In some embodiments, the hatch cover plates 5161 may be hingedly mounted to the closure plate 5116. Where vertical stiffening plates 5136 are provided in the inter-shell cavity 5109 of the cooling jacket, an access hatch 5160 is provided between each stiffening plate and an adjacent stiffening plate or end plate 5135. This allows each compartment within the jacket 5100 to receive cooling medium 5120.

The cooling medium 5120 has a temperature lower than the heated spent nuclear fuel storage/transport cask 5020, and preferably lower than the ambient environment. This forms a heat sink in the cooling jacket 5100. The energy balance therefore causes the heat to flow and transfer from the higher temperature cask radially outwards to the lower temperature heat sink formed in the cooling jacket 5100 by the cooling medium.

The cooling medium 5120 is preferably a sublimating cooling medium at normal atmospheric pressure conditions (i.e. 14.7 PSIA equivalent to 1 bar or atmosphere) and normal temperature (68 degrees F.—Fahrenheit) per the normal pressure and temperature (NPT) standard set by the National Institute of Standards and Technology (NIST). Accordingly, one preferred but non-limiting cooling medium used in cooling jacket 5100 may be a solid substance having a triple point occurring at a pressure which is greater than normal atmospheric pressure such that the cooling medium sublimates at lower normal atmospheric pressure inside the cooling jacket and changes phase directly from a solid phase (which is easily handled and filled into the cooling medium cavity 5109 of cooling jacket 5100) to a gaseous phase. In chemistry, the triple point is the temperature and associated pressure at which solid, liquid, and vapor phases of a particular substance coexist in equilibrium. The triple point corresponds to the lowest pressure at which a substance can exist as a liquid. Below that triple point pressure (or alternative temperature), a stable liquid phase cannot be maintained. Sublimation is the change in phase from the solid phase directly to the gaseous phase without passing through an intermediate liquid phase at pressures below the triple point pressure. Accordingly, this "heat absorbing" sublimating endothermic phase change happens at either temperatures or pressures below the triple point of the substance. Heat absorbed by the sublimating cooling medium from the cask 5020 via the endothermic reaction forms the heat sink with the internal cavity 5109 of cooling jacket 5100.

In one embodiment, as previously noted herein, the sublimating cooling medium 5120 meeting the foregoing criteria may preferably be dry ice. The dry ice may be provided in any suitable solid form, such as for example without limitation pellets or blocks. Dry ice is solid carbon dioxide ($CO_2$), which turns to gaseous $CO_2$ at the NPT atmospheric pressure and temperature standard conditions via the process of sublimation. In fact, dry ice will sublimate at normal atmospheric pressure over a wide range of temperatures from −200 to 260 degrees F. The dry ice may partially or completely fill the cavity depending on the amount of cooling required. Where dry ice is used, the top closure plate 5116 of cooling jacket 5100 further includes at least one vent 5165 in fluid communication with the internal inter-shell cooling medium cavity 5109 of the cooling jacket to vent the gaseous $CO_2$. The vent 5165 ensures that the cooling medium cavity 5109 remains at atmospheric pressure, and is therefore not pressurized in any manner. In one embodiment, a plurality of vents 5165 circumferentially spaced apart around and through the top closure plate 5116 may be provided to ensure adequate venting of the gaseous carbon dioxide to atmosphere from the cooling jacket internal cavity 5109 which is created by sublimation of the dry ice when heated by the cask. The vents 5165 may be holes or slots of any suitable shape and dimension to adequately vent the accumulating carbon dioxide from cavity 5109. Where cooling jacket cavity 5109 is divided into multiple cooling compartments 5137 by the stiffening plates 5136 as previously described herein, each compartment preferably has at least one vent 5165.

In some circumstances and embodiments, other non-sublimating cooling mediums may be used in conjunction with cooling jacket 5100 which can sublimate at NPT conditions. In other possible embodiments, for example, the cooling medium cavity 5109 of the cooling jacket may be filled with conventional water ice if dry ice (solid $CO_2$) is not readily available or required. The solid ice when heated may melt into liquid water and/or sublimate at NPT conditions. Drainage holes may be provided in the cooling jacket to release the water produced by the melting ice. In yet other embodiments, chilled cooling water or liquid refrigerant (e.g. ethylene glycol) may be circulated through the internal cavity 5109 of the cooling jacket via a motorized pump and commercial chiller in a closed flow cooling loop piping circuit. Such cooling circuits are well known in the art. These alternative cooling mediums to dry ice, albeit less efficient at removal of heat from the nuclear fuel cask 5020, may be suitable if the cooling demands of the cask 5020 are not severe. The cooling jacket 5100 preferably is not designed for air cooling, but can be adapted for such use if needed by adding multiple air inlet holes to the bottom closure plate 5117.

To prevent the cooling medium 5120 (e.g. dry ice) from absorbing excessive heat from the external ambient environment around the cooling jacket 5100, an external insulation jacket 5170 may be provided which extends completely around the cooling jacket (see, e.g. FIGS. 105, 111, 112, and 115). The insulation jacket 5170 may be secured to the outer surface 5108 of the cooling jacket defined by outer shell 5102 by any suitable means standardly used to apply insulation to an object. The insulation jacket 5170 may have a single continuous annular construction, or may be provided in two or more arcuately curved sections which can be abutted along longitudinal seams as shown to match the outer circumference of the cooling jacket 5100. The seams may be taped in some embodiments per standard insulating practices. In the illustrated embodiment, two semi-circular sections are used. Any suitable type and thickness of commercially-available insulation may be used. Examples include fiberglass, mineral wool, Styrofoam, etc. which may optionally include an internal and/or external covering or facing 5171 which may be weather-proof for protection against the elements or water inside the reactor containment structure and/or provide an air, radiant, and/or vapor barrier (best shown in FIG. 115). Examples of standard facing materials include Kraft paper, vinyl sheeting, and aluminum foil. Example thicknesses of insulation which be used may be about 1 inches to 4 inches, or more as needed depending on the thermal insulating requirements and ambient temperatures for a given cask cooling application to ensure that heat absorbed by the cooling medium is primarily from the cask side of the cooling jacket 5100 rather than the environment. In one exemplary embodiment, the insulation may be about 4 inches thick.

The cooling jacket 5100 is made from metallic materials which preferably have good fracture strength and resistance at cryogenic temperatures. The inner shell 5101 which faces the cask 5020 may be made from a good thermally conductive material such as for example without limitation copper or aluminum (inclusive of their commonly used alloys). The rest of the cooling jacket body (e.g. outer shell 5102, top closure plate 5116, bottom closure plate 5117, end plates 5135) and appurtenances (e.g. stiffening plates 5136, spacers 5141, hangers 5150, access hatches 5160, etc.) may be made of suitable metallic materials such as for example without limitation aluminum, aluminum alloy, copper, steel, stainless steel, etc. All of the materials used for the foregoing parts preferably have low nil ductility temperatures (NDT), which is a commonly used engineering parameter in the art associated with the temperature at which the failure mechanism of a metal changes from ductile to brittle resulting in fracture. In various embodiments, the inner and outer shells 5101, 5102 may be formed of the same or different metals. In one embodiment, the inner shell 5101 facing the cask 5020 may be formed of a metal having a higher thermal conductivity (BTU/(h-ft-° F.)) than the outer shell 5102 facing the ambient environment. This would maximize heat transfer from the cask through the inner shell to the cooling medium 5120 which is desired heat transfer path to the heat sink, yet minimize heat transfer from the ambient environment to the cooling medium. Non-limiting example constructions would be an inner shell formed of copper and an outer shell formed of aluminum or steel, or inner shell formed of copper or aluminum and an outer shell formed of steel. Any suitable thickness may be used for shells 5101, 5102. A non-limiting representative thickness that may be used is about ½ inch because the cooling jacket is not intended for radiation shielding, which is provided by the cask. Gamma radiation shielding using metallic materials typically requires substantially greater thicknesses, on the order of about 5 inches or more. Accordingly, the inner and outer shells 5101, 5102 of cooling jacket 5100 preferably have a thickness less than 2 inches, and more preferably 1 inch or less to keep the cooling jacket structure as light weight as possible for lifting and deployment.

A process or method for cooling a container housing spent nuclear fuel (SNF) such as without limitation a cask 5020 in this non-limiting example will now be briefly summarized based on the foregoing discussion and with general reference to FIGS. 101-117. The method includes providing an empty cooling jacket 5100 and circumferentially surrounding at least a portion of the cask with the cooling jacket. If the cooling jacket is provided as a factory or on-site prefabricated annular structure forming a continuous circle, the jacket may be raised completely above the cask 5020 such as via a crane or hoist, and then lowered into position around the exterior of the cask as shown in FIGS. 116-117 (showing the cask). The top hangers 5150 of the cooling jacket 5100 engage the top of the cask 5020 (e.g. top surface 5070-1 of top mounting flange 5070) while the cooling jacket is being lowered around the cask. The annular interstitial space 5140 is formed between the cooling jacket and cask, which may include radially engaging the cooling jacket interior spacers 5141 with the outer surface of the cask. The bottom portions of the cask 5020 (e.g. bottom flange 5026 and lid 5050) remain exposed beneath the bottom closure plate 5117 of the cooling jacket so as to not interfere with any cooling air provisions which might be incorporated into the structure of the cask.

If the cooling jacket 5100 is alternatively provided as two prefabricated segments 5100-1, 5100-2 as previously described herein, each segment may be raised and then lowered to locate each cooling jacket segment around one-half of the cask on opposite sides. The segments need not be fully raised above the top of the cask unlike the continuously circular cooling jacket embodiment described immediately above, thereby advantageously requiring less overhead crane/hoist clearance for positioning the cooling jacket. The cooling jacket segments 5100-1, 5100-2 may be simply laterally moved or rolled into position about the cask. The end plates 5135 of each segment are then abutted against each other so that there is no appreciable gap between the segments. The cooling jacket segments may optionally be detachably coupled together at the end plates 5135 such as via the angle clips 5130 and threaded fastener sets 5131 previously described herein, or another suitable temporary fastening means.

FIGS. 116-117 show the cooling jacket 5100 fully in position on the cask 5020. Cooling jacket 5100 is removably mounted to the cask in a suspended cantilevered manner by top hangers 5150. The bottom end of the cooling jacket 5100 (e.g. bottom closure plate 5117) is elevated above the bottom of the cask as shown. Bottom closure plate 5117 may engage gusset plates of the bottom flange 5026 of cask 5020.

In one scenario once the cooling jacket 5100 is in position around the cask, the cooling medium 5120 may then be added to the previously empty cooling medium cavity 5109 in the cooling jacket via the access hatches 5160. The hatch cover plates 5160 are removed and then replaced after filling the cooling jacket with the cooling medium during this process. The cooling medium may be dry ice in the present non-limiting example which sublimates at normal atmospheric pressure maintained in the cooling medium cavity 5109 by the vent holes 5165 in the cooling jacket. With cooling jacket now at least partially filled with dry ice (or substantially completely filled except for some small headspace beneath the cooling jacket top closure ring 5116 inside cavity 5109, the heat sink is therefore now formed in the cooling jacket and ready for operation to cool the cask 5020.

It bears noting that in another scenario, the cooling jacket 5100 may be filled with dry ice first before placement around the cask 5020. The method is not limited by either scenario; however the first scenario is generally preferred as it preserves the dry ice the longest by adding it after the cask is positioned inside the cooling jacket 5100.

Heat emitted external surface of the cask by the cask 5020 by the spent nuclear fuel contained therein is transferred radially outwards across interstitial space 5140 to the cooling jacket 5100. The heat is absorbed by the dry ice in this non-limiting example which becomes heated. The dry ice undergoes sublimation changing from its initial unheated solid phase directly to gaseous carbon dioxide ($CO_2$) inside the cooling medium cavity 5109 of the cooling jacket, thereby cooling the cask. The gaseous $CO_2$ rises in cooling medium cavity 5109 and is vented to the ambient atmosphere via the vents 5165 in the cooling jacket top closure plate 5116. Continued heating of the dry ice by the heat emitted from cask 5020 continuously accelerates converts more and more of the dry ice to vaporous $CO_2$. The external and/or internal temperature of the cask may be monitored by suitable temperature sensors (e.g. thermistors, thermocouples, thermometers, etc.) to determine the effectiveness of the cask cooling operation. When the dry ice is depleted to an amount which results in the increase in the external and/or internal temperature of the cask detected by the temperature sensors, additional quantities of dry ice may be added to cooling jacket 5100 as needed.

It bears noting that the dry ice will begin to sublimate when placed inside the cooling jacket 5100 at normal atmospheric pressure alone, but at a slower rate than when the cask is in place inside the cooling jacket. The added heat emitted by the cask 5020 from the SNF housing therein (e.g. such as within nuclear fuel canister 5060) accelerates the sublimation process and depletion rate of the dry ice as the heat is absorbed.

Once the cooling jacket 5100 is mounted to cask 5020, the method may further include lifting and moving the assembly from a first location to a second location in the nuclear power generation facility and/or fuel storage facility.

In other possible variations of the foregoing method, the cooling jacket 5100 may first be position on the desired available horizontal support surface (which may be at grade, below grade, or above grade) in a nuclear power generation or nuclear fuel storage facility, and then the cask may be raised and lowered inside the cooling jacket. This deployment mode of the cooling jacket is only possible where the inside diameter of the cooling jacket (defined by inner shell 5101 or diametrical distance between spacers 5141 if provided) is larger than the largest outside diameter of the cask. In this embodiment, the top mounting hangers 5150 are omitted and the bottom end 5105 of the cooling jacket 5100 defined by bottom closure plate 5117 would engage the available support surface. For cask 5020 configured disclosed herein, it bears noting that the largest outside diameter is defined by the annular bottom flange 5026 and is larger than the smallest inside diameter of the cooling jacket 5100. Accordingly, for such a cask configuration, the method must be practiced by lowering the cooling jacket 5100 over the cask 5020, or laterally positioning cooling jacket segments 5100-1, 5100-2 if provided around the cask as initially discussed above. This results in the assembly cooling jacket and cask arrangement shown in FIGS. 116-117 and already discussed above.

FIGS. 118-131 depict an embodiment of a cooling jacket 5200 suitable for use with horizontal storage of spent nuclear fuel (SNF) which is used in some nuclear waste storage facilities. Horizontal cooling jacket 5200 is similar in design, construction, and operation to vertical cooling jacket 5100 previously described herein. For the sake of brevity, only notable differences will be described now.

Referring to FIGS. 118-131, cooling jacket 5200 has a horizontal orientation when deployed on the cask 5020 which is oriented horizontally (see, e.g. FIGS. 130-131). Cooling jacket 5200 may comprise a single semi-circular segment 5100-1 which arches over and covers the top half portion of the cylindrical sidewalls of the horizontal cask. A plurality of lifting plates 5210 are rigidly affixed to the outer shell 5102 of cooling jacket 5200 such as via welding, brazing, soldering, fasteners and clips, etc. In one embodiment, at least four lifting plates are provided to provide a balanced load for lifting via a crane or hoist to position the cooling jacket over the cask. Cutouts 5211 may be formed in the outer insulating jacket 5170 to allow the lifting plates to project outwards beyond the insulating jacket for rigging.

In the present horizontal embodiment of the cooling jacket 5200, the access hatches 5160 and vents 5165 are formed through the outer shell 5102 of the jacket and communicate with cooling medium cavity 5109 inside the jacket. In one embodiment, a series of longitudinally spaced apart hatches 5160 and vents 5165 may be formed at the top dead center location in the outer shell 5102; the latter for venting the gaseous $CO_2$ produced by sublimation of the dry ice to atmosphere from the cooling medium cavity 5109 of cooling jacket 5200 when in use. A longitudinally-extending channel 5212 is formed in the outer insulating jacket 5170 to accommodate the hatches and vents.

Cooling jacket 5200 further includes substantially flat and linear bottom support plates 5235 on each side, which are analogous and similar in construction, design, and to end plates 5135 of vertical cooling jacket 5100. The support plates 5235 support the weight of the cooling jacket 5200. Arcuately curved and flat end closure plates 5217 are provided on each longitudinal end of the cooling jacket 5200, which are analogous and similar in construction, design, and function to bottom closure plate 5117 of cooling jacket 5100.

A pair of vertical standoffs 5202 are provided which engage and support the bottom of each side of the cooling jacket 5200. Standoffs 5202 elevate the cooling jacket above the support surface 5220 on which the cask 520 is supported from (see, e.g. FIG. 128). The standoffs are laterally spaced apart. Each standoff includes a flat horizontal top plate 5203 and opposing bottom plate 5204, a plurality of flat longitudinal spaced vertical support plates 5201 extending perpendicularly between the top and bottom plates. An optional outer cover plate 5205 and inner cover plate 5206 may be provided which enclose the open spaces formed between the support plates 5201 and further stiffen the standoff structures. Top plates 5203 each abuttingly engage one of the bottom support plates 5235 of cooling jacket 5200 in a flat-to-flat interface when cooling jacket 5200 is placed on standoffs 5202. In some embodiment, the bottom support plates 5235 of cooling jacket 5200 and top plates 5203 of standoffs 5202 may be detachably coupled together during use of the cooling jacket via a plurality of fasteners, clamps, or other temporary securement means.

Cooling jacket 5200 also includes a plurality of spacers 5141 similarly to vertical cooling jacket 5100 which are located in the central space 5103 defined by the cooling jacket to receive the cask 5200 at least partially therein. The spacers maintain the interstitial space 5140 formed between the cask and cooling jacket 5200 in a similar manner as well.

Although cooling jacket 5200 is shown as a single assembly, in other possible embodiments the cooling jacket may be formed of multiple arcuate segments each less than a half circle.

In order to further structurally strengthen the cooling jacket 5200, the jacket may also include a plurality of horizontally/longitudinally spaced apart radial stiffening plates 5236 arranged in the internal cooling medium cavity of the jacket (see, e.g. FIG. 129). These plates serve a similar function to stiffening plates 5136 of vertical cooling jacket 5100. Stiffening plates 5236 are vertically oriented when a vertical cask 5020 is used as shown in the presently described embodiment. Stiffening plates 5136 are arcuately curved in shape and extend in a radial direction between the inner and outer shells 5101, 5102 of cooling jacket 5200. Stiffening plates 5136 are preferably rigidly attached to the inner and outer shells 5101, 5102 such as via welding, brazing, soldering, fasteners and clips, etc. The method used depends on the selection of metallic material for the inner and outer shells.

The horizontal cooling jacket 5200 is positioned or deployed about cask 5020 and used in a similar manner to vertical cooling jacket 5100 previously described herein to externally cool the cask. In the illustrated embodiment, cooling jacket 5200 is raised completely over the horizontally oriented cask 5020 and lowered into position on the standoffs 5202 which may already be positioned on the horizontal support surface 5220. In other possible embodiments, the standoffs 5202 may alternatively be detachably coupled to the cooling jacket 5200 before placement on the support surface 5220 about the cask.

Variations in the sequence of steps related to any of the foregoing cooling jacket deployment methods or processes previously described herein may be used in practice and does not limit the invention.

Either the vertical or horizontal embodiments of the cooling jacket 5100 or cooling jacket 5200 disclosed herein provides flexibility to the designer to tailor the rate of heat extraction to the cask's needs by controlling parameters such as the radial gap (interstitial space 5140) between the cask and cooling jacket, and absorptivity of the cooling jacket inner surface 5107 and inner shell 5101 material/thickness facing the cask. Means to identify the quantity of remaining dry ice in the cooling jacket can be discerned by telltale holes/connections at the top of the jacket cavity 5109 or by suitably located sight glasses. Although the cooling jackets 5100, 5200 are ideally suited for cooling the cask during short term operations at a worksite; the jackets are not normally intended for long haul of loaded casks. Calculations show that the cooling jacket 5100 or 5200 can optimally be sized for use with transfer casks to maintain their cooling function for up to 12 hours with adequate margin (i.e. one extended worker shift). For longer short-term operations, intermediate replenishment of the dry ice in the jacket will typically be required.

In alternative embodiments contemplated, cooling jacket 5100 may be incorporated into the body of the cask 520 in lieu of being a detachably coupled device. FIGS. 132 and 133 depict a cask 5020 with incorporated and integral cooling jacket.

In FIG. 132, integral cooling jacket 5100 forms an outermost portion of the body of the cask 5020; the inner gamma blocker cylinder (GBC) 5040 and outer neutron shield cylinder (NSC) 5021 forming inboard portions of the cask body. In this embodiment, the inner shell 5101 of cooling jacket 5100 may be omitted and outer shell 5032 of NSC 5021 provides the same function as inner shell 5101 to contain the cooling medium 5120, which may be dry ice in some embodiments. The cooling jacket 5100 in this embodiment need comprise only a single cylindrical outer shell.

In FIG. 133, the integral cooling jacket 5100 forms an intermediate portion of the body of the cask 5020 being disposed and sandwiched between the inner gamma blocker cylinder (GBC) 5040 and outer neutron shield cylinder (NSC) 5021. In this embodiment, the inner shell 5033 of NSC 5021 may provide the same function as outer shell 5102 of cooling jacket 5100 which may be omitted.

Each of the integral cooling jackets 5100 of FIGS. 132 and 133 contain the same access hatches 5160 and top vents 5165 as previously described herein for adding cooling medium 5120 to the cooling medium cavity 5109 and permit venting gaseous $CO_2$ from the cavity, respectively.

It bears noting that the integral cooling jacket 5100 of FIGS. 132 and 133 each may form part of the outer neutron shield cylinder (NSC) 5021 which may be separable from the concentrically arranged inner gamma blocker cylinder (GBC) 5040 nested therein as previously described herein. In other possible embodiments where the NSC and GBC are not separable from each other as in conventional cask body constructions, the inner shell 5101 of the integral cooling jacket 5100 may be omitted entirely as it is not necessary. In such a cask construction for the embodiment of FIG. 133, the outer shell 5048 of inner GBC 5040 and inner shell 5033 of outer NSC 5021 form the inner and outer containment boundaries of the cooling jacket 5100, respectively. The cooling medium 5120 is therefore disposed directly between and contacts shells 5048 and 5033. The same top access hatches 5060 and vents 5065 are provided through the cask structure for adding cooling medium and venting gases from cooling medium cavity 5109 to atmosphere, as previously described herein. This unitary cask body construction embodiment is shown in FIG. 134.

Although the cask embodiments shown in FIGS. 132-134 are illustrated as containing a single integral cooling jacket 5100, in other possible embodiments more than one cooling jacket 5100 may be provided which may each contain the same or a different type of cooling medium in various implementations and uses.

VI. Inventive Concept 6

With reference to FIGS. 135-150, a sixth inventive concept will be described.

For non-limiting exemplary purposes, the cask/canister cooling system and related methods discussed herein will be described in connection with transport casks used to the transport, store and handle high level radioactive waste such as spent nuclear fuel ("SNF"). However, the invention is not limited in its applicability to casks handling SNF alone, and can be utilized to cool casks emitting heat used to handle any type of high level nuclear waste, including for example without limitation without limitation burnable poison rod assemblies ("BPRA"), thimble plug devices ("TPD"), control rod assemblies ("CRA"), axial power shaping rods ("APSR"), wet annular burnable absorbers ("WABA"), rod cluster control assemblies ("RCCA"), control element assemblies ("CEA"), water displacement guide tube plugs, orifice rod assemblies, vibration suppressor inserts and any other radioactive materials. The SNF and foregoing waste materials may collectively be referred to as "nuclear waste" herein all of which are radioactive. Moreover, while this invention is focused on cooling of casks containing high level nuclear waste, it can be applied to cool any type of nuclear-related or non-nuclear vessels with heat producing contents that need to be kept cool for operational reasons.

FIGS. 135-148 show one non-limiting embodiment of a vertically oriented cask 6020 containing spent nuclear fuel (SNF) which may utilize the cooling water system according to the present disclosure. However, the present cooling system can be used with a cask in other orientations such as casks in a horizontal or inclined orientation. The heat extraction effectiveness of the cask cooling system may be influenced by the orientation of the cask, but the present invention is equally applicable to such alternate orientations. An embodiment of the cask cooling system for horizontally orientated nuclear fuel storage/transport casks is disclosed later herein.

Referring now to FIGS. 135-148, a cask such as a transfer cask 6100 may be cooled by the present water cooling. Cask 6100 may be an elongated vessel having a cylindrical body defining a longitudinal axis LA. Cask 6100 includes a top end 6122, a bottom end 6123, cylindrical sidewall 6124 extending between the ends, and an internal longitudinal cavity 6144. Cask 6100 further includes an internal surface 6101 defining cavity 6144 and an opposite external surface 6102 facing the ambient environment.

Cavity 6144 of cask 6100 extends for substantially a full height of the cask along the longitudinal axis LA from the top to bottom end. Cavity 6144 is configured to hold and a conventional unshielded nuclear spent fuel (SNF) canister 6160 therein (shown in FIGS. 137 and 144). The cask cavity 6144 preferably has a transverse cross-sectional area configured to hold no more than a single spent nuclear fuel canister 6160, which in turn defines an internal canister cavity 6162 that holds a plurality of conventional SNF assemblies 6165 each of which contain multiple fuel rods. One or more fuel assemblies 6165 are disposed in conventional gridded fuel basket 6164 inside canister 6160; a few of which are represented schematically in FIG. 144 by hatching as such assemblies are well known in the art. Canister 6160 includes an unshielded cylindrical body and a sealable top lid 6161 which can be seal welded to the body to close cavity 6162. A typical nuclear fuel canister may hold approximately 89 fuel assemblies at full capacity as one non-limiting example.

Referring particularly to FIGS. 137 and 144, cask 6100 includes radiation shielding to prevent transmission of neutron particles and gamma rays to the external ambient environment surrounding the cask. Sidewall 6124 of cask 6100 accordingly may have a composite multi-shell wall construction comprising concentrically arranged outer shell 6130, inner shell 6134, and intermediate shell 6132 disposed therebetween. A gamma blocking liner 6131 is interposed and sandwiched between outer shell 6130 and intermediate shell 6132. In addition, a neutron attenuation shielding media 6133 is interposed and sandwiched between inner shell 6134 and intermediate shell 6132 to complete the nuclear radiation shielding. The shells may be formed of a suitable metal of sufficient structural strength and thickness, such as without limitation stainless steel for corrosion protection as one example.

The gamma blocking liner 6131 may be preferably constructed of a high density and high thermally conductive metallic material(s) selected and operable to block gamma radiation. Suitable materials which may be used that meet those criteria include steel, lead, or copper as some non-limiting examples. In one embodiment, the liner 6131 may comprise lead. The neutron shielding media 6133 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 6133 may be liquid such as water containing boric acid. In either the case of a solid or liquid neutron shielding media, the media may be completely enclosed or encased between inner and intermediate shells 6134 and 6132.

The bottom end 6123 of cask 6100 may include a gusseted annular bottom support flange 6126 for supporting the cask during transport and stiffening of the sidewall 6124 of the cask. Flange 6126 extend radially outwards beyond sidewall 6124 and circumferentially completely around the cask. The flange 6126 is configured and arranged to engage a platform surrounding a mating receptacle of a conventional self-propelled wheeled or tracked vertical cask transport vehicle or crawler used to transport the fully loaded cask 6020 with loaded fuel canister. Such cask transporters are well known in the art and commercially available from manufacturers such as Enerpac Heavy Lifting Technology and others. The bottom end 6123 of the cask 6100 projects downwards below support flange 6026 into the upwardly open receptacle of the crawler and may not engage any structural surface of the transport vehicle for support. Accordingly, the bottom support flange 6126 essentially supports the entire weight of the cask 6100 and spent fuel contained therein.

The cavity 6144 at the bottom end 6123 of cask 6100 may be closed by a detachable bottom lid 6150. Lid 6050 protrudes vertically downwards below the bottom support flange 6126 and bottom end 6123 of cask 6100. The bottom lid 6050 is constructed to support the spent fuel canister 6160 which rests on the planar horizontal top surface of lid, which is of suitable thickness for this purpose without undue deflection from the weight of the canister.

Bottom lid 6150 may be removably coupled to bottom end 6123 of cask 6100 via any suitable means, such as via fasteners such as threaded fasteners in one embodiment. In other embodiments, lid 6150 may be permanently attached to cask 6100 such as via hermetic seal welding to provide a liquid and air leak proof coupling.

With continuing general reference to FIGS. 135-148, the top end 6122 of the cask 6100 may be terminated by an annular top mounting flange 6170 configured for mounting a top lid 6171 (represented in dash lines in FIG. 138) thereto. Flange 6170 projects radially/laterally outwards beyond the sidewall 6124 of cask 6100. An annular collar 6172 mounted to the top of the buttstock body projects upwards through and beyond the central opening of the flange 6170. The collar 6172 may assist with mounting and sealing the cask top lid 6171 to the mounting flange 6170 and cask. Lid 6171 may be detachably mounted to the top mounting flange 6170 by any suitable means, such as a plurality of mounting fasteners or welding as some non-limiting examples. Any suitable configuration of lid 6171 may be used.

The cask cooling system will now be described.

Referring now to FIGS. 135-148, the cask cooling system generally comprises a ring-shaped or annular cooling water header 6200 detachably mounted to cask 6100 in one embodiment. Header 6200 has an annular body which extends in a circular configuration completely around the circumference of the cask sidewall 6124. Header 6200 defines and circumscribes a central spaced configured to receive the cask. In one preferred embodiment as illustrated, header 6200 may be continuous in structure and completely encircles cask 6100 for a full 360 degrees to uniformly wet the entire circumference thereof. A continuous circular internal flow path and pressure retention boundary defined inside the header 6200 is thus provided. The cooling water header may be provided as single prefabricated circular unit which can be slipped over the top end of the cask and positioned on its mounting brackets 6220, as further described herein.

In other possible embodiments, the cooling water header 6200 may alternatively be provided as multiple (i.e. 2 or more) arcuately shaped header sections or segments which may be assembled and fluidly coupled together end-to-end in leak-resistant manner via suitable commercially-available fluid end couplings (e.g. bolted pipe flanges, threaded tube connections, etc.) after emplacement around the cask 6100. This allows the multiple header sections to be positioned proximate to the cask in a lateral direction on its supports as opposed to slipping the one-piece header unit described above over the top end of the cask 6100 which may more convenient for both installation and handling in some situations. FIG. 142 shows one of embodiment of the possible arrangement and location of piping/tubing joints 6280 in header 6200, which in this non-limiting example is formed by two semi-circular header sections 6281 coupled together at the joints. Each header section is supported by two mounting brackets 6220. Once the header sections 6281 are assembled and fluidly coupled together, a continuous circular internal flow path and pressure retention boundary is established the same as the one-piece header.

In yet other possible embodiments, the cooling water header 6200 may alternatively be provided as multiple (i.e. 2 or more) arcuately shaped header sections or segments which may not be fluidly coupled together end-to-end. For the foregoing example of two header semi-circular header sections 6281 (referring to FIG. 142), each section may be simply terminated at both ends by a conventional end cap fitting such that one section is not in fluid communication with the other section. To ensure complete and uniform wetting of the cylindrical sidewall 6124 of the cask 6100, however, each header section 6281 preferably should terminate in close and adjacent proximity to each other at their ends at a location similar to where the joints 6280 are indicated in FIG. 142. Each of the fluidly isolated header sections 6281 in this example are fed cooling water by a separate supply line 6240A, 6240B as shown.

In all of the above embodiments and variations of the cooling water header 6200 construction described, the preferred installed cooling water header configuration is generally circular and annular overall even when formed from multiple fluidly coupled or isolated header sections.

With continuing general reference to FIGS. 135-148, cooling water header 6200 is positioned around the upper half and portion of cask 6100 to deliver cooling water to the upper surface of the cask sidewall 6124. Preferably, header 6200 is spaced downwards from the top of the cask by a sufficient distance to prevent interfering with making the canister lid 6161 to canister 6160 circumferential hermetic seal weld previously described herein. In one non-limiting embodiment, header 6200 may be positioned at an elevation below the top of the fuel canister 6160 when placed inside the cask, but at a position equal to 60% or more than a height of the canister for optimum cooling of the cask and canister therein. This positioning balances the need to cooling the cask and canister while avoiding interference with the canister lid welding operations which may be performed simultaneously while the cask is being cooled by the cooling system.

Cooling water header 6200 may have a conventional circular cross sectional shape in one embodiment. Header 6200 includes a top surface 6204, bottom surface 6203, outer surface 6205, and inner surface 6206 facing the cask when positioned inside the header (see, e.g. FIGS. 141 and 146-147).

Cooling water header 6200 may be formed of suitable piping or tubing (collectively a "flow conduit") of suitable diameter selected to provide the desired rate of flow. Any suitable metallic material or non-metallic material (e.g. plastic) may be used. If metal is used, the material selected is preferably corrosions resistant such as for example without limitation aluminum or stainless steel. Header 6200 preferably may have a rigid structure in some embodiments to hold its annular shape without undue sagging between support points from the cask, further described below.

Cooling water header 6200 comprises a plurality of water dispensing outlets 6201 which are configured to direct cooling water onto and wet the external surface 6102 of the cask 6100. This in turn cools the canister 6160 and SNF therein to prevent boiling of the water retained in the canister until welding of the lid to the canister is completed. The dispensing outlets 6201 are preferably provided in number and arrangement to wet the entire cylindrical sidewall external surface 6102 of cask 6100 for uniform cooling. The outlets 6201 may each take various forms in different implementations, including for example without limitation simply openings or orifices formed directly into the header 6200 in the header in some embodiments. In other embodiments, the dispensing outlets 6201 may comprise spray nozzles 6202 as best shown in FIGS. 146-147 which are configured to drip or spray the cooling water onto the external surface 6102 of cask 6100. Each nozzle 6202 is fed by a corresponding flow hole or aperture formed in the header 6200 which allows the nozzle to receive pressurized cooling water flowing inside the header in a circular/circumferential flow pattern around the cask 6100. In one non-limiting embodiment as shown, nozzles 6202 may be arranged on the bottom surface 6203 of header 6200. In other possible embodiments, nozzles 6202 may alternatively be arranged on the top surface 6204, inner surface 6206, or a combination of the top, inner, and bottom surfaces depending on the desired coverage of cooling water applied to the cask.

Nozzles 6202 may be configured to provide any suitable spray pattern P to wet the external surface 6102 of cask 6100 as uniformly as possible. In one embodiment, a fan shaped spray pattern P may be used (see, e.g. FIG. 147). The fan shaped spray pattern permits overlap of spray from adjacent (but spaced apart) nozzles to minimize the number of nozzles required to uniformly wet and cool the entire cylindrical sidewall external surface 6102 of the cask.

Cooling water header 6200 is supported directly from the cask 6100 by a plurality of mounting brackets 6220. Brackets 6220 may be detachably mounted to the cask in one embodiment. This permits the cooling water header to be used only for those casks having high thermal output energy which are in need of external cooling to prevent boiling of the water remaining in the canister 6160 from the fuel pool until the canister lid to canister hermetic seal weld can be completed.

Referring to FIGS. 146-147, brackets 6220 each have a radially elongated body comprising a lower base portion 6221 and detachable upper securement portion 6222. Base portion 6221 includes an inner mounting end 6223 configured to receive threaded fasteners 6224 to couple the base portion to the external surface 6102 of cask 6100 (i.e. cylindrical sidewall 6124). Two fasteners may be used to complete a stable coupling in one embodiment as shown. The cask 6100 may include predrilled and tapped threaded holes to receive the fasteners 6224. Base portion 6221 further includes an outer supporting end 6226 which is configured to seat the cooling water header 6200 thereon. In one embodiment, supporting end 6226 defines an upwardly open concave cradle 6225 of semi-circular shape on which the lower half of header 6200 rests. Cradle 6225 is complementary configured in radius to the diameter of the header for a relatively snug engagement therebetween. The upper securement portion 6222 is generally U-shaped defining a downwardly open concave receptacle 6227 which is complementary configured to cradle 6225 in shape and radius. Receptacle 6227 covers the upper half of header 6200. Threaded fasteners 6228 may be used to detachably couple the securement and base portions 6222, 6221 together to trap and lock the cooling water header 6200 to the mounting brackets 6220 as shown.

In some embodiments as shown in FIGS. 137 and 144-145, the mounting brackets 6220 may be mounted via fasteners 6224 to vertically elongated longitudinal reinforcement plates 6230 fixedly incorporated into the structure of the cask 6100. Reinforcement plates 6230 may extend for the full height of the cask sidewall 6124. Plates 6230 extend in a radially outward direction from inner shell 6134 to outer shell 6130 of the cask. An inboard end 6231 is rigidly affixed to inner shell 6134 such as via welding and an opposite outboard end 6232 are rigidly affixed to outer shell 6130 such as via welding. Reinforcement plates 6230 may have a T-shaped transverse cross section including a circumferential portion 6233 proximate to outboard end 6232 to facilitate alignment of shell section edges for welding together where the cask is comprises of multiple arcuate sections assembled together (see, e.g. FIG. 137). The reinforcement plates 6230 provide a convenient and robust location for securing the mounting brackets 6220 to the cask. However, the brackets need not be secured to the plate locations only and any suitable locations on the external surface 6102 of the sidewall 6124 of cask 6100 may be used for mounting the header mounting brackets.

When the cooling water header 6200 is mounted to the mounting brackets 6220, the header is supported in a cantilevered manner from the cask 6100. Header 6200 may be entirely supported from the cask 6100 by the brackets in some embodiments as illustrated. Brackets fixedly hold the header in spaced apart relation to the external surface 6102 of the cask. The radial distance selected between the cask 6100 and header 6200 is selected to allow uniform wetting of the entire outer surface of the cask with the cooling water spray delivered from spray nozzles 6202. In one embodiment, brackets 6220 are preferably made of a suitable corrosion resistant metal such as aluminum, stainless steel, galvanized steel, or other. Any suitable number of brackets 6220 may be used to support the header 6200 preferably without undue sagging between the brackets. In the illustrated embodiment, four brackets are used (one to support the cooling water header 6200 in each quadrant). The number of brackets 6220 and spacing may be determined by the material and weight of the cooling water header to be supported.

It bears noting that other types and configurations of mounting brackets 6220 may be used in other embodiments.

Cooling water header 6200 is fluidly coupled to a suitable source of cooling water via water supply line 6240 (see, e.g. FIG. 142). In one embodiment, a reservoir such as cooling water tank 6241 holding a supply of cooling water may provide the source. Cooling water is delivered to water supply line 6240 and header 6200 in turn at pressure based on the static pressure head created in the tank without the assistance of pump, thereby creating a passive system which does not rely on the availability of electric or other power (e.g. gasoline) for operation. The cooling water flows by gravity from the tank 6241 to the header 6200 and spray nozzles 6202 via the available static pressure head. The flow rate of cooling water may decrease over time as cooling water is consumed and the surface level of remaining water in the tank continually drops. In one embodiment, the cooling water tank 6241 may be located at an elevation above the cask 6100 so that the flow of cooling water remains completed gravity driven.

In other possible embodiments where it may not be possible to locate the cooling water source conveniently above the cask 6100, pumped cooling water may be used. In this case, the water supply line 6240 may alternatively be fed with cooling water delivered by one or more powered cooling water pumps 6242 (shown in dashed lines in FIG. 142) which provide a pressurized source of water to cooling water header 6200 independently of the elevation of the cask 6100 and water source relative to each other. Pump(s) 6242 may be electrically driven or powered by a gasoline engine in some embodiments. The pumps 6242 may take suction from any available source of cooling water, such as cooling water tank 6241. Tank 6241 may be located at the same elevation (e.g. grade or ground level) as the cask 6100 in this embodiment of the cooling system.

In the case of either a gravity driven passive cooling water system or a pump pressurized cooling water system, the cooling water tank 6241 may be portable and supported on movable base or platform, which can be transported via fork lift, crane, hoist, or other motorized lifting apparatus. In the case of the gravity driven cooling water system, the lifting apparatus may be used to elevate and hold the cooling water tank 6241 above the top of the cask to ensure that the header 6200 does not run dry as long as water is available in the tank. The bottom of tank 6241 may therefore be higher than the top of the cooling water header 6200 in some arrangements.

In one embodiment, water supply line 6240 may be bifurcated into a first branch 6240A and second branch 6240B at the cask 6100 to provide two separate points of cooling water supply to the cooling water header 6200. This ensure a more uniform supply and distribution of cooling water to the nozzles 6220 of the header. The supply of cooling water may be controlled (e.g. open for flow, closed to stop flow, or throttled therebetween) via one or more water supply valves 6243. A separate valve may be used for each branch 6240A, 6240B to balance the cooling water flow.

Water supply line 6240 may be comprises of any suitable piping or tubing which may be metallic or plastic. Supply line 6240 may be flexible or rigid in structure. In one embodiment, as shown, tubing may be used. Supply line 6240 may be fluidly coupled to cooling water header 6200 via suitable commercially-available flow fittings 6244 (best shown in FIG. 141).

Operation of the cooling water system will now be briefly described for cooling cask 6100 containing high level radioactive waste emitting heat via the following method, recognizing that numerous variations in the method may be used.

A source of cooling water for cask 6100 is provided. The source may be water tank 6241. If a gravity fed cooling wat system is to be used, the tank may be raised by a lifting apparatus at least partially above the cask such that the bottom of the tank is above level at which the cooling water header will be mounted to the cask. The cask 6100 is provided, which may be staged and be located at grade or ground level (e.g. an operating floor inside a nuclear facility building or cask staging pad outside) in some embodiments. The cooling water header 6200 may then be is detachably mounted to cask 6100, such as via mounting brackets 6220. The cooling water source is then fluidly coupled to cooling water header 6200 by fluidly coupling water supply line 6240 to the header at one end and to water tank 6241 at the other end if a gravity fed cooling water system is used. If pumped, the supply line 6240 is fluidly coupled to the pump(s) 6242. The flow of cooling water to the header 6200 is initiated by at least partially opening supply valves 6243 (assuming two are provided as described above). A single supply valve 6243 may be used, in which case that single valve is opened.

The method continues by flowing cooling water in an arcuate or circular flow path around the cask 6100 inside cooling water header 6200, and directing the cooling water radially inwards onto the cask external surface 6102 from the plurality of water dispensing outlets 6201 (e.g. spray nozzles 6202) on the cooling water header. The cooling water wets the external surface 6102 of cylindrical sidewall 6124 of the cask and flows downwards from the top to bottom along the cask. The cooling water flow cools the cask 6100 forming a heat sink which absorbs the heat emitted by the radioactive waste contained in the canister 6160 inside the cask. When the cask is sufficiently cooled, the water supply may be terminated to the cooling water header 6200 by closing valves 6243. The water supply line 6240 may be uncoupled from the header 6200. The cooling water header may in turn be detached from the cask for use with another cask having a canister with high heat load which requires cooling.

FIG. 149 shows a first alternate embodiment of a cooling water header 6301. In this embodiment, the flow dispensing outlets 6201 comprise a plurality of circumferentially spaced apart flow orifices or apertures 6312. The flow apertures are arranged on the inward facing inner surface 6206 of header 6301 to direct cooling water against external surface 6102 of cask 6100. Header 6301 is the same as cooling water header 6200 in all other aspects and mounting details including mounting brackets 6220, as previously described herein.

FIG. 150 shows the addition of an annular flow guide or director 6314 to the cooling water header 6301 assembly. Flow director 6314 may extend from header 6301 radially inwards towards external surface 6102 of cask 6100. Flow director 6314 may be fixedly attached secured at its outer peripheral circumferential edge 6320 to the bottom surface 6303 of the header. The inner peripheral circumferential edge 6321 may detachably and abuttingly engage external surface 6102 of the cask, but need not be permanently attached to the cask. The flow director 6314 forms a water plenum or trough which receives cooling water from flow aperture 6312 which circulates around the entire circumference of the cask. From there, a plurality of drip orifices 6316 in turn are formed in flow director 6314 which dispense the water downwards against the external surface 6102 of cask 6100 to produce a water curtain flowing downwards along the cask.

In one embodiment, the flow director 6314 may be formed of a flexible elastomeric material (e.g. natural rubber or synthetic elastic polymer) which can deform against the external surface 6102 of cask 6100 to preferably form a leak resistant seal at the flow director to cask interface. If some leakage occurs, this is acceptable since the cooling water will still contact the external surface of the cask and flow downwards. The flow director 6314 helps provide more uniform distribution and wetting of the entire circumference of the cask 6100 for effective cooling and heat dissipation.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An air-cooled condenser comprising:
   an array of cooling cells, each cooling cell comprising:
   a structural frame defining a longitudinal axis and comprising a main beam, a plurality of transversely elongated condensate header support beams affixed to the main beam, and plurality of deflection limiter beams affixed to the condensate header support beams which collectively form a V-shaped structure;
   a pair of longitudinally-extending steam headers mounted to a top of the frame which receive steam from a source of steam;
   a pair of longitudinally-extending condensate headers mounted to the condensate header support beams, one condensate header being arranged on each side of the main beam;
   a pair of inclined tube bundles each comprising a plurality of tubes connected to an upper tubesheet and a lower tubesheet, the tube bundles disposed at an acute angle to each other;
   each tube bundle arranged coplanar with the deflection limiter beams and fluidly coupled to one of the steam headers at top and one of the condensate headers at bottom;
   a fan mounted at a top of the frame and operable to draw ambient cooling air through the tube bundles; and
   each deflection limiter beam having a width which engages and is supported by one of the condensate headers;
   wherein each condensate headers is trapped between an upwardly concave support surface defined by each condensate header support beam and a downwardly concave entrapment surface defined by a bottom mounting end of the deflection limiter beams.

2. The air-cooled condenser according to claim 1, wherein the main beam is supported by a plurality of vertical support columns which elevate the air-cooled condenser above ground level.

3. The air-cooled condenser according to claim 1, wherein the fan is supported by a fan deck supported in turn directly from the deflection limiter beams.

4. The air-cooled condenser according to claim 2, wherein the bottom mounting of each deflection limiter beam comprises a trapezoid shaped face plate surrounded on a top and lateral sides thereof by perpendicularly oriented peripheral flange plates which extend perimetrically around the face plate.

5. The air-cooled condenser according to claim 4, wherein a bottom of each face plate includes a perpendicularly oriented bottom mounting flange which mates with a corresponding top mounting flange on each condensate header support beam forming a flat-to-flat interface and abutting engagement.

6. The air-cooled condenser according to claim 1, further comprising a floating end cap associated with each deflection limiter beam and rigidly affixed to the upper tubesheet, each deflection limiter beam having a top end slideably inserted in an open channel of the end cap; wherein the end caps are configured to prevent out of plane bowing of the tube bundles via engaging the deflection limiter beams when the tubes thermally expand.

7. An air-cooled condenser cell comprising:
   a structural frame defining a longitudinal axis;
   a pair of longitudinally-extending steam headers supported by the frame and configured for receiving steam from a source of steam;
   a pair of longitudinally-extending condensate headers positioned below the steam headers and spaced laterally apart;
   a pair of inclined tube bundles each comprising a plurality of tubes connected to an upper tubesheet and a lower tubesheet, the tube bundles disposed at an acute angle to each other;
   each tube bundle extending between and fluidly coupled to one of the steam headers at top and a different one of the condensate headers at bottom forming a V-shaped tube structure;
   a fan mounted to the cell and arranged to flow ambient cooling air through the tube bundles; and
   a plurality of deflection limiter beams rigidly mounted to the frame;
   wherein the deflection limiter beams are interspersed and arranged between the tube bundles and coplanar therewith; and
   a plurality of floating end caps rigidly affixed to the upper tubesheet, each floating end cap movable with the upper tubesheet within a plane of the tube bundles as the tubes thermally grow in length.

8. The air-cooled condenser cell according to claim 7, wherein the upper tubesheet, floating end caps, and tubes can thermally grow in a direction of the length of the tubes while the deflection limiter beams remain stationary.

9. The air-cooled condenser cell according to claim 7, wherein each deflection limiter beam is slideably received in a downwardly open channel of it a respective one of the floating end caps such that the one of the floating end caps is movable independently of the deflection limiter beam.

10. The air-cooled condenser cell according to claim 9, wherein each floating end cap is configured to engage its a respective one of the deflection limiter beams when the tubes thermally grow to prevent the tube bundles from bowing out of plane.

11. The air-cooled condenser cell according to claim 10, wherein the channel is defined by a spaced apart pair of protrusions downwardly projecting from a flat plate affixed to the upper tubesheet.

12. The air-cooled condenser cell according to claim 11, wherein each deflection limiter beam is a wide flange I-beam comprising a pair of flanges and a web extending therebetween, and wherein the web is received between the protrusions of one of the floating end caps.

13. The air-cooled condenser cell according to claim 12, wherein each floating end cap is configured to allow limited movement of the upper tubesheet in an axial direction along the longitudinal axis when the upper tubesheet is heated.

14. The air-cooled condenser cell according to claim 7, wherein the frame comprises a longitudinally-extending main beam and a plurality of transversely arranged elongated condensate header support beams affixed to the main beam.

15. The air-cooled condenser cell according to claim 14, wherein the condensate header support beams each comprise a pair of arcuately curved saddle support surfaces, each saddle support surface engaging a bottom of one of the condensate headers located on opposite sides of the main beam.

16. The air-cooled condenser cell according to claim 15, wherein the bottom end of each deflection limiter beam comprises an arcuately curved entrapment surface engaging a top of one of one of the condensate headers to lock the condensate header to one of the condensate header support beams.

17. The air-cooled condenser cell according to claim 16, wherein the entrapment surface is defined by a enlarged structural mounting end assembly bolted one of the condensate header support beams, and wherein the mounting end assembly has a generally trapezoidal shape.

18. An air-cooled condenser cell comprising:
a structural frame defining a longitudinal axis;
a pair of longitudinally-extending steam headers supported by the frame and configured for receiving steam from a source of steam;
a pair of longitudinally-extending condensate headers positioned below the steam headers and spaced laterally apart;
a pair of inclined tube bundles each comprising a plurality of tubes connected to an upper tubesheet and a lower tubesheet, the tube bundles disposed at an acute angle to each other;
each tube bundle extending between and fluidly coupled to one of the steam headers at top and a different one of the condensate headers at bottom forming a V-shaped tube structure;
a fan mounted to the cell and arranged to flow ambient cooling air through the tube bundles; and
a plurality of deflection limiter beams rigidly mounted to the frame;
wherein the frame comprises a longitudinally-extending main beam and a plurality of transversely arranged elongated condensate header support beams affixed to the main beam; and
wherein the bottom end of each deflection limiter beam comprises an enlarged structural mounting end assembly coupled to one of the condensate header support beams, and each of the condensate headers are trapped between an upwardly concave support surface of the condensate header support beams and a downwardly concave entrapment surface of the mounting end assembly of the deflection limiter beam.

* * * * *